US010318034B1

(12) United States Patent
Hauenstein et al.

(10) Patent No.: US 10,318,034 B1
(45) Date of Patent: Jun. 11, 2019

(54) DEVICES, METHODS, AND USER INTERFACES FOR INTERACTING WITH USER INTERFACE OBJECTS VIA PROXIMITY-BASED AND CONTACT-BASED INPUTS

(71) Applicant: Apple Inc., Cupertino, CA (US)

(72) Inventors: Mark K. Hauenstein, San Francisco, CA (US); Jeffrey T. Bernstein, San Francisco, CA (US); Julian Missig, Redwood City, CA (US); Marek A. Bereza, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/712,092

(22) Filed: Sep. 21, 2017

Related U.S. Application Data

(60) Provisional application No. 62/506,502, filed on May 15, 2017, provisional application No. 62/399,239, filed on Sep. 23, 2016.

(51) Int. Cl.
*G06F 3/041* (2006.01)
*G06F 3/0354* (2013.01)
*G06F 3/0488* (2013.01)

(52) U.S. Cl.
CPC ........ *G06F 3/0412* (2013.01); *G06F 3/03545* (2013.01); *G06F 3/0416* (2013.01); *G06F 3/04883* (2013.01); *G06F 2203/04108* (2013.01)

(58) Field of Classification Search
CPC ........................... G06F 3/0412; G06F 3/03545; G06F 3/0416; G06F 3/04883; G06F 2203/04108
See application file for complete search history.

(56) References Cited

U.S. PATENT DOCUMENTS

| 9,311,898 B2* | 4/2016 | Ward | G06F 3/0488 |
| 2013/0293490 A1* | 11/2013 | Ward | G06F 3/0488 345/173 |

(Continued)

FOREIGN PATENT DOCUMENTS

| EP | 2 264 116 A1 | 8/2012 |
| WO | WO 2014/105277 A2 | 7/2014 |
| WO | WO 2014/207288 A1 | 12/2014 |

OTHER PUBLICATIONS

International Search Report and Written Opinion, dated Feb. 5, 2018, received in International Patent Application No. PCT/US2017/053038, which corresponds with U.S. Appl. No. 15/712,092, 14 pages.

*Primary Examiner* — Peter D McLoone
(74) *Attorney, Agent, or Firm* — Morgan, Lewis & Bockius LLP

(57) ABSTRACT

An electronic device with a touch-sensitive surface, a display, one or more first sensors to detect proximity of an input object above the touch-sensitive surface and one or more second sensors to detect intensity of contact of the input object with the touch-sensitive surface displays a user interface object at a first location, and detects selection of the user interface object at the first location on the display. While the user interface object is selected, the device detects lateral movement of the input object over the touch-sensitive surface while the input object meets hover criteria. In response, the device moves the selected user interface object in accordance with the lateral movement. While moving the selected user interface object, the device dynamically varies a first visual characteristic of the selected user interface object in accordance with a current hover proximity parameter of the input object.

33 Claims, 226 Drawing Sheets

(56) References Cited

U.S. PATENT DOCUMENTS

| | | | |
|---|---|---|---|
| 2014/0282279 A1* | 9/2014 | Woolley | G06F 3/04883 715/863 |
| 2015/0149964 A1* | 5/2015 | Bernstein | G06F 3/04815 715/836 |
| 2016/0202871 A1* | 7/2016 | Ward | G06F 3/0488 345/175 |
| 2016/0334912 A1* | 11/2016 | Protasio Ribeiro | G06F 3/0414 |
| 2016/0357296 A1* | 12/2016 | Picciotto | G06F 3/016 |
| 2016/0357297 A1* | 12/2016 | Picciotto | G06F 3/0488 |

* cited by examiner

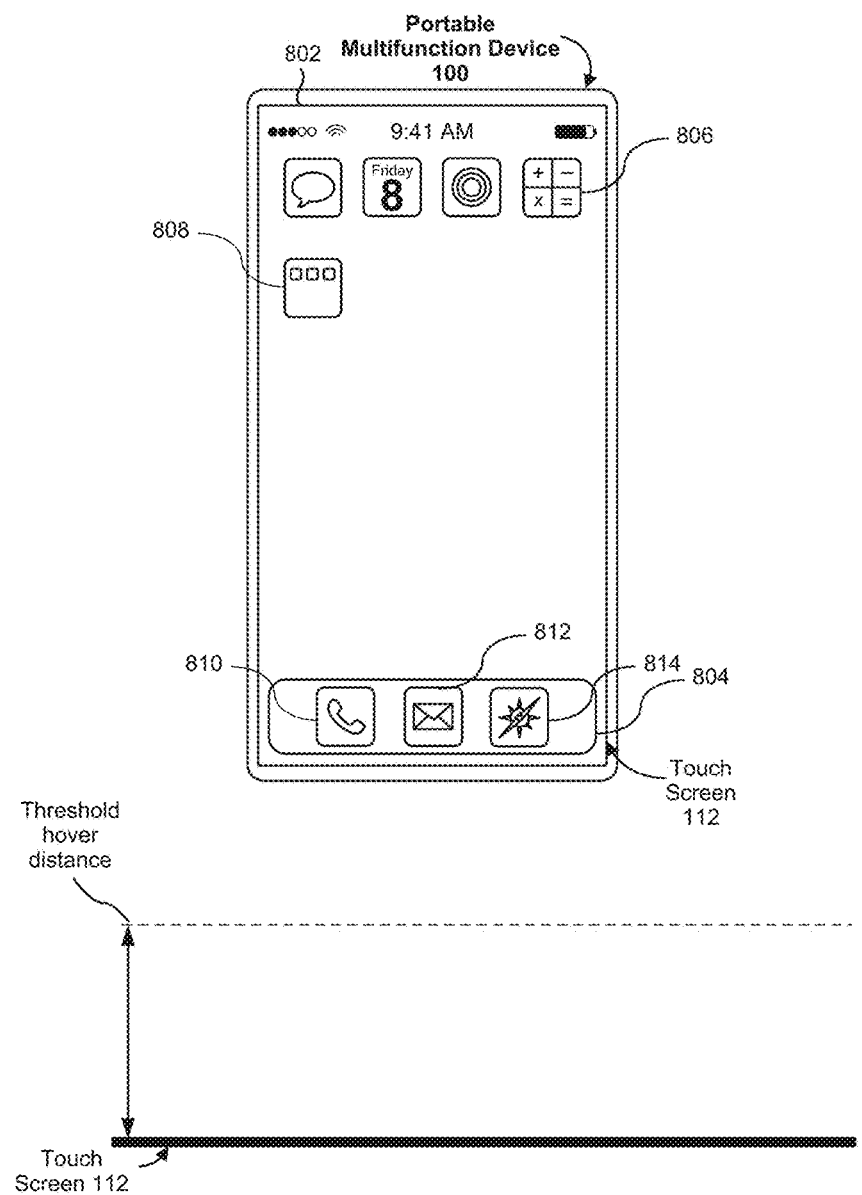

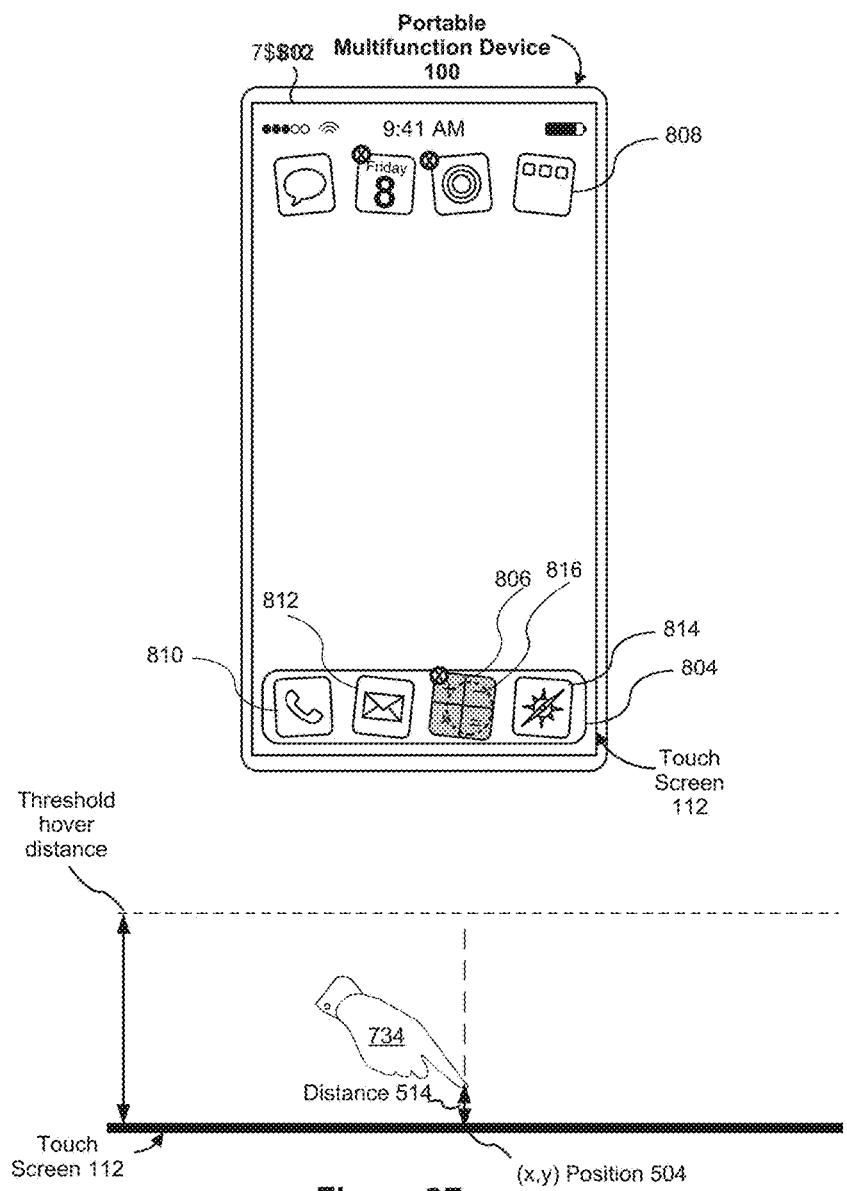

1500

1522 In response to detecting selection of the user interface object at the first location on the display, provide visual feedback to indicate that the user interface object is selected

1506

(B)

1524 Dynamically varying the first visual characteristic of the user interface object in accordance with the current hover proximity parameter of the input object includes dynamically changing a size of the user interface object in accordance with the current hover proximity parameter of the input object

1618 The first manner for dynamically varying the appearance of the user interface object is different from the second manner for dynamically varying the appearance

---

1620 Visually distinguish:
    a hover state of the user interface object during which the appearance of the user interface object is dynamically changed in accordance with the current hover distance, and
    a contact state of the user interface object during which the appearance of the first user interface object is dynamically changed in accordance with the current contact intensity

---

1622 Aurally distinguish:
    a hover state of the user interface object during which the appearance of the user interface object is dynamically changed in accordance with the current hover distance, and
    a contact state of the user interface object during which the appearance of the first user interface object is dynamically changed in accordance with the current contact intensity

---

1624 Provide a first visual and/or audio and/or haptic signal in response to detecting the input object making contact with the touch-sensitive surface at the initial contact location

---

1626 Provide a second visual and/or audio and/or haptic signal in response to detecting the input object breaking contact with the touch-sensitive surface at a final contact location

1628 While dynamically changing the appearance of the user interface object in accordance with the current contact intensity between the input object and the touch-sensitive surface, detect the input object breaking contact with the touch-sensitive surface at a final contact location that corresponds a current onscreen location of the user interface object; and
    in response to detecting the input object breaking contact with the touch-sensitive surface, dynamically change the appearance of the user interface object in a third manner in accordance with the current hover proximity parameter of the input object, wherein:
    the first manner by which the appearance of the user interface object is dynamically changed in accordance with the current hover proximity parameter before the input object has made the initial contact with the touch-sensitive surface differs from the third manner by which the appearance of the user interface object is dynamically changed in accordance with the current hover proximity parameter after the input object has broken the initial contact with the touch-sensitive surface 1630 Across a transition where the input object makes contact with the touch-sensitive surface or where the input object breaks contact with the touch-sensitive surface, maintain a direction in which a first visual characteristic of the user interface object is dynamically changed in accordance with the current hover proximity parameter or the current contact intensity 1632 Detect a third portion of the input, wherein detecting the third portion of the input includes detecting that the current hover proximity parameter ceases to meet the hover criteria while the input object is at a final hover location that corresponds to the current onscreen location of the user interface object; and
    in response to detecting the third portion of the input, restore the appearance of the user interface object to an initial state that was shown before the detection of the first portion of the input 1634 Provide a third visual and/or audio and/or haptic signal in response to detecting the third portion of the input 1636 Before restoration of the appearance of the user interface object to the initial state is completed, display an animation showing an overshoot of the restoration and a reversal of the overshoot

1638 Dynamically changing the appearance of the user interface object includes dynamically changing one or more of visual characteristics selected from a group consisting of: a size, a color, a hue, a color saturation, a brightness, a boldness, an animation speed, a vibration frequency, a level of image clarity or detail, an opacity, an image resolution, and a level of deformity 1640 While dynamically changing the appearance of the user interface object in the first manner in accordance with the current hover proximity parameter of the input object, apply a first dynamically varied sound effect to accompany the dynamically changed appearance of the user interface object 1642 While dynamically changing the appearance of the user interface object in the second manner in accordance with the current contact intensity of the contact by the input object, apply a second dynamically varied sound effect to accompany the dynamically changed appearance of the user interface object 1644 While dynamically changing the appearance of the user interface object in the first manner and in the second manner, apply a third dynamically varied sound effect to accompany the dynamically changed appearance of the user interface object, wherein across a transition where the input object makes contact with the touch-sensitive surface or where the input object breaks contact with the touch-sensitive surface, maintain a direction in which an audio characteristic of the third sound effect is dynamically changed 1646 While dynamically changing the appearance of the user interface object in the first manner or in the second manner:
    detect a current angle of the input object relative to the touch-sensitive surface; and
    apply a fourth dynamically varied sound effect to accompany the dynamically changed appearance of the user interface object, wherein the fourth dynamically varied sound effect varies in accordance with the current angle of the input object 1648 Applying the fourth dynamically varied sound effect to accompany the dynamically changed appearance of the user interface object includes:
    choosing different sound qualities for the fourth dynamically varied sound effect while dynamically changing the appearance of the user interface object in the first manner and the second manner

1650 While the input object meets the hover criteria, detect first lateral movement of the input object over the touch-sensitive surface; and
    in response to detecting the first lateral movement of the input object over the touch-sensitive surface while the input object meets the hover criteria, move the user interface object across the display in accordance with the first lateral movement of the input object over the touch-sensitive surface 1652 While the input object remains in contact with the touch-sensitive surface, detect second lateral movement of the input object across the touch-sensitive surface; and
    in response to detecting the second lateral movement of the input object across the touch-sensitive surface while the input object remains in contact with the touch-sensitive surface, move the user interface object across the display in accordance with the second lateral movement of the input object across the touch-sensitive surface 1654 Before selection of the user interface object, while the input object meets the hover criteria, detect third lateral movement of the input object across the touch-sensitive surface; and
    in response to detecting the third lateral movement of the input object across the touch-sensitive surface while the input object meets hover criteria, distort the user interface object in accordance with the third lateral movement of the input object across the touch-sensitive surface, without moving the user interface object

1714 In response to detecting the second movement of the input object across the touch-sensitive surface:
   in accordance with a determination that the second movement of the input object is detected while the input object is hovering over the touch-sensitive surface without making contact with the touch-sensitive surface, move the position indicator in accordance with the second input without selecting text

1702

(A)

1716 The hover criteria include a criterion that is met when a hover proximity parameter of the input object is less than a threshold proximity value 1718 The position indicator is initially displayed within the text in response to detecting that the hover proximity parameter of the input object is less than the threshold proximity value above an initial location on the touch-sensitive surface 1720 Displaying the position indicator within the text includes displaying the position indicator within the text at a location that is based on one or more of:
   a position of a projection of a tip of the input object on the touch-sensitive surface;
   an orientation of the input object relative to the touch-sensitive surface;
   a tilt of the input object relative to the touch-sensitive surface; and
   a distance of the input object relative to the touch-sensitive surface 1722 While the hover criteria are met, display a magnifier object over a portion of the displayed text, wherein the magnifier object displays a magnified image of the position indicator and text adjacent to the position indicator 1724 In response to detecting the first movement of the input object over the touch-sensitive surface:
   move the magnifier object in accordance with the first movement of the input object over the touch-sensitive surface; and
   update the magnifier object to display an updated magnified image of the position indicator and text adjacent to the position indicator

1726 While a first portion of the text is selected on the display in accordance with the second movement of the input object, detect liftoff of the input object from the touch-sensitive surface; and,
  in response to detecting the liftoff of the input object, maintain selection of the first portion of the text on the display

1728 In response to detecting the liftoff of the input object, display a menu of options for the selected first portion of the text

1730 After detecting the liftoff of the input object:
  determine whether the input object meets the hover criteria;
  in accordance with a determination that the input object meets the hover criteria, maintain display of the position indicator on the display; and
  in accordance with a determination that the input object ceases to meet the hover criteria, cease to display the position indicator on the display

1732 After detecting the liftoff of the input object:
  detect a third movement over the touch-sensitive surface of the input object while the input object meets the hover criteria; and,
  in response to detecting the third movement of the input object over the touch-sensitive surface, move the position indicator in accordance with the third movement of the input object, while maintaining the selection of the first portion of the text on the display

1734 After moving the position indicator in accordance with the third movement of the input object over the touch-sensitive surface, detect the input object making contact with the touch-sensitive surface at a second location on the touch-sensitive surface; and,
  in response to detecting the input object making contact with the touch-sensitive surface at the second location on the touch-sensitive surface:
    cancel selection of the first portion of the text; and
    restart text selection at a location on the display that corresponds to the second location on the touch-sensitive surface

1814 the user interface includes a first item at a first location,
the first user interface operation includes an operation to relocate the first item on the display, and
updating the user interface to indicate a preview of the first user interface operation includes moving the first item from a first location to a second location on the display in accordance with the lateral movement of the input object 1816 Cancelling the first user interface operation in accordance with a determination that the input object no longer meets the hover proximity criteria because the input object has exited a hover proximity range of the touch-sensitive surface includes:
restoring the first item to an original location of the first item on the display after detecting that the input object no longer meets the hover proximity criteria 1818 Confirming the first user interface operation in accordance with a determination that the input object no longer meets the hover proximity criteria because the input object has made contact with the touch-sensitive surface includes:
displaying the first item at a final location that is distinct from the first location after detecting that the input object no longer meets the hover proximity criteria 1820 Detect a second input by the input object, wherein the second input corresponds an operation to display content associated with the first item, and wherein the second input does not correspond to the start of the first user interface operation; and
In response to detecting the second input that corresponds to an operation to display content associated with the first item, display first content associated with the first item

1844 Providing feedback to indicate that the input object is within a respective threshold range of a boundary of the hover proximity range includes:

providing an alert to a user to indicate that the input object will cease to meet the hover proximity criteria if movement of the input object were to continue in a current direction toward or away from the touch-sensitive surface 1846 Providing the alert to the user includes:

in accordance with a determination that the input object meets the first criteria because the input object is within a first threshold distance of an upper boundary of the hover proximity range of the touch-sensitive surface, changing an appearance of the first item; and in accordance with a determination that the input object meets the first criteria because the input object is within a second threshold distance of the touch-sensitive surface, highlighting a drop-off location for the first item in the user interface

1914 Maintaining display of the second user interface object in accordance with a determination that the input object meets the continue-to-display criteria includes dynamically changing an appearance of the second user interface object in accordance with a characteristic value of the hover proximity parameter of the input object

1916 Detecting the predefined interaction with the first user interface object includes detecting a first change in the hover proximity parameter of the input object in a first direction, and displaying the second user interface object includes:
 displaying a precursor image of the second user interface object; and
 dynamically changing an appearance of the precursor image of the second user interface object in a first manner in accordance with the first change in the hover proximity parameter of the input object

1918 Dynamically changing the appearance of the second user interface object in accordance with the characteristic value of the hover proximity parameter of the input object includes:
 in accordance with detection of a second change in the hover proximity parameter of the input object in the first direction that is identical to the first change, dynamically changing the appearance of the second user interface object in a second manner in accordance with the second change in the hover proximity parameter of the input object, wherein the second manner is different from the first manner

1920 The continue-to-display criteria require that a first characteristic rate of change in the hover proximity parameter of the input object after the second user interface object is displayed is less than a first threshold rate in order for the continue-to-display criteria to be met (B)

1922 The cease-to-display criteria require that a second characteristic rate of change in the hover proximity parameter of the input object after the second user interface object is displayed is greater than a second threshold rate in order for the cease-to-display criteria to be met 1924 While the input object meets the continue-to-display criteria and while maintaining display of the second user interface:
  detect a third change in the hover proximity parameter of the input object from a first value to a second value;
  in response to detecting the first change in the hover proximity parameter, apply a first visual change to an appearance of the second user interface object;
  after applying the first visual change to the appearance of the second user interface object, detect a second change in the hover proximity parameter of the input object from the second value to the first value; and
  in response to detecting the second change in the hover proximity parameter of the input object, reverse the first visual change to the appearance of the second user interface object 1926 Detecting the predefined interaction with the first user interface object by the input object includes:
  detecting a first input by a first contact at a location on the touch-sensitive surface that corresponds to the first user interface object on the display, and
  detecting that the first input meets object-display criteria, wherein the object-display criteria require that a characteristic intensity of the first contact exceeds a first intensity threshold in order for the object-display criteria to be met (C)

1936 The first user interface object corresponds to an application,
the second user interface object is an unread notification or a preview of a communication for the application, and
detecting the predefined interaction includes:
detecting that the input object meets notification-display criteria, wherein the notification-display criteria require that the input object is within a hover proximity range of the touch-sensitive surface, and that the application has at least one unread notification or unread communication available for user review in order for the notification-display criteria to be met; and
in response to detecting that the input object meets the notification-display criteria, displaying the unread notification or the preview of the communication without launching the application

---

1938 The first user interface object is a control object,
the second user interface object is an information object that includes information related to a function of the control object,
detecting the predefined interaction includes:
detecting that the input object meets information-display criteria, wherein the information-display criteria require that the input object is within a hover proximity range of the touch-sensitive surface, and that an information object corresponding to the first user interface object is available for user review in order for the information-display criteria to be met; and
in response to detecting that the input object meets the information-display criteria, displaying the information object that corresponds to the first user interface object

2014 In response to detecting that the second hover proximity criteria are met by the input object, cease to display the first visual feedback when displaying the second visual feedback;
  While displaying the second visual feedback, detect that the second hover proximity criteria are no longer met and that the first hover proximity criteria are still met; and
  In response to detecting that the second hover proximity criteria are no longer met and that the first hover proximity criteria are still met:
    cease to display the second visual feedback that is associated with the second hover proximity criteria; and
    redisplay the first visual feedback that is associated with the first hover proximity criteria 2016 In response to detecting that the second hover proximity criteria are met by the input object, maintain display of the first visual feedback while displaying the second visual feedback;
  While displaying the first visual feedback and the second visual feedback, detect that the second hover proximity criteria are no longer met and that the first hover proximity criteria are still met; and
  In response to detecting that the second hover proximity criteria are no longer met and that the first hover proximity criteria are still met:
    cease to display the second visual feedback that is associated with the second hover proximity criteria; and
    continue to maintain display of the first visual feedback that is associated with the first hover proximity criteria (B)

2018 Displaying the second visual feedback that is associated with the second hover proximity range includes applying a first visual change to a first portion of the first user interface while the input object is detected at a first hover location above the touch-sensitive surface, and
    the method includes:
        while the first visual change is applied to the first portion of the first user interface, detecting a first movement of the input object from a first hover location to a second hover location while the input object continues to meet the second hover proximity criteria; and
        in response to detecting the first movement of the input object while the input object continues to meet the second hover proximity criteria:
            applying a second visual change to a second portion of the first user interface that is distinct from the first portion while the input object is detected at the second hover location above the touch-sensitive surface.

---

2020 Displaying the first visual feedback that is associated with the first hover proximity criteria includes shifting first content that is displayed on the display laterally across the display; and
    Displaying the second visual feedback that is associated with the second hover proximity criteria includes while the first content remains shifted, displaying a user interface object at a location on the display that is previously occupied by the first content

---

2022 Displaying the first visual feedback that is associated with the first hover proximity criteria includes:
        applying a first change to an appearance of a first user interface object that is already displayed on the display, wherein the first user interface object includes a second user interface object; and
    Displaying the second visual feedback that is associated with the second hover proximity criteria includes:
        applying a second change to an appearance of the second user interface object relative to an appearance of the third user interface object within the first user interface object (C)

2050 Displaying the first visual feedback that is associated with the first hover proximity criteria includes:
    applying a first change to an appearance of a first user interface object that is already displayed in the first user interface; and
    Displaying the second visual feedback that is associated with the second hover proximity criteria includes:
        while maintaining the first change to the appearance of the first user interface object, applying a second change to the appearance of the first user interface object that is distinct and non-continuous from the first change that has been applied to the first user interface object 2052 While displaying the second visual feedback, detect that third hover proximity criteria are met by the input object, wherein the third hover proximity criteria require that the current value of the hover proximity parameter of the input object is within a third value range, and wherein the third value range is within the second value range; and
    In response to detecting that the third hover proximity criteria are met by the input object, display a third visual feedback, distinct and non-continuous from the first and second visual feedback, that is associated with the third hover proximity range 2054 Displaying the first visual feedback that is associated with the first hover proximity criteria includes:
    applying a magnification to a first portion of selectable text that is displayed at a location that corresponds to a current hover location of the input object; and
    displaying a cursor that was not displayed before the first hover proximity criteria were met by the input object;
    Displaying the second visual feedback that is associated with the second hover proximity criteria includes:
        while the magnification is applied to the first portion of the selectable text and the cursor is displayed, changing an appearance of the cursor to indicate that text selection mode is activated (H)

2112 The first augmented hover proximity criteria require that the input object meets second hover proximity criteria before the input object moved away from the first hover location, wherein the first hover proximity criteria require that a current hover proximity parameter of the input object is within a first value range, the second hover proximity criteria require that the current hover proximity parameter of the input object is within a second value range, and the second value range is within the first value range 2114 Performing the first operation includes changing an appearance of the first user interface object to indicate that a mode associated performing the first operation has been entered 2116 Performing the first operation includes changing a size of a selection in accordance with the movement of the input object 2118 In response to detecting movement of the input object away from the first hover location:
in accordance with the determination that the input object does not meet the first augmented hover proximity criteria, move the first user interface object in accordance with the movement of the input object, without changing the size of the selection 2120 Detecting movement of the input object away from the first hover location includes detecting movement of the input object to a second hover location over a second user interface object of the plurality of user interface objects, and
Performing the first operation includes displaying second information about the second user interface object in response to detecting the input object at the second hover location over the second user interface object (B)

2122 Detect that the input object meets the first hover proximity criteria and the additional requirement that augment the first hover proximity criteria before the input object moved away from the first location; and In response to detecting that the input object meets the first hover proximity criteria and the additional requirement that augment the first hover proximity criteria before the input object moved away from the first hover location, display first information about the first user interface object 2124 Performing the first operation includes ceasing to display first information about the first user interface object 2126 Displaying the second information about the second user interface object includes displaying the second information without requiring that the input object meets the first augmented hover proximity criteria 2128 After displaying the second information about the second user interface object in response to detecting the input object at the second hover location over the second user interface object, detect that the input object no longer meets the first hover proximity criteria because the input object has exited a hover proximity range above the touch-sensitive surface; and In response to detecting that the input object no longer meets the first hover proximity criteria because the input object has exited the hover proximity range above the touch-sensitive surface, cease to display the second information about the second user interface object (C)

2130 After detecting that the input object no longer meets the first hover proximity criteria because the input object has exited the hover proximity range above the touch-sensitive surface, detect that the input object meets the first hover proximity criteria again after the input object has reentered the hover proximity range at the second location above the second user interface object; and In response to detecting that the input object meets the first hover proximity criteria at the second location above the second user interface object:

in accordance with a determination that the input object meets the first augmented hover proximity criteria, redisplay the second information about the second user interface object; and in accordance with a determination that the input object does not meet the first augmented hover proximity criteria, forgo redisplaying the second information about the second user interface object

2132 The first user interface object and the second user interface objects are of a first type of objects, and the first information and the second information are of a first type of information

2202 Display a plurality of user interface objects, including a first user interface object, on the display

2204 Detect a first portion of an input by an input object, including detecting the input object at a first hover location above the touch-sensitive surface while the input object meets first hover proximity criteria, wherein the first hover location above the touch-sensitive surface corresponds to a location of the first user interface object on the display

2206 In response to detecting the first portion of the input, including detecting the input object at the first hover location above the touch-sensitive surface while the input object meets the first hover proximity criteria:
    in accordance with a determination that the first user interface object has differentiated responses to intensity-based inputs, display first visual feedback in association with the first user interface object to indicate that the first user interface object has differentiated responses to intensity-based inputs; and,
    in accordance with a determination that the first user interface object does not have differentiated responses to intensity-based inputs, forego displaying the first visual feedback in association with the first user interface object

---

2208 Displaying the first visual feedback includes dynamically varying a visual effect that is displayed in accordance with a current hover proximity parameter of the input object while the input object is within a first threshold range from the first user interface object

---

2210 In response to detecting the first portion of the input, including detecting the input object at the first hover location above the touch-sensitive surface while the input object meets the first hover proximity criteria: in accordance with the determination that the first user interface object does not have differentiated responses to intensity-based inputs, display second visual feedback that is distinct from the first visual feedback in association with the first user interface object to indicate that the first user interface object does not have differentiated responses to intensity-based inputs (A)

2216 Detect a third portion of the input by the input object, including detecting movement of the input object from the second hover location to a third hover location, wherein the third hover location corresponds to a third user interface object that is distinct from the first user interface object and the second user interface object, and wherein the third user interface object does not have differentiated responses to intensity-based inputs; and In response to detecting the third portion of the input, including detecting the movement of the input object from the second hover location to the third hover location:

in accordance with a determination that the input object meets the second hover proximity criteria, display the second visual feedback in association with the third user interface object to indicate that the third user interface object does not have differentiated responses to intensity-based inputs (C)

2226 While displaying the preview user interface object that corresponds to the first user interface object in response to detect the increase in the characteristic intensity of the contact above the first intensity threshold and in accordance with the determination that the first user interface object has differentiated responses to intensity-based inputs, detecting the input object breaking contact with the touch-sensitive surface; and In response to detecting the input object breaking contact with the touch-sensitive surface:

in accordance with a determination that the input object meets second hover proximity criteria, maintain display of the preview user interface object while the input object continues to meet the second hover proximity criteria; and in accordance with a determination that the input object no longer meets the second hover proximity criteria because the input object has exited a hover proximity range specified by the second hover proximity criteria, cease to display the preview user interface object 2228 Maintaining display of the preview user interface object while the input object continues to meet the second hover proximity criteria includes dynamically varying an appearance of the preview user interface object in accordance with a current hover proximity parameter of the input object while the input object continues to meet the second hover proximity criteria (F)

2302 Display a content selection object within selectable content, wherein the content selection object includes a first edge of the content selection object and a second edge of the content selection object, and wherein content located between the first edge of the content selection object and the second edge of the content selection object is selected

2304 Detect a first portion of an input by the input object, including detecting the input object at a first hover location above the touch-sensitive surface that corresponds to the first edge of the content selection object

2306 In response to detecting the first portion of the input by the input object:
    in accordance with a determination that the first portion of the input meets first criteria, wherein the first criteria require that the input object meets hover proximity criteria when the input object is detected at the first hover location above the touch-sensitive surface that corresponds to the location of the first edge of the content selection object on the display in order for the first criteria to be met,
    change an appearance of the first edge relative to the second edge of the content selection object in a first manner to indicate that the first edge of the content selection object will be selected for movement relative to the second edge of the content selection object when the input object meets second criteria 2308 In response to detecting the first portion of the input by the input object:
    in accordance with a determination that the first portion of the input does not meet the first criteria,
    maintain the appearance of the first edge relative to the second edge of the content selection object to indicate that the selectable content will be scrolled when the input object meets the second criteria (A)

2310 After detecting the first portion of the input, detect a second portion of the input by the input object, including detecting lateral movement of the input object; and
In response to detecting the second portion of the input object:
in accordance with a determination that the second portion of the input meets the second criteria:
in accordance with a determination that the input object has met the first criteria during the first portion of the input, move the first edge of the content selection object relative to the second edge of the content selection object in accordance with the lateral movement of the input object across the touch-sensitive surface; and
in accordance with a determination that the input object has not met the first criteria during the first portion of the input, scroll the selectable content in accordance with the lateral movement of the input object across the touch-sensitive surface 2312 The second criteria require that the input object makes contact with the touch-sensitive surface and maintains continuous contact with the touch-sensitive surface while making the lateral movement across the touch-sensitive surface in order for the second criteria to be met 2314 While the appearance of the first edge is changed relative to the second edge in the first manner, detect a first contact of the input object with the touch-sensitive surface at a location that corresponds to the first edge of the content selection object; and
In response to detecting the first contact of the input object with the touch-sensitive surface at the location that corresponds to the first edge of the content selection object:
change the first edge of the content selection object relative to the second edge of the content selection object in a second manner that is distinct from the first manner (B)

2322 After detecting the second portion of the input by the input object and moving the first edge relative to the second edge in response to the second portion of the input, detect a third portion of the input by the input object, including detecting that the input object no longer meets the hover proximity criteria;

In response to detecting the third portion of the input by the input object:

in accordance with a determination that the input object no longer meets the hover proximity criteria because the input object has exited a hover proximity range above the touch-sensitive surface, restore the first edge of the selection object to the location of the first edge before the first edge was moved in accordance with the lateral movement of the input object across the touch-sensitive surface; and in accordance with a determination that the input object no longer meets the hover proximity criteria because the input object has made contact with the touch-sensitive surface, confirm content selection between the first edge and the second edge of the content selection object 2324 The first criteria further require that the input object meets the hover proximity criteria for at least a first threshold amount of time with less than a threshold amount of movement away from the first hover location in order for the first criteria to be met 2326 The first criteria further require that the input object makes a predefined gesture while the input object meets the hover proximity criteria at the first hover location in order for the first criteria to be met (D)

> 2328 Changing the appearance of the first edge of the content selection object relative to the second edge of the content selection object in the first manner includes:
> transforming the first edge of the content selection object to a content selection handle > 2330 Changing the appearance of the first edge of the content selection object relative to the second edge of the content selection object in the first manner includes:
> displaying a content selection handle adjacent to the first edge of the content selection object > 2332 The first edge of the content selection object is a first content selection handle and the second edge of the content selection object is a second content selection handle other than the first content selection handle, and
> changing the appearance of the first edge of the content selection object relative to the second edge of the content selection object in the first manner includes enlarging at least a portion of the first content selection handle relative to a corresponding portion of the second content selection handle

---

2414 In response to detecting the respective movement of the input object while the input object continues to meet the hover proximity criteria:
  in accordance with a determination that the respective movement is a second movement from the first hover location to a third hover location that is above a third portion of the touch-sensitive surface:
    in accordance with a determination that the second movement meets second focus-maintenance criteria, wherein the second focus-maintenance criteria require that the second movement includes less than a second threshold amount of lateral movement in order for the second focus-maintenance criteria to be met, maintain input focus on the first user interface object without regard to a value of the characteristic hover proximity parameter of the input object during the second movement of the input object from the first hover location to the third hover location

---

2416 In response to detecting the respective movement of the input object while the input object continues to meet the hover proximity criteria:
  in accordance with a determination that the respective movement is a third movement from the first hover location to a fourth hover location that is above a fourth portion of the touch-sensitive surface:
    in accordance with a determination that the third movement meets second focus-shifting criteria, wherein the second focus-shifting criteria require that the fourth portion of the touch-sensitive surface corresponds to a third user interface object of the plurality of user interface object, and that the third movement includes at least a third threshold amount of lateral movement, in order for the second focus-shifting criteria to be met, shift input focus from the first user interface object to the third user interface object without regard to a value of the characteristic hover proximity parameter of the input object during the third movement of the input object from the first hover location to the fourth hover location

---

2418 The characteristic hover proximity parameter of the input object is based on a hover distance of the input object from the touch-sensitive surface

---

2420 The characteristic hover proximity parameter of the input object is based on a rate of change in a hover distance of the input object from the touch-sensitive surface 2422 The first threshold amount of lateral movement is smaller for a greater characteristic hover proximity parameter of the input object 2424 The first threshold amount of lateral movement is greater for a greater characteristic hover proximity parameter of the input object 2426 In accordance with a determination that the input object is moving toward the touch-sensitive surface, maintain input focus on the first user interface object for at least a predetermined amount of time 2428 Detect that the input object meets information-object-display criteria, wherein the information-object-display criteria require that the input object meets the hover proximity criteria in order for the information-object-display criteria to be met;
In response to detecting that the input object meets the information-object-display criteria, display an information-display object that corresponds to the input object, including:
in accordance with a determination that a respective user interface object of the plurality of user interface objects has input focus, display object-specific information that corresponds to the respective user interface object of the plurality of user interface object in the information-display object, and
in accordance with a determination that none of the plurality of user interface objects has input focus, forgo display any object-specific information in the information-display object (D)

Figure 24D

DEVICES, METHODS, AND USER INTERFACES FOR INTERACTING WITH USER INTERFACE OBJECTS VIA PROXIMITY-BASED AND CONTACT-BASED INPUTS

RELATED APPLICATIONS

This application claims priority to U.S. Provisional Application Ser. No. 62/506,502, filed May 15, 2017, titled "Devices, Methods, and User Interfaces for Interacting with User Interface Objects via Proximity-based and Contact-based Inputs," and to U.S. Provisional Application Ser. No. 62/399,239, filed Sep. 23, 2016, titled "Devices, Methods, and User Interfaces for Interacting with User Interface Objects via Proximity-based and Contact-based Inputs," which are incorporated by reference in their entireties.

TECHNICAL FIELD

This relates generally to electronic devices with touch-sensitive surfaces, including but not limited to electronic devices with touch-sensitive surfaces that facilitate user interface interactions through proximity-based and contact-based inputs.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Some touch-sensitive surfaces also include sensors that detect inputs provided by an object (e.g., stylus) that is not in direct contact with the touch-sensitive surface, but is in close proximity to the touch-sensitive surface. The proximity-based inputs provide an additional avenue for manipulating user interface objects on a display. However, contact-based inputs and proximity-based inputs do not often work together seamlessly and may interfere with each other and cause confusion and frustration to the user.

Exemplary manipulations of user interface objects include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, and control elements such as buttons and other graphics. A user will, in some circumstances, need to perform such manipulations on user interface objects in, for example, a note taking application, a file management program, an image management application, a digital content management application, a drawing application, a presentation application, a word processing application, or a spreadsheet application.

But methods for performing these manipulations are cumbersome and inefficient. In addition, these methods take longer than necessary, thereby wasting energy. This latter consideration is particularly important in battery-operated devices.

SUMMARY

Accordingly, there is a need for electronic devices with faster, more efficient methods and interfaces for interacting with user interfaces to perform operations using contact-based and proximity-based inputs. Such methods and interfaces optionally complement or replace conventional methods for interacting with user interfaces using contact-based and proximity-based inputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a touch-sensitive surface and a display, where the electronic device includes one or more first sensors to detect proximity of an input object above the touch-sensitive surface and optionally one or more second sensors to detect intensity of contact of the input object with the touch-sensitive surface. The method includes displaying a user interface object at a first location on the display, and detecting selection of the user interface object at the first location on the display. While the user interface object is selected, the method further includes detecting lateral movement of the input object over the touch-sensitive surface while the input object meets hover criteria. In response to detecting lateral movement of the input object over the touch-sensitive surface while the input object meets the hover criteria, the method includes moving the selected user interface object in accordance with the lateral movement of the input object over the touch-sensitive surface. While moving the selected user interface object in accordance with the lateral movement of the input object over the touch-sensitive surface, the method further includes dynamically varying a first visual characteristic of the selected user interface object in accordance with a current hover proximity parameter of the input object.

In accordance with some embodiments, a method is performed at an electronic device with a touch-sensitive surface and a display, where the device includes one or more first sensors to detect proximity of an input object above the touch-sensitive surface and optionally one or more second sensors to detect intensity of contact of the input object with the touch-sensitive surface. The method includes displaying a user interface object at a first location on the display. While displaying the user interface object at the first location on the display, the method further includes detecting a first portion of an input by an input object, where detecting the first portion of the input includes detecting the input object at a location over the touch-sensitive surface that corresponds to the first location of the user interface object on the display while the input object meets hover criteria. In response to detecting the first portion of the input, the method includes dynamically changing an appearance of the user interface object in a first manner in accordance with a current hover proximity parameter of the input object. After dynamically changing the appearance of the user interface object in a first manner in accordance with the current hover proximity parameter of the input object, the method further includes detecting a second portion of the input by the input object, where detecting the second portion of the input includes detecting the input object making contact with the touch-sensitive surface at an initial contact location that corresponds to the first location on the display; and, in response to detecting the second portion of the input, dynamically changing the appearance of the user interface object in a second manner in accordance with a current intensity of a contact by the input object on the touch-sensitive surface.

In accordance with some embodiments, a method is performed at an electronic device with a touch-sensitive surface and a display, where the electronic device includes one or more first sensors to detect proximity of an input object above the touch-sensitive surface, and optionally one or more second sensors to detect intensity of contacts with the touch-sensitive surface. The method includes displaying a position indicator within text on the display while an input object above the touch-sensitive surface meets hover criteria. While the position indicator is displayed within the text on the display, the method includes detecting a first movement of the input object that includes a component of movement parallel to the touch-sensitive surface, where the input object continues to meet the hover criteria during the first movement. In response to detecting the first movement of the input object over the touch-sensitive surface, the method includes moving the position indicator within the displayed text in accordance with the first movement of the input object. After moving the position indicator within the displayed text in accordance with the first movement of the input object, the method includes detecting a second movement of the input object that includes a component of movement parallel to the touch-sensitive surface; and, in response to detecting the second movement of the input object across the touch-sensitive surface: in accordance with a determination that the second movement of the input object is detected while the input object is in contact with the touch-sensitive surface, selecting text in accordance with the second movement of the input object across the touch-sensitive surface while the input object remains in contact with the touch-sensitive surface.

A method is performed at a device having a display and a touch-sensitive surface, wherein the device includes one or more first sensors for detecting proximity of an input object above the touch-sensitive surface. The method includes: displaying a user interface on the display; detecting a first input by the input object that corresponds to a start of a first user interface operation; after detecting the first input that corresponds to the start of the first user interface operation and while the input object meets hover proximity criteria, detecting lateral movement of the input object; in response to detecting the lateral movement of the input object while the input object meets the hover proximity criteria, updating the user interface to indicate a preview of the first user interface operation; while the user interface is updated to indicate the preview of the first user interface operation, detecting that the input object no longer meets the hover proximity criteria; and, in response to detecting that the input object no longer meets the hover proximity criteria: in accordance with a determination that the input object no longer meets the hover proximity criteria because the input object has exited a hover proximity range of the touch-sensitive surface, cancelling the first user interface operation; and in accordance with a determination that the input object no longer meets the hover proximity criteria because the input object has made contact with the touch-sensitive surface, confirming the first user interface operation.

A method is performed at a device having a display and a touch-sensitive surface, wherein the device includes one or more first sensors for detecting proximity of an input object above the touch-sensitive surface. The method includes: displaying a first user interface object at a first location on the display; detecting a predefined interaction with the first user interface object by the input object; in response to detecting the predefined interaction with the first user interface object by the input object, displaying a second user interface object that is associated with the first user interface object; while displaying the second user interface object, detecting a change in a hover proximity parameter of the input object; and, in response to detecting the change in the hover proximity parameter of the input object: in accordance with a determination that the input object meets continue-to-display criteria, wherein the continue-to-display criteria require that the input object continues to meet hover proximity criteria in order for continue-to-display criteria to be met, maintaining display of the second user interface object; and in accordance with a determination that the input object meets cease-to-display criteria, wherein the cease-to-display criteria require that the input object no longer meets the hover proximity criteria in order for the cease-to-display criteria to be met, ceasing to display the second user interface object.

A method is performed at a device having a display and a touch-sensitive surface, wherein the device includes one or more first sensors for detecting proximity of an input object above the touch-sensitive surface. The method includes: displaying a first user interface on the display; while displaying the first user interface on the display, detecting that first hover proximity criteria are met by the input object, wherein the first hover proximity criteria require that a current value of a hover proximity parameter of the input object is within a first value range in order for the first hover proximity criteria to be met; in response to detecting that the first hover proximity criteria are met by the input object, displaying first visual feedback that is associated with the first hover proximity criteria; while displaying the first visual feedback that is associated with the first hover proximity criteria, detecting a change in the current value of the hover proximity parameter of the input object and that second hover proximity criteria are met by the input object after the change, wherein the second hover proximity criteria require that the current value of the hover proximity parameter of the input object is within a second value range that is within the first value range in order for the second hover proximity criteria to be met; and in response to detecting that the second hover proximity criteria are met by the input object, displaying second visual feedback, distinct and non-continuous from the first visual feedback, that is associated with the second hover proximity range.

A method is performed at a device having a display and a touch-sensitive surface, wherein the device includes one or more first sensors for detecting proximity of an input object above the touch-sensitive surface. The method includes: displaying, in a first user interface, a plurality of user interface objects that includes at least a first user interface object; while displaying the plurality of user interface objects, detecting an input object at a first hover location over the first user interface object that meets first hover proximity criteria; after detecting the input object at the first hover location over the first user interface object that meets the first hover proximity criteria, detecting movement of the input object away from the first hover location; in response to detecting movement of the input object away from the first hover location: in accordance with a determination that the input object meets first augmented hover proximity criteria, wherein the first augmented hover proximity criteria require that the input object had met the first hover proximity criteria and an additional requirement that augments the first hover proximity criteria before the input object moved away from the first location, performing a first operation associated with the movement of the input object; and in accordance with a determination that the input object does not meet the first augmented hover proximity criteria, forgoing performing the first operation.

A method is performed at a device having a display and a touch-sensitive surface, wherein the device includes one or more first sensors for detecting proximity of an input object above the touch-sensitive surface and one or more second sensors for detecting intensity of contacts with the touch-sensitive surface. The method includes: displaying a plurality of user interface objects, including a first user interface object, on the display; detecting a first portion of an input by an input object, including detecting the input object at a first hover location above the touch-sensitive surface while the input object meets first hover proximity criteria, wherein the first hover location above the touch-sensitive surface corresponds to a location of the first user interface object on the display; in response to detecting the first portion of the input, including detecting the input object at the first hover location above the touch-sensitive surface while the input object meets the first hover proximity criteria: in accordance with a determination that the first user interface object has differentiated responses to intensity-based inputs, displaying first visual feedback in association with the first user interface object to indicate that the first user interface object has differentiated responses to intensity-based inputs; and, in accordance with a determination that the first user interface object does not have differentiated responses to intensity-based inputs, foregoing displaying the first visual feedback in association with the first user interface object.

A method is performed at a device having a display and a touch-sensitive surface, wherein the device includes one or more first sensors for detecting proximity of an input object above the touch-sensitive surface. The method includes: displaying a content selection object within selectable content, wherein the content selection object includes a first edge of the content selection object and a second edge of the content selection object, and wherein content located between the first edge of the content selection object and the second edge of the content selection object is selected; detecting a first portion of an input by the input object, including detecting the input object at a first hover location above the touch-sensitive surface that corresponds to the first edge of the content selection object; and in response to detecting the first portion of the input by the input object: in accordance with a determination that the first portion of the input meets first criteria, wherein the first criteria require that the input object meets hover proximity criteria when the input object is detected at the first hover location above the touch-sensitive surface that corresponds to the location of the first edge of the content selection object on the display in order for the first criteria to be met, changing an appearance of the first edge relative to the second edge of the content selection object in a first manner to indicate that the first edge of the content selection object will be selected for movement relative to the second edge of the content selection object when the input object meets second criteria.

A method is performed at a device having a display and a touch-sensitive surface, wherein the device includes one or more first sensors for detecting proximity of an input object above the touch-sensitive surface. The method includes: displaying a plurality of user interface objects on the display, wherein the plurality of user interface objects include a first user interface object and a second user interface object, and wherein the first user interface object and the second user interface object are displayed at different locations on the display; detecting the input object at a first hover location above a first portion of the touch-sensitive surface while the input object meets hover proximity criteria; in response to detecting the input object at the first hover location above the first portion of the touch-sensitive surface while the input object meets the hover proximity criteria, placing input focus on the first user interface object; while the first user interface object has input focus and while the input object continues to meet the hover proximity criteria, detecting a respective movement of the input object from the first hover location above the first portion of the touch-sensitive surface to a respective hover location above a respective portion of the touch-sensitive surface that is different from the first portion of the touch-sensitive surface; and in response to detecting the respective movement of the input object while the input object continues to meet the hover proximity criteria: in accordance with a determination that the respective movement is a first movement from the first hover location to a second hover location that is above a second portion of the touch-sensitive surface: in accordance with a determination that the first movement meets first focus-maintenance criteria, wherein the first focus-maintenance criteria require that the first movement includes less than a first threshold amount of lateral movement in order for the first focus-maintenance criteria to be met, and wherein the first threshold amount of lateral movement is determined based on a value of a characteristic hover proximity parameter of the input object during the first movement of the input object from the first hover location to the second hover location, maintaining input focus on the first user interface object; and in accordance with a determination that the first movement meets first focus-shifting criteria, wherein the first focus-shifting criteria require that the first movement includes at least the first threshold amount of lateral movement in order for the first focus-shifting criteria to be met, shifting input focus from the first user interface object to the second user interface object.

In accordance with some embodiments, an electronic device includes a display, a touch-sensitive surface, one or more sensors to detect proximity of an input object above the touch-sensitive surface, and optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, one or more sensors to detect proximity of an input object above the touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, one or more sensors to detect proximity of an input object above the touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, one or more sensors to detect proximity of an input object above the touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, one or more sensors to detect proximity of an input object above the touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces, one or more sensors to detect proximity of an input object above the touch-sensitive surface, and optionally one or more sensors to detect intensity of contacts with the touch-sensitive surface are provided with faster, more efficient methods and interfaces for interacting with a user interface to perform operations through proximity-based and contact-based inputs, thereby increasing the effectiveness, efficiency, and user satisfaction with such devices. Such methods and interfaces may complement or replace conventional methods for interacting with a user interface through proximity-based and contact-based inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7V-7AJ illustrate exemplary user interfaces for interacting with a user interface object through proximity-based and contact-based inputs (e.g., pushing toward, pressing against, easing off of, and pulling away from the user interface object) in accordance with some embodiments.

FIGS. 7AK-7AU illustrate exemplary user interfaces for interacting with a user interface object through proximity-based and contact-based inputs (e.g., moving a cursor and selecting text) in accordance with some embodiments.

FIGS. 15A-15C are flow diagrams illustrating a method of interacting with a user interface object through proximity-based and contact-based inputs in accordance with some embodiments.

FIGS. 16A-16E are flow diagrams illustrating a method of interacting with a user interface object through proximity-based and contact-based inputs in accordance with some embodiments.

FIGS. 17A-17C are flow diagrams illustrating a method of interacting with a user interface object through proximity-based and contact-based inputs in accordance with some embodiments.

FIGS. 18A-18G are flow diagrams illustrating a method of moving an object by a hover move input, in accordance with some embodiments.

FIGS. 19A-19E are flow diagrams illustrating a method of maintaining display of a transient user interface object using a hover input, in accordance with some embodiments.

FIGS. 20A-20I are flow diagrams illustrating a method of displaying different visual feedback when a hover input meets different levels of hover proximity criteria, in accordance with some embodiments.

FIGS. 21A-21D are flow diagrams illustrating a method of performing an operation after augmented hover proximity criteria have been met, in accordance with some embodiments.

FIGS. 22A-22G are flow diagrams illustrating a method of displaying visual feedback in response to a hover input to identify a user interface object that has differentiated responses to intensity-based inputs, in accordance with some embodiments.

FIGS. 23A-23E are flow diagrams illustrating a method of visually indicating an edge of a selection object that will be selected for movement, in response to a hover input, in accordance with some embodiments.

FIGS. 24A-24E are flow diagrams illustrating a method of maintaining input focus on an object based on whether an input object has made more than a threshold amount of lateral movement, where the threshold amount of lateral movement is determined based on a characteristic hover proximity parameter of an input object, in accordance with some embodiments.

DESCRIPTION OF EMBODIMENTS

Proximity-based inputs and contact-based inputs are provided to manipulate a user interface object. Visual, haptic, and/or audio feedback is provided in accordance with whether a user interface object is under the influence of a proximity-based input (e.g., the user interface object being in a hover state under the influence of a hover input) or a contact-based input (e.g., the user interface object being in a contact state under the influence of a press input or swipe input). Visual, haptic, and/or audio feedback is optionally provided when the user interface object transitions between the hover state and the contact state. The device dynamically changes the feedback provided to the user based on input metrics such as hover proximity parameters and intensities of contact.

In some embodiments, a user interface object is moved by a hover input, and the device changes the appearance of the user interface object based on the hover proximity parameter of the hover input. In some embodiments, when a continuous input includes one or more proximity-based inputs and one or more contact-based inputs, the device changes the appearance of the user interface object in accordance with the hover-proximity parameters of the proximity-based inputs and in accordance with the intensities of the contact-based inputs, such that the changes in at least one characteristic is a smooth change when the user interface object transitions between the hover state and the contact state. In some embodiments, an input object (e.g., a finger or stylus) places a cursor within text at a location in accordance with lateral movement of the input object above the touch-sensitive surface, and starts expanding text selection from the cursor location in accordance with lateral movement of the input object across the touch-sensitive surface.

Figure 2:
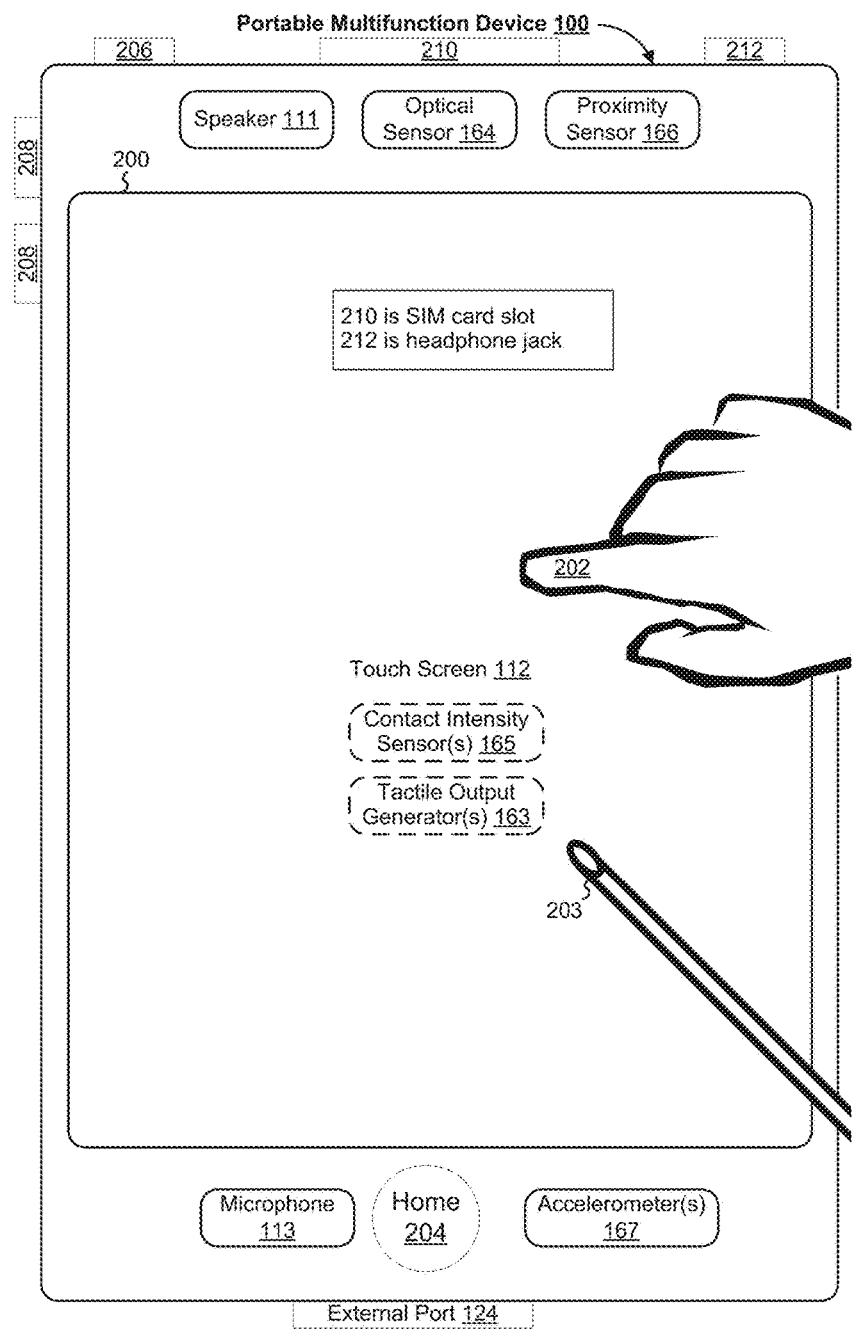
FIG. 2 illustrates a portable multifunction device having a touch screen in accordance with some embodiments.
Figure 3:
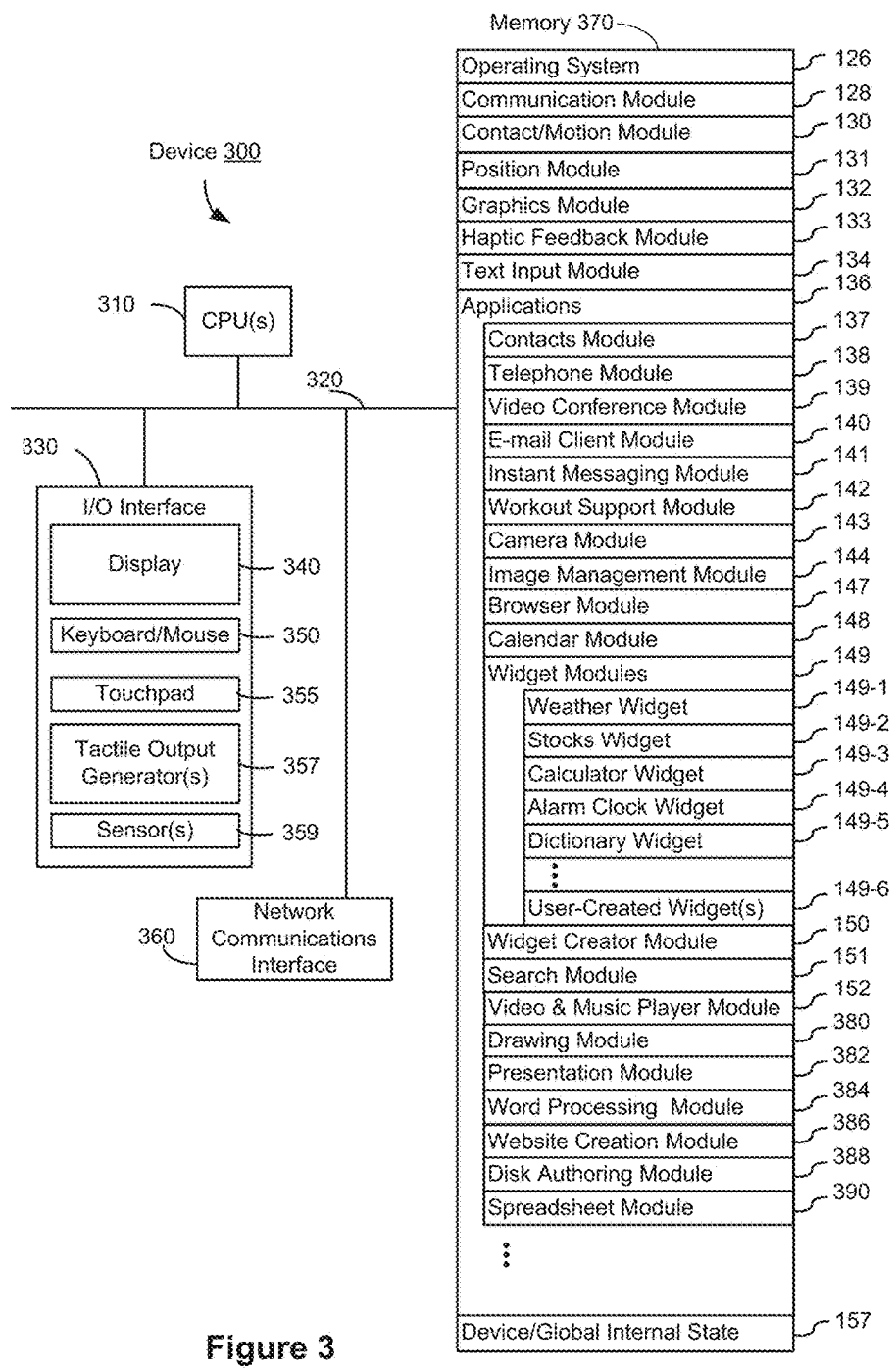
FIG. 3 is a block diagram of an example multifunction device with a display and a touch-sensitive surface in accordance with some embodiments.
Figure 4:
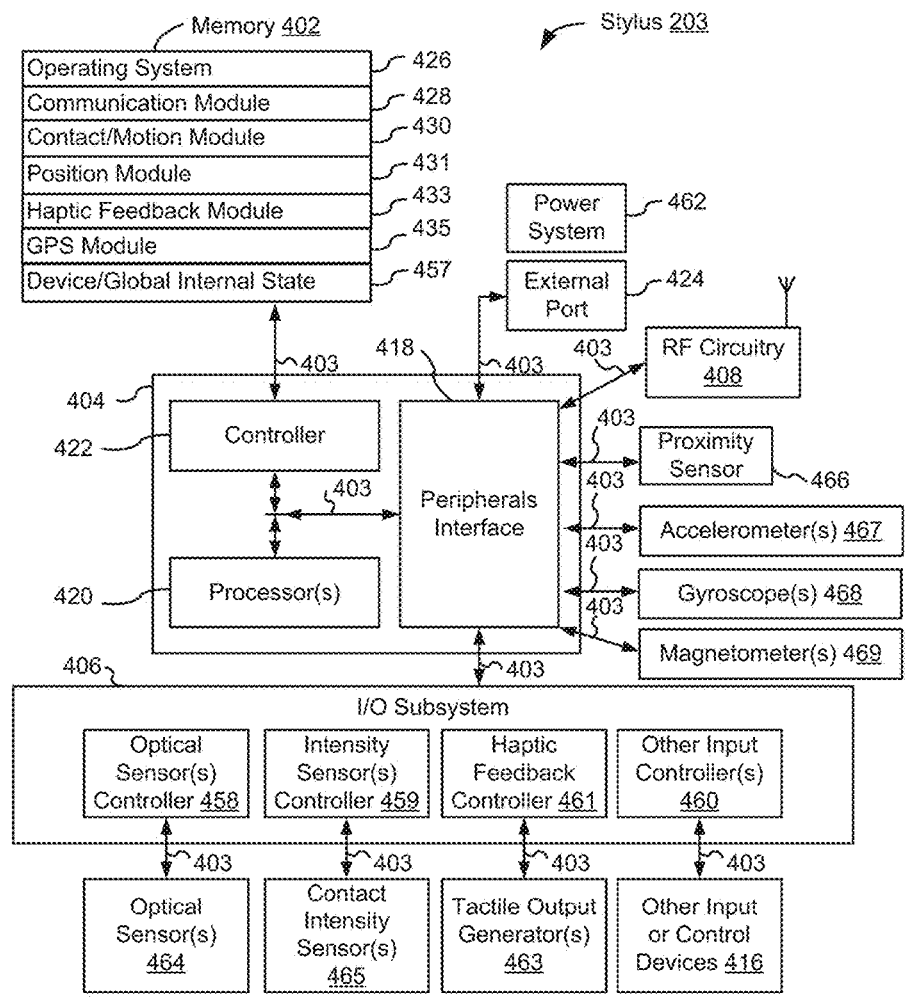
FIG. 4 is a block diagram of an exemplary electronic stylus in accordance with some embodiments.
Figure 5A:
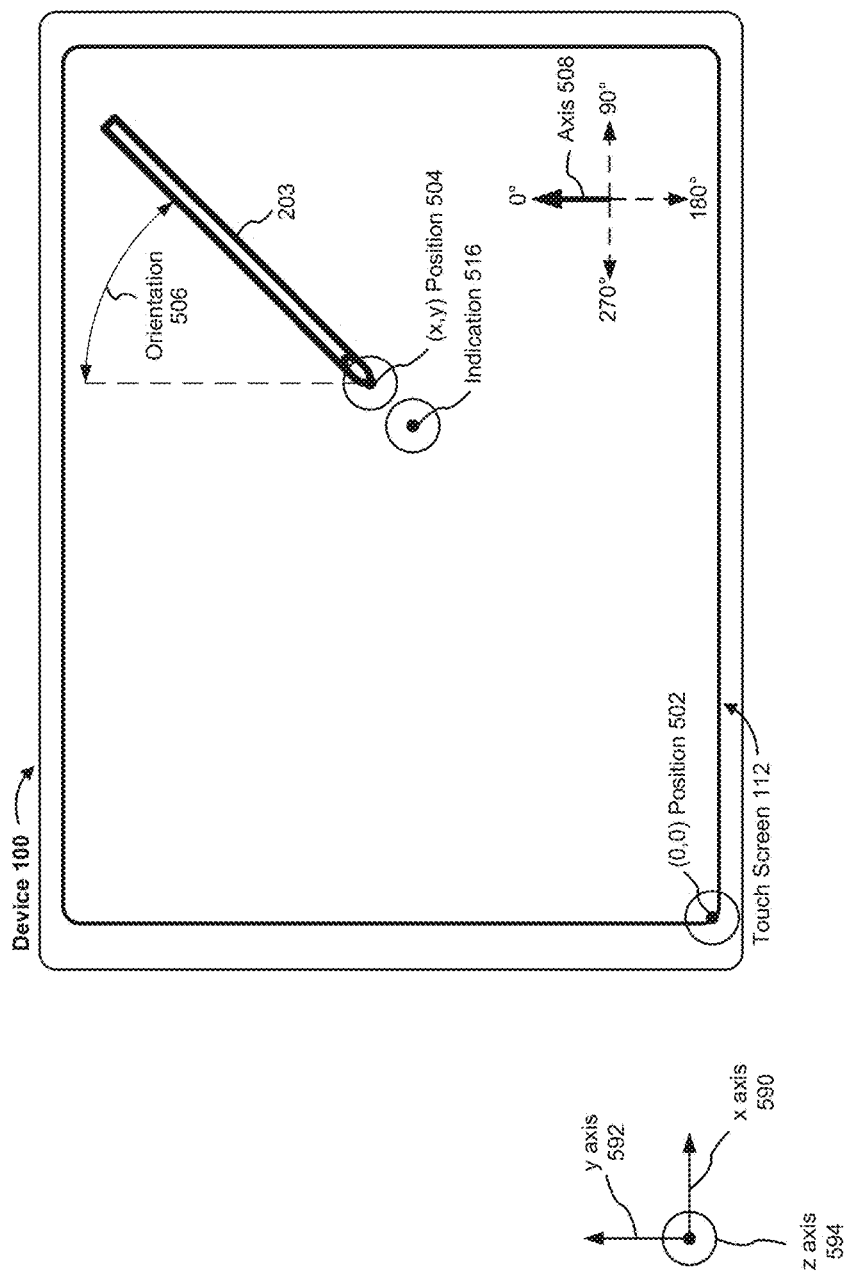
FIGS. 5A-5B illustrate a positional state of a stylus relative to a touch-sensitive surface in accordance with some embodiments
Figure 5B:
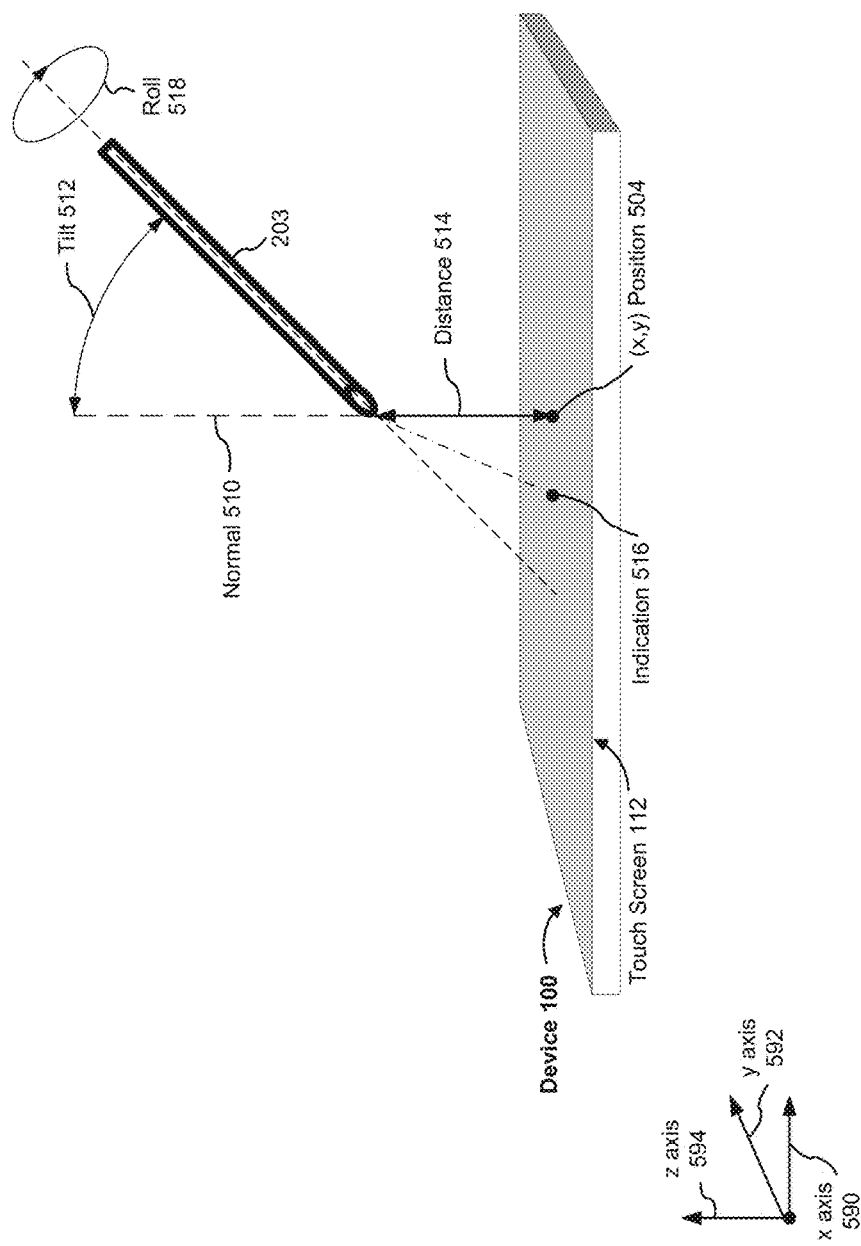
Figure 6A:
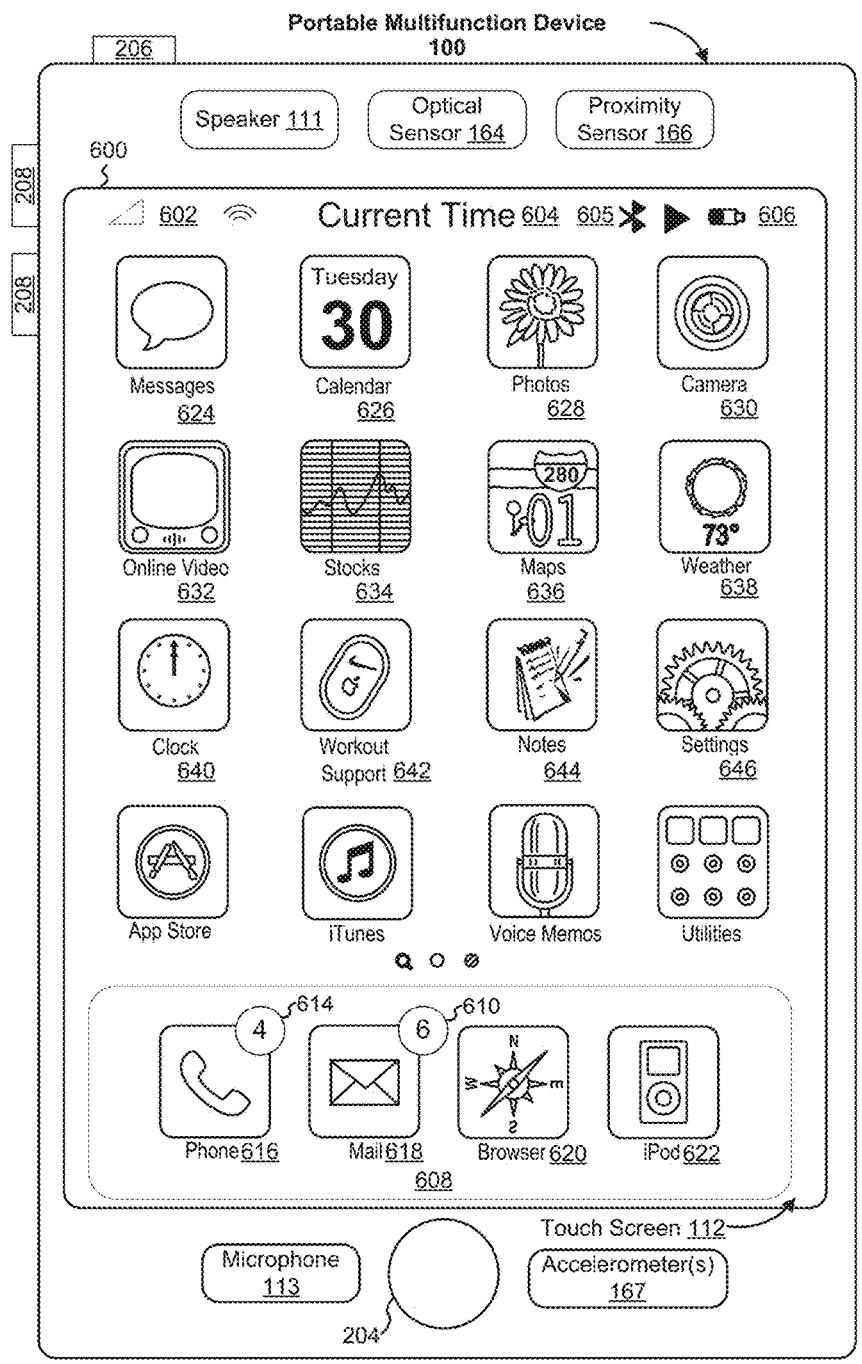
FIG. 6A illustrates an example user interface for a menu of applications on a portable multifunction device in accordance with some embodiments.
Figure 6B:
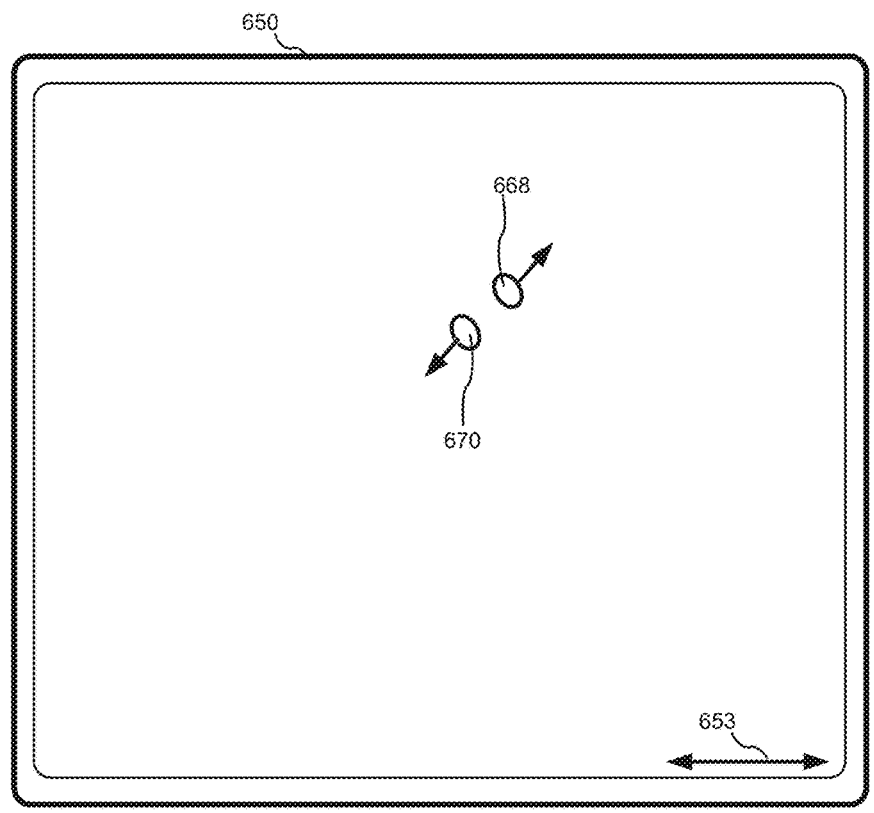
FIG. 6B illustrates an example user interface for a multifunction device with a touch-sensitive surface that is separate from the display in accordance with some embodiments.
Figure 6B:
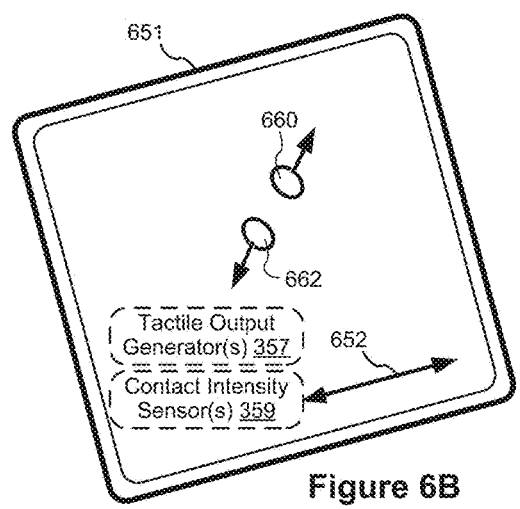
Figure 7A:
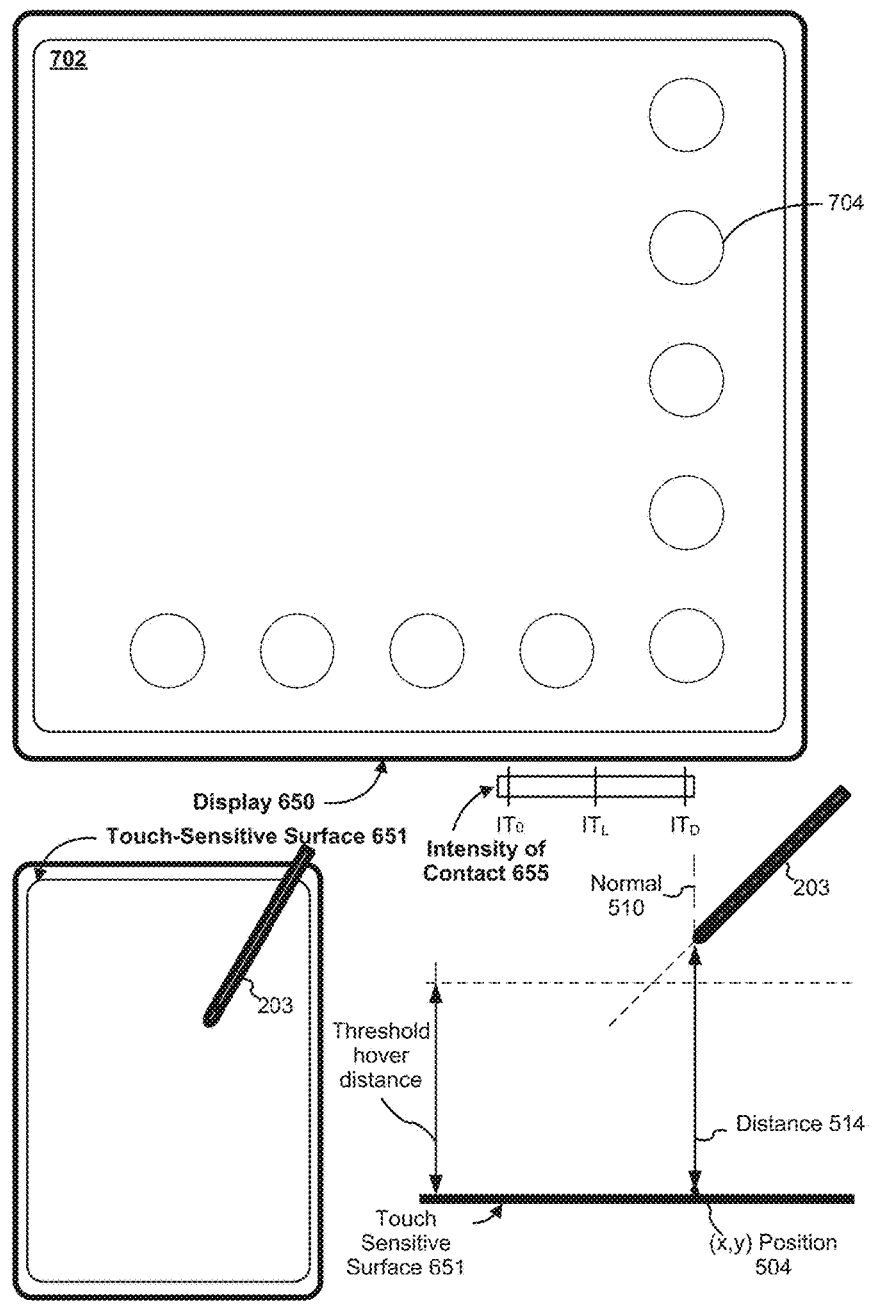
FIGS. 7A-7U illustrate exemplary user interfaces for interacting with a user interface object through proximity-based and contact-based inputs (e.g., pulling, picking up, dragging, and dropping off a user interface object) in accordance with some embodiments.

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6B, FIGS. 7A-7AU, FIGS. 8A-8V, FIGS. 9A-9O, FIGS. 10A-10Y, FIGS. 11A-11J, FIGS. 12A-12R, FIGS. 13A-13N, and FIGS. 14A-14L illustrate exemplary user interfaces for interacting with a user interface object through proximity-based inputs and contact-based inputs. FIGS. 15A-15C, FIGS. 16A-16E, FIGS. 17A-17C, FIGS. 18A-18G, FIGS. 19A-19E, FIGS. 20A-20I, FIGS. 21A-21D, FIGS. 22A-22G, FIGS. 23A-23E, and 24A-24E illustrate flow diagrams of methods of interacting with a user interface object through proximity-based and contact-based inputs. The user interfaces in FIGS. 6A-6B, FIGS. 7A-7AU, FIGS. 8A-8V, FIGS. 9A-9O, FIGS. 10A-10Y, FIGS. 11A-11J, FIGS. 12A-12R, FIGS. 13A-13N, and FIGS. 14A-14L are used to illustrate the processes in FIGS. 15A-15C, FIGS. 16A-16E, FIGS. 17A-17C, FIGS. 18A-18G, FIGS. 19A-19E, FIGS. 20A-20I, FIGS. 21A-21D, FIGS. 22A-22G, FIGS. 23A-23E, and 24A-24E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
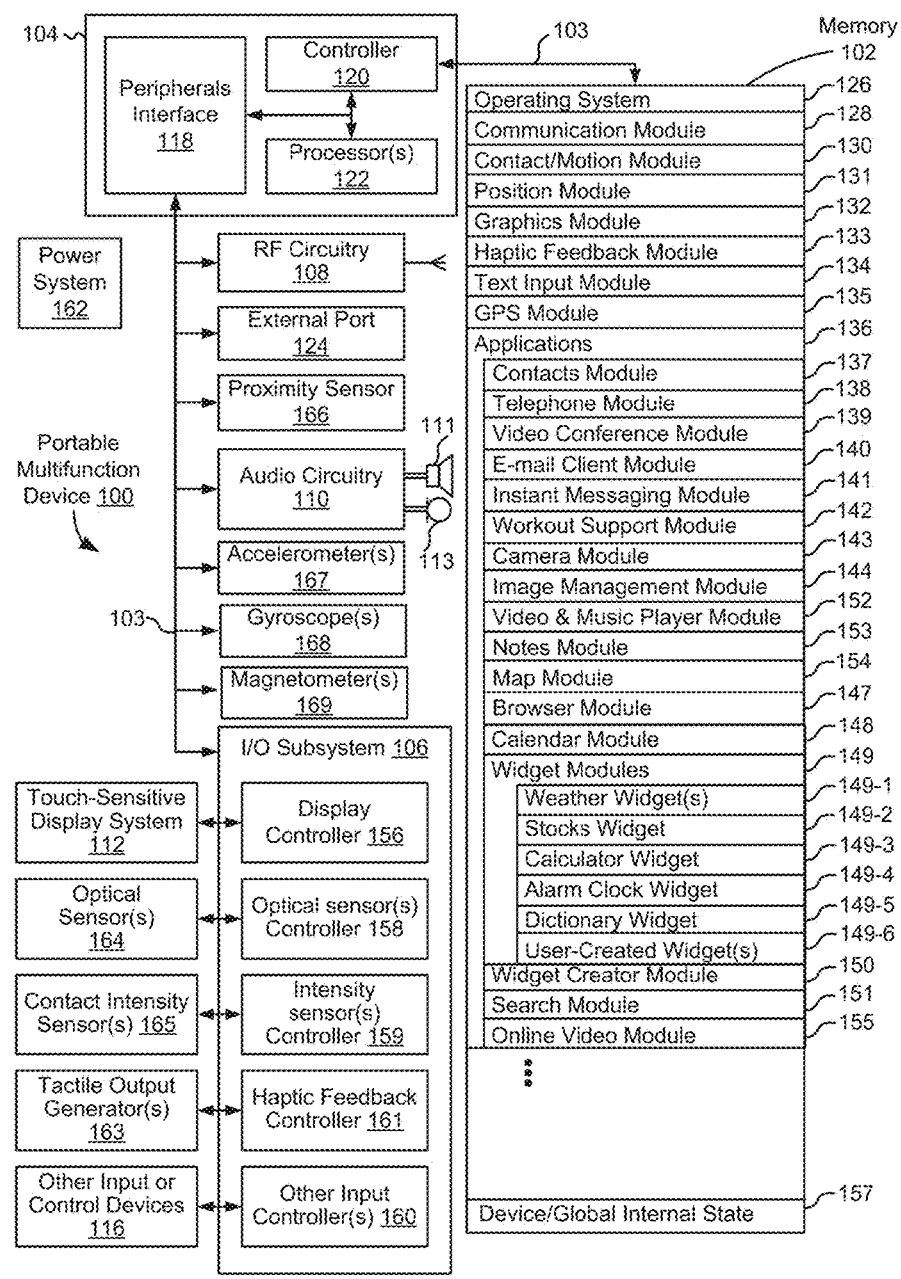
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one-finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);

telephone module 138;

video conferencing module 139;

e-mail client module 140;

instant messaging (IM) module 141;

workout support module 142;

camera module 143 for still and/or video images;

image management module 144;

browser module 147;

calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
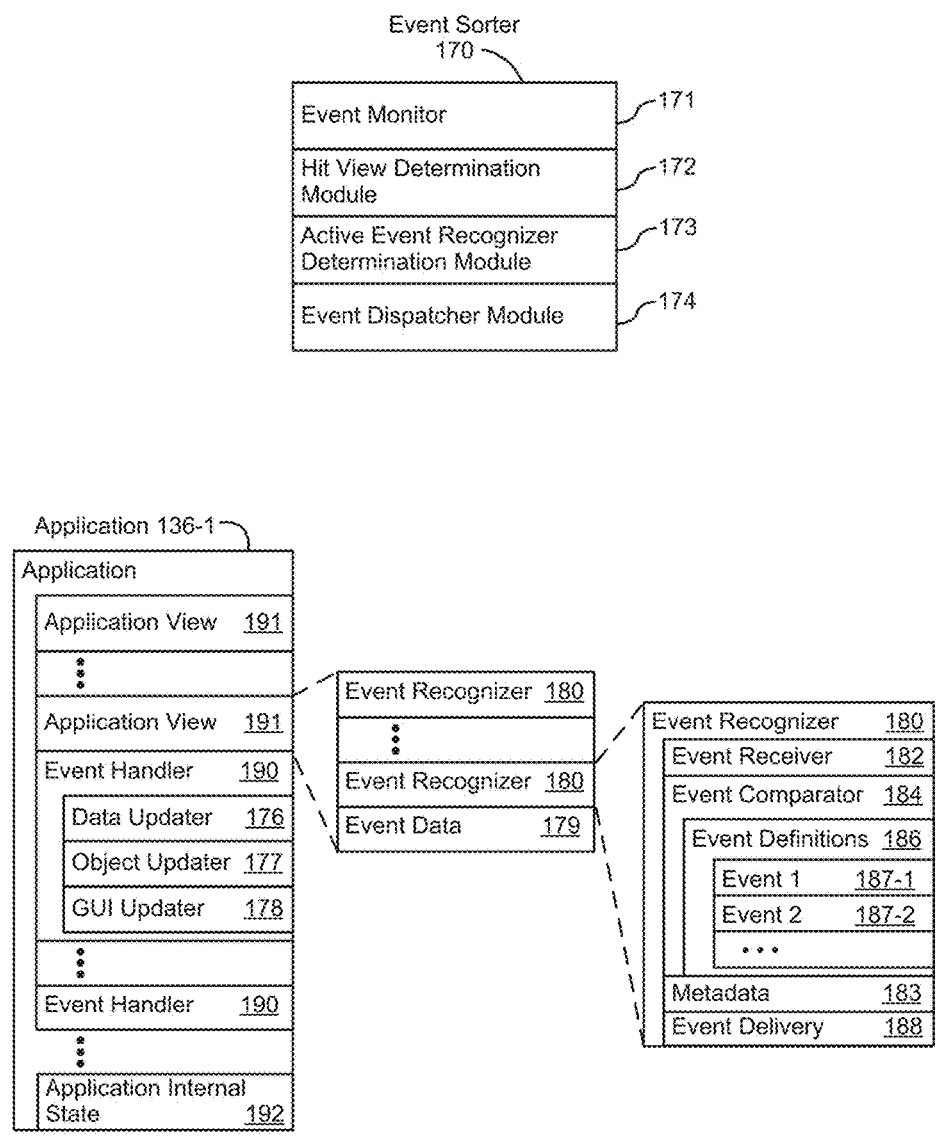
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripheral interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z-axis 594 points out of the page (i.e., in a direction normal to a plane of touch screen 112), x-axis 590 is parallel to a first edge (e.g., a length) of touch screen 112, y-axis 592 is parallel to a second edge (e.g., a width) of touch screen 112, and y-axis 592 is perpendicular to x-axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x-axis 590 and y-axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels. As used herein, "indication" may also be used to refer to a position that is not visible on the touch-screen when describing the exemplary user interfaces.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z-axis 594 points in a direction normal to the plane of touch screen 112, x-axis 590 is parallel to a first edge (e.g., a length) of touch screen 112, y-axis 592 is parallel to a second edge (e.g., a width) of touch screen 112, and y-axis 592 is perpendicular to x-axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x-axis," "y-axis," and "z-axis," are used herein to illustrate certain directions in particular figures, it will be understood that these terms do not refer to absolute directions. In other words, an "x-axis" could be any respective axis, and a "y-axis" could be a particular axis that is distinct from the x-axis. Typically, the x-axis is perpendicular to the y-axis. Similarly, a "z-axis" is distinct from the "x-axis" and the "y-axis," and is typically perpendicular to both the "x-axis" and the "y-axis."

Further, FIG. 5B illustrates roll 518, a rotation about the length (long axis) of stylus 203.

Attention is now directed towards embodiments of user interfaces ("UI") that are, optionally, implemented on portable multifunction device 100.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod (trademark of Apple Inc.) module 152, labeled "iPod;" and
Icons for other applications, such as:
  Icon 624 for IM module 141, labeled "Text;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Online Video;"
  Icon 634 for stocks widget 149-2, labeled "Stocks;"
  Icon 636 for map module 154, labeled "Map;"
  Icon 638 for weather widget 149-1, labeled "Weather;"
  Icon 640 for alarm clock widget 169-6, labeled "Clock;"
  Icon 642 for workout support module 142, labeled "Workout Support;"
  Icon 644 for notes module 153, labeled "Notes;" and
  Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from the display 650. In some embodiments, the touch-sensitive surface (e.g., 651 in FIG. 6B) has a primary-axis (e.g., 652 in FIG. 6B) that corresponds to a primary-axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. Some of the examples that follow will be given with reference to a device that detects inputs on a touch-sensitive surface that is separate from the display, as shown in FIG. 6B. Some of the examples that follow will be given with reference to inputs on touch screen display 112 (where the touch sensitive surface and the display are combined). It should be understood that similar methods are, optionally, used for other user interfaces described herein.

Additionally, while some of the following examples are given primarily with reference to finger inputs (e.g., finger contacts, finger tap gestures, finger press gestures, and finger swipe gestures, etc.), it should be understood that, in some embodiments, one or more of the finger inputs are replaced with input from another input device (e.g., a mouse based input or a stylus based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 6A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). As used herein, a "focus selector" may be a visible "indication" or an invisible "indication" of a hovering input object (e.g., a finger or stylus).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7AU) described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments, $IT_0$ is zero. In some embodiments, $IT_0$ is greater than zero. In some illustrations, a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

FIGS. 7A-7AU, FIGS. 8A-8V, FIGS. 9A-9O, FIGS. 10A-10Y, FIGS. 11A-11J, FIGS. 12A-12R, FIGS. 13A-13N, and FIGS. 14A-14L illustrate exemplary user interfaces for interacting with a user interface object through proximity-based inputs and contact-based inputs by an input object in accordance with some embodiments. The user interfaces in these figures are used to illustrate the processes described below, including the processes in FIGS. 15A-15C, FIGS. 16A-16E, FIGS. 17A-17C, FIGS. 18A-18G, FIGS. 19A-19E, FIGS. 20A-20I, FIGS. 21A-21D, FIGS. 22A-22G, FIGS. 23A-23E, and 24A-24E. Although some of the examples which follow will be given with reference to inputs on a touch-sensitive surface 651 that is separate from the display 650, in some embodiments, the device detects inputs on a touch-screen display (where the touch-sensitive surface and the display are combined, as shown in FIG. 6A. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

Figure 7B:
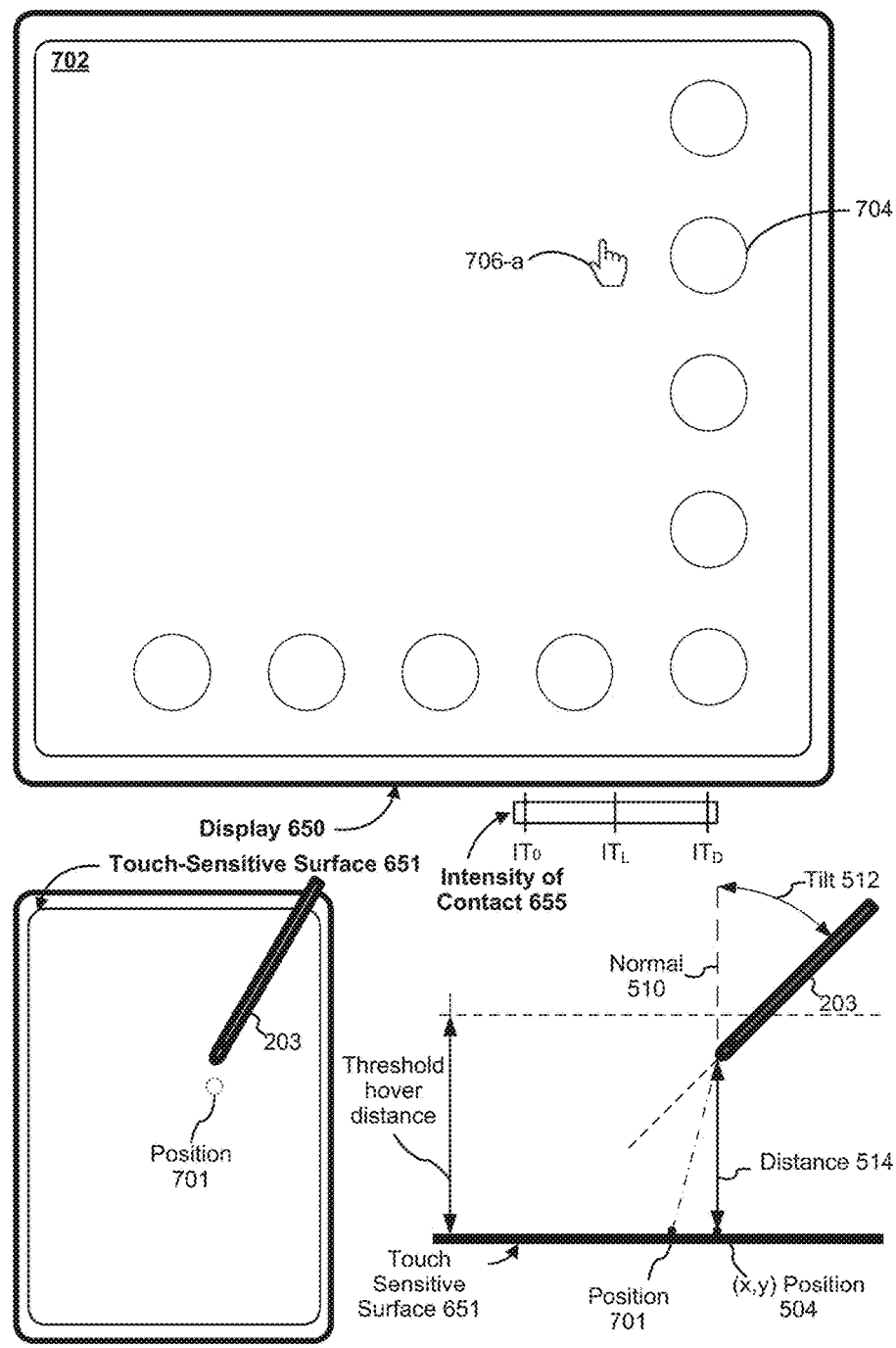
Figure 7C:
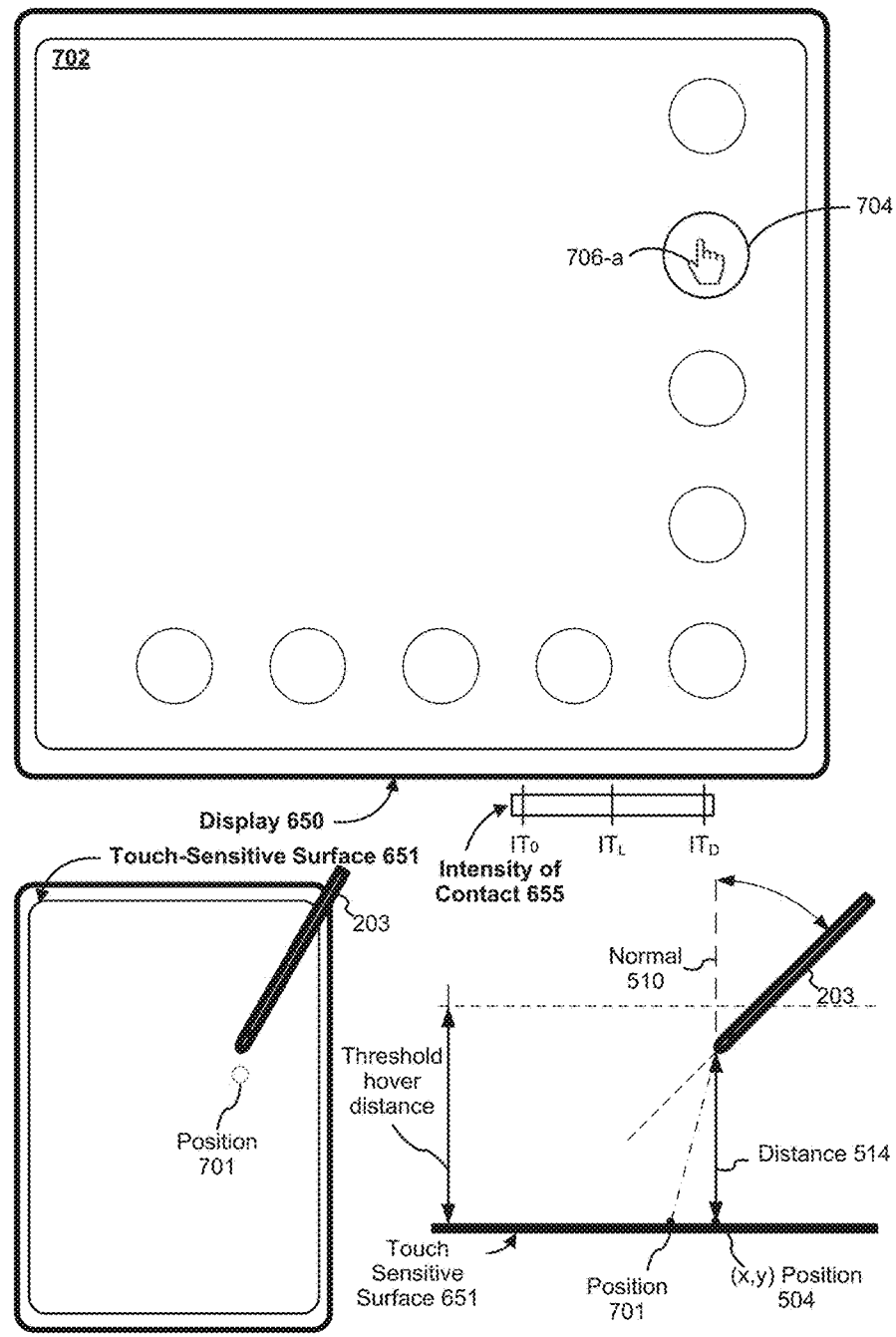
Figure 7D:
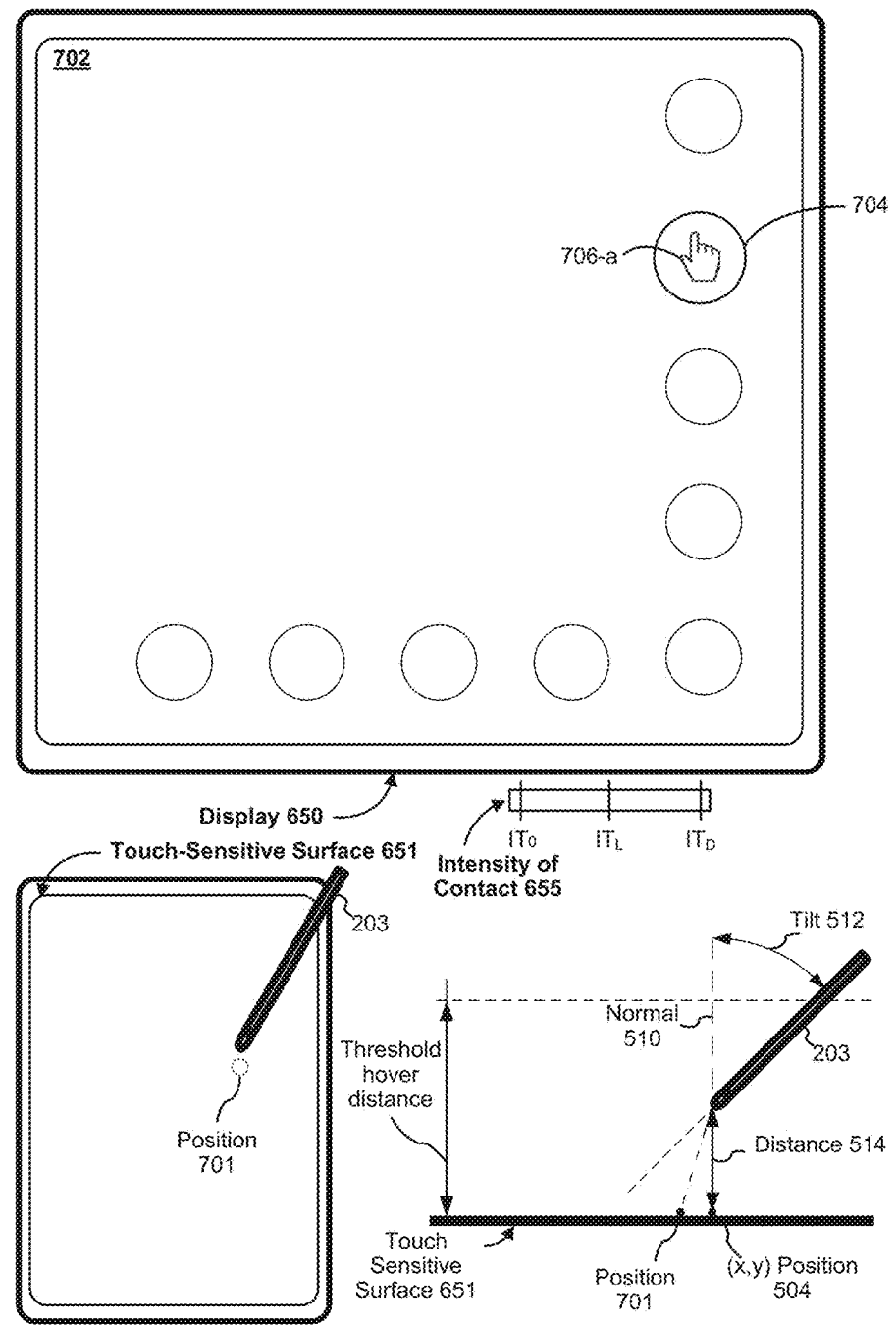
Figure 7E:
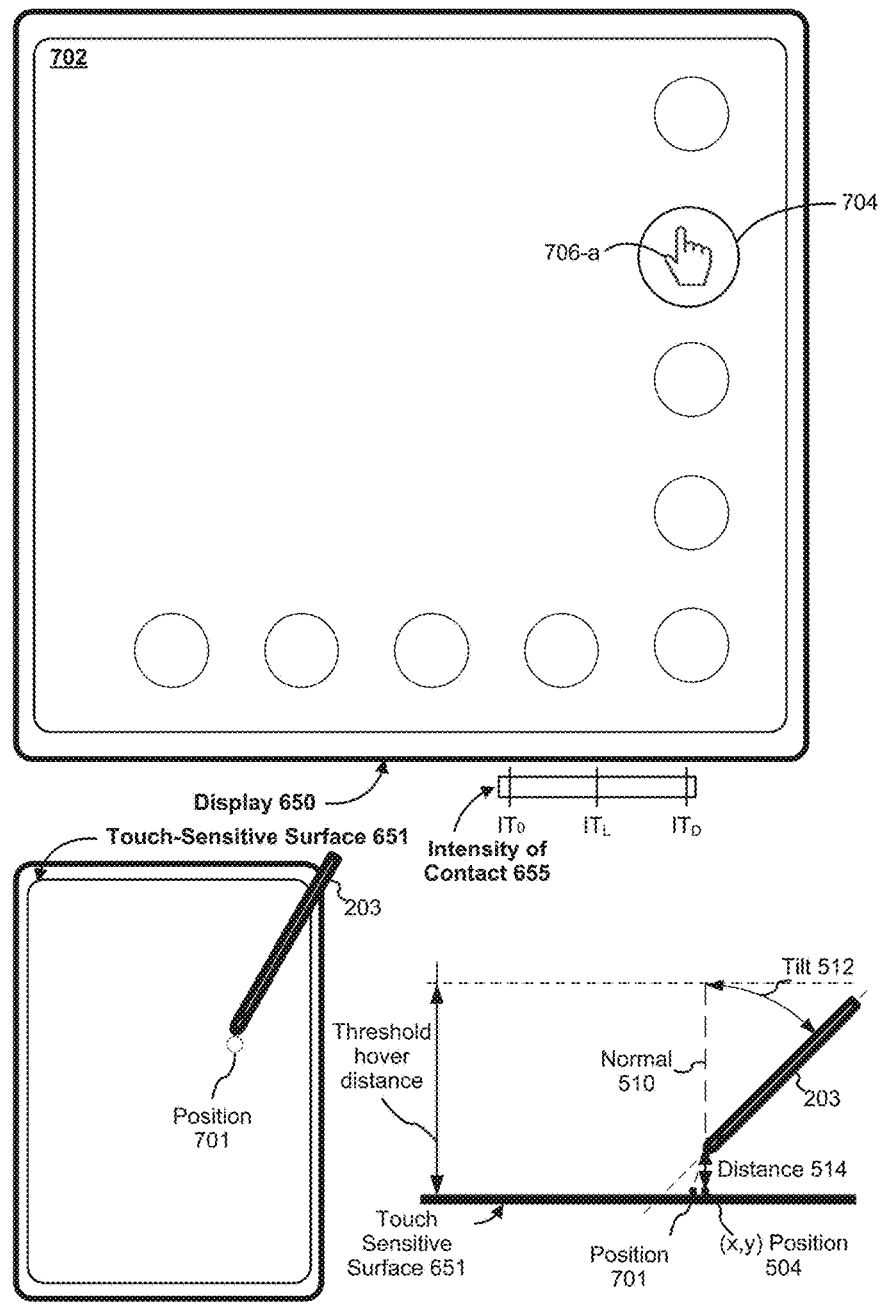
Figure 7F:
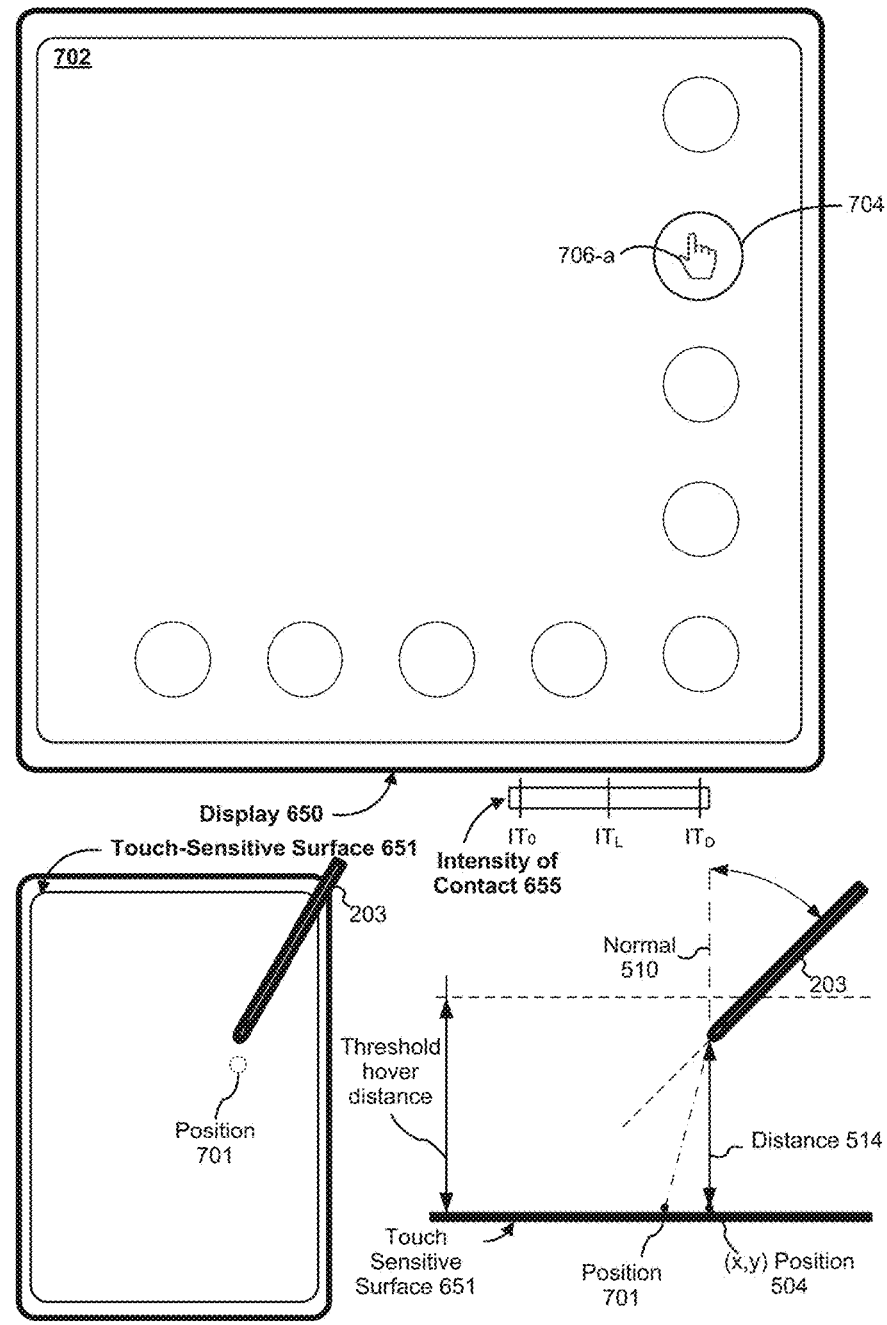
Figure 7G:
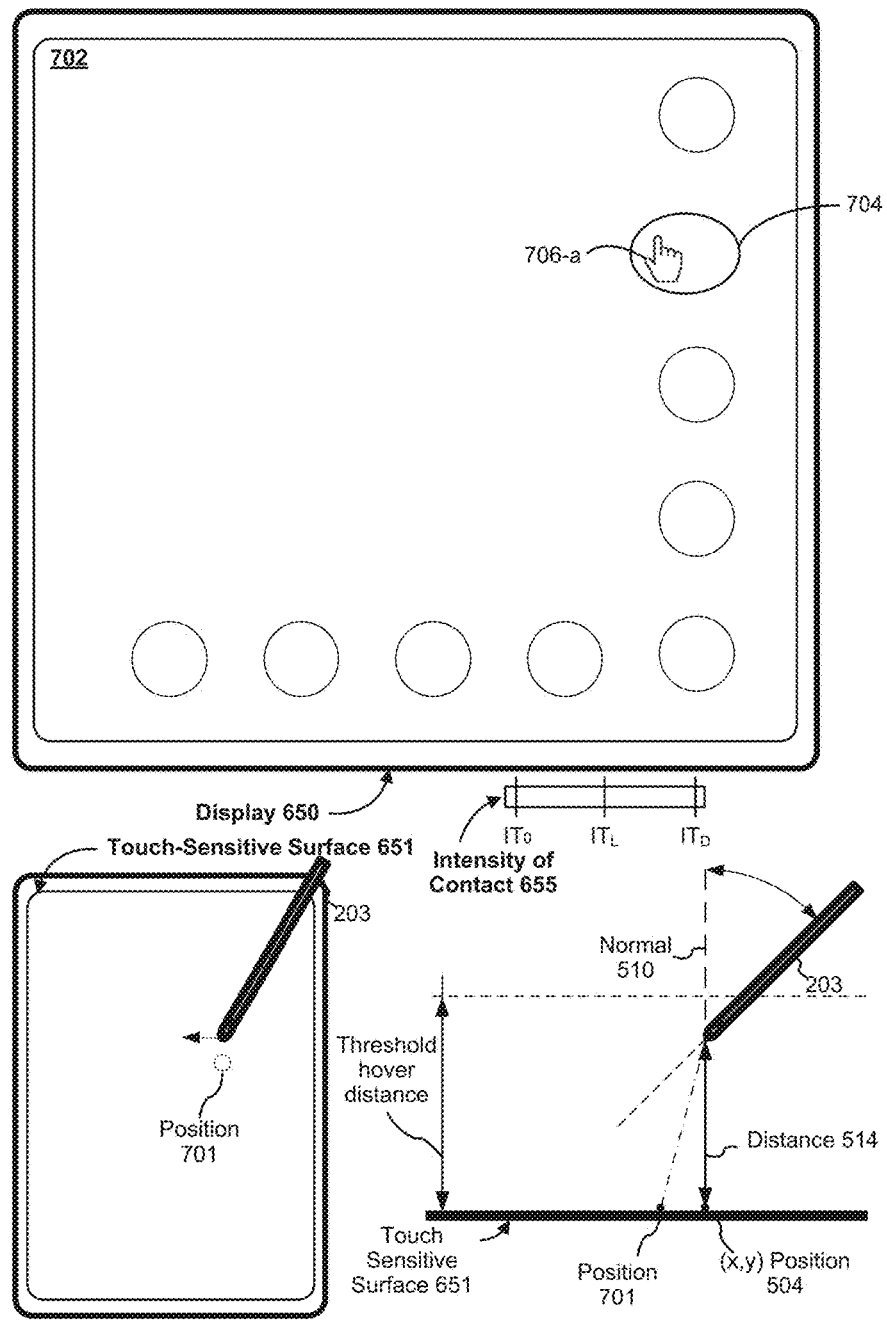
Figure 7H:
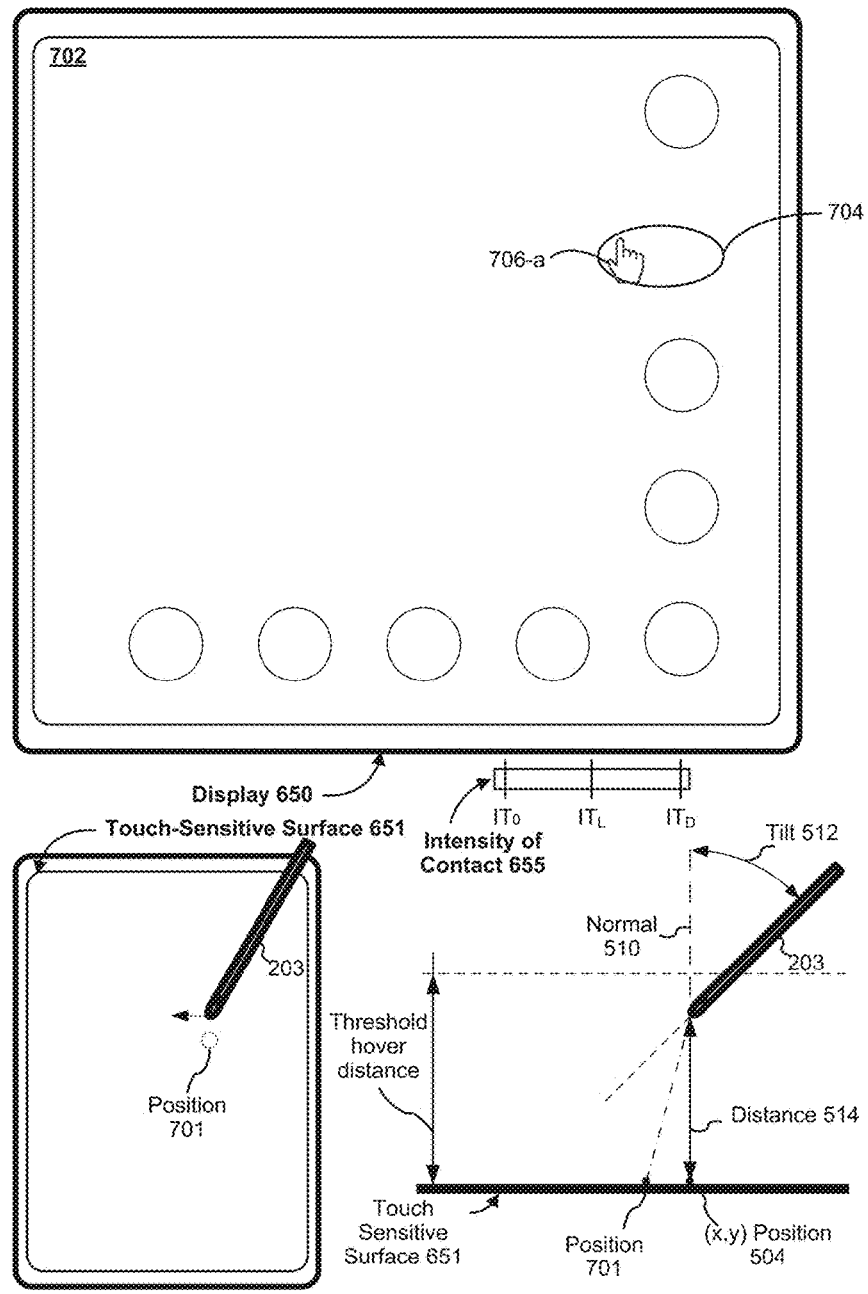
Figure 7I:
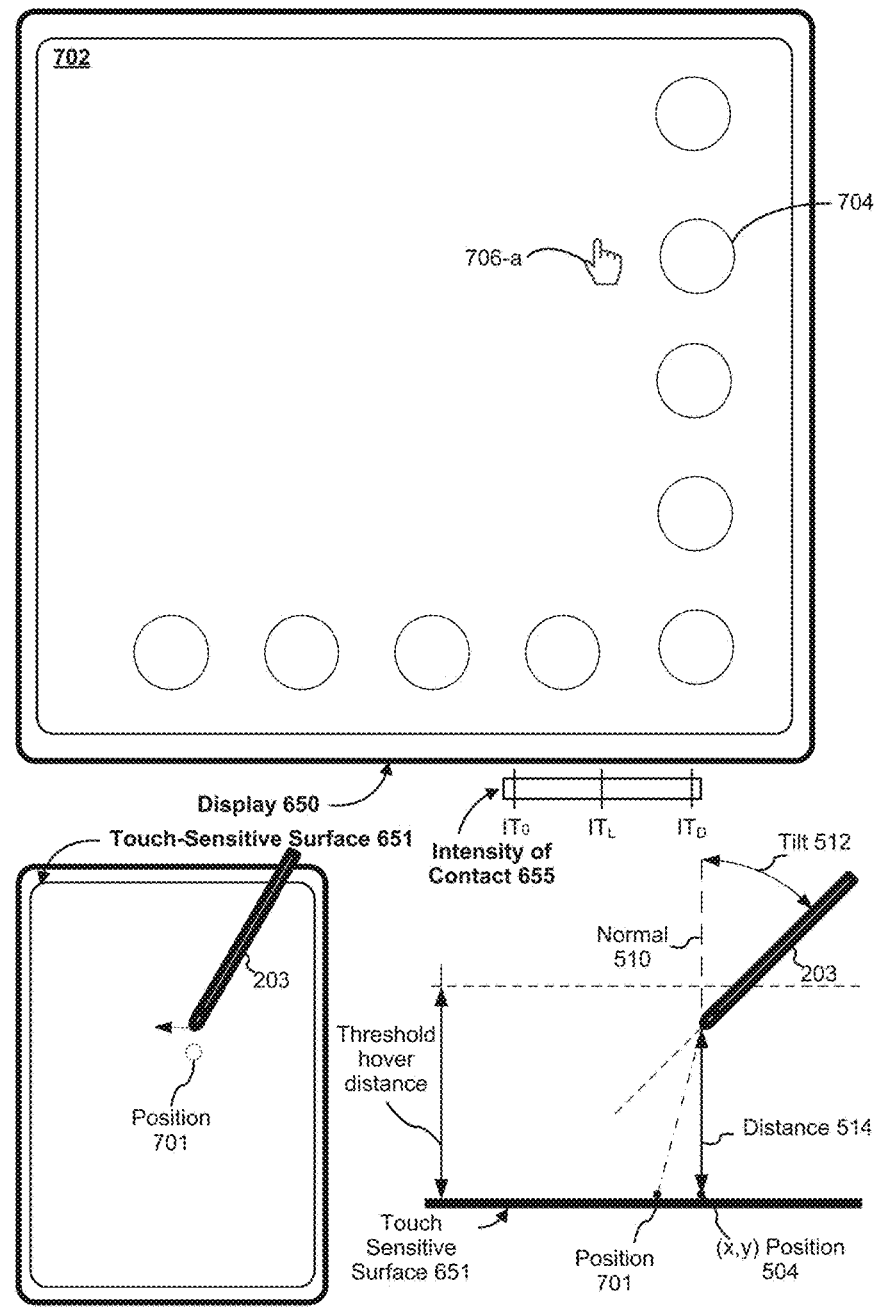
Figure 7J:
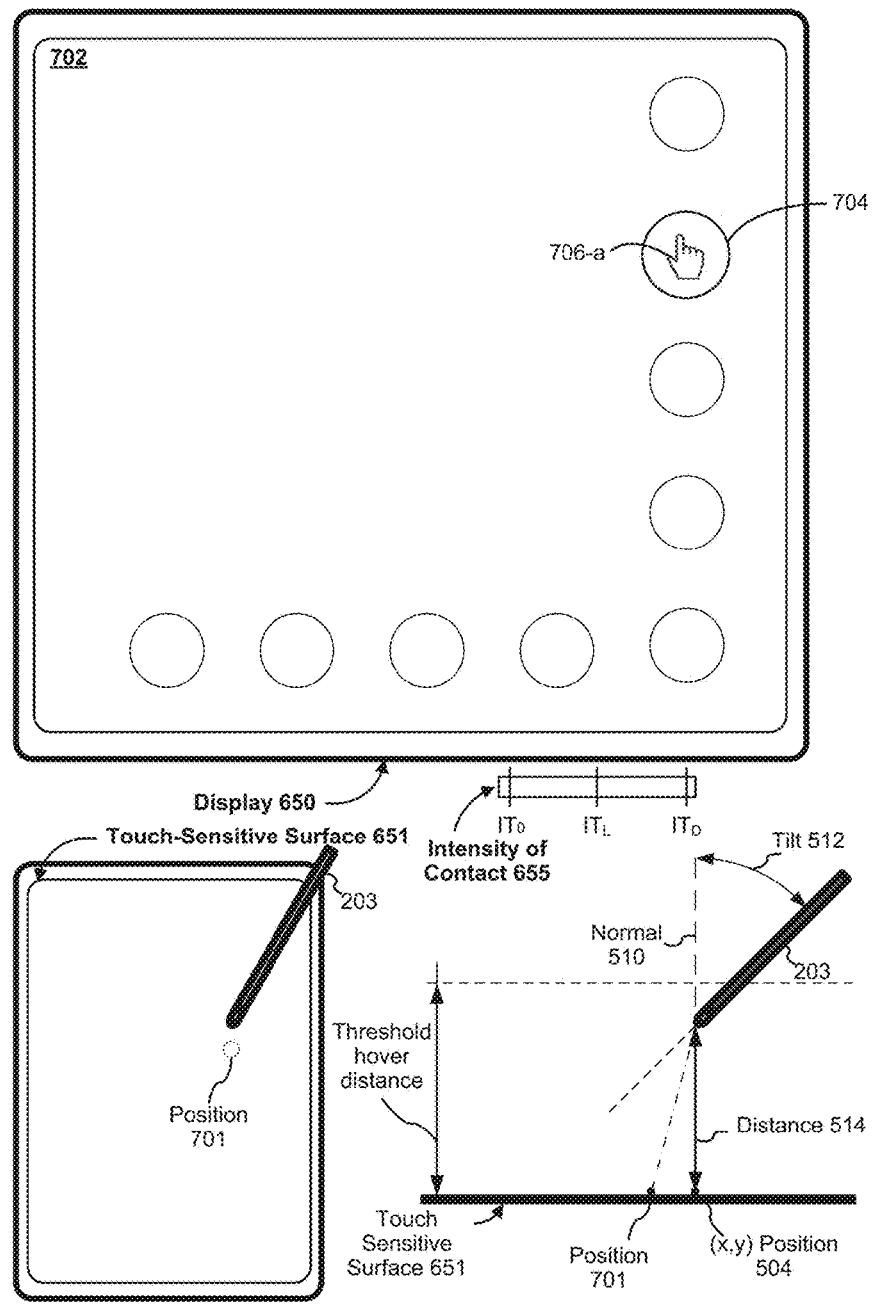
Figure 7K:
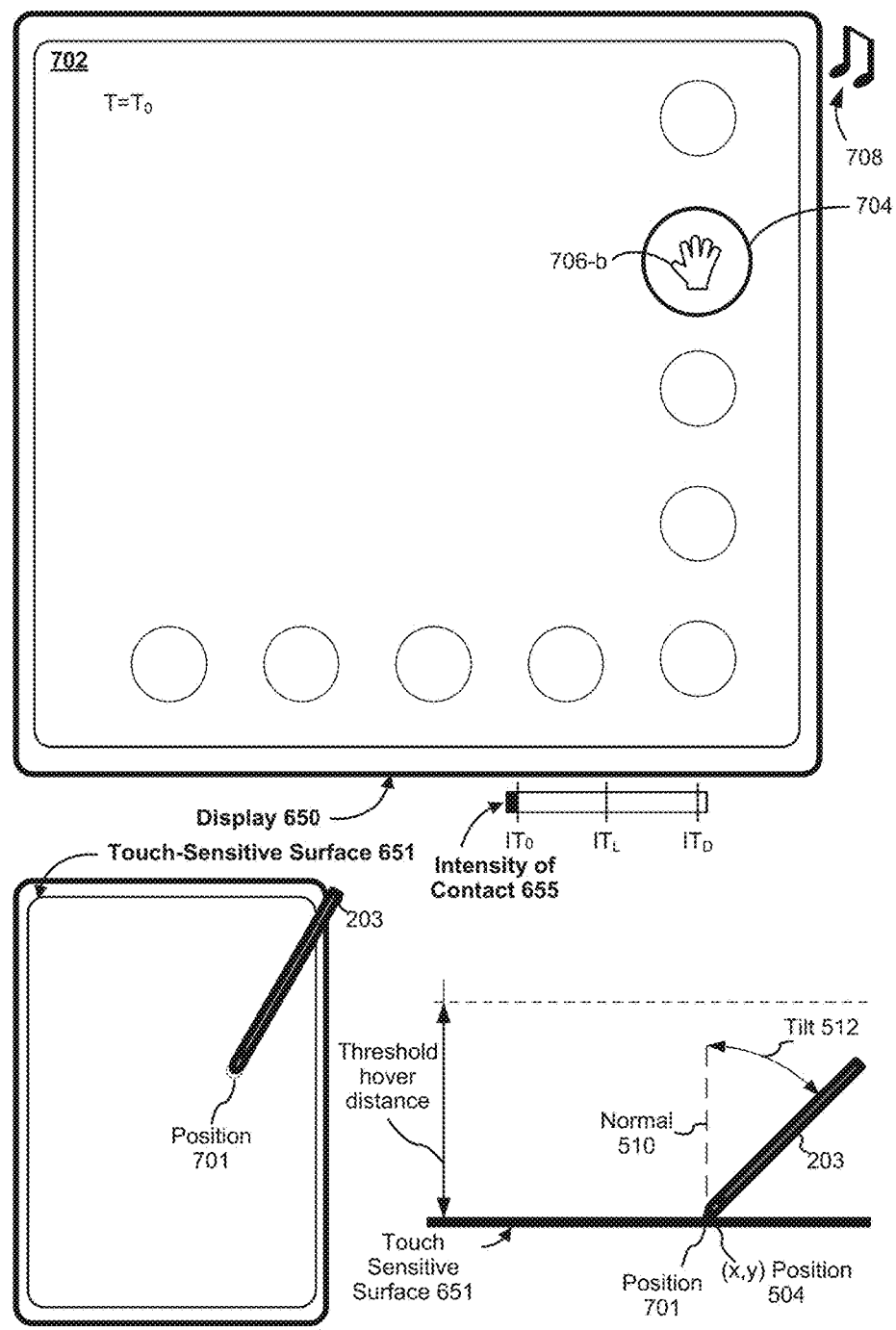
Figure 7L:
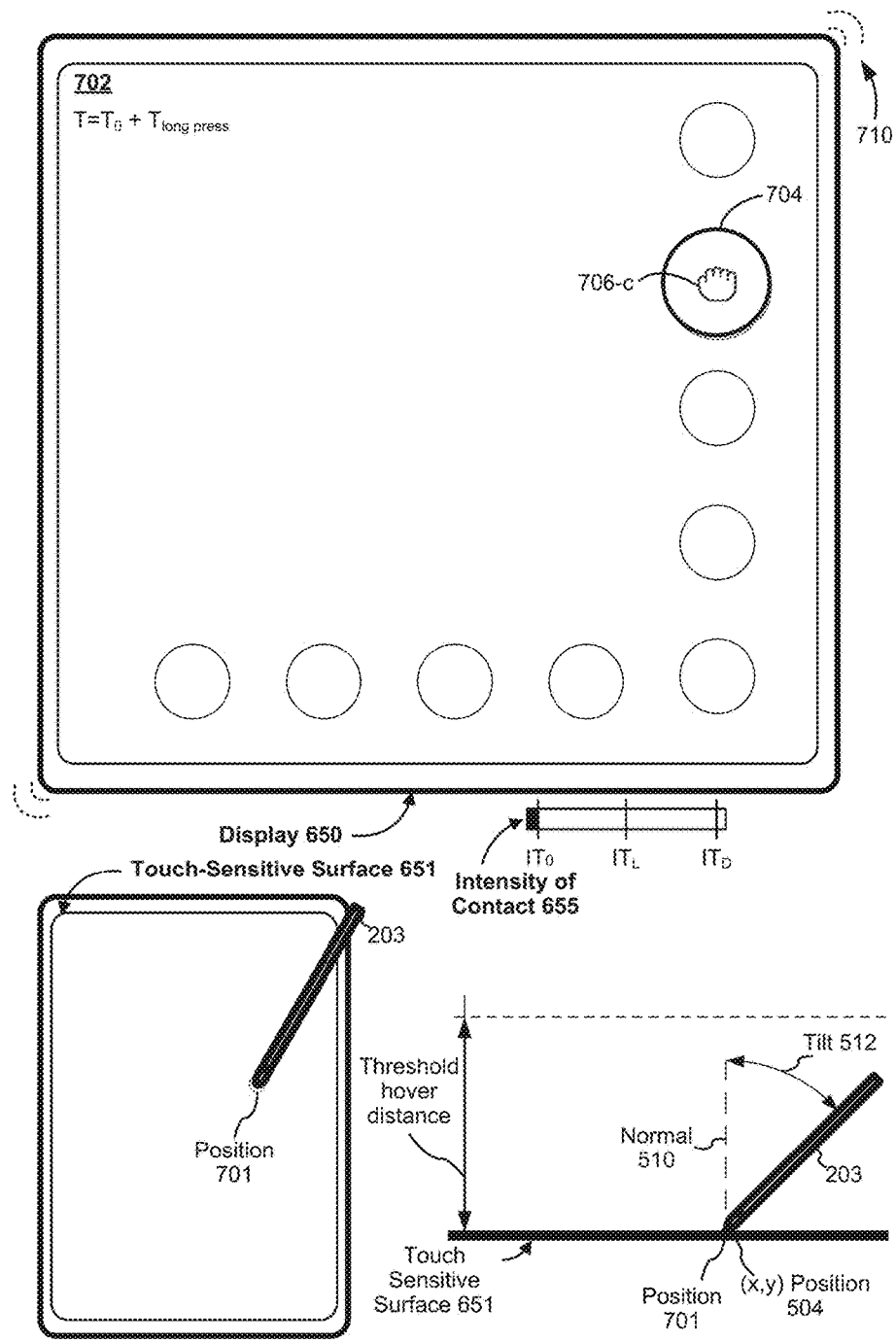
Figure 7M:
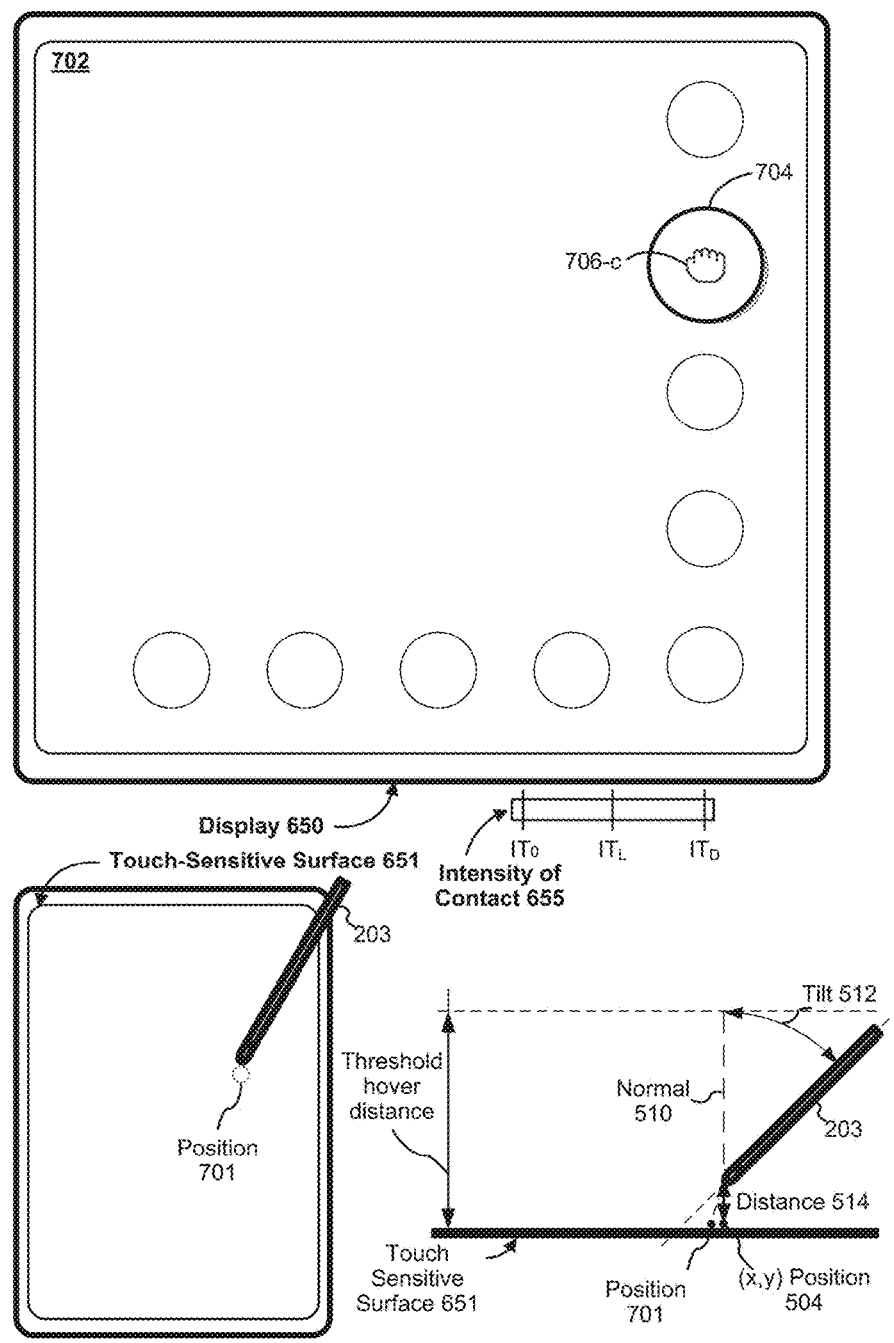
Figure 7N:
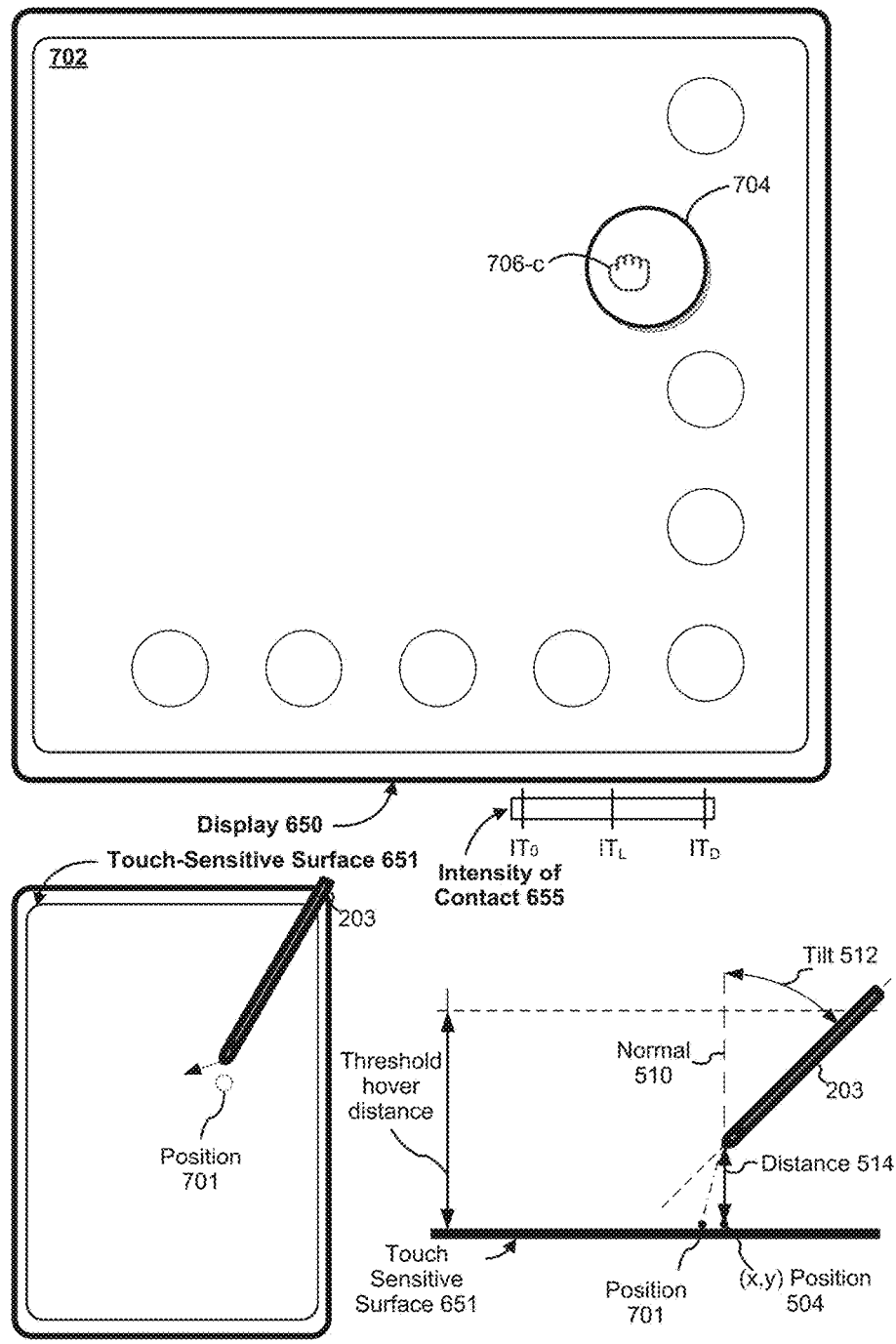
Figure 7O:
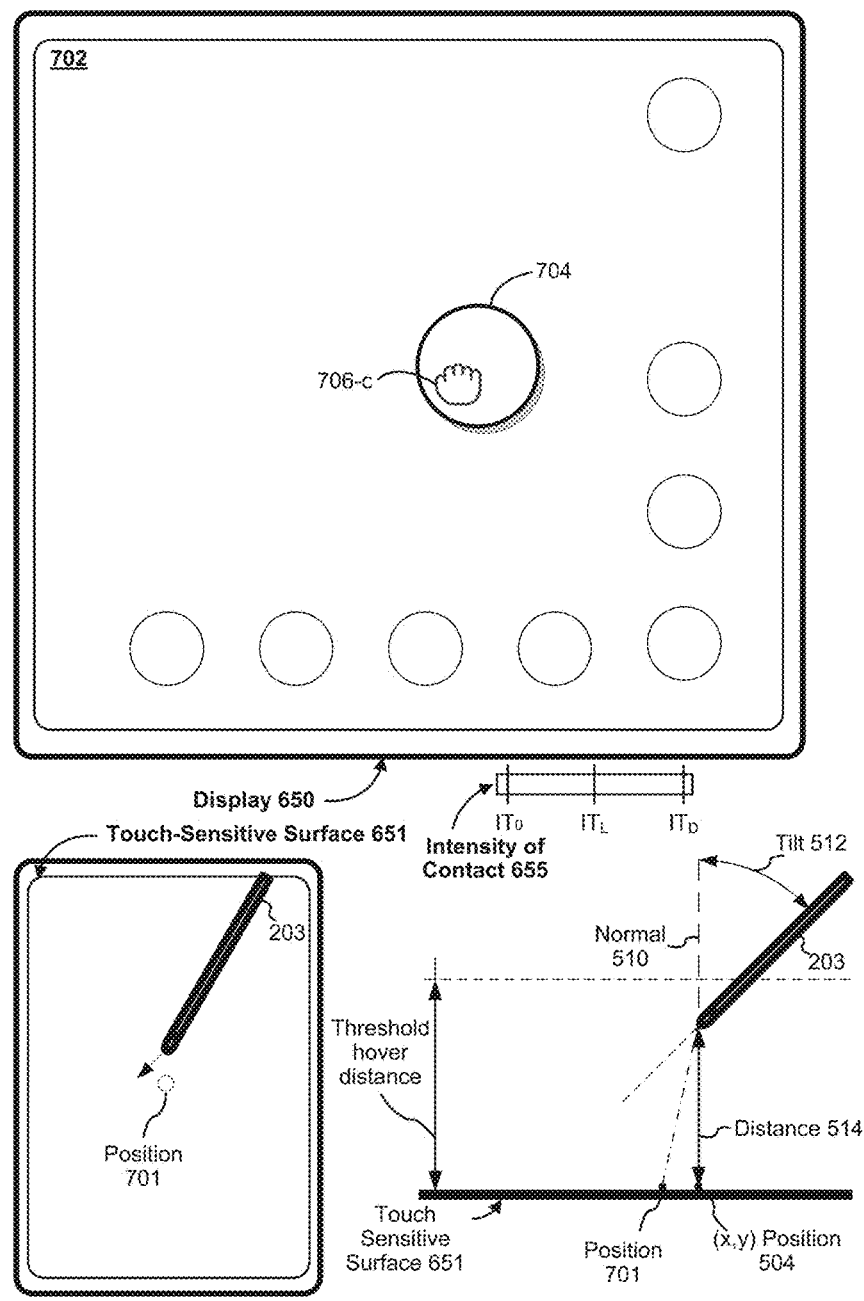
Figure 7P:
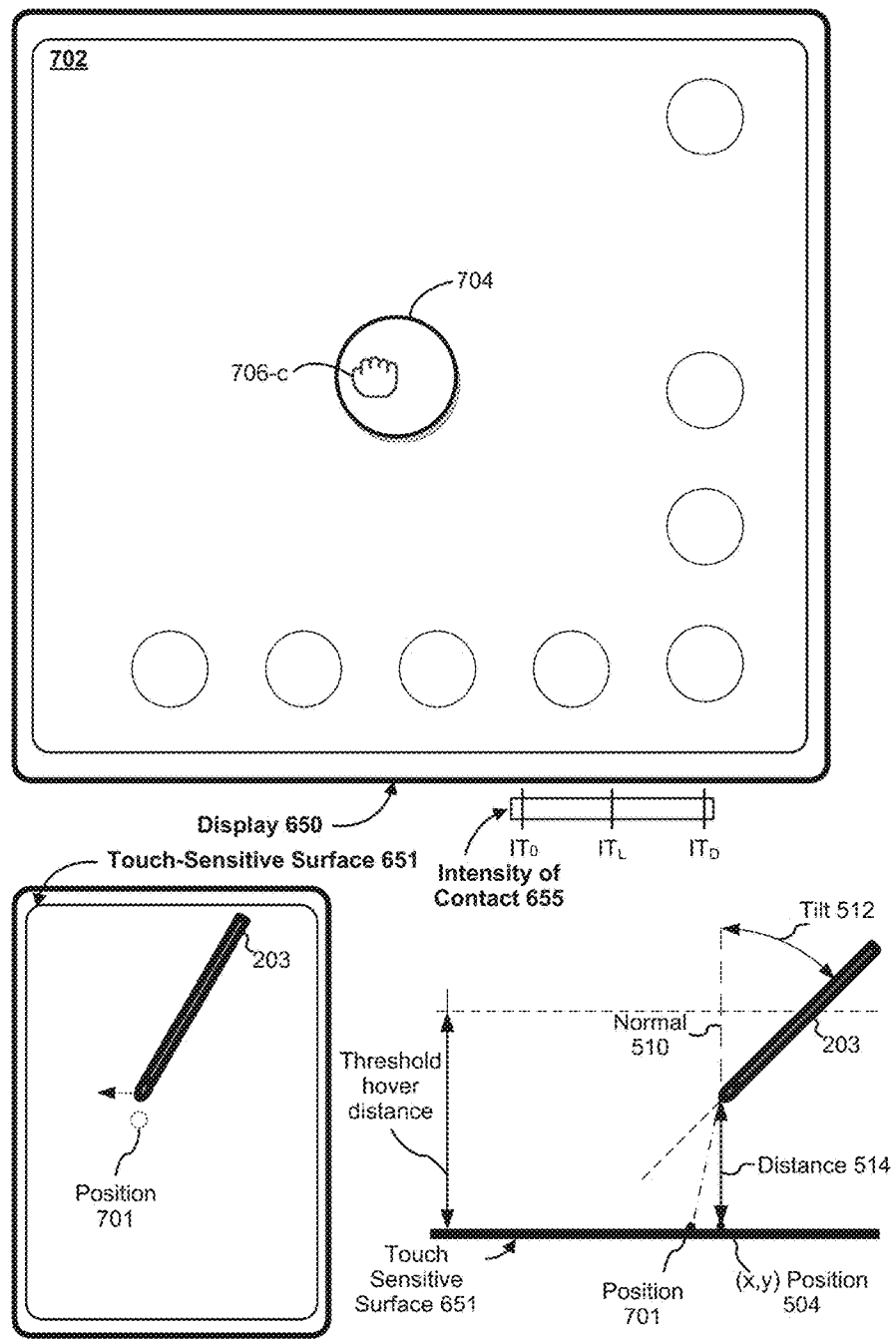
Figure 7Q:
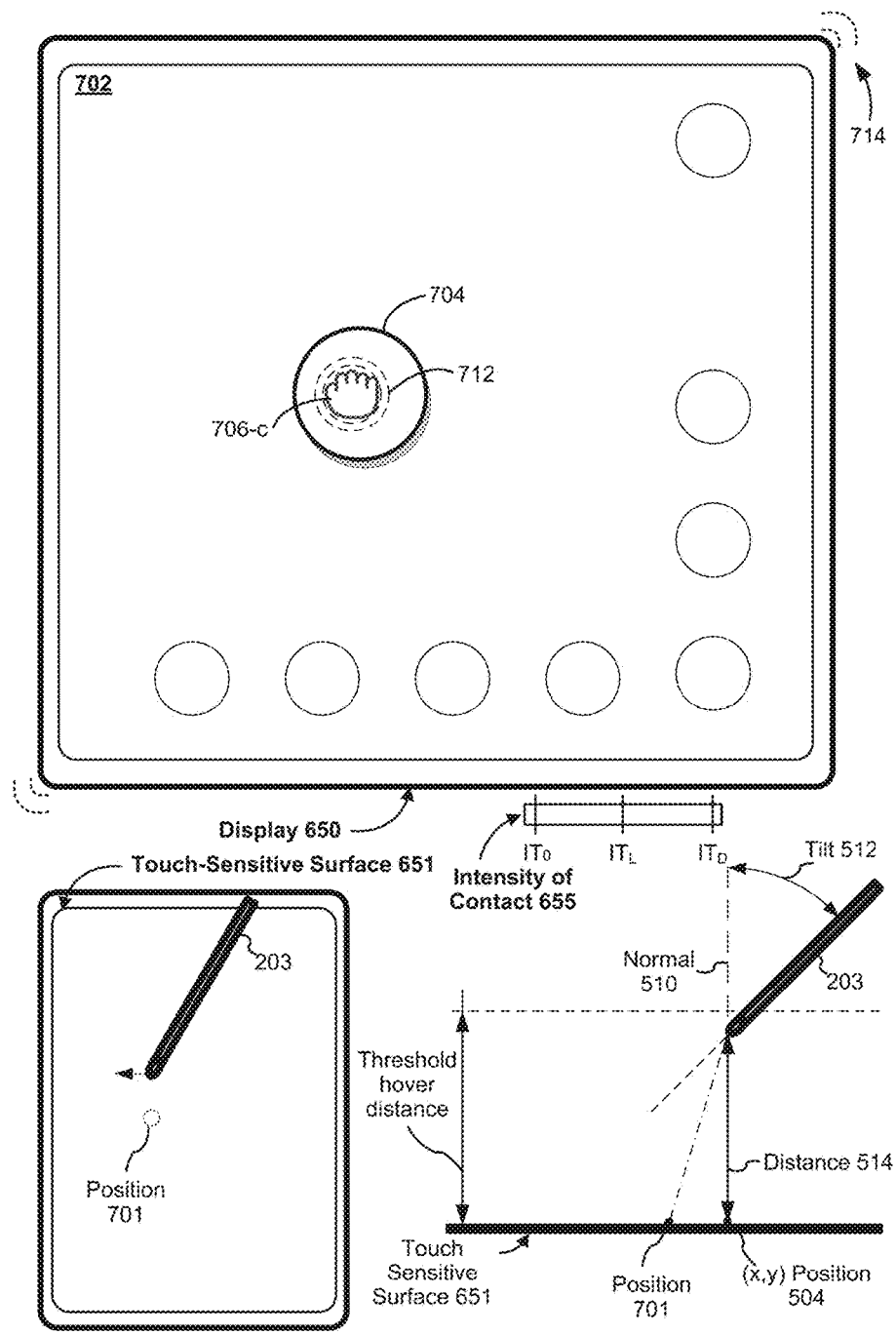
Figure 7R:
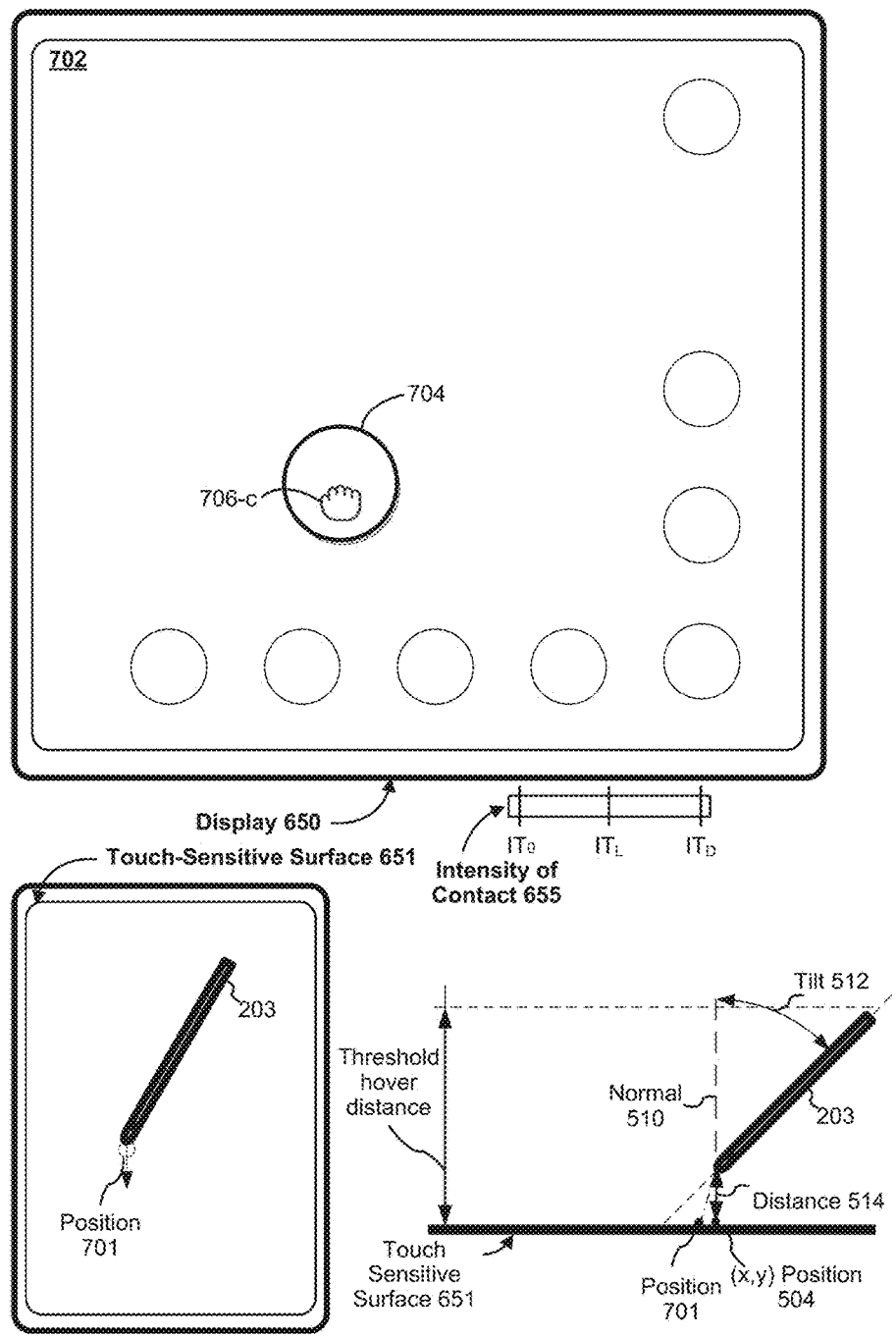
Figure 7S:
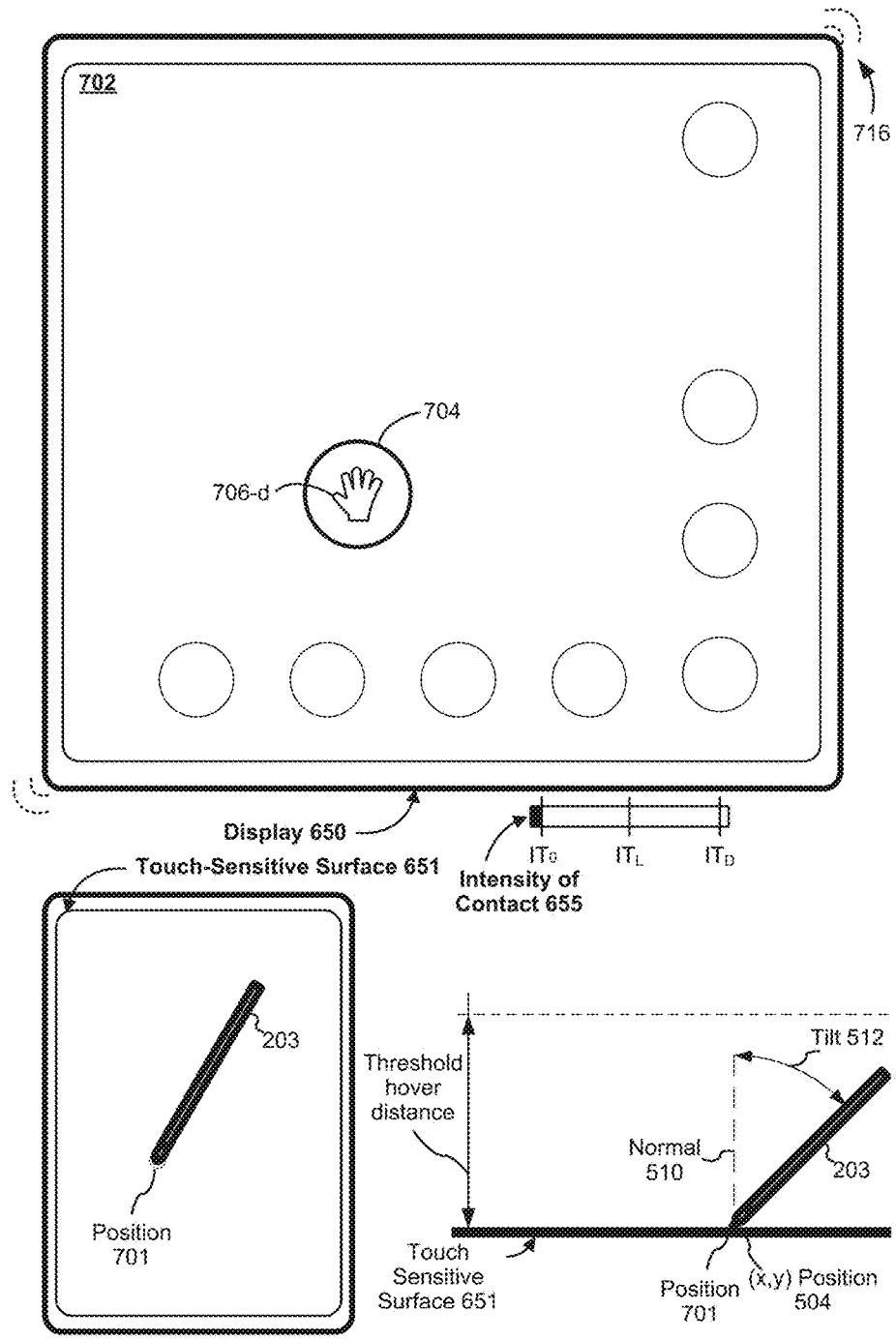
Figure 7T:
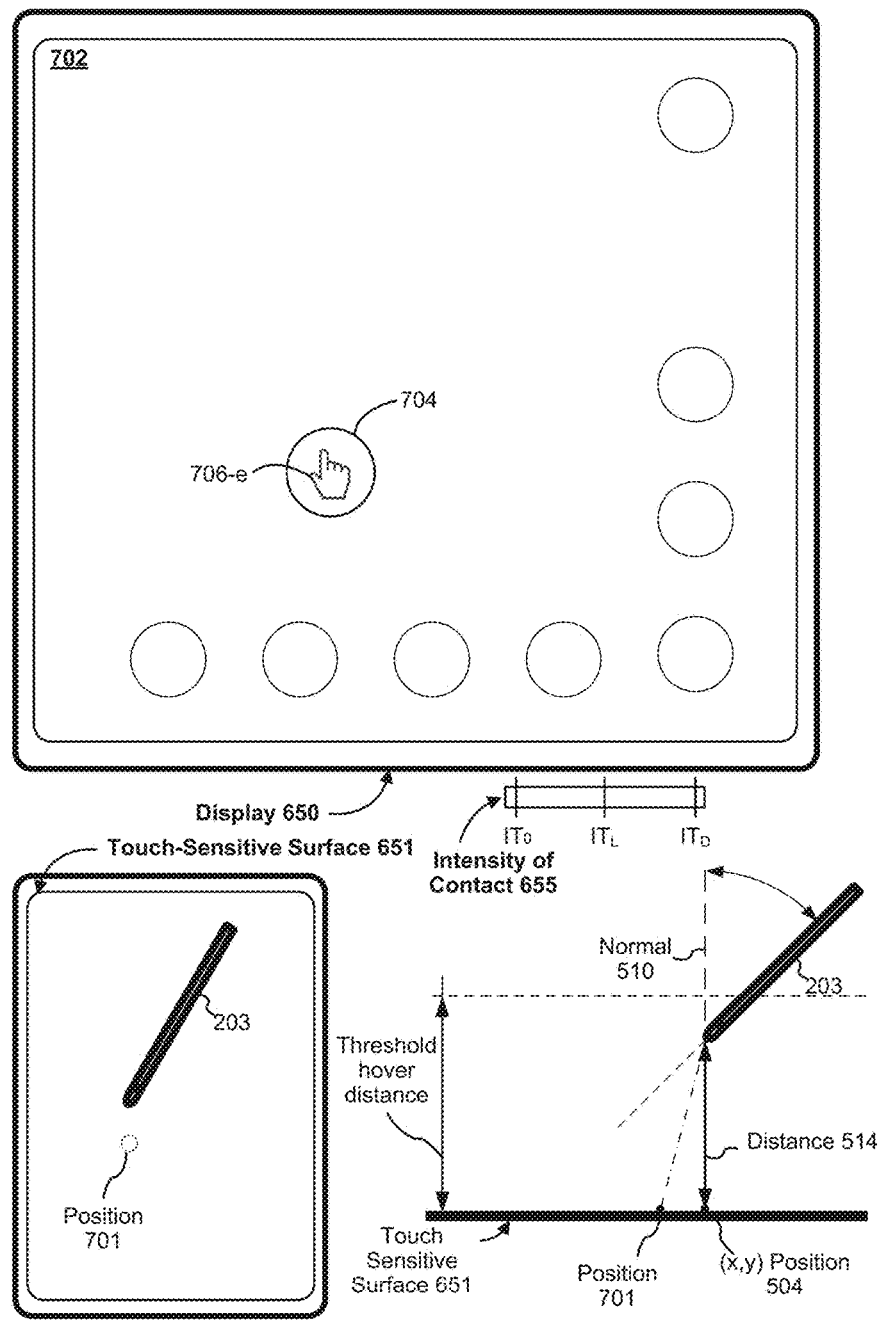
Figure 7U:
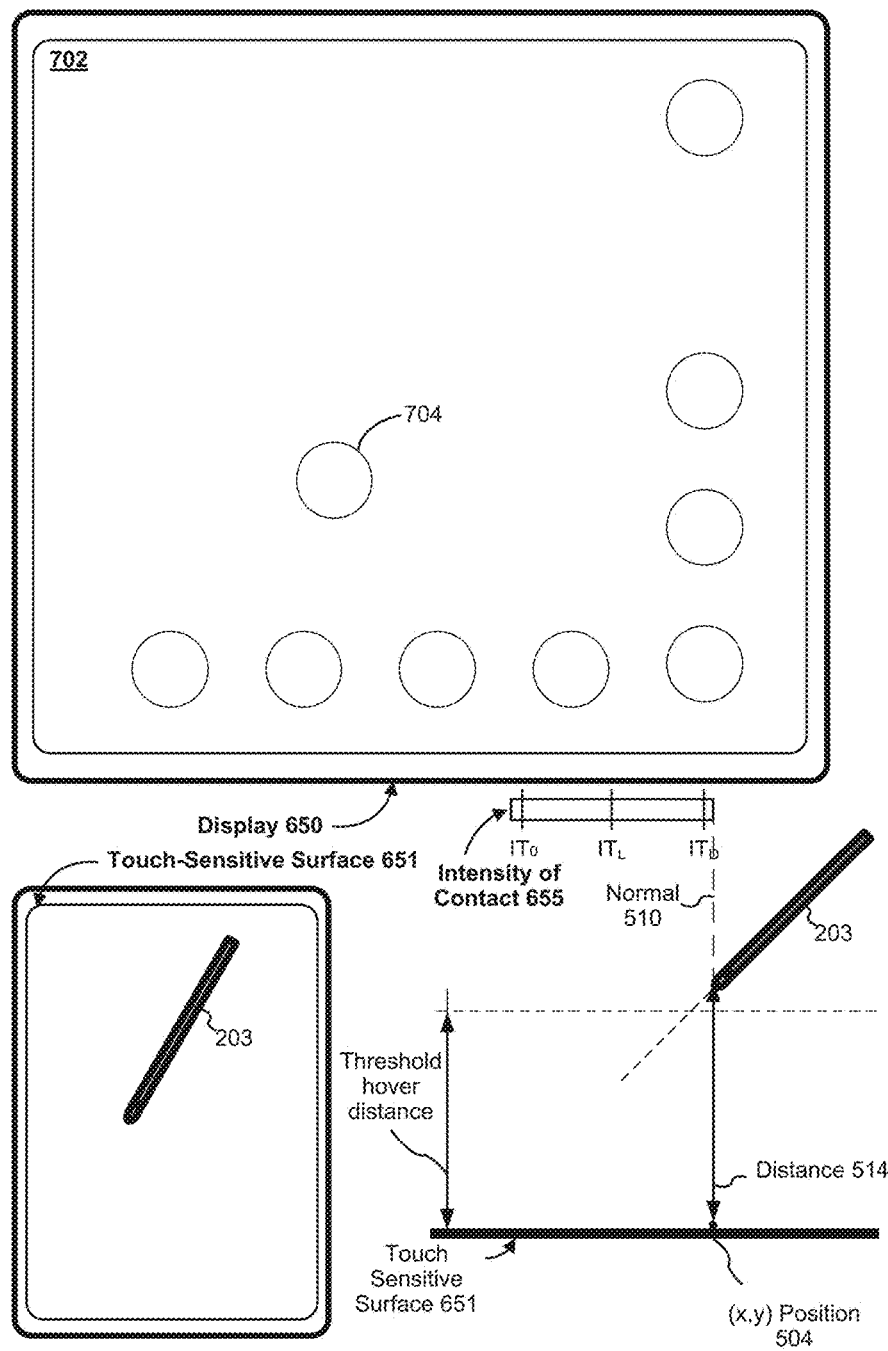

FIGS. 7A-7U illustrate a process for interacting with a user interface object (e.g., including picking up, moving, and dropping off the user interface object) through proximity-based inputs and contact-based inputs by an input object (e.g., a finger or a stylus, such as stylus 203). Although this example is given with reference to inputs provided by stylus 203, in some embodiments, the device detects inputs provided by other types of input objects, such as a finger, a wand, a handheld controller, etc., to perform the operations illustrated below.

The input parameters of an input provided by the input object (and detected by the electronic device (e.g., device 100)) include a hover proximity parameter that is (or is calculated based on) a distance (e.g., distance 514) between a predetermined portion of the input object (e.g., the tip of the finger, or the tip of the stylus) and a touch-sensitive surface (e.g., touch-screen 112 or touch-sensitive surface 651). In some embodiments, the input parameters include the lateral position (e.g., (x, y) position 504) of the input object (e.g., finger or stylus 203) relative to the touch-sensitive surface. In some embodiments, the input parameters include the three-dimensional positional state and movement of the input object, e.g., as described with respect to FIGS. 5A and 5B. In some embodiments, when the input object is in contact with the touch-sensitive surface, the input parameters include a characteristic intensity and position of a contact by the input object (e.g., the tip of the finger or stylus) with the touch-sensitive surface.

In FIG. 7A, user interface 702 is displayed on display 650. User interface 702 includes a number of user interface objects (e.g., represented by a row and a column of circles), including user interface object 704 (e.g., an application launch icon, a button, etc.). When the tip of stylus 203 is held at a distance (e.g., distance 514) that is more than the threshold hover distance away from the touch-sensitive surface, the device optionally does not display any visual indicator or focus selector that corresponds to stylus 203 on the display.

FIG. 7B illustrate that, when the tip of stylus 203 is moved toward the touch-sensitive surface and is held within the threshold hover distance of the touch-sensitive surface, the device optionally displays a visual indicator (e.g., indicator 706 (e.g., pointing hand 706-a)). Indicator 706 is displayed at a location in user interface 702 that corresponds to a position (e.g., position 701) on the touch-sensitive surface that is determined based on the lateral position (e.g., (x,y) position 504) of stylus 203 and, optionally, the vertical position and/or positional state of stylus 203. As shown in FIG. 7B, when the tip of stylus 203 is above touch-sensitive surface 651 and not in contact with touch-sensitive surface 651, position 701 is offset from (x,y) position 504 of stylus 203. The amount of the offset is optionally determined based on vertical distance 514 and optionally the positional state of stylus 203.

FIGS. 7B-7C illustrate that, when stylus 203 moves laterally while being held above the touch-sensitive surface and within the threshold hover distance of the touch-sensitive surface (in other words, while stylus 203 is within the hover range above the touch-sensitive surface), indicator 706 moves in accordance with the lateral movement of stylus 203. In FIG. 7C, lateral movement of stylus 203 is stopped when indicator 706 reaches user interface object 704. In response to detecting stylus 203 hovering above a location on the touch-sensitive surface that corresponds to the location of user interface object 704, the device changes the appearance of user interface object 704 (e.g., enlarges user interface object 704 slightly).

FIGS. 7D-7F illustrate that, when stylus 203 is moved vertically up and down within the hover range, the device dynamically changes the appearance of user interface object 704 in accordance with the current hover distance of stylus 203. In this example, the device enlarges the size of user interface object 704 with decreasing hover distance (e.g., represented by distance 514), and decreases the size of user interface object 704 with increasing hover distance.

FIGS. 7G-7H illustrate that, while stylus 203 is within the threshold hover distance of the touch-sensitive surface, lateral movement of stylus 203 influences the shape of user interface object 704 when indicator 706 is within a threshold distance (e.g., three quarters of a diameter of the user interface object) away from the original location of user interface object 704 (e.g., the location of a centroid of the user interface object). In other words, lateral movement of indicator 706 away from the original location of user interface object 704 stretches user interface object 704 in a movement direction of the indicator 706, until indicator 706 moves laterally beyond the threshold distance away from the original location of user interface object 704. In some embodiments (not shown), the threshold distance is shorter when stylus 203 is farther away from the touch-sensitive surface, and a smaller amount of stretch that can be applied to object 704 before object 704 snaps back to its original shape.

FIG. 7I illustrates, that when indicator 706 moves beyond the threshold distance away from the original location of user interface object 704, user interface object 704 snaps back into its original location and shape. In some embodiments, user interface object may be pull away from its original location by a small distance with the movement of indicator 706, but snaps back to its original location once indicator 706 moves beyond the threshold distance away from the original location of object 704.

FIG. 7J illustrates that stylus 203 makes an initial contact with touch-sensitive surface 651. Upon initial contact of stylus 203 with the touch-sensitive surface, the device changes the appearance of indicator 706 to indicate that contact has been made and that user interface object 704 is no longer in the hover state and interaction with the user interface object will be carried out by a contact between stylus 203 and the touch-sensitive surface. In addition, the device also changes the appearance of user interface object 704 (e.g., further enlarges user interface object 704 as compared to the size before stylus 203 made contact with the touch-sensitive surface, and highlighting user interface object 704) to indicate that user interface object is now being manipulated by a touch input, as opposed to a hover input. In some embodiments, the changes in the size of object 704 are continuous at the transition between the object's states before and after stylus 203 made contact with the touch-sensitive surface. In some embodiments, the device generates an audio output (e.g., audio signal 708) to indicate that stylus 203 has made initial contact with the touch-sensitive surface. The audio feedback (e.g., by audio signal 708) enhances the visual feedback (e.g., enlarging and highlighting of user interface object 704) to alert the user that object 704 has exited the hover state and entered the contact state, and the user interface behavior will be different in the contact state, as compared to the hover state. In some embodiments, if stylus 203 moves laterally while remaining in contact with the touch-sensitive surface (not shown), indicator 706 moves in accordance with the lateral movement of stylus 203, and drags object 704 with it within user interface 702. In some embodiments, to distinguish from the dragging of the object by a hover input provided by stylus 203, object 704 moves at the same speed as indicator 706 and does not lag behind indicator 706 in response to lateral movement of stylus 203 while maintaining contact with the touch-sensitive surface.

FIGS. 7K-7L illustrate that, when contact between stylus 203 and the touch-sensitive surface is maintained for more than a threshold amount of time (e.g., $T_{long}$ press) such that a long press input is registered by the device (e.g., stylus 203 does not move for more than a threshold amount before the long press input is registered), user interface object 704 is picked up by stylus 203. Upon detecting that stylus 203 has maintained contact with the touch-sensitive surface for more than the long-press time threshold, the device changes the appearance of indicator 706 (e.g., from an open hand 706-b to a grabbing hand 706-c) to show that user interface object 704 is attached to indicator 706. The device provides a tactile output (e.g., discrete tactile output 710) to indicate that user interface object 704 is picked up and ready to be lifted up and moved with stylus 203. In some embodiments, the device shows that user interface object 704 appearing to jump up from its original z-location toward indicator 706. In some embodiments, generation of tactile output 710 is synchronized with the attachment of user interface object 704 to indicator 706.

FIGS. 7M-7R illustrate the process that user interface object 704 is lifted up and moved with indicator 706 in response to movement of stylus 203 while stylus 203 is hovering over the touch-sensitive surface. In FIGS. 7M-7O, after lift-off of stylus 203 from the touch-sensitive surface, stylus 203 moves laterally while moving away from the touch-sensitive surface. With increasing distance between stylus 203 and the touch-sensitive surface (as indicated by increasing value of distance 514), the size of indicator 706 increases. In addition, with increasing distance between stylus 203 and the touch-sensitive surface, the size of object 704 also increases accordingly. In FIGS. 7O-7P, it is shown that, with decreasing distance between stylus 203 and the touch-sensitive surface, the size of indicator 706 decreases. In addition, with decreasing distance between stylus 203 and the touch-sensitive surface, the size of object 704 also decreases.

In FIG. 7Q, the stylus is lifted above the touch-sensitive surface very close to the edge of the hover range (e.g., less than a threshold distance (e.g., 10% of the threshold hover distance) from the edge of the hover range), the device generates visual feedback (e.g., flickering edge 712 of indicator 702) indicating that stylus 203 is about to exit the hover range and termination of the hover input is imminent if stylus 203 is not brought closer to the touch-sensitive surface immediately (e.g., within a threshold amount of time (e.g., 300 ms)). In some embodiments, the device generates tactile output 714 (and/or an audio alert) in conjunction with displaying the visual feedback to indicate that stylus 203 is about to exit the hover range. FIG. 7R shows that stylus is brought closer to the touch-sensitive surface without exiting the hover range, and the appearance of indicator 706 is restored (e.g., flickering edge 712 ceases to be displayed). The size of object 704 is adjusted according to the current hover distance of stylus 203.

In FIGS. 7M-7R, it is illustrated that the size of object 704 is dynamically changed in accordance with the changes in the hover distance of stylus 203, while object 704 is moved laterally in accordance with the lateral movement of indicator 706 (and in accordance with the lateral movement of stylus 203 above the touch-sensitive surface). In addition, during the lateral movement of indicator 706, the movement of object 704 lags behind the movement of indicator 704 slightly, so when indicator 706 changes its movement direction, or suddenly slows down or speeds up, the relative positions of indicator 706 and object 704 change slightly to reflect this lag.

FIG. 7S illustrates that, after stylus 203 picked up and moved user interface object 704 (e.g., as shown in FIGS. 7M-7R), stylus 203 makes contact with the touch-sensitive surface again to drop off user interface object 704. In some embodiments, upon detecting the second contact between stylus 203 and the touch-sensitive surface, the device changes the appearance of indicator 706 (e.g., from a grabbing hand 706-c to an open hand 706-d) to indicate that object 704 is to be dropped off at the current location. In some embodiments, the device shows that object 704 detaches from indicator 706. The device optionally generates a tactile output (tactile output 716) in conjunction with object 704 landing onto the surface of user interface 702.

FIG. 7T illustrates that, after dropping off object 704, stylus 203 is lifted off the touch-sensitive surface and the appearance of indicator 706 is changed to indicate that stylus 203 is in the hovering again. If at this time, stylus 203 moves laterally while hovering above the touch-sensitive surface, object 706 will be stretched by the moving indicator 706 but will not move with indicator 706 (e.g., as illustrated earlier in FIGS. 7G-7H).

FIG. 7U illustrates that, after dropping off object 704 and being lifted off of the touch-sensitive surface, stylus 203 is then lifted out of the hover range, such that stylus 203 is no longer in the hover state. Indicator 706 is no longer displayed, and object 704 is displayed at its new location and restored to its original appearance.

Figure 7V:
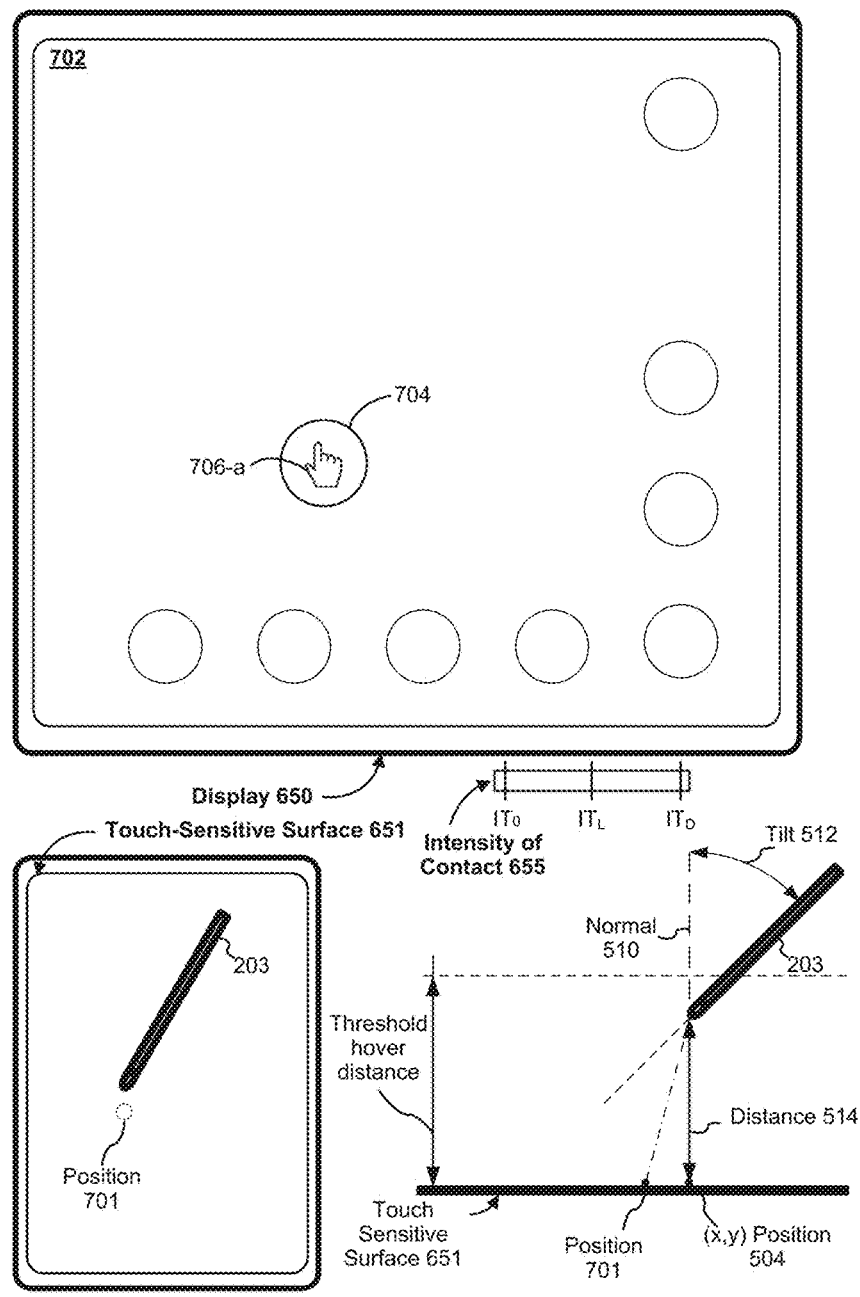

FIG. 7V-7AJ illustrates a process in which device 100 changes the appearance of object 704 in response to a continuous input that includes a first portion of the input in which stylus 203 is hovering above the touch-sensitive surface, followed by a second portion of the input in which stylus 203 is in contact with the touch-sensitive surface, followed by a third portion of the input in which stylus is lifted off of the touch-sensitive surface and is in the hover state again. In this example, the device dynamically changes the appearance of object 704 in accordance with the hover distance of stylus 203 in a first manner before stylus 203 makes initial contact with the touch-sensitive surface. The device dynamically changes the appearance of object 704 in accordance with the contact intensity of stylus 203 in a second manner after stylus 203 makes the initial contact with the touch-sensitive surface. In some embodiments, at least one change in appearance (e.g., change in size of object 704) is continuous at the transition between the hover state and the contact state. In some embodiments, at least one change in appearance (e.g., change in color of object 704) is not continuous at the transition between the hover state and the contact state. In addition, when stylus 203 breaks the initial contact with the touch-sensitive surface, the device dynamically changes the appearance of the object 704 in accordance with the hover distance of stylus 203. In some embodiments, at least one change in appearance (e.g., change in size of object 704) is continuous at the transition between the contact state and the hover state. In some embodiments, at least one change in appearance (e.g., change in color of object 704) is not continuous at the transition between the contact state and the hover state.

FIGS. 7U-7V illustrate that, when stylus 203 enters the hover range from above the touch-sensitive surface at a location that corresponds to the location of object 704 in user interface 702, the device displays indicator 706 at the location of object 704 in user interface 702.

Figure 7W:
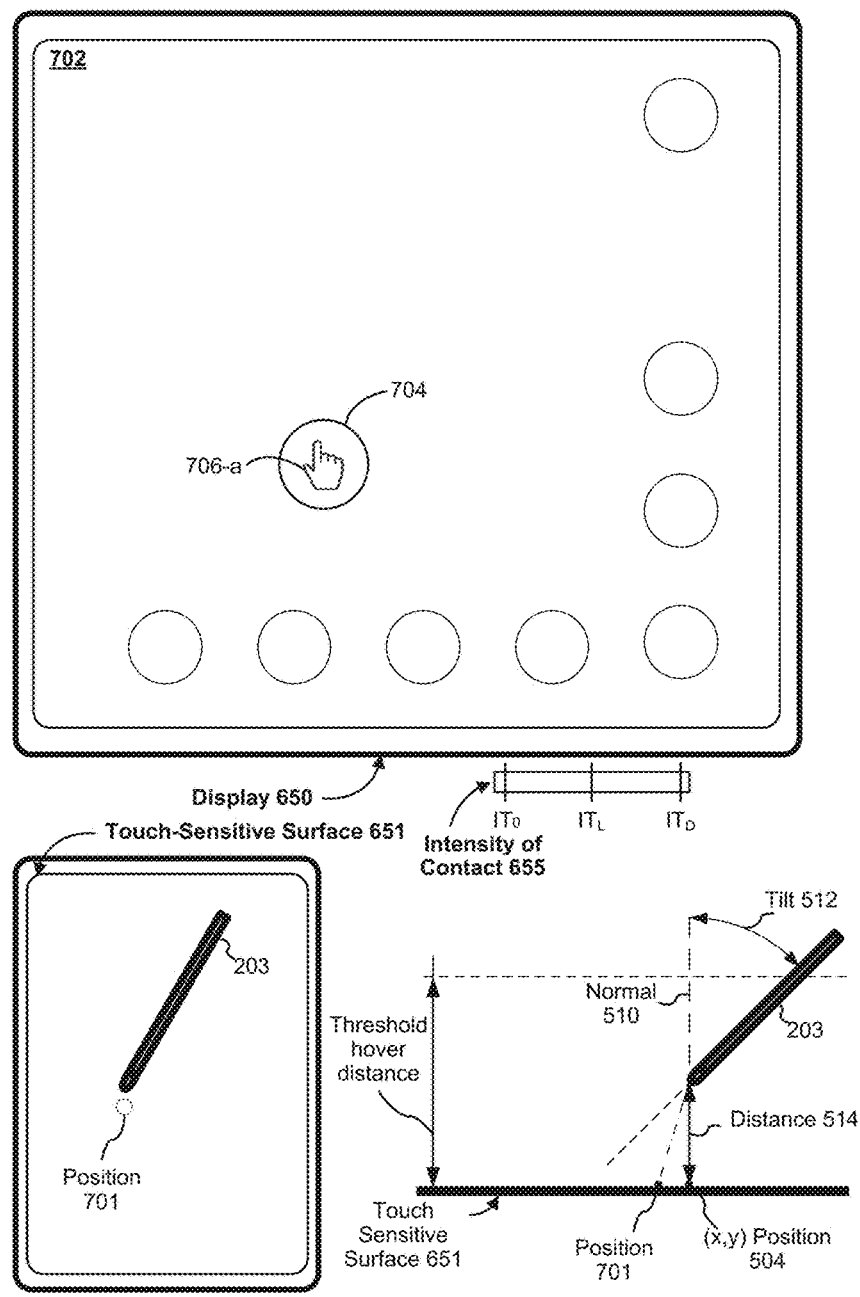
Figure 7X:
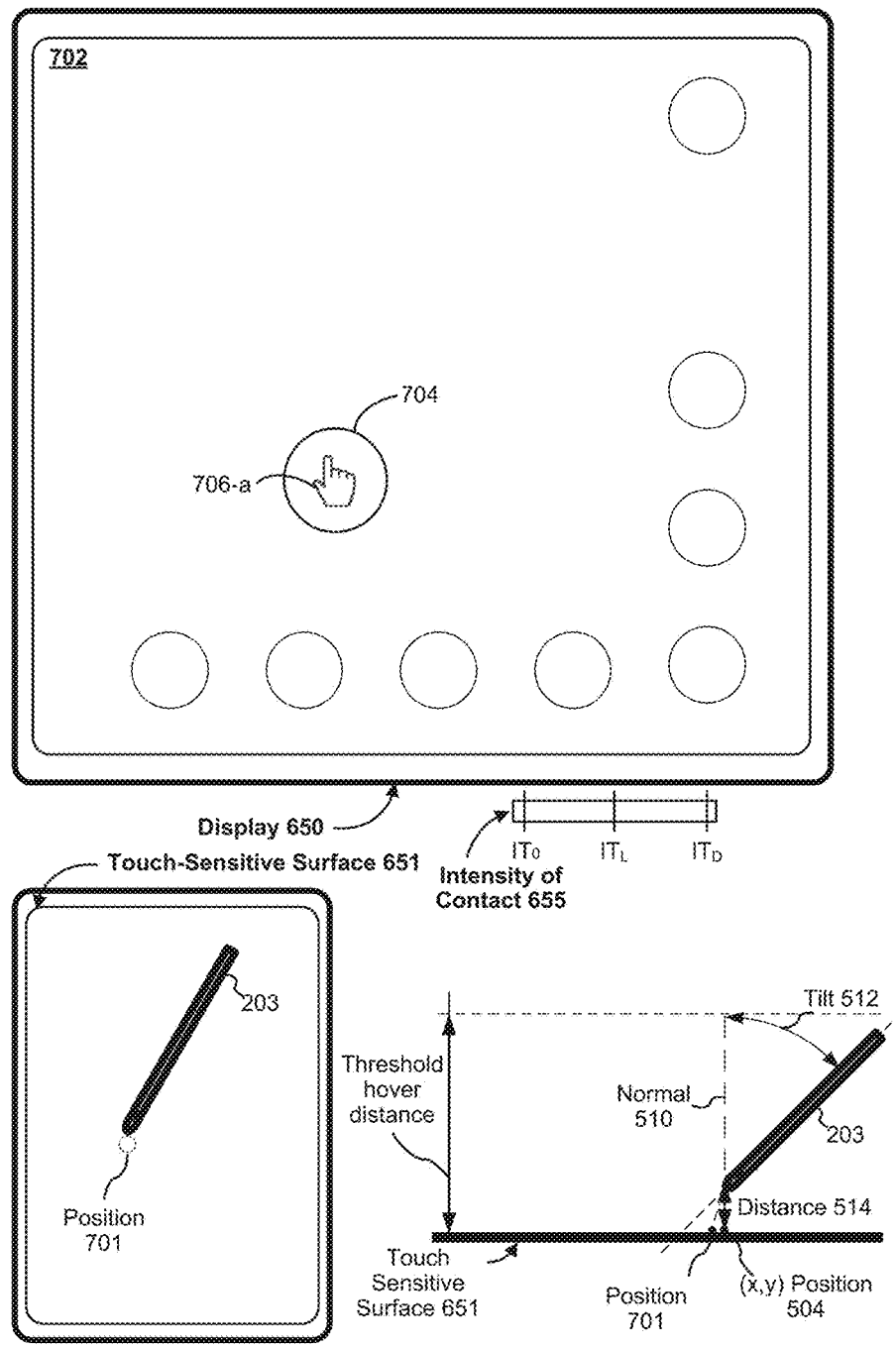

FIGS. 7V-7X illustrate that, when stylus 203 approaches the touch-sensitive surface from above, device 100 increases the size of object 704 with decreasing hover distance (e.g., represented by decreasing distance 514) of stylus 203 before stylus 203 makes initial contact with the touch-sensitive surface. In some embodiments, device also increases the size of indicator 706 with the decreasing hover distance of stylus 203.

Figure 7Y:
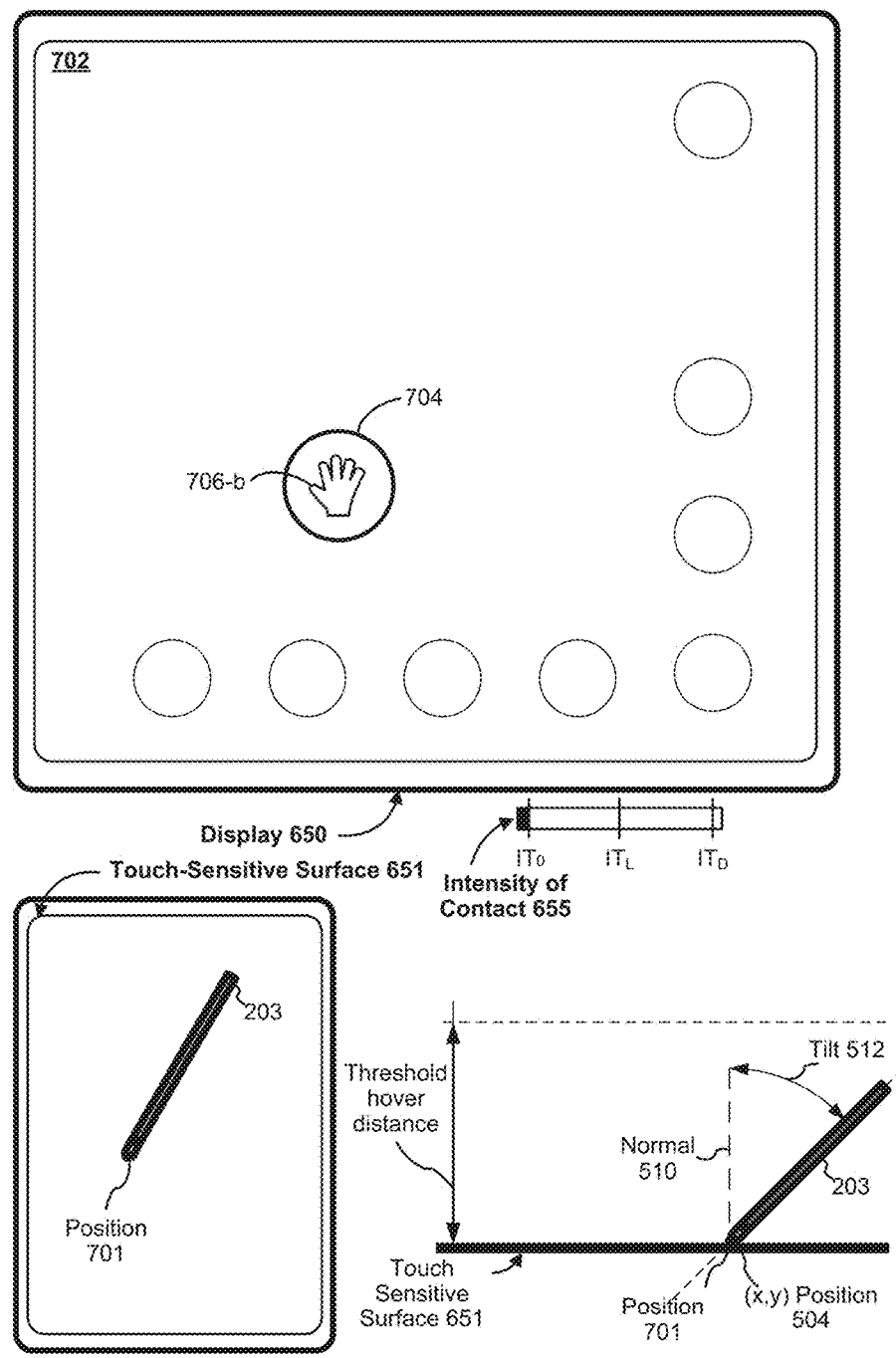

FIG. 7Y illustrates the initial contact of stylus 203 with the touch-sensitive surface. In FIG. 7Y, it is shown that, as soon as stylus 203 makes contact with the touch-sensitive surface and the contact intensity meets the detection threshold $IT_0$, the device changes the appearance of indicator 706 (e.g., from pointing hand 706-a to open hand 706-b) to indicate that stylus 203 has exited the hover state and is now in the contact state (and that the object under the influence of indicator 706 or stylus 203 has exited the hover state and entered the contact state). In addition, upon detecting the contact by stylus 203 with the touch-sensitive surface (e.g., upon detecting that the intensity of the contact meets the detection threshold $IT_0$), device 100 changes the appearance of object 704 (e.g., by highlighting object 704 or changing the color of object 704) to indicate that object 704 will now respond to change in contact intensity of the contact between stylus 203 and the touch-sensitive surface. The transition from the un-highlighted state to the highlighted state is an abrupt change in the appearance of object 704 that occurs at the moment when stylus 203 makes contact with the touch-sensitive surface, or when contact intensity reaches the contact detection intensity threshold $IT_0$. In some embodiments, in the intermediate stage before the stylus touches the touch-sensitive surface and the contact intensity is below the detection threshold intensity $IT_0$, the device applies an animated transition to change the size (e.g., to increase the size) of object 704 from the state right before stylus 203 touches the touch-sensitive surface to the state right after the intensity of contact between stylus 203 and the touch-sensitive surface meets the detection intensity threshold $IT_0$. In other words, the change in the size of object 704 (e.g., size increase) is a smooth transition when stylus 203 transitions from the hover state to the contact state.

Figure 7Z:
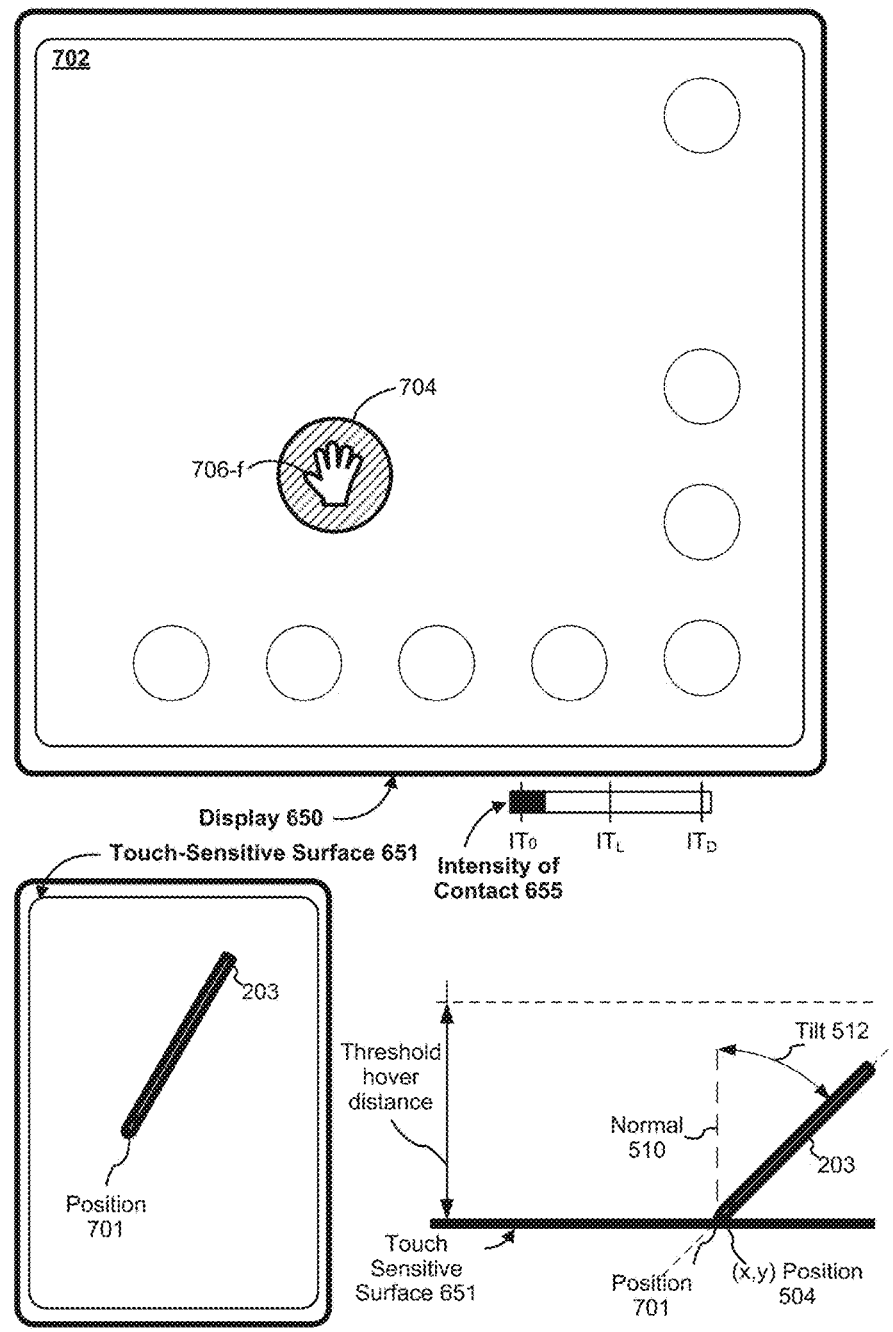
Figure 7A:
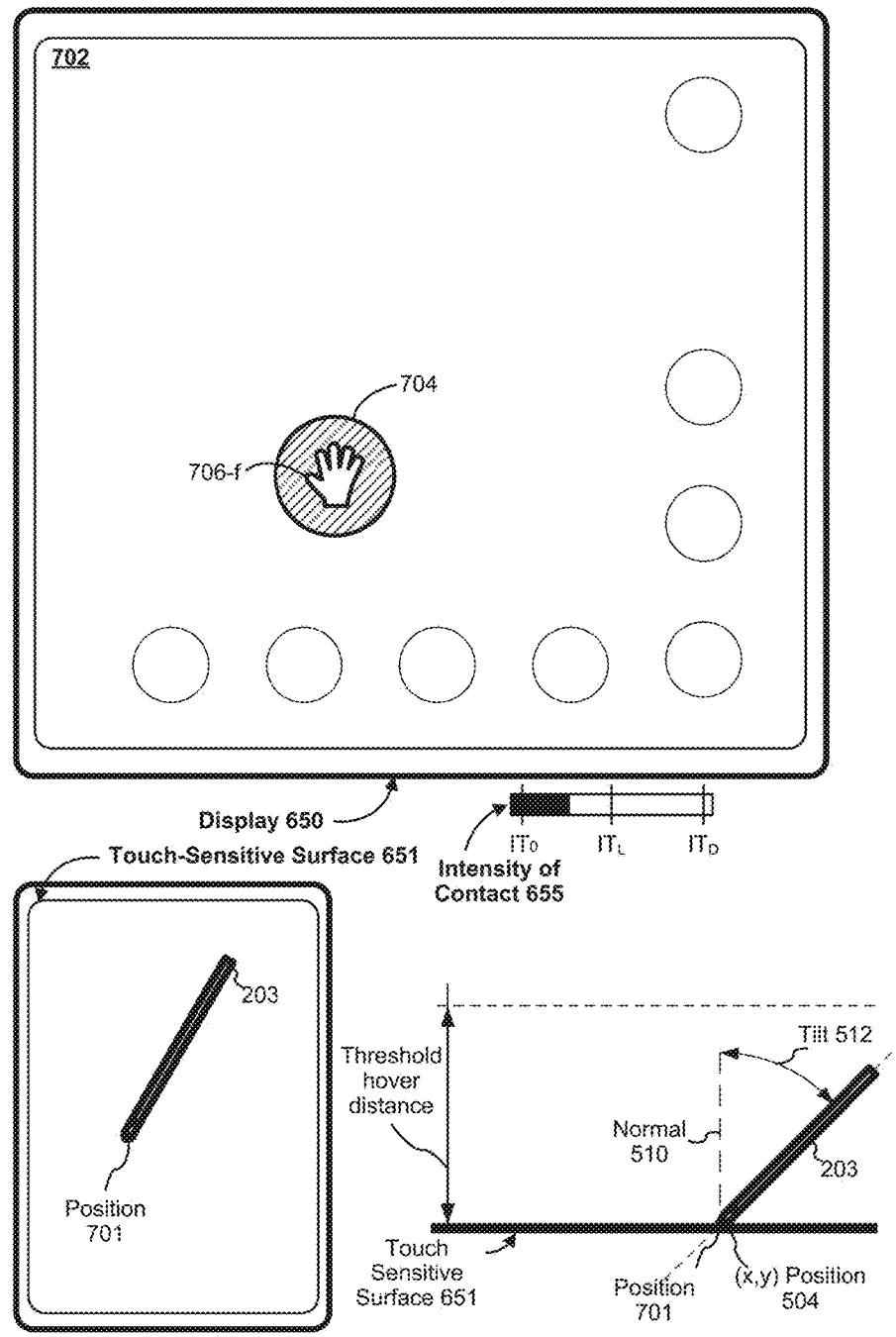
Figure 7A:
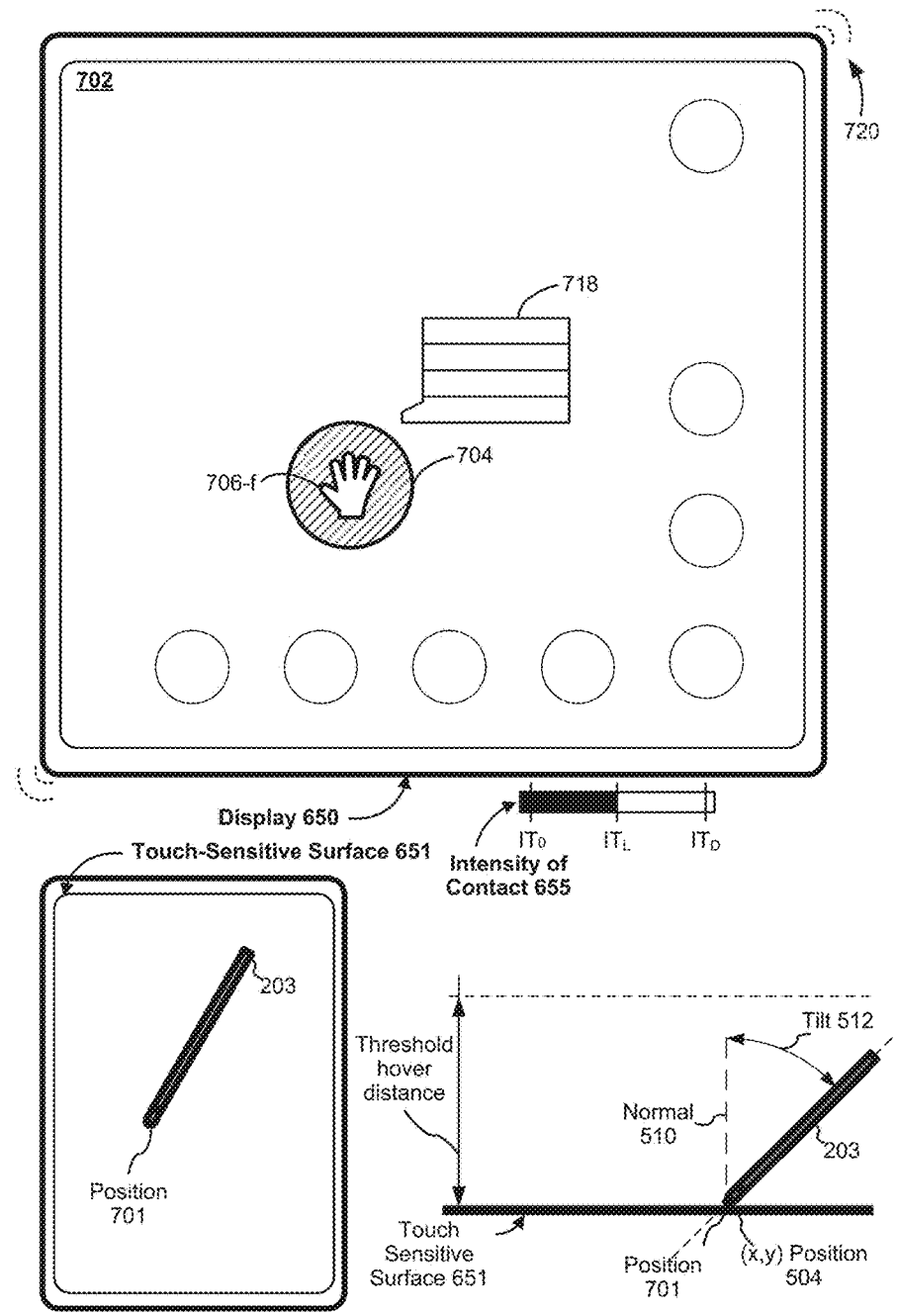
Figure 7A:
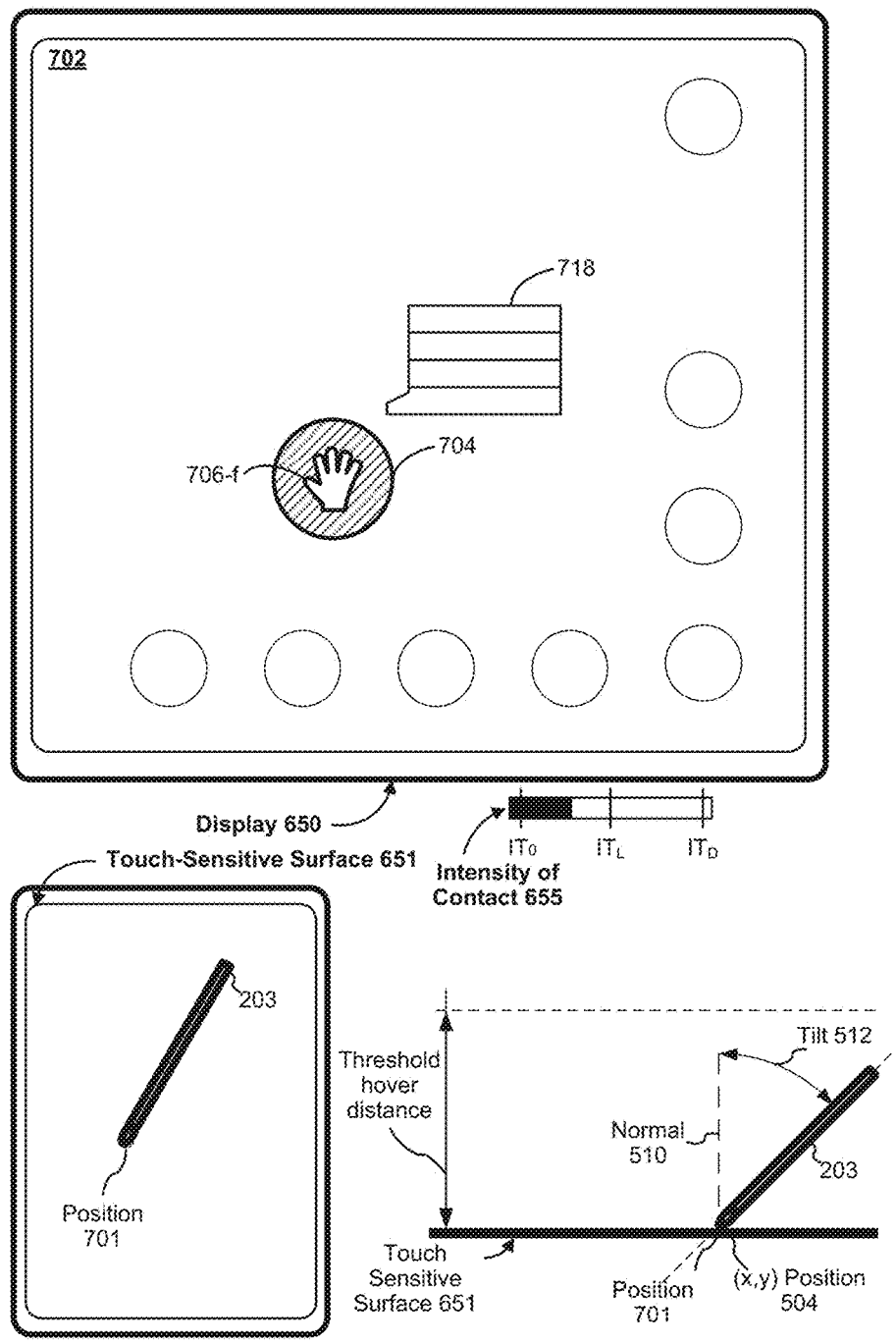
Figure 7A:
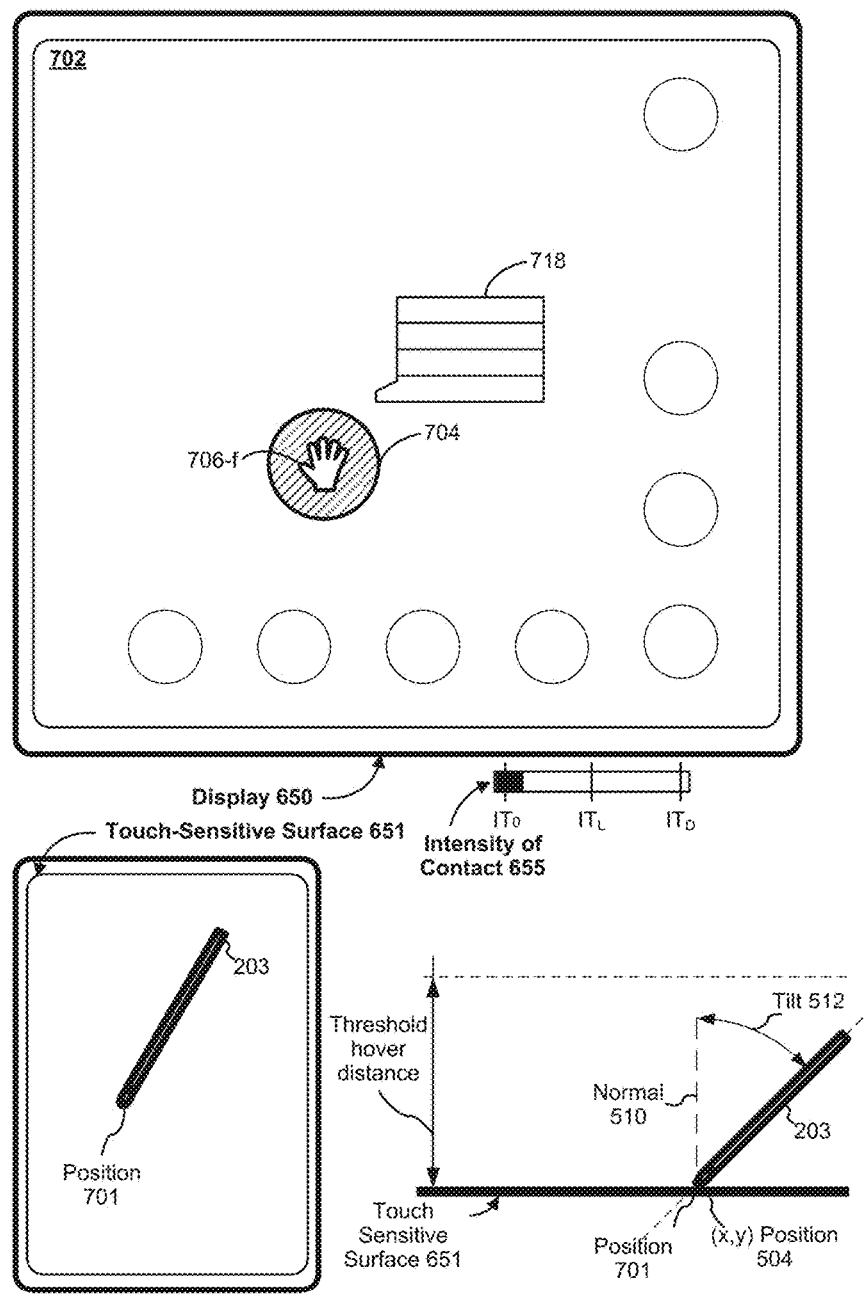
Figure 7A:
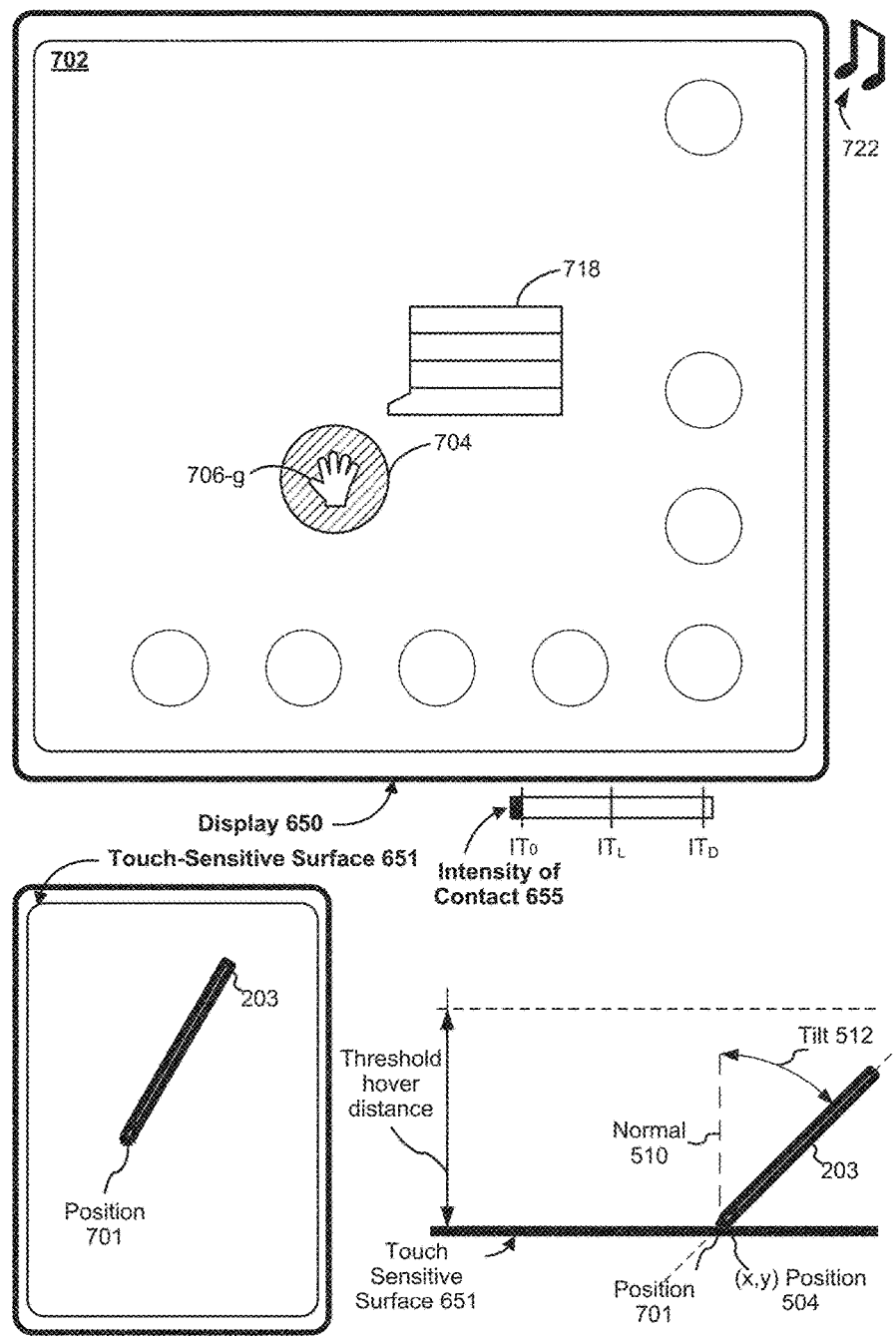
Figure 7A:
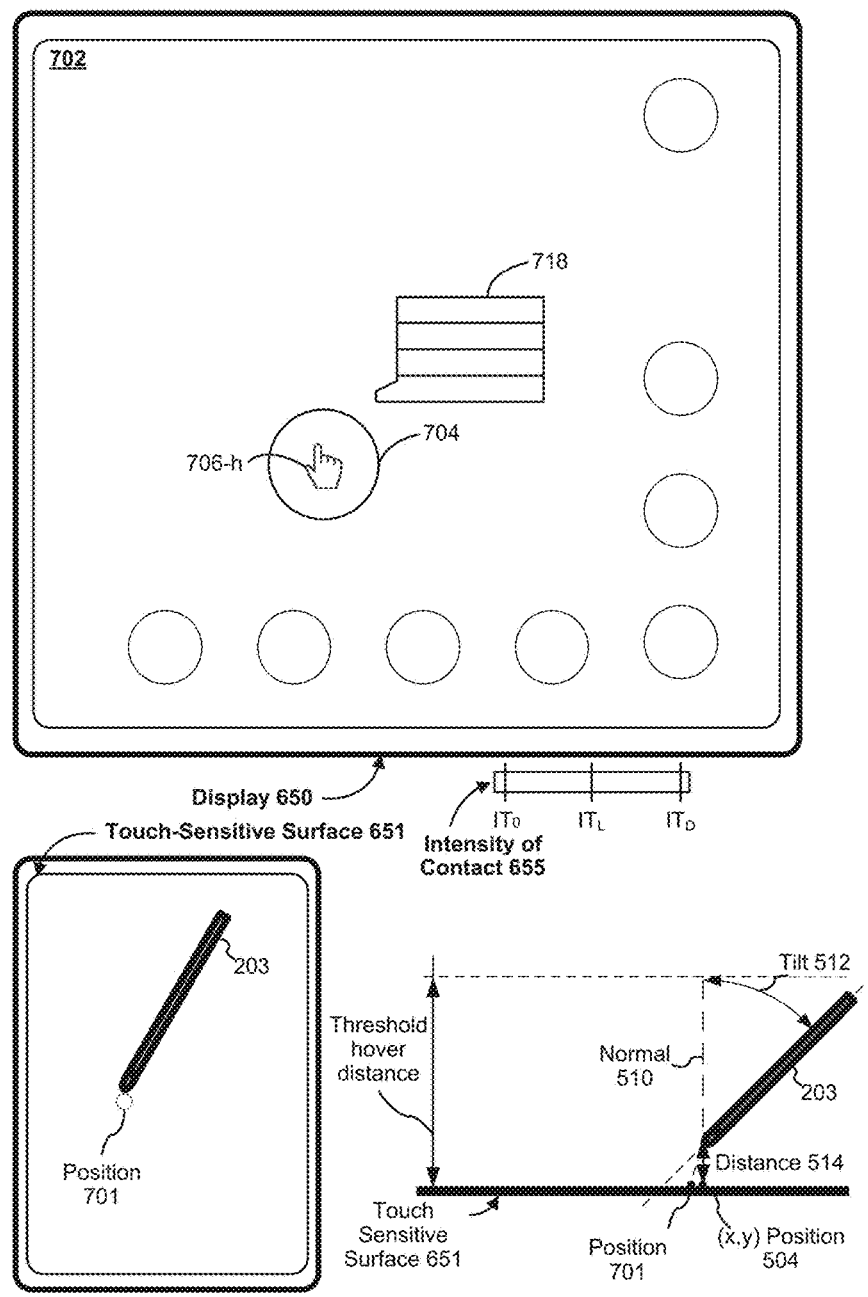
Figure 7A:
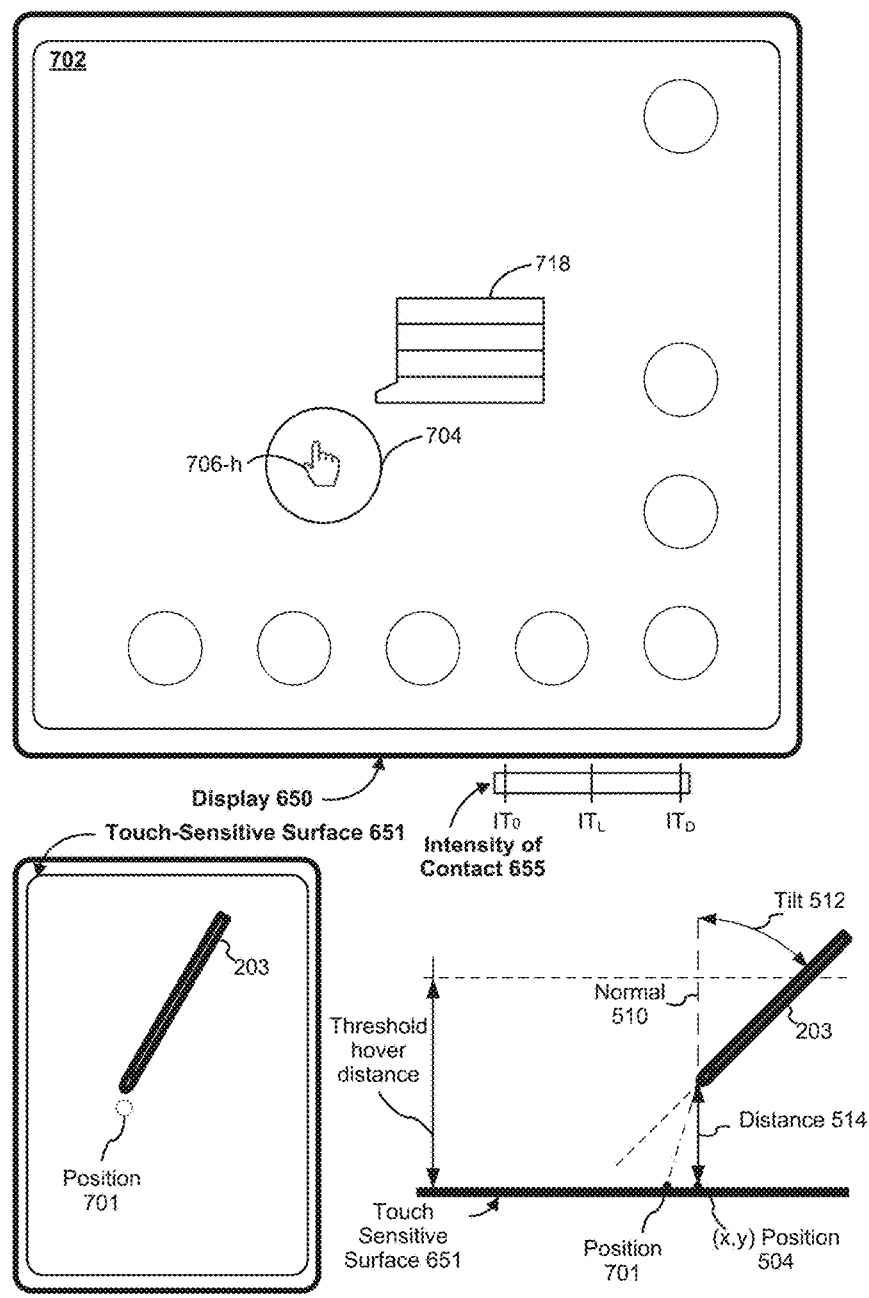
Figure 7A:
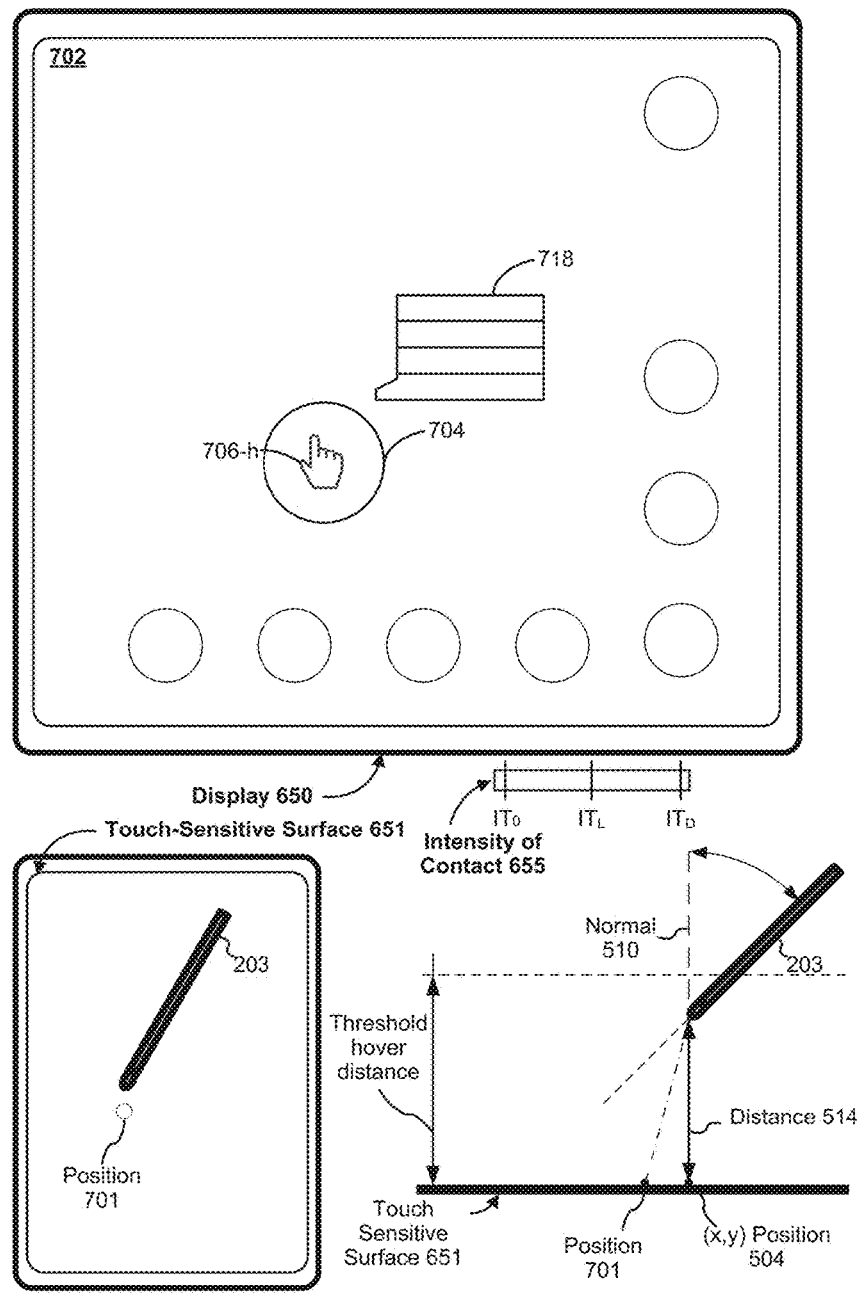
Figure 7A:
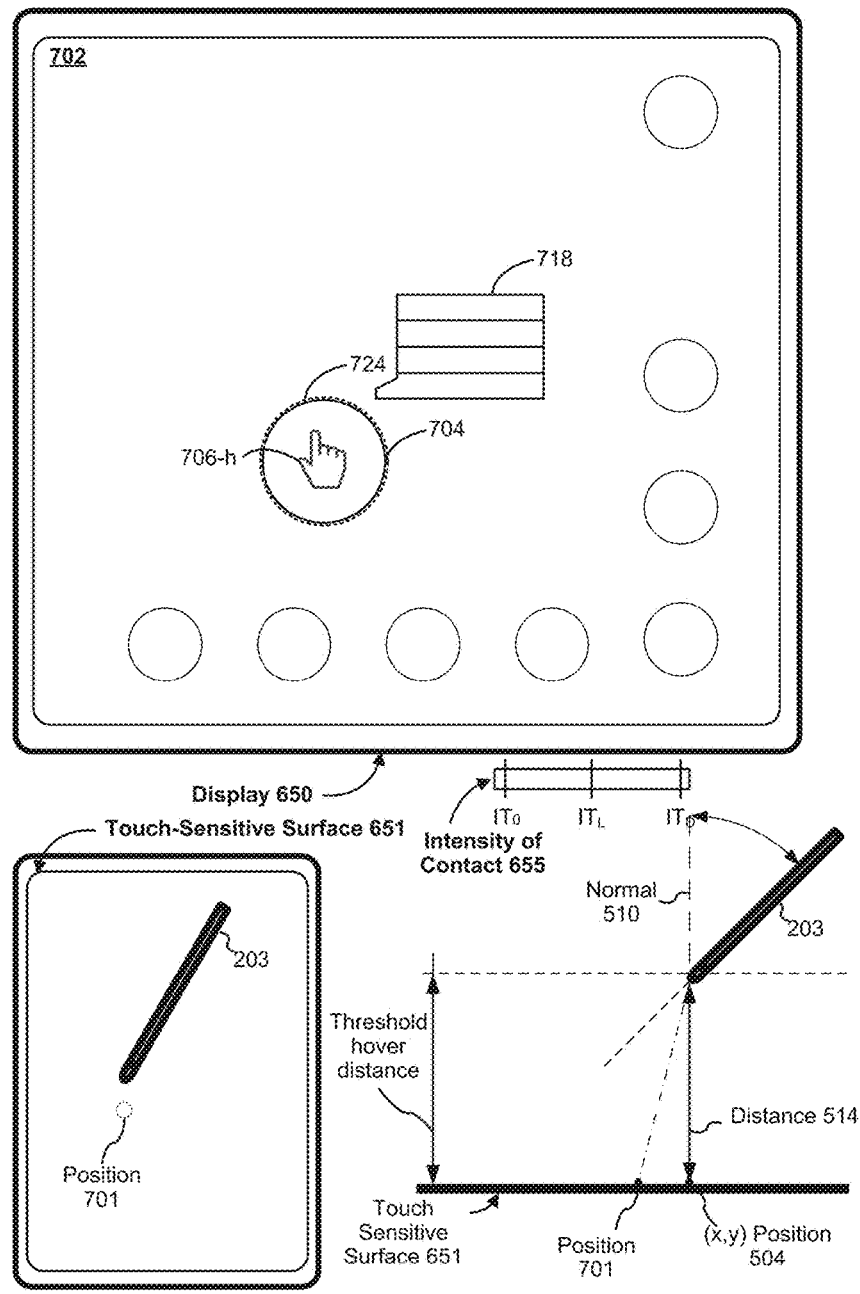
Figure 7A:
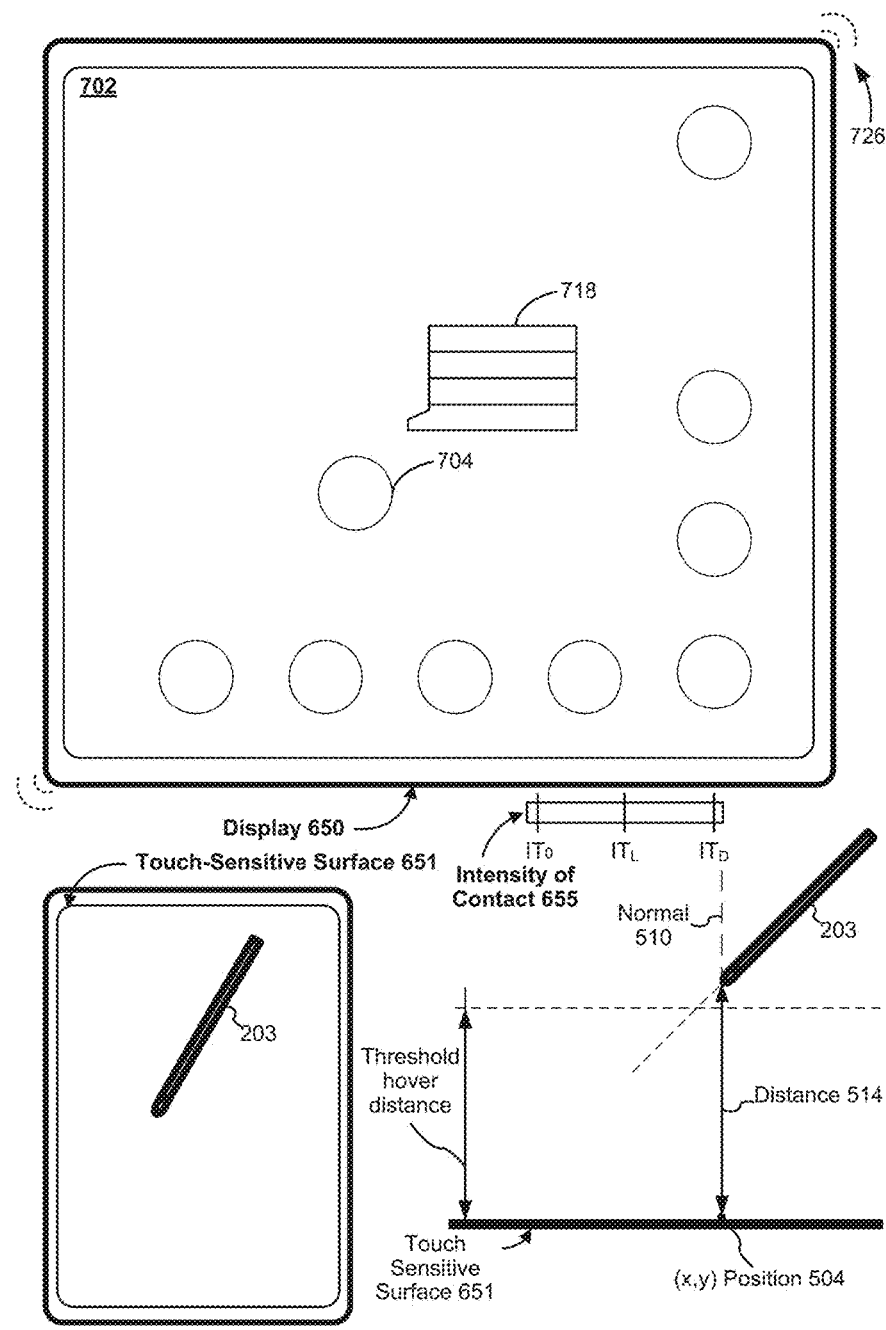
Figure 7A:
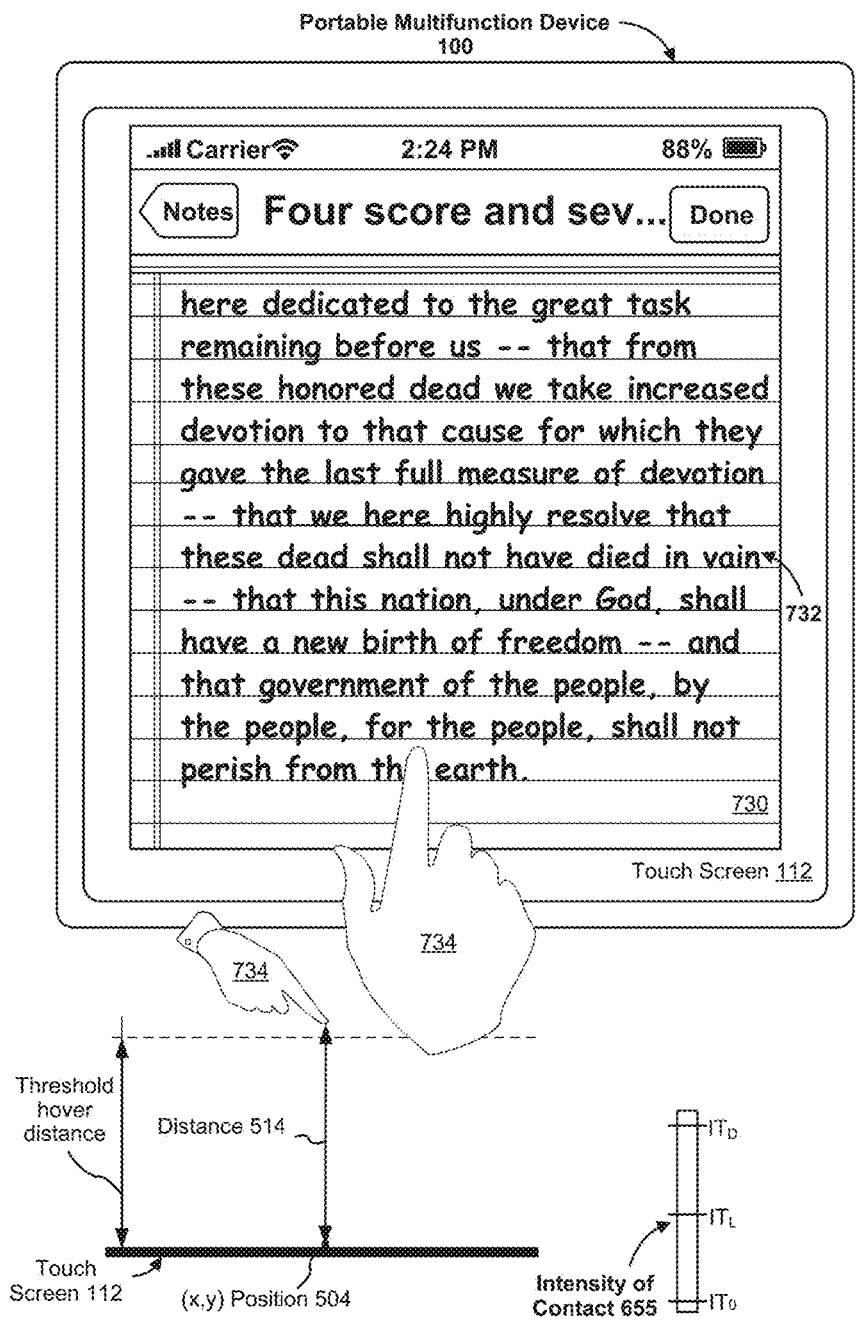
Figure 7A:
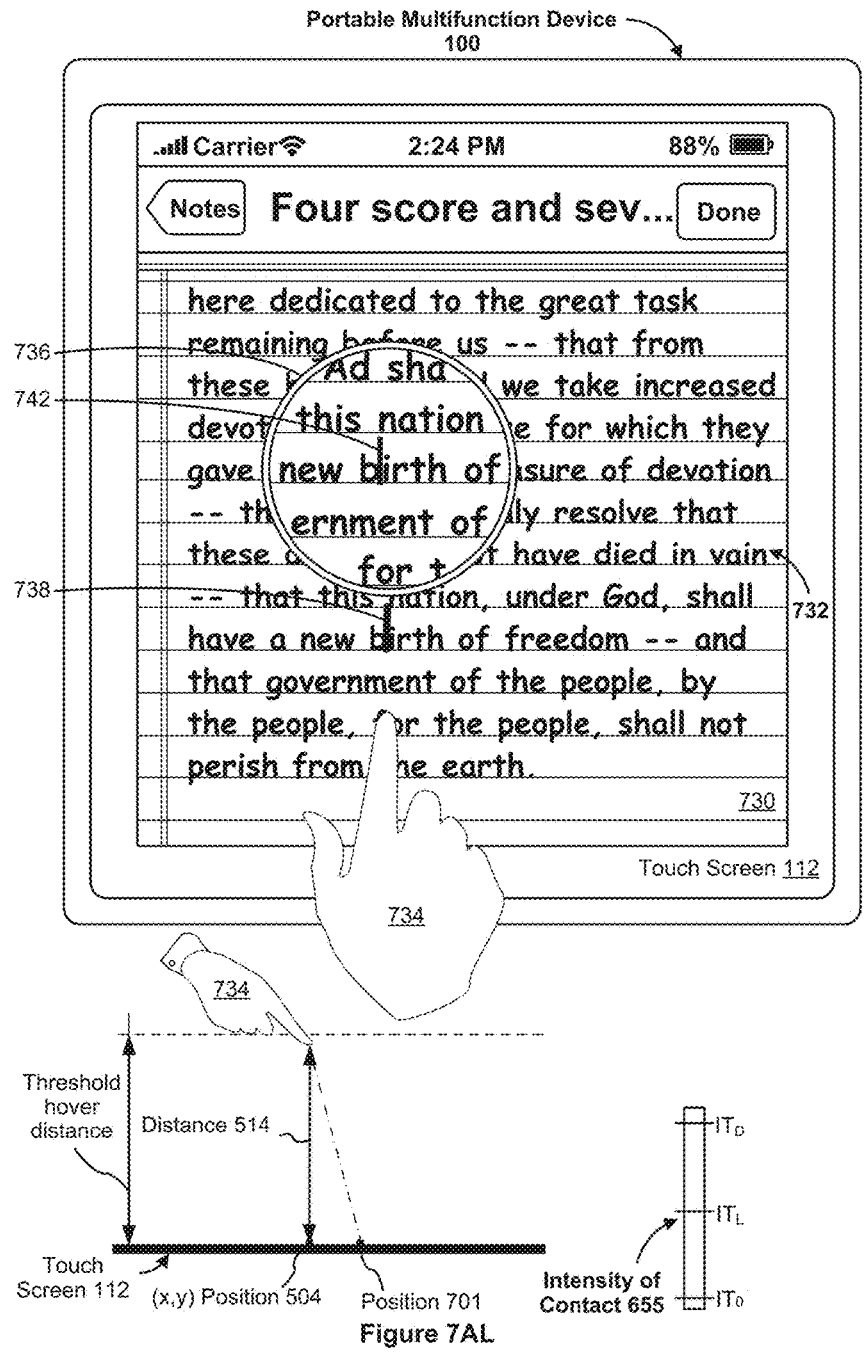
Figure 7A:
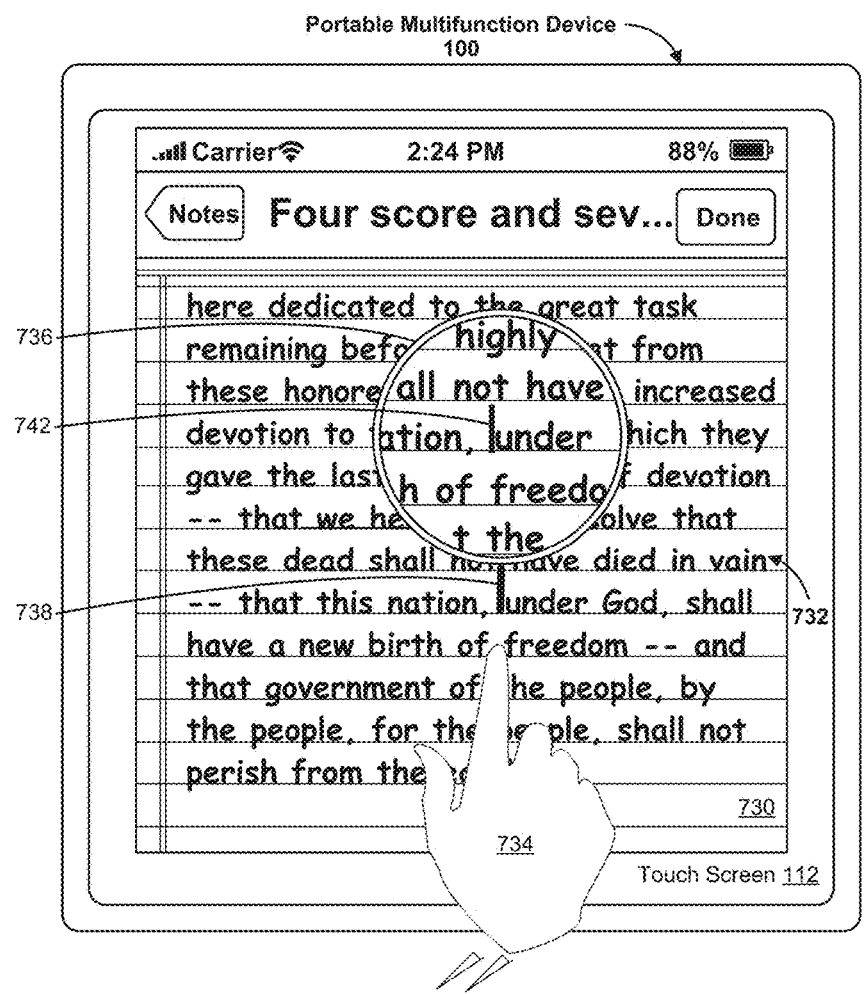
Figure 7A:
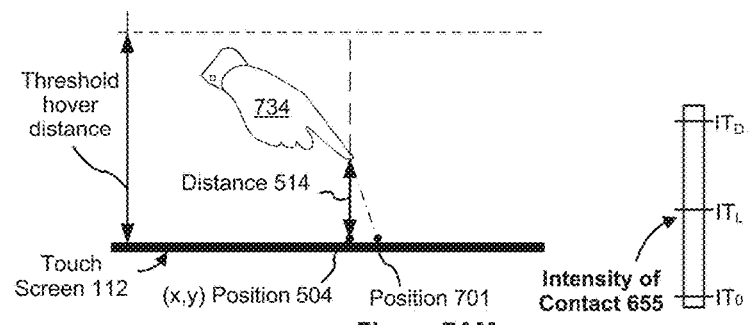
Figure 7A:
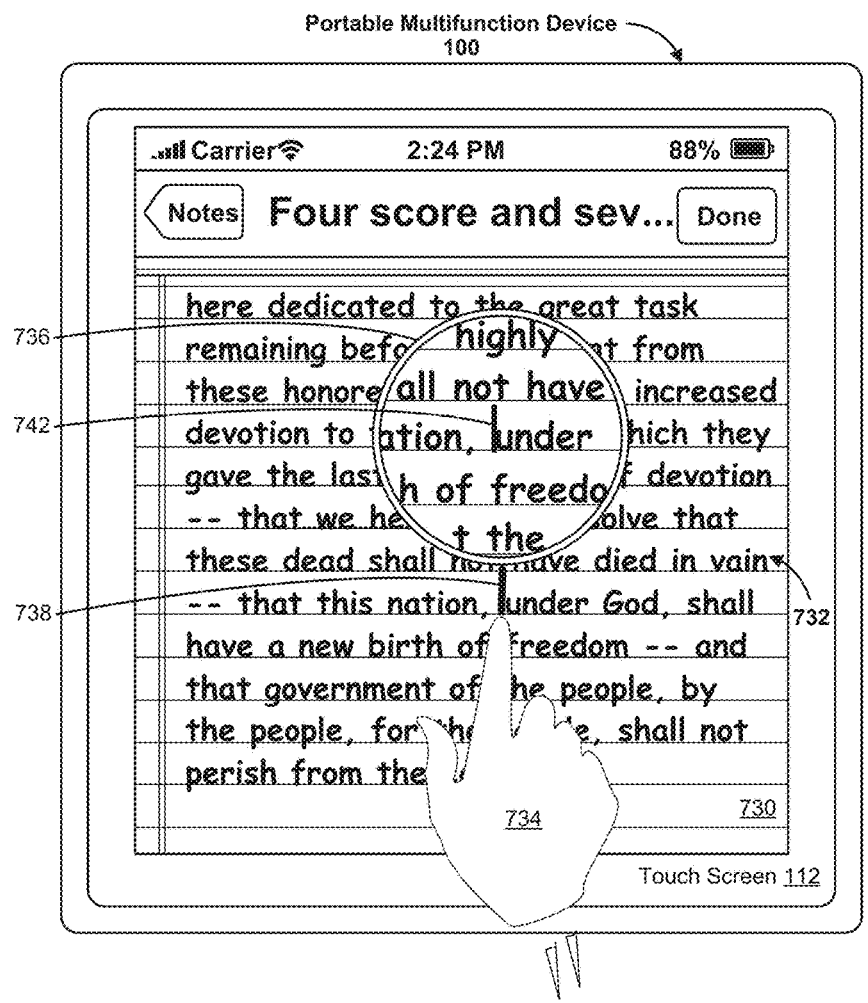
Figure 7A:
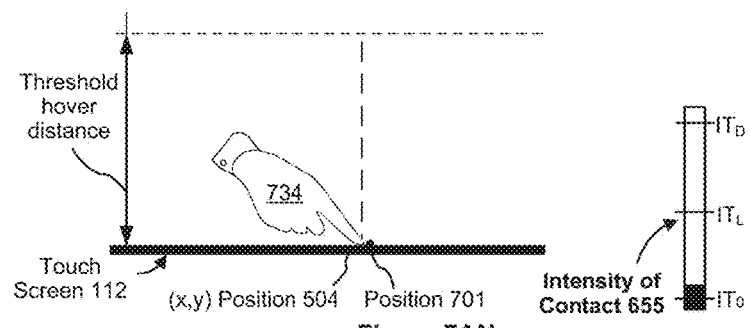
Figure 7A:
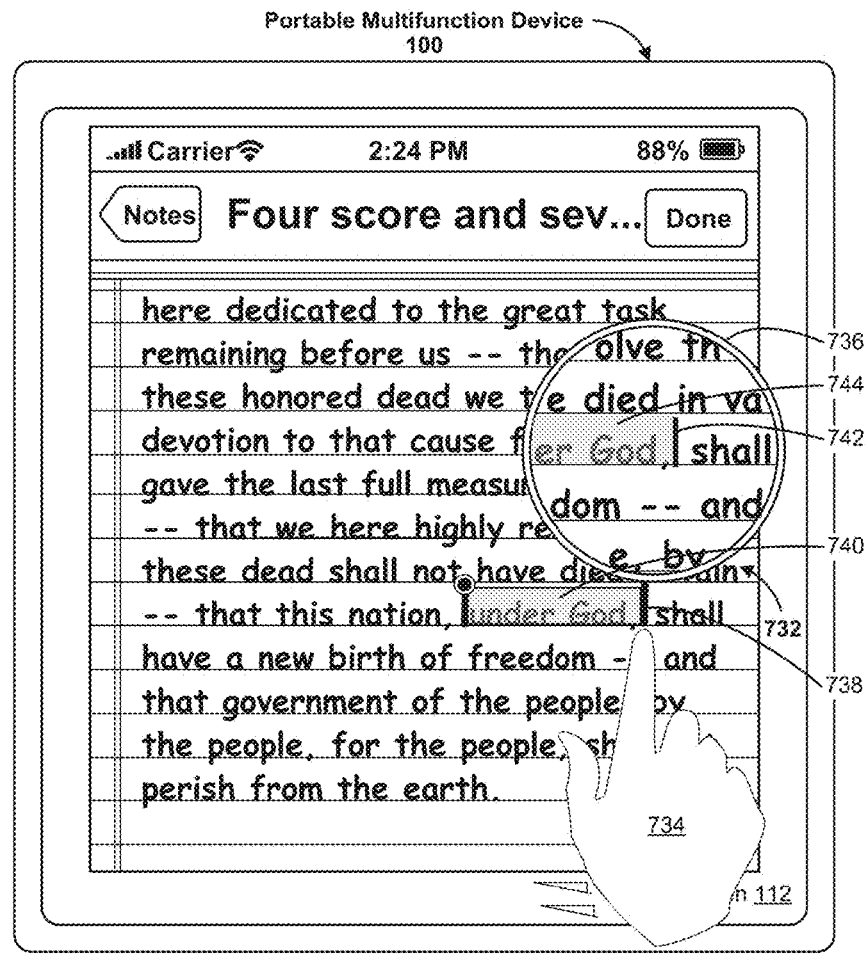
Figure 7A:
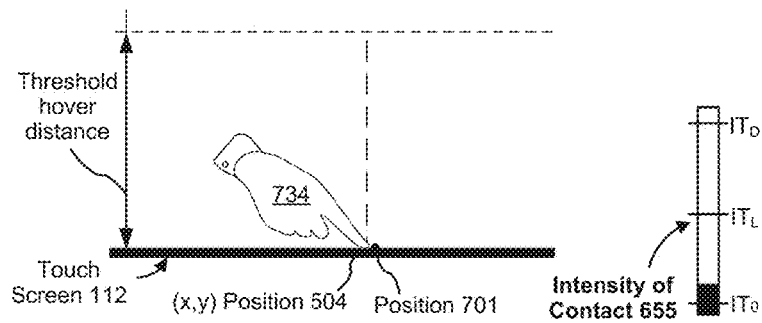
Figure 7A:
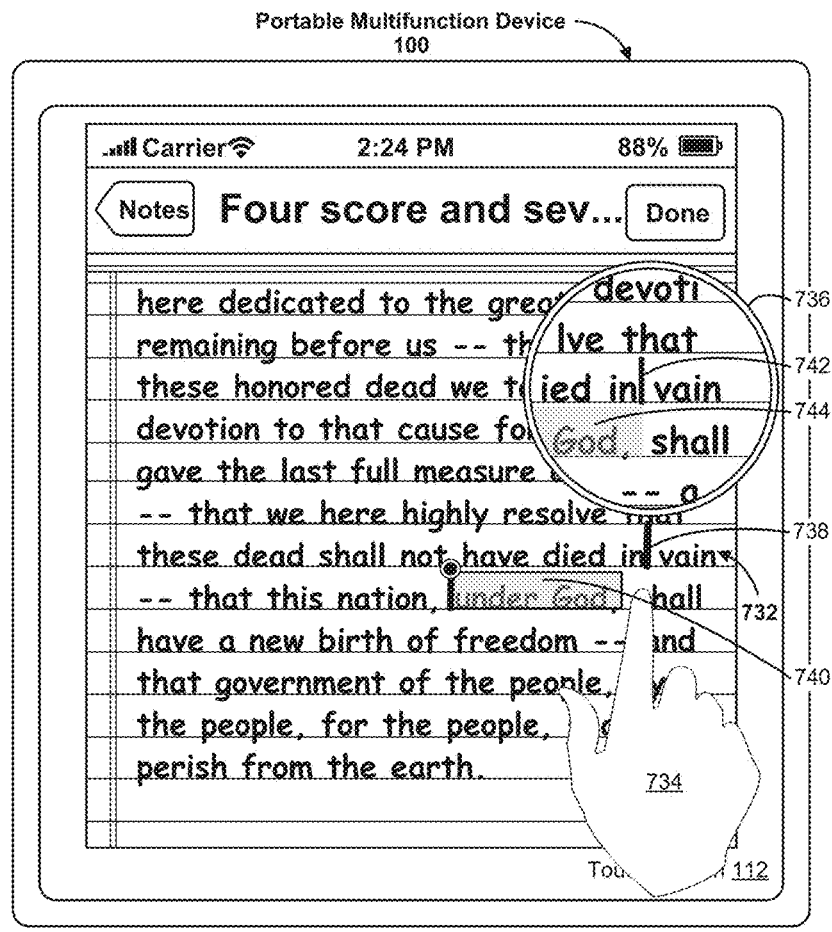
Figure 7A:
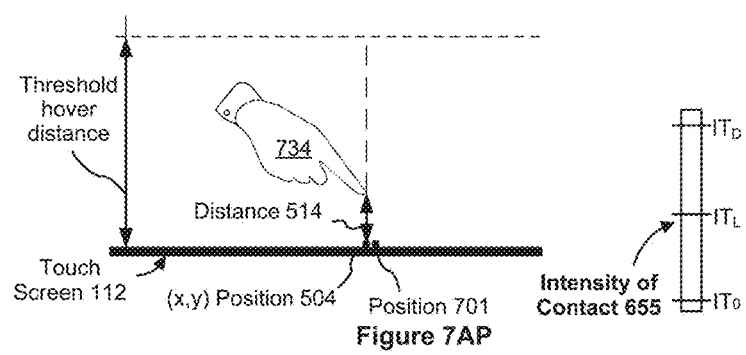
Figure 7A:
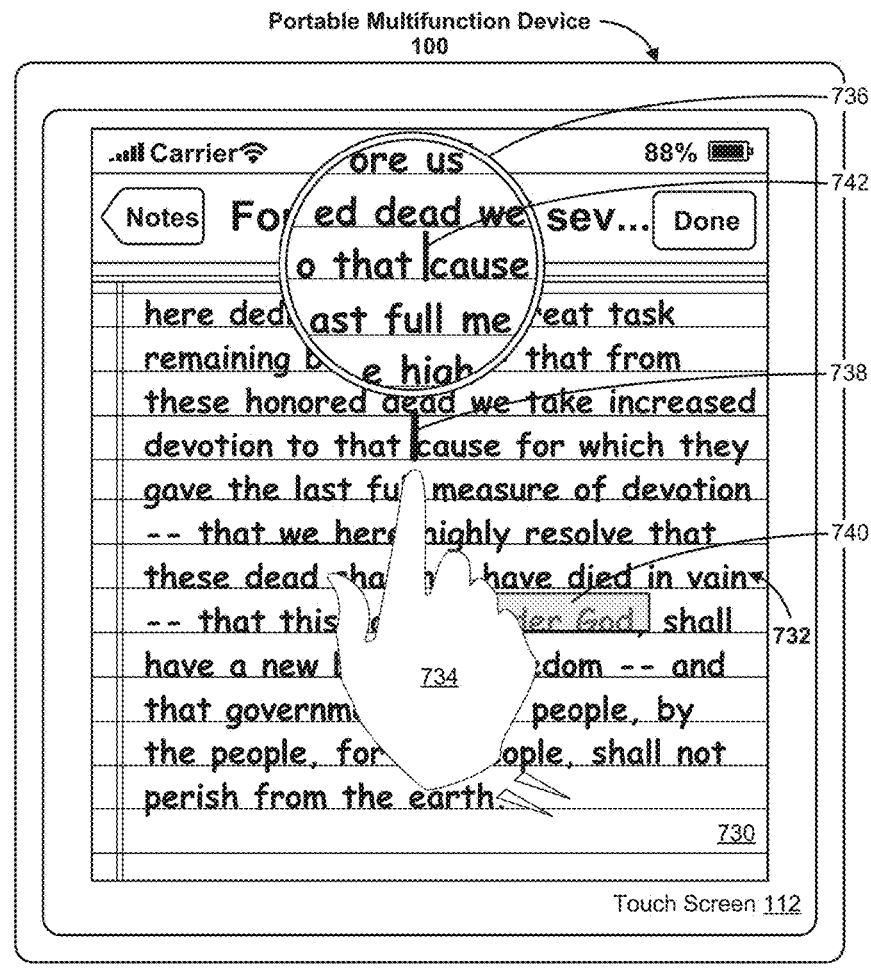
Figure 7A:
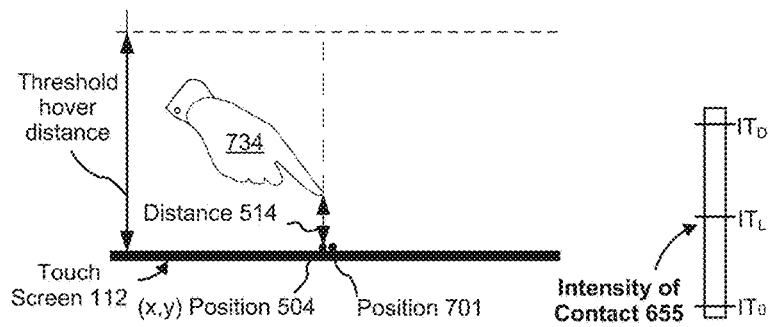
Figure 7A:
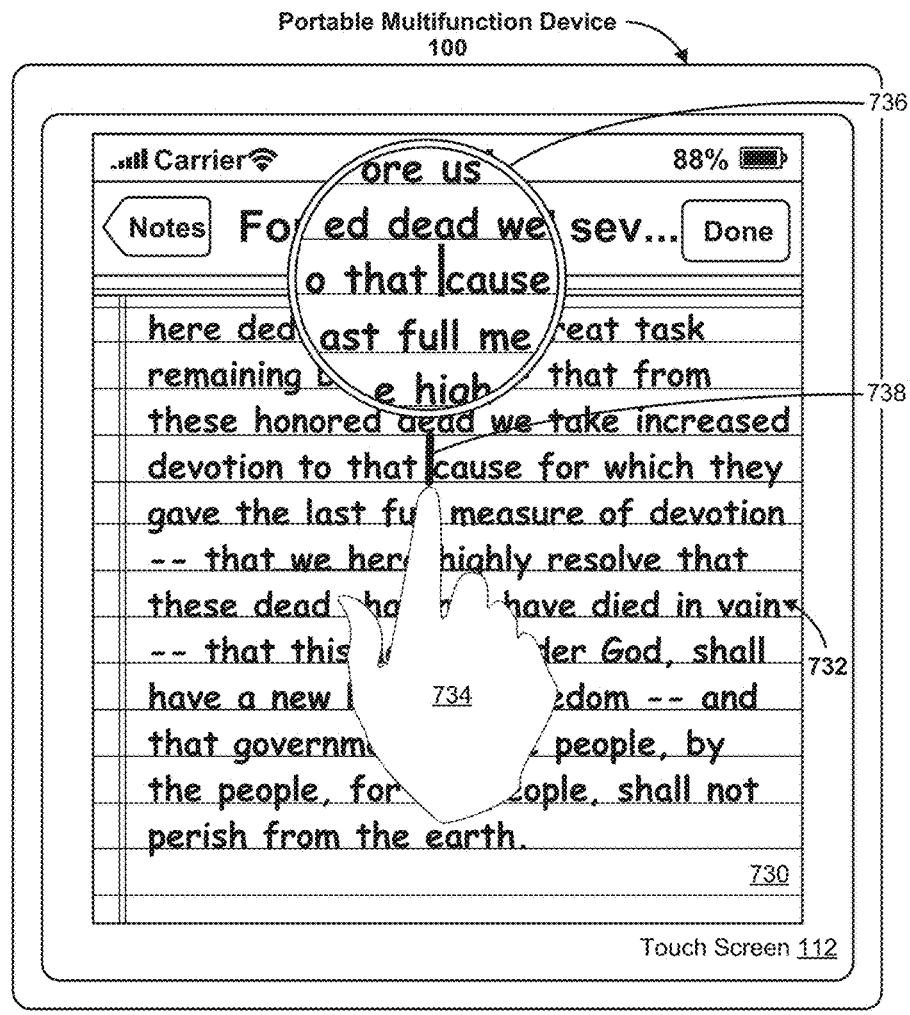
Figure 7A:
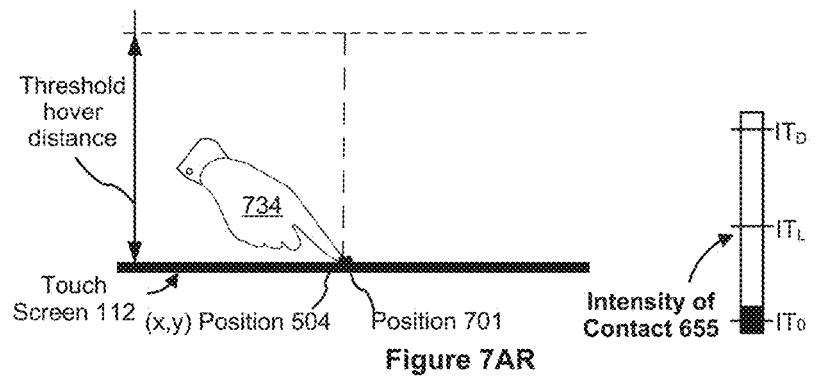
Figure 7A:
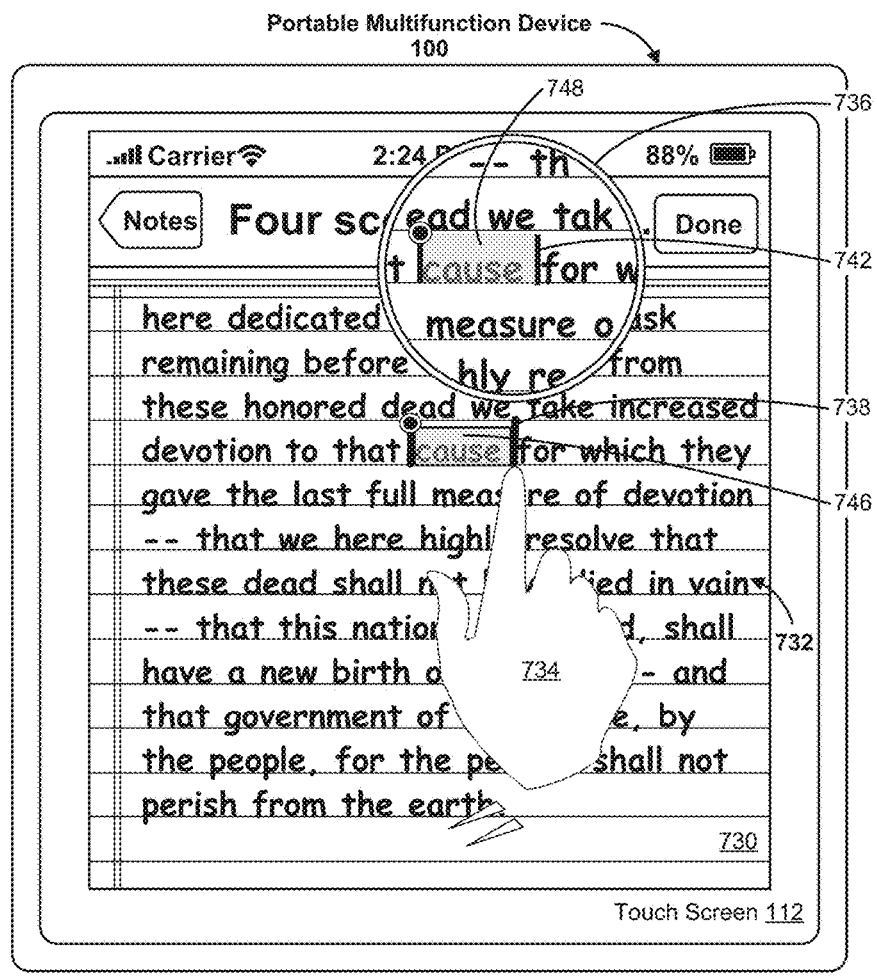
Figure 7A:
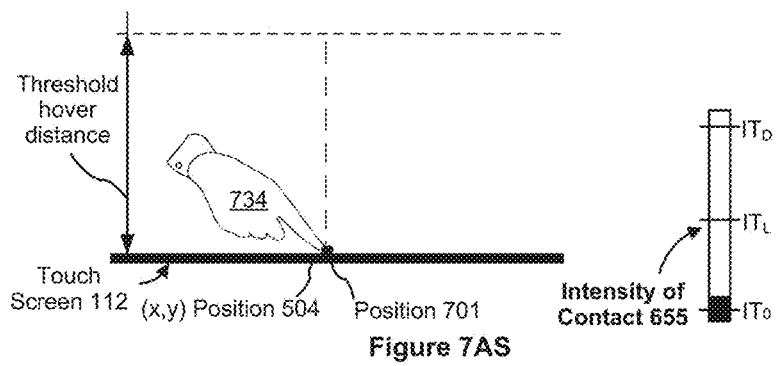
Figure 7A:
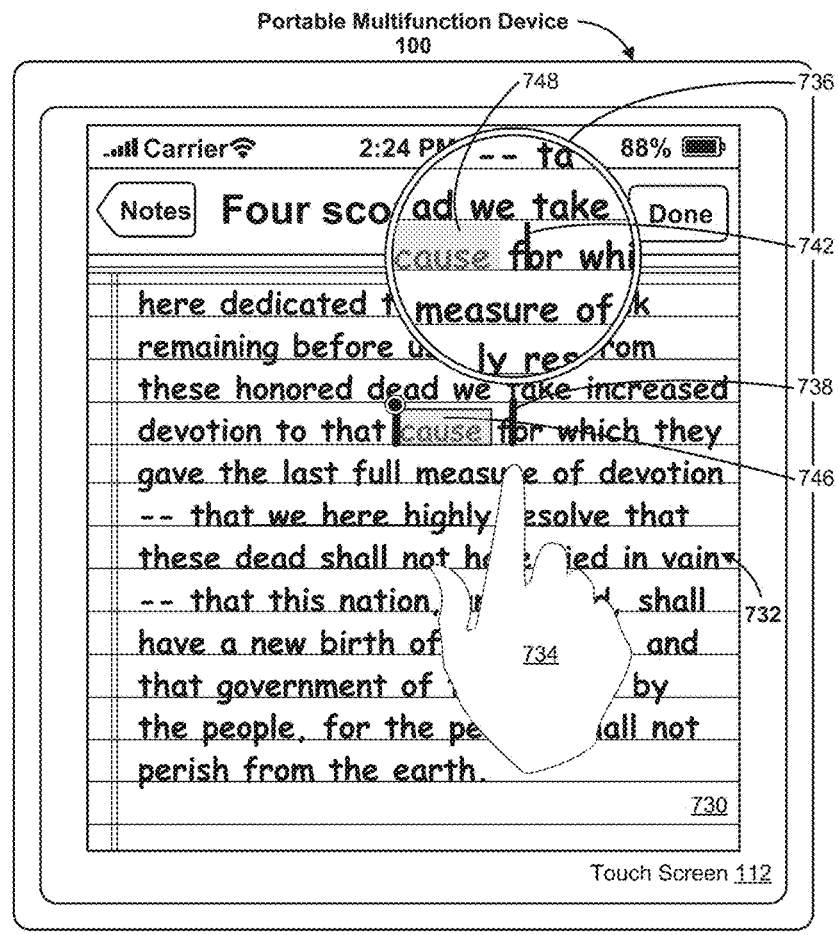
Figure 7A:
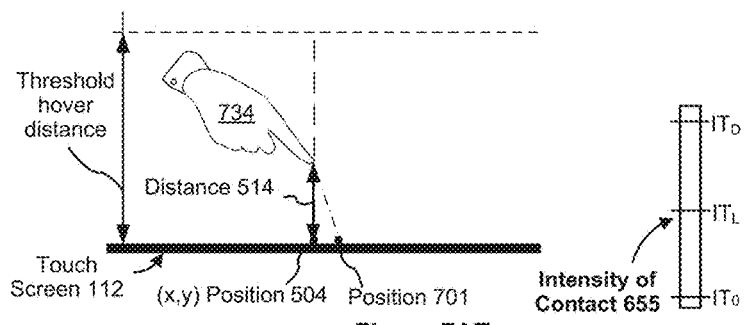
Figure 7A:
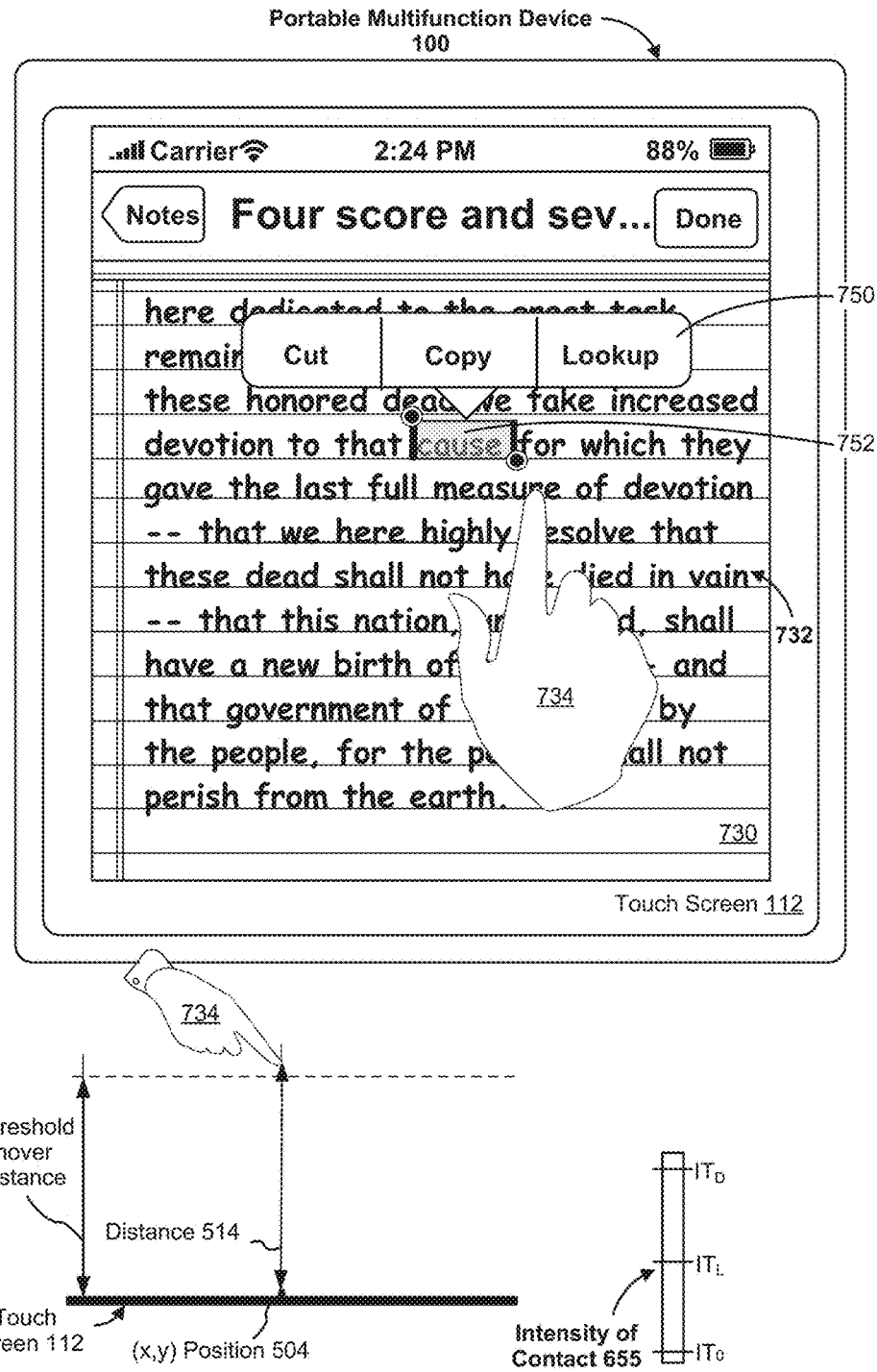

FIGS. 7Z-7AB illustrate that, while stylus 203 is in the contact with the touch-sensitive surface, device 100 dynamically changes the appearance of object 704 in accordance with the characteristic intensity of the contact (e.g., shown as intensity of contact 655 in the intensity meter) between stylus 203 and the touch-sensitive surface. For example, as shown in FIG. 7Z-7AB, the device increases the size of object 704 with increasing intensity of the contact between stylus 203 and the touch-sensitive surface. In some embodiments, when intensity of the contact between stylus 203 and the touch-sensitive surface increases, the device optionally increases the size of indicator 706 as well.

It can be seen that, the size of object 704 continuously increases when stylus 203 approaches touch-sensitive surface 651, makes contact with touch-sensitive surface 651, and presses against touch-sensitive surface 651 with increasing intensity. In other words, the increasing contact intensity in the contact state is treated as a continuation of the decreasing hover distance in the hover state, when changing the size of object 704 first in accordance with the decreasing hover distance in the hover state and then in accordance with the increasing contact intensity in the contact state. In contrast, the color or highlighting of object 704 goes through an abrupt transition when stylus 203 makes the initial contact with the touch-sensitive surface. In other words, the device indicates the transition from the hover state to the contact state by applying an abrupt change to the appearance of object 704.

FIG. 7AB also illustrates that, when intensity of the contact between stylus 203 and the touch-sensitive surface reaches a light press intensity threshold $IT_L$ (and the contact does not move for more than a threshold amount before the light press intensity threshold is met), device 100 performs an operation associated with object 704, such as displaying a menu 718 associated with object 704. In some embodiments, hint animations (e.g., visual changes to object 704 or user interface 702 (e.g., blurring and darkening of user interface 702 except for object 704)) are optionally displayed before intensity of the contact reaches the light press intensity threshold (e.g., after then intensity of the contact reaches a hint intensity threshold below the light press intensity threshold).

FIGS. 7AB-7AD illustrate that, while stylus 203 remains in contact with the touch-sensitive surface, stylus 203 gradually reduces the intensity of the contact with the touch-sensitive surface. While the intensity of the contact between stylus 203 and the touch-sensitive surface gradually decreases, the device gradually reduces the size of object 704 in accordance with the decreasing intensity of the contact between stylus 203 and the touch-sensitive surface. In some embodiments, the device also gradually reduces the size of indicator 706 with the decreasing intensity of the contact between stylus 203 and the touch-sensitive surface. In addition, in some embodiments, menu 718 remains to be displayed when intensity of the contact between stylus 203 and the touch-sensitive surface gradually decreases.

FIG. 7AE illustrates that, when stylus 203 is about to lift-off from the touch-sensitive surface, and the intensity of contact between stylus 203 and the touch-sensitive surface has decreased to the contact detection threshold $IT_0$, the device determines that stylus 203 is about to transition from the contact state into the hover state again. When stylus 203 transitions from the contact state to the hover state, the size of object 704 is the same as the size of object 704 when stylus 203 transitioned from the hover state to the contact state right after making the initial contact with the touch-sensitive surface.

FIGS. 7AE-7AH illustrate that, after stylus 203 makes the transition from the contact state back to the hover state again, the device increases the size of object 704 with increasing hover distance of stylus 203. The size of indicator 706 increases with increasing hover distance of stylus 203. The changes in appearance of indicator after lift-off of stylus 203 from the touch-sensitive surface is consistent with the change in appearance of indicator 706 before stylus 203 made the initial contact with the touch-sensitive surface. In other words, the size of indicator 706 increases with increasing hover distance of stylus 203 regardless of whether it is before or after stylus 203 made the initial contact with the touch-sensitive surface. In contrast to the behavior of indicator 706, the changes in size of object 704 in accordance with hover distance after the lift-off of stylus 203 from the touch-sensitive surface is opposite to the changes in size of object 704 in accordance with hover distance before stylus 203 made the initial contact with the touch-sensitive surface. In other words, the size of object 704 increases with increasing hover distance of stylus 203 after lift-off of stylus 203 from the touch-sensitive surface (e.g., as shown in FIGS. 7AF-7AH), while the size of object 704 increases with decreasing hover distance of stylus 203 before stylus 203 made the initial contact with the touch-sensitive surface (e.g., as shown in FIGS. 7V-7X).

FIG. 7AI illustrates that, when stylus 203 is within a threshold hover distance (e.g., 10% of the threshold hover distance) away from reaching the edge of the hover range, the device determines that stylus 203 is about the exit the hover range if stylus 203 is not brought closer to the touch-sensitive surface immediately (e.g., within 300 ms). When device 100 detects that stylus 203 is about to exit the hover range, device 100 provides visual feedback (e.g., flickering edge 724 of object 704) to indicate that stylus 203 is about to exit the hover range.

FIG. 7AJ illustrate that, when stylus 203 exits the hover range, indicator 706 is no longer displayed, and object 704 detaches from indicator 706 and falls to the surface of user interface 702. The size of object 704 also snaps back to its original state. In some embodiments, device 100 generates a tactile output (e.g., tactile output 726) in conjunction with object 704 snaps back into its original state.

FIG. 7AK-7AU illustrates a process in which an input object (e.g., a finger) moves and positions a cursor within selectable text (e.g., editable or non-editable text) while the input object moves laterally in the hover state, and in which the input object selects text (e.g., expand text selection from the current cursor position) while the input object moves laterally in the contact state.

In FIG. 7AK, a user interface (e.g., user interface 730) is displayed on touch-screen 112. User interface 730 includes selectable text 732. When the input object, finger or hand 734, is above the threshold hover distance away from touch-screen 112 (e.g., distance 514 is greater than the threshold hover distance), no indicator corresponding to the input object is displayed in user interface 730.

FIG. 7AL illustrates that, when the input object (e.g., finger or hand 734) is within the threshold hover distance from touch-screen 112, an indicator (e.g., cursor 738) is displayed within selectable text 732 at position 701 on touch-screen 112 (e.g., at a location that corresponds to (x,y) position 504 on touch-screen 112). Position 701 is offset from the lateral position, (x,y) position 504, of finger 734, and the amount of offset is optionally determined based on the hover distance (e.g., represented by distance 514) and/or a positional state (e.g., tilt) of finger 734. In some embodiments, in addition to cursor 738, device 100 also displays a magnifying loupe (e.g., loupe 736) over selectable text 732. Magnifying loupe 736 is displayed above cursor 734 in user interface 730, and moves with cursor 732 in user interface 730. Within magnifying loupe 736, magnified version of a portion of selectable text 732 is displayed, and a copy 742 of cursor 738 is also displayed at a position within the magnified text according to the position of cursor 738 within editable text 732.

FIG. 7AM illustrates that, as finger 734 moves laterally while remaining within the hover range, cursor 738 moves within selectable text 732 in accordance with the lateral movement of finger 734. Magnifying loupe 736 moves with cursor 738 and shows an updated portion of text 732 and updated position of cursor 738. FIG. 7AM also illustrate that, the hover distance does not have to be maintained at a constant value during the movement of finger 734 in order to move cursor 738 within selectable text 732.

FIG. 7AN illustrates that, as finger 734 moves laterally to another position on touch-screen 112, cursor 738 is moved to a new position within selectable text 732. Touch-down of finger 734 is detected on touch-screen 112 (e.g., intensity of contact between finger 734 and touch-screen 112 is above the contact detection threshold $IT_0$). Before finger 734 moves laterally while in contact with touch-screen 112, cursor 732 is displayed at its current location within selectable text 732. Magnifying loupe 742 is displayed above cursor 732. Magnified version of the text surrounding cursor 732 is displayed within magnifying loupe 736, and position of cursor 732 within the selectable text is represented by copy 742 of cursor 736 within the magnifying loupe.

FIG. 7AO illustrates that, after finger 734 makes contact with touch-screen, finger 734 moves laterally while remaining in contact with touch-screen 112. The movement of the contact causes cursor 738 to move within selectable text 732, and movement of cursor 738 from its previous location (e.g., the cursor location at the time of the touch-down of finger 734 on touch-screen 112) to its current location causes a portion of text between the cursor's previous location and current location to be selected (e.g., as indicated by selection 740). As movement of cursor 738 continues with the movement of contact between finger 734 and touch-screen 112, selection 740 is expanded or contracted in accordance with the movement of cursor 738. As shown in FIG. 7AO, selection 740 is also represented (e.g., as selection 744) within magnifying loupe 736.

FIG. 7AP illustrates that, after moving the contact between finger 734 and touch-screen 112 and adjusting the ending boundary of selection 740 by the moving cursor 738, lift-off of finger 734 is detected. After lift-off from touch-screen 112, finger 734 is hovering above touch-screen 112 again. While finger 734 hovers above touch-screen 112, cursor 738 detaches from selection 740, and moves within selectable text 732 with the lateral movement of finger 734 while finger 734 remains within the hover range above touch-screen 112. As shown in FIG. 7AP, in some embodiments, selection 740 is maintained in text 732 after lift-off of contact between finger 734 and touch-screen 112 is detected. Magnifying loupe continues to move with cursor 732, and displays a magnified version of the text surrounding cursor 738.

FIG. 7AQ illustrates that, cursor 738 has moved to a new location within text 732 in accordance with lateral movement of finger 734 while finger 734 is within the hover range above touch-screen 112. Magnifying loupe 736 is also moved with the moving cursor 736 and displays a magnified version of the text surrounding cursor 738. Selection 740 is still maintained at its original location.

FIGS. 7AR-7AS illustrate that, when touch-down of finger 734 is detected again at a new location, selection 740 is canceled (selection 740 is no longer shown in FIG. 7AR). Cursor 738 is displayed at the new location (e.g., position 701) that corresponds to the touch-down location (e.g., (x,y) position 504) of finger 734 on touch-screen 112, as shown in FIG. 7AR. In FIG. 7AS, lateral movement of finger 734 across touch-screen 112 is detected, and movement of cursor 738 from its previous location (e.g., location of cursor 738 at the time of the second touch-down of finger 734 in FIG. 7AR) to its current location causes a portion of text between the previous location and the current location of cursor 738 to be selected (e.g., as shown by selection 746). Magnifying loupe 736 moves with cursor 738 and shows the current selection of text (e.g., represented by magnified copy 748 of selection 746).

FIG. 7AT shows that, lift-off of finger 734 is detected, and cursor 738 is detached from selection 746 in response to the lift-off of finger 734 from touch-screen 112. Selection 746 is maintained while cursor 738 moves away from selection 746 in accordance with movement of finger 734.

FIG. 7AU illustrates that, when finger 734 is lifted out of the hover range (e.g., beyond the threshold hover distance above touch-screen 112), magnifying loupe 736 is replaced with menu 750 (e.g., a "cut/copy/lookup" menu) and selection 746 changes appearance (e.g., replaced with selection object 752 with adjustable boundaries). The selection object 752 is optionally moved by a contact (e.g., another contact by finger 734) as a whole to another location, or resized by a contact (e.g., another contact by finger 734) the drags the adjustable boundaries of selection object 752. In some embodiments, when selection object 752 is displayed, device 100 optionally does not display cursor 738 when finger 734 re-enters the hover range. In some embodiments, a tap input by a contact (e.g., another contact by finger 734) dismisses menu 750 and cancels selection represented by selection object 752, and a subsequent hover input, when detected, causes display and placement of cursor 738 again in the manner illustrated in FIGS. 7AK-7AT.

Figure 8B:
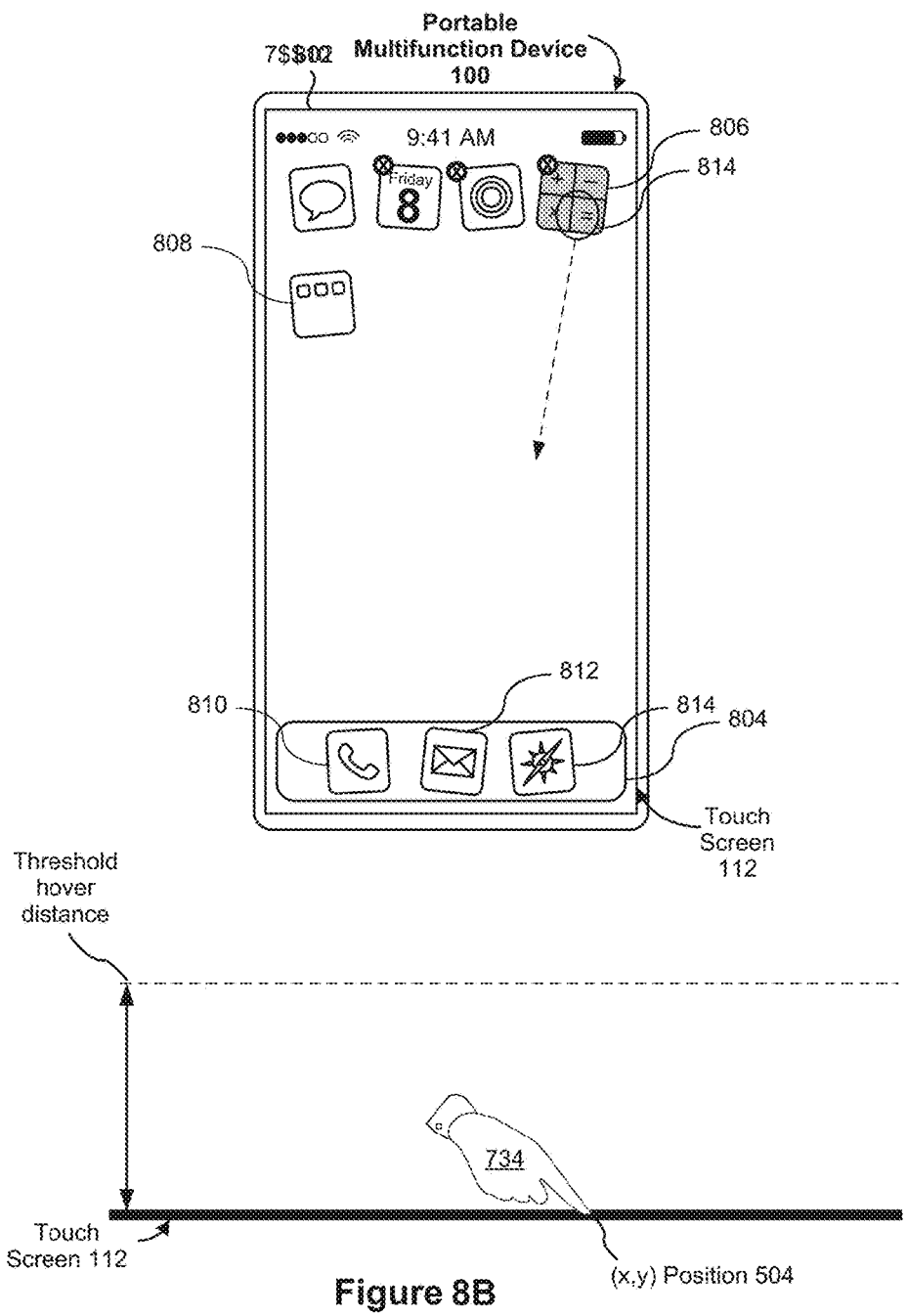
FIGS. 8A-8V illustrate exemplary user interfaces for displaying a preview of a move operation by a hover-move input, and canceling or confirm the move operation in accordance with a determination of whether the input object has made contact with the touch-sensitive surface before being lifted out of the hover proximity range, in accordance with some embodiments.
Figure 8C:
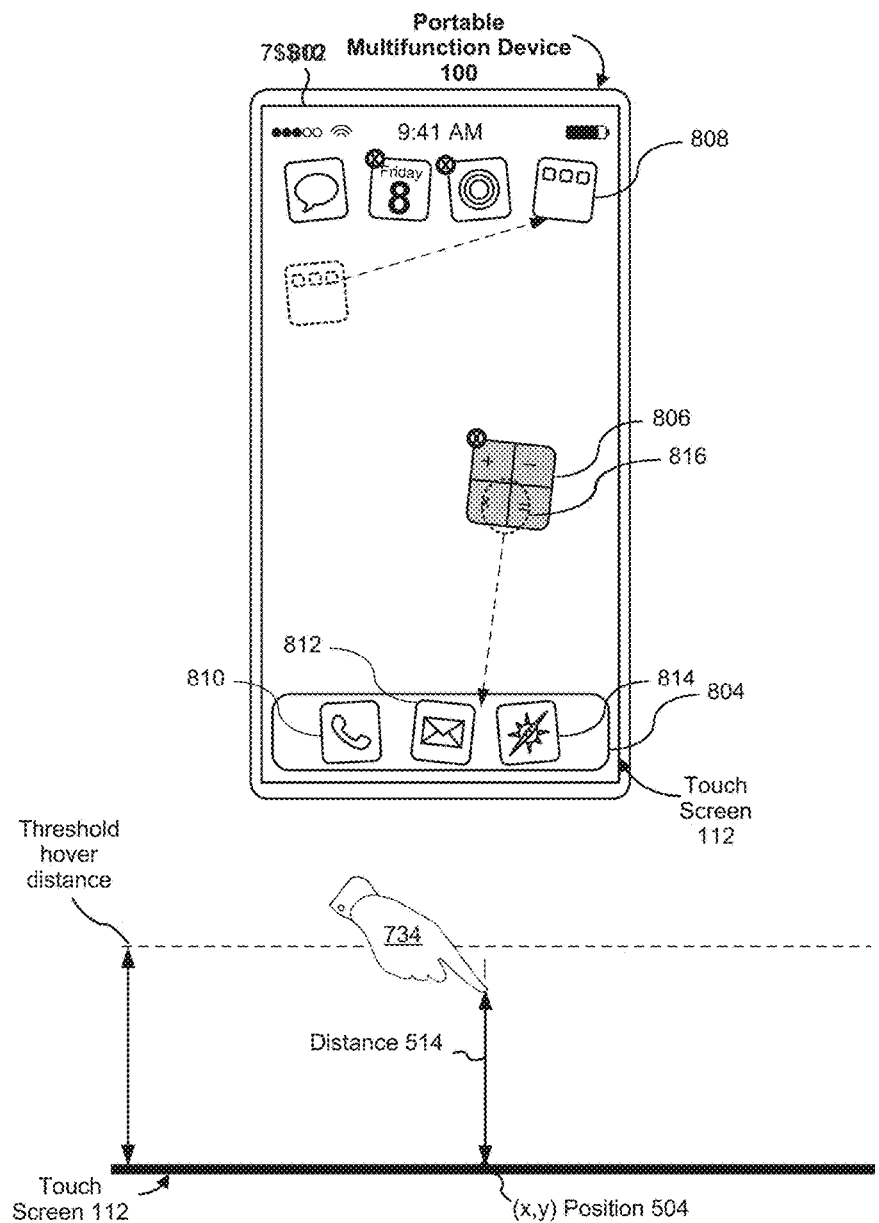
Figure 8D:
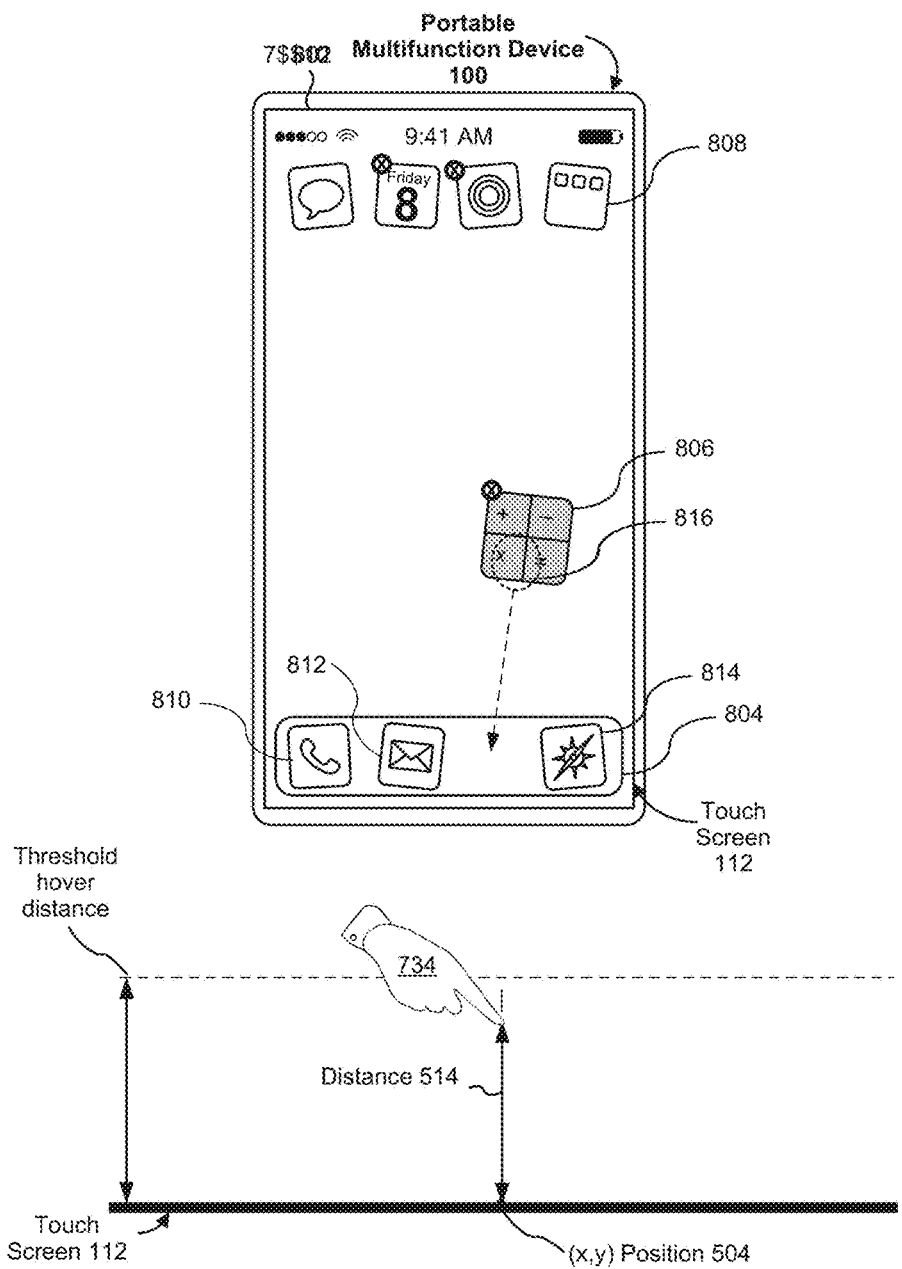
Figure 8E:
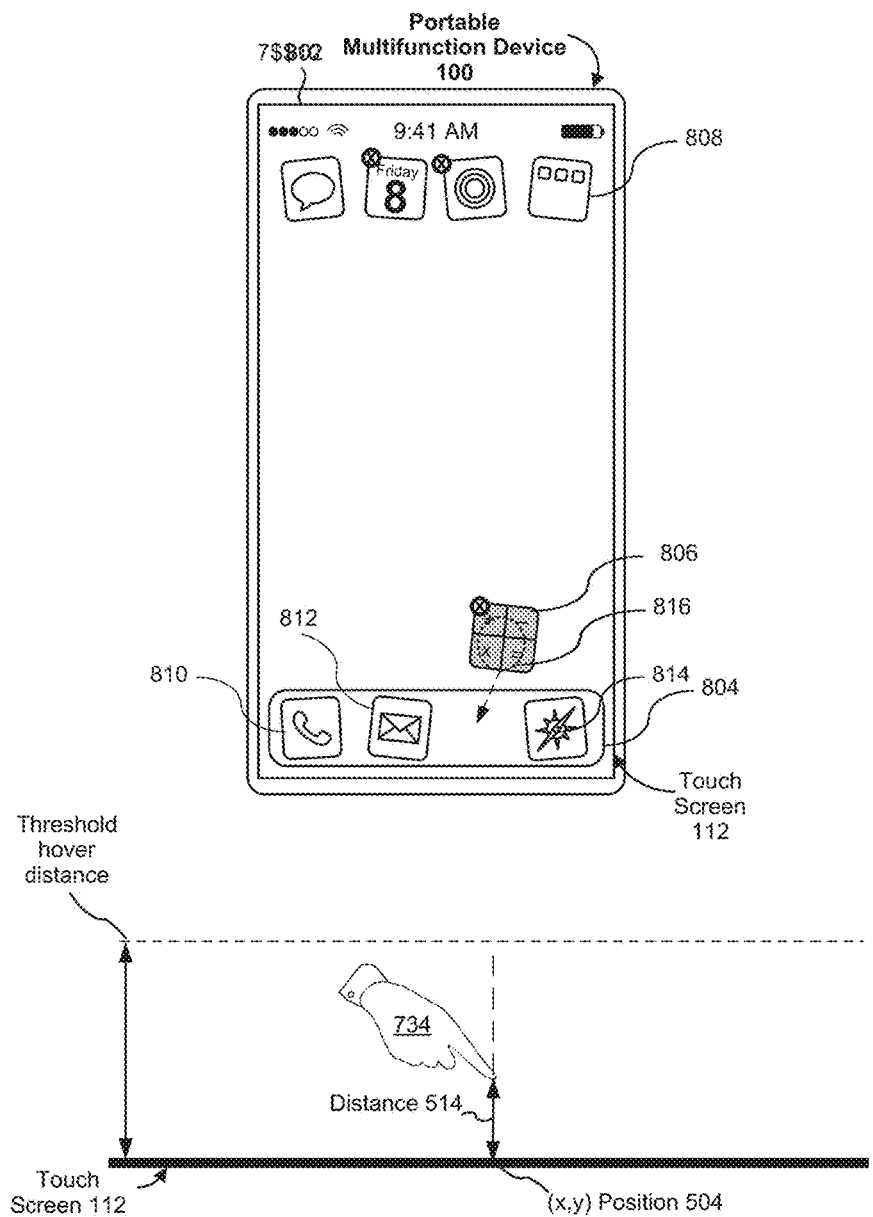
Figure 8G:
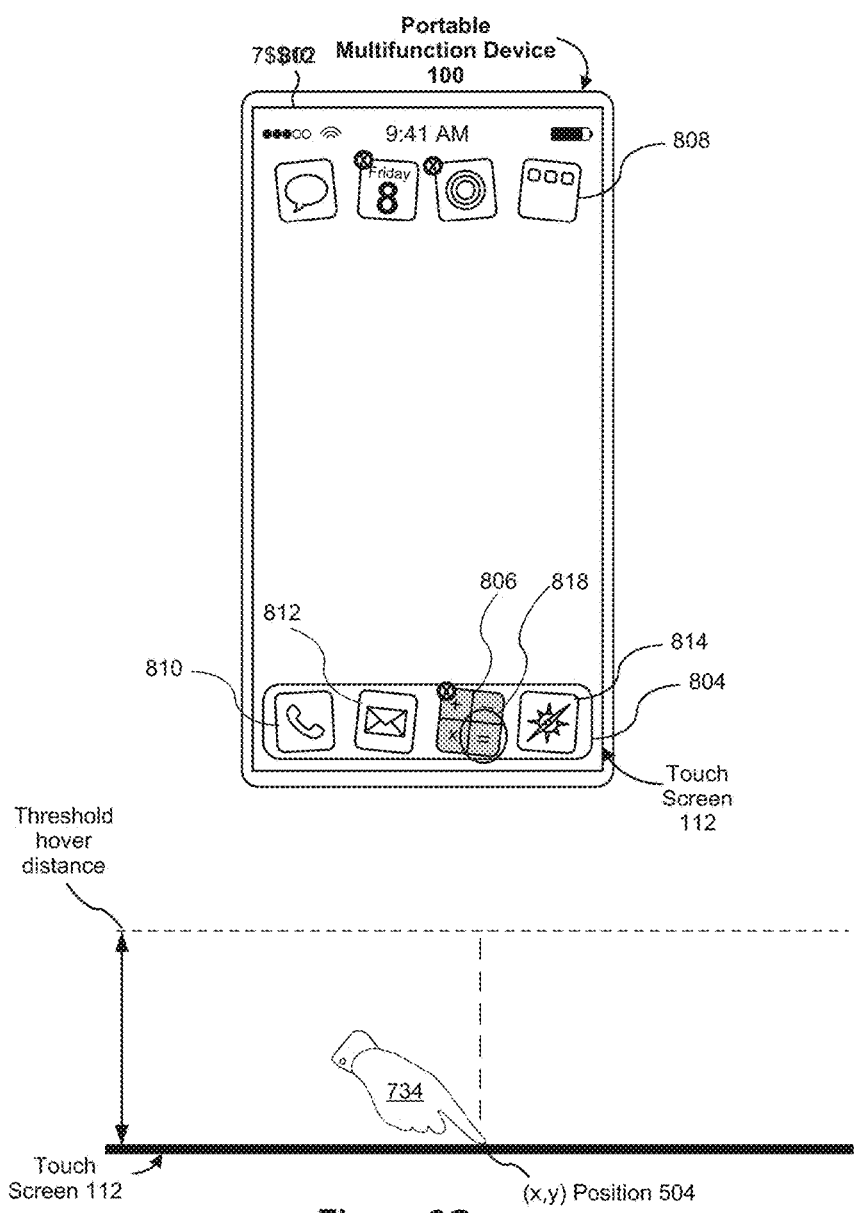
Figure 8H:
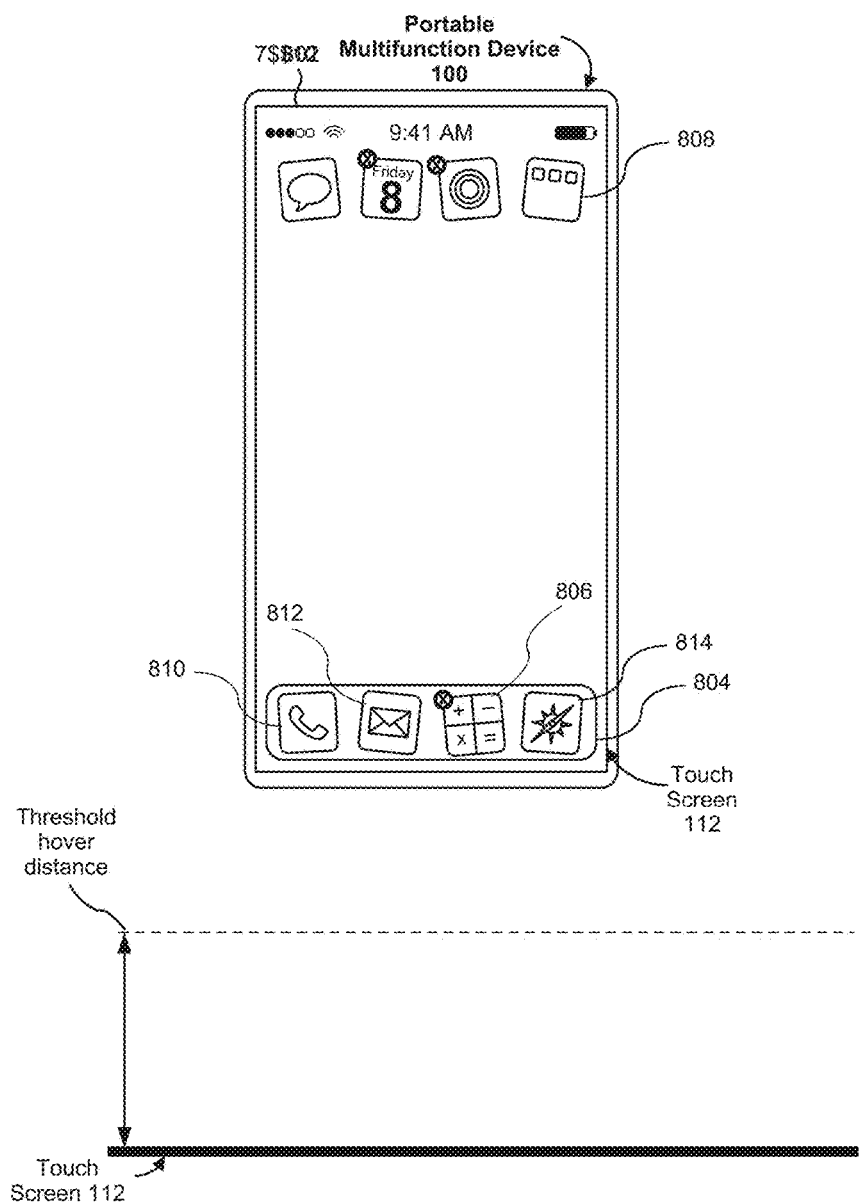
Figure 8I:
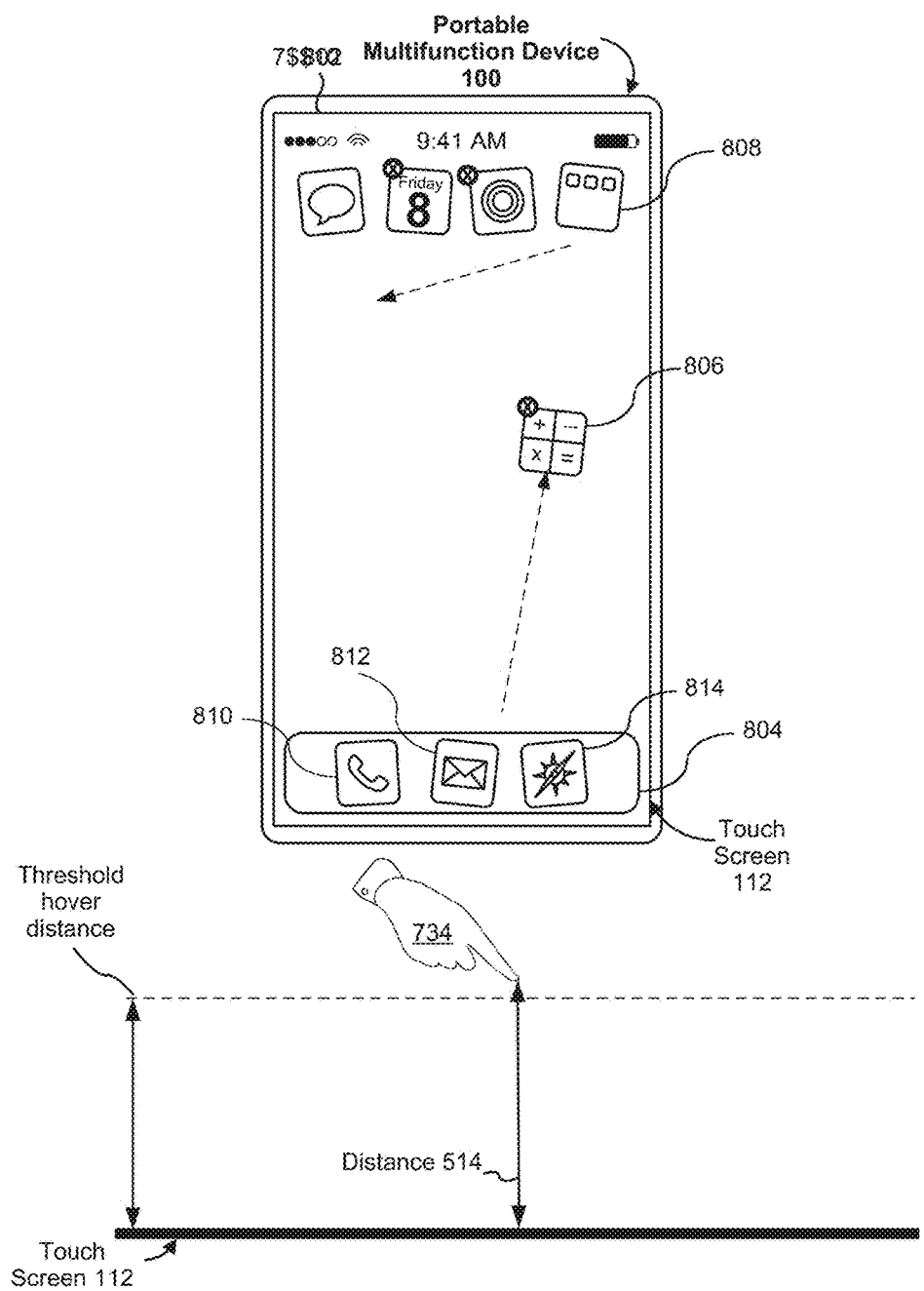
Figure 8J:
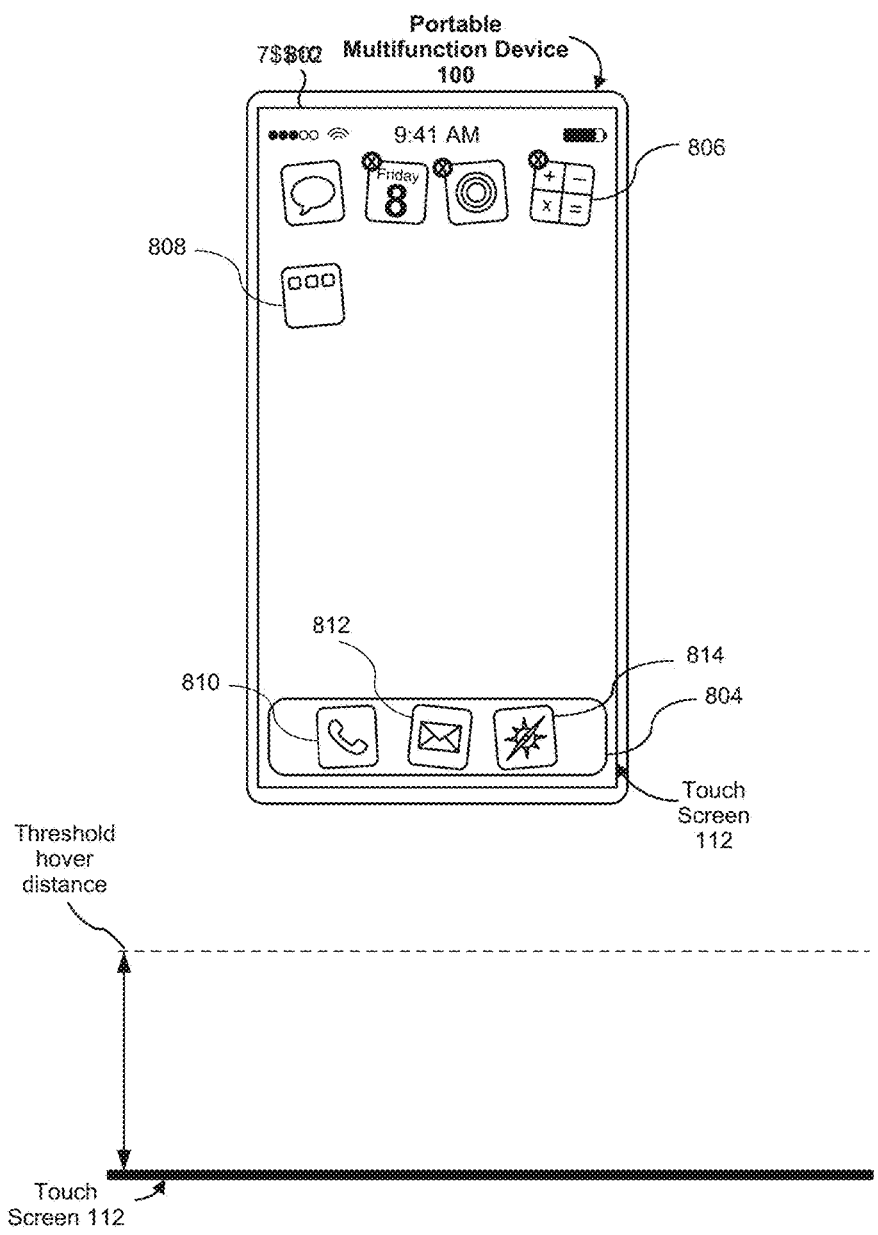
Figure 8K:
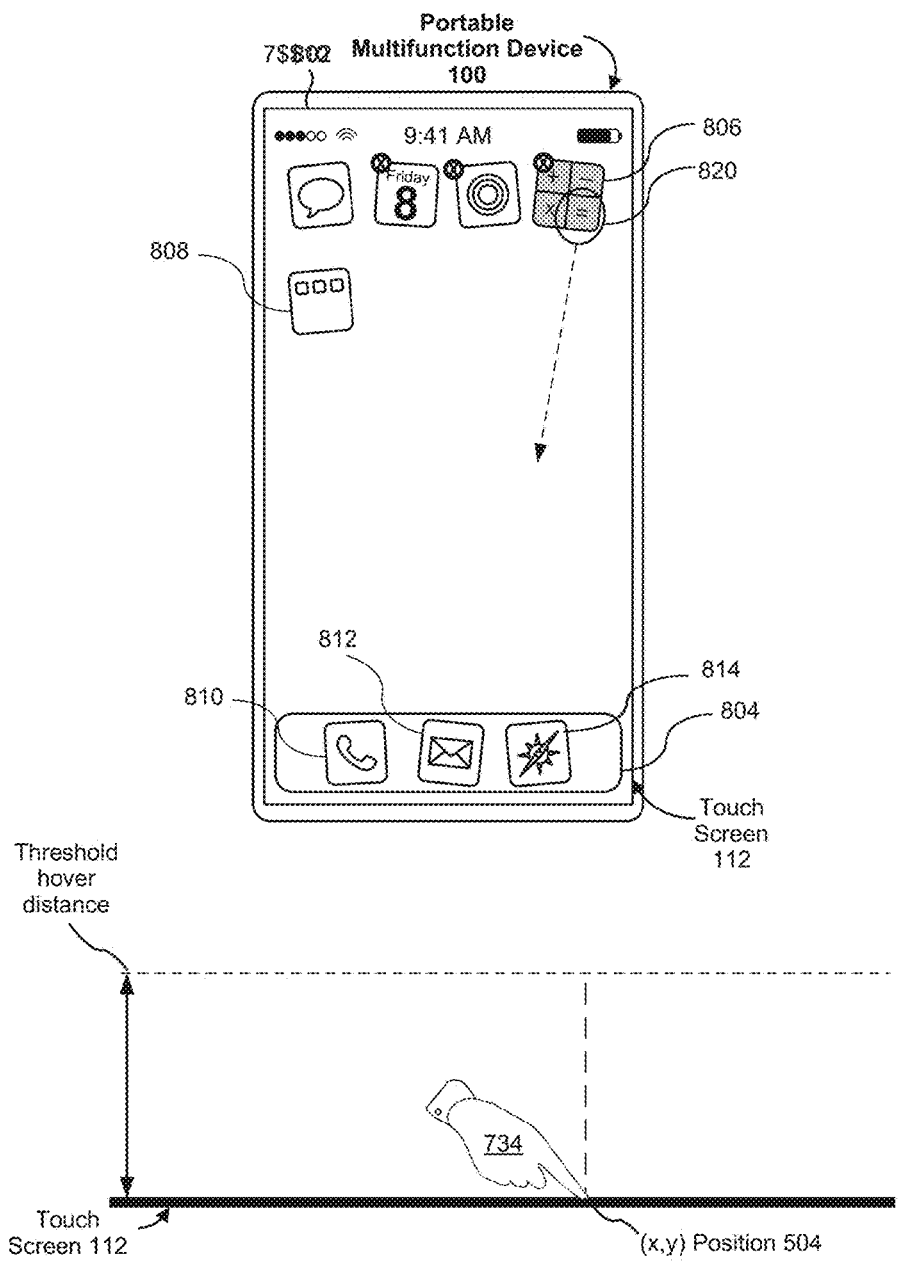
Figure 8L:
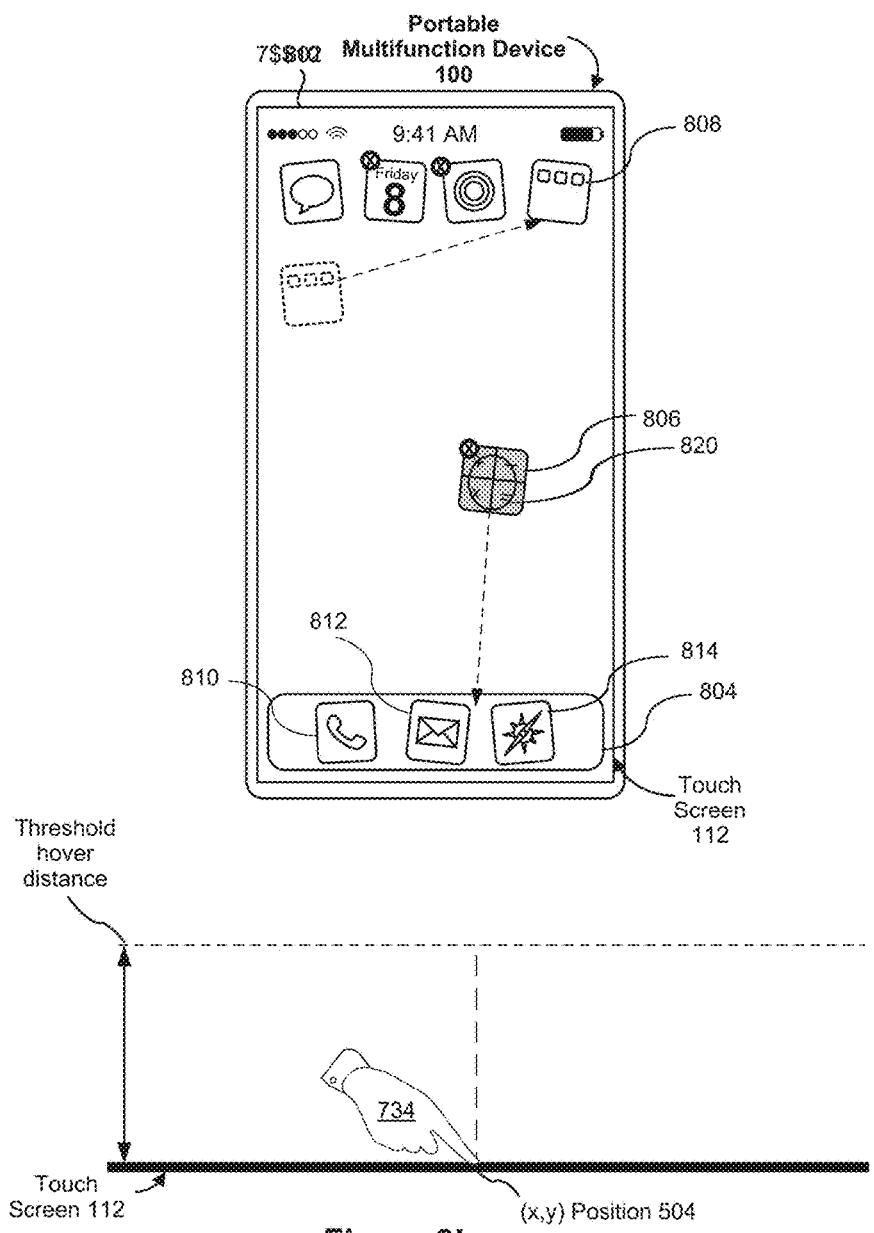
Figure 8M:
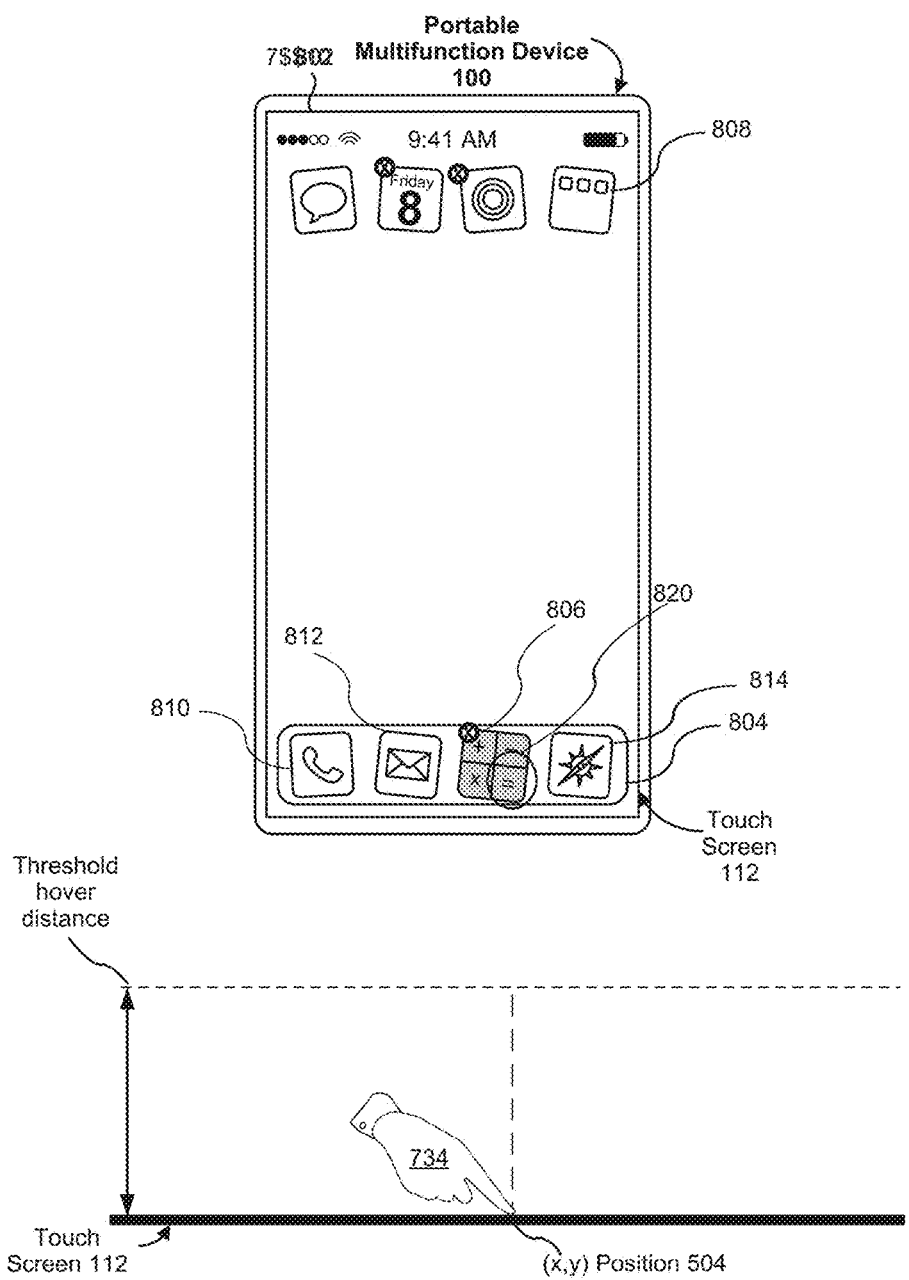
Figure 8N:
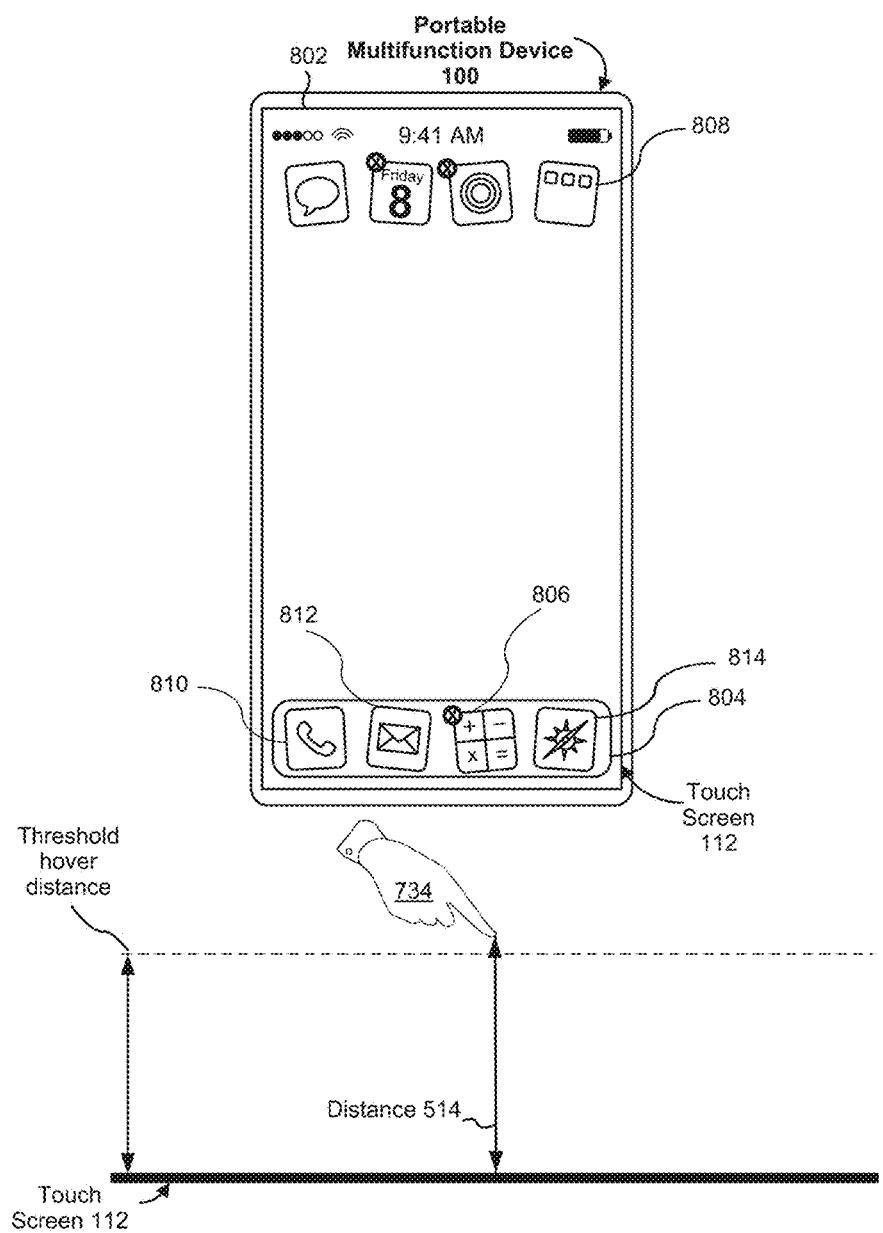
Figure 8O:
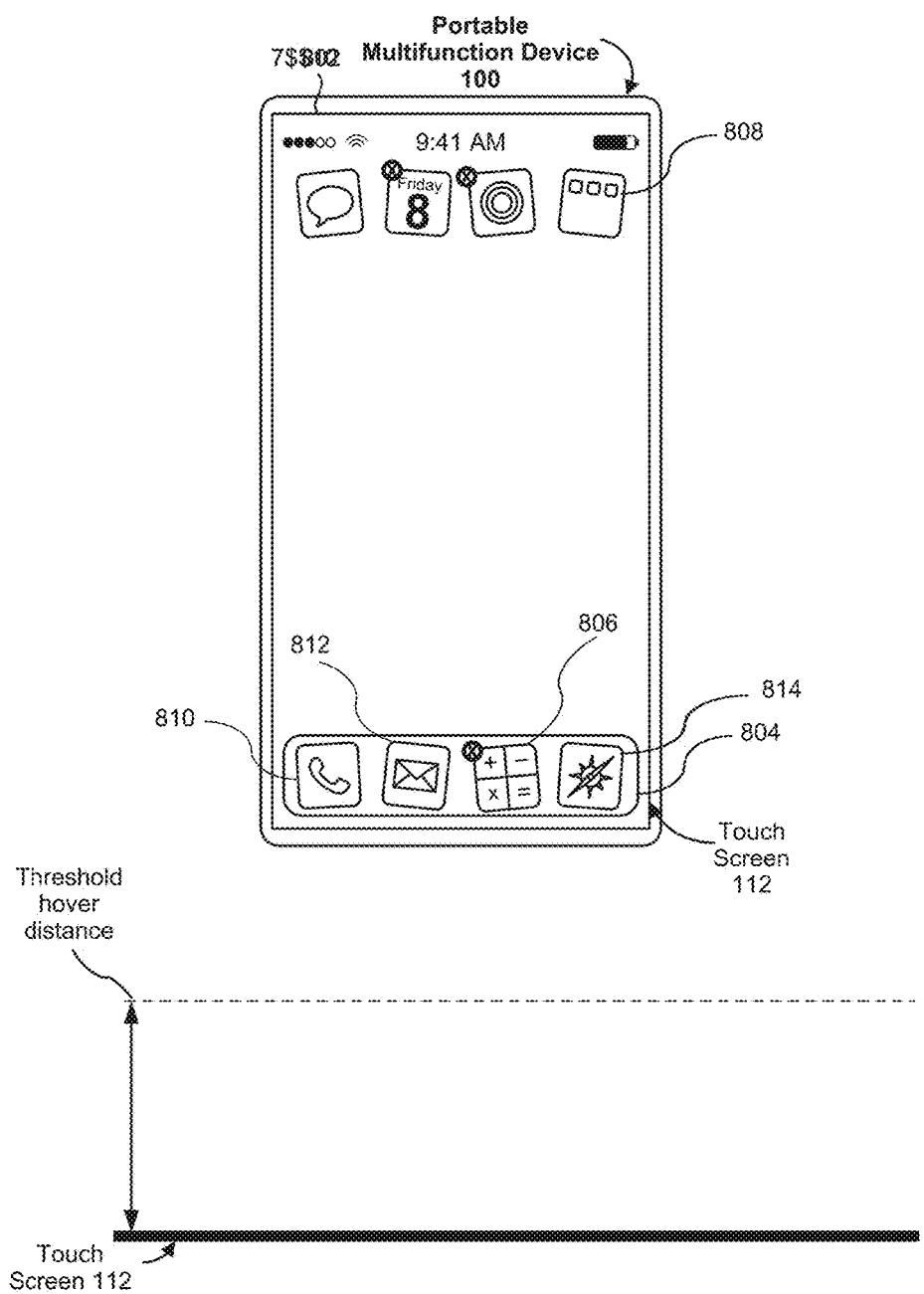
Figure 8P:
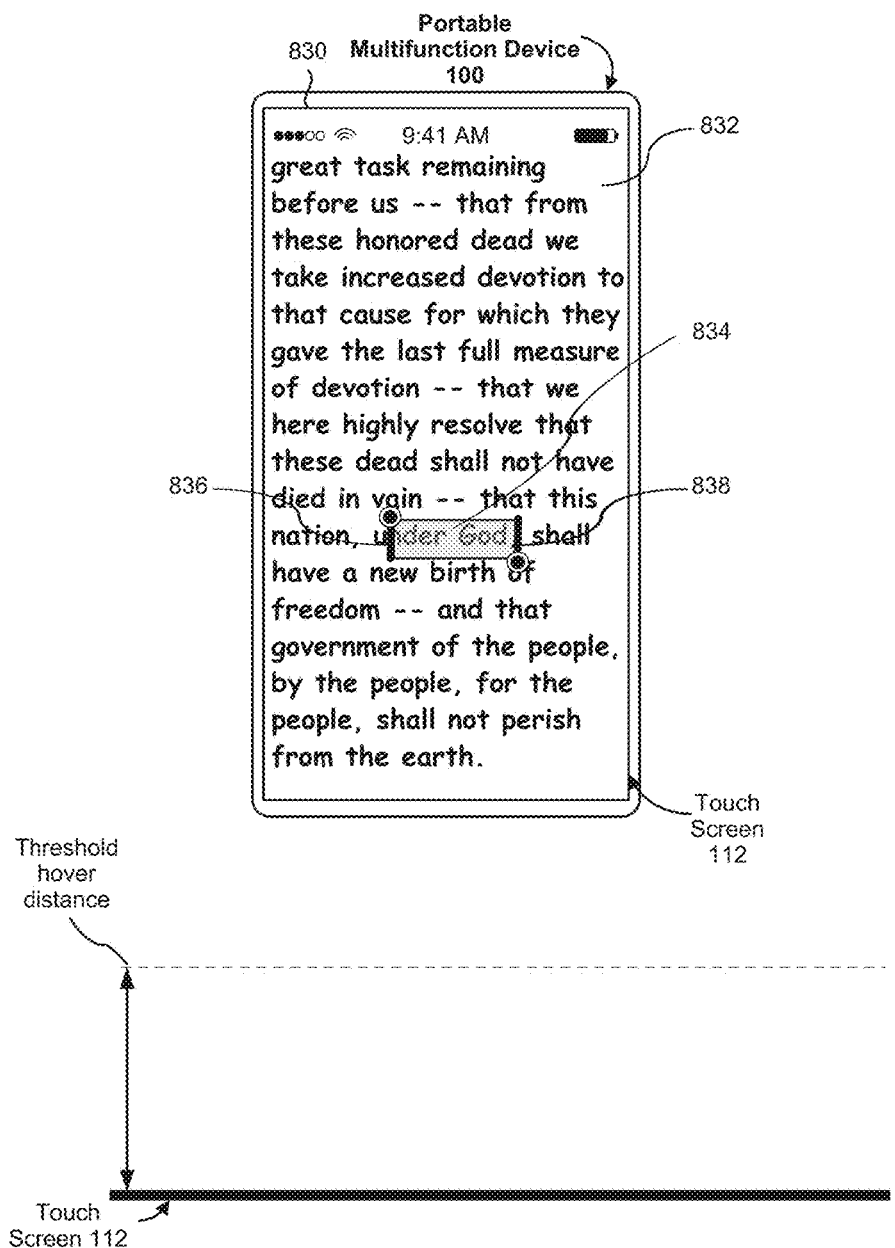
Figure 8Q:
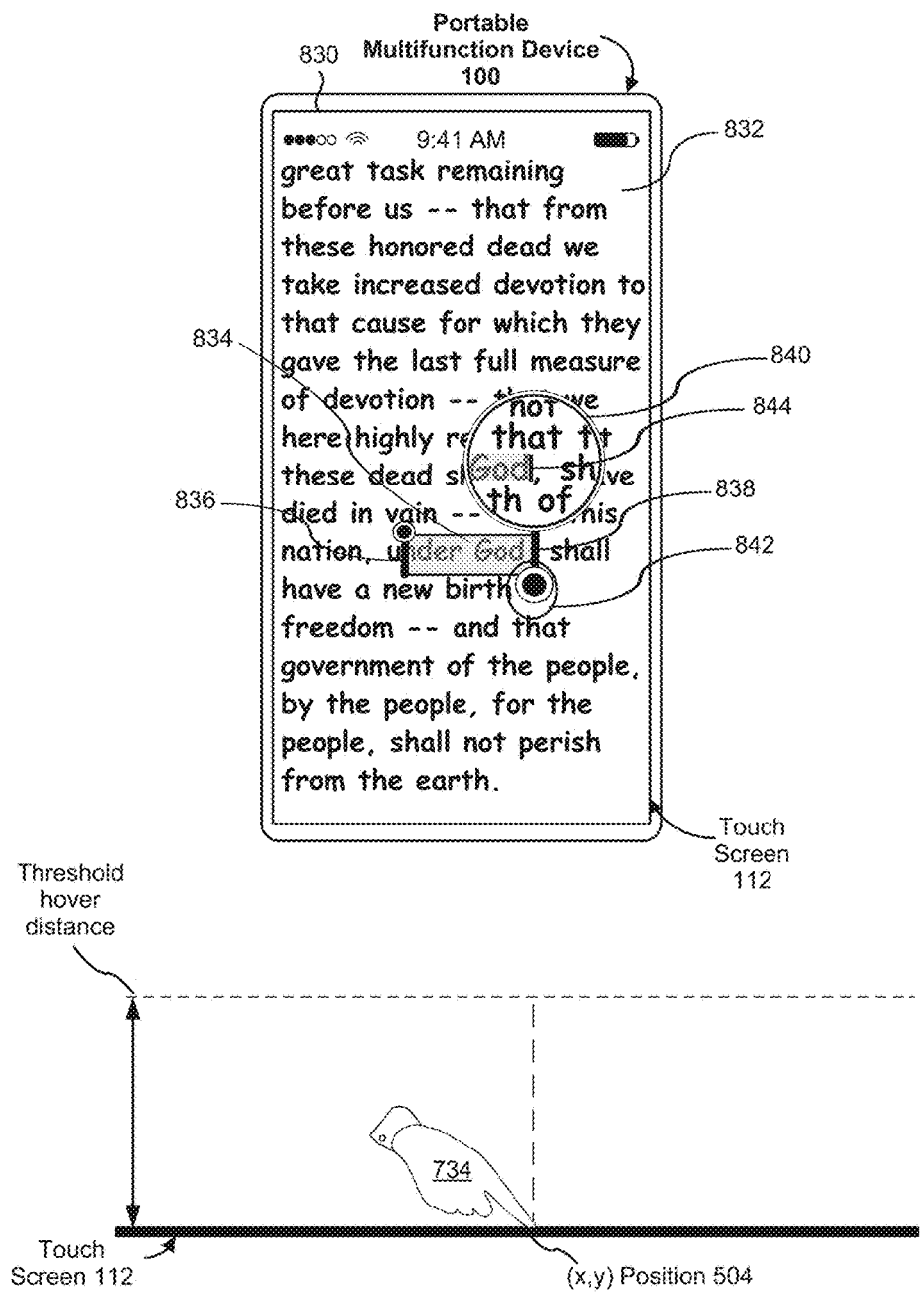
Figure 8R:
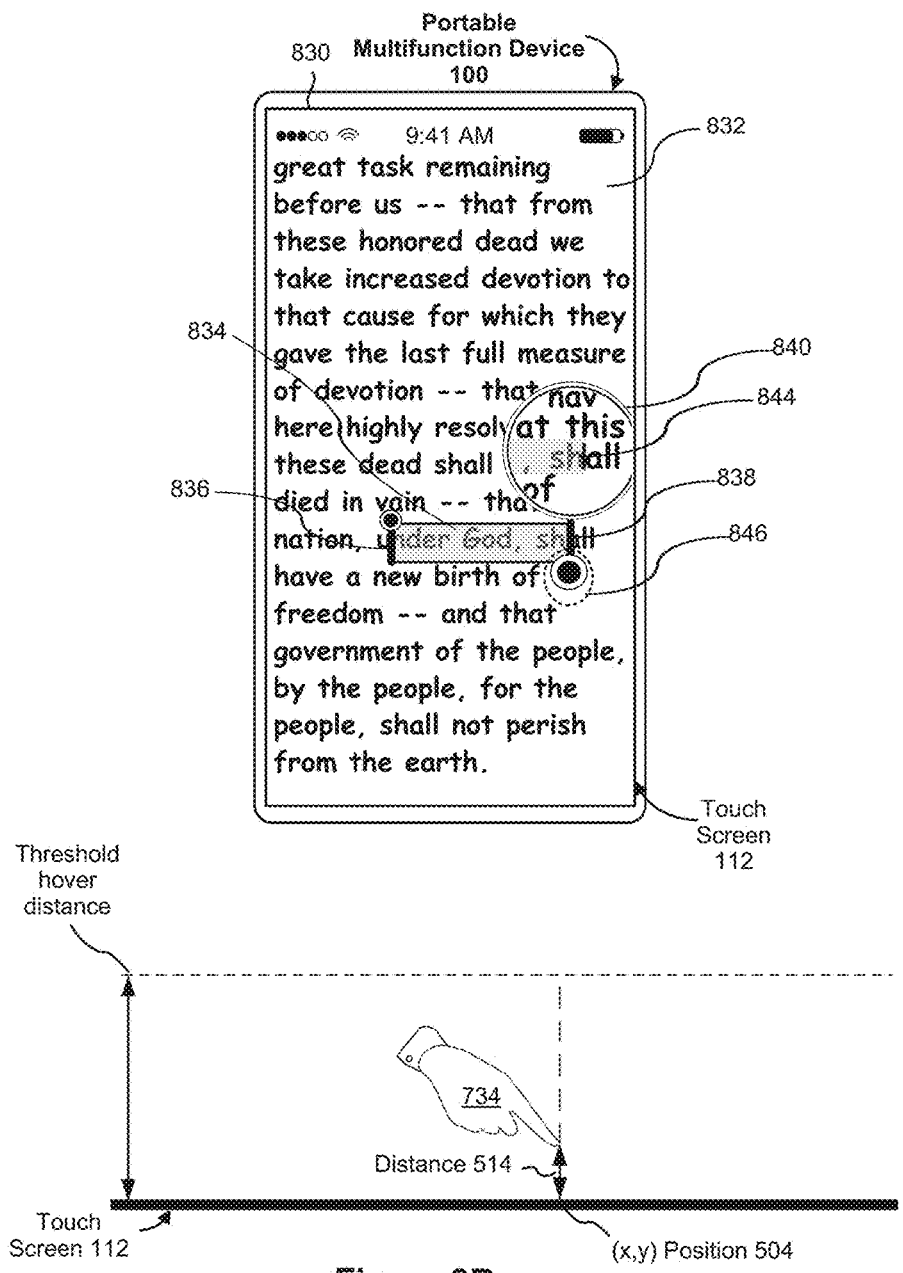
Figure 8S:
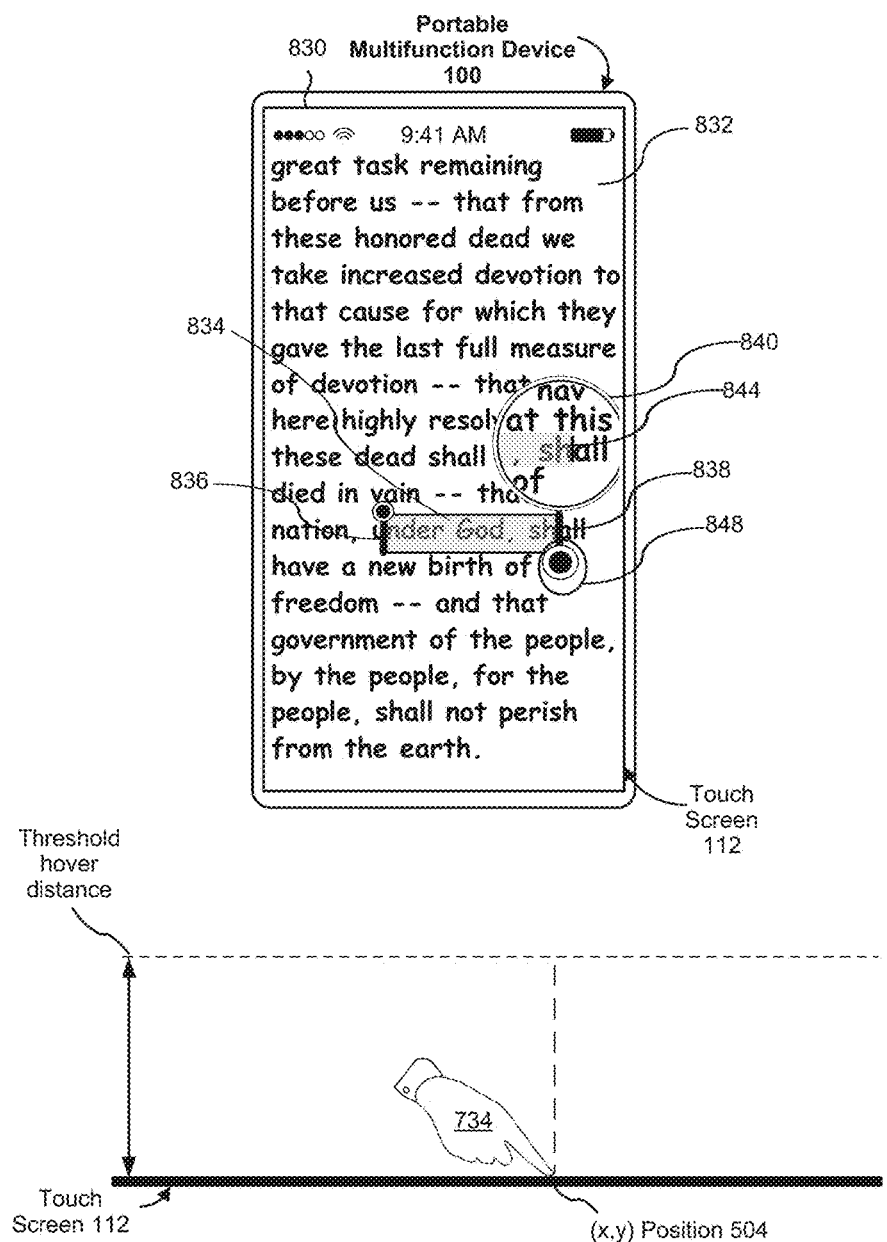
Figure 8T:
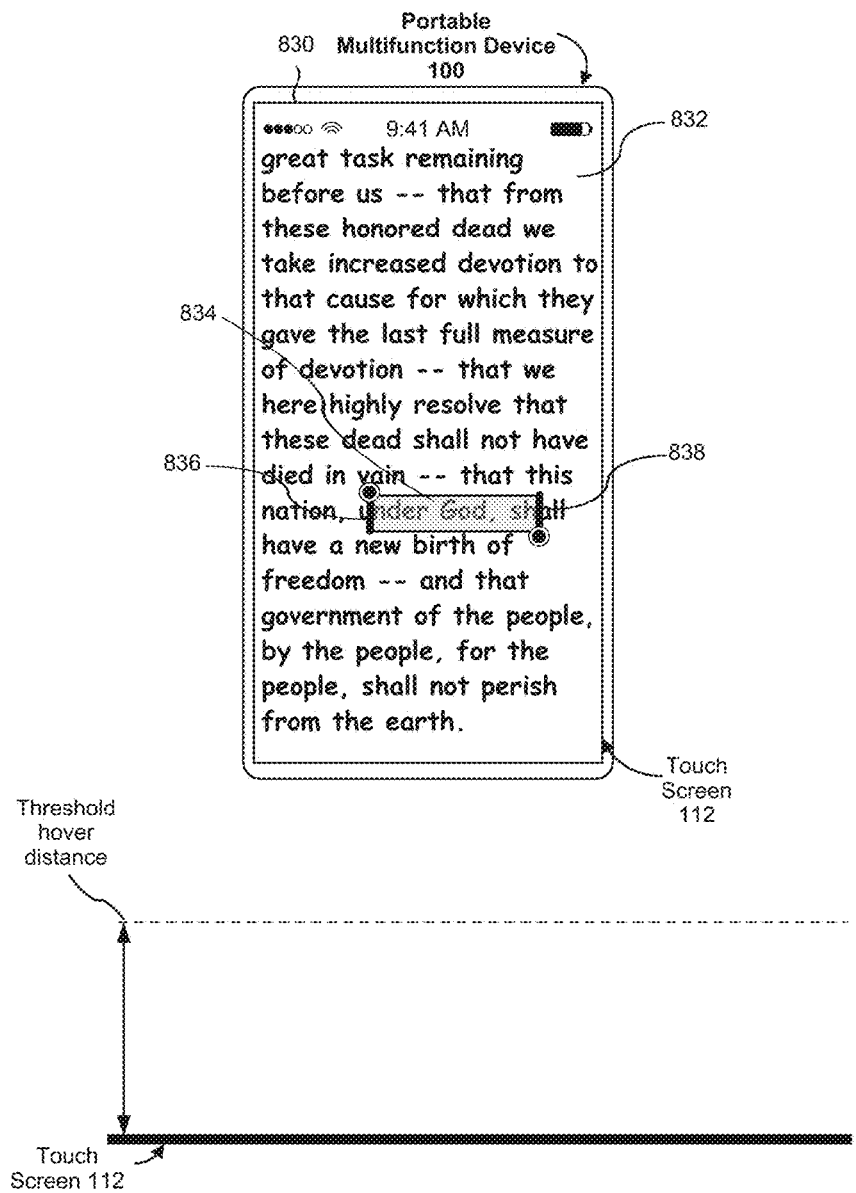
Figure 8U:
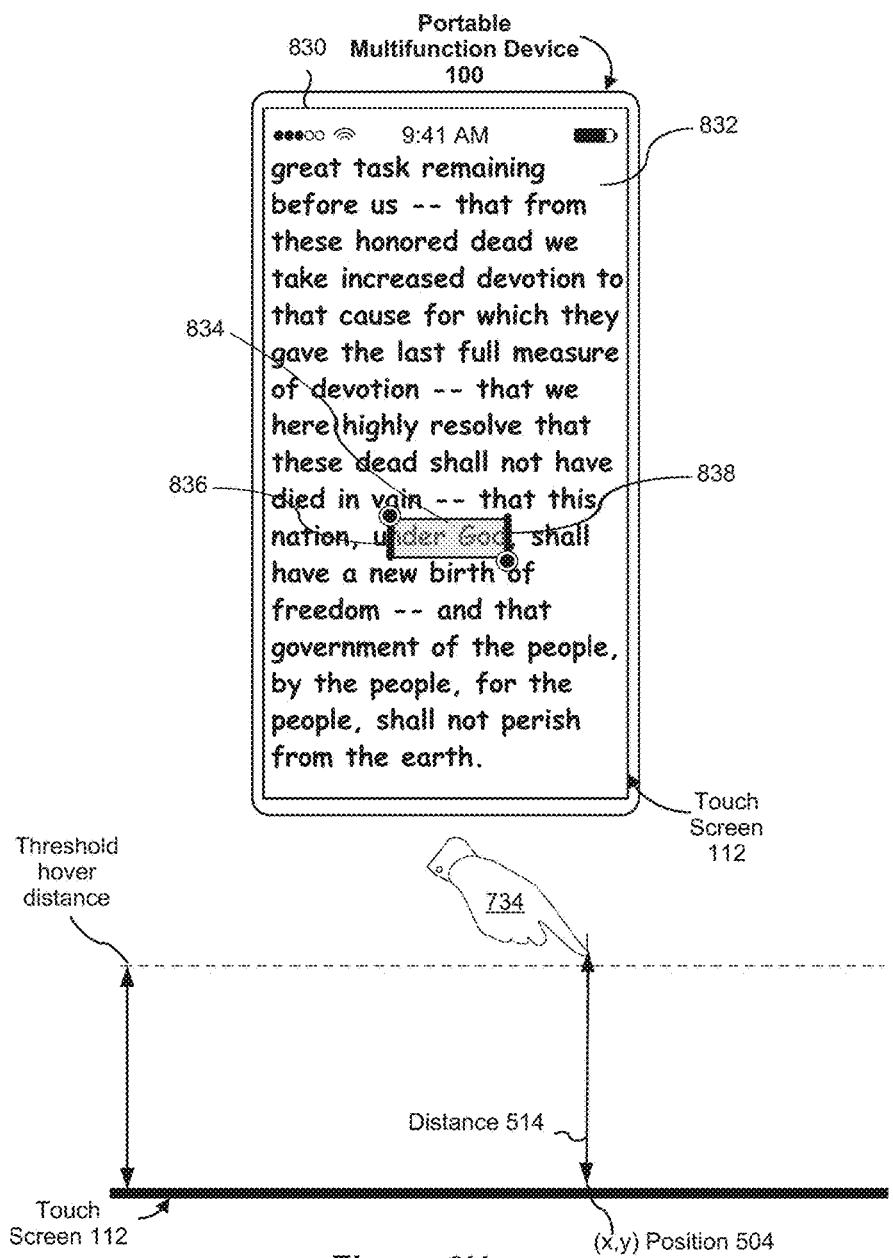
Figure 8V:
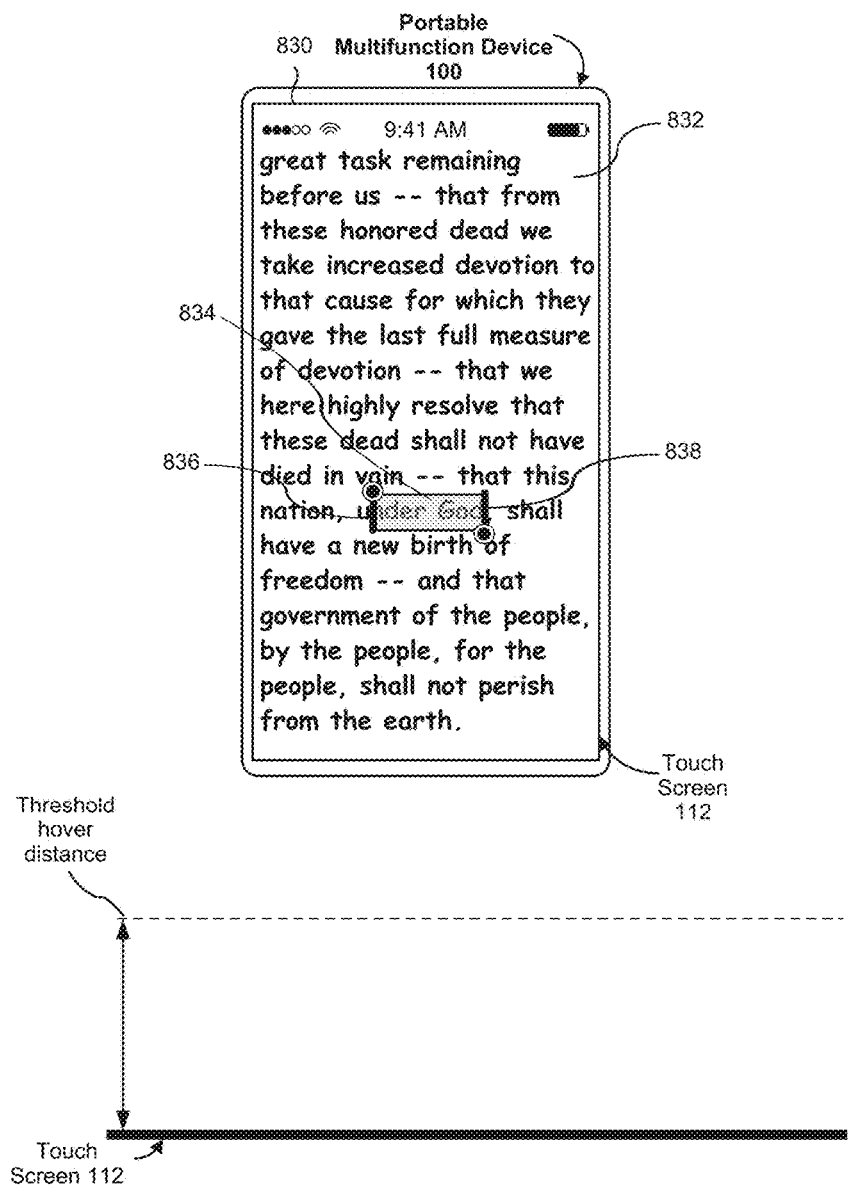

FIGS. 8A-8V illustrate user interface interactions for moving an object (e.g., application launch icon 806, or a moveable boundary or selection handle 838 of a content selection object) in a user interface (e.g., home screen user interface 802, or content-display user interface 830) in accordance with some embodiments. In particular, FIGS. 8A-8V illustrate that, when the object is moved across the user interface in accordance with a lateral movement of an input object while the input object hovers above the touch-sensitive surface, the move of the object is canceled when the input object is lifted out of the hover proximity range without first making contact with the touch-sensitive surface, and the move of the object is confirmed when the input object makes contact with the touch-sensitive surface after the lateral movement.

FIG. 8A shows a user interface (e.g., home screen user interface 802) that includes a number of user interface objects that correspond to different applications installed on the electronic device 100 (e.g., application launch icon 806 that corresponds to a "Calculator" application, and folder icon 808 that corresponds to a folder that includes one or more application launch icons, application launch icon 810 that corresponds to a telephony application, application launch icon 812 that corresponds to a mail application, application launch icon 814 that corresponds to an Internet browser application, etc.). The user interface objects are arranged in the user interface in accordance with a predetermined layout (e.g., according to a four column grid). Some of the objects (e.g., applications launch icons 810, 812, and 814) are included in a container object (e.g., dock 804).

In FIG. 8B, a home screen reconfiguration mode has been triggered and application launch icon 806 is currently selected, e.g., in response to a long press input by contact 814 with the touch-sensitive surface. In the home screen reconfiguration mode, the icons in the home screen user interface can be rearranged by moving one or more of the icons.

FIGS. 8C-8F illustrate that the selected icon 806 is dragged across the user interface in accordance with lateral movement of the input object (e.g., hand or finger 734) while the input object hovers over the touch-sensitive surface 112. In some embodiments, a visual indication of the hovering input object (e.g., indication 816) is displayed on the touch screen. In some embodiments, indication 816 is not visible on the touch screen. In FIG. 8C, when icon 806 is moved out of its original location in the home screen user interface 802, other icons (e.g., icon 808) are rearranged in the home screen user interface 802 in accordance with predefined user interface layout rules. In FIG. 8D, when icon 806 is dragged near the dock 804, other icons (e.g., icons 810, 812 and 814) within the dock 804 are rearranged to make room for icon 806.

FIGS. 8C-8F also illustrate that, during the lateral movement of finger 734 while finger 734 hovers above touch-screen 112, the appearance of the 806 is dynamically changed in accordance with hover distance 514 of finger 734. For example, when finger 734 hovers higher above touch-screen 112 (e.g., as in FIGS. 8C-8D), icon 806 appears more enlarged than when finger 734 hovers lower above the touch-screen (e.g., as in FIGS. 8E-8F).

FIGS. 8G-8H illustrate that, after the icon 806 is moved across the touch-screen in accordance with the lateral movement of the hovering finger 734, finger 734 makes contact with the touch-screen at a location that corresponds to an acceptable drop-off location for icon 806 on the touch-sensitive surface (as shown in FIG. 8G). As a result, the icon 806 is dropped off at the acceptable drop-off location that corresponds to the location of contact 818 on touch-screen 112 and remains at the new location after lift-off of the contact 818 (e.g., as shown in FIG. 8H). The move of icon 806 and rearrangement of home screen user interface 802 is confirmed and completed, and the locations of the icons on the home screen user interface remains in the new configuration after the finger 734 is lifted out of the hover proximity range.

In contrast to the scenario illustrated in FIGS. 8G-8H, FIGS. 8I-8J illustrate that, after icon 806 is moved across the touch screen in accordance with the lateral movement of the hovering finger 734, finger 734 is lifted out of the hover-proximity range before finger 734 has made any contact with the touch-screen (as shown in FIG. 8I, as continuation of any of FIGS. 8C-8F). As a result, icon 806 flies back to its original location in home screen user interface 806, as do other icons (e.g., icons 808, 810, 812, and 814) that have been moved in response movement of icon 806; and the movement of icon 806 and the rearrangement of the home screen user interface is canceled (e.g., as shown in FIGS. 8I-8J). In other words, after a preview of the rearrangement of the home screen user interface has been presented to the user, the rearrangement of the home screen user interface is reverted when the hover input ended without finger 734 making contact with touch-screen 112 first.

FIGS. 8K-8M illustrate that, icon 806 is dragged by a continuously maintained contact 820 from its original location (in FIG. 8K) to the same drop-off location as before (e.g., same drop-off location in FIGS. 8F and 8M). When icon 806 is dragged, other icons in the home screen user interface 112 are also rearranged in response to the movement of icon 806 (e.g., as shown in FIGS. 8L and 8M).

Following FIGS. 8K-8M, in FIGS. 8N-8O, finger 734 is lifted off touch-screen 112 and lifted out of the hover proximity range above the touch-screen, and icon 806 remains in its new position in the dock 804, and the home screen user interface remains in the new configuration.

FIG. 8P shows a content-display user interface 830 (e.g., a user interface of a text editor application or a web-browser application). Content-display user interface 830 displays selectable text. Within content-display user interface 830, a portion of text is currently selected, as indicated by text selection box 843 that includes the portion of the selected text. Text selection box 843 includes a beginning edge (e.g., selection handle 836) and an ending edge (e.g., selection handle 838).

FIG. 8Q shows that one of the two selection handles (e.g., selection handle 838) is selected (e.g., by contact 842 made by finger 734 with the touch-screen) for subsequent movement. In some embodiments, the selection handle 838 is selected by another required input, such as a predefined hover gesture (e.g., an in-air finger wiggle gesture) while finger 734 hovers above selection handle 838 (e.g., when (x,y) position 504 of finger 734 corresponds to the location of selection handle 838). The selection of selection handle 838 is visually indicated by enlargement of the end portion of selection handle 838 relative to a corresponding end portion of selection handle 836. In addition, a magnifying object (e.g., magnifying loupe 840) is displayed near the selected selection handle 838 to show a portion of the text near the selected selection handle 838. In some embodiments, cursor 844 is displayed within the text shown in magnifying loupe 840 to indicate the boundary of the text selection box.

FIG. 8R shows that, in accordance with lateral movement of finger 734 while finger 734 hovers above touch-screen 112 (e.g., an indication 846 of the hovering finger 734 is shown to indicate the relative position of the hovering finger 734 and the selected selection handle 38), the selected selection handle 838 is moved across the touch-screen relative to the unselected selection handle 836, changing the size of text selection 834 (e.g., expanding text selection 834).

FIGS. 8S-8T illustrate that, after the selected selection handle 838 is moved with hovering finger 734 (as shown in FIGS. 8Q-8R), finger 734 makes contact with touch-screen 112 and as a result, the relocation of selection handle 838 and the resizing of text selection object 834 are confirmed and remain in effect after finger 734 is lifted out of the hover proximity range above touch-screen 112 (e.g., as shown in FIG. 8T).

FIGS. 8U-8V illustrate that, in contrast to the scenario shown in FIGS. 8S-8T, after the selected selection handle 838 is moved with the hovering finger 734 (as shown in FIGS. 8Q-8R), finger 734 is lifted out of the hover proximity range without first making contact with touch-screen 112, and as a result, the relocation of selection handle 838 and the resizing of text selection object 834 are canceled when finger 734 is lifted out of the hover proximity range above touch-screen 112.

Figure 9A:
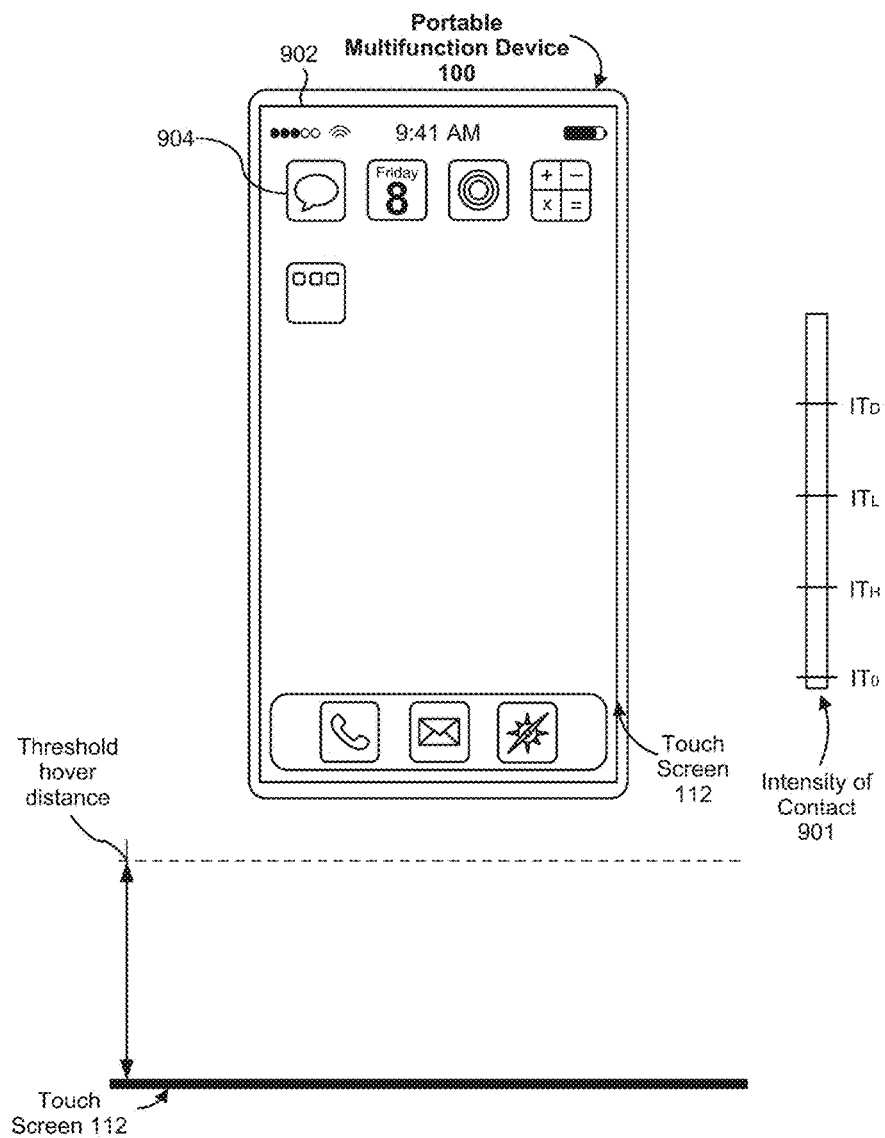
FIGS. 9A-9O illustrate exemplary user interfaces for displaying a user interface object after predefined user interface interaction by the input object, and conditionally maintaining display of the user interface object while the input object continue to meet hover proximity criteria, in accordance with some embodiments.
Figure 9B:
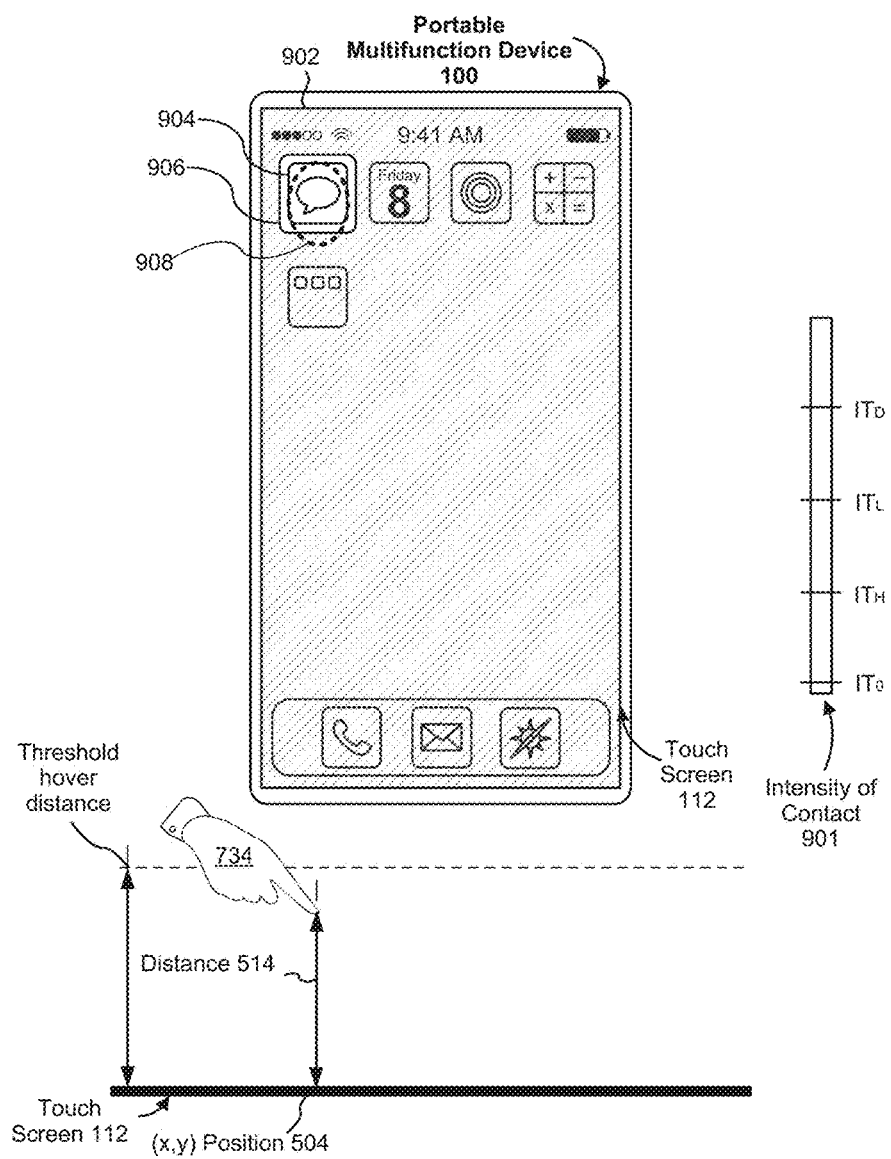
Figure 9C:
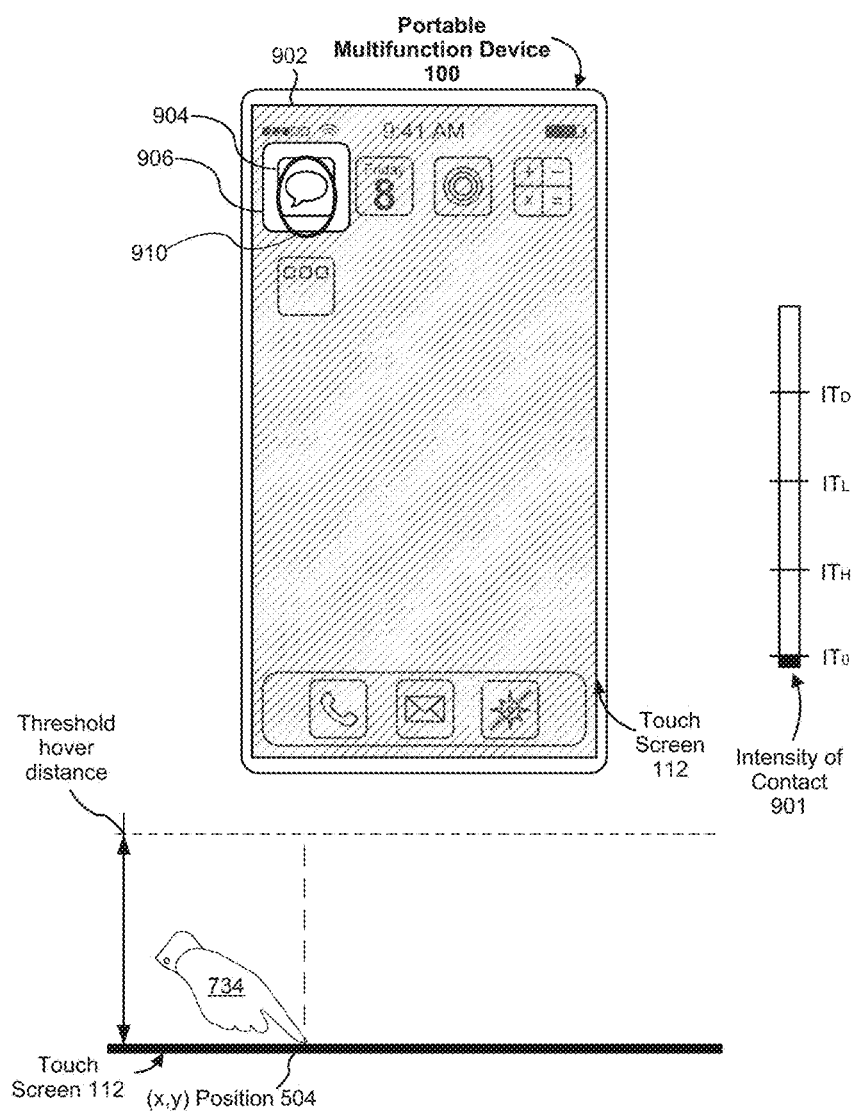
Figure 9D:
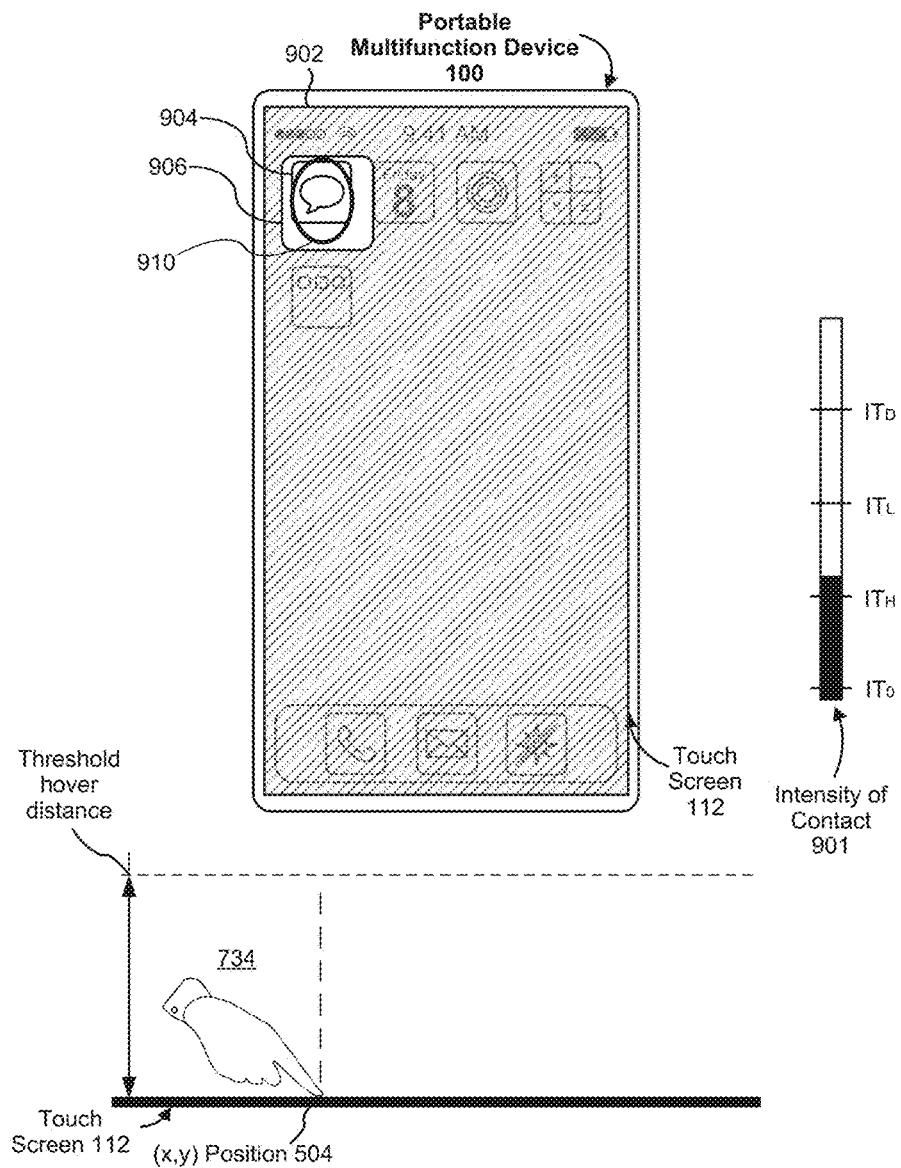
Figure 9E:
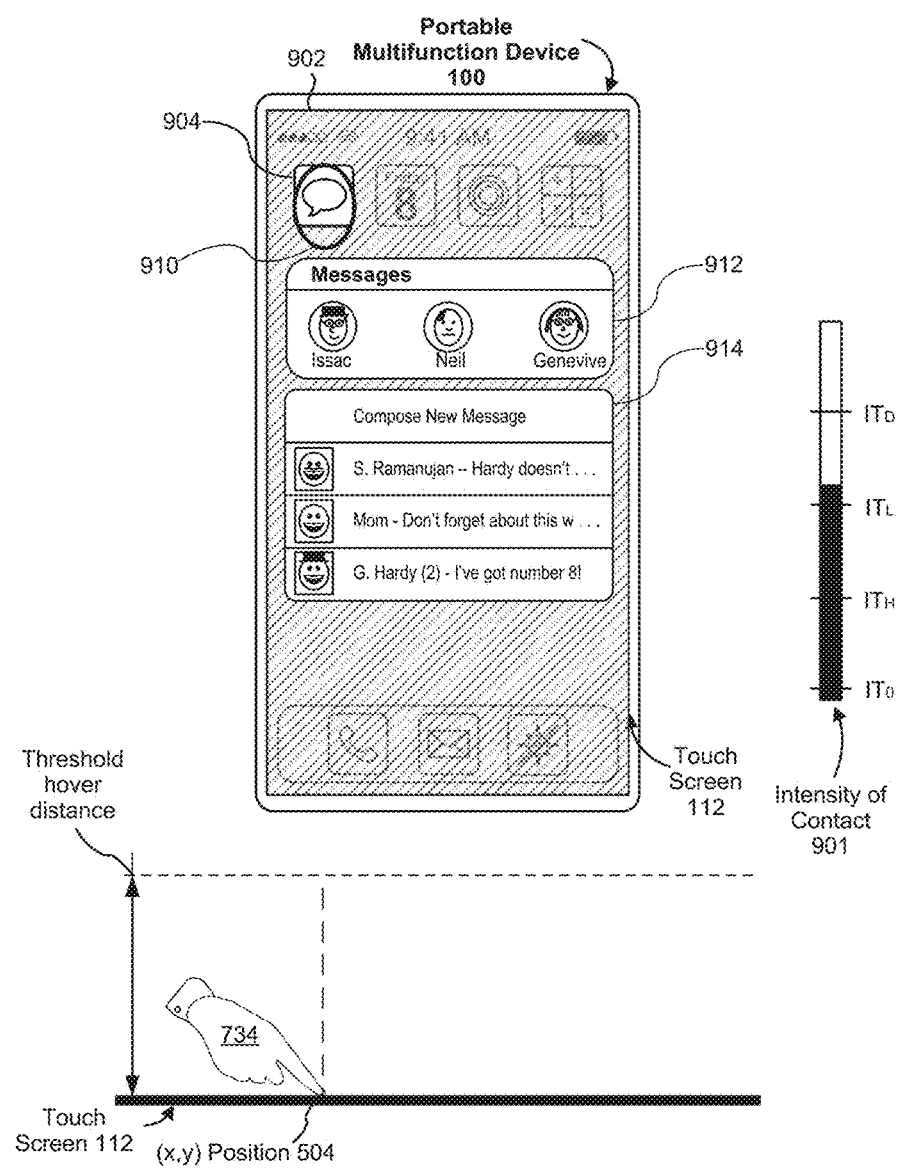
Figure 9F:
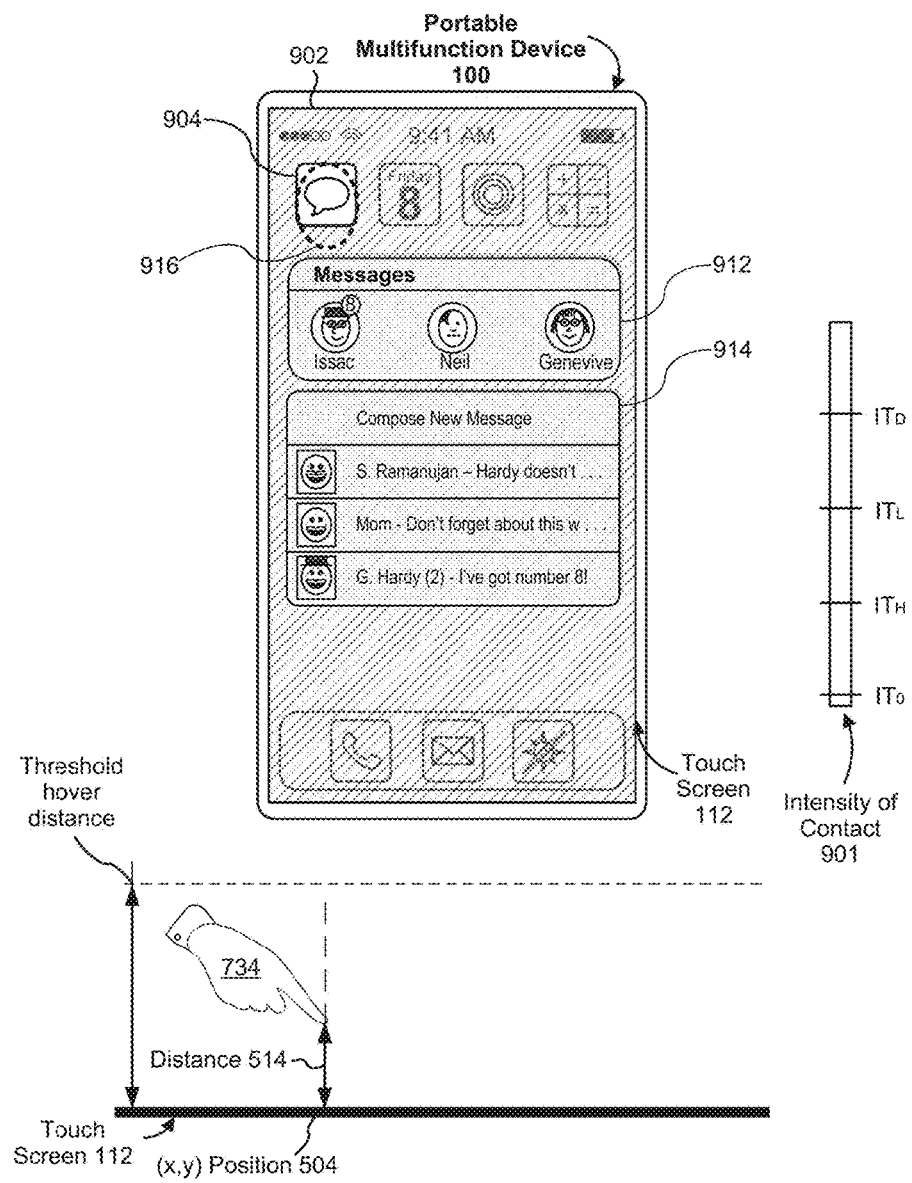
Figure 9G:
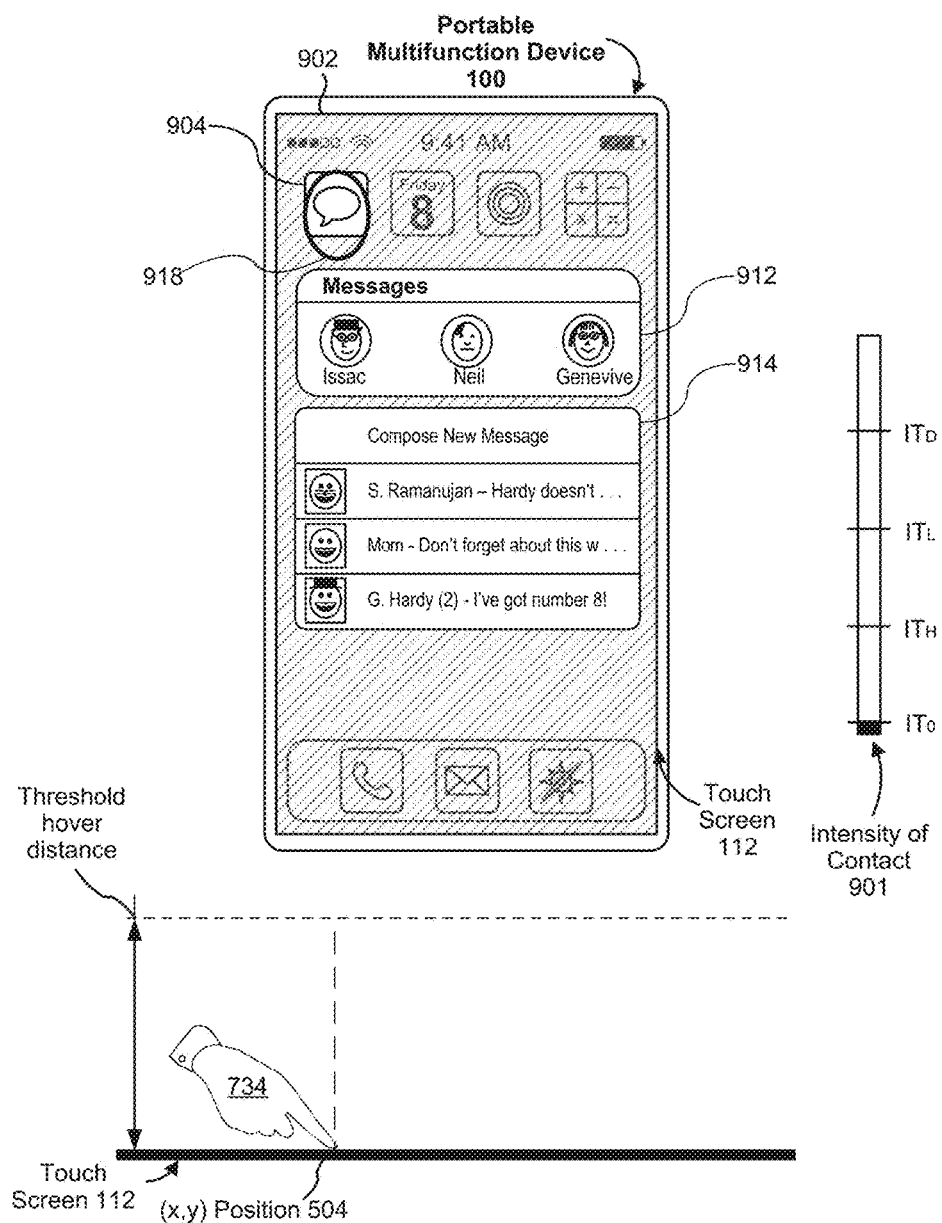
Figure 9H:
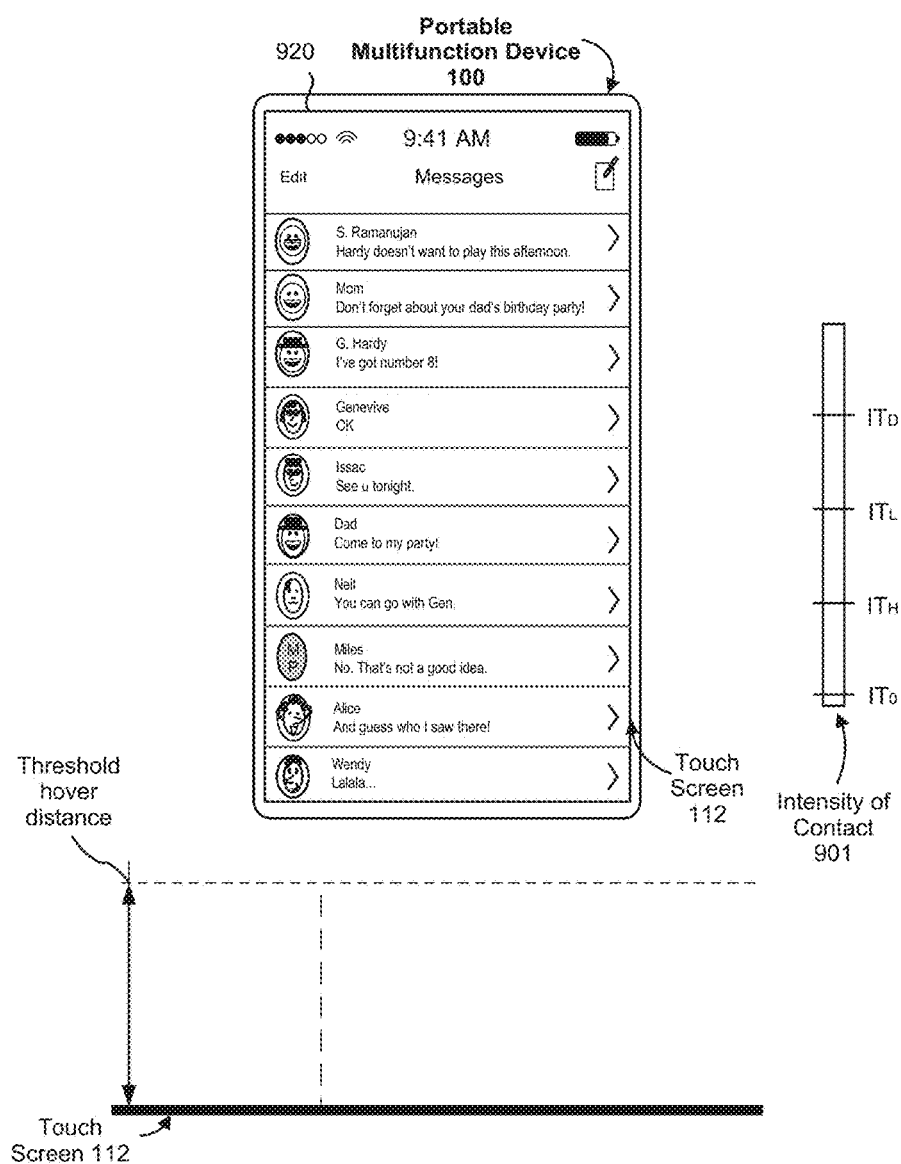
Figure 9I:
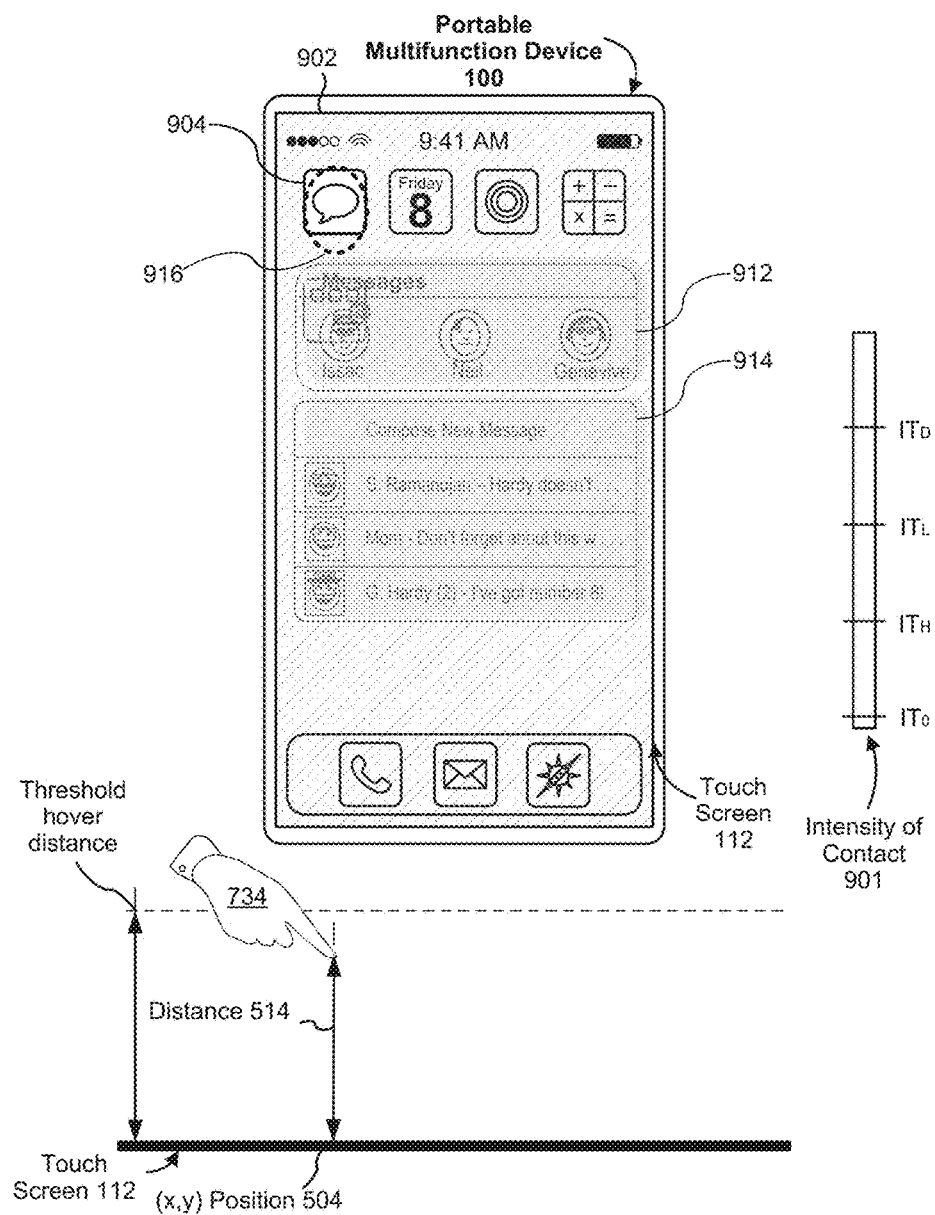
Figure 9J:
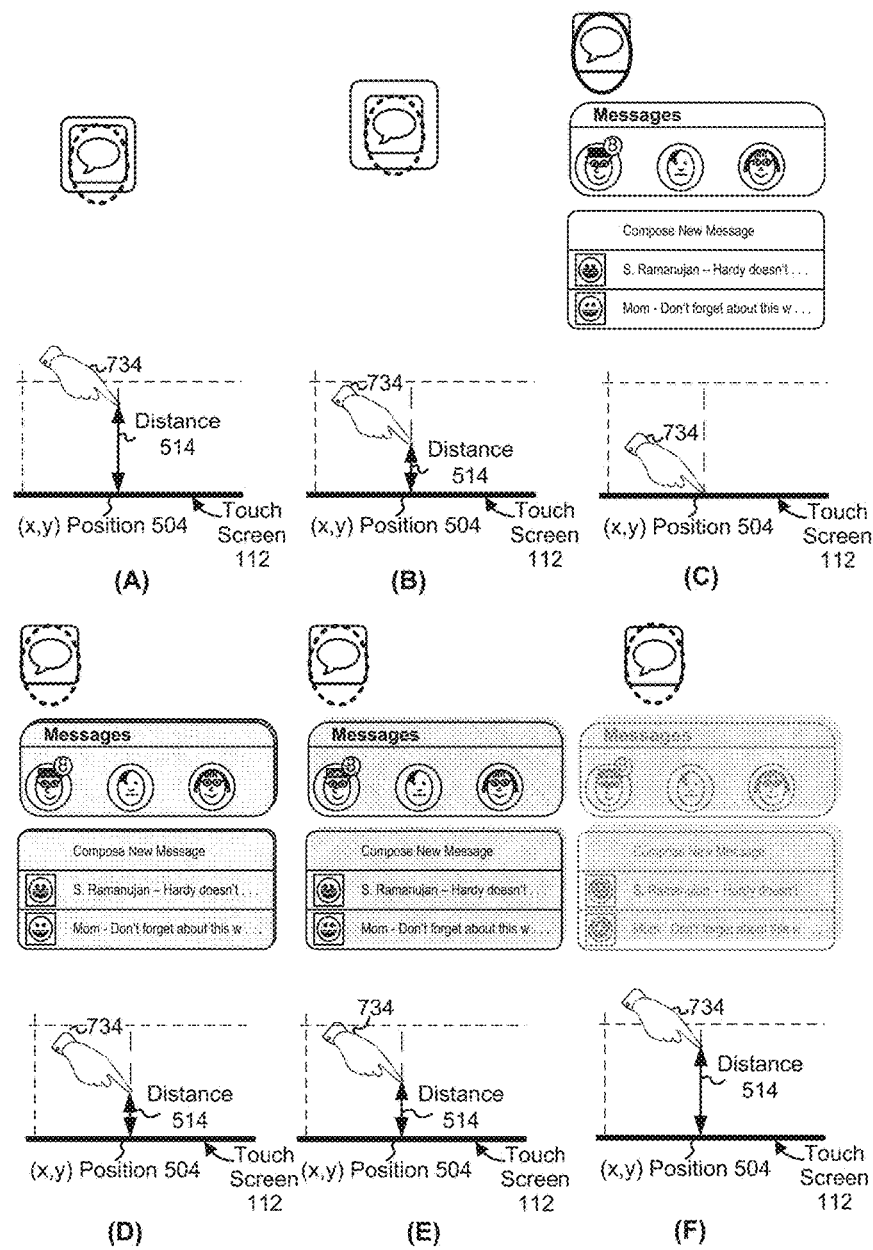
Figure 9K:
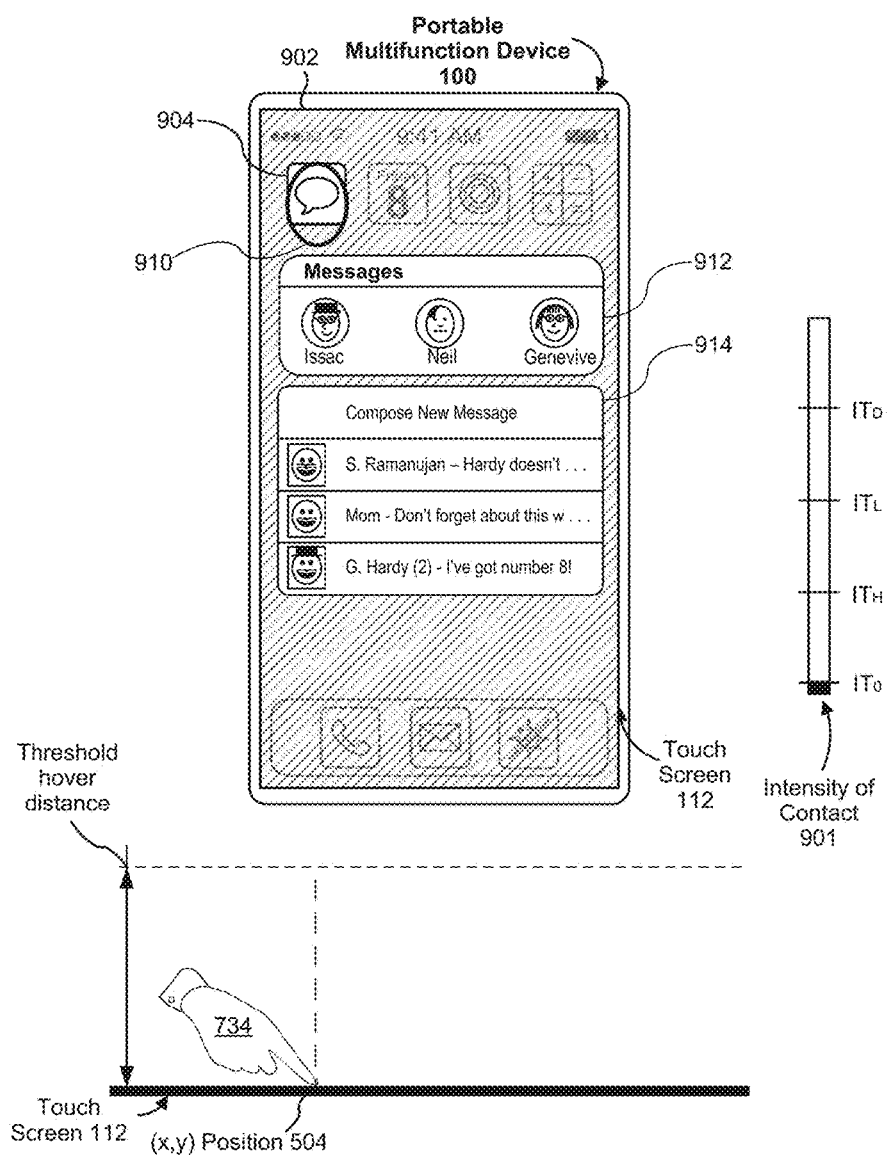
Figure 9L:
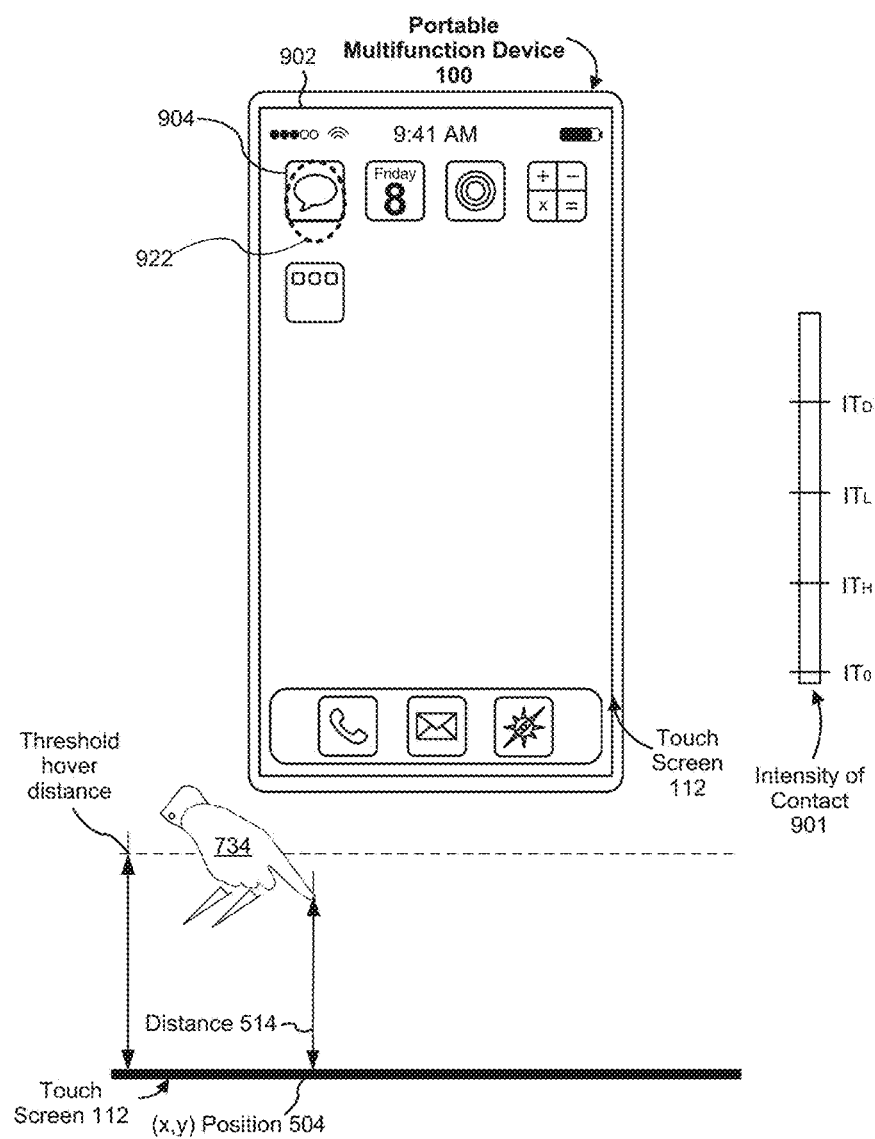
Figure 9M:
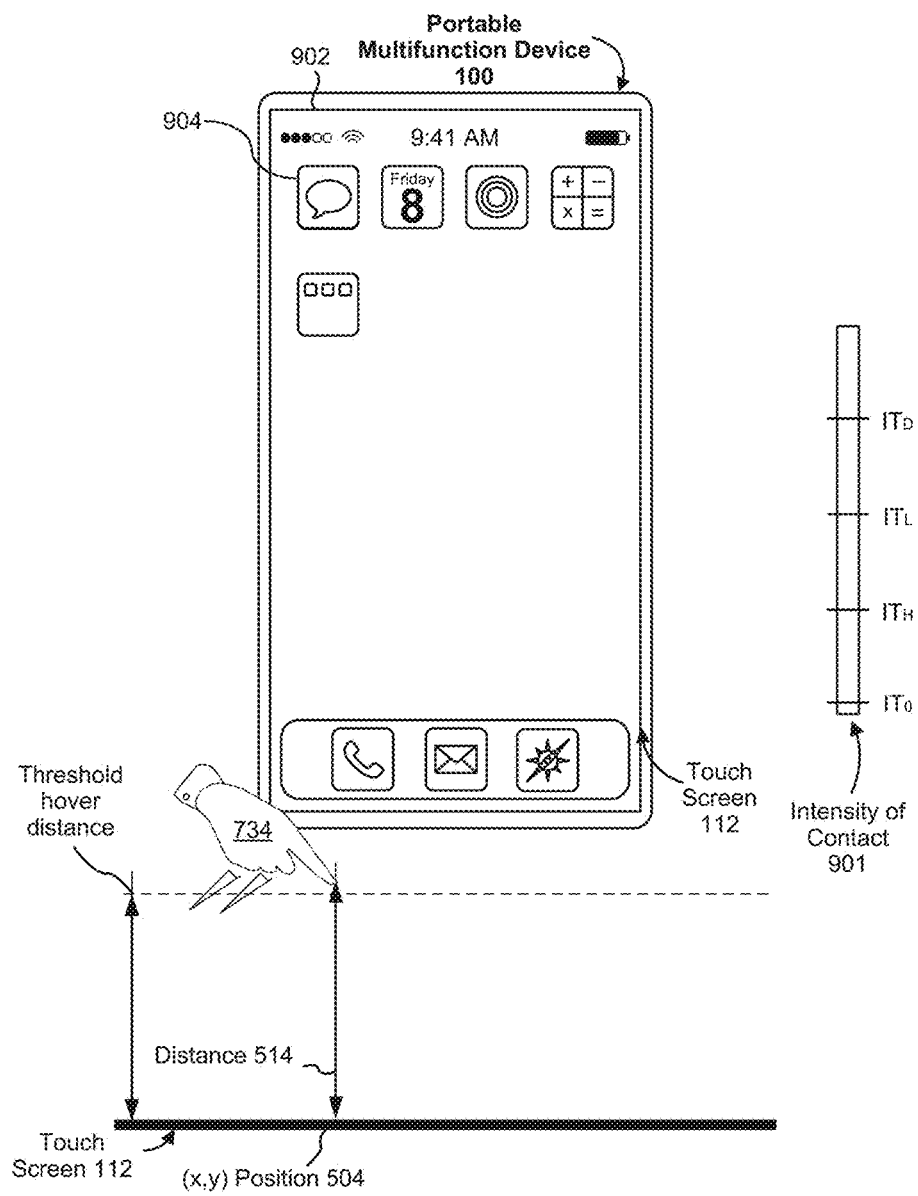
Figure 9N:
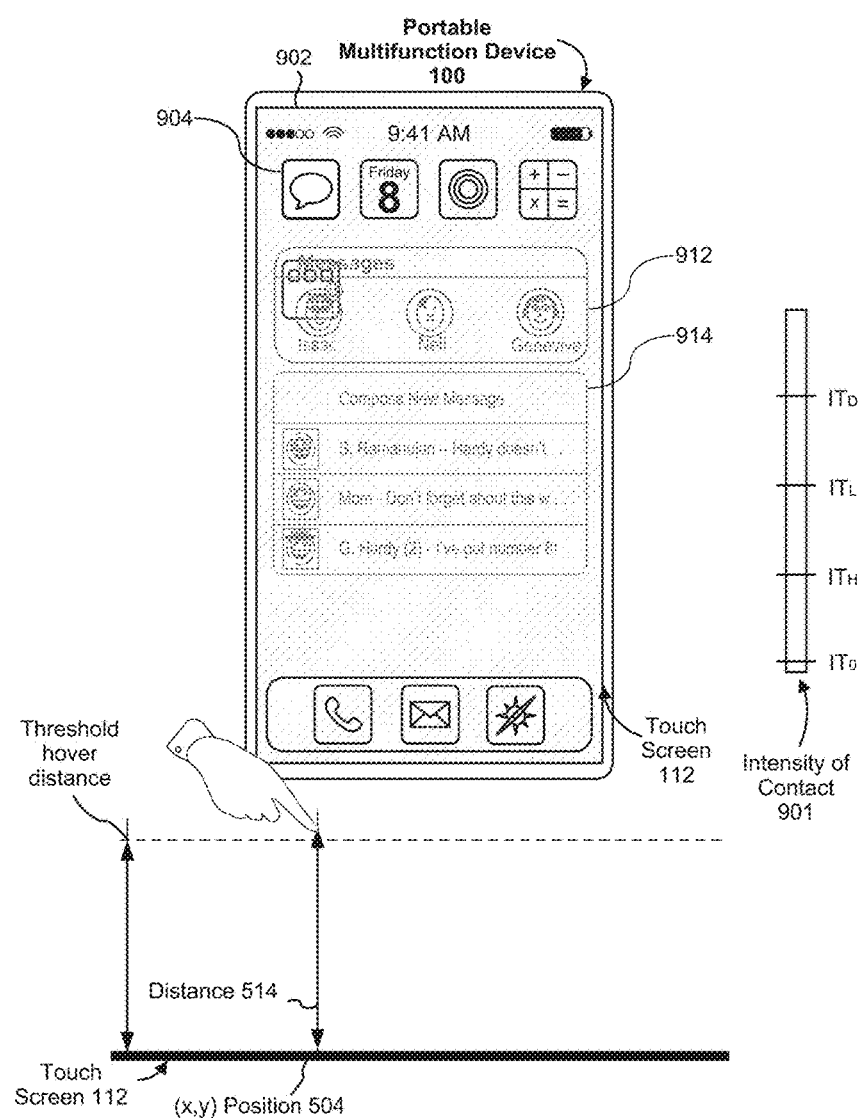
Figure 9O:
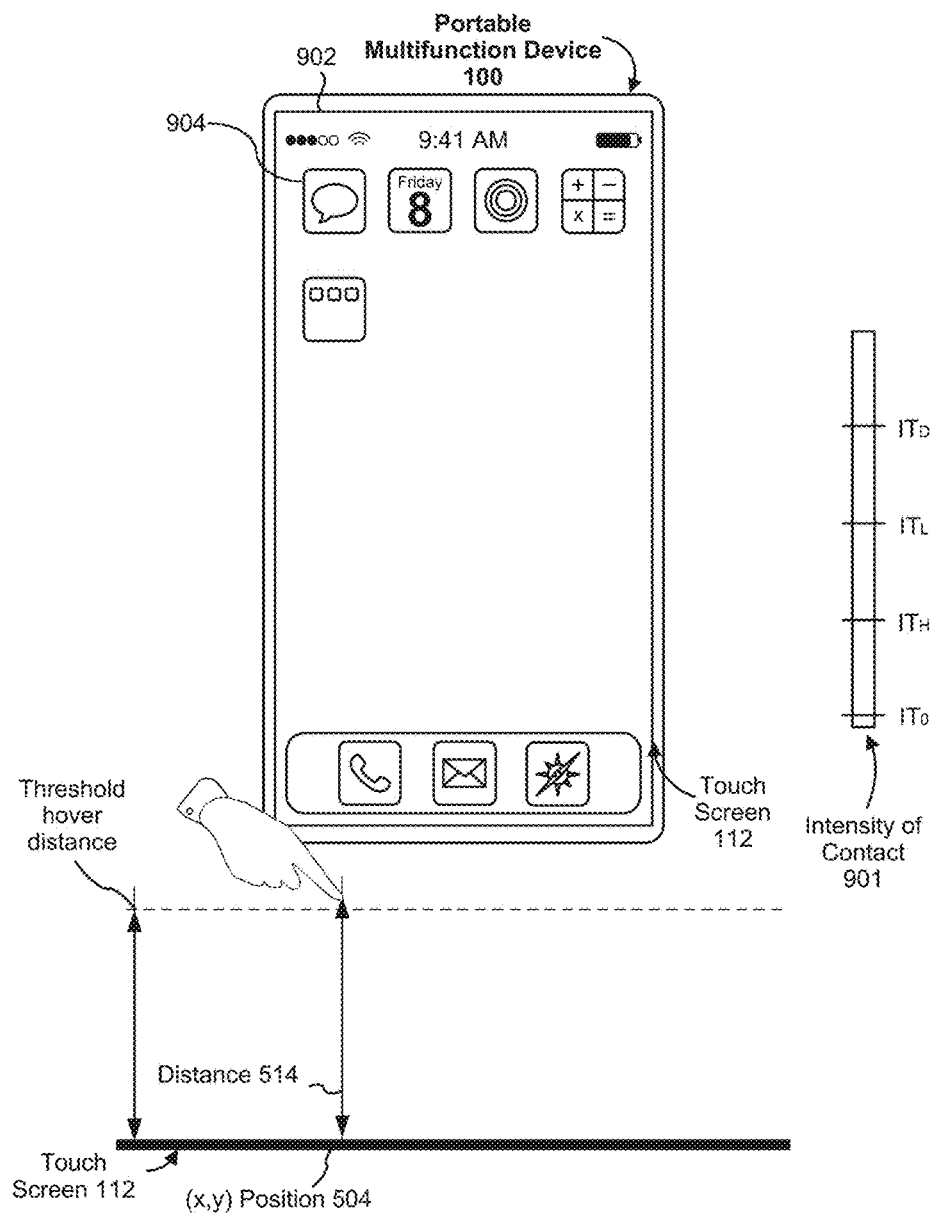

FIGS. 9A-9O illustrate user interactions by an input object to display transient visual effect (e.g., a precursor image 906 or visual hint of quick action menu 914, mini application object 912) and maintaining display of the transient visual effect (e.g., the transient user interface object(s)) by maintaining the input object within the hover proximity range above touch-screen 112. In addition, the transient visual effect that is displayed when the input object is hovering in toward the touch-screen (e.g., when the input object is entering the hover proximity range from outside of the hover-proximity range, and moving within the hover proximity range before making contact with the touch-screen) is different from the transient visual effect that is displayed when the input object is hovering out away from the touch-screen (e.g., when the input object is on its way to exit the hover proximity range after making contact with the touch-screen). In some embodiments, by making contact with the touch-sensitive surface and lifting off, an operation is activated (e.g., launching an application, or activating a menu option) by the input object. In some embodiments, with a quick lift-off of the contact by the input object, the operation is performed without displaying the transient visual effect during the brief time that the input object is moving through the hover proximity range.

FIG. 9A shows a user interface (e.g., home screen user interface 902) that includes a number of objects (e.g., application launch icons, including application launch icon 904 for an instant messaging application).

FIG. 9B illustrates that, when an input object (e.g., finger 734) hovers above application icon 904, a precursor image (e.g., preview platter 906) of a quick action menu 914 and a mini application object 912 is displayed. Relative positions of indication 908 of the input object and icon 904 on the touch-screen are shown in FIG. 9B. In some embodiments, the size and appearance of the precursor image changes dynamically with hover distance 514 of the hovering finger 734. FIG. 9B also shows that portions of home screen user interface 902 outside of icon 904 are darkened and blurred when finger 734 is detected hovering above touch-screen 112, as a hint to indicate that icon 904 is an intensity-reactive icon which will provide an object-specific response (e.g., show a quick action menu and a mini application object that correspond to the instant messaging application) in response to a light press input (e.g., as opposed to a tap input). In some embodiments, the amount of darkening and blurring applied to home screen user interface 902 changes dynamically with hover distance 514 of the hovering finger 734. Although not shown, the display of the precursor image and the hint visual effect (e.g., the blurring and darkening of home screen user interface 902) are transient, and cease to be displayed when finger 734 is lifted out of the hover proximity range above the touch-screen before finger 734 has made any contact with the touch-sensitive surface.

FIGS. 9C-9D illustrate that, when finger 734 makes contact (e.g., contact 910) with touch-screen 112 and increase the intensity of the contact (e.g., contact 910), the precursor image and the hint visual effect are further enhanced (e.g., preview platter 906 is enlarged and shifted off-center, and the blurring and darkening of home screen user interface 902 are increased). In some embodiments, the visual effects that are shown is continuous and non-discrete when finger 734 moves toward the touch-screen, makes contact with the touch-screen, and presses against the touch-screen. Although not shown here, when finger 734 is lifted off the touch-screen before the intensity of contact 910 exceeds the light press intensity threshold $IT_L$, the device treats the received input by finger 734 as a tap input, and launches the application in response to detecting lift-off of contact 910.

FIG. 9E illustrates that when a characteristic intensity of the contact (e.g., contact 910) by finger 734 exceeds the light press intensity threshold $IT_L$ (as indicated by intensity meter 901), the precursor image (e.g., preview platter 906) is transformed into mini application object 912 and quick action menu 914 (e.g., a list of selectable options) that correspond to the instant messaging application. The blurring and darkening of the home screen user interface behind mini application object 912 and quick action menu 914 are at their maximum extent when mini application object 912 and quick action menu 914 are first displayed.

FIG. 9F shows that when finger 734 is lifted off touch-screen 112 but still remains within the hover proximity range above the touch-screen, mini application object 912 and quick action menu 914 remain displayed over the blurred and darkened home screen user interface 902. The appearances of mini application object 912 and quick action menu 914 are changed with the changing hover distance of finger 734 to indicate that the display of mini application object 912 and quick action menu 914 is transient and will cease once finger 734 is lifted out of the hover proximity range above touch-screen 112. For example, mini application object 912 and quick action menu 914 become increasingly translucent as finger 734 moves away from the touch-screen. In some embodiments, mini application object 912 and quick action menu 914 are lifted off the z-layer of the home screen user interface with the hovering finger 734 and optionally quiver with the lateral movement of finger 734 while the finger hovers above touch-screen 112.

FIGS. 9G-9H illustrate that, before finger 734 is lifted out of the hover proximity range and while mini application object 912 and quick action menu 914 are still visible over home screen user interface 902, finger 734 moves downward and makes contact (e.g., as indicated by contact 918 on application launch icon 904) with touch-screen 112 (as shown in FIG. 9G); and in response to detecting finger 734 making contact with touch-screen 112 and upon lift-off of finger 734 from touch-screen 112 (e.g., in some embodiments, a quick lift-off with minimal hovering is required), the device launches the instant messaging application (as shown in FIG. 9H). In some embodiments, the instant messaging application is launched to display a user interface that corresponds to the item at the location of the contact (e.g., contact 918). For example, contact 918 is on the application launch icon 904, and the application is launched to display conversation listing interface 920 of the instant messaging application upon lift-off of the contact (or upon detecting that finger 734 has exited the hover proximity range within a threshold amount of time after lift-off of contact 918). If the contact is on one of the avatars in mini application object 912, the device optionally launches the instant messaging application to display a conversation interface that corresponds to the avatar. If the contact is on one of the selectable options in quick action menu 914, the device launches a user interface that corresponds to the selectable option. FIG. 9G shows that, mini application object 912 and quick action menu 914 are restored to their original appearances upon contact of finger 734 with the touch-screen. In some embodiments (not shown), the user can move the contact (e.g., contact 918) to a desired location on the touch-screen (e.g., over one of the selectable options in the quick action menu or one of the avatars in the mini application object), and then lift off from that location to cause the application to be launched to display a corresponding user interface. In some embodiments, the device requires finger 734 to exit the hover proximity range within a threshold amount of time after lift-off of the contact in order to launch the application; otherwise, the transient user interface objects (e.g., the quick action menu and the mini application object) will be displayed while the finger reenters the hover proximity range and remains within the hover proximity range above the touch-screen.

FIG. 9I illustrates that, instead of moving closer to the touch-screen and making contact with the touch-screen, if finger 734 moves further away from the touch-screen but remains within the hover proximity range above the touch-screen, mini application object 912 and quick action menu 914 become increasingly translucent (e.g., more so than that shown in FIG. 9F) as finger 734 moves away from the touch-screen. In addition, mini application object 912 and quick action menu 914 are lifted off the home screen user interface with the hovering finger 734 leaving a longer shallow on the home screen user interface. FIG. 9I also shows that, when mini-application object 912 and become more translucent, the amount of blurring and darkening applied to home screen user interface 902 are also reduced, indicating to the user that home screen user interface 902 will be fully restored if finger 734 continues to move away from the touch-screen and exits the hover proximity range above the touch-screen.

FIG. 9J illustrate that the transient user interface objects that are displayed during the hovering in process (e.g., when the input object is moving toward the touch-screen and moving into the hover proximity range) and during the hovering out process (e.g., when the input object is moving away from the touch-screen and moving out of the hover proximity range) are different, and that the appearances of the transient user interface objects may change in different ways in response to the changing hover proximity parameter of the input object. In the top row of FIG. 9J, when finger 734 has just entered the hover proximity range above the touch-screen and has not make any contact with the touch-screen, a preview platter is displayed behind the application launch icon (e.g., as shown in (A)); the preview platter grows larger when the finger moves closer to the touch-screen (e.g., as shown in (B)); and when the finger presses against the touch-screen, the preview platter expands and shifts, and eventually transforms into the mini application object and the quick action when the intensity of the contact exceeds the light press threshold (as shown in (C)). In the bottom row of FIG. 9J, after the finger has made contact with the touch-screen and after the mini application object and the quick action menu have been displayed, moving the finger away from the touch-screen makes the mini application object and the quick action menu increasingly translucent indicating that they would cease to be displayed once the finger is lifted out of the hover proximity range above the touch-screen (e.g., as shown in (D) and (E)); and moving the finger toward the touch-screen makes the mini-application object and the quick action menu increasingly opaque indicating that they will be restored completely to their initial appearances when the finger makes contact with the touch-screen again (as shown in (F)).

FIG. 9K continues from FIG. 9E, where after mini application object 912 and quick action menu 914 have been displayed in response to detecting the intensity of contact 910 exceeding the light-press intensity threshold (as indicated by intensity meter 901), intensity of the contact is decreased and mini application object 912 and quick action menu 914 maintain their original appearance as long as the contact is maintained.

FIGS. 9L and 9M illustrate that a quick lift-off (e.g., the speed of finger 734 exceeding a first threshold speed and/or finger 734 exiting the hover proximity range within a threshold amount of time), the transient user interface objects (e.g., mini application object 912 and quick action menu 914) cease to be displayed even while finger 734 is still moving through the hover proximity range above touch-screen 112 (as shown in FIG. 9L).

FIGS. 9N-9O continue from FIG. 9E or 9I, where finger 934 has not made contact with touch-screen 112 again after the display of mini application object 912 and quick action menu 914. FIGS. 9N-9O illustrate that, when finger 934 is lifted out of the hover proximity range slowly (e.g., the speed of finger 734 is below a second threshold speed and/or finger 734 lingers within the hover proximity range for more than a threshold amount of time), the transient user interface objects (e.g., mini application object 912 and quick action menu 914) remain displayed for a brief moment even after finger 734 has exited the hover proximity range above touch-screen 112 (as shown in FIG. 9N). FIG. 9O shows that, the transient user interface objects only linger for a brief moment (e.g., 200 ms) and cease to be displayed after that brief moment has passed. In some embodiments (not shown), if finger 734 reenters the hover proximity range, the device maintains display of the transient user interface object and interprets the exit of finger 734 as accidental and ignores it.

In some embodiments, FIG. 9K continues from FIG. 9G, where finger 934 has made contact with touch-screen 112 again after the display of mini application object 912 and quick action menu 914, when finger 934 is lifted out of the hover proximity range sufficiently slowly (e.g., the speed of finger 734 is below a second threshold speed and/or finger 734 lingers within the hover proximity range for more than a threshold amount of time). In such cases, no application launching operation is activated upon lift-off of the contact, and the transient user interface objects (e.g., mini application object 912 and quick action menu 914) remain displayed after finger 734 is lifted off touch-screen 112.

Figure 10A:
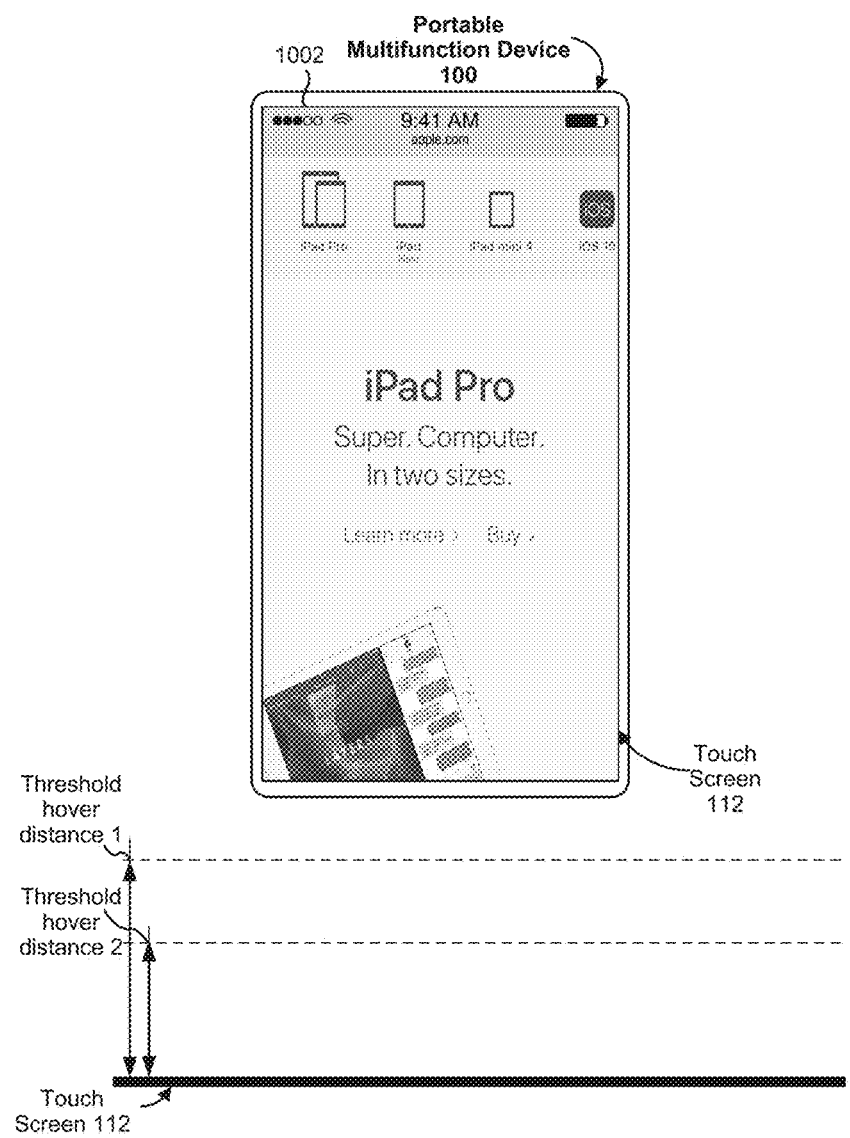
FIGS. 10A-10Y illustrate exemplary user interfaces for displaying different visual feedback when an input object is detected to meet different levels of hover proximity criteria, in accordance with some embodiments.
Figure 10B:
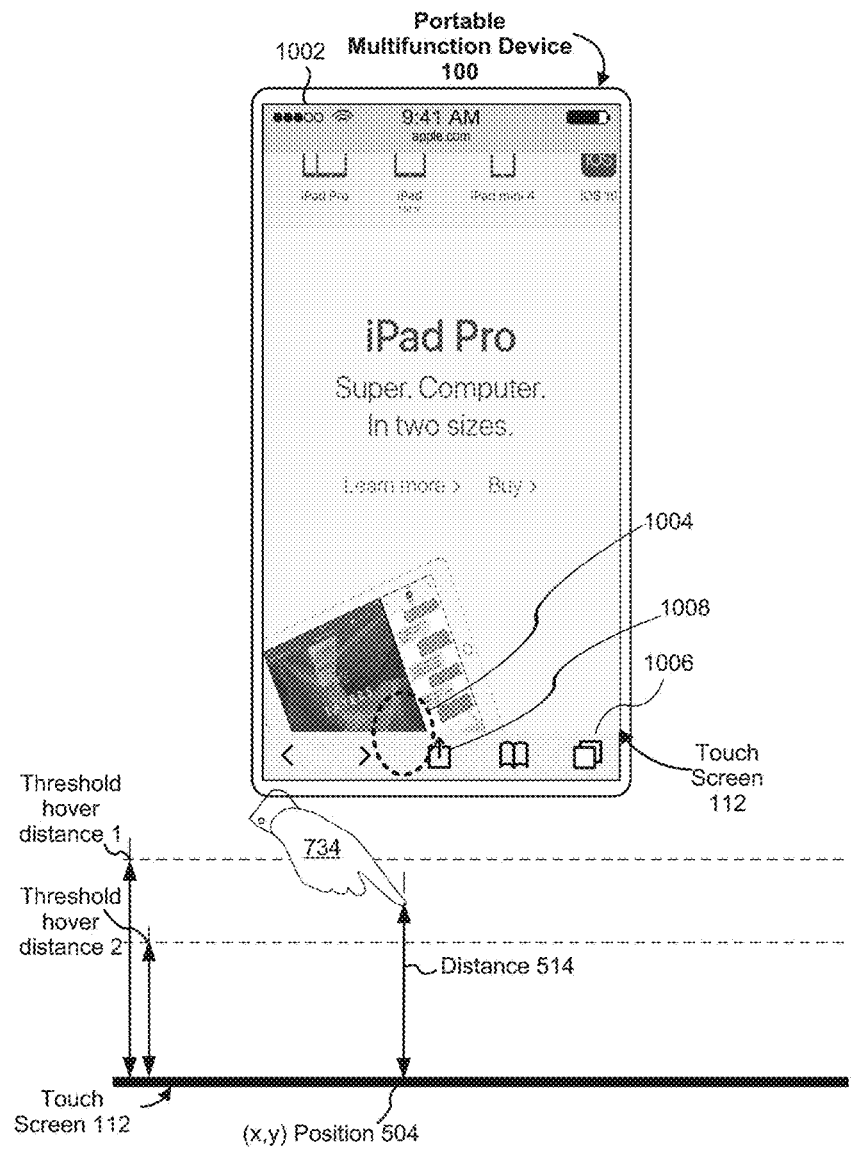
Figure 10C:
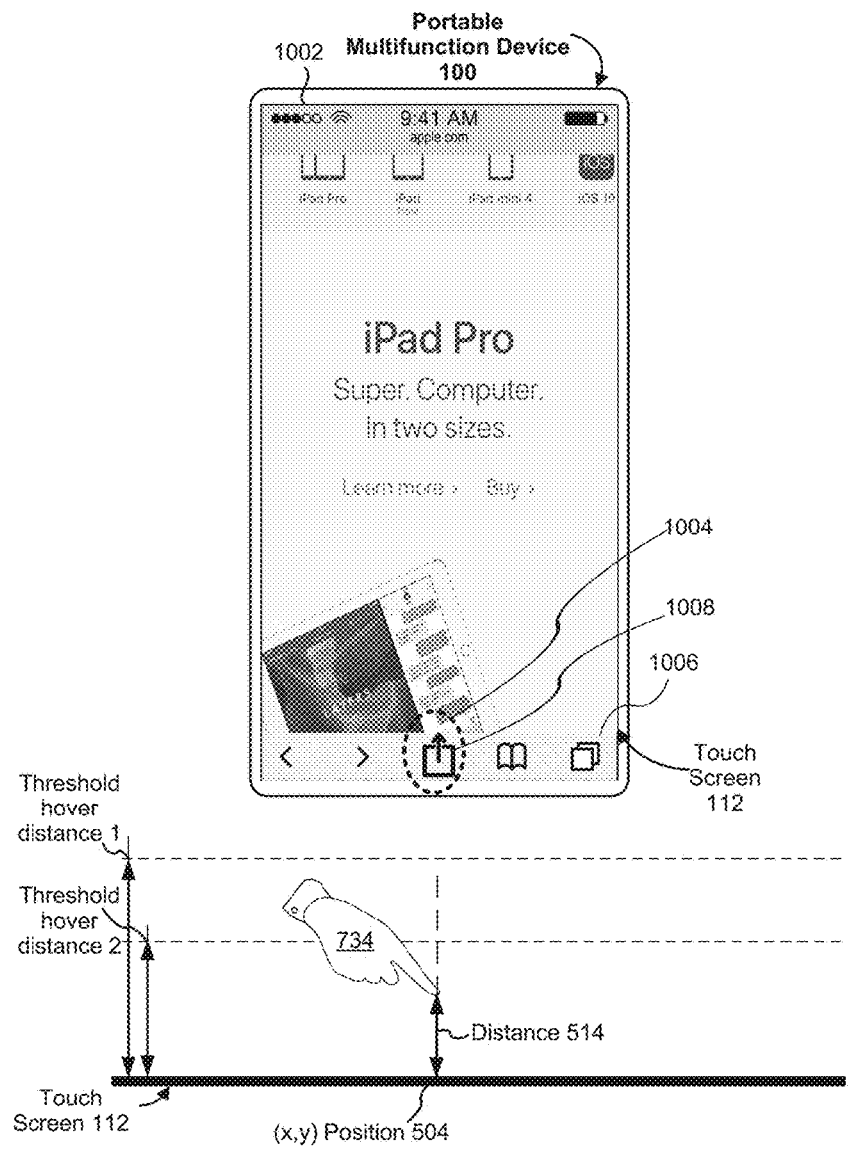
Figure 10D:
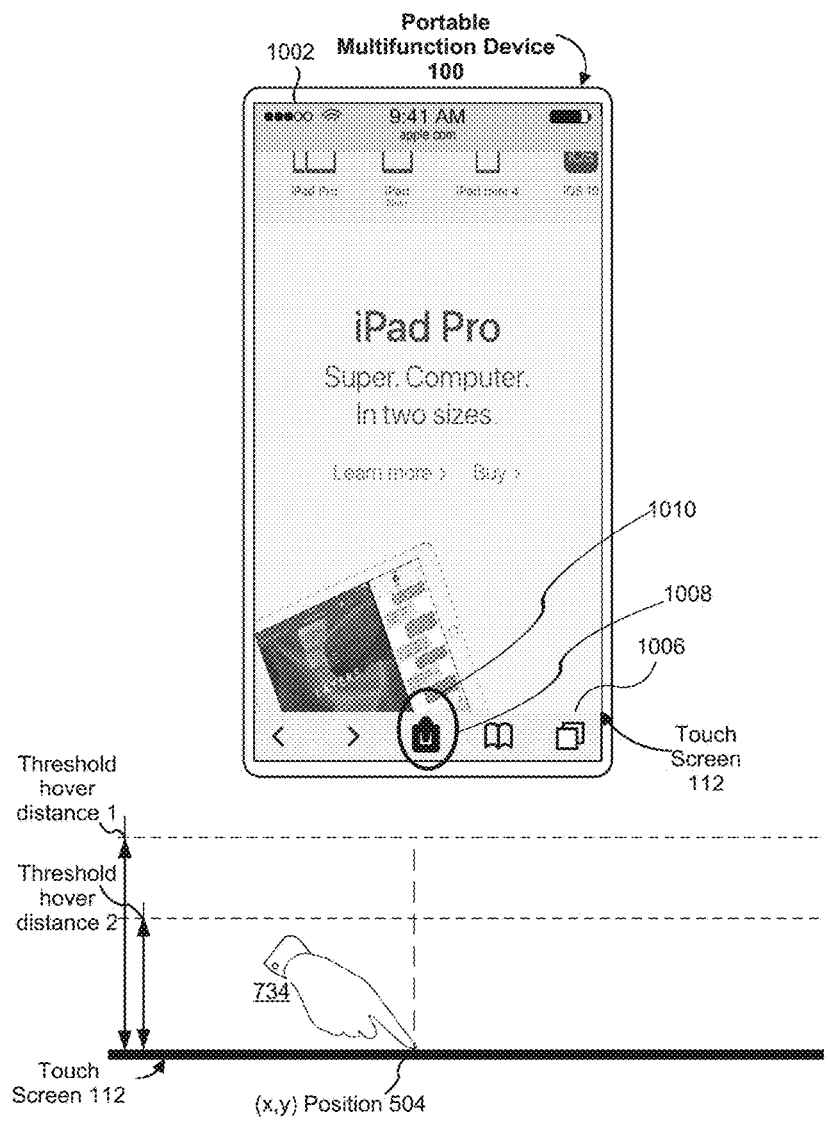
Figure 10E:
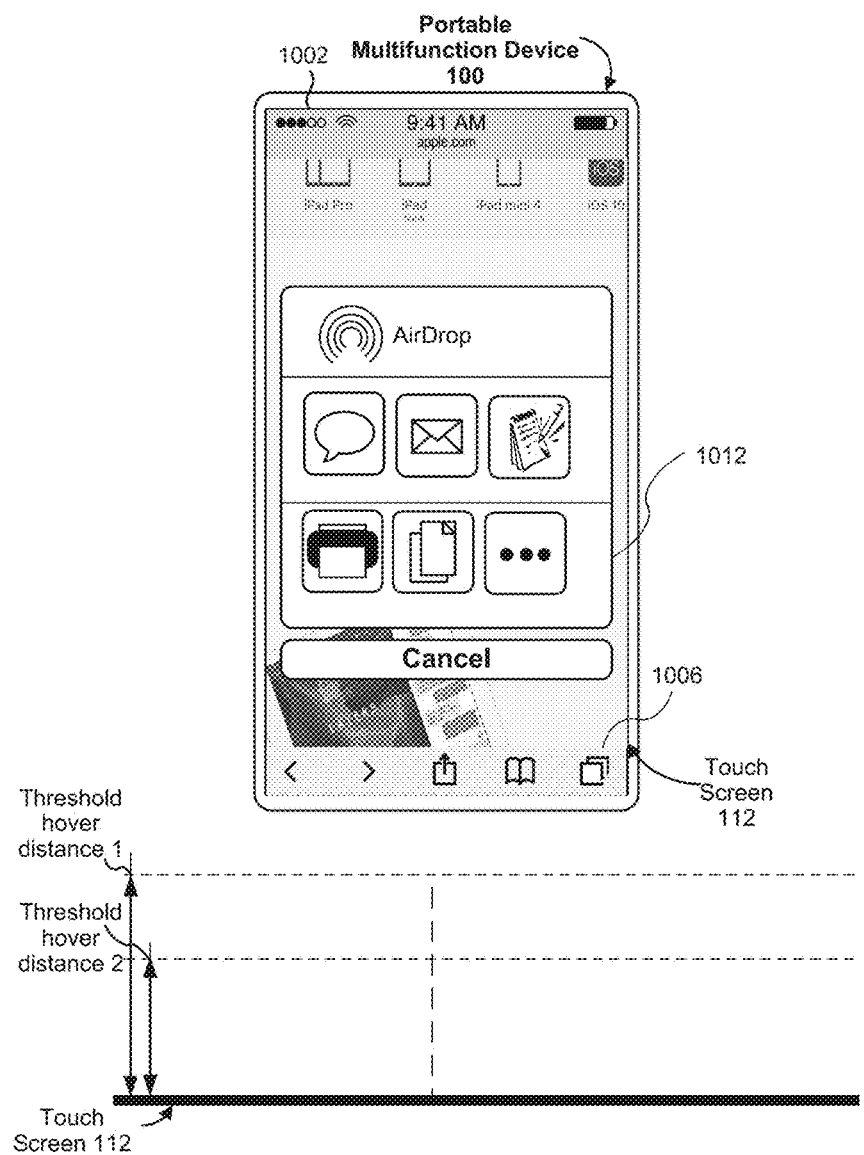
Figure 10F:
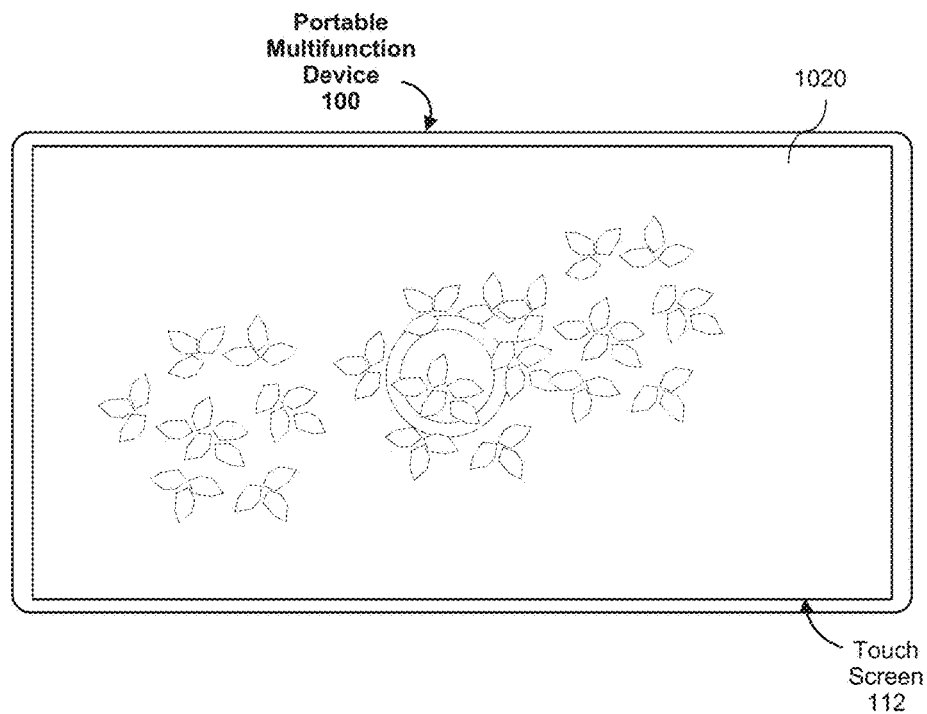
Figure 10F:
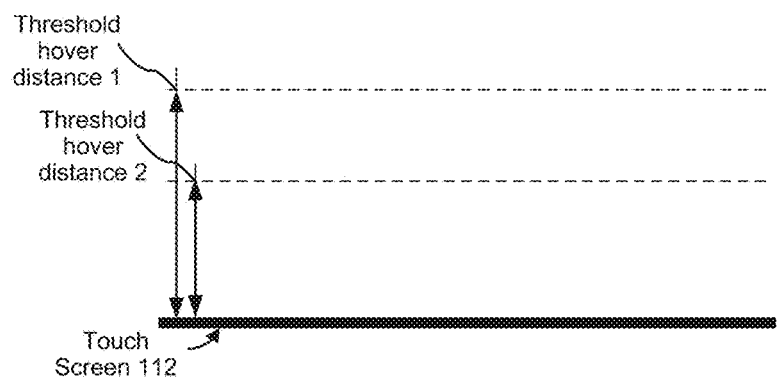
Figure 10G:
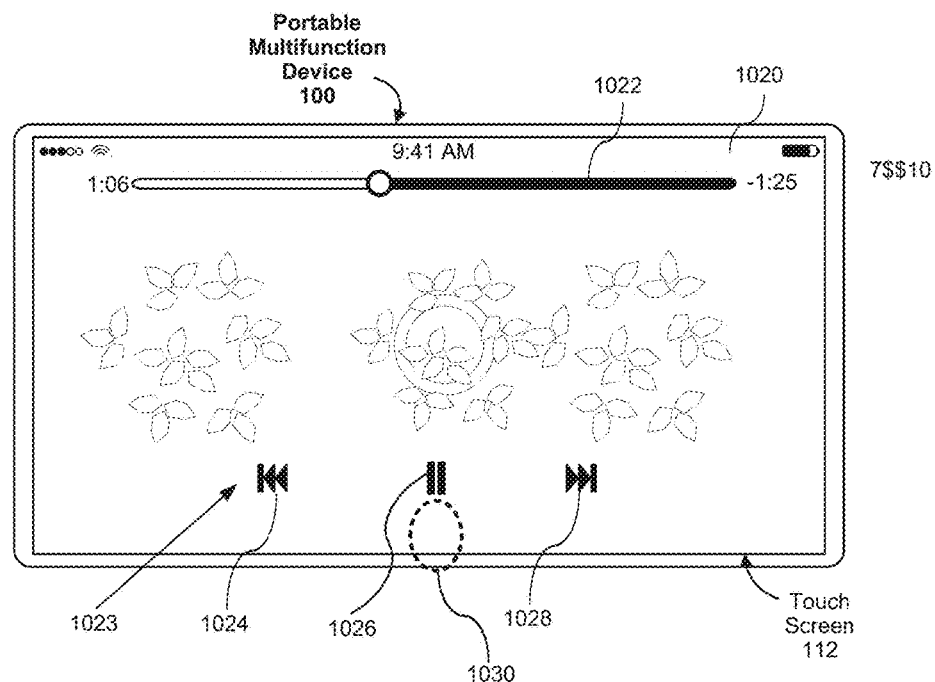
Figure 10G:
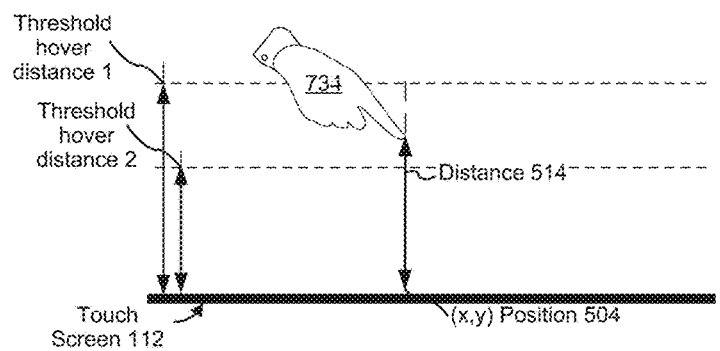
Figure 10H:
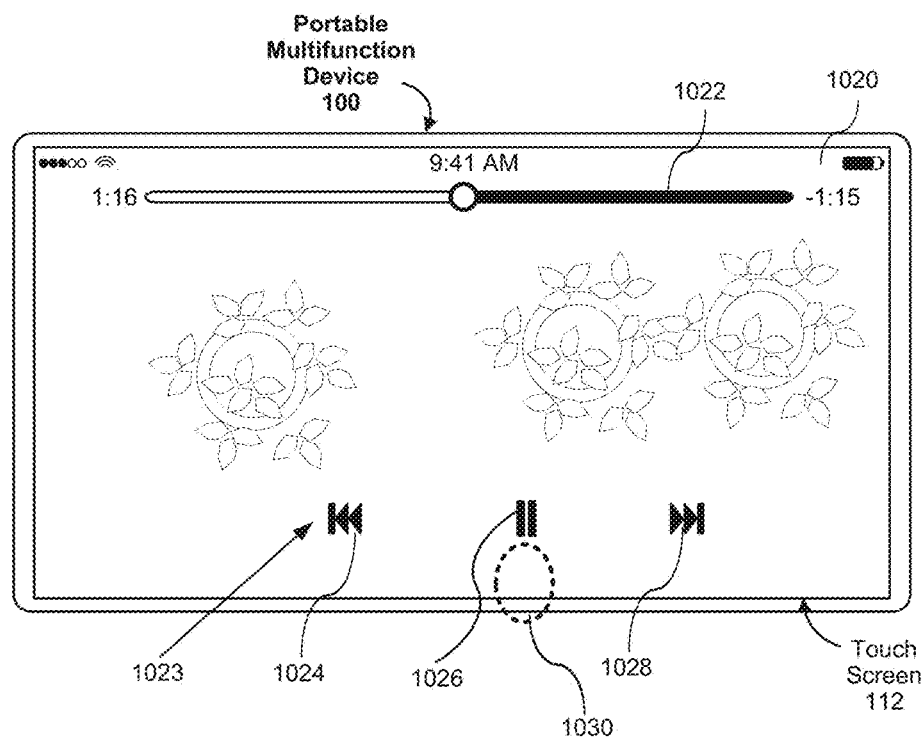
Figure 10H:
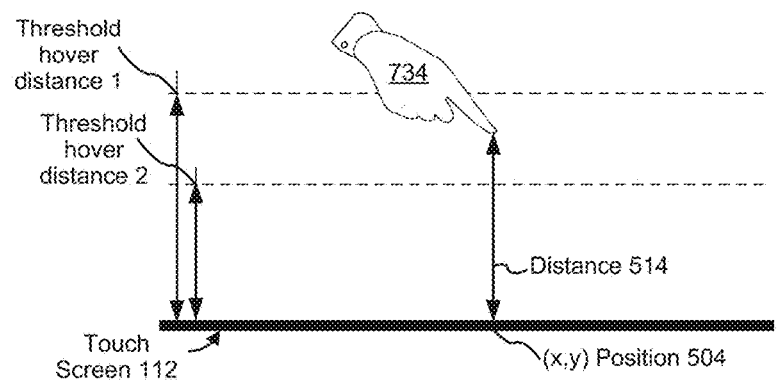
Figure 10I:
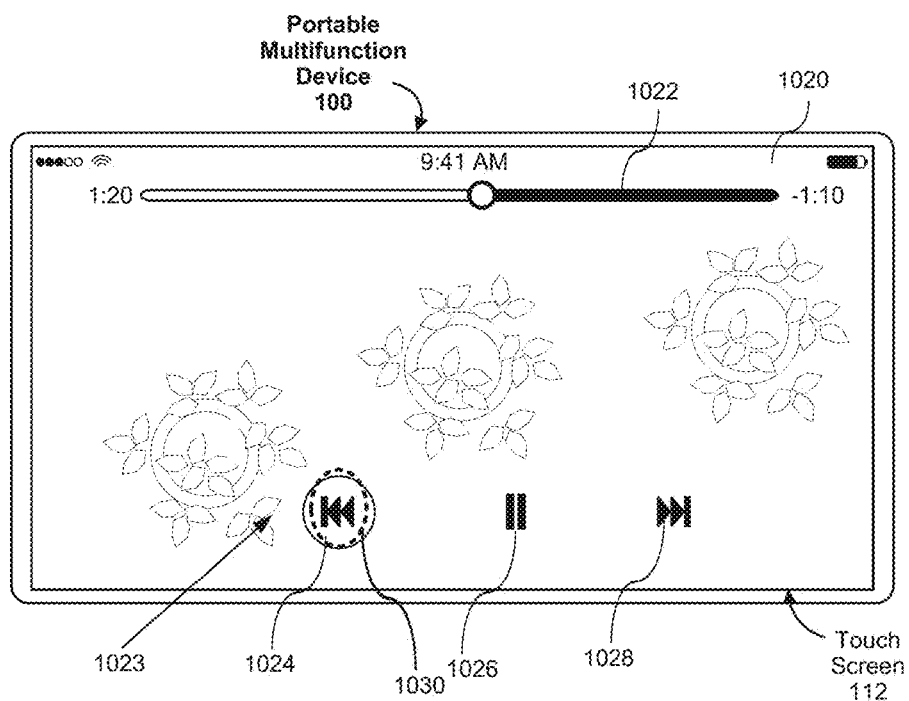
Figure 10I:
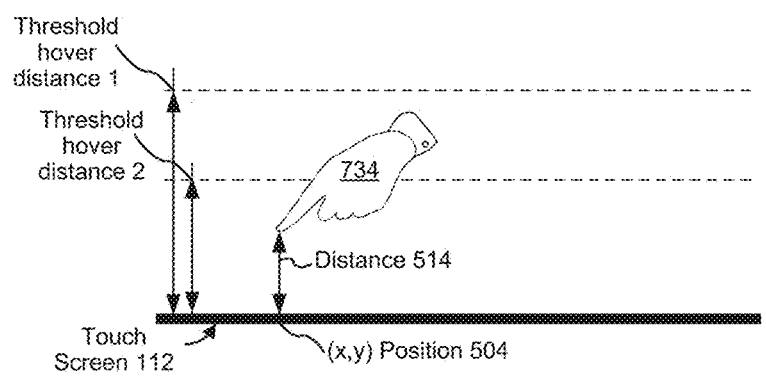
Figure 10J:
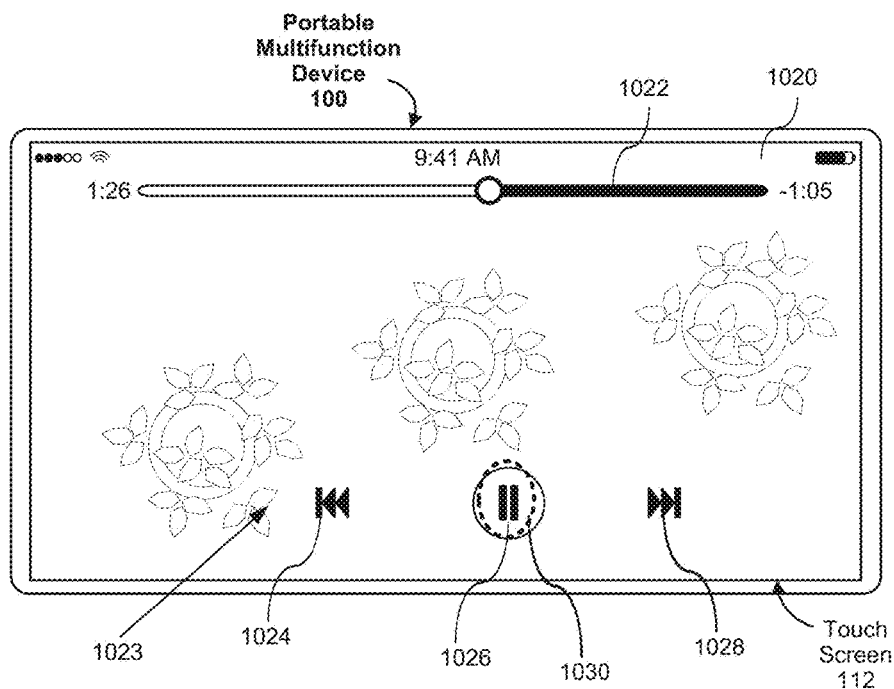
Figure 10J:
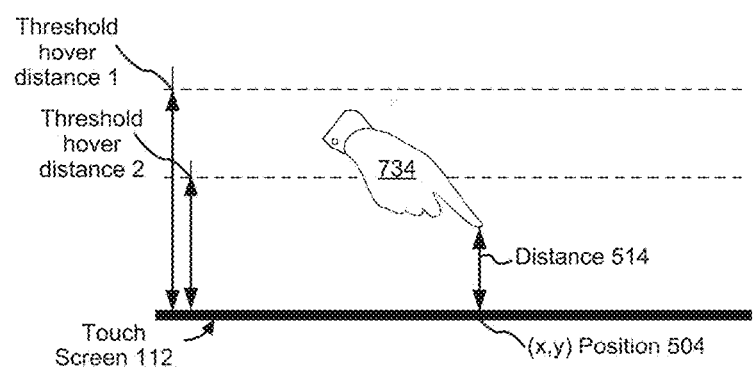
Figure 10K:
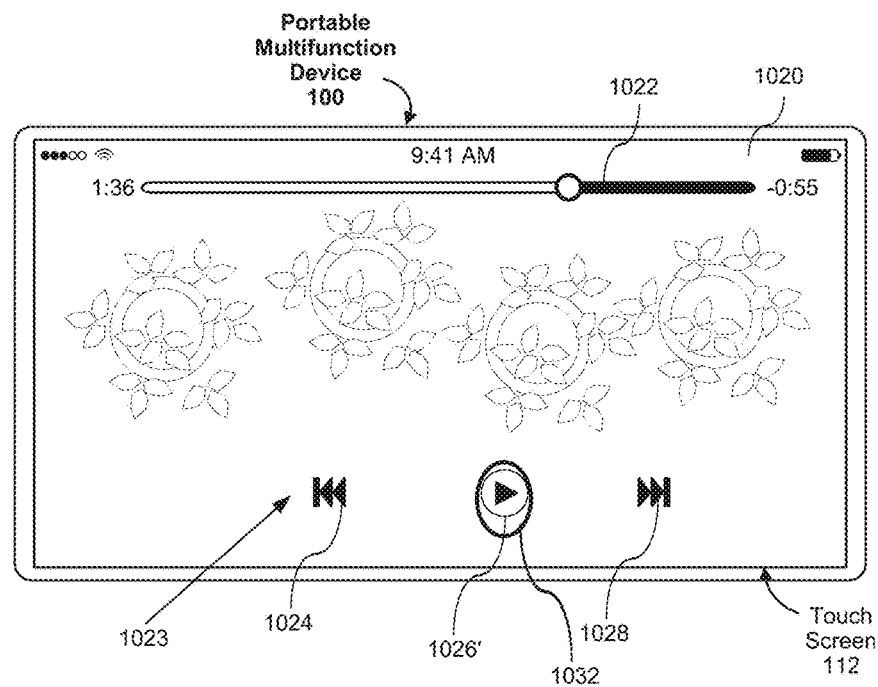
Figure 10K:
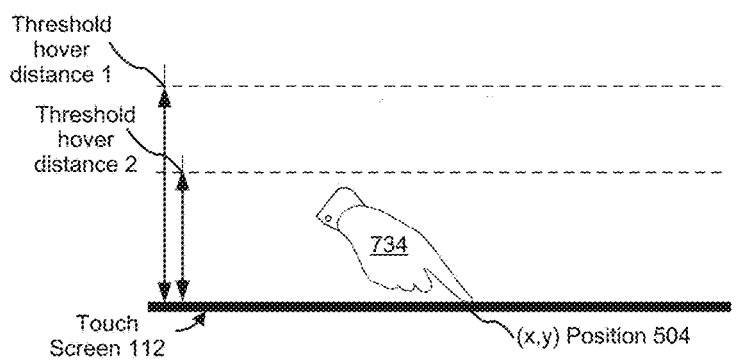
Figure 10L:
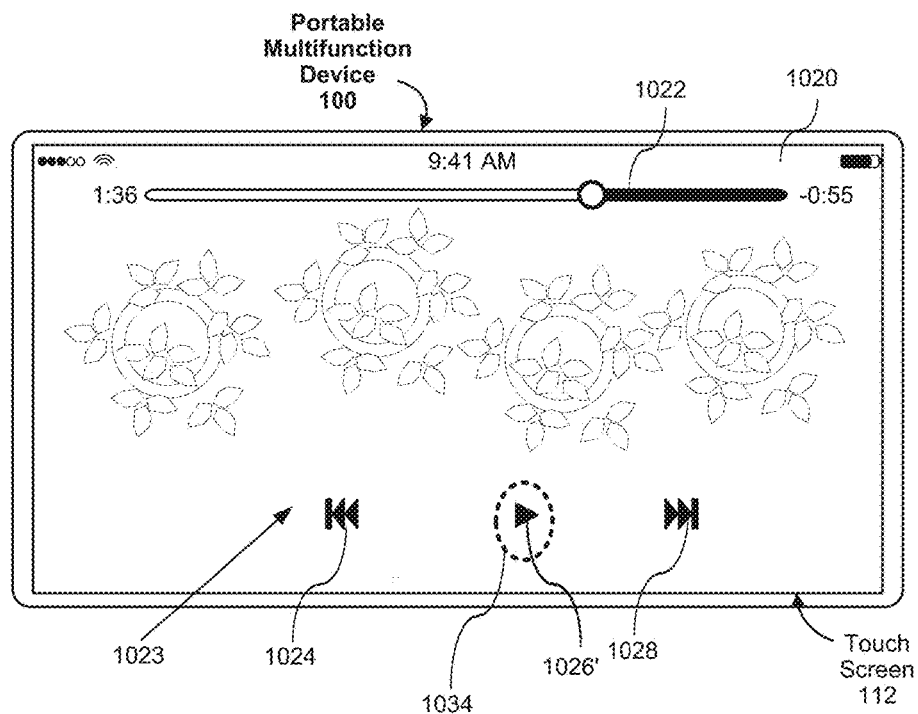
Figure 10L:
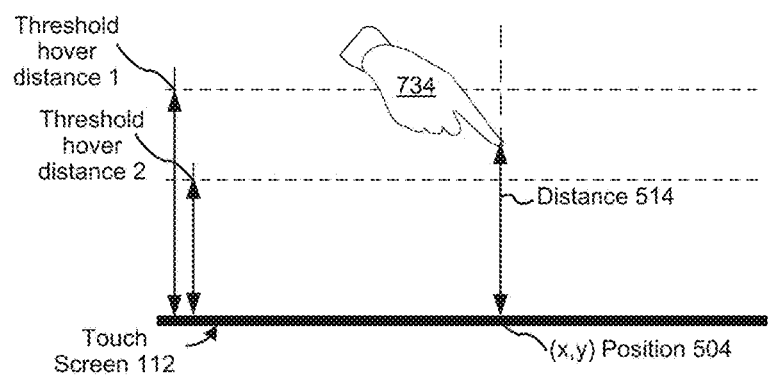
Figure 10M:
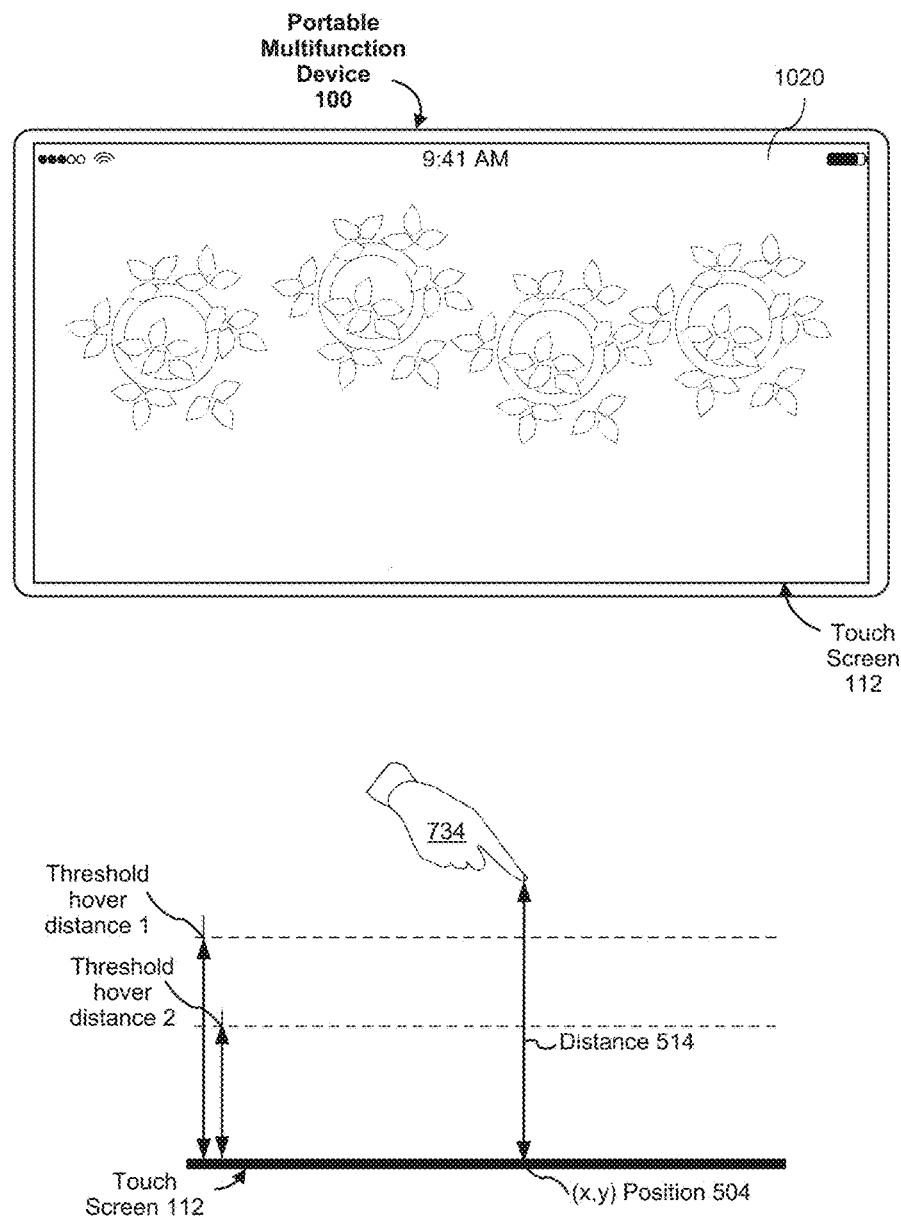
Figure 10N:
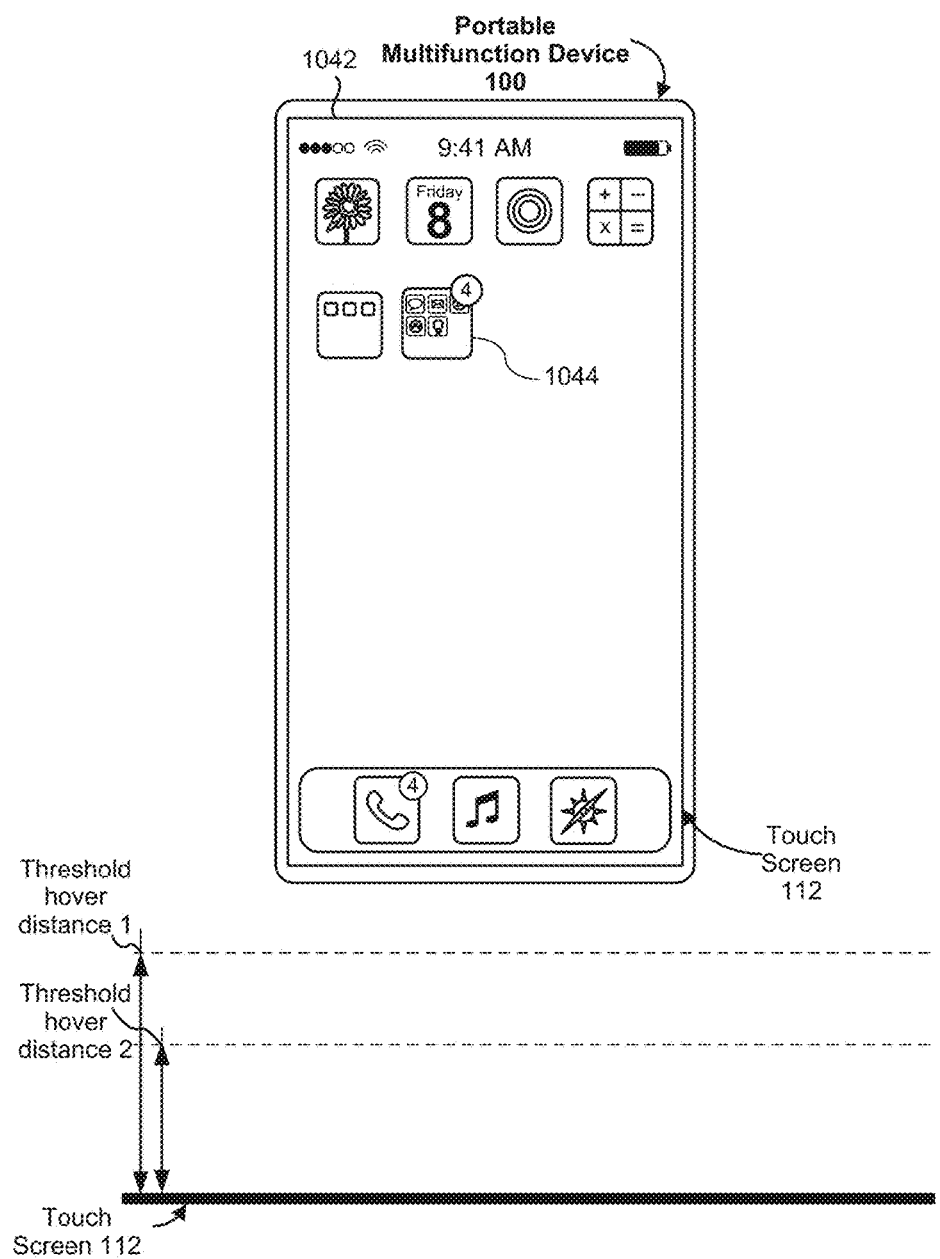
Figure 10O:
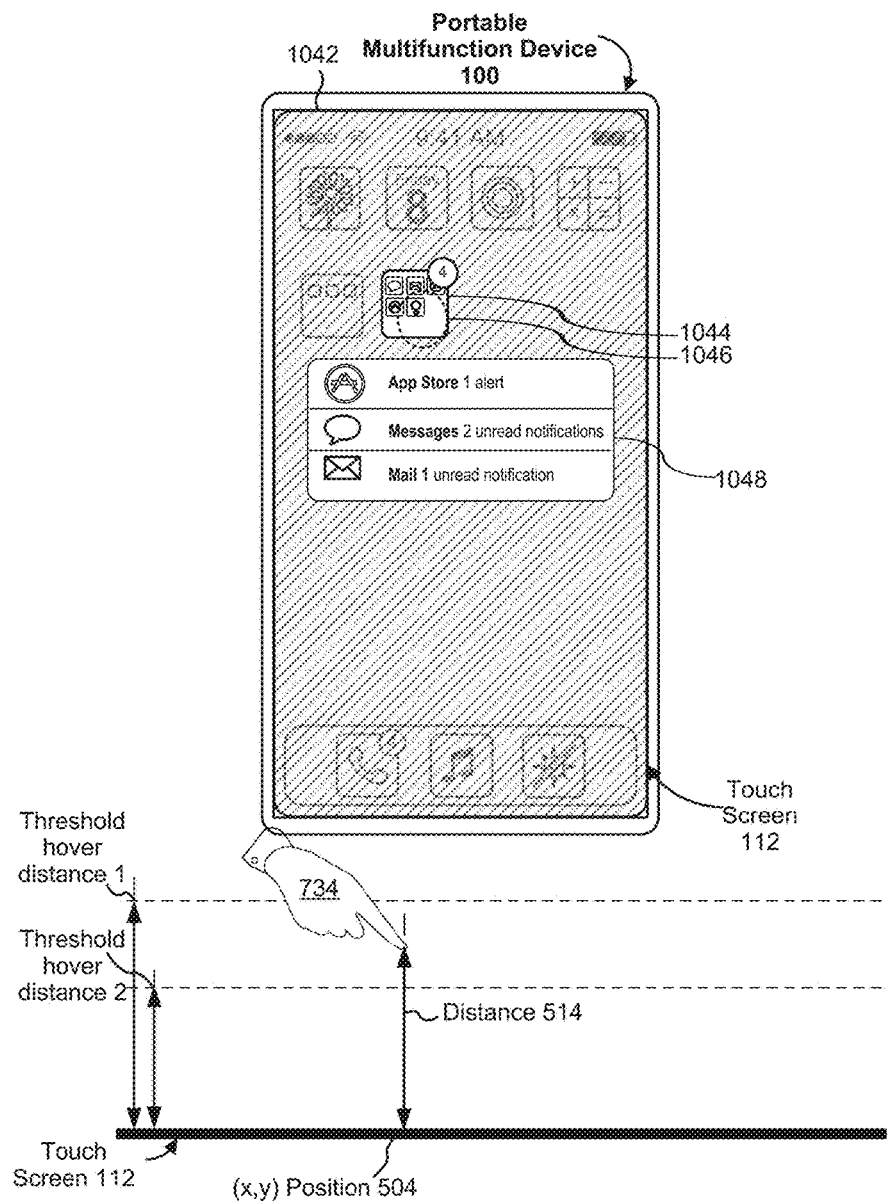
Figure 10P:
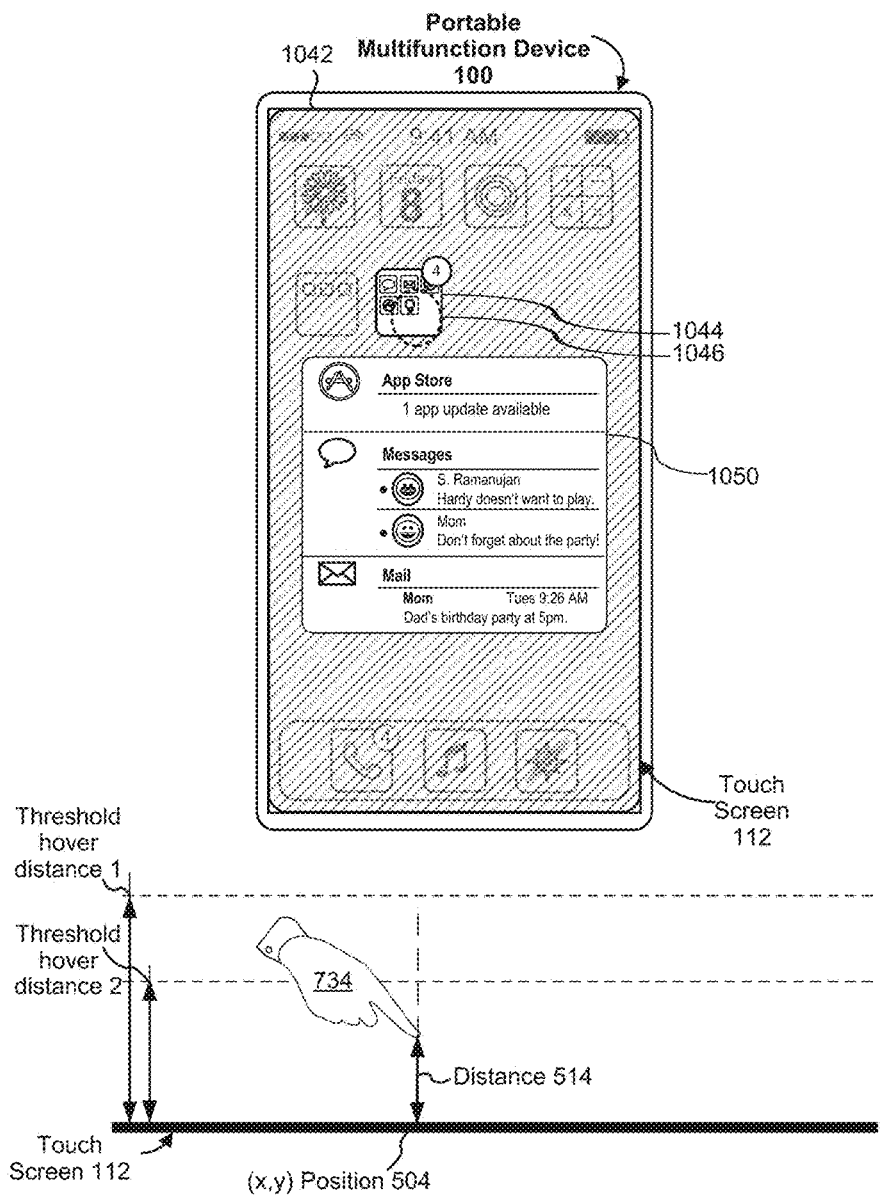
Figure 10Q:
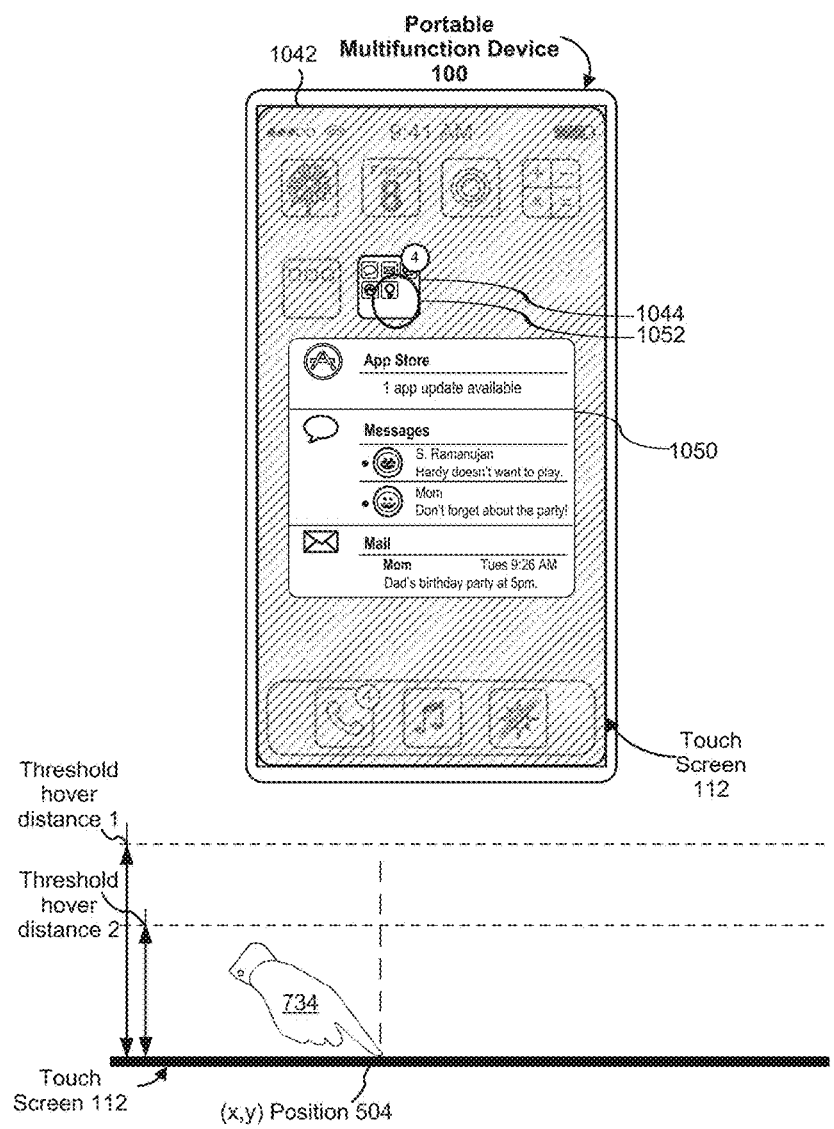
Figure 10R:
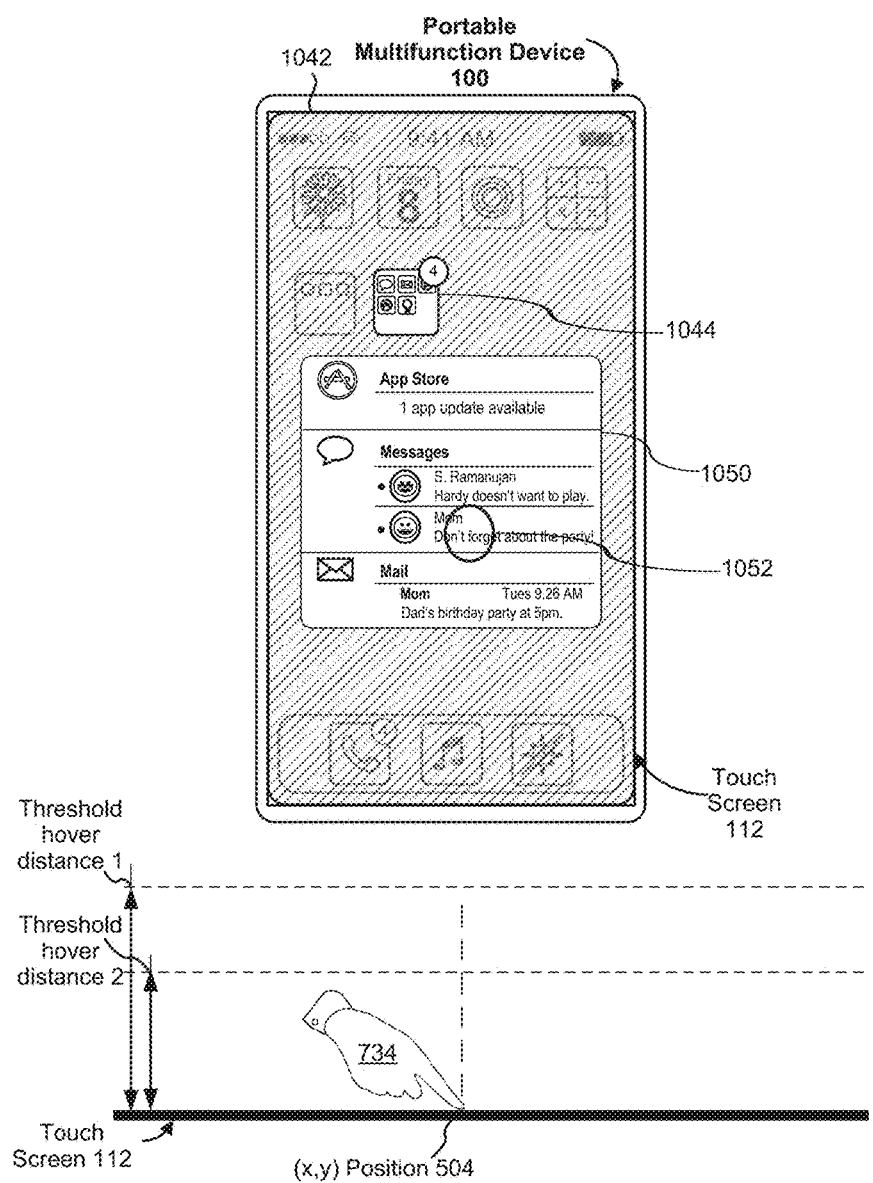
Figure 10S:
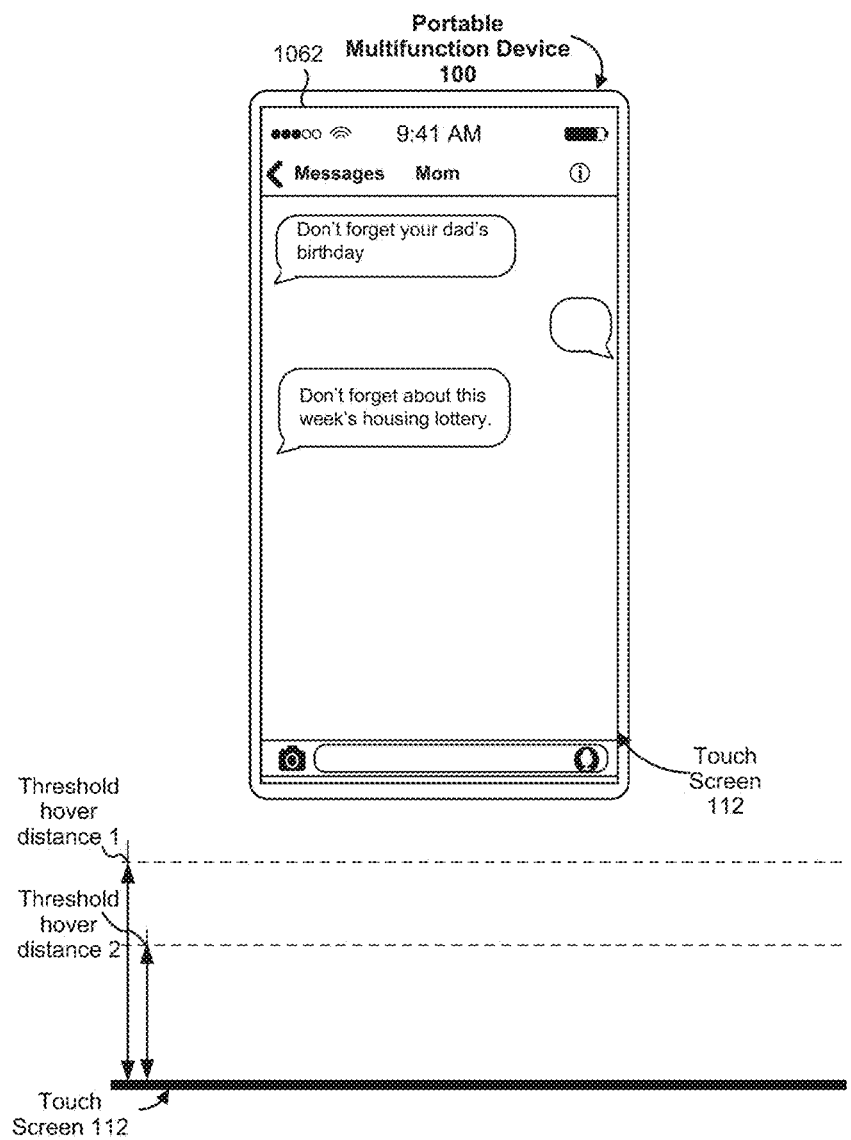
Figure 10T:
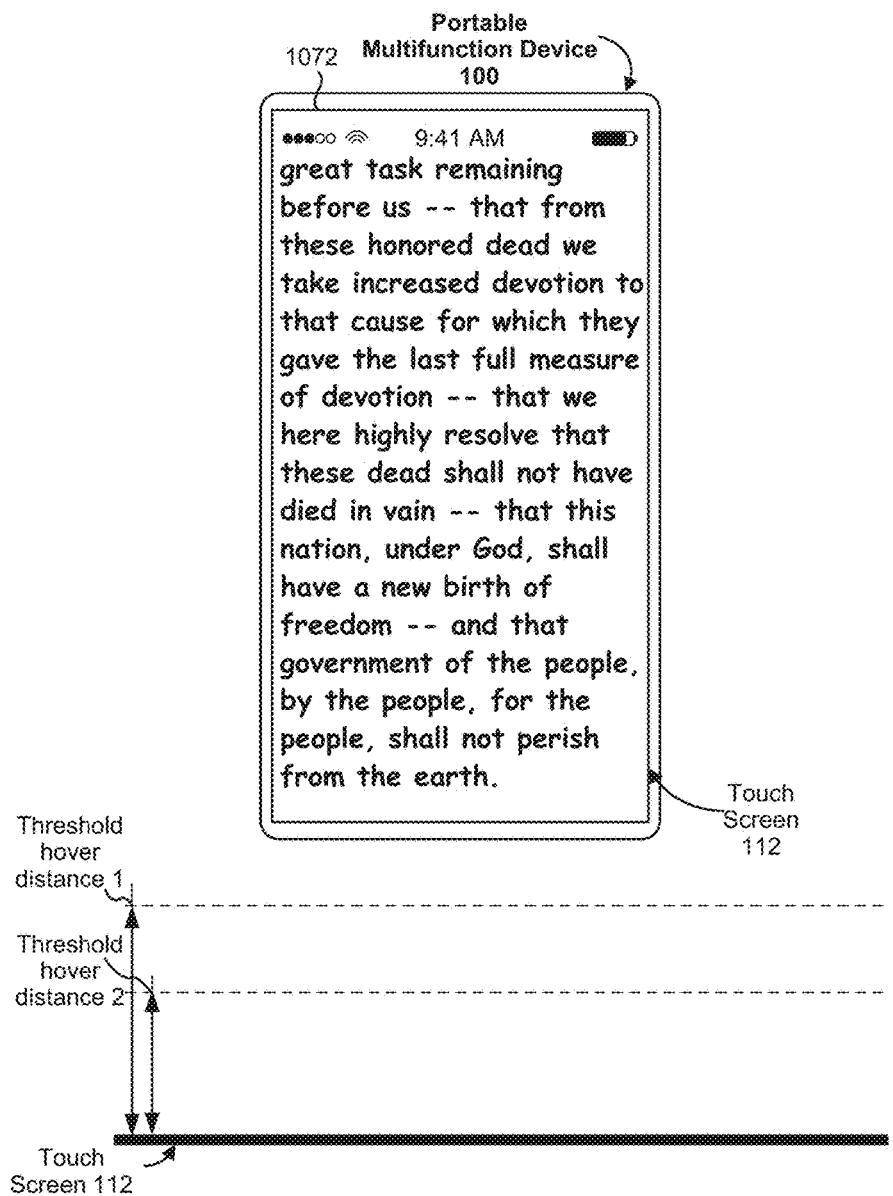
Figure 10U:
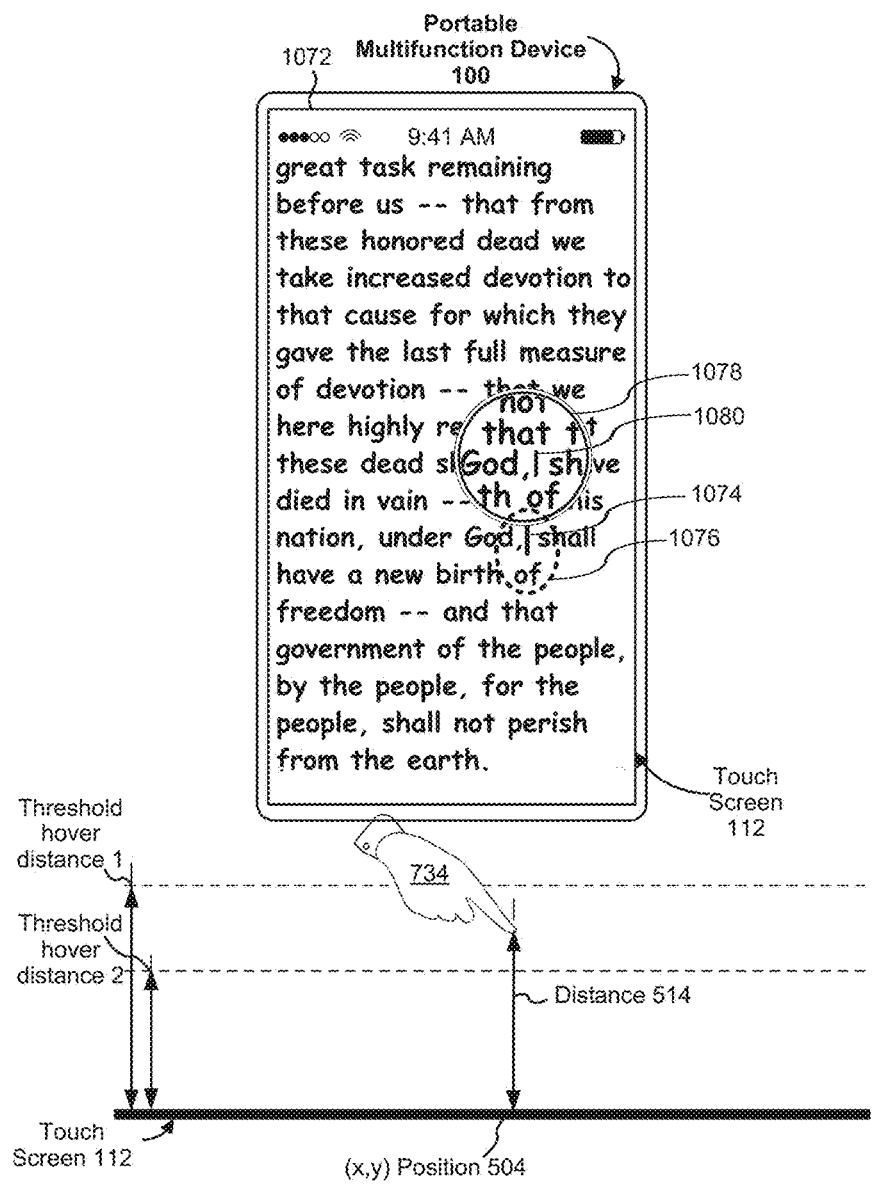
Figure 10V:
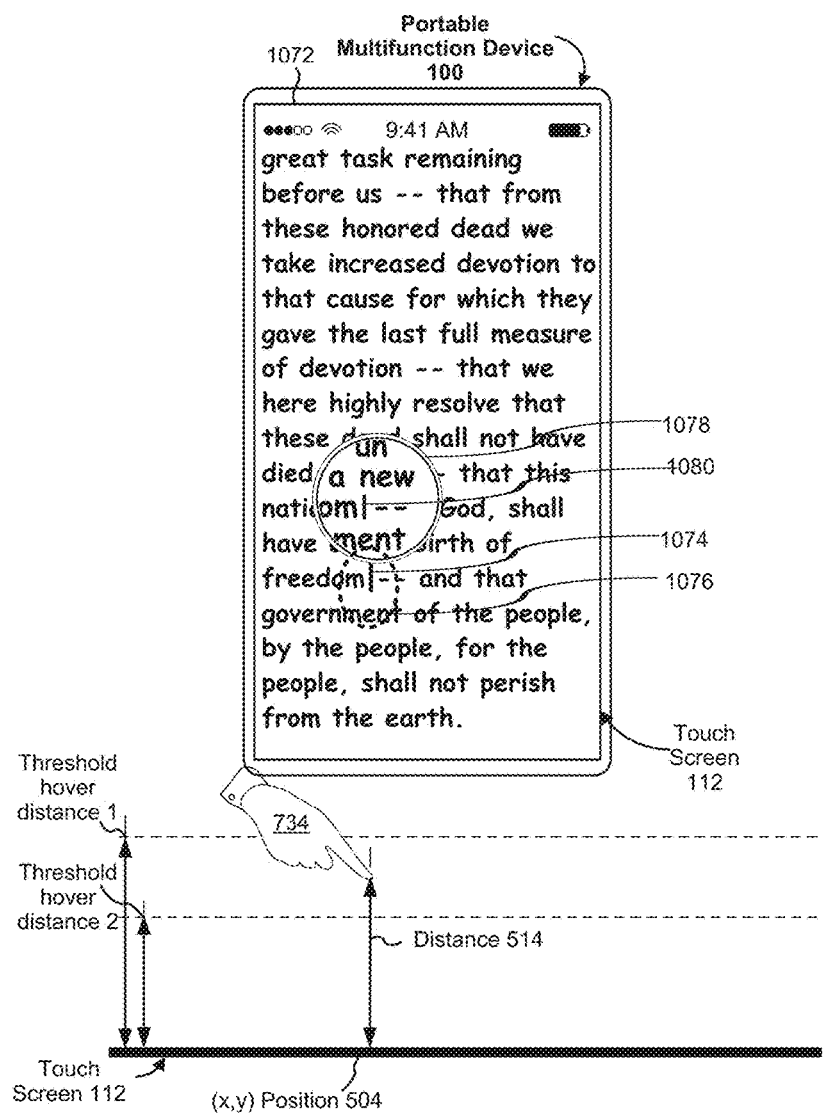
Figure 10W:
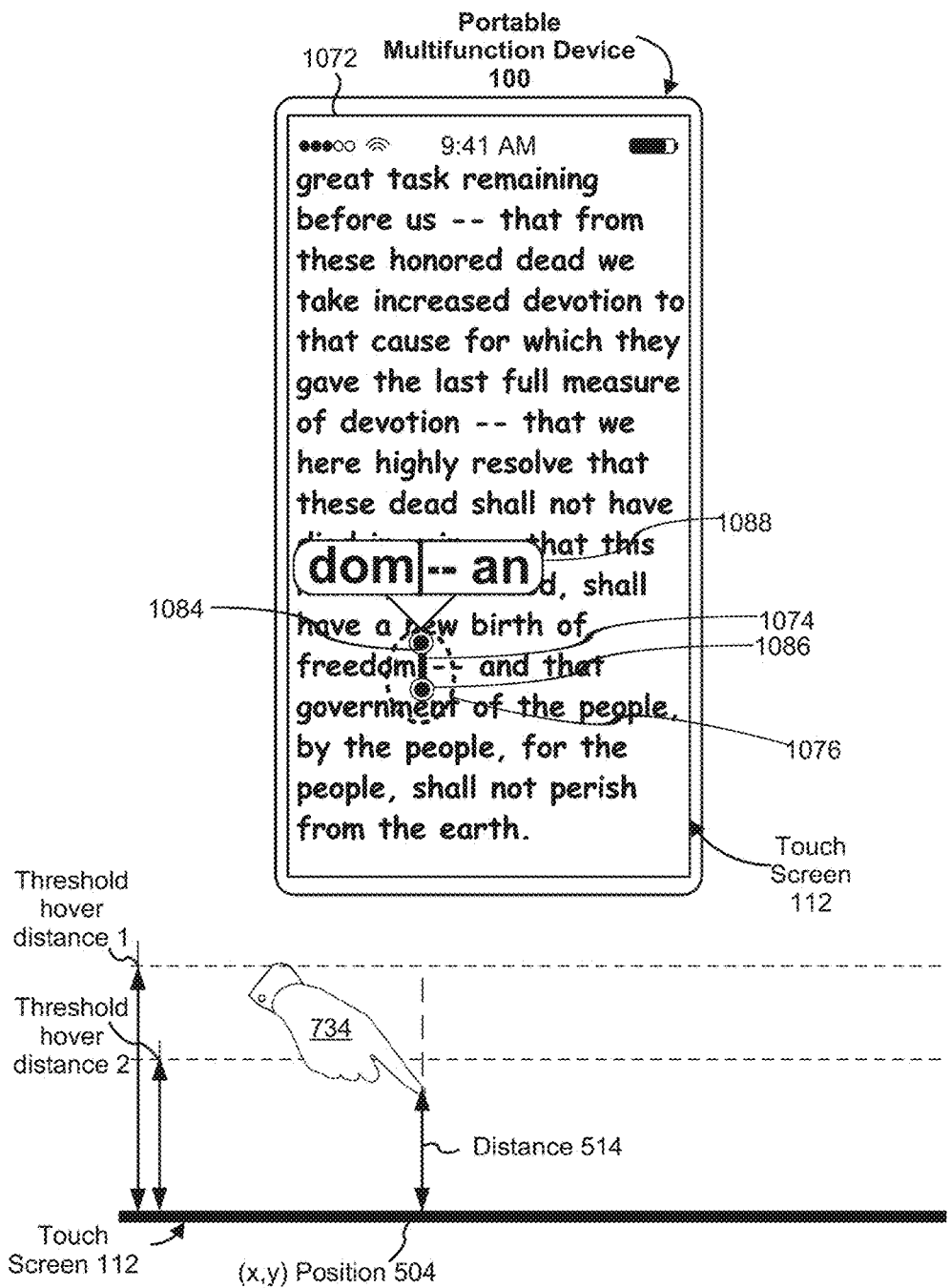
Figure 10X:
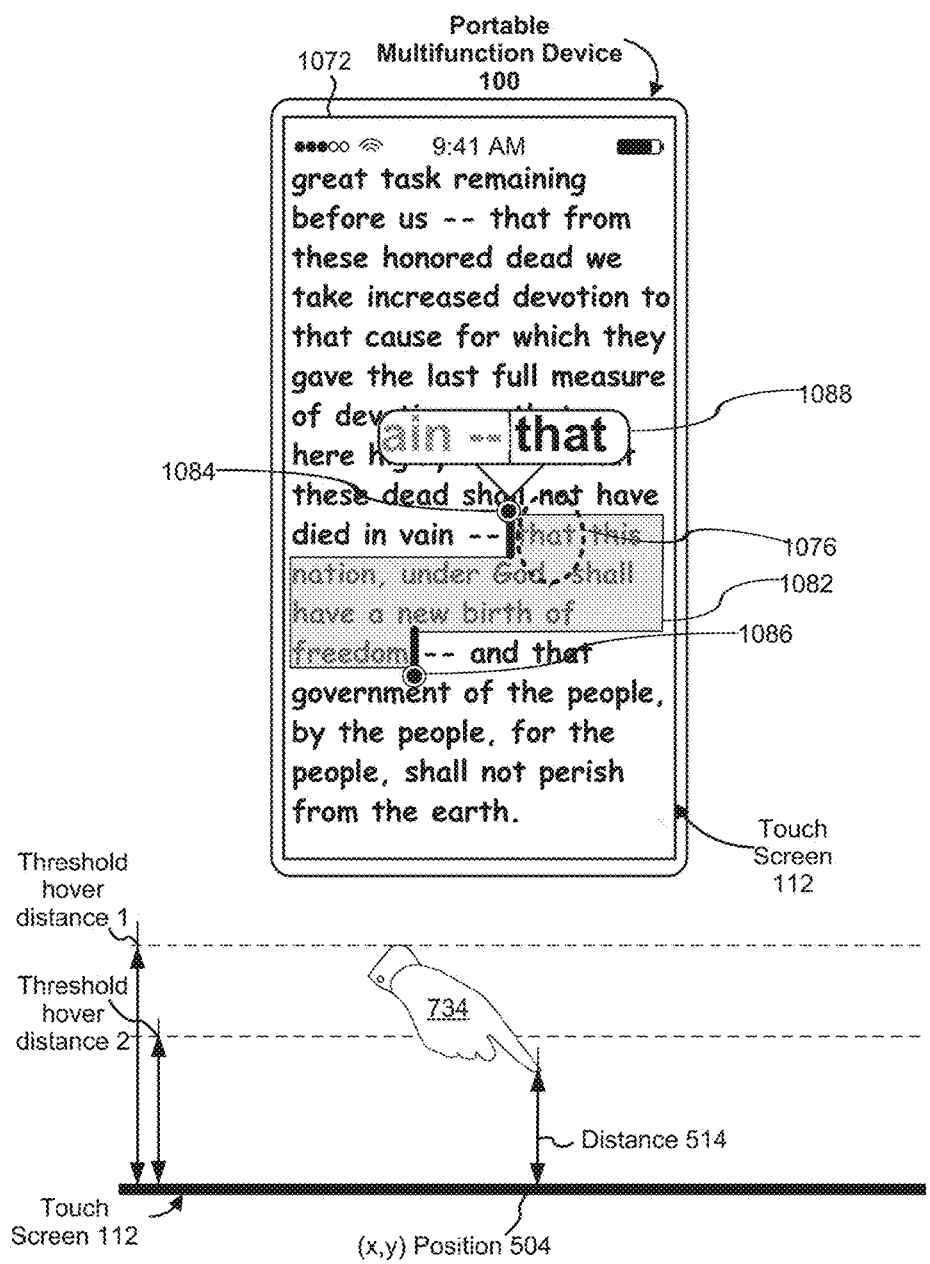
Figure 10Y:
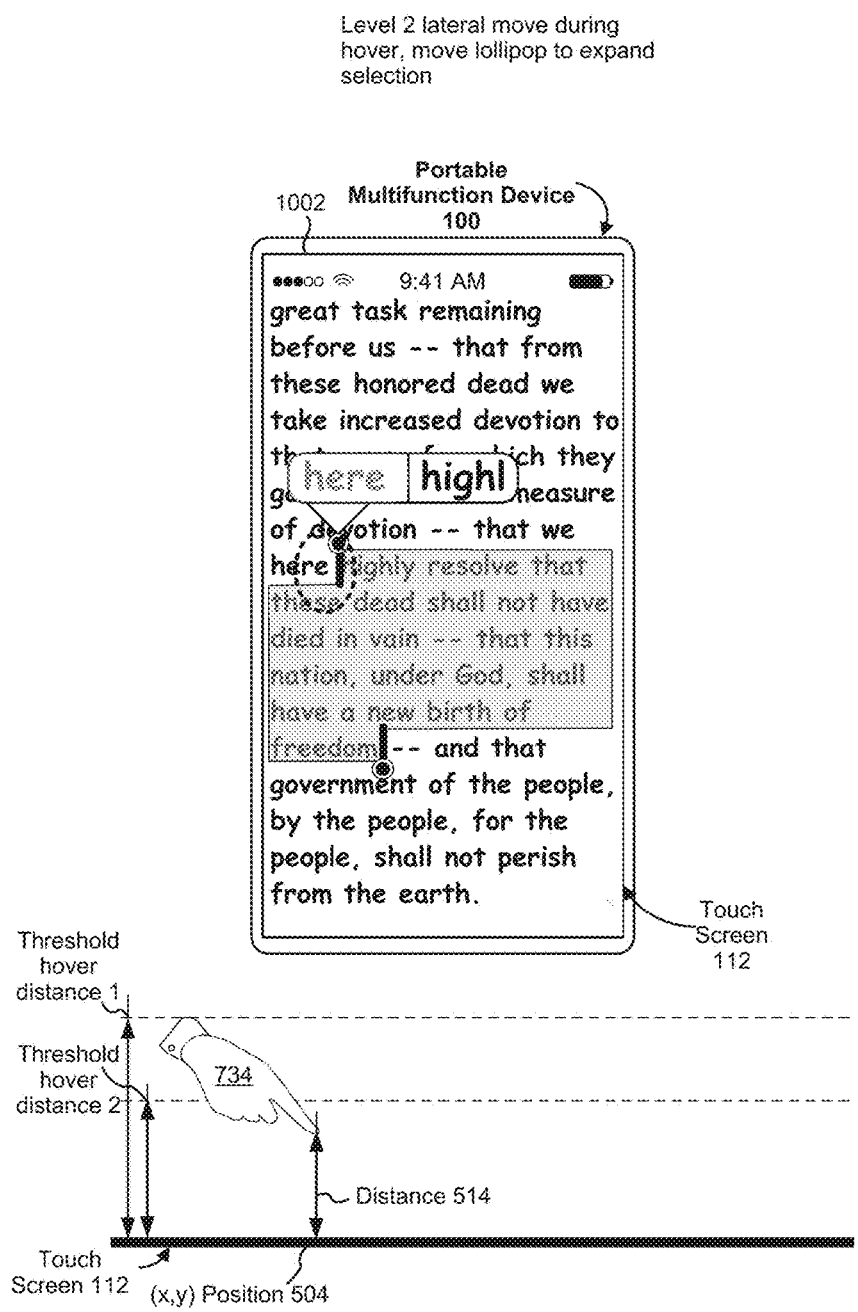

FIGS. 10A-10Y illustrate different device responses to input object entering and/or exiting different levels of hover proximity ranges in accordance with some embodiments.

10A-10E illustrate displaying a tool bar when finger 734 enters a first hover-proximity range from outside of the first hover proximity range, and activating or highlighting a control in the tool bar when finger 734 enters a second hover proximity range from outside of the second hover proximity range, where the first hover proximity range is a bigger range that includes the second hover proximity range. For example, the first hover proximity range corresponds to a larger threshold hover distance (e.g., threshold hover distance 1) above the touch-screen, and the second hover proximity range corresponds to a smaller threshold hover distance (e.g., threshold hover distance 2) above the touch-screen.

FIG. 10A shows a user interface (e.g., browser user interface 1002). Browser user interface 1002 displays content of a web page. Browser user interface 1002 is displayed in a full-screen mode without showing any menu bars or tool bars of the browser application.

FIG. 10B shows that when finger 734 enters the first level hover proximity range from outside of the first level hover proximity range, while the (x,y) position 504 of finger 734 is within a predefined lower edge portion of touch-screen 112 (e.g., as indicated by indication 1004 of finger 734 relative to touch-screen 112), the displayed content in browser user interface 1002 is shifted as a whole upward away from the lower edge of the touch-screen and a tool bar (e.g., tool bar 1006) is displayed in the space vacated by the shifted content. In some embodiments (not shown), when finger 734 then moves out of the first level hover proximity range without first entering the second level hover proximity range, the displayed content shifts back down toward the lower edge of the touch-screen and the tool bar ceases to be displayed. It is noted that indication of finger 734 is not visible on the touch-screen in some embodiments.

FIG. 10C illustrates that, when finger 734 continues to move toward the touch-screen while remaining near the bottom edge of the touch-screen (as indicated by indication 1004 of finger 734 relative to touch-screen 112) and upon finger 734 entering the second level hover proximity range from outside of the second level hover proximity range, a control affordance (e.g., affordance 1008 for sharing the displayed content) in tool bar 1006 that is nearest finger 734 is highlighted and enlarged. In some embodiments, if finger 734 does not continue to move toward the touch-screen, but exits the second level hover proximity range by moving away from the touch-screen, the highlighting on control affordance 1008 is removed and control affordance 1008 is restored to its original appearance. While finger 734 still remains within the first level hover proximity range, tool bar 1006 remains displayed with all its affordances in their original appearances. In some embodiments (not shown), if finger 734 moves laterally to a hover location over another control affordance in tool bar 1006 while finger 734 remains within the second level hover proximity range, the control affordance that is nearest finger 734 is highlighted and enlarged instead of affordance 1008.

FIGS. 10D-10E illustrate that, when finger 734 makes contact with the touch-screen at a touch location that corresponds to a control affordance in tool bar 1006 (e.g., indicated by contact 1010 on the highlighted control affordance 1008), an operation corresponding to the selected control affordance 1008 is performed (e.g., a sharing card 1012 showing various sharing options is displayed). In some embodiments (not shown), after tool bar 1006 is displayed, moving finger 734 toward the touch-screen does not highlight any control affordance, and a control affordance is activated only when finger 734 makes contact with the touch-screen at a touch location that corresponds to the control affordance.

FIGS. 10F-10M illustrate displaying a control panel that includes one or more control affordances when finger 734 enters a first hover-proximity range from outside of the first hover proximity range, and highlighting a control in the tool bar when finger 734 enters a second hover proximity range from outside of the second hover proximity range, in accordance with some embodiments.

FIG. 10F shows a media player application operating in a full-screen playback mode. User interface 1020 of the media player application displays a video in playback mode.

FIG. 10G illustrates that, when finger 734 moves toward the touch-screen and enters the first level hover proximity range, a control panel (e.g., control panel 1023) with three playback control affordances (e.g., rewind affordance 1024, pause affordance 1026, and fast forward affordance 1028) is displayed on media player user interface 1020, while the video continues to be played. The location of control panel 1023 is selected based on (x,y) position 504 of finger 734. For example, the center of control panel 1023 is placed slightly above the (x,y) position 504 of finger 734 (e.g., the (x,y) position of finger 734 is indicated by indication 1030 relative to touch-screen 112). It is noted that indication of finger 734 is not visible on the touch-screen in some embodiments. FIG. 10G further shows that, scrubber 1022 is displayed at the top of user interface 1020 to indicate current progress of the video playback. The location of scrubber 1022 is predefined and does not depend on the (x,y) position 504 of finger 734.

FIG. 10H illustrates that, when finger 734 moves laterally while hovering within the first level hover proximity range (without entering the second level hover proximity range), control panel 1023 is repositioned on the touch-screen in accordance with the (x,y) position 504 of finger 734.

FIG. 10I illustrates that, when finger 734 moves closer to the touch-screen and enters the second level hover proximity range, a control affordance (e.g., rewind affordance 1024) nearest finger 734 is highlighted relative to other control affordances in control panel 1023.

In FIG. 10J, when finger 734 moves laterally while remaining within the second level hover proximity range, control panel 1023 remains stationary, and a different control affordance (e.g., pause affordance 1026) that is closest to finger 734 becomes highlighted instead.

FIG. 10K illustrates that, when finger 734 makes contact (e.g., indicated by contact 1032) with a control affordance (e.g., pause affordance 1026) in control panel 1023, the control affordance is activated (e.g., pause affordance 1026 is toggled into play affordance 1026'). In some embodiments, the control affordance is activated upon contact. In some embodiments, the control affordance is activated upon lift-off of the contact.

FIG. 10L illustrates that, when finger 734 is lifted off the touch-screen after making contact with pause control 1026, and returned to the first hover proximity range after exiting the second hover proximity range, the highlighting of control affordance ceases to be displayed, and control panel 1023 remains displayed at a location that corresponds to (x,y) position 504 of finger 734 (e.g., as indicated by relative position of control panel 1023 and indication 1034 of finger 734).

In FIG. 10M, after finger 734 has exited the first level hover proximity range, control panel 1023 and scrubber 1022 cease to be displayed, and video playback in user interface 1020 remains in the paused state.

FIGS. 10N-10R illustrate displaying information (e.g., missed notifications) for an application or applications in a folder when finger 734 hovers over an application icon or folder icon within a first level hover proximity range, and displaying more details of the information (e.g., details of the missed notifications) when finger 734 enters the second hover proximity range from outside of the second hover proximity range, in accordance with some embodiments.

FIG. 10N shows home screen user interface 1042 that includes application launch icons and a folder icon 1044. A badge (e.g., the indicator "4") on folder icon 1044 indicates there are a number of unread notifications (e.g., four unread notifications) for the applications within the folder represented by folder icon 1044.

FIG. 10O shows that, when finger 734 moves toward the touch-screen and enters the first level hover proximity range near the location of folder icon 1044 (e.g., as indicated by the relative positions of folder icon 1044 and indication 1046 for the (x,y) position 504 of finger 734), notification list 1048 is displayed near folder icon 1044. Notification list 1048 includes a count of unread notifications for each application within the folder that have unread notifications. Optionally, portions of home screen user interface 1042 outside of folder icon 1044 are darkened and blurred underneath notification list 1048. In this example, three of the five applications in the folder have unread notifications, e.g., the App Store application has one unread notification, the Messages application has two unread notifications, and the Mail application has one unread notification. In some embodiments (not shown), if finger 734 exits the first level hover proximity range by moving away from the touch-screen now, notification list 1048 will cease to be displayed, and the notifications remain as unread.

FIG. 10P shows that, when finger 734 moves closer toward the touch-screen and enters the second level hover proximity range near the location of folder icon 1044 (or near any portion of notification list 1048), more details of the unread notifications are displayed. For example, content for each unread notification is displayed in expanded notification list 1050. In some embodiments, if finger 734 is lifted away from the touch-screen and exits the second level hover proximity range, expanded notification list 150 remains displayed as long as finger 734 still remains within the first level hover proximity range. In some embodiments, if finger 734 is lifted away from the touch-screen and exits the second level hover proximity range, expanded notification list 1050 ceases to be displayed and notification 1048 is redisplayed as long as finger 734 still remains within the first level hover proximity range. In some embodiments, once finger 734 is lifted out of the first level hover proximity range, no notification list is displayed, and the status of the previously unread notifications is changed to "read" by the device.

FIG. 10Q illustrates that, if finger 734 does not exit the first level hover proximity range, but instead makes contact with the touch-screen (e.g., contact 1052 is detected on folder icon 1044), expanded notification list 1050 remains displayed while contact 1052 is maintained on the touch-screen. In some embodiments, if lift-off of contact 1052 is detected while contact 1052 is on folder icon 1044, display of home screen user interface 1042 and expanded notification list 1052 is replaced with or partially replaced with content of the folder represented by folder icon 1044. In some embodiments, if, instead of a folder icon, the finger hovered over an application launch icon that corresponds to an application that has unread notifications, lift-off of finger 734 after the finger makes contact with the application launch icon causes the application to be launched, and causes display of the user interface of the application to replace the display of the home screen user interface.

FIGS. 10R-10S illustrate that, while finger 734 maintains contact (e.g., contact 1052) with the touch-screen, finger 734 moves across the touch-screen to a new location over an unread notification for the Messages application; and in response to detecting lift-off of contact 1052 over the unread notification for the Messages application, the device replaces the display of home screen user interface 1042 and expanded notification list 1050 with user interface 1062 of the messages application that corresponds to a conversation associated with the missed notification. Although not shown, in some embodiments, the read/unread statuses of all of the previously unread notifications shown in notification list 1050 are changed to "read" by the device. In some embodiments, the statuses of the unread notifications for other applications (e.g., App Store and Mail) within the folder remain as unread.

FIGS. 10T-10Y illustrate activating a cursor placement mode when finger 734 hovers over selectable content within a first level hover proximity range, and activating a selection resize mode when finger 734 enters a second hover proximity range from outside of the second hover proximity range, in accordance with some embodiments.

In FIG. 10T, user interface 1072 displays content (e.g., selectable text).

FIG. 10U, when finger 734 moves toward the touch-screen and enters the first level hover proximity range, cursor 1074 is displayed within the displayed text at a location that corresponds to (x,y) position 504 of finger 734 (e.g., as indicated by indication 1076 (not visible)) relative to touch-screen 112. In addition, a magnifying loupe (e.g., magnifying loupe 1078) is displayed. A magnified version of a portion of the text near cursor 1074 is shown in magnifying loupe 1078. A magnified version 1080 of cursor 1074 is also shown in magnifying loupe 1078.

FIG. 10V shows that, when finger 734 moves laterally within the first level hover proximity range, cursor 1076 and magnifying loupe 1078 move across the touch-screen in accordance with (x,y) position 504 of finger 734. In some embodiments (not shown), if finger 734 is lifted out of the first level hover proximity range, cursor 1076 and magnifying loupe 1078 cease to be displayed. In some embodiments, the cursor placement mode can be activated when a selection already exist within the content. In some embodiments, cursor 1074 remains displayed (e.g., at least for a threshold amount of time) and the magnifying loupe ceases to be displayed when finger 734 is lifted out of the first level hover proximity range without first entering the second level hover proximity range. For example, the user can start typing or pasting additional content at the position of the cursor afterwards. Cursor 1074 may cease to be displayed if no user input is detected within the threshold amount of time.

FIG. 10W shows that, when finger 734 continues to move toward the touch-screen and enters the second level hover proximity range, the appearance of cursor 1074 changes to indicate that selection resize mode is activated. For example, cursor 1074 transforms into two overlapping selection handles 1084 and 1086. The appearance of magnifying loupe 1978 is changed (e.g., changed to magnifying loupe 1088) to indicate that the selection resize mode is activated.

FIGS. 10X-10Y show that, once the selection resize mode has been activated, subsequent lateral movement of finger 723 within the second level hover proximity range causes text to be selected (e.g., in selection object 1082) with one selection handle (e.g., selection handle 1086) remaining at its initial location, and the other selection handle (e.g., selection handle 1084) moving in accordance with the lateral movement of finger 723. Magnifying loupe 1088 moves with the selection handle (e.g., selection handle 1084) that is repositioned by finger 734. In some embodiments (not shown), after the text selection has been expanded, if finger 743 is lifted out of the second hover proximity range and then out of the first hover proximity range without first making contact with the touch-screen, the selection is canceled; and if finger 734 first makes contact with the touch-screen, the selection is maintained after finger 734 is lifted out of the second hover proximity range and then out of the first hover proximity range. In some embodiments, the device requires that finger 734 hovers within the second level hover proximity range for at least a threshold amount of time before the cursor placement mode is ended and the selection resize mode is activated. In some embodiments, the device requires that finger 734 hovers over cursor 1074 within the second level hover proximity range for at least a threshold amount of time before the cursor placement mode is ended and the selection resize mode is activated. In some embodiments, once selection object 1082 is expanded, finger 734 can move back out to the first level hover proximity range without disturbing the selection, and reenter the second level hover proximity range to reselect one of the two selection handles (e.g., by hovering near the selection handle, or hover and hold over the selection handle for a threshold amount of time) and move the selected selection handle to resize the selection object. In some embodiments, when finger 734 moves back out to the first level hover proximity range, magnifying loupe 1088 ceases to be displayed, and when finger 734 reenters the second level hover proximity range and selects one of the selection handles, magnifying loupe 1088 is redisplayed near the selected selection handle. In some embodiments, when finger 734 moves back out of the first level hover proximity range, selection object 1082 is removed (e.g., the selection is canceled) unless finger 734 makes contact with the touch-screen first. In some embodiments, when finger 734 moves back out of the first level hover proximity range, selection object 1082 remains displayed, and when finger 734 then moves back into the first level hover proximity range, cursor placement mode is reentered with the selection object 1082 remaining on the touch-screen.

FIGS. 11A-11J illustrate hovering an input object over a first object for at least a threshold amount of time to enter a mode for performing a respective operation with respect to the first object (e.g., an information display mode for displaying tool tips or missed notifications for an object, such as a control affordance, or an application launch icon), and once the mode is entered, when the input object moves laterally over another object (e.g., an object of the same type), the respective operation is performed with respect to the object without requiring the input object to hover over the object for at least the threshold amount of time (e.g., the respective operation is performed immediately). In some embodiments, the device requires the input object to meet requirements other than the hover-hold time threshold to enter the mode. For example, a predefined in-air gesture is required to enter the mode, and once the mode is entered, the device does not require the in-air gesture to be performed again for the next object in order to perform an operation with respect to the next object. In some embodiments, the device requires the input object to enter the second level hover proximity range (e.g., be close to the touch-screen) to enter the mode, and once the mode is entered, the device only require the input object to be in the first-level hover proximity range in order to perform an operation associated with the mode.

Figure 11A:
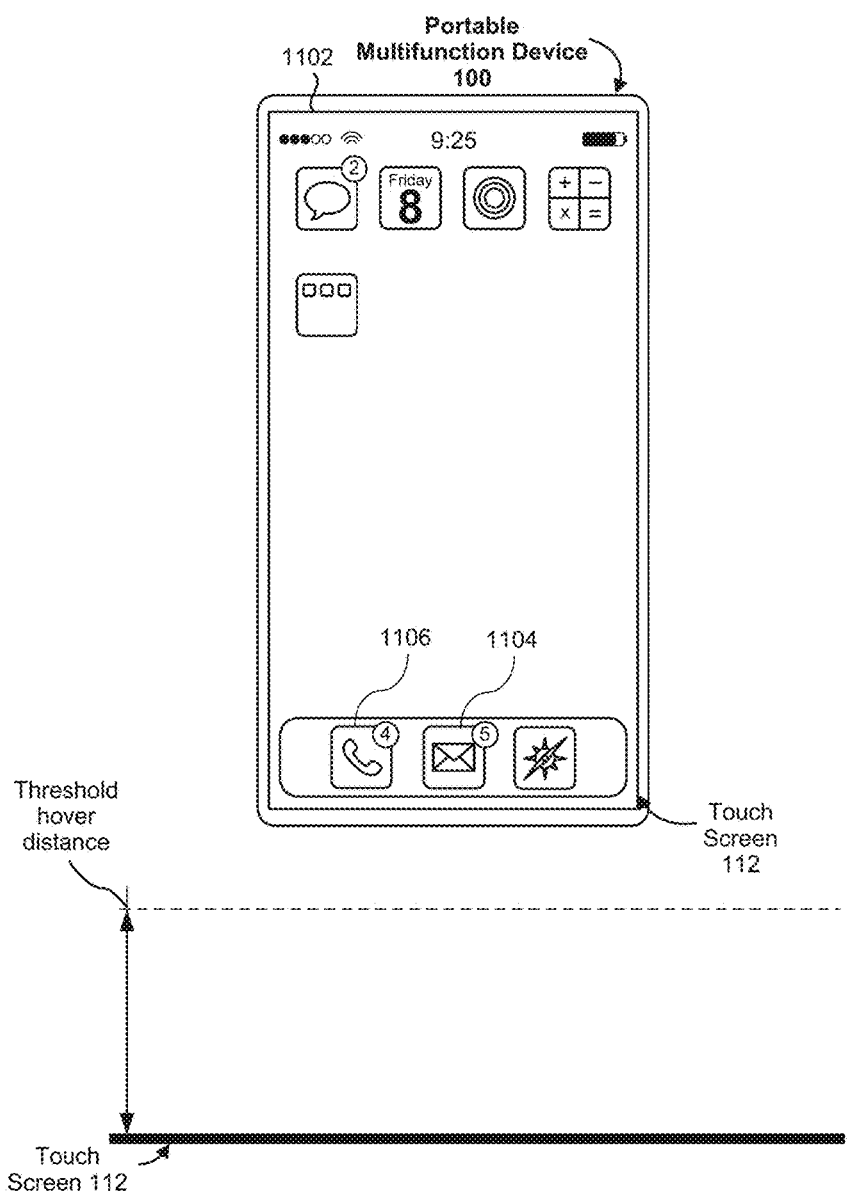
FIGS. 11A-11J illustrate exemplary user interfaces for entering an information display mode after the input object meets augmented hover proximity criteria, and while in the information display mode, displaying information for additional objects while the input object meets non-augmented hover proximity criteria, in accordance with some embodiments.

In FIG. 11A, home screen user interface 1102 is displayed. Within home screen user interface 1102, a number of application launch icons are displayed, including some application launch icons with unread notifications or messages. For example, there are four unread notifications or messages for the telephone application (e.g., as indicated by the badge on the application launch icon 1106); there are five unread notifications or messages for the mail application (e.g., as indicated by the badge on the application launch icon 1104), and there are two unread notifications or messages for the instant messaging application.

Figure 11B:
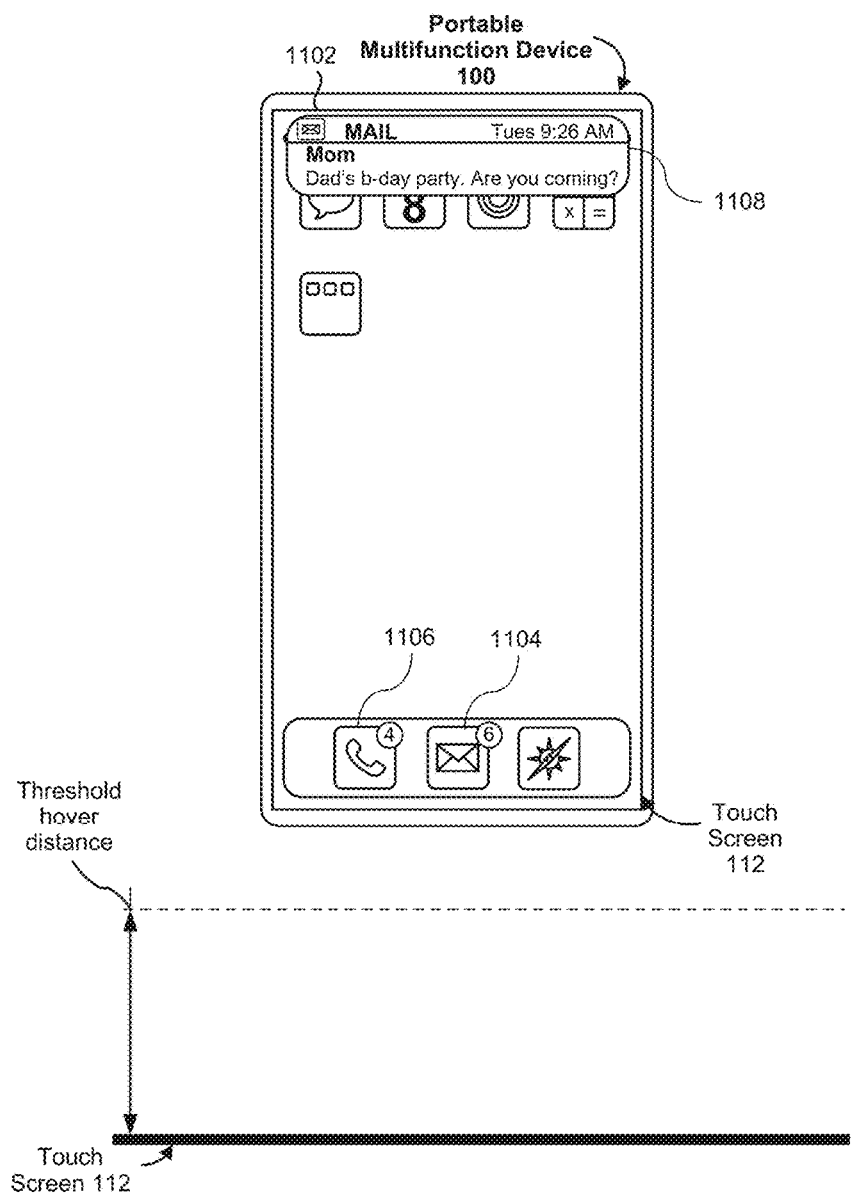

In FIG. 11B, a new message for the mail application has arrived at the device, and a notification is generated (e.g., as represented by notification banner 1108) and displayed over home screen user interface 1102. If no user interaction with notification banner 1108 is detected within a threshold amount of time since the initial display of notification banner 1108, notification banner 1108 ceases to be displayed (e.g., the notification may be stored in a notification center for the user to review later).

Figure 11C:
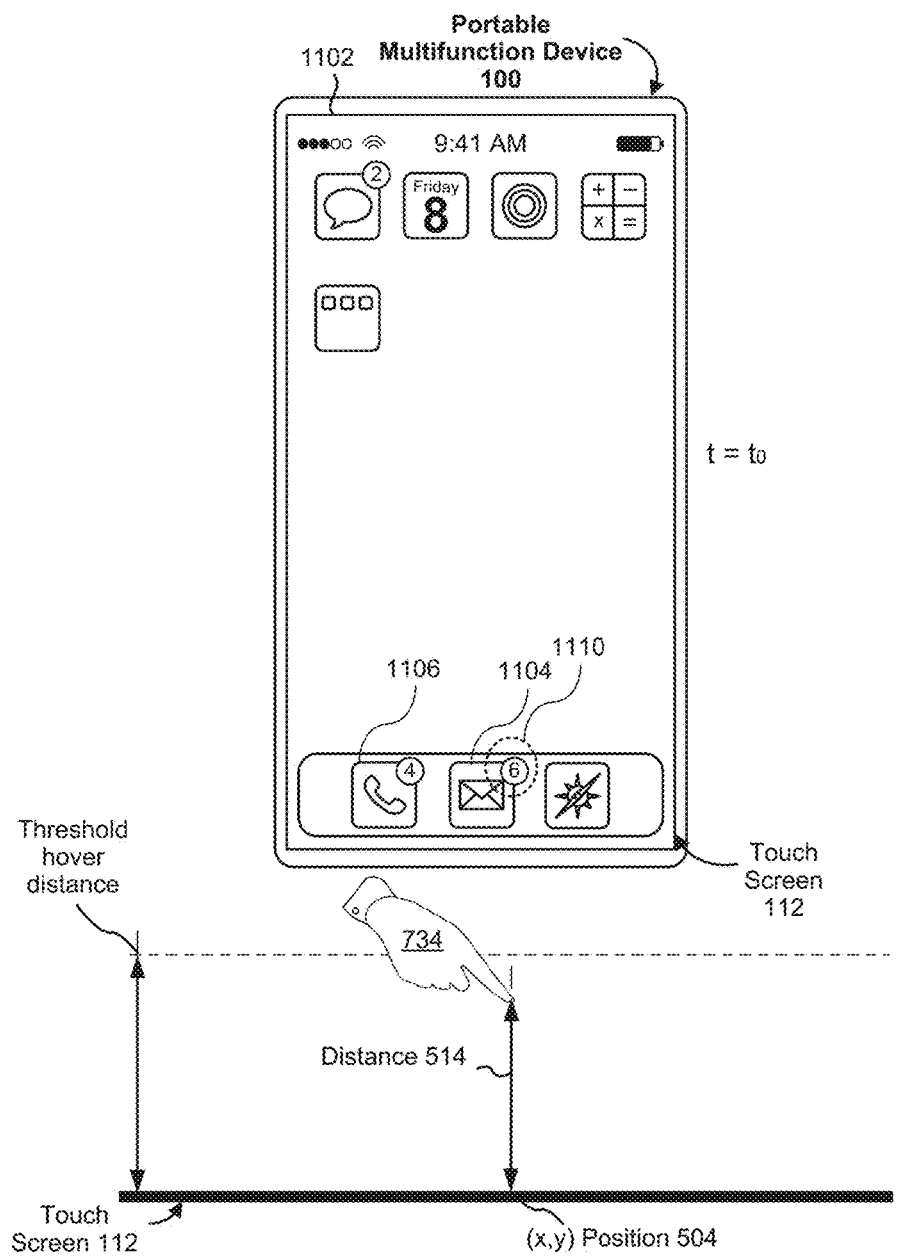
Figure 11D:
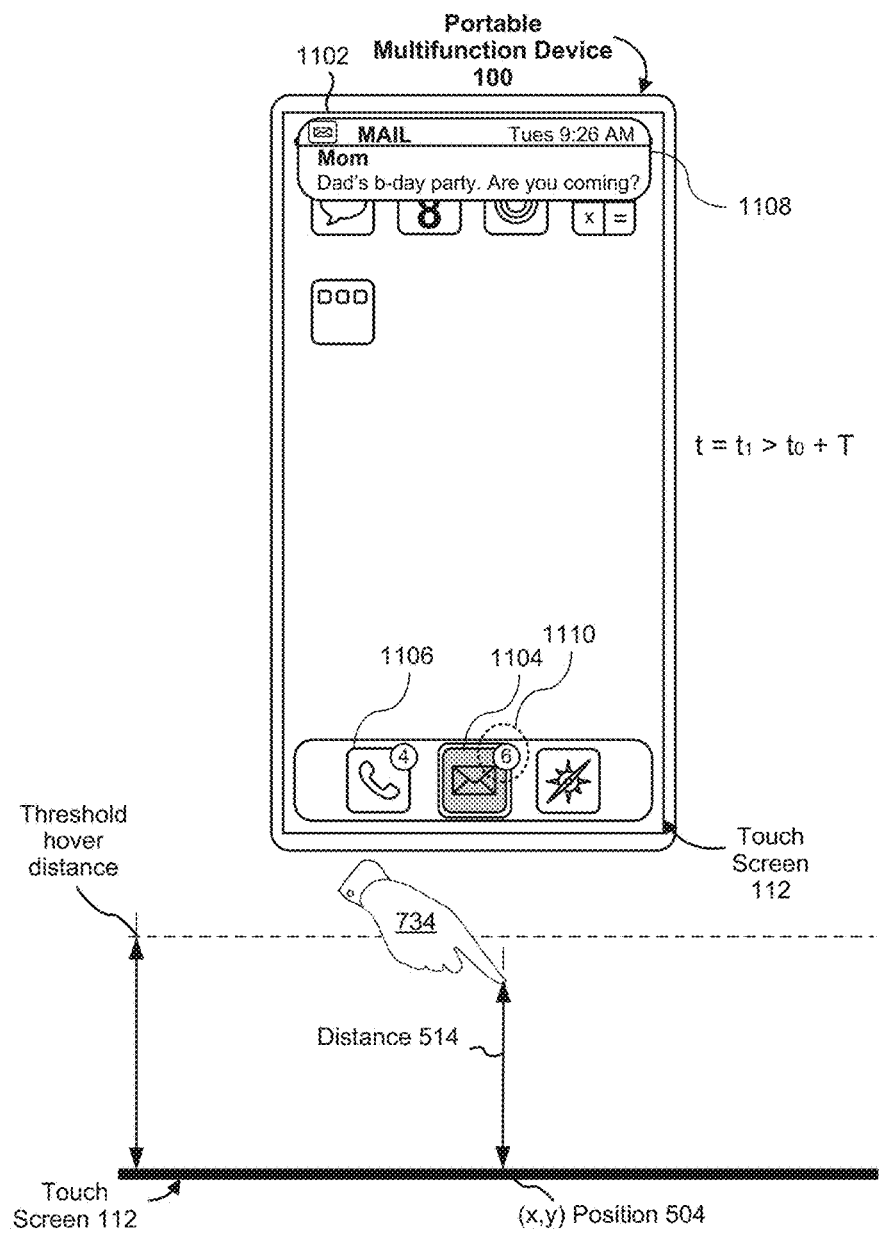

In FIGS. 11C-11D, finger 734 has moved toward the touch-screen and entered the hover proximity range above the touch-screen (e.g., finger 734 moved to a hover location above application launch icon 1104 at time to). Finger 734 is then held over application launch icon 1104 for the mail application (e.g., indication 1110 for finger 734 is over the badge portion of application launch icon 1104 in FIGS. 11C-11D). When finger 734 is held over application launch icon 1104 for less than a threshold amount of time T, no visible change is applied to application launch icon 1104 (e.g., as shown in FIG. 11C). When finger 734 is held over application launch icon 1104 for at least the threshold amount of time T, application launch icon 1104 is highlighted, and the previously displayed notification banner 1108 is redisplayed over home screen user interface 1102. In some embodiments (not shown), notification banner 1108 will remain displayed for a period of time without requiring finger 734 to be continuously held over application launch icon 1104. If finger 734 is lifted out of the hover proximity range, and taps on notification banner 1108 while it is still displayed, the mail application will be launched. If finger 734 is lifted out of the hover proximity range, and no user interaction with notification banner 1108 is detected within a threshold amount of time, notification banner 1108 ceases to be displayed. Notification banner 1108 will remain displayed for as long as finger 734 hovers over application launch icon 1104. In some embodiments, portions of home screen user interface 1102 outside of icon 1104 are blurred and darkened underneath notification banner 1108.

Figure 11E:
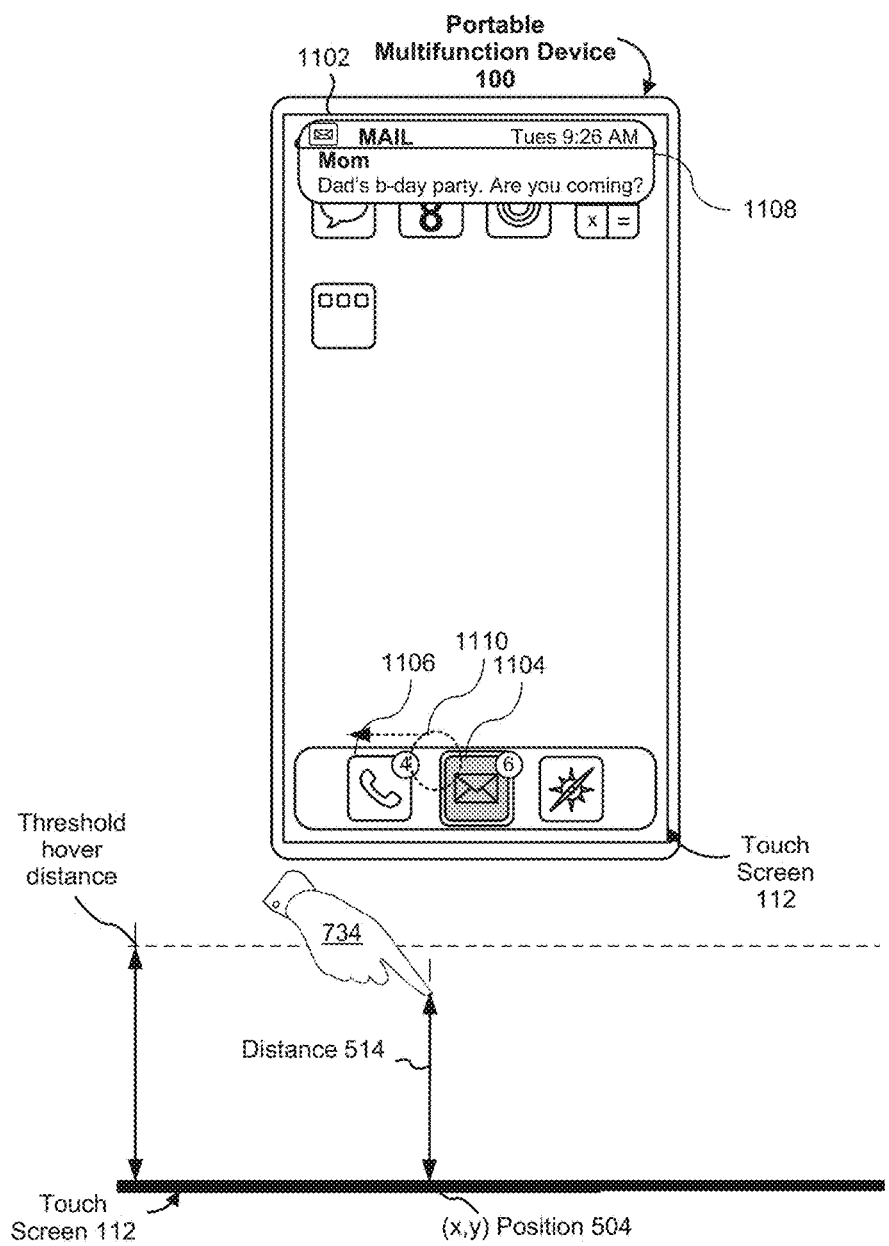
Figure 11F:
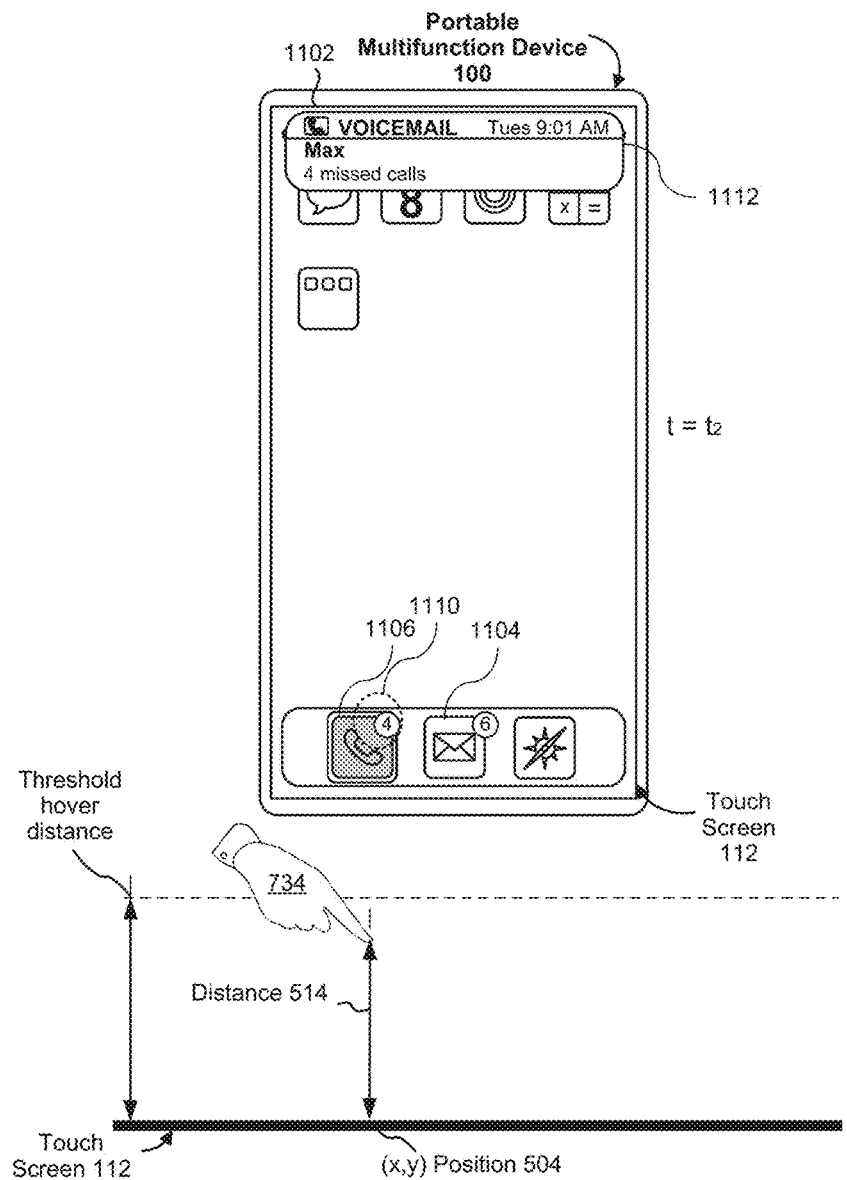

FIGS. 11E-11F illustrate that, once notification banner 1108 is displayed, the device has entered an information display mode that will displaying information (e.g., missed notifications) for additional objects without requiring finger 734 to hold over the additional objects for the same threshold amount of time as for application launch icon 1104. In some embodiments, the additional objects are of the same type of the first object (e.g., application launch icon 1104) for which the information display mode was first activated, and the information that is displayed for the additional objects are of the same type as the information (e.g., notification banner 1108) that was displayed for the first object (e.g., application launch icon 1104). As shown in FIG. 11E, while notification banner 1108 remains displayed over home screen user interface 1102, finger 734 starts to move laterally toward application launch icon 1106 while remaining within the hover proximity range above the touch-screen. In FIG. 11F, as soon as finger 734 moves to a hover location above application launch icon 1106 (as indicated by the position of indication 1110 for finger 734), application launch icon 1106 becomes highlighted and notification banner 1112 for the telephony application is displayed. At the same time, application launch icon 1104 ceases to be highlighted and notification banner 1108 ceases to be displayed.

Figure 11G:
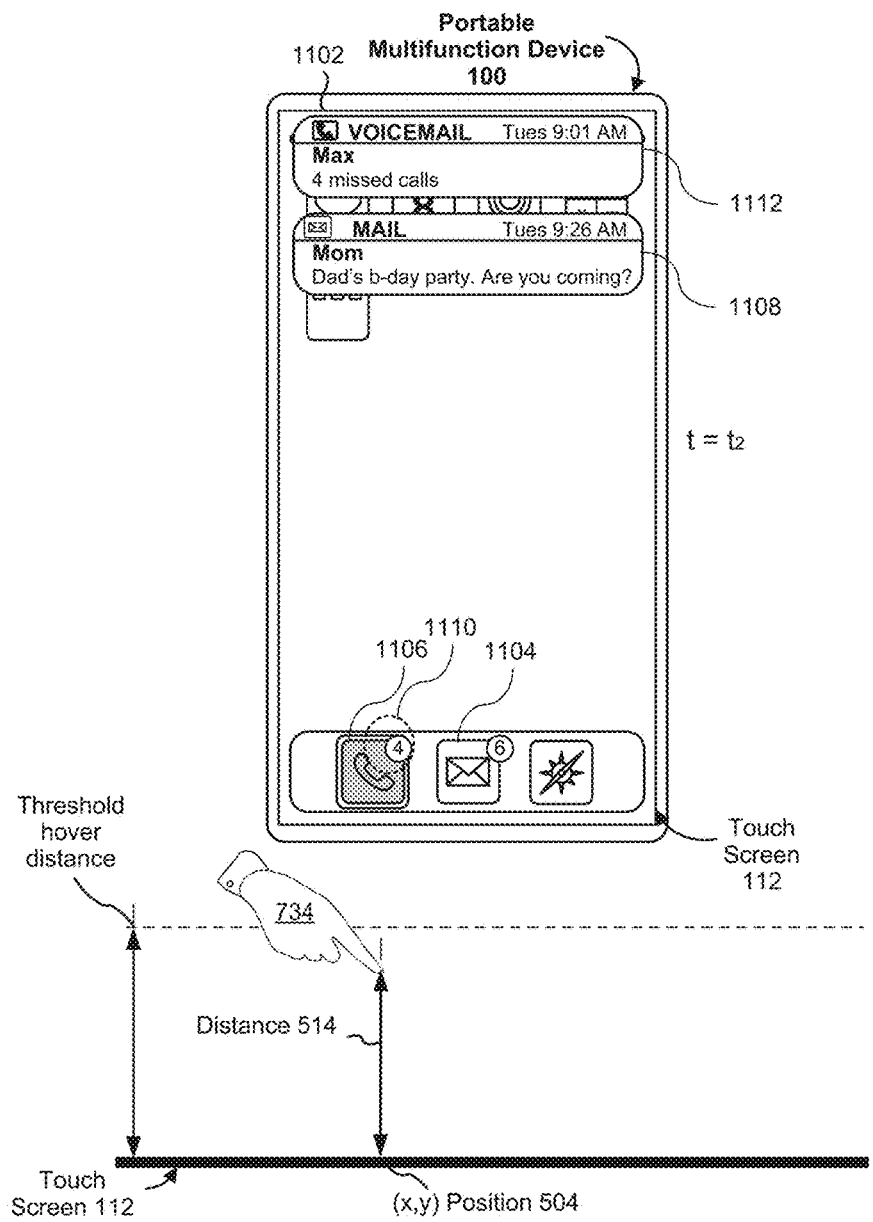

FIG. 11G shows an embodiment in which, when finger 734 moves laterally to application launch icon 1106 after the information display mode has been entered, notification banner 1112 for application launch icon 1106 is displayed, while notification banner 1108 for application launch icon 1104 remains displayed over home screen user interface 1102. In some embodiments, both notification banner 1108 and notification banner 1112 crease to be displayed when finger 734 is lifted out of the hover proximity range above the touch-screen and the information display mode is exited.

Figure 11H:
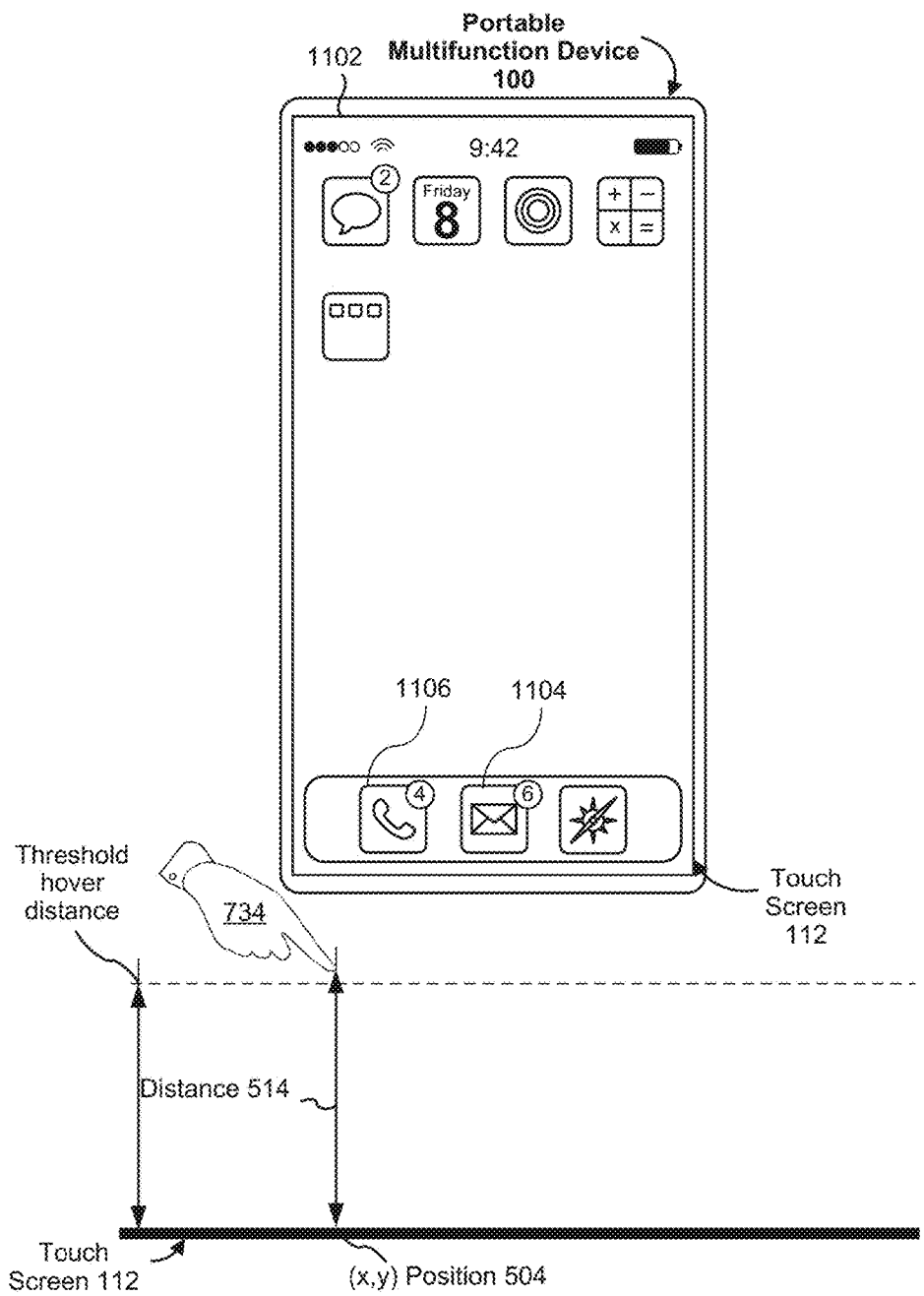

FIG. 11H continues from FIG. 11F or 11G. FIG. 11H shows that, when finger 734 is lifted out of the hover proximity range above the touch-screen, notification banner 1112 (and notification banner 1108) cease to be displayed (e.g., after a predefined period of time) and the information display mode is exited (e.g., immediately upon finger 734 exiting the hover proximity range).

Figure 11I:
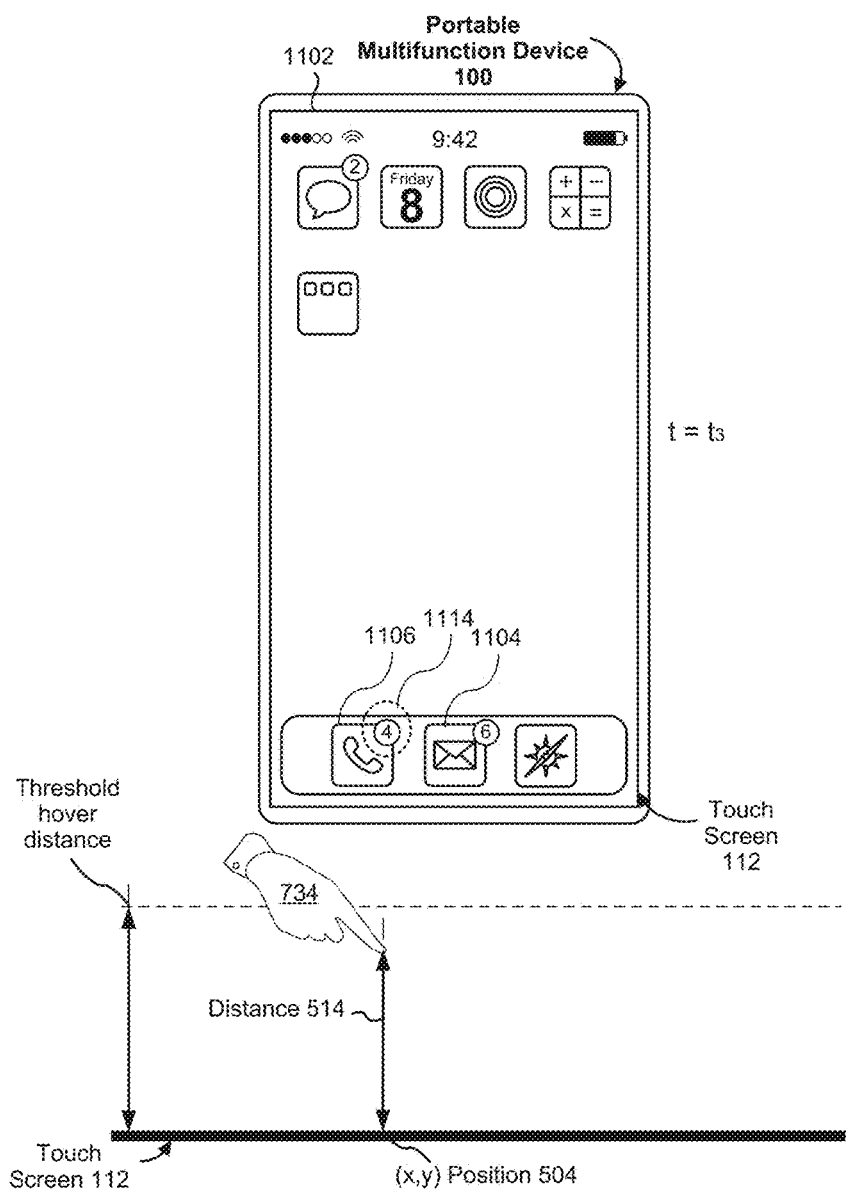
Figure 11J:
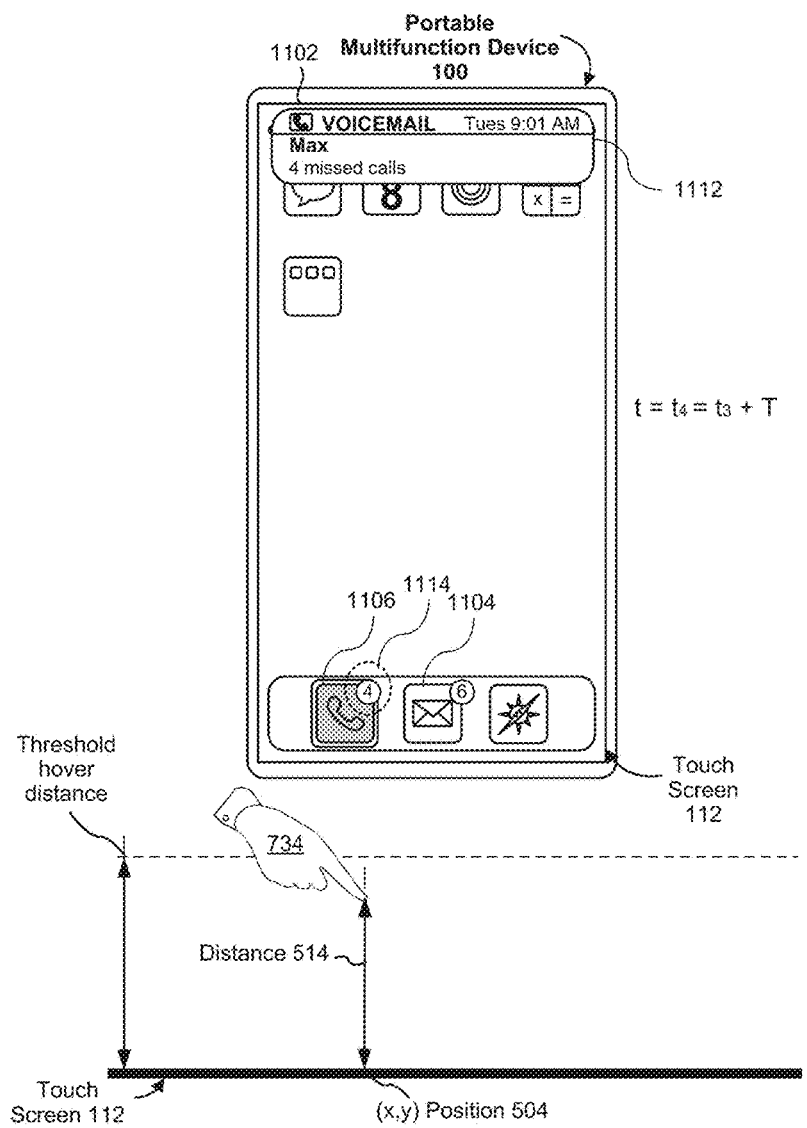

FIGS. 11I-11J illustrate that, after the information display mode has been exited, in order to redisplay notification banner 1112, finger 734 is required to reenter the hover proximity range and hover over application launch icon 1106 (e.g., as indicated by indication 1114 over application launch icon 1106) for at least the threshold amount of time T. Once finger 734 has reentered the hover proximity range (e.g., finger 734 reentered the hover proximity range above application launch icon 1106 at time t3, as shown in FIG. 11I) and hovered over application launch icon 1106 for at least the threshold amount of time, the information display mode is reentered, and notification banner 1112 is redisplayed (e.g., at time t4, notification banner 1112 is redisplayed).

Figure 12A:
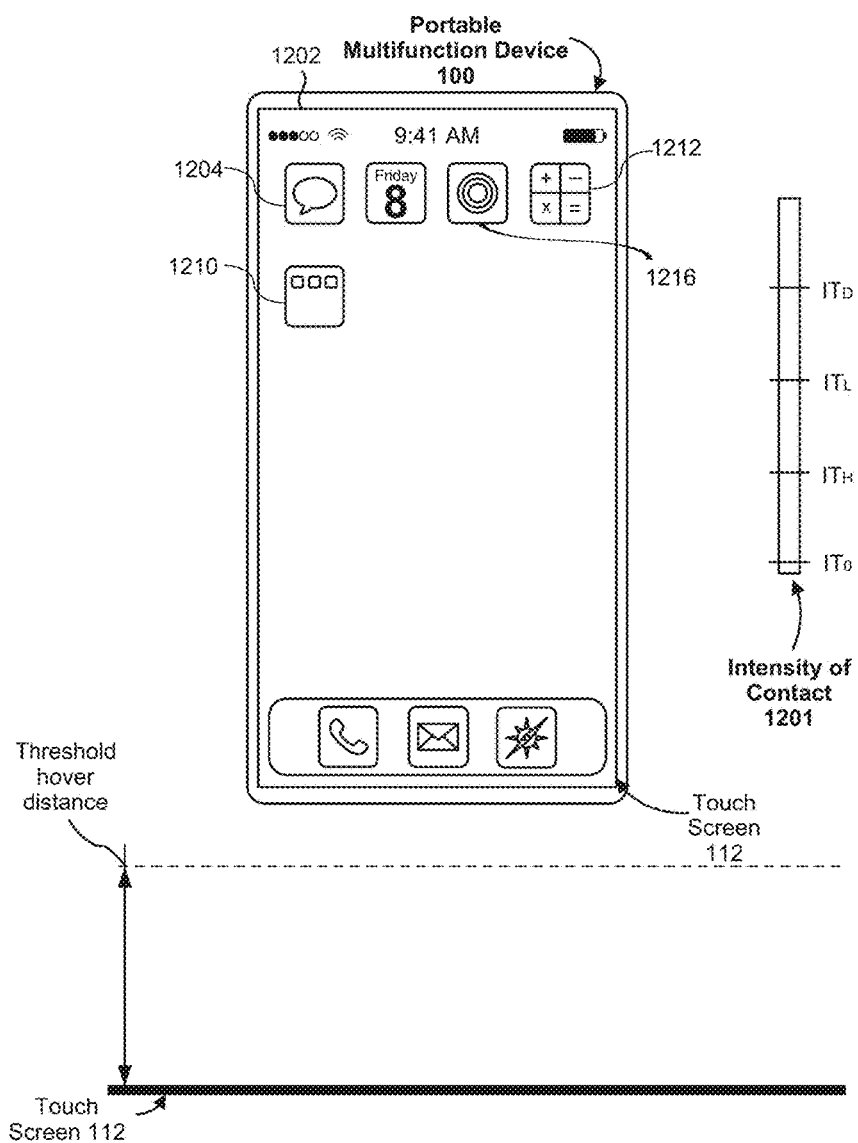
FIGS. 12A-12R illustrate exemplary user interfaces for displaying visual feedback indicating whether an object has differentiated, object-specific responses for intensity-based inputs, when an input object hovers over the object, in accordance with some embodiments.
Figure 12B:
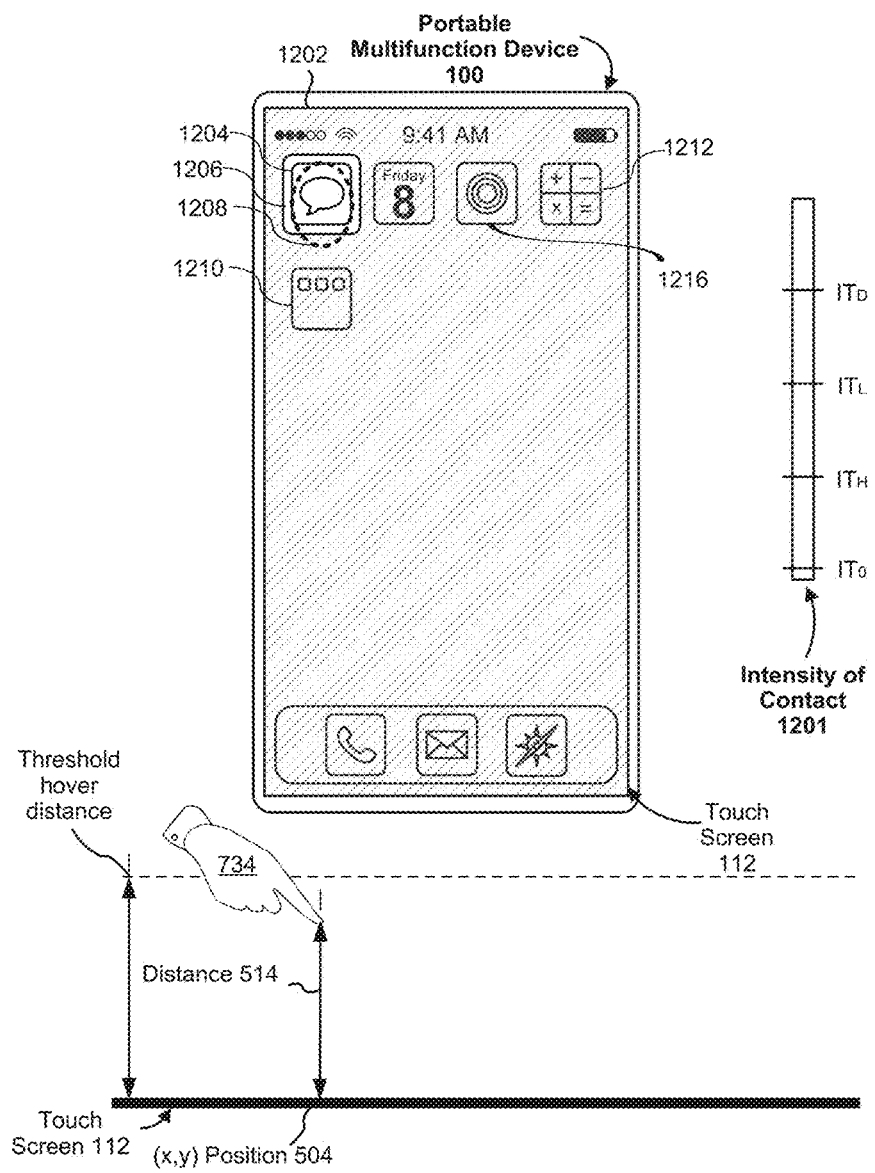
Figure 12C:
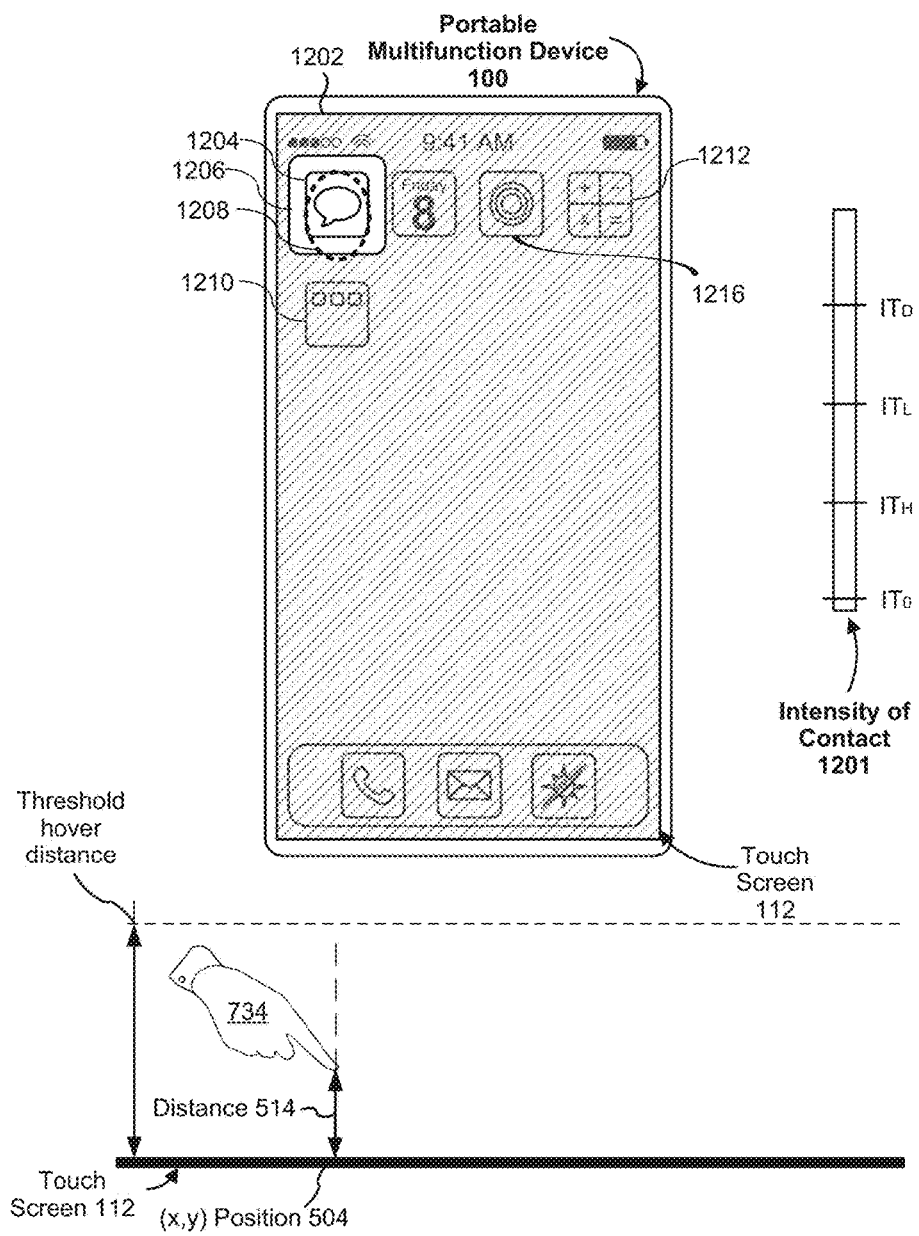
Figure 12D:
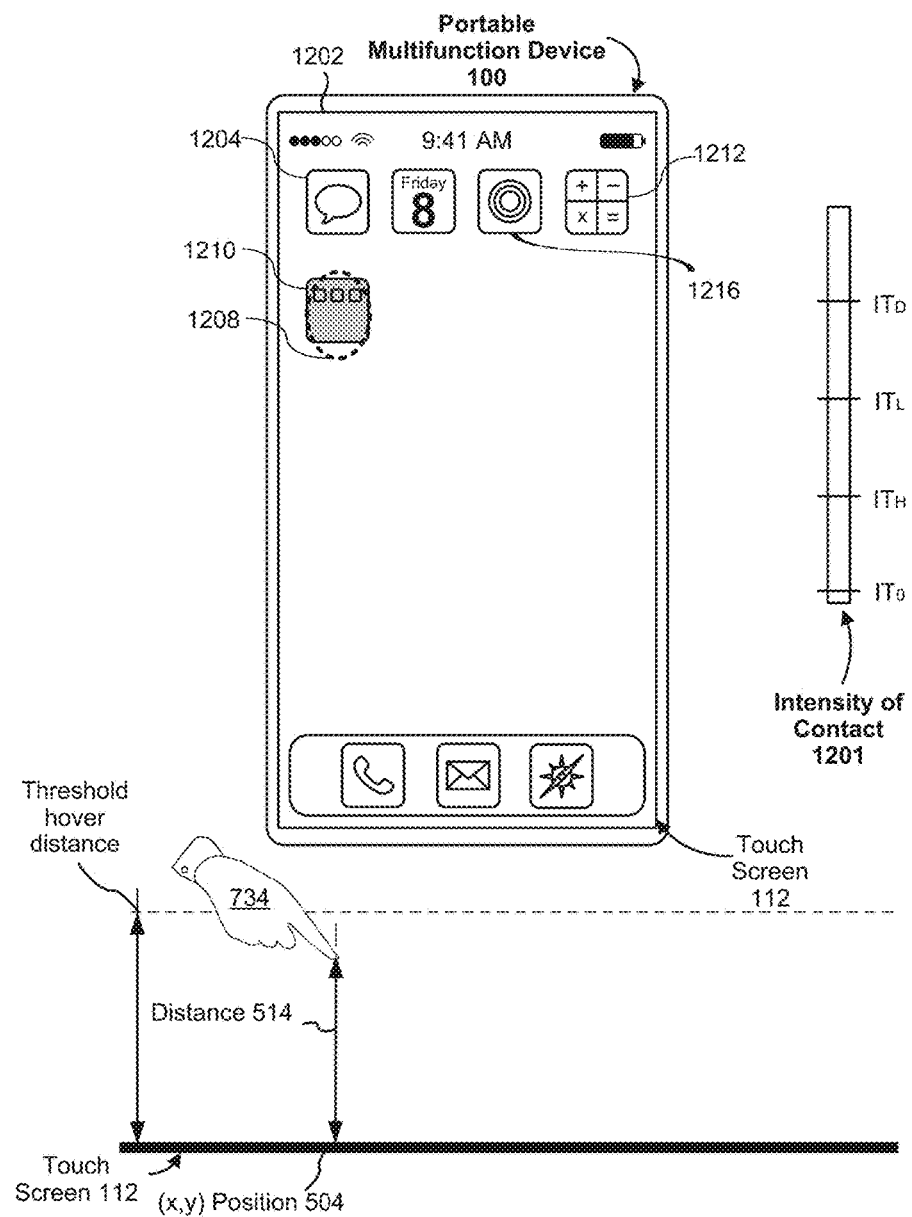
Figure 12E:
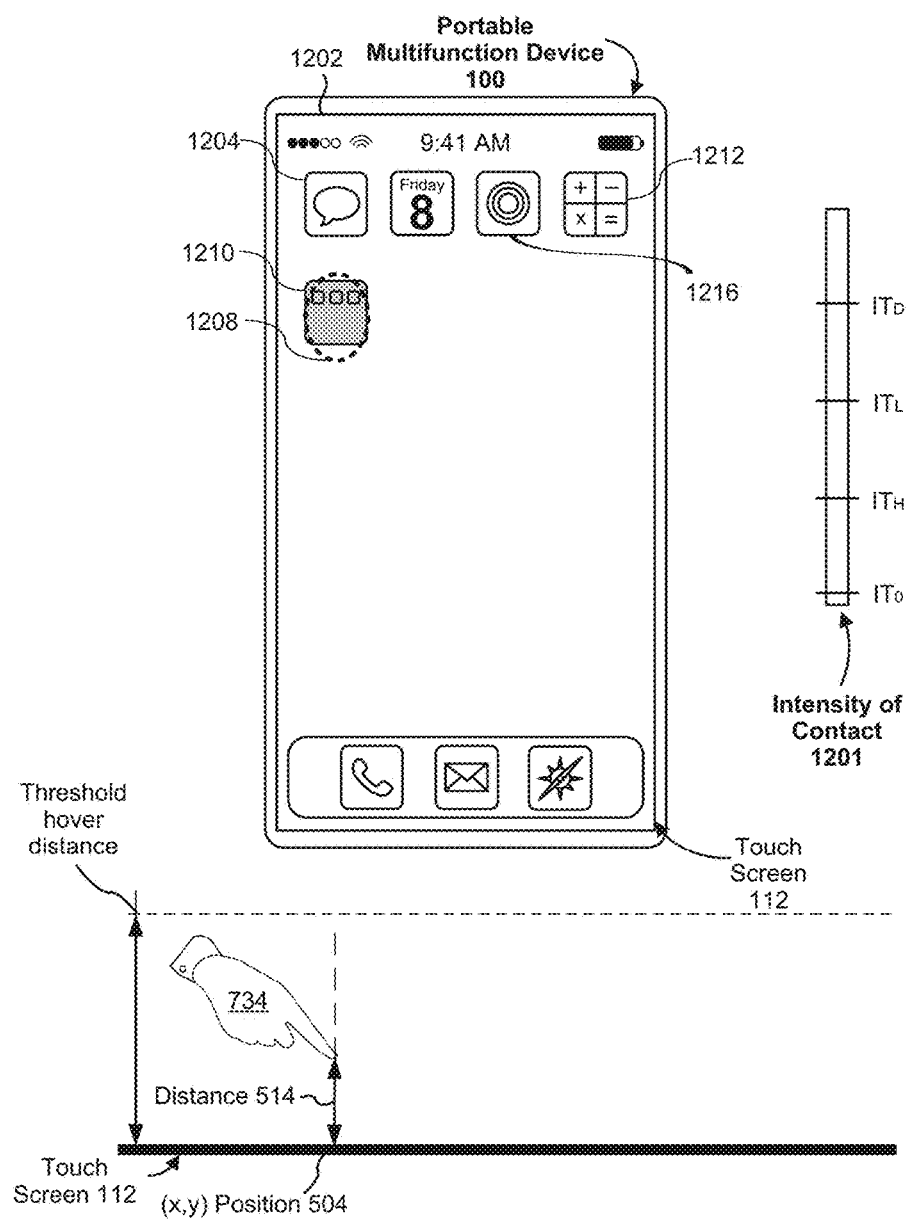
Figure 12F:
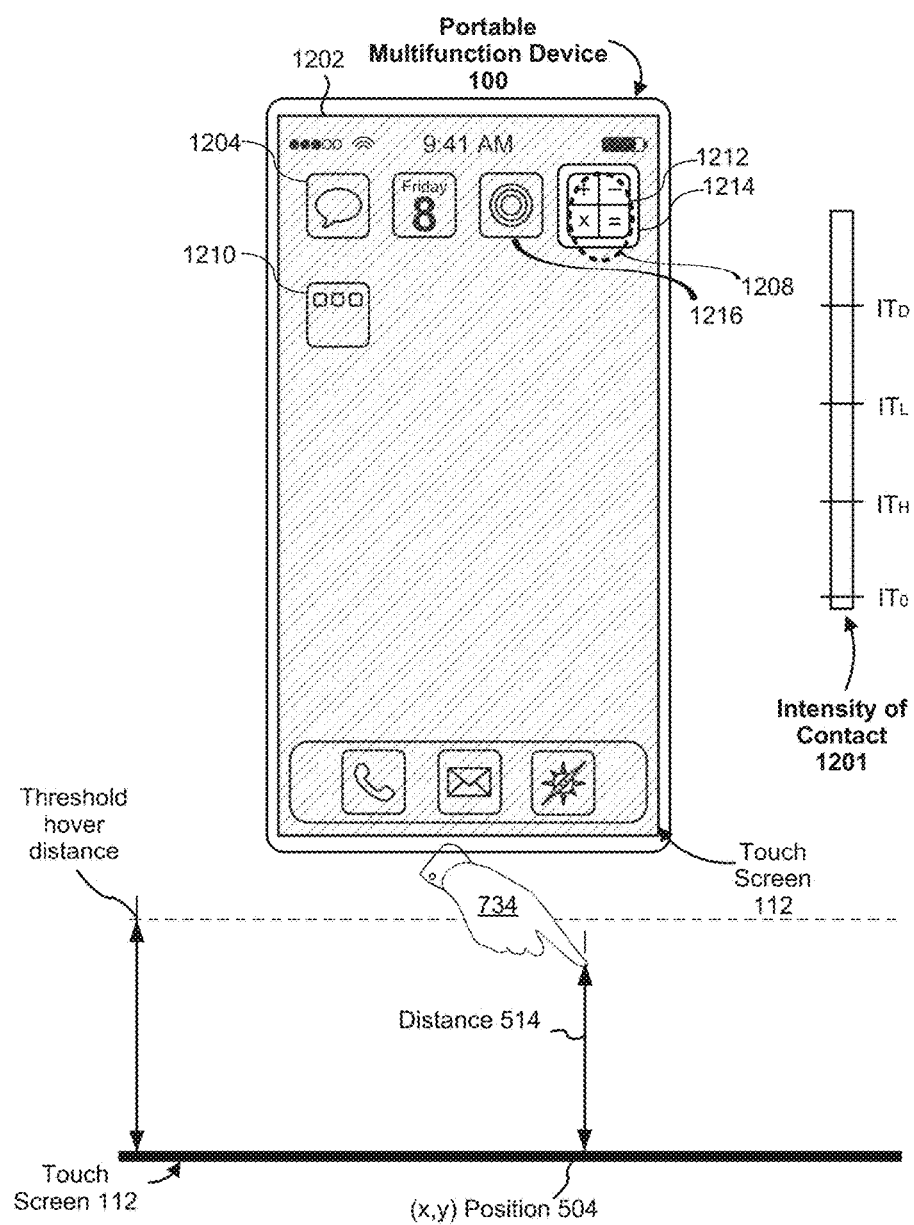
Figure 12G:
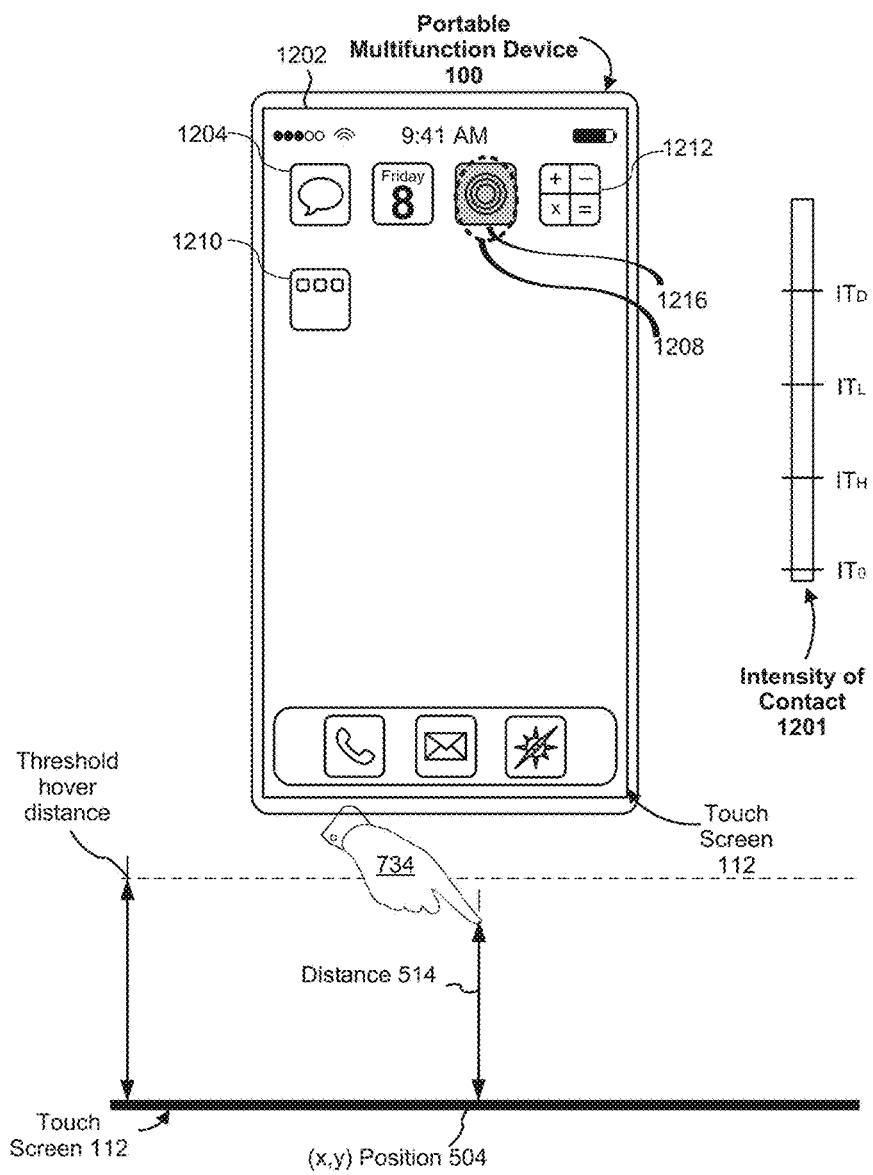
Figure 12H:
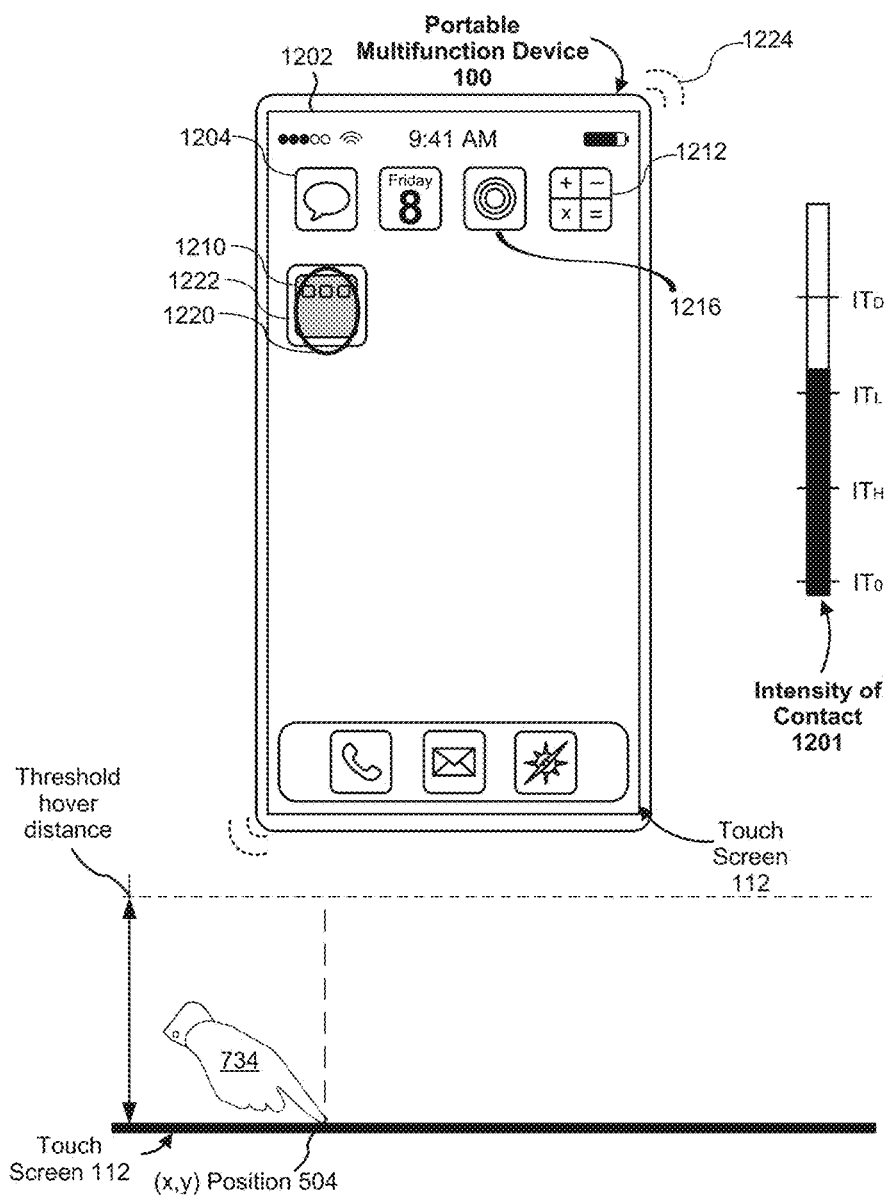
Figure 12I:
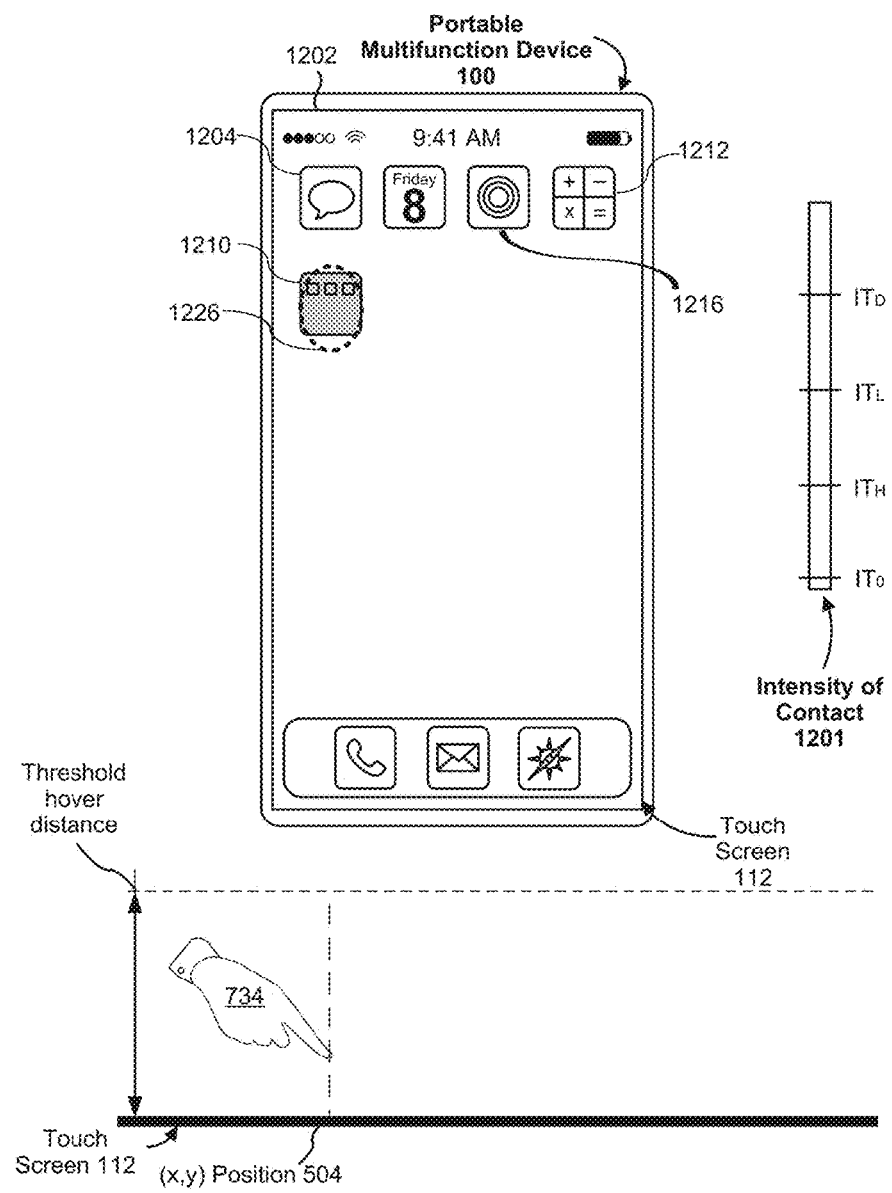
Figure 12J:
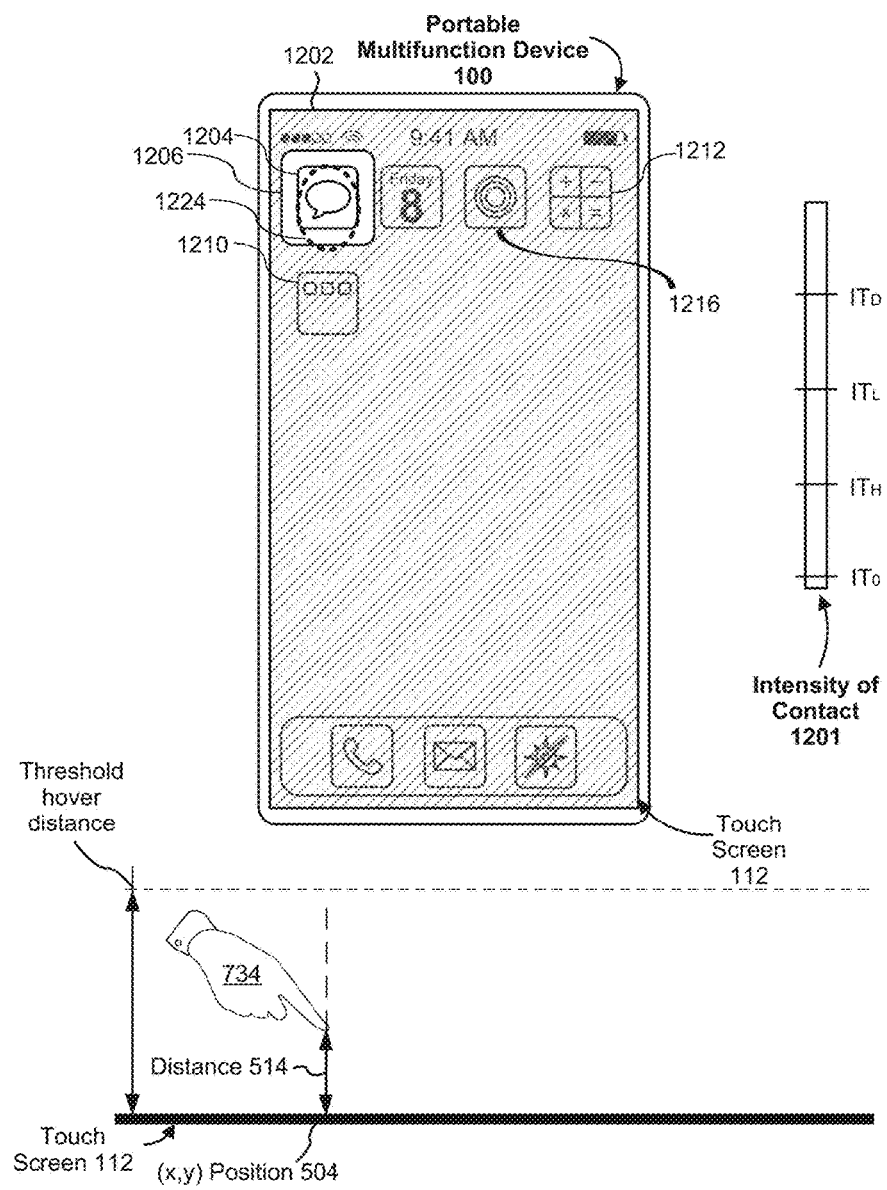
Figure 12K:
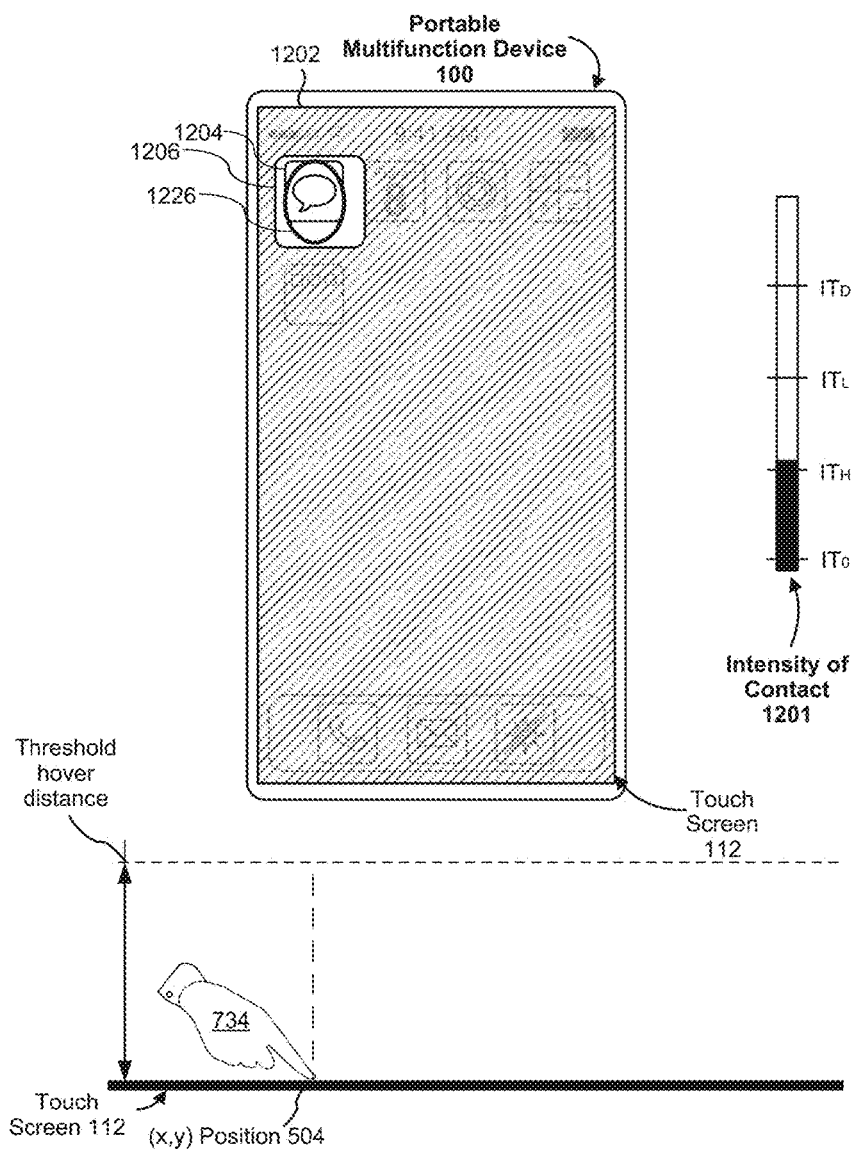
Figure 12L:
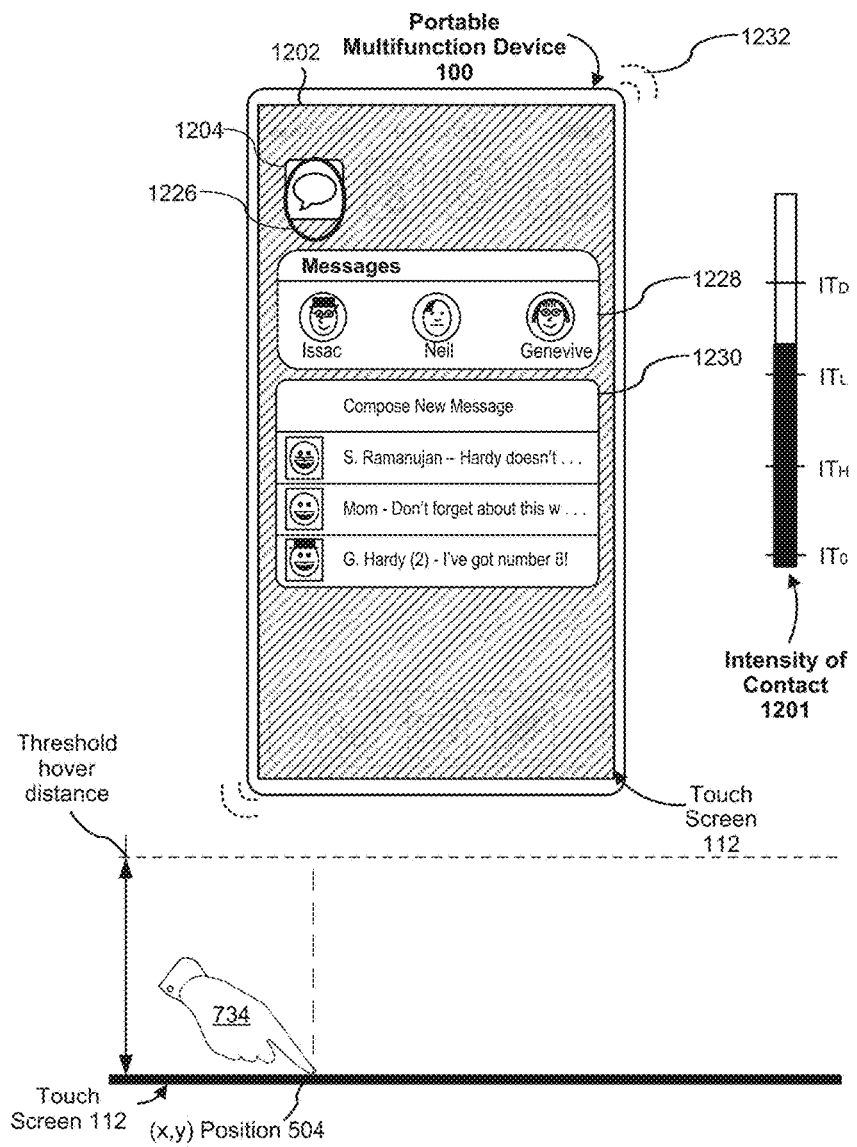
Figure 12M:
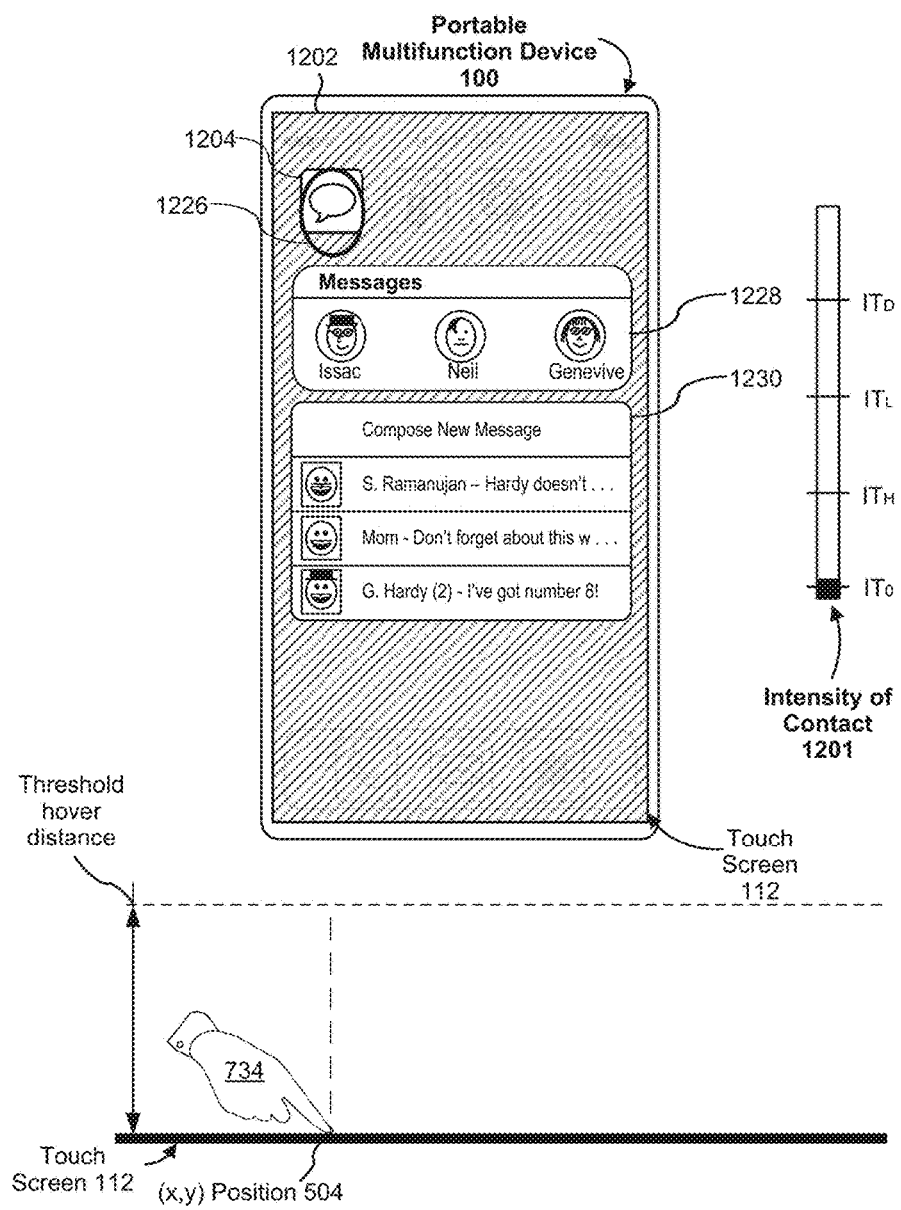
Figure 12N:
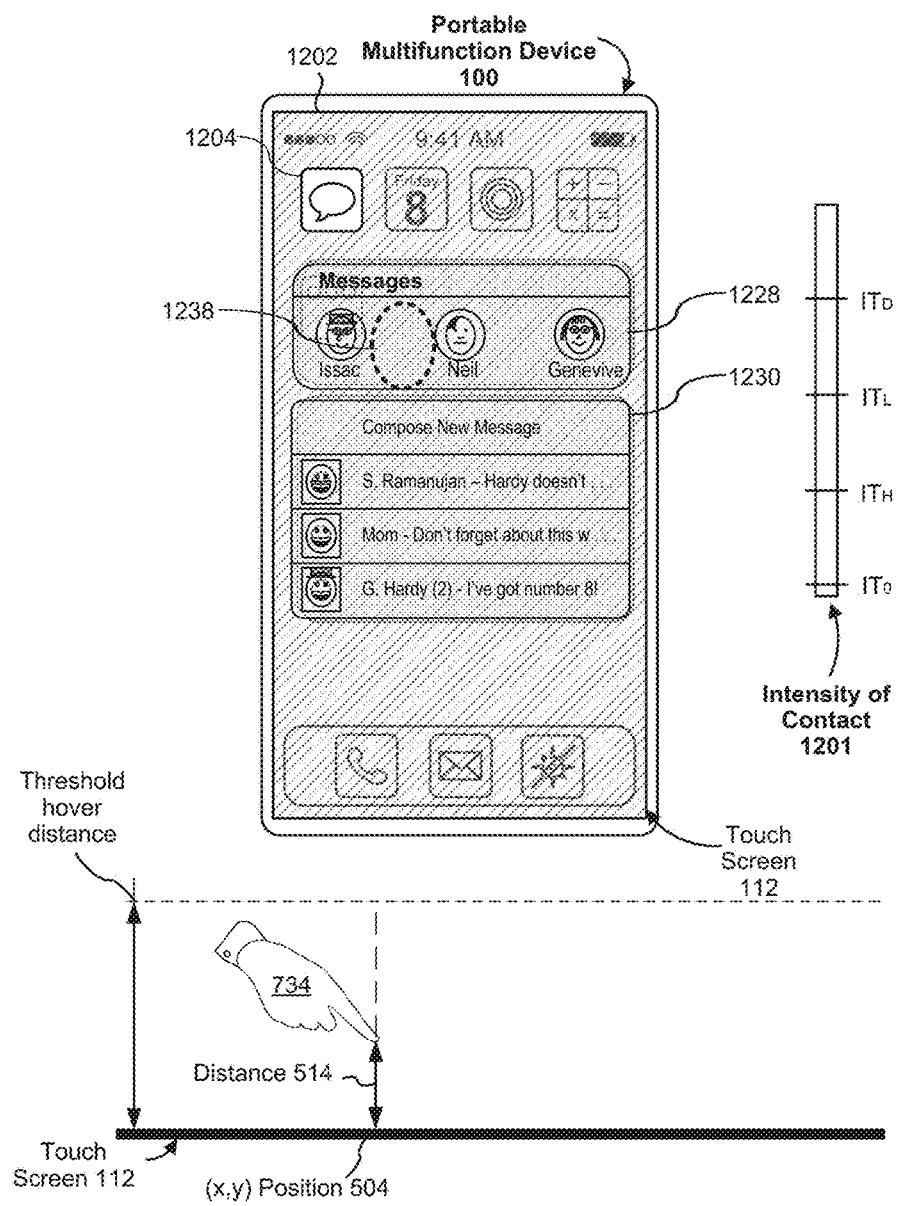
Figure 12O:
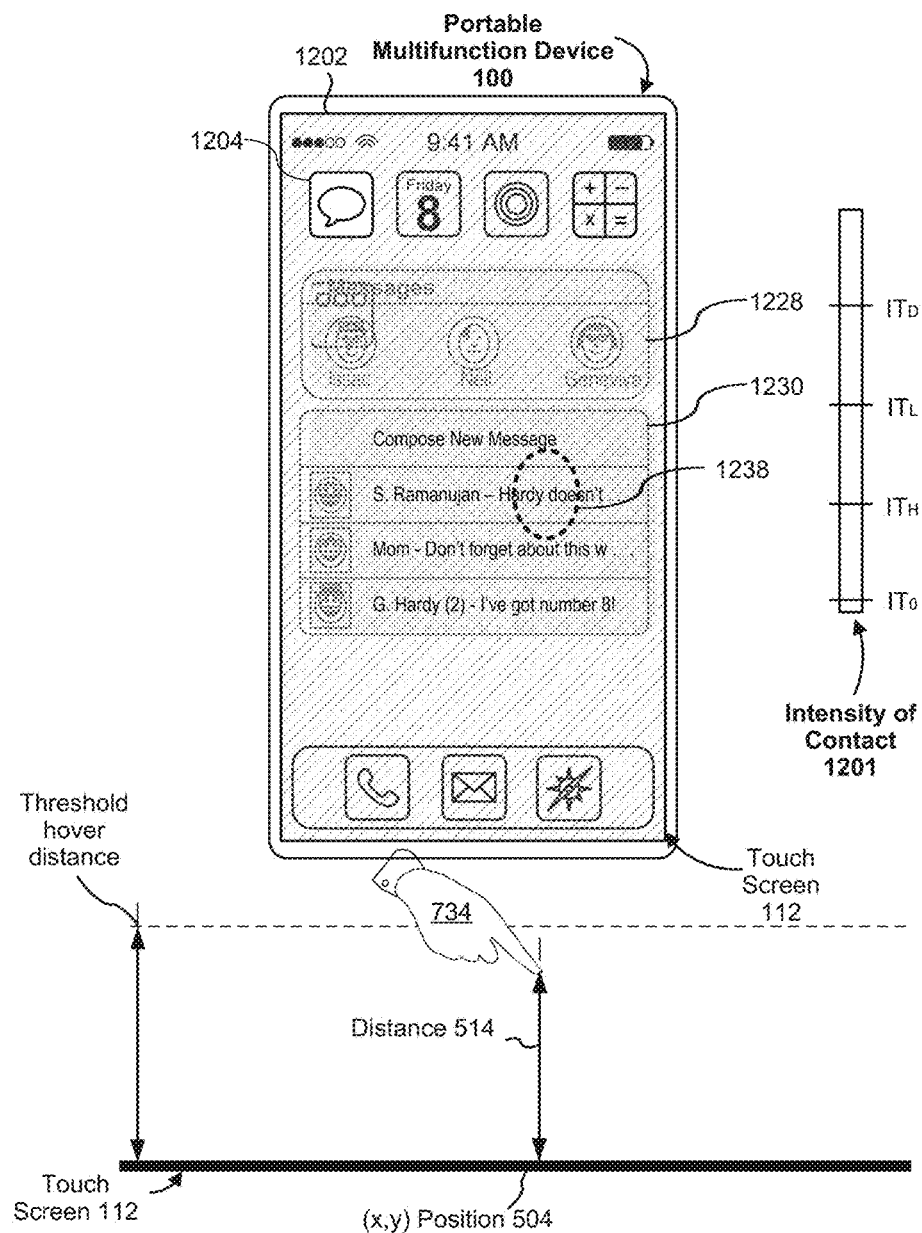
Figure 12P:
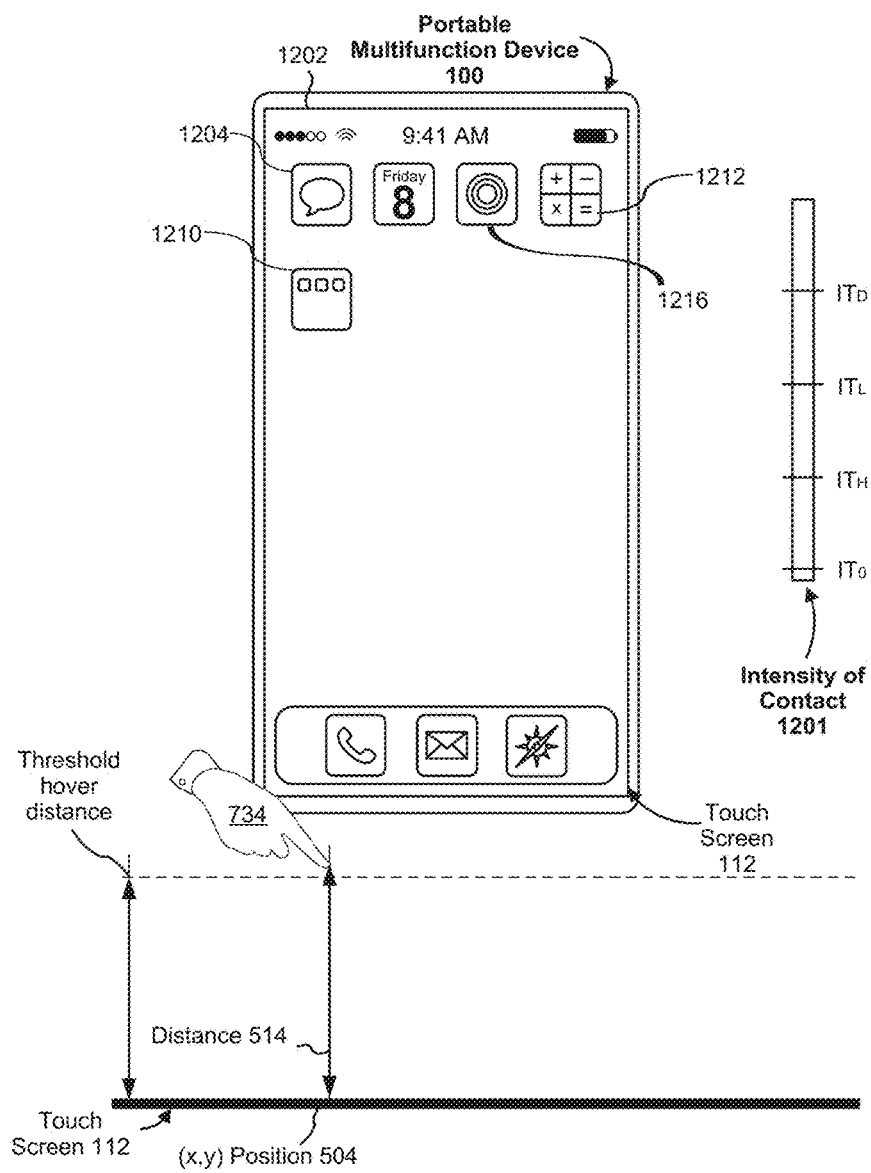
Figure 12Q:
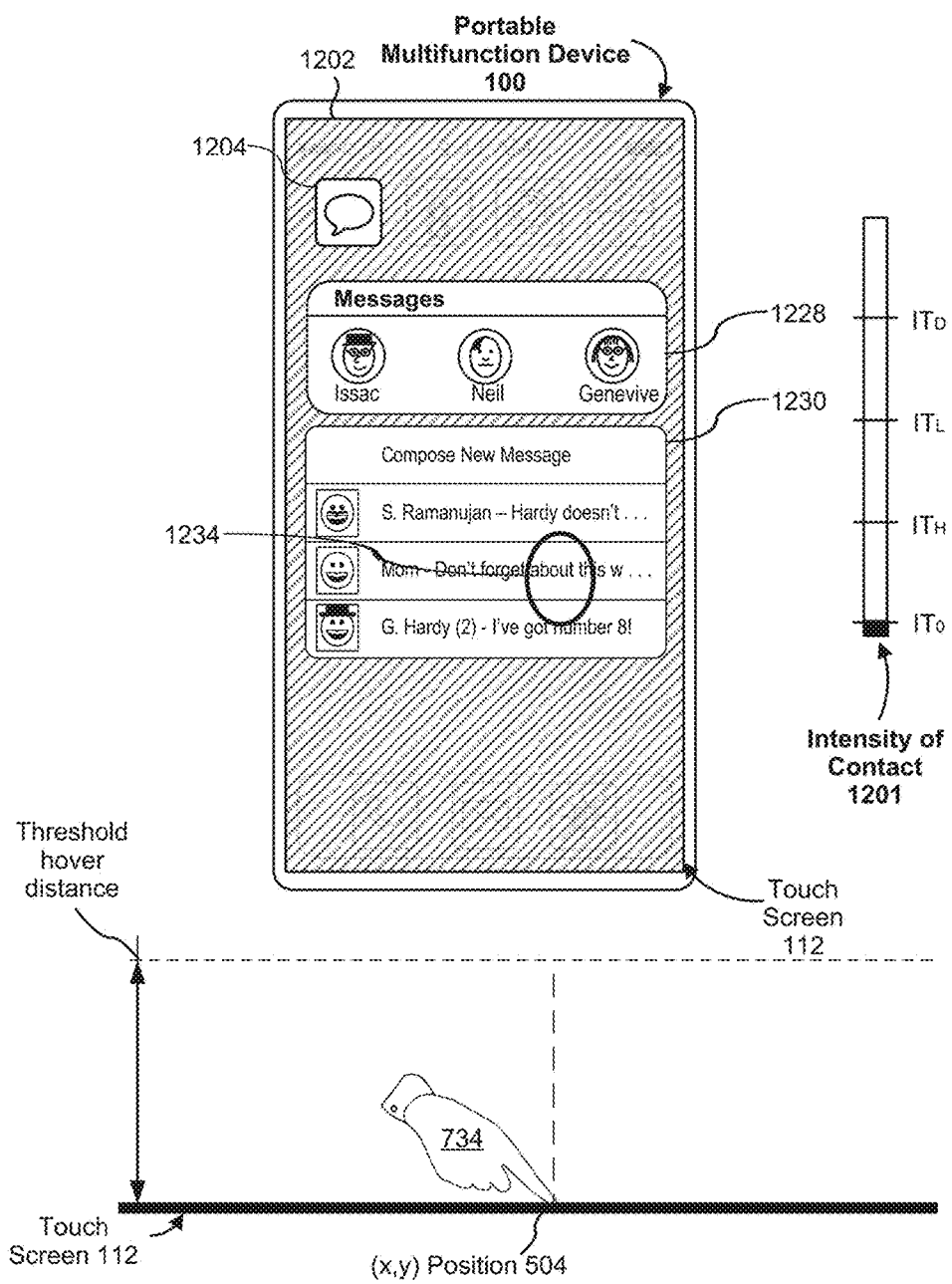
Figure 12R:
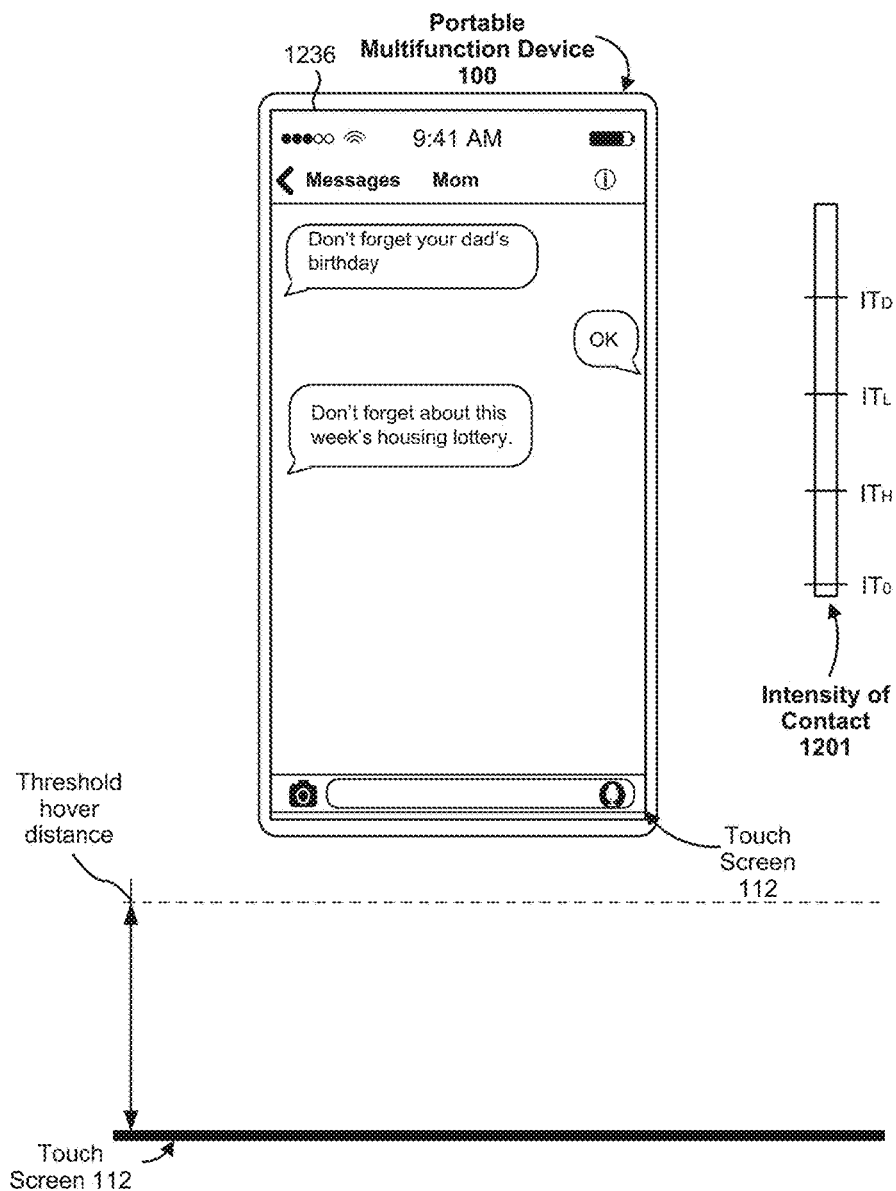

FIGS. 12A-12R illustrate using a hover input to distinguish user interface objects that have differentiated object-specific responses to intensity-based inputs (e.g., a light press, a deep press input, e.g., as opposed to non-intensity-based inputs such as a tap input, a touch-hold input) from user interface objects that do not have differentiated, object-specific responses to intensity-based inputs. An intensity threshold that is above the contact-detection intensity threshold is used as part of the criteria to detect and recognize an intensity-based input. A non-intensity-based input, such as a tap input or a touch-hold input (e.g., a long press input) does not require the contact to have an intensity that meets another intensity threshold above the contact-detection intensity threshold in order for the input to be detected and recognized. A time threshold between touch-down and lift-off is sometimes used as part of the criteria to detect and recognize a non-intensity-based input. An object that has differentiated responses for intensity-based inputs has a first response to a tap input and a different response for a light press input with an intensity exceeding a light press intensity threshold, and optionally another different response for a deep press input with an intensity exceeding the deep press intensity threshold above the light press intensity threshold. An object that does not have differentiated responses for intensity-based inputs has the same response for a tap input and a light press input with lift-off, for example.

In FIG. 12A, home screen user interface 1202 is displayed. Home screen user interface 1202 includes a number of application launch icons corresponding to different applications installed on the device. Some application launch icons (e.g., application launch icons 1204 and 1212) have corresponding application-specific quick action menus that are displayed when the application launch icons are activated by a contact with an intensity that exceeds a light press intensity threshold $IT_L$. Some other application launch icons (e.g., application launch icons 1210 and 1216) do not have corresponding application-specific quick action menus, and do not display such menus or other associated application-specific user interface objects when the application launch icons are activated by a contact with an intensity that exceeds the light press intensity threshold $IT_L$. A tap input on any of the application launch icons will cause the device to launch the application that corresponds to the tapped application launch icon.

FIGS. 12B-12C illustrate that, when finger 734 enters the hover proximity range above the touch-screen and while finger 734 hovers over application launch icon 1204 (as indicated by indication 1208 of finger 734), preview platter 1206 merges from behind application launch icon 1204 to indicate to the user that application launch icon 1204 has differentiated, object-specific/application-specific responses to intensity-based inputs. In FIGS. 12B-12C, while finger 734 hovers over application launch icon 1204, portions of home screen user interface 1202 that are outside of application launch icon 1204 are darkened and blurred. In some embodiments, the amount of darkening and blurring applied to home screen user interface 1202 and the appearance of preview platter 1206 are dynamically changed in accordance with a current value of the hover proximity parameter (e.g., hover distance 514) of finger 734. For example, when finger 734 hovers closer to the touch-screen, preview platter 1206 grows in size, and home screen user interface 1202 becomes increasingly darkened and blurred. The visual effects (e.g., the preview platter and the darkening and blurring of the home screen user interface) are removed if finger 734 is lifted out of the hover proximity range or moved over to another application launch icon that does not have differentiated, object-specific responses to intensity-based inputs.

FIGS. 12D-12E illustrate that, when finger 734 moves laterally to another hover location over application launch icon 1210 that does not have differentiated, object-specific responses to intensity-based inputs, the appearance of application launch icon 1210 is changed to indicate that finger 734 is now hovering over application launch icon 1210 (as indicated by indication 1208 of finger 734, and highlighting of application launch icon 1210), but no preview platter merges from behind application launch icon 1210 and no darkening and blurring of home screen user interface 1202 are applied. In some embodiments, the highlighting of application launch icon 1210 remains unchanged when the current value of the hover proximity parameter (e.g., hover distance 514) of finger 734 changes (e.g., application launch icon 1210 looks the same in FIGS. 12D and 12E).

FIG. 12F shows that, when finger 734 hovers over another application launch icon 1212 (e.g., as indicated by indication 1208 of finger 734) that has differentiated, object-specific responses to intensity-based inputs, preview platter 1214 emerges from behind application launch icon 1212. The appearance and behavior of preview platter 1214 are optionally identical to the appearance and behavior of preview platter 1206 for application launch icon 1204. Similarly, home screen user interface 1202 is darkened and blurred in the same manner as shown in FIG. 12B.

FIG. 12G shows that, when finger 734 hovers over another application launch icon 1216 (e.g., as indicated by indication 1208) that does not have differentiated, object-specific responses to intensity-based inputs, application-launch icon 1216 is highlighted. The highlighting that is applied to application-launch icon 1216 is consistent, similar, and optionally identical to the highlighting that is applied to application-launch icon 1210 in FIG. 12D.

FIGS. 12H-12I continue from 12E. After finger 734 hovers over application launch icon 1210, finger 734 makes contact with application launch icon 1210 (e.g., as indicated by contact 1220). When the intensity of contact 1220 increases and exceeds the light press intensity threshold $IT_L$ (as indicated by intensity meter 1201), a canned visual effect is shown to indicate that a light press input has been detected, but that application launch icon 1210 does not have an object-specific response to the light press input. As shown in FIG. 12H, a hint 1222 of a preview platter emerges from behind application launch icon 1210 and tactile output 1224 (e.g., a "failure" haptic) is generated, when the light press input is detected. The hint 1222 of the preview platter fades away quickly during the canned visual effect. FIG. 12I shows that, the canned visual effect is completed, and finger 734 is lifted off the touch-screen. While finger 734 hovers over application launch icon 1210 (as indicated by indication 1226), the same highlighting is applied to application launch icon 1210 to indicate that it does not have differentiated, object-specific response to intensity-based inputs, and only have a canned, generic response (which has been illustrated in FIG. 12H).

In FIGS. 12J-12L, finger 734 moves laterally to a hover location over application launch icon 1204 again. The same visual effects shown in FIG. 12C are redisplayed. In FIG. 12K, finger 734 makes contact with application launch icon 1204 (e.g., as indicated by contact 1226). When the intensity of contact 1226 increases, preview platter 1206 grows in size and shifts relative to application launch icon 1204, and user interface 1202 is darkened and blurred further (as shown in FIG. 12K). Once the intensity of contact 1226 exceeds the light press intensity threshold, preview platter 1206 transforms into mini application object 1228 and quick action menu 1230 that correspond to the messages application (as shown in FIG. 12L). The amount of blurring and darkening applied to user interface 1202 is at their maximum extent. A tactile output (e.g., tactile output 1232) is generated when the light press input is detected and the quick action menu and mini application object are displayed.

FIGS. 12M-12O illustrate that, when finger 734 lifts up from the touch-screen after mini application object 1228 and quick action menu 1230 have been displayed in response to the light press input by contact 1226, the appearances of mini application object 1228 and quick action menu 1230 are altered in accordance with a current value of the hover proximity parameter of finger 734, e.g., becoming increasingly translucent with increasing hover distance 514 above the touch-screen. In addition, the amount of blurring and darkening of home screen user interface 1202 is also decreased with increasing hover distance 514 above the touch-screen. FIGS. 12M-12O also illustrate that, after finger 734 is lifted off the touch-screen, finger 734 moves laterally while remaining within the hover proximity range above the touch-screen (as indicated by indication 1238), and as long as finger 734 is still detected within the hover proximity range above the touch-screen, display of mini application object 1228 and quick action menu 1230 is maintained.

FIG. 12P continues from FIG. 12O. FIG. 12P illustrates that, if finger 734 is lifted out of the hover proximity range without first making contact with the touch-screen again, mini application object 1228 and quick action menu 1230 cease to be displayed, and home screen user interface 1202 is restored to its original appearance.

FIGS. 12Q-12R continues from 12O. In contrast to the scenario shown in FIG. 12P, finger 734 makes contact with the touch-screen at a location that corresponds to one of the selectable options in quick action menu 1230 (as indicated by contact 1234). Upon lift-off of contact 1234, the selectable option that is touched by contact 1234 is activated, and the instant messaging application that corresponds to application launch icon 1204 is launched and user interface 1236 that corresponds to the selectable option is displayed (as shown in FIG. 12R).

Figure 13A:
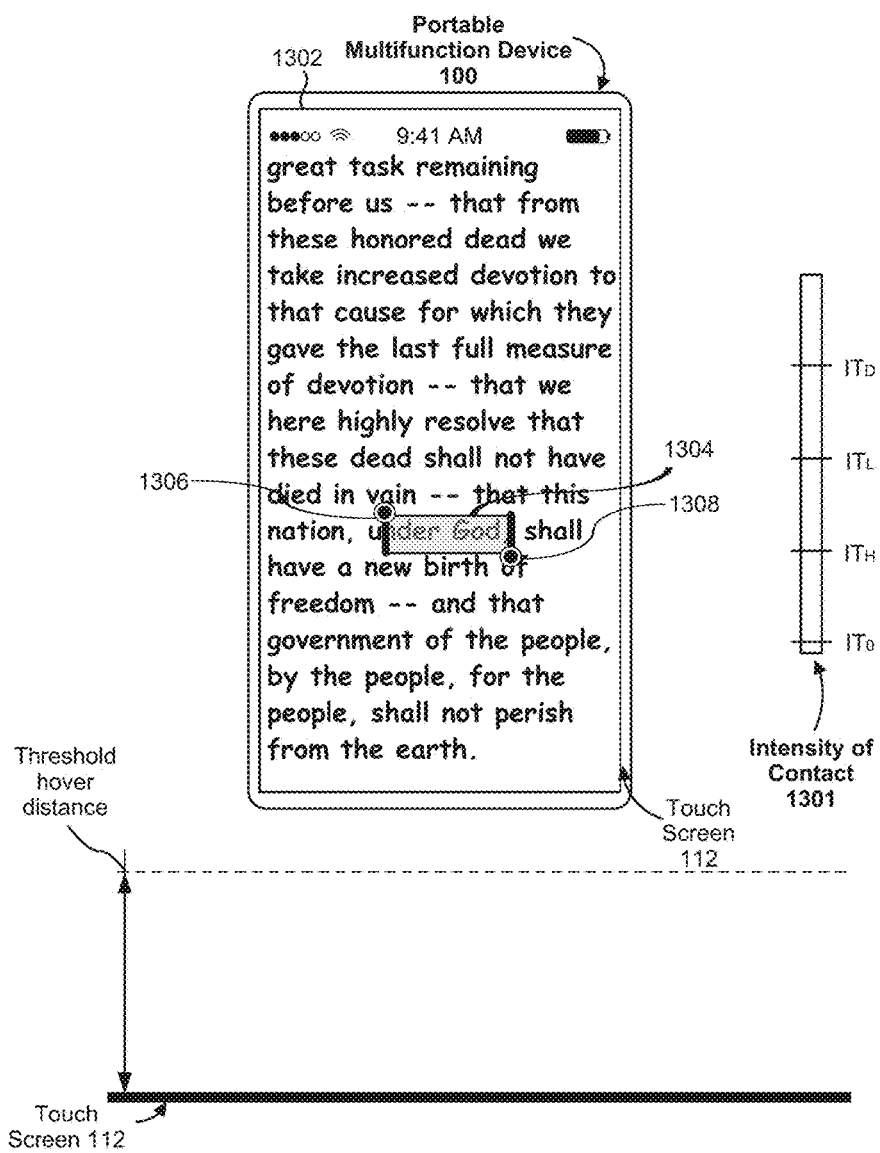
FIGS. 13A-13N illustrate exemplary user interfaces for indicating which selection handle of a selection object is selected for movement when an input object hovers over the selection object, in accordance with some embodiments.
Figure 13B:
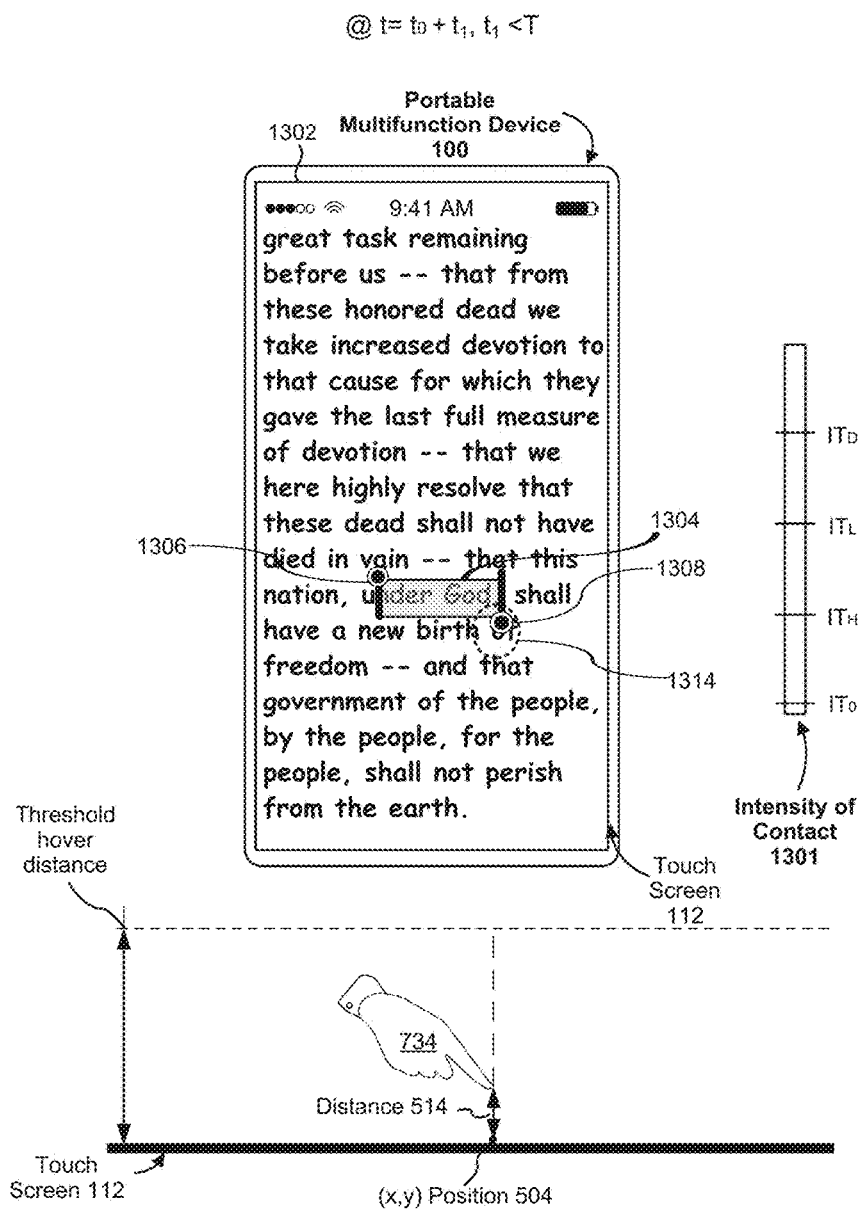
Figure 13C:
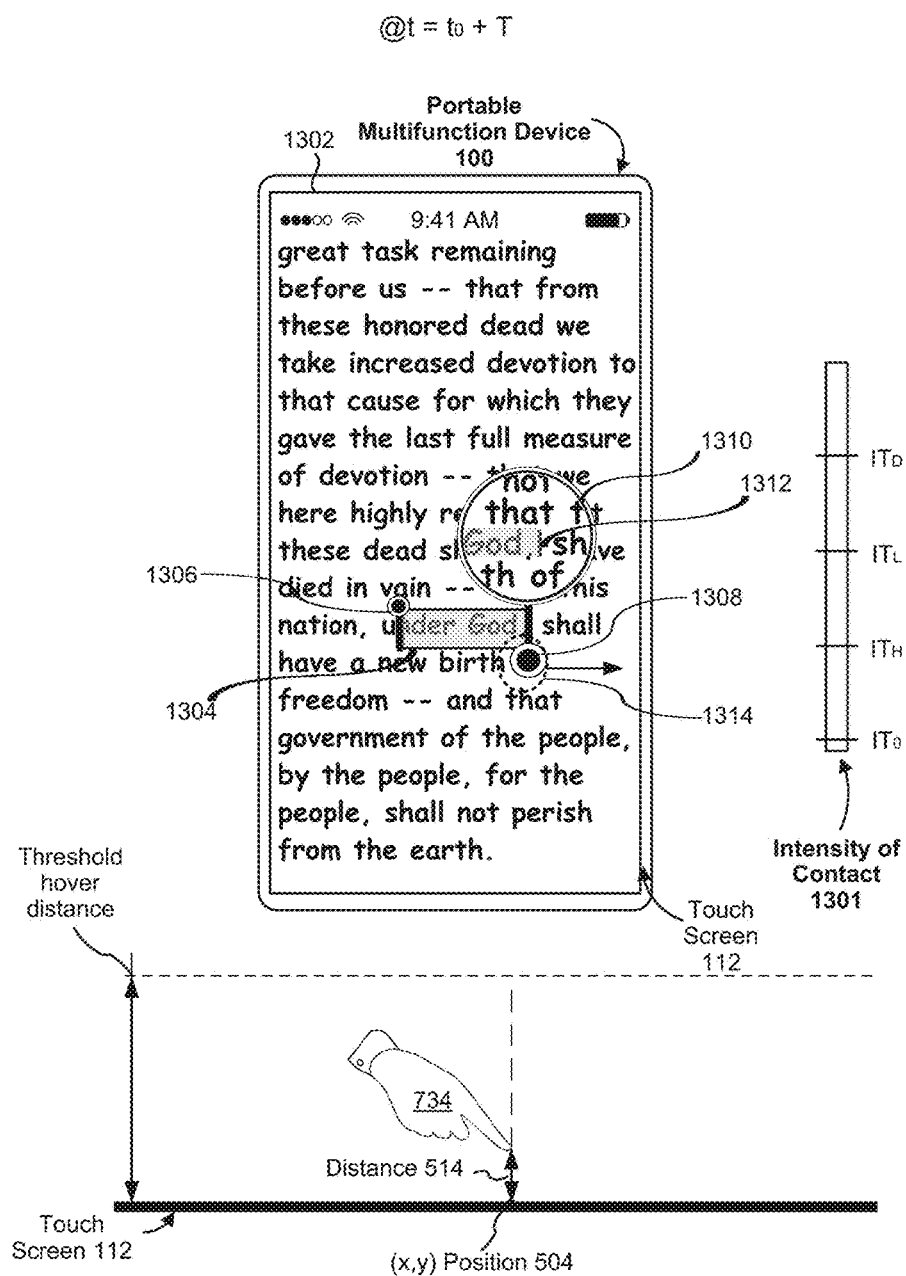
Figure 13D:
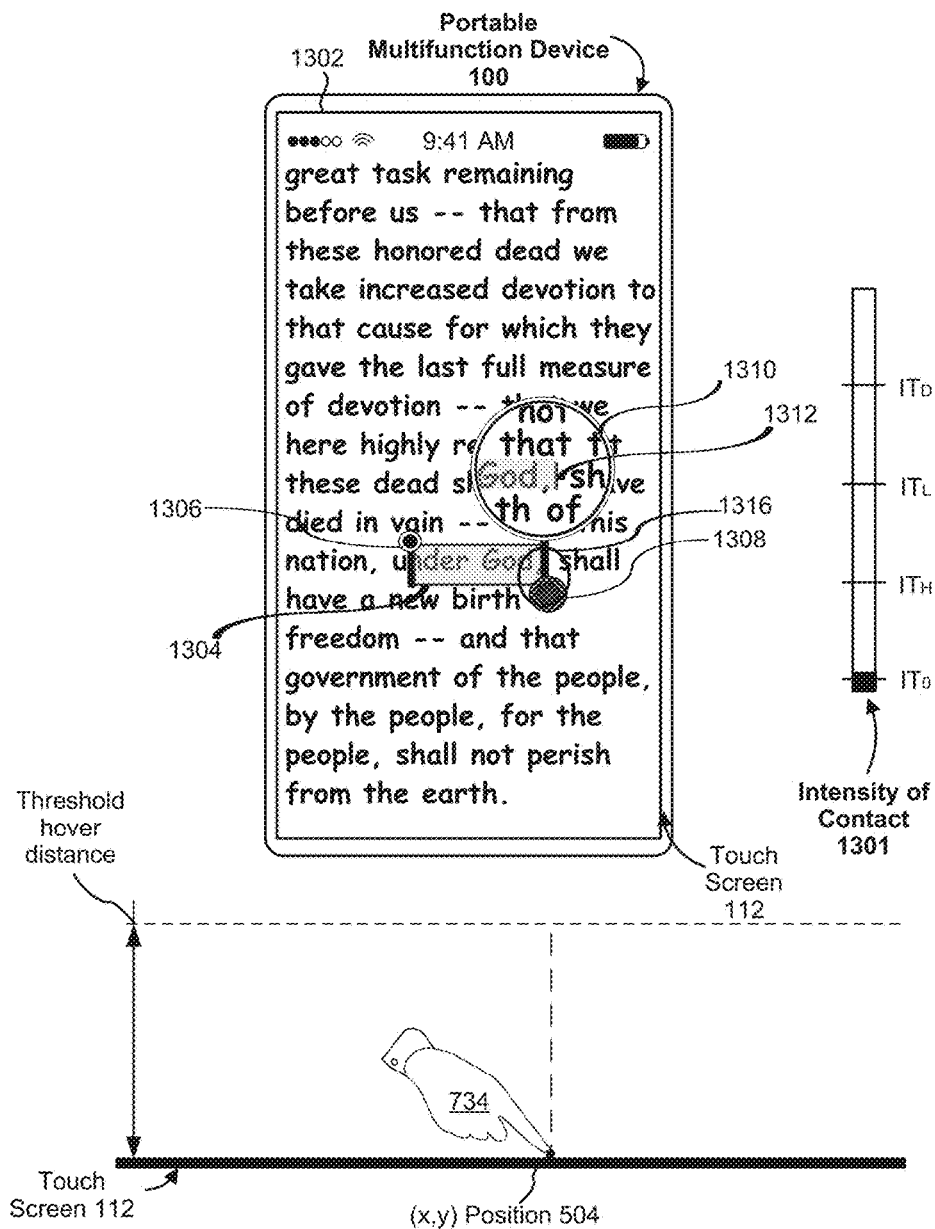
Figure 13E:
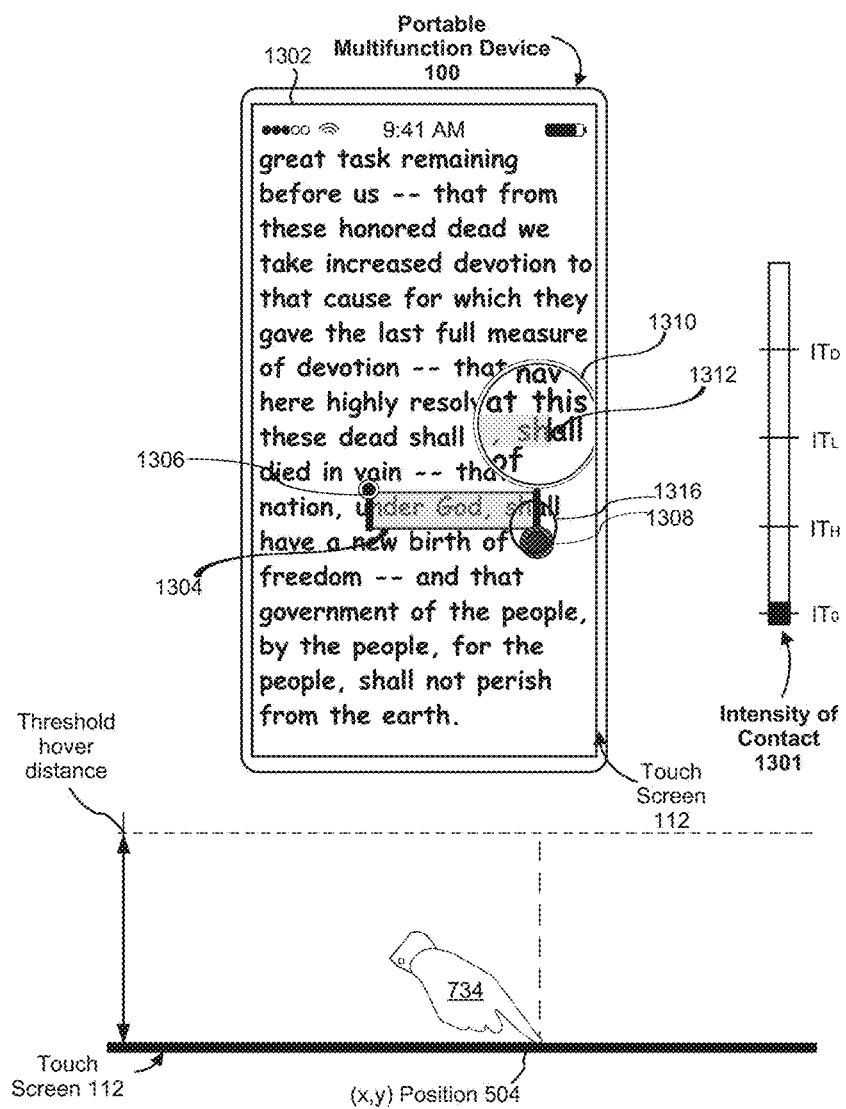
Figure 13F:
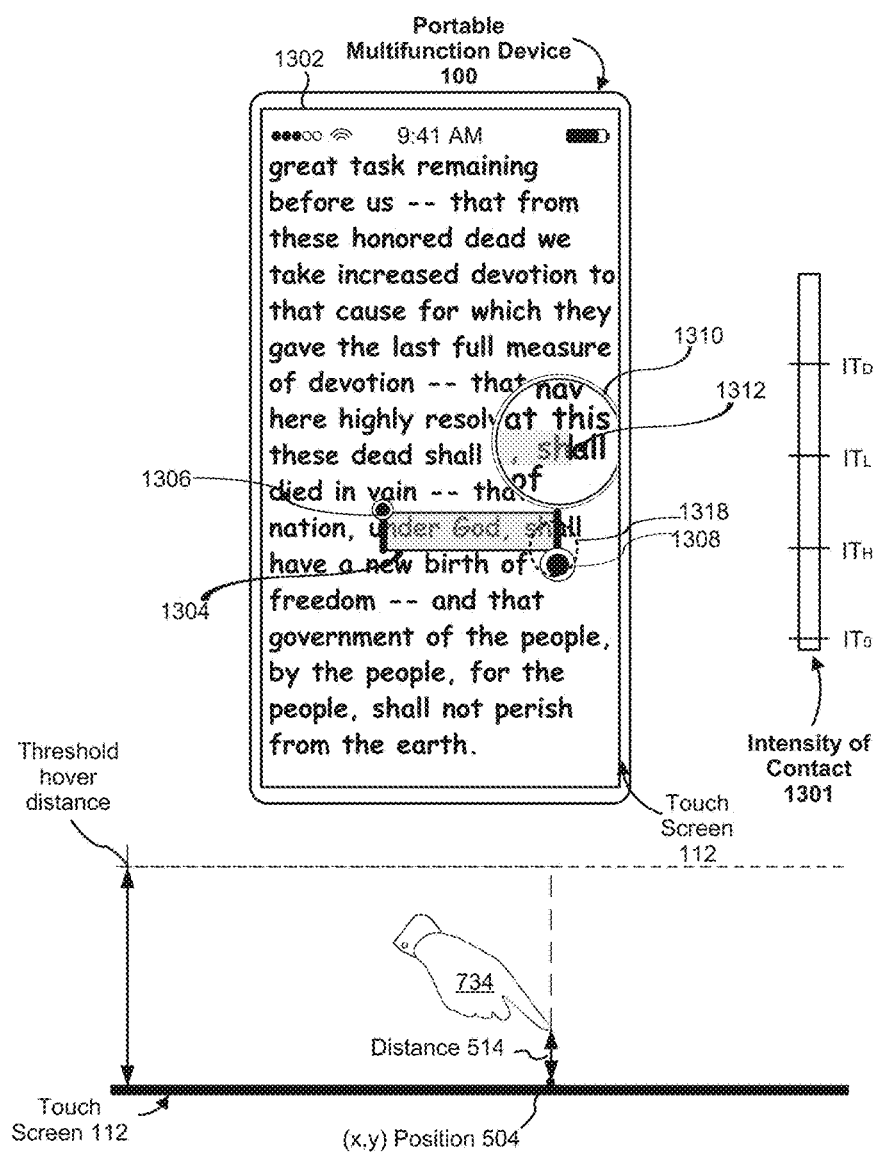
Figure 13G:
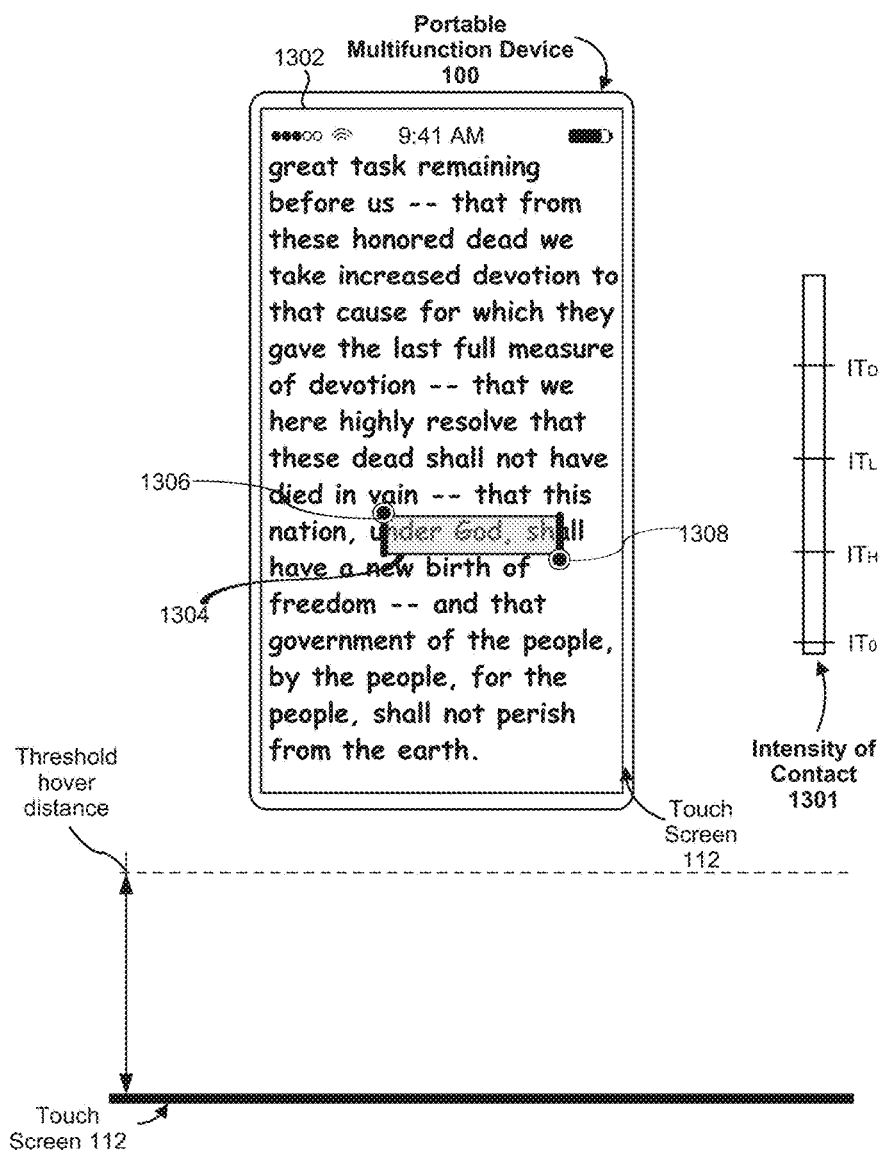
Figure 13H:
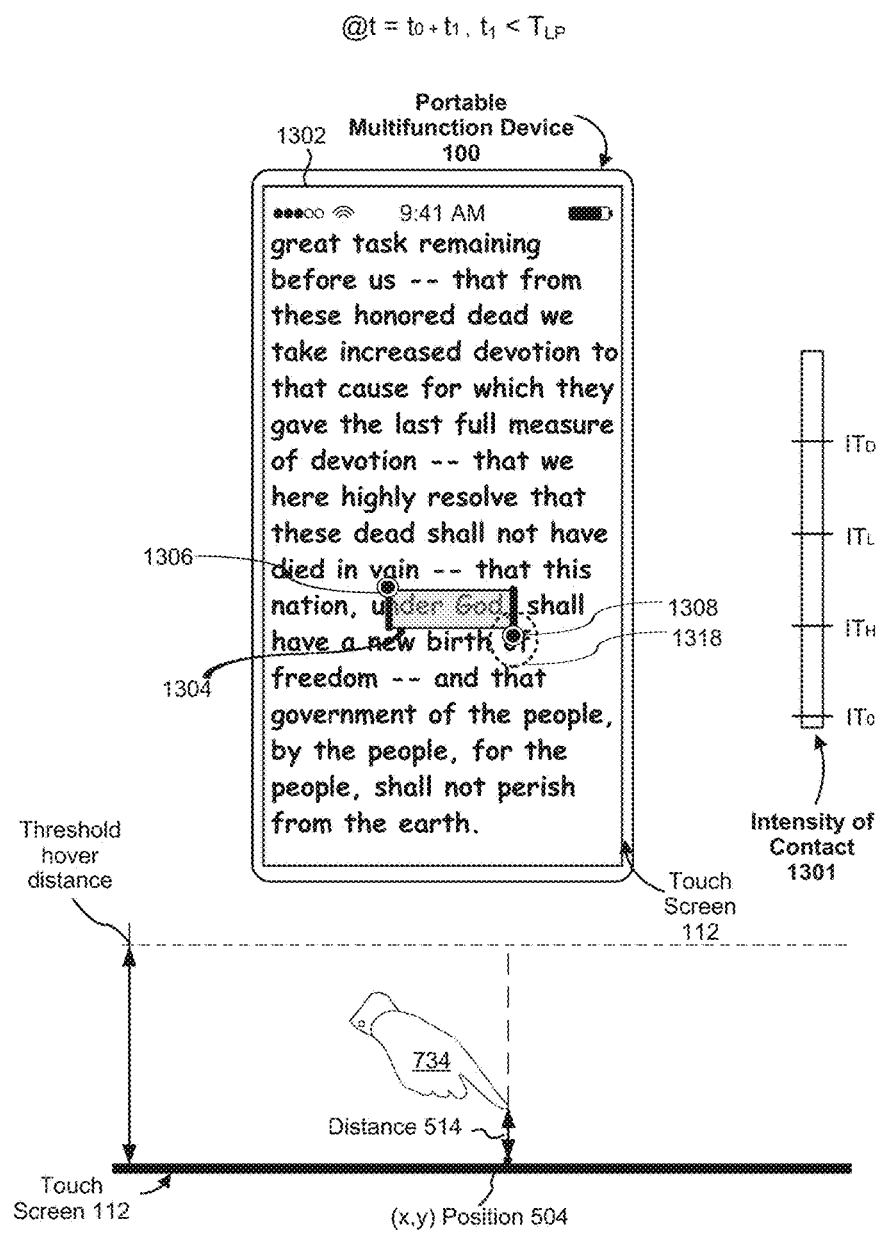
Figure 13I:
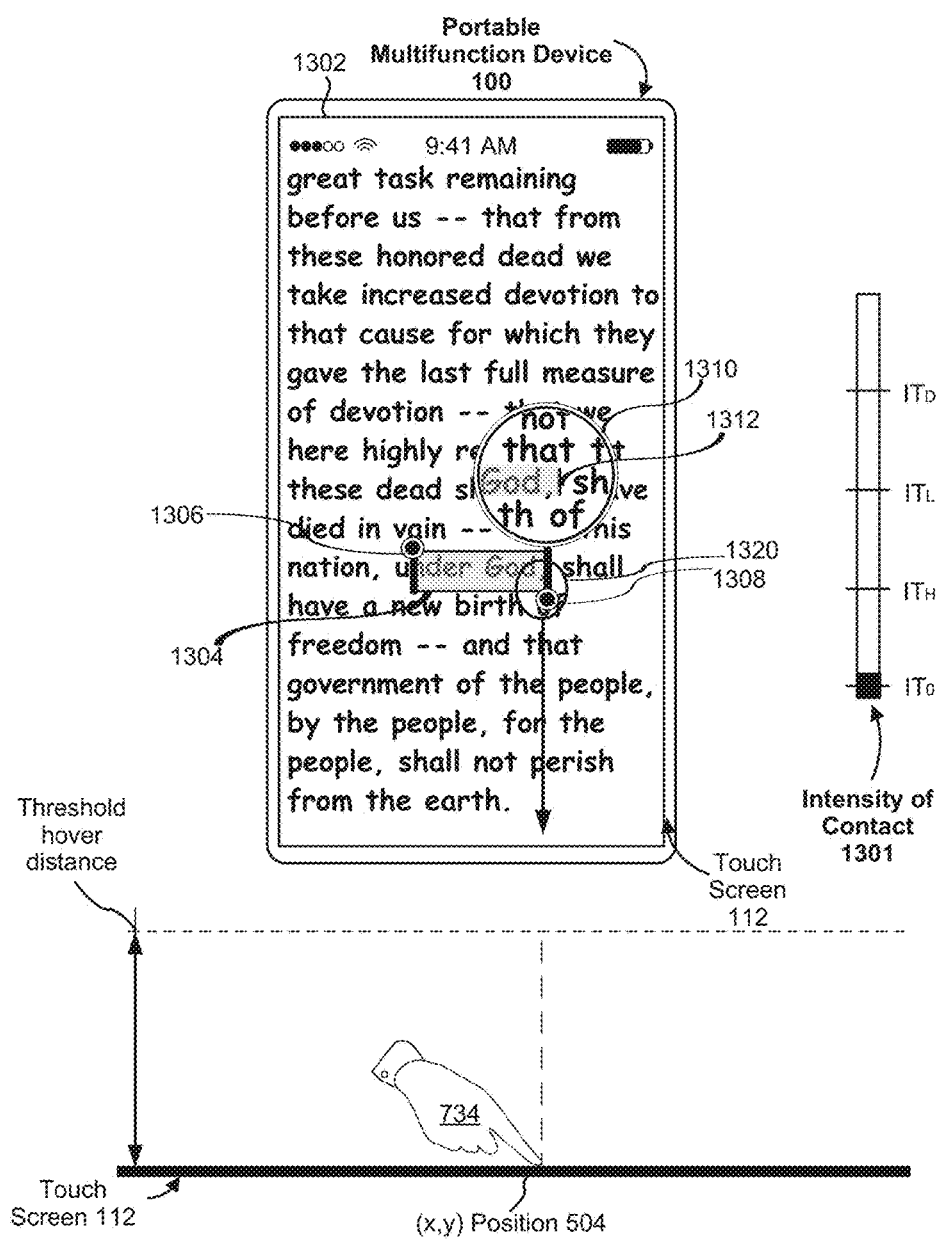
Figure 13J:
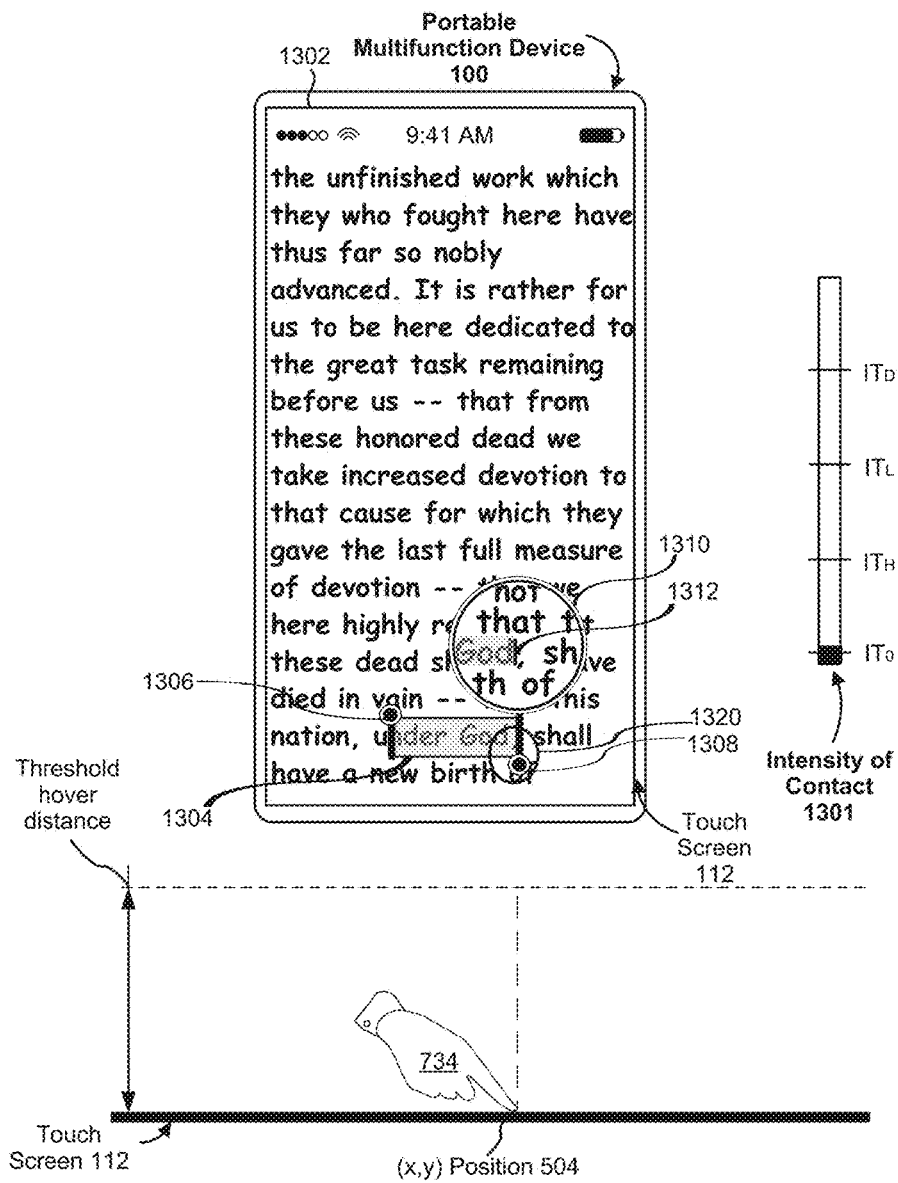
Figure 13K:
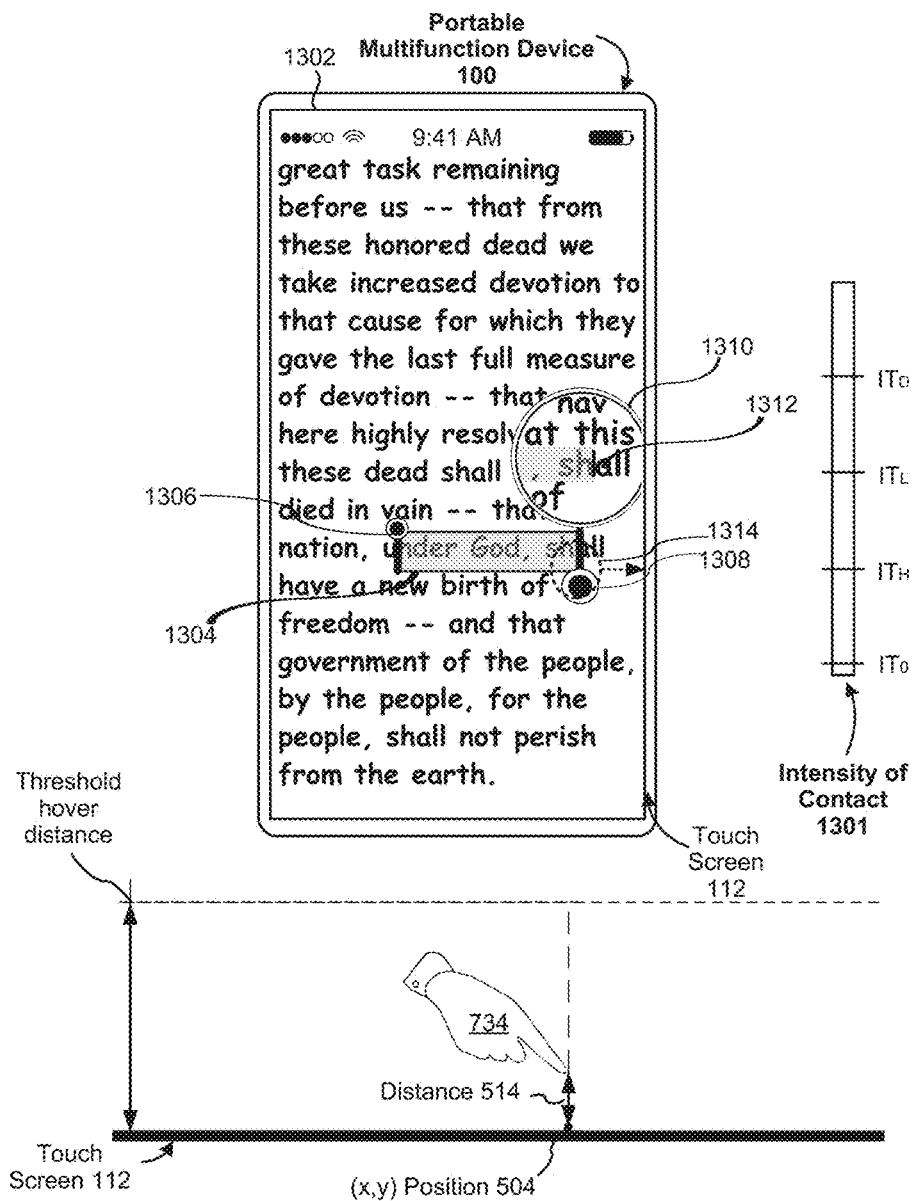
Figure 13L:
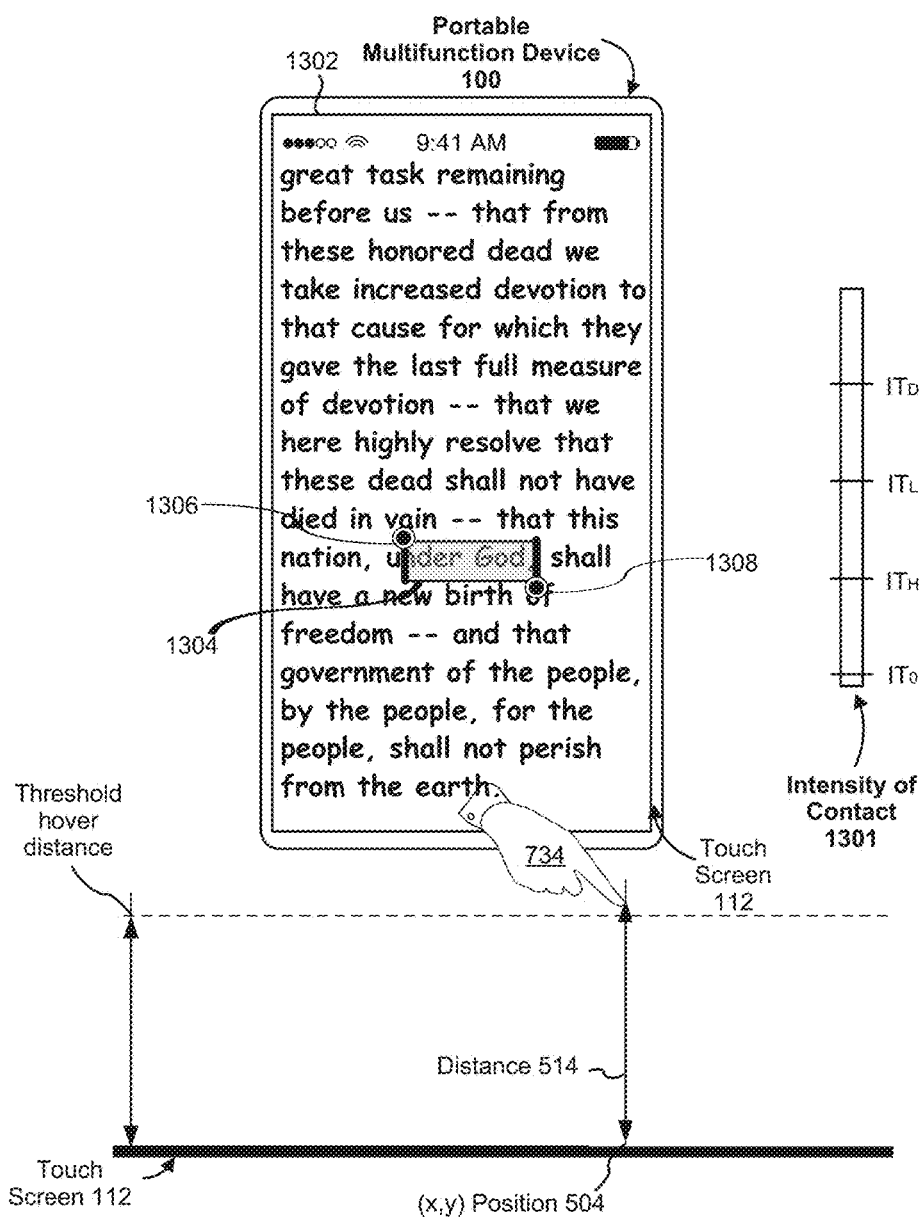
Figure 13M:
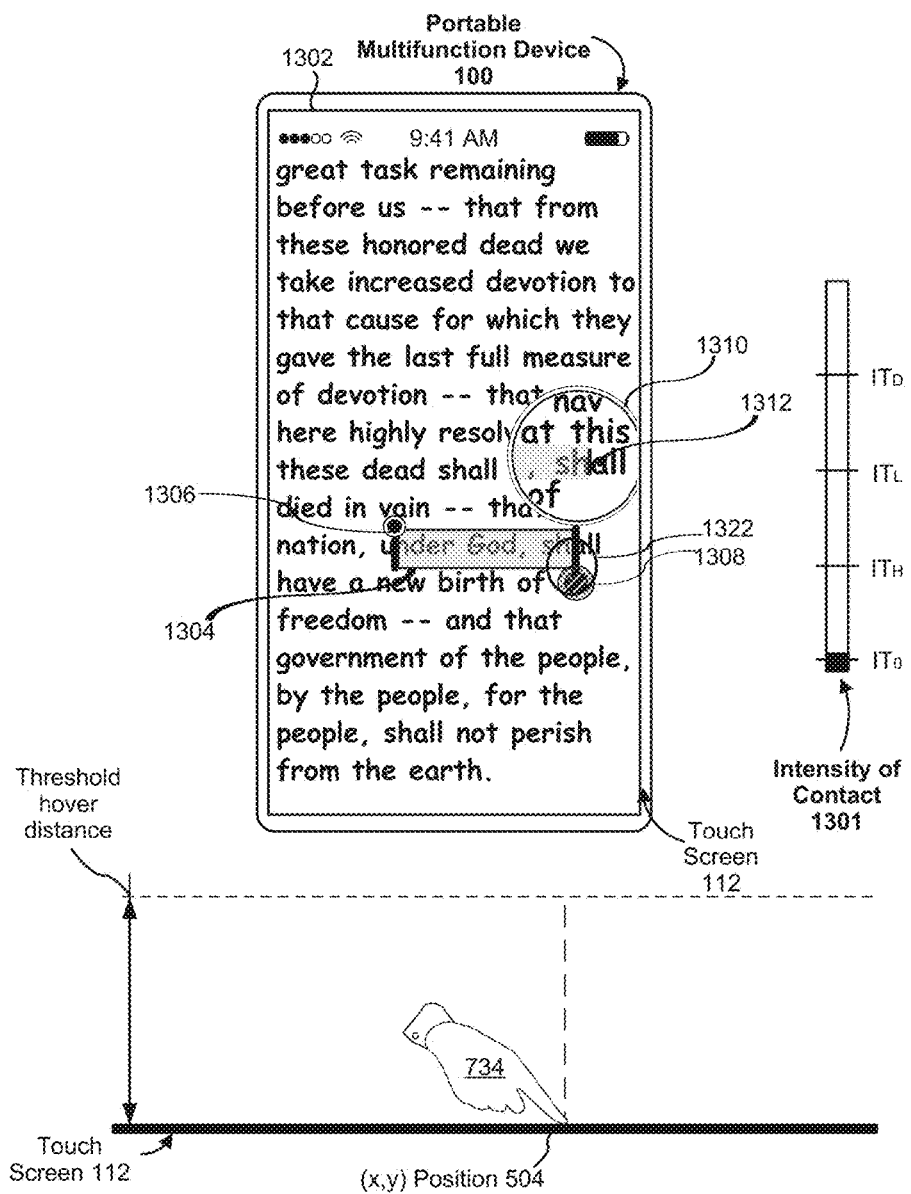
Figure 13N:
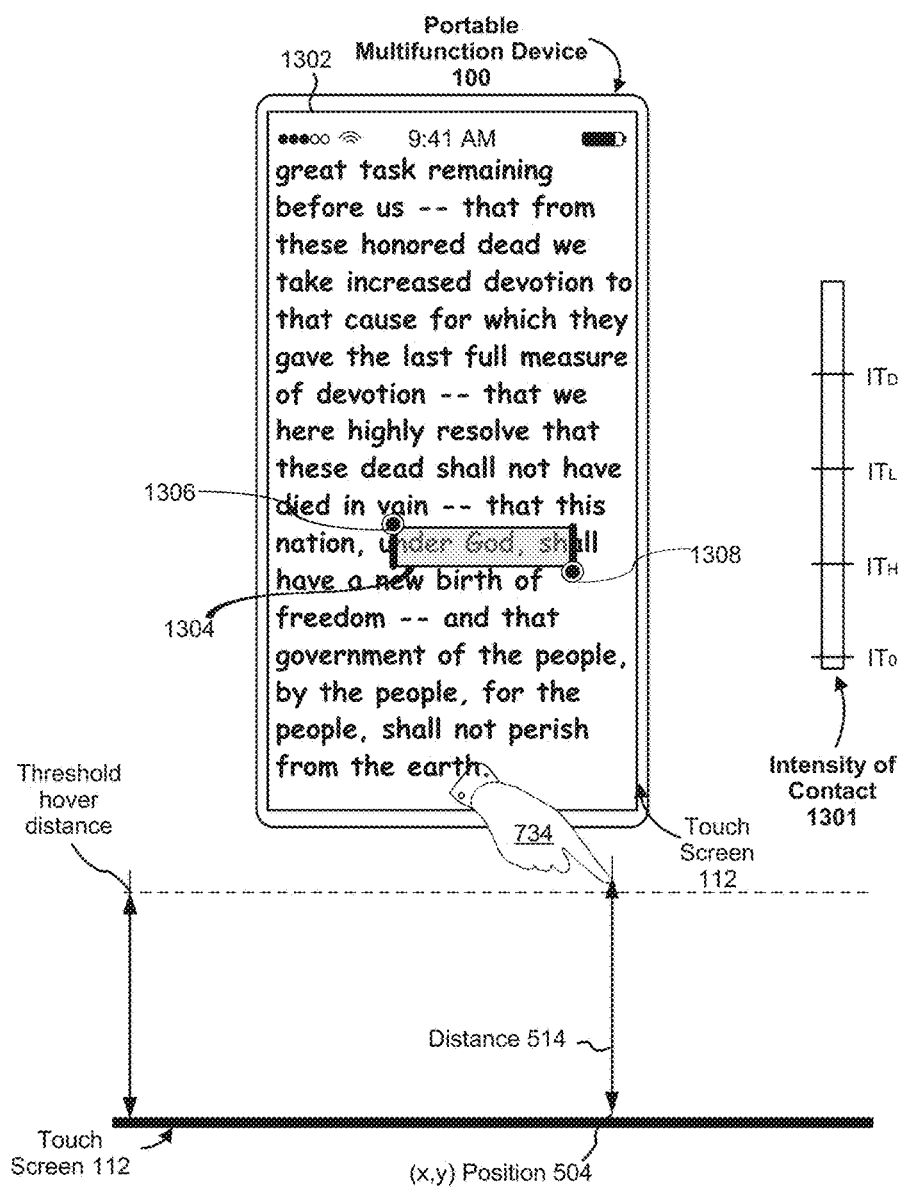

FIGS. 13A-13N illustrate visually indicating which selection handle among multiple selection handles of a content selection object is selected for movement when an input object hovers over the selection handle, in accordance with some embodiments.

In FIG. 13A, content display user interface 1302 (e.g., a user interface of a text editor application or a user interface of a web browser application, etc.) displays selectable content (e.g., text). A portion of the displayed content has been selected. The selection is enclosed in a selection object (e.g., selection object 1304 with two selection handles, including start selection handle 1306 and end selection handle 1308). The selection of the text is optionally carried out in a manner that is described with respect to FIGS. 10T-10Y, or other conventional text selection methods.

FIGS. 13B-13C illustrate that, when finger 734 moves toward the touch-screen and enters the hover proximity range, and if (x,y) position 504 of finger 734 is over one of the selection handles (e.g., selection handle 1308) (e.g., as indicated by indication 1314 of finger 734) for at least a threshold amount of time T, the selection handle (e.g., selection handle 1308) is highlighted relative to the other selection handle (e.g., selection handle 1306). For example, the end portion of selection handle 1308 is enlarged relative to the corresponding end portion of selection handle 1306 to indicate that selection handle 1308 has been selected for movement. In some embodiments, magnifying loupe 1310 is displayed near the selected selection handle 1308. In some embodiments, magnifying loupe 1310 is only displayed after finger 734 has hovered over selection handle 1308 for at least the threshold amount of time T. The magnifying loupe includes a magnified version of a portion of text surrounding selection handle 1308. Selection handle 1308 is represented as cursor 1312 within the magnified text inside magnifying loupe 1310.

FIGS. 13D-13G illustrate relocation of the selected selection handle 1308 by movement of a continuously maintained contact. FIG. 13D continues from FIG. 13C in some embodiments. In some embodiments, FIG. 13D continues from FIG. 13B. When finger 734 moves closer to the touch-screen and makes contact with the touch-screen (e.g., as indicated by intensity meter 1301) at a location that corresponds to the selected selection handle 1308 (e.g., as indicated by contact 1316), the appearance of selection handle 1308 is optionally changed to indicate that contact has been made with selection handle 1308 (as shown in FIG. 13D). When contact 1316 moves across the touch-screen, selection handle 1308 is dragged by contact 1316 to expand the selection enclosed in selection object 1304. Magnifying loupe 1310 moves with selection handle 1308 and the text shown in magnifying loupe 1310 is continuously updated in accordance with the position of selection handle 1308 within the text (as shown in FIG. 13E). In FIG. 13F, finger 734 is lifted off the touch-screen, and selection handle 1308 remains highlighted (e.g., in the same manner as shown in FIG. 12C) while finger 734 continues to hover above selection handle 1308. If finger 734 moves laterally to another hover location over selection handle 1306 instead (not shown), selection handle 1308 will be restored to its original appearance, and selection handle 1306 would be highlighted relative to selection handle 1308 to indicate that selection handle 1306 is now selected for movement. In addition, magnifying loupe 1310 would be moved (not shown) to be near selection handle 1306 and showing text surrounding selection handle 1306. In FIG. 13G, once finger 734 is lifted out of the hover proximity range above the touch-screen, the previously highlighted selection handle (e.g., selection handle 1308) is restored to its original appearance but remains at the new location, and the resizing of the selection object is completed.

FIGS. 13H-13J illustrate a scenario in which finger 734 is not held over a selection handle for more than the threshold amount of time T before finger 734 makes contact with the touch-screen. When the contact moves across the touch-screen, content display user interface 1302 is scrolled. In FIG. 13H, finger 734 is at a hover location over selection handle 1308 (as indicated by indication 1318 of finger 734) (e.g., when finger 734 is on its way to make contact with the touch-screen). Before finger 734 hovers over selection handle 1308 for at least the threshold amount of time T, the selection object does not change in appearance. After finger 734 makes contact with the touch-screen (e.g., as indicated with contact 1320), the entire content display user interface 1302 scrolls with movement of contact 1320 across the touch-screen (as shown in FIGS. 13I-13J). Although content selection object 1304 is displayed on content display user interface, scrolling of user interface 1302 by contact 1320 does not require the presence of content selection object. In addition, the scrolling of the user interface does not require the contact to be located on or near a selection handle, and may be performed by a contact on any part of the displayed content.

FIG. 13K continues from FIG. 13D. FIG. 13K illustrates that, selection handle 1308 is moved in accordance with lateral movement of finger 734 while finger 734 remains with the hover proximity range above the touch-screen.

FIG. 13L follows FIG. 13K and illustrates that, if finger 734 is lifted out of the hover proximity range without first making contact with the touch-screen again, selection handle 1308 is restored to its original location and the resizing of the selection object 1304 is canceled.

FIGS. 13M-13N follows FIG. 13K and illustrates that, if finger 734 is lifted out of the hover proximity range after making contact with the touch-screen (e.g., as indicated by contact 1322) again, selection handle 1308 remains at its new location in the text. Additional details of this behavior is described with respect to FIGS. 8P and 8V, for example.

FIGS. 14A-14M illustrate operation of a reactive region for maintaining input focus on an object, where the reactive region has different lateral ranges at different hover distances above the touch-screen, in accordance with some embodiments.

Figure 14A:
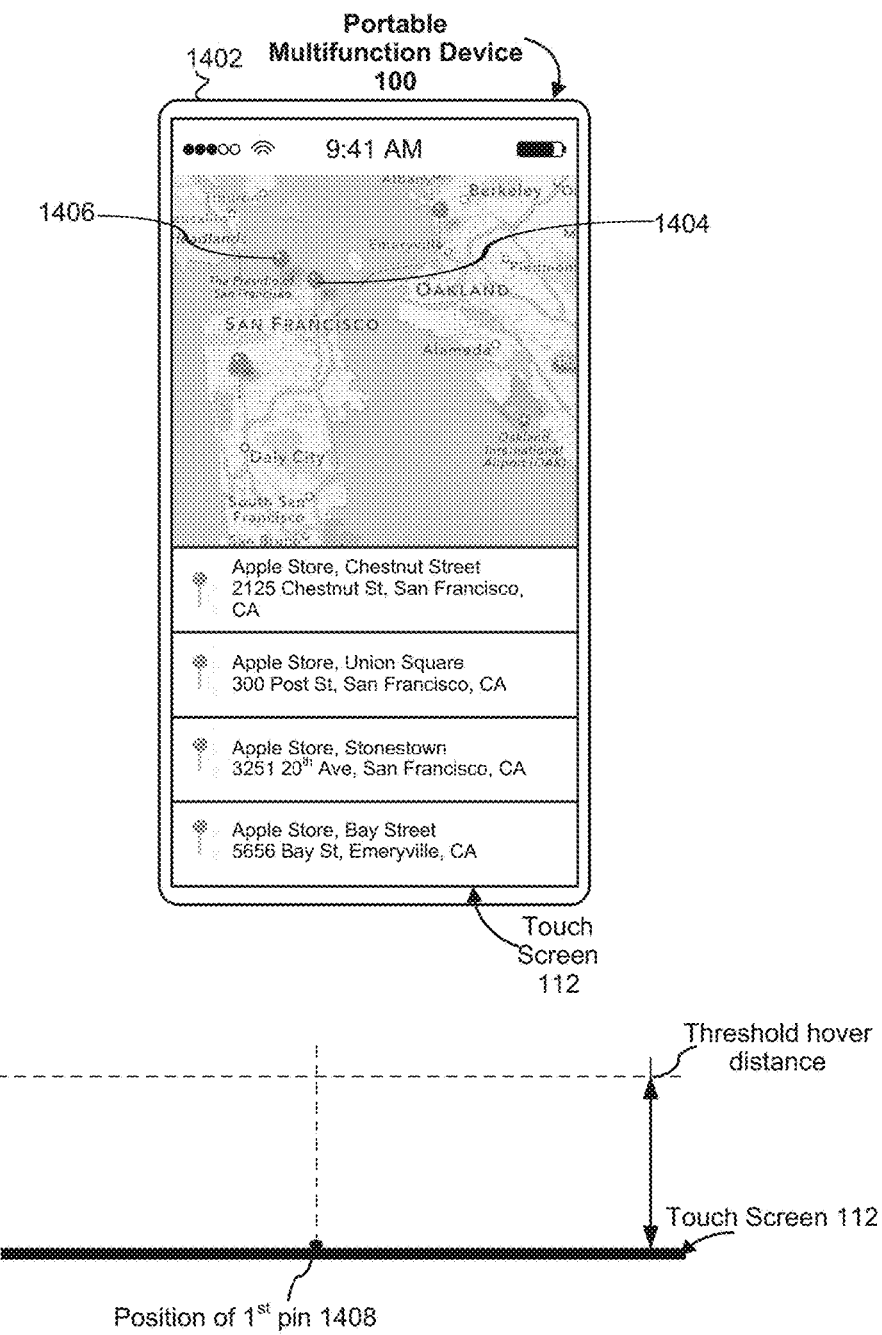
FIGS. 14A-14M illustrate maintaining input focus on an object during a hover move input, where the criteria for maintaining input focus on the object is dynamically changed based on a characteristic hover proximity parameter of the input object during the hover move input, in accordance with some embodiments.

FIG. 14A shows a user interface (e.g., map user interface 1402) that includes a plurality of user interface objects (e.g., location pin 1404 and location pin 1406) that are selectable when finger 734 hovers above them. The (x,y) position 1408 of location pin 1404 is indicated on touch-screen 112.

Figure 14B:
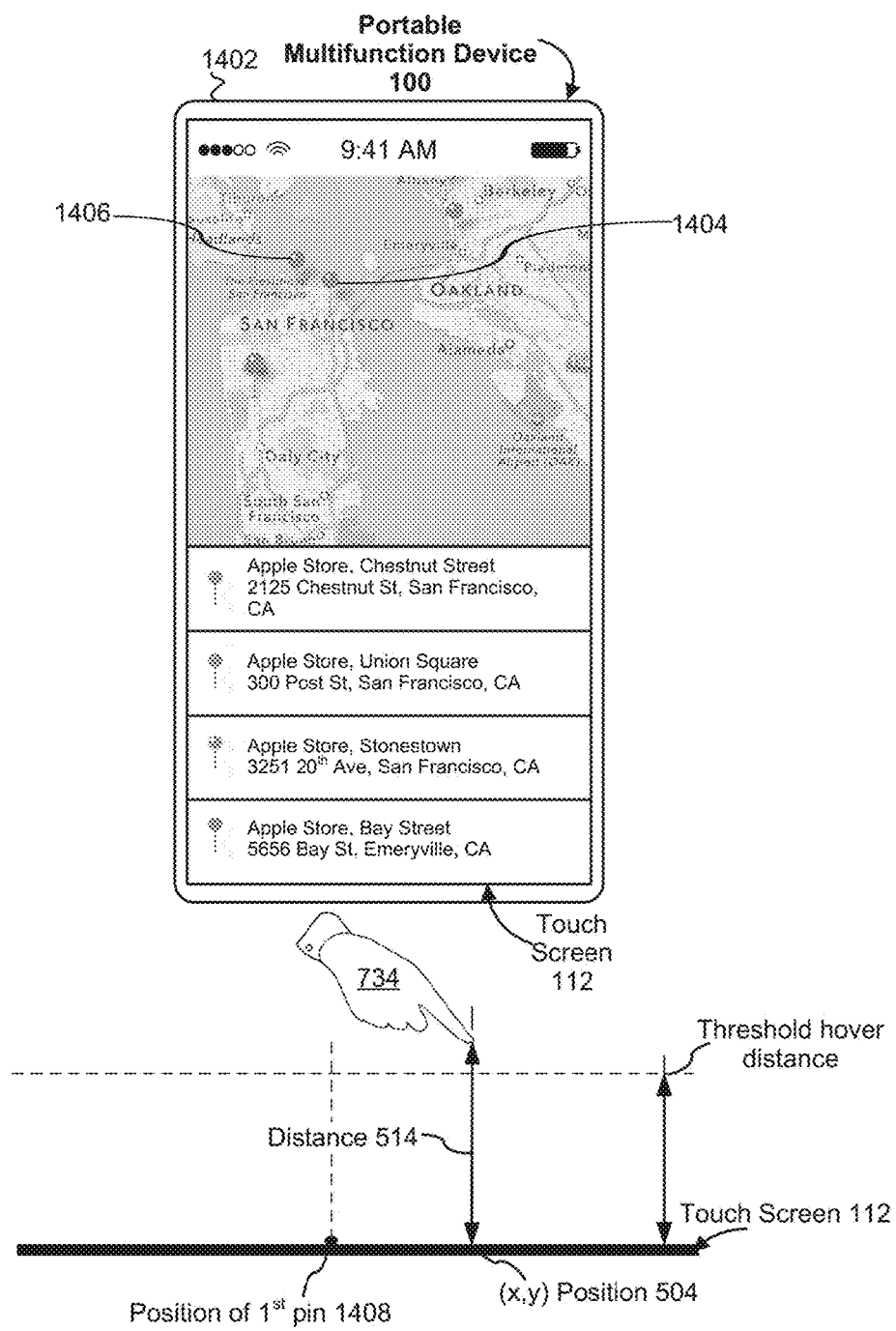
Figure 14C:
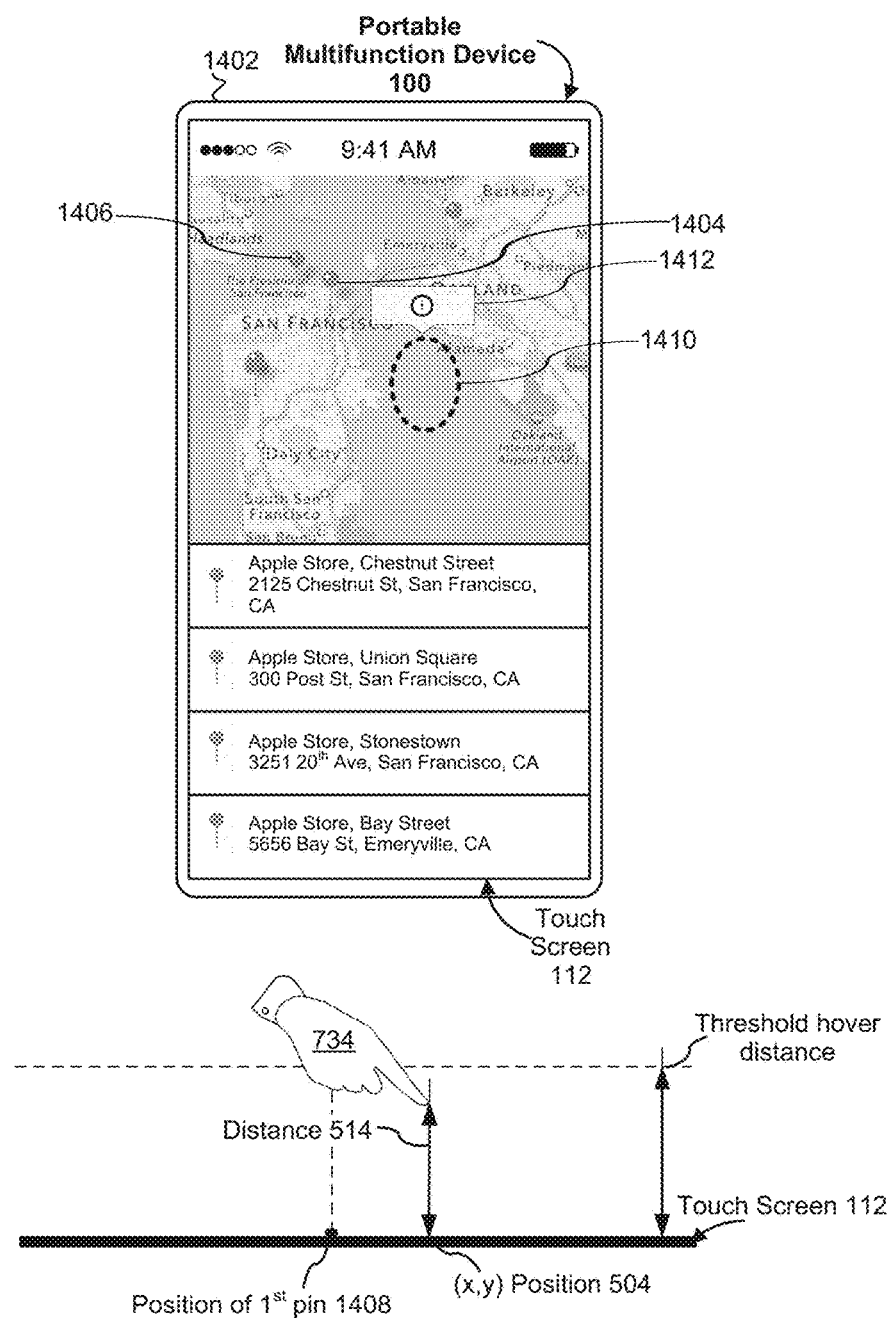

FIGS. 14B-14C illustrate that, when finger 734 moves toward the touch-screen and enters the hover proximity range above a region that does not have any selectable objects (e.g., as indicated by indication 1410 in FIG. 14C), an empty information pop-up (e.g., pop-up 1412) is displayed at the location that corresponds to the (x,y) position 504 of finger 734.

Figure 14D:
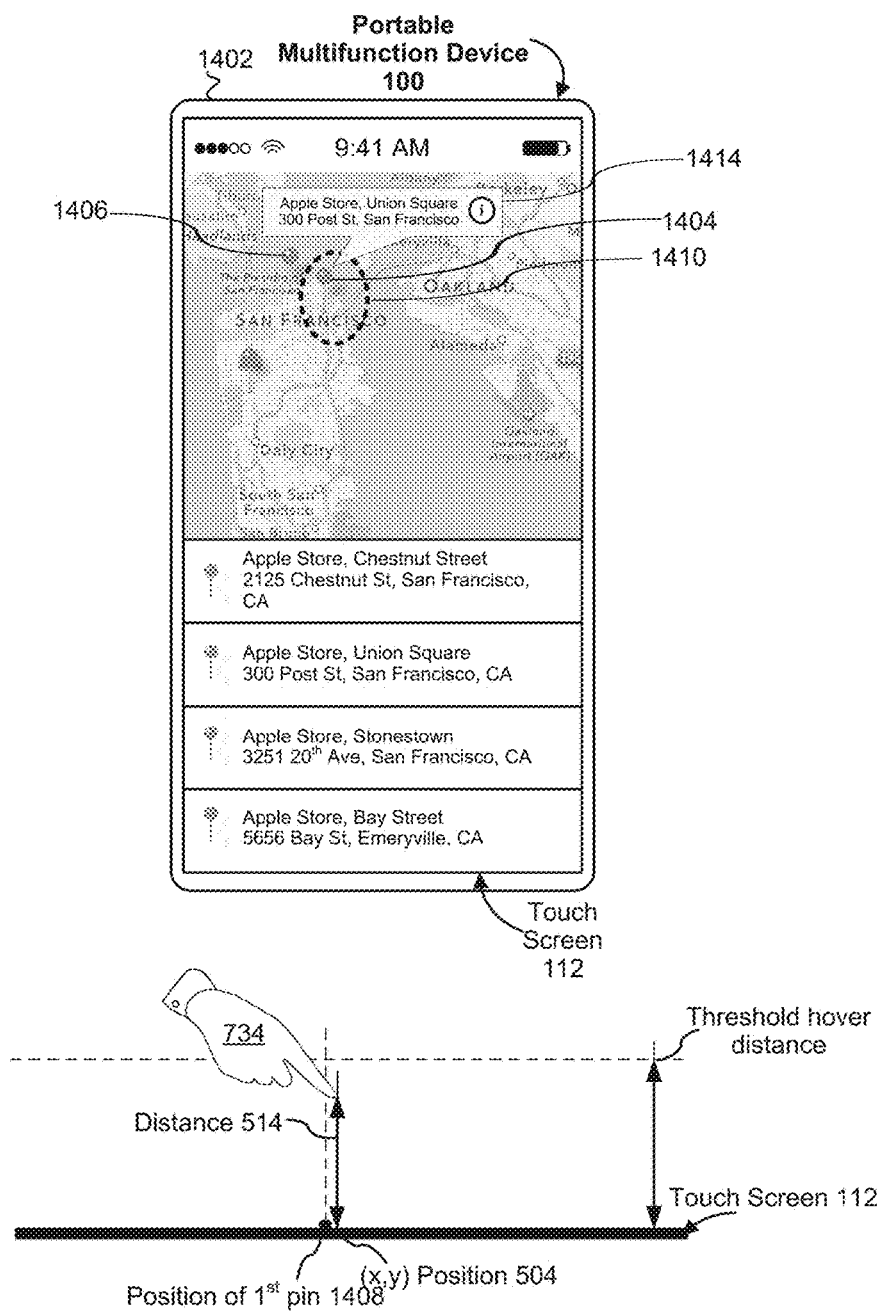

FIG. 14D illustrates that, when finger 734 moves to a hover location that is directly above location pin 1404 (e.g., with (x,y) position 504 of finger 734 within a narrow lateral range around position 1408), input focus is shifted to location pin 1404 and information pop-up 1414 that corresponds to location pin 1404 is displayed.

Figure 14E:
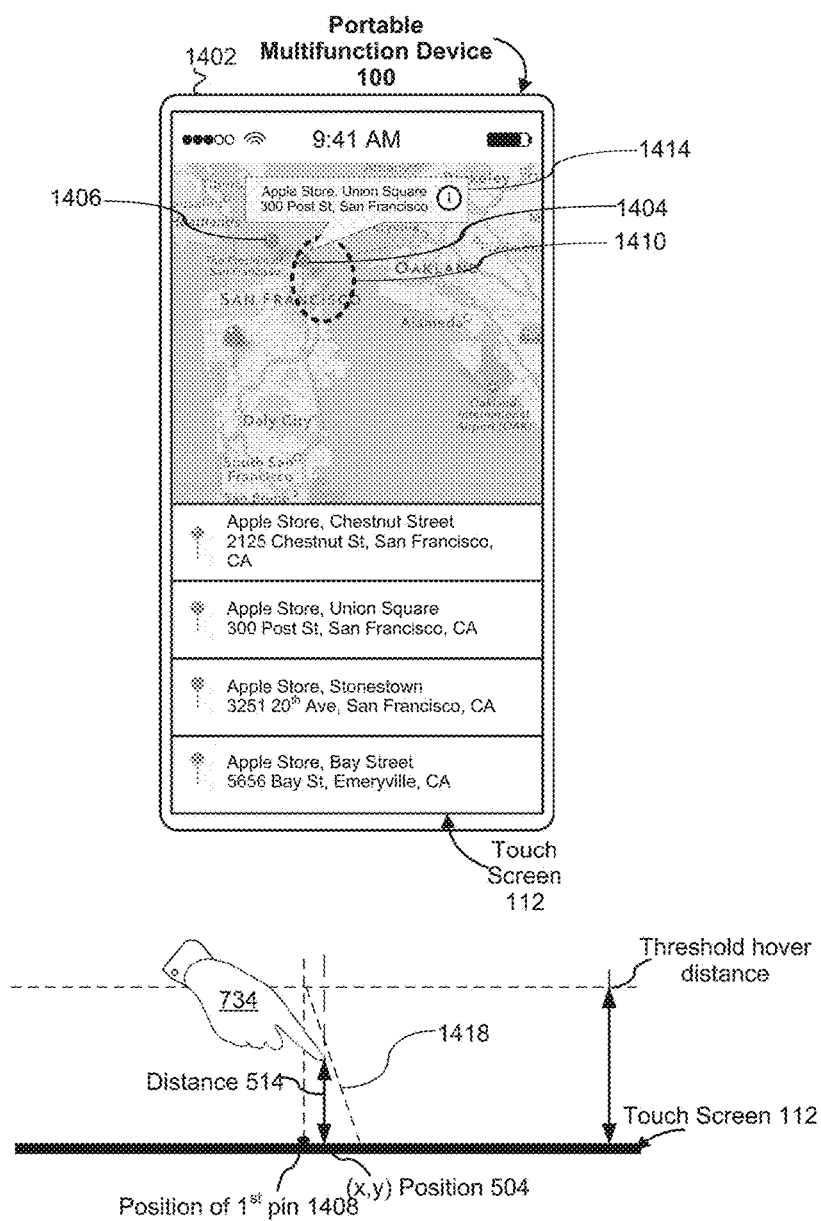
Figure 14F:
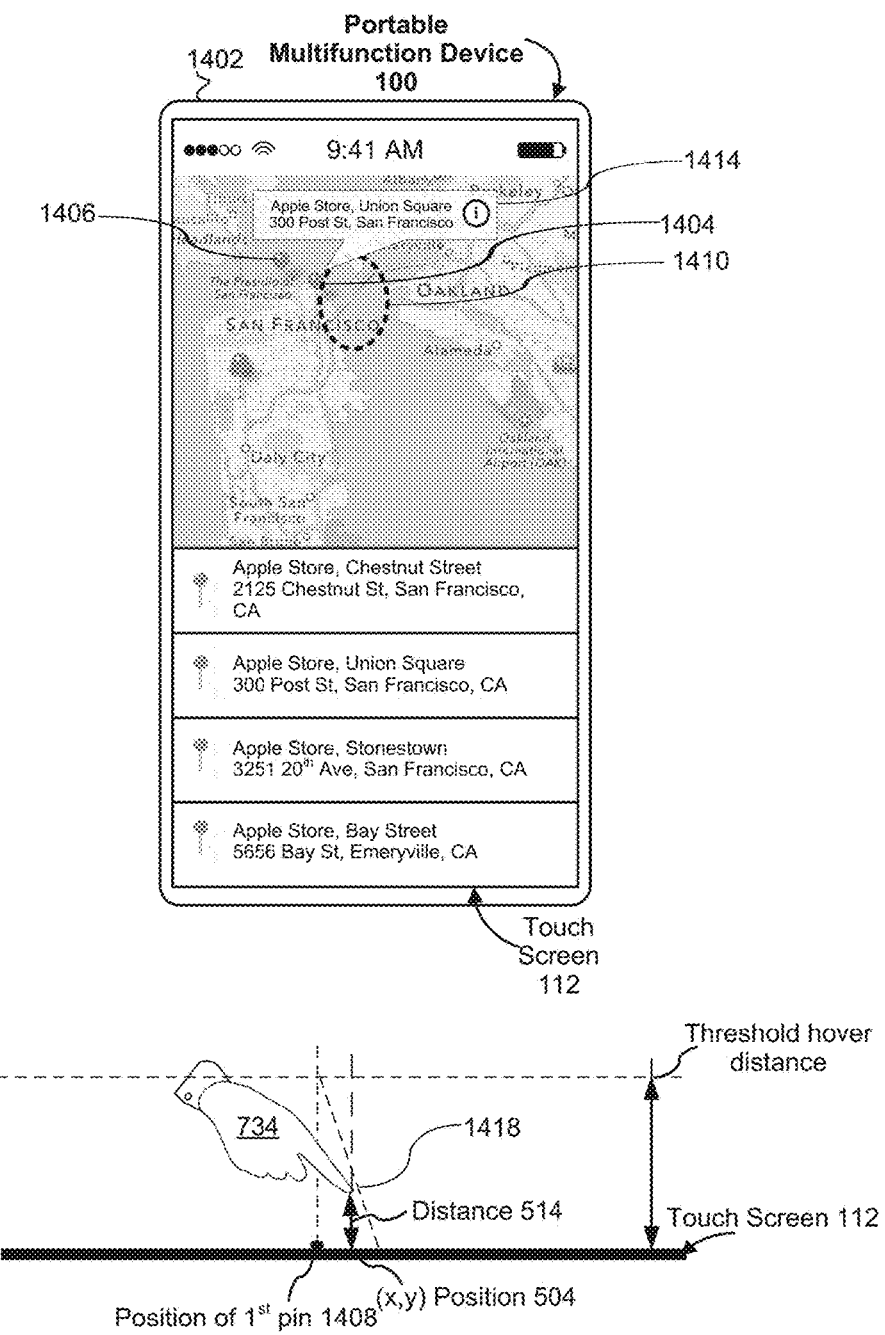

FIGS. 14E-14F illustrate a reactive region of location pin 1404 that is wider closer to the touch-screen and narrower farther away from the touch-screen (e.g., as represented by the boundary line 1418 of the reactive region, where the reactive region is inside a cone defined by boundary line 1418 (only half of the cone is shown in the figures)). FIG. 14E shows that, once input focus is shifted to location pin 1404 (after finger 734 has met the stringent requirement for shifting input focus onto location pin 1404), input focus does not shift away from location pin 1404 when finger 734 is no longer directly above location pin 1404 (e.g., with (x,y) position 504 of finger 734 outside of the narrow lateral range around position 1408). FIGS. 14E-14F show that, as finger 734 moves laterally away from location pin 1404, as long as finger 734 remains within the reactive region defined by boundary line 1418, input focus would remain with location pin 1404 and information pop-up 1414 would remain displayed. It is to be noted that although boundary line 1418 is shown to be straight, it does not need to be straight in some embodiments. In some embodiments, the lateral range of the reactive region is calculated on the fly based on various factors including the hover proximity parameter of finger 734 and optionally the speed and direction of finger 734 at the moment, therefore, the reactive region is not a predefined region with fixed shape, but rather is dynamically determined during the hover movement of finger 734. In addition, in some embodiments, the lateral range of the reactive region may increase with increasing hover distances for a first range of hover distances and may decrease with increasing hover distances for second range of hover distances (e.g., that are above the first range, or that are below the first range).

Figure 14G:
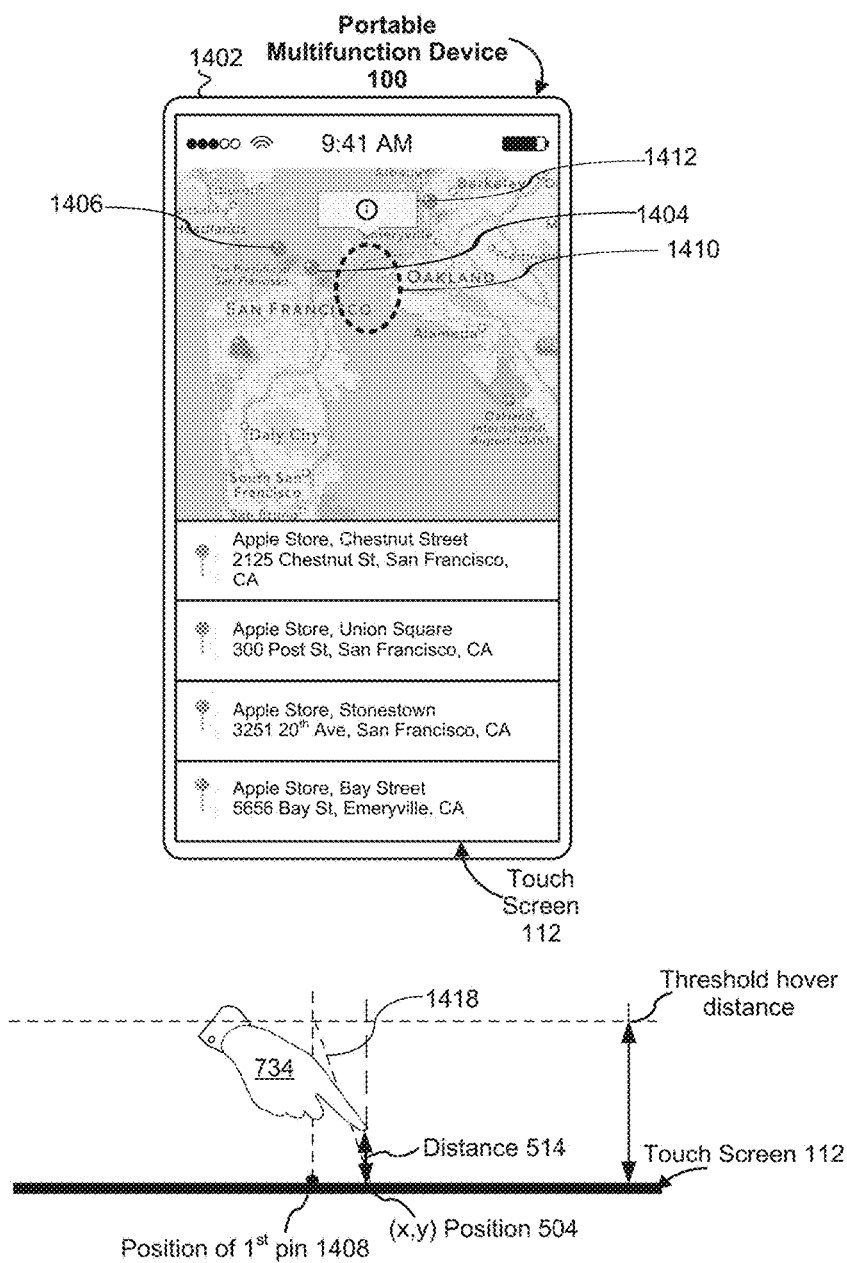

FIG. 14G illustrates that, finger 734 is moved outside of the reactive region defined by boundary 1418, input focus is taken away from location pin 1404 and information pop-up 1414 is replaced with the empty information pop-up 1410.

Figure 14H:
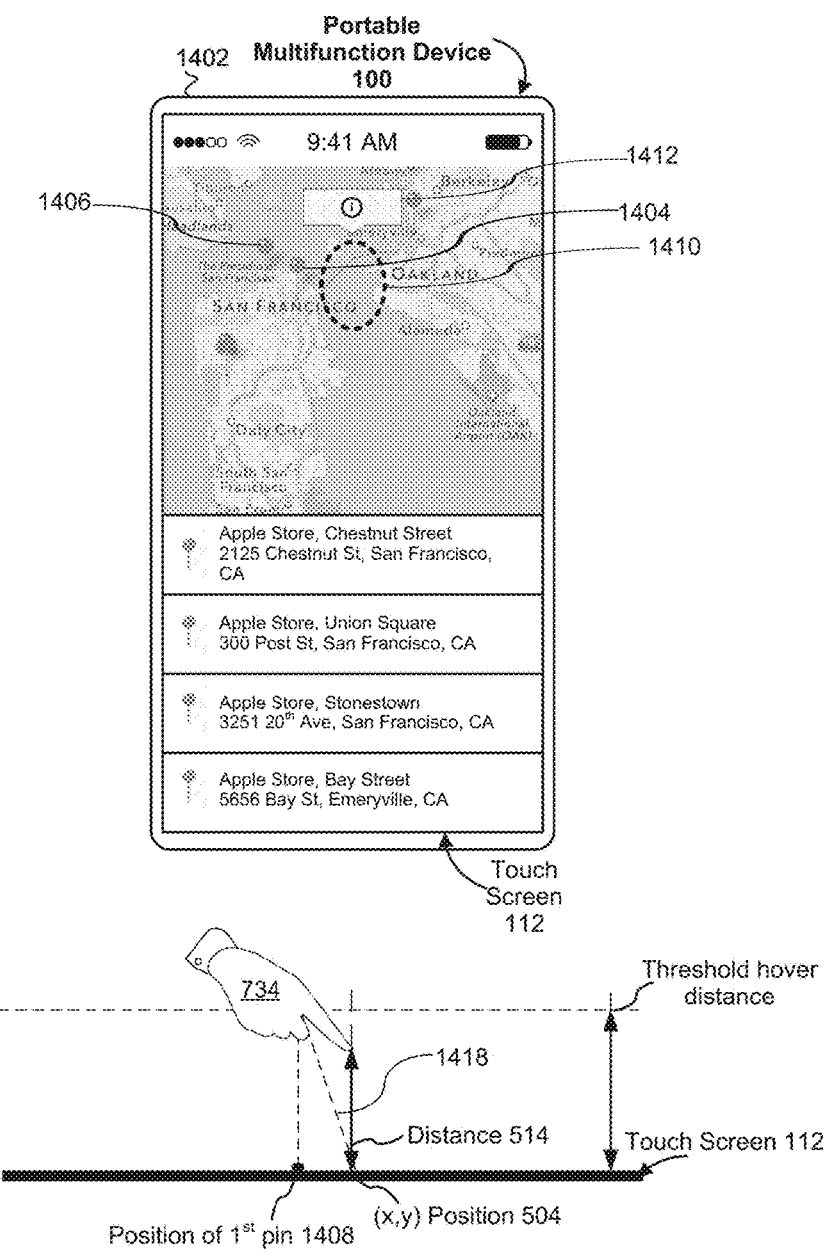
Figure 14I:
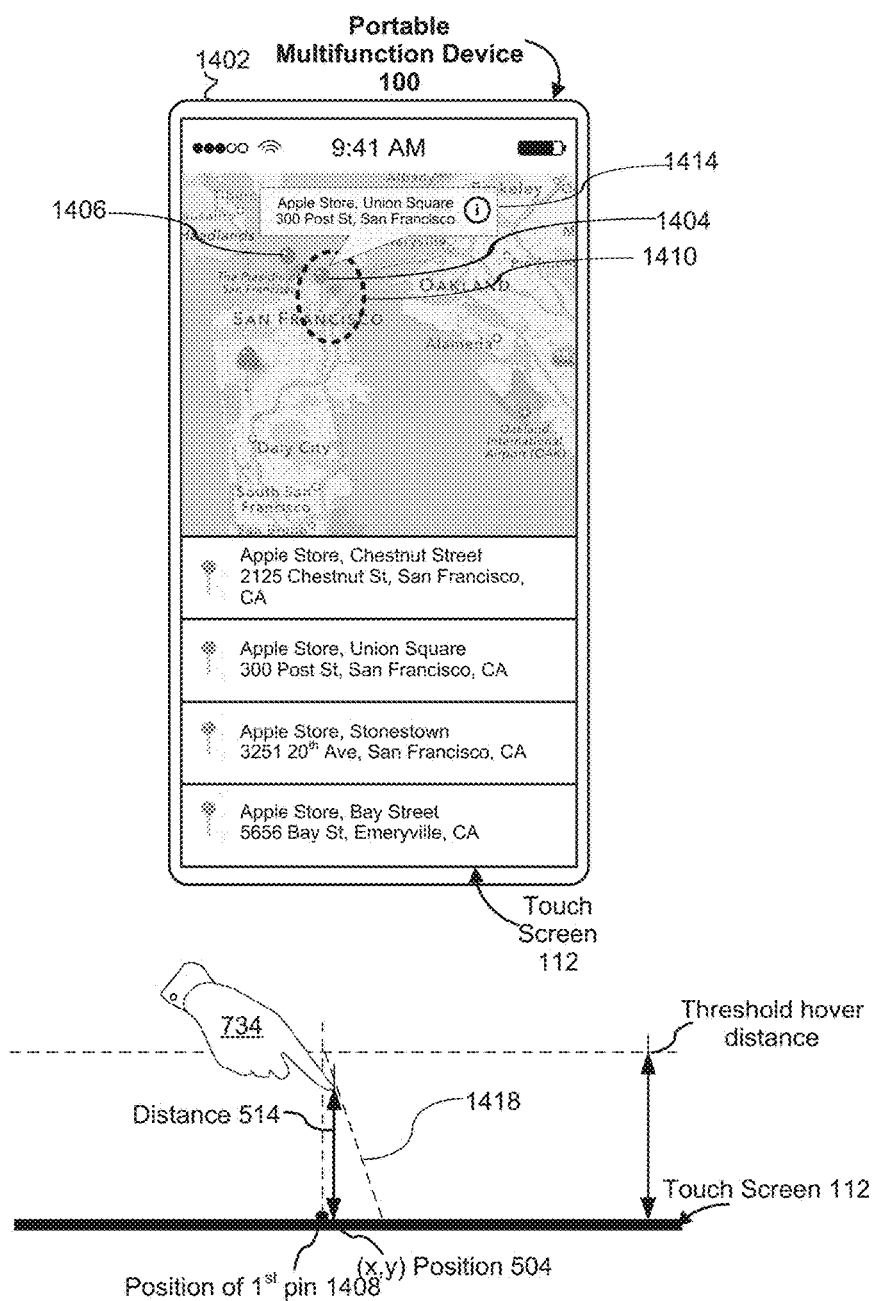

FIGS. 14H-14I illustrate that, when finger 734 is outside of the reactive region of location pin 1404, and then hovered directly over location pin 1404 again, input focus is placed on location pin 1404 and information pop-up 1414 is displayed again.

Figure 14J:
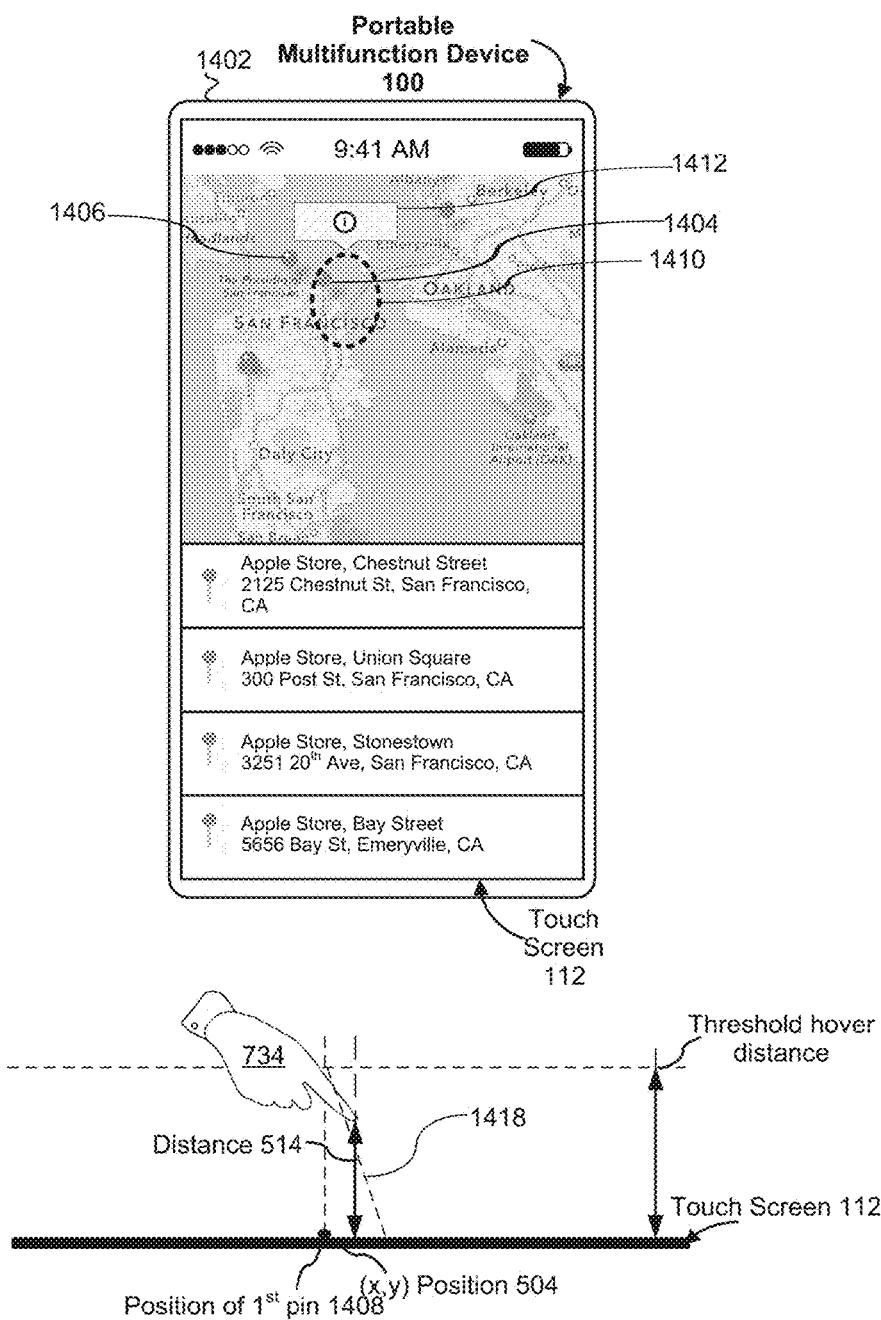

FIG. 14J shows that, when finger 734 is moved laterally at a higher hover distance from the touch-screen (as compared to the cases shown in FIG. 14F), input focus is taken away from location pin 1404 when finger 734 is moved by a smaller lateral distance from the location 1408 than that shown in FIGS. 14F-14G, because the threshold lateral range for shifting input focus away from location pin 1404 is smaller at the higher hover distance above the touch-screen.

Figure 14K:
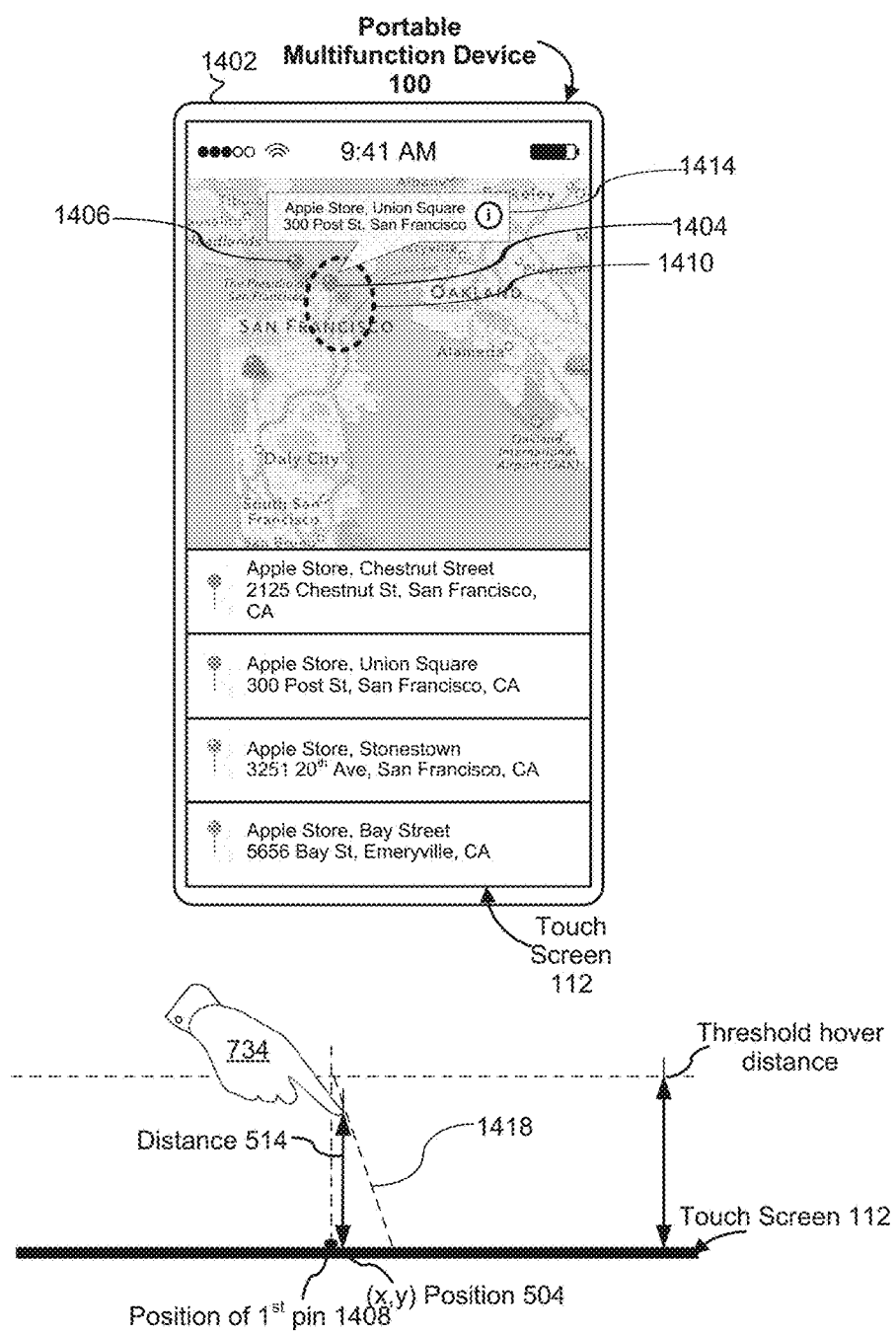
Figure 14L:
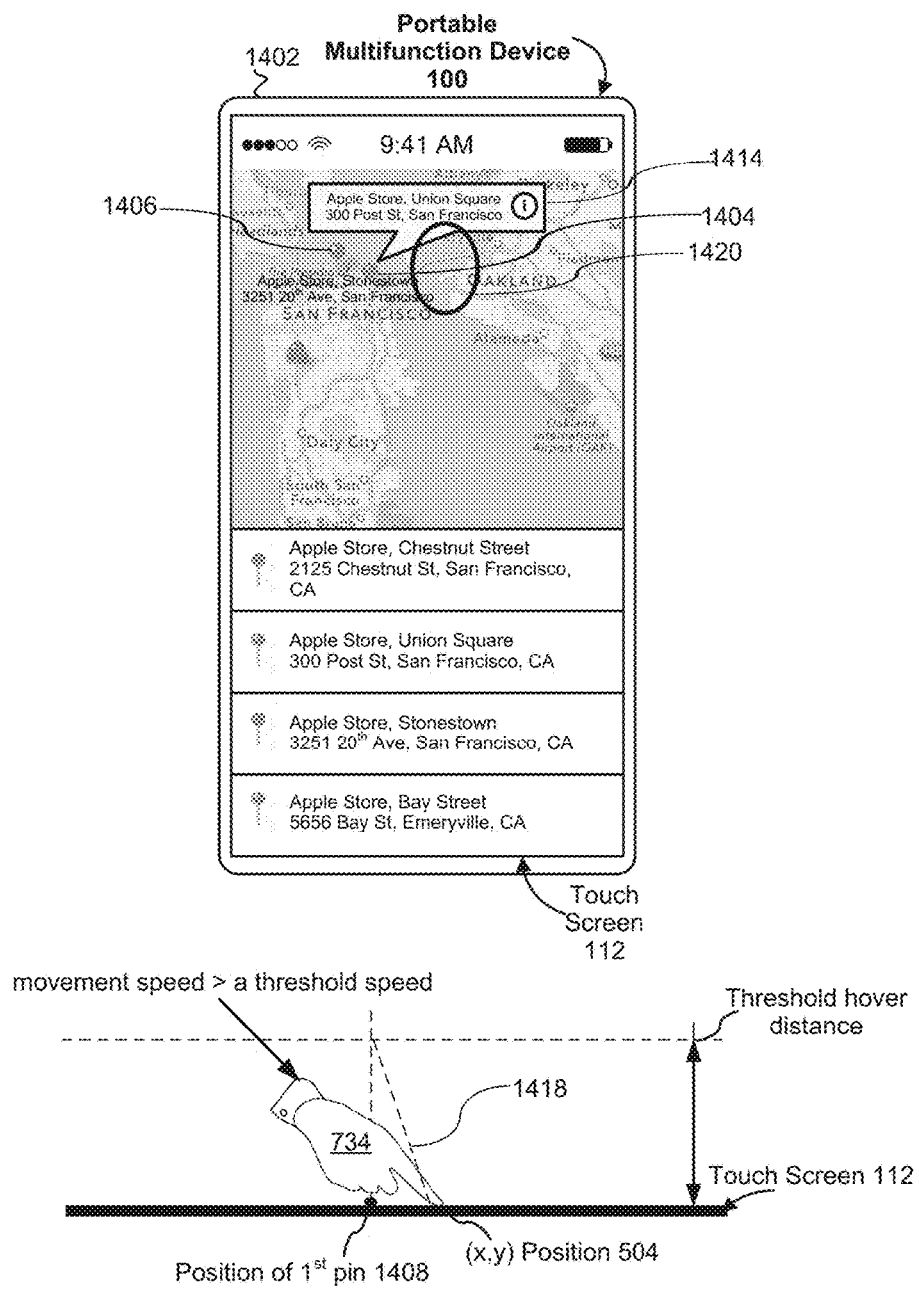
Figure 14M:
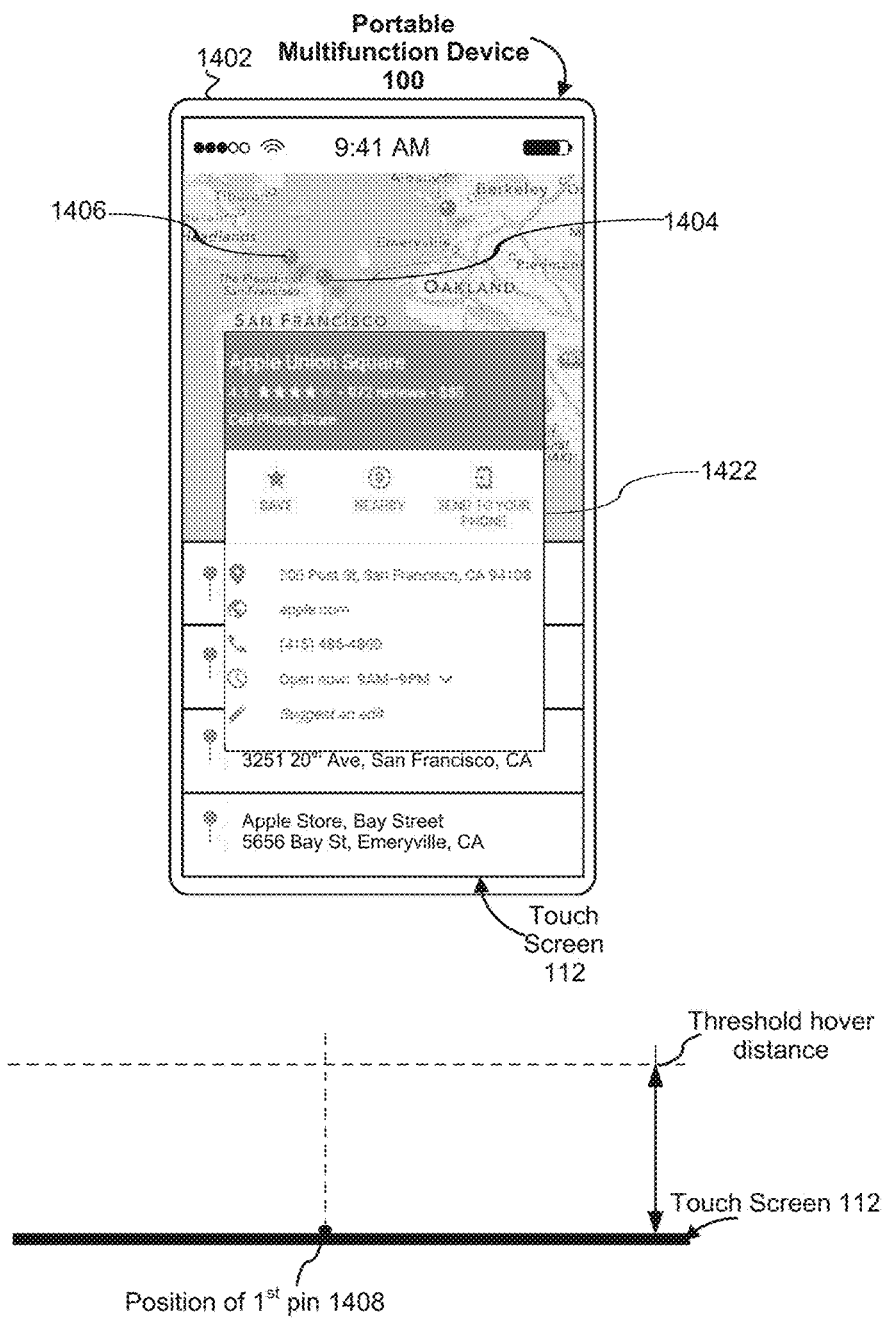

FIG. 14K illustrates that, when finger 734 hovered over location pin 1404 again, input focus is placed on location pin 1404 and information pop-up 1414 is displayed again. If finger 734 moves toward the touch-screen with a speed greater than a threshold speed, input focus is maintained on location pin 1404 for at least a threshold amount of time, even if finger 734 is outside of the reactive region of location pin 1404 during its journey to the touch-screen. For example, as shown in FIG. 14L, the input focus is maintained on location pin 1404 when finger 734 makes contact with the touch-screen within the threshold amount of time, even though finger 734 has made contact (e.g., as indicated by contact 1420) with the touch-screen outside of the reactive region of location pin 734. FIG. 14M shows that, when lift-off of contact 1420 is detected, additional information related to location pin 1404 is displayed, e.g., in information platter 1422.

Figure 15A:
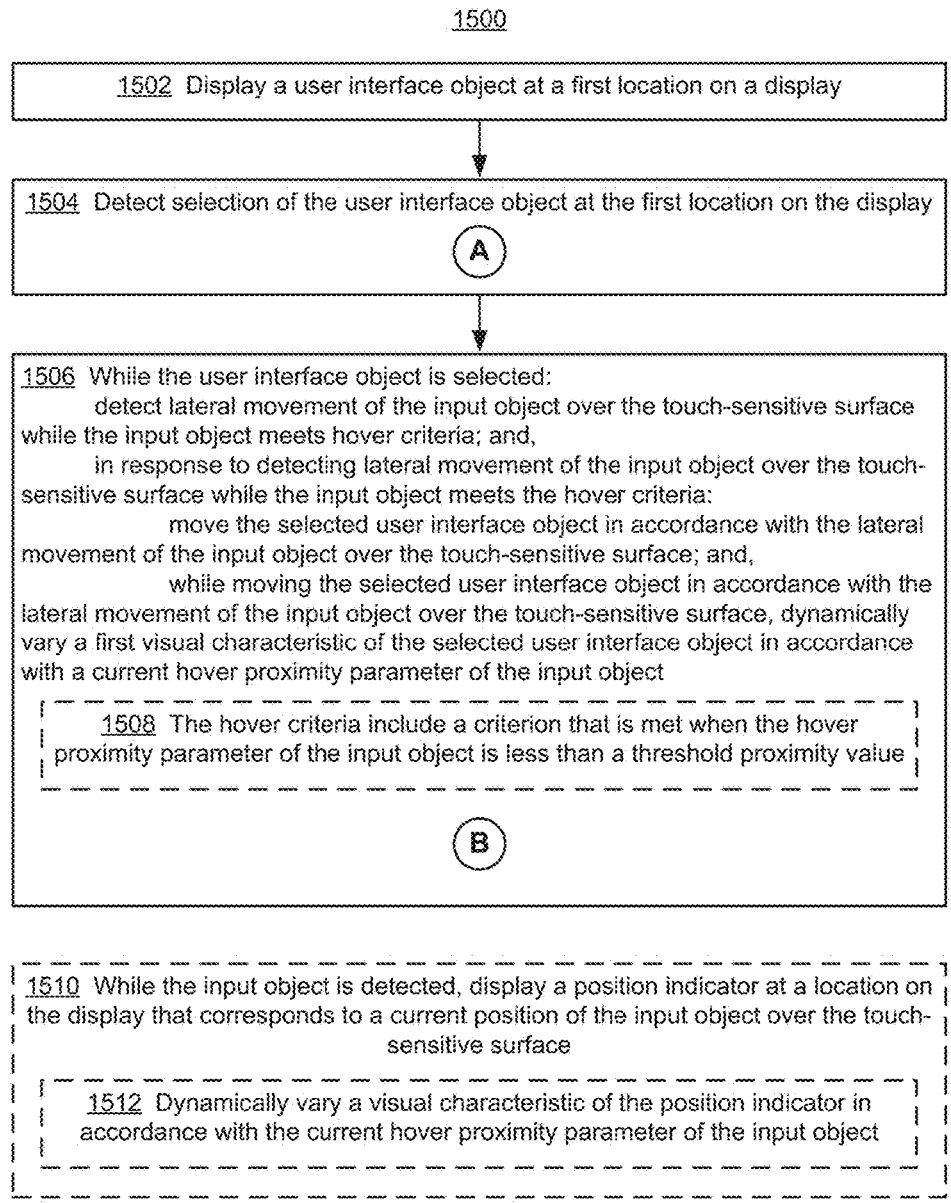
Figure 15B:
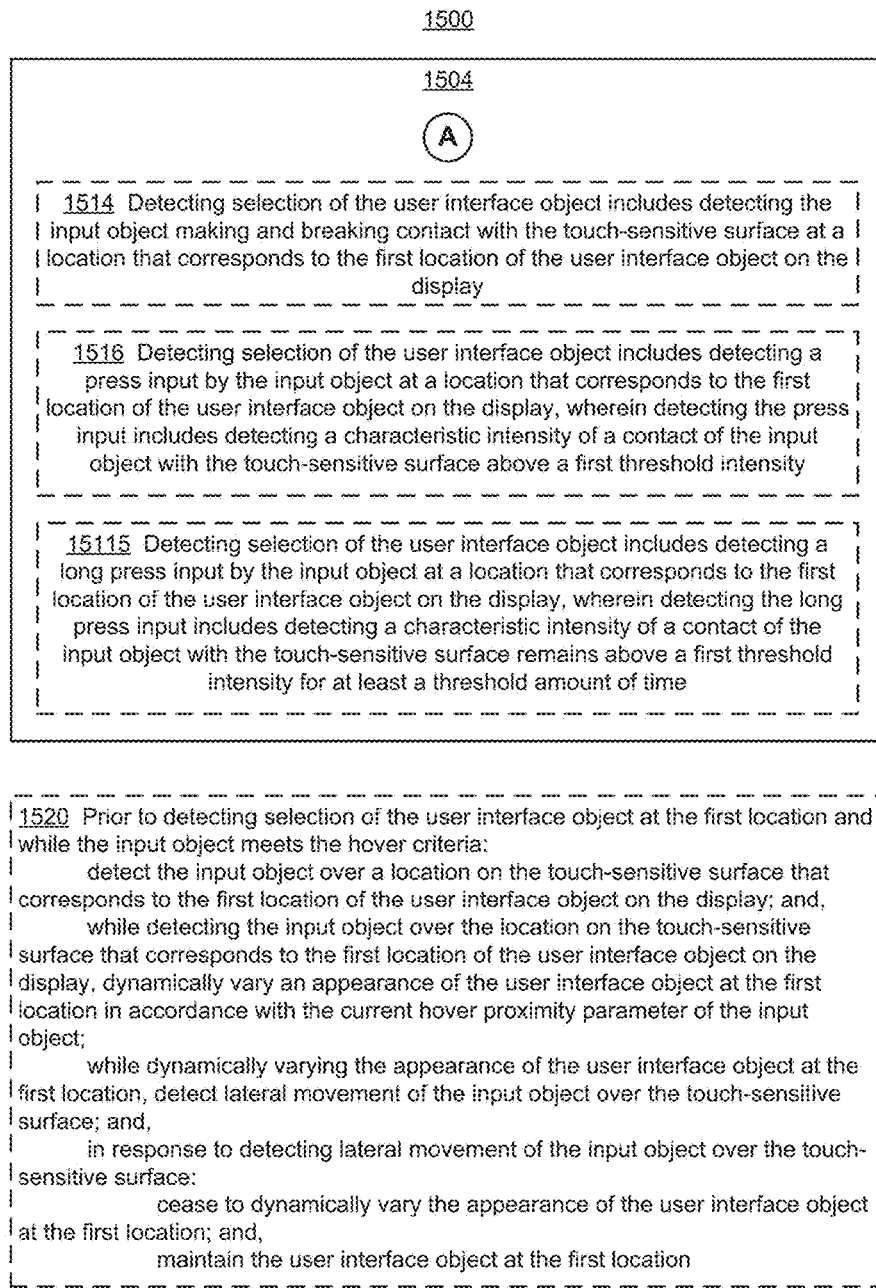
Figure 16A:
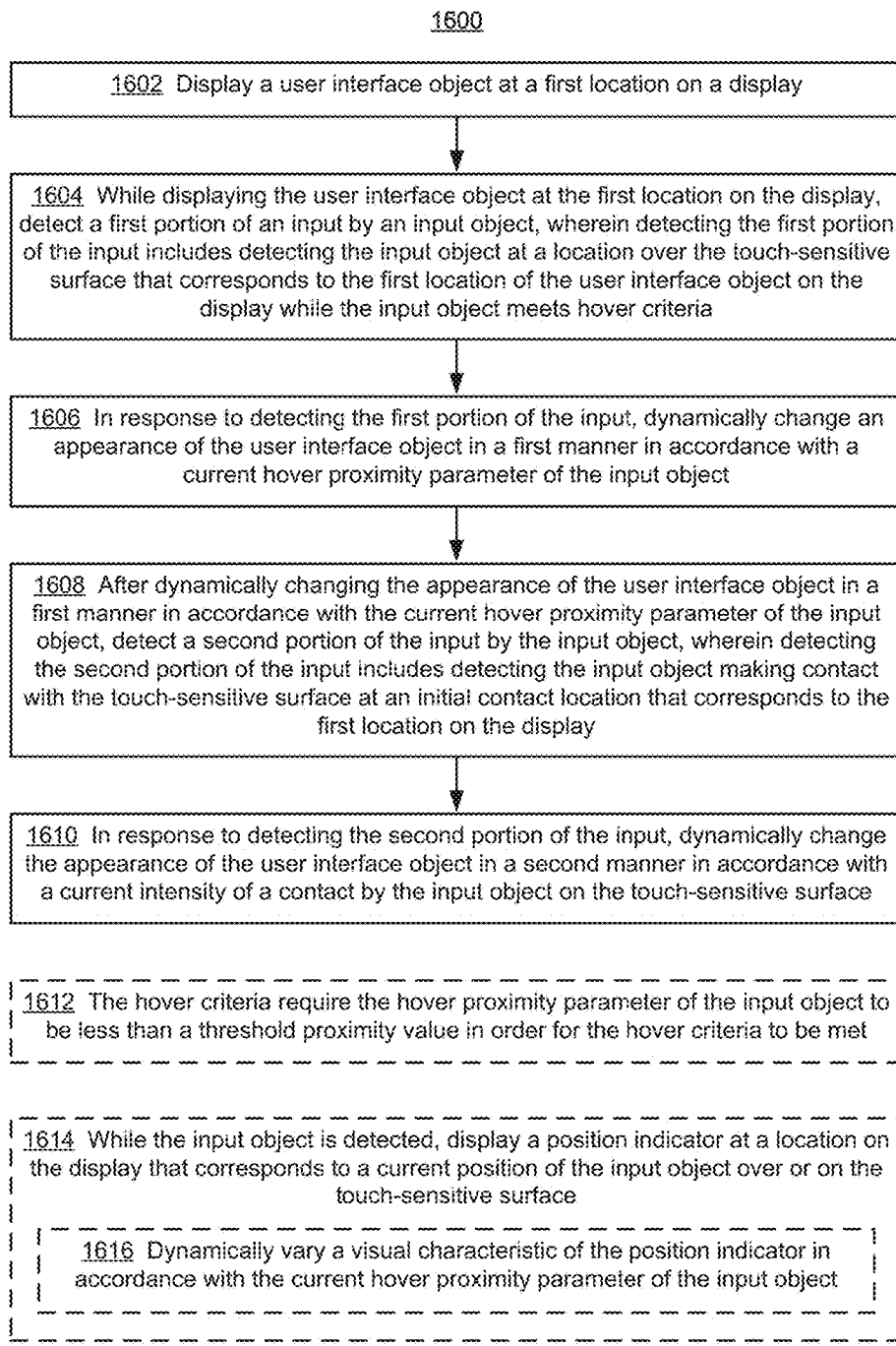

FIGS. 15A-15C are flow diagrams illustrating a method 1500 of interacting with a user interface object through proximity-based and contact-based inputs in accordance with some embodiments. The method 1500 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1500 are, optionally, combined and/or the order of some operations is, optionally, changed.

As described below, the method 1500 provides an intuitive way to interact with a user interface object through proximity-based and contact-based inputs. In particular, by dynamically varying a visual characteristic of a selected user interface object in accordance with the current hover proximity parameter of the input object while of the user interface object is dragged by the input object, the device provides visual feedback to the user regarding the user's input, such that the user can timely adjust the input (e.g., the hover proximity parameter) to avoid input mistakes (e.g., accidentally dropping the object by moving too close or too far away from the touch-sensitive surface) and accomplish an intended operation more efficiently (e.g., by timely dropping the object at a desired location or continuing to move the object toward an intended destination). The method reduces the number, extent, and/or nature of the inputs from a user when interacting with a user interface object, thereby creating a more efficient human-machine interface. For battery-operated electronic devices, enabling a user to reposition an object faster and more efficiently conserves power and increases the time between battery charges.

The device displays (1502) a user interface object (e.g., user interface object 704) at a first location on the display (e.g., as shown in FIG. 7A).

The device detects (1504) selection of the user interface object at the first location on the display (e.g., the user interface object is selected in response to a hover input, a tap input, or a press input directed to the user interface object).

While the user interface object is selected (1506), the device detects lateral movement of the input object (e.g., a finger or a stylus) over the touch-sensitive surface while the input object meets hover criteria (e.g., the hover criteria require that a hover proximity parameter (e.g., a parameter based on hover distance) associated with the input object is less than a threshold proximity value (e.g., a threshold hover distance) in order for the hover criteria to be met); and, in response to detecting lateral movement of the input object over the touch-sensitive surface while the input object meets the hover criteria: the device moves the selected user interface object (e.g., from the first location to a second location on the display) in accordance with the lateral movement of the input object over the touch-sensitive surface; and, while moving the selected user interface object in accordance with the lateral movement of the input object over the touch-sensitive surface, the device dynamically varies a first visual characteristic (e.g., size, color saturation, transparency, perceived depth relative to the surface of the display, etc.) of the selected user interface object in accordance with a current hover proximity parameter of the input object. For example, as shown in FIGS. 7L-7R, after object 704 is lifted up by stylus 203, the size of object 704 is dynamically varied in accordance with hover distance 514 of stylus 203 during lateral movement of stylus 203, while stylus 203 remains within the threshold hover distance above touch-sensitive surface 651.

In some embodiments, the hover criteria include (1508) a criterion that is met when the hover proximity parameter of the input object is less than a threshold proximity value. For example, the detected distance of a fingertip above the touch-sensitive surface is less than a threshold distance. As used in the specification and claims, the term "hover proximity parameter" refers to the (non-zero) distance of the input object above the touch-sensitive surface or to a substitute (proxy) for the distance of the input object above the touch-sensitive surface. In some embodiments, a change in capacitance detected on the touch-sensitive surface due to changing distance of an input object above the touch-sensitive surface is a proxy for the distance of the input object above the touch-sensitive surface. In some embodiments, the hover criteria include a criterion that the input object is not touching the touch-sensitive surface.

In some embodiments, while the input object is detected, the device displays (1510) a position indicator (e.g., a cursor, an image of a fingertip or hand, an image representing a shadow cast by the input object, an icon representing a focus selector, an icon representing a selection tool, etc.) (e.g., indicator 706) at a location on the display that corresponds to a current position (e.g., (x,y) position 504 of stylus 203) of the input object over the touch-sensitive surface. In some embodiments, the location on the display that corresponds to the current position of the input object lies directly below the input object. In some embodiments, the location on the display that corresponds to the current position of the input object does not necessarily lie directly below the input object, and may be offset laterally from the position that is directly below the input object (e.g., position 701 is offset from (x,y) position 504 of stylus 203). For example, the location on the display that corresponds to the current position of the input object may be a projection of the tip of the input object onto the display surface in accordance with the current azimuthal and inclination angles of the input object. In another example, a finger hovering over the touch-screen causes a position indicator (also serving as the focus selector) to be displayed at a position on the touch-screen that is offset upward by a distance such that the finger does not obscure the user's view of the focus selector. By offsetting the position of the position indicator from the (x,y) position of the fingertip, the user is able to better control the movement and position of the position indicator and manipulate objects with better precision and fewer mistakes.

In some embodiments, the device (dynamically) varies (1512) a visual characteristic of the position indicator (e.g., size, color saturation, transparency, and/or 3D visual effect such as a shadow shape and/or length) in accordance with the current hover proximity parameter of the input object (e.g., dynamically changing (e.g., increasing or decreasing) a size or transparency of the position indicator as the detected (non-zero) hover distance of the input object above the touch-sensitive surface changes (e.g., increases or decreases, or vice versa)). For example, the device dynamically varies the size of indicator 706 in accordance with the hover distance 514 during movement of stylus 203, as shown in FIGS. 7L-7R. In some embodiments, when the input object is well within the hover distance from the touch-sensitive surface, the position indicator has a "normal" appearance (e.g., a neutral color or normal opaqueness); and when the input object is getting very close to the touch-sensitive surface and contact with the touch-sensitive surface is imminent, the position indicator takes on a first "warning" appearance (e.g., an orange alert color and/or complete opaqueness); and when the input object is getting very close to the proximity threshold, and termination of hover interaction is imminent, the position indicator takes on a second "warning" appearance (e.g., a red alert color and/or near complete transparency). This is illustrated in FIG. 7Q (e.g., by flickering edge 712 of indicator 706). In some embodiments, by (dynamically) varying a visual characteristic of the position indicator in accordance with the current hover proximity parameter of the input object (e.g., before election of the user interface object, while the user interface object is dragged by the input object, and/or after the object is dropped off), the device provides visual feedback to the user regarding the current state user's input (e.g., function currently performed or function that can be activated by the current input), such that the user can timely adjust the input (e.g., adjusting the hover proximity parameter) to avoid input mistakes (e.g., accidentally picking up or dropping off the object by moving too close or too far away from the touch-sensitive surface) and accomplish an intended operation more efficiently (e.g., by timely picking up the desired object, or dropping the object off at a desired location, or continuing to move the object toward an intended destination).

In some embodiments, detecting selection of the user interface object includes (1514) detecting the input object making and breaking contact with the touch-sensitive surface at a location that corresponds to the first location of the user interface object on the display (e.g., detecting a tap gesture, or a long press gesture by the input object at a location that corresponds to the user interface object). In some embodiments, upon lift-off of the input object, the user interface object is selected; and upon selection of the user interface object, the position indicator of the input object changes appearance as well (e.g., a hand indicator changes from an open palm to a closed fist). This is illustrated in FIGS. 7J-7M, for example.

In some embodiments, detecting selection of the user interface object includes (1516) detecting a press input by the input object at a location that corresponds to the first location of the user interface object on the display, wherein detecting the press input includes detecting a characteristic intensity of a contact of the input object with the touch-sensitive surface above a first threshold intensity (e.g., a light press or deep press intensity threshold). In some embodiments, the user interface object is selected when liftoff is detected after the first threshold intensity is met by the input object, or immediately upon the input object meeting the first threshold intensity; and upon selection of the user interface object, the position indicator of the input object changes appearance as well (e.g., a hand indicator changes from an open palm to a closed fist). In some embodiments, when a press input is required for selecting the object, an input by a contact that does not meet the first intensity threshold optionally triggers an operation associated with the object. For example, when the object is a weather item, a tap input triggers display of a user interface that includes more information about the weather item, and a press input that meets the first threshold intensity selects the weather item. In another example, where the object is a calendar entry, a tap input triggers display of a user interface that includes more information about the calendar, and a press input that meets the first threshold intensity selects the calendar item. By requiring the characteristic intensity of the contact to increase above the first threshold intensity in order to select the user interface object, the device reduces user mistakes (e.g., accidental selection of the object while hovering above the touch-sensitive surface may be avoided), and improves operability of the device (e.g., precise control of the input object above the touch-sensitive surface is not mandated).

In some embodiments, detecting selection of the user interface object includes (1518) detecting a long press input by the input object at a location that corresponds to the first location of the user interface object on the display, wherein detecting the long press input includes detecting a characteristic intensity of a contact of the input object with the touch-sensitive surface remains above a first threshold intensity for at least a threshold amount of time. This is illustrated in FIGS. 7K-7L. In some embodiments, when a long press input is required for selecting the object, an input by a contact that does not meet the first intensity threshold or the time threshold optionally triggers an operation associated with the object or triggers display of additional information related to the object. For example, when the object is an application launch icon, a tap input triggers launches an application associated with the application launch icon, a press input causes display of a quick action menu with selectable options to activate respective operations associated with the application, and a long press input causes selection of the application launch icon. By requiring the characteristic intensity of the contact to increase above the first threshold intensity and be maintained for at least a threshold amount of time in order to select the user interface object, the device reduces user mistakes (e.g., accidental selection of the object while hovering above the touch-sensitive surface may be avoided), and improves operability of the device (e.g., precise control of the input object above the touch-sensitive surface is not mandated).

In some embodiments, prior to detecting selection of the user interface object at the first location (e.g., before a tap gesture, a long press input, or a press input with the input object selects the user interface object as the target of a "hovering drag" gesture) and while the input object meets the hover criteria (1520): the device detects the input object over a location on the touch-sensitive surface that corresponds to the first location of the user interface object on the display; and, while detecting the input object over the location on the touch-sensitive surface that corresponds to the first location of the user interface object on the display, the device (dynamically) varies an appearance of the user interface object at the first location in accordance with the current hover proximity parameter of the input object (e.g., dynamically changing a size and/or color of the unselected user interface object as the detected (non-zero) hover distance of the input object above the touch-sensitive surface changes) (as illustrated in FIGS. 7C-7E); while (dynamically) varying the appearance of the user interface object at the first location, the device detects lateral movement of the input object over the touch-sensitive surface (e.g., lateral movement that goes beyond the immediate vicinity (e.g., a threshold lateral range) above the unselected user interface object); and, in response to detecting lateral movement of the input object over the touch-sensitive surface: the device ceases to (dynamically) vary the appearance of the user interface object at the first location; and, the device maintains the user interface object at the first location (e.g., as shown in FIG. 7I, where lateral and vertical movements of stylus 203 cease to influence object 704). In some embodiments, the image of the unselected user interface object is skewed (e.g., dynamically stretched while remaining anchored at its original location) with small lateral movements of the input object when the input object varies its lateral position while hovering above the unselected user interface object (e.g., as shown in FIGS. 7F-7I). In some embodiments, by providing visual feedback to the user regarding interactions with the object (e.g., lateral movement by input object near the object) prior to selection of the object (e.g., prior to the input object meeting selection criteria), the device helps the user to timely adjust the input (e.g., the hover proximity parameter) to avoid input mistakes (e.g., accidentally selecting the object by moving too close to the touch-sensitive surface, or accidentally selecting the wrong object when moving too close to the wrong object among several closely positioned objects) and accomplish an intended operation more efficiently (e.g., by adjusting the direction of movement toward a desired target and adjusting the hover proximity parameter at a desired location).

In some embodiments, in response to detecting selection of the user interface object at the first location on the display, the device provides (1522) visual feedback to indicate that the user interface object is selected (e.g., displaying an animation showing that the user interface object is "picked up" by the hovering input object, showing shimmers of the user interface object to indicate the activated state of the user interface object, or casting a shadow under the selected user interface object to indicate that the user interface object is now hovering above its original plane) (e.g., the position indicator of the input object changes its appearance to indicate that the object is selected (e.g., the position indicator changes its appearance from an open palm to a closed fist)). This is illustrated in FIG. 7L.

In some embodiments, dynamically varying the first visual characteristic of the user interface object in accordance with the current hover proximity parameter of the input object includes (1524) dynamically changing a size of the user interface object in accordance with the current hover proximity parameter of the input object (e.g., dynamically changing the size of the selected user interface object as the detected (non-zero) hover distance of the input object above the touch-sensitive surface changes). In some embodiments, the user interface object increases in size as the distance between the input object and the display (or touch-sensitive surface) increases (e.g., the user interface object is being lifted with the finger or stylus). This is illustrated in FIGS. 7L-7R, for example. In some embodiments, the user interface object decreases in size as the distance between the input object and the display increases (e.g., the user interface object is gradually falling away from the finger). In some embodiments, by (dynamically) varying the size of the user interface object in accordance with the current hover proximity parameter of the input object, while the user interface object is dragged by the input object, the device provides visual feedback to the user regarding the current state user's input, such that the user can timely adjust the input (e.g., adjusting the hover proximity parameter) to avoid input mistakes (e.g., accidentally dropping off the object by moving too close to the touch-sensitive surface) and accomplish an intended operation more efficiently (e.g., by timely dropping the object off at a desired location, or continuing to move the object toward an intended destination).

It should be understood that the particular order in which the operations in FIGS. 15A-15C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1600, 1700, 1800, 1900, 2000, 2100, 2200, 2300 and 2400) are also applicable in an analogous manner to method 1500 described above with respect to FIGS. 15A-15C. For example, the contacts, gestures, input objects, user interface objects, tactile outputs, audio outputs, intensity thresholds, position indicators, focus selectors, and animations described above with reference to method 1500 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1600, 1700, 1800, 1900, 2000, 2100, 2200, 2300 and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B. For example, detection operations and feedback operations 1504, 1506, and 1520 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 16A-16E are flow diagrams illustrating a method 1600 of interacting with a user interface object through proximity-based and contact-based inputs in accordance with some embodiments. The method 1600 is performed at an electronic device (e.g., device 300, FIG. 3, or portable multifunction device 100, FIG. 1A) with a display and a touch-sensitive surface. In some embodiments, the device includes one or more first sensors to detect proximity of an input object above the touch-sensitive surface (e.g., proximity sensors (such as infrared sensors), capacitive sensors in the touch sensitive surface, or cameras next to the touch-sensitive surface) and one or more second sensors to detect intensity of contact of the input object with the touch-sensitive surface In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1600 are, optionally, combined and/or the order of some operations is, optionally, changed.

As described below, the method 1600 provides an intuitive way to interact with a user interface object through proximity-based inputs and contact-based inputs. In some embodiments, by providing distinguishable visual feedback regarding whether the object is responding to a hover portion or a press portion of an input, the device provides a more responsive user interface and allows the user to timely adjust his/her input to accomplish an intended task (e.g., to continue pushing toward the touch-sensitive surface to make contact with the object) and/or to avert input mistakes (e.g., to stop pressing harder to avoid meeting an intensity threshold to trigger an unintended action). The more responsive user interface also helps to avoid causing user confusion during an input because each portion of the input has a direct and immediate impact on the visual appearance of the user interface. The method reduces the number, extent, and/or nature of the inputs from a user when interacting with a user interface object, thereby creating a more efficient human-machine interface. For battery-operated electronic devices, enabling a user to interact with a user interface object faster and more efficiently (e.g., by reducing user mistakes with improved visual feedback) conserves power and increases the time between battery charges.

The device displays (1602) a user interface object (e.g., user interface object 704) at a first location on the display, e.g., as shown in FIG. 7U.

While displaying the user interface object at the first location on the display, the device detects (1604) a first portion of an input by an input object (e.g., a fingertip or a stylus), wherein detecting the first portion of the input includes detecting the input object at a location over the touch-sensitive surface that corresponds to the first location of the user interface object on the display while the input object meets hover criteria. For example, while the user interface object is displayed, the device detects that a finger approaches the user interface object from above touch-sensitive surface without making contact with the touch-sensitive surface, while a hover proximity parameter of the input object is less than a threshold distance above the touch-sensitive surface (e.g., while the input object remains within a threshold distance above the touch-sensitive surface without making contact with the touch-sensitive surface). This is shown in FIG. 7V, for example.

In response to detecting the first portion of the input, the device dynamically changes (1606) an appearance of the user interface object in a first manner in accordance with a current hover proximity parameter of the input object (e.g., the appearance of the user interface object is dynamically varied as the hover distance of the input object changes). For example, in some embodiments, while hover criteria are met and before the input object makes contact with the touch-sensitive surface, the size of the user interface object increases when the input object approaches the touch-sensitive surface, and decreases when the input object retreats from the touch-sensitive surface. This is shown in FIGS. 7V-7X, for example. In another example, in some embodiments, while hover criteria are met and before the input object makes contact with the touch-sensitive surface, the color of the user interface object gets darker when the input object approaches the touch-sensitive surface, and gets lighter when the input object retreats from the touch-sensitive surface.

After dynamically changing the appearance of the user interface object in a first manner in accordance with the current hover proximity parameter of the input object, the device detects (1608) a second portion of the input by the input object, wherein detecting the second portion of the input includes detecting the input object making contact with the touch-sensitive surface at an initial contact location that corresponds to the first location on the display. This is shown in FIG. 7Y, for example.

In response to detecting the second portion of the input, the device dynamically changes (1610) the appearance of the user interface object in a second manner in accordance with a current intensity of a contact by the input object on the touch-sensitive surface (e.g., while the input object is in contact with the touch-sensitive surface, the appearance of the user interface object is dynamically varied in accordance with the changing force or pressure of the input object on the touch-sensitive surface). In some embodiments, the second manner of changing the appearance involves changing the same property of the user interface object (e.g., size or color) as the first manner, but basing the change on a different input parameter or metric from that used in the first manner (e.g., value of the property (e.g., size) increases with increasing hover proximity parameter in the first portion of the input, and value of the property (e.g., size) increases with increasing contact intensity in the second portion of the input). In some embodiments, the second manner and second manner of changing the appearance involves changing two different properties of the user interface object (e.g., varying the size with hover proximity parameter in the first portion of the input, and varying the color with contact intensity in the second portion of the input). In FIGS. 7Z-7AE, the device dynamically varies the size of object 704 with changing intensity of the contact of stylus 203 with touch-sensitive surface 651.

In some embodiments, the hover criteria require (1612) the hover proximity parameter of the input object to be less than a threshold proximity value in order for the hover criteria to be met. For example, the detected distance of a fingertip above the touch-sensitive surface is less than a threshold distance. As used in the specification and claims, the term "hover proximity parameter" refers to the (non-zero) distance of the input object above the touch-sensitive surface or to a substitute (proxy) for the distance of the input object above the touch-sensitive surface. In some embodiments, a change in capacitance detected on the touch-sensitive surface due to changing distance of an input object above the touch-sensitive surface is a proxy for the distance of the input object above the touch-sensitive surface. In some embodiments, the hover criteria include a criterion that the input object is not touching the touch-sensitive surface.

In some embodiments, while the input object is detected, the device displays (1614) a position indicator (e.g., a cursor, an image of a fingertip or hand, an image representing a shadow cast by the input object, an icon representing a focus selector, an icon representing a selection tool, etc.) (e.g., indicator 706 in FIG. 7V) at a location on the display that corresponds to a current position of the input object over or on the touch-sensitive surface. In some embodiments, the location on the display that corresponds to the current position of the input object lies directly below the input object. In some embodiments, the location on the display that corresponds to the current position of the input object does not necessarily lie directly below the input object, and may be offset laterally from the position that is directly below the input object. For example, the location on the display that corresponds to the current position of the input object may be a projection of the tip of the input object onto the display surface in accordance with the current azimuthal and inclination angles of the input object.

In some embodiments, the device (dynamically) varies (1616) a visual characteristic (e.g., size, color saturation, transparency, and/or 3D visual effect such as a shadow shape and/or length) of the position indicator in accordance with the current hover proximity parameter of the input object (e.g., dynamically changing (e.g., increase or decrease) a size or transparency of the position indicator as the detected (non-zero) hover distance of the input object above the touch-sensitive surface changes (e.g., increases or decreases, or vice versa)). This is illustrated in FIGS. 7V-7X, for example. In some embodiments, when the input object is well within the hover distance from the touch-sensitive surface, the position indicator has a "normal" appearance, e.g., a neutral color or normal opaqueness; and when the input object is getting very close to the touch-sensitive surface and contact with the touch-sensitive surface is imminent, the position indicator takes on a first "warning" appearance, e.g., an orange alert color and/or complete opaqueness; and when the input object is getting very close to the proximity threshold, and termination of hover interaction is imminent, the position indicator takes on a second "warning" appearance, e.g., a red alert color and/or near complete transparency (e.g., as shown in FIG. 7AI).

In some embodiments, the first manner for dynamically varying the appearance of the user interface object is (1618) different from the second manner for dynamically varying the appearance. For example, before the input object makes initial contact with the touch-sensitive surface, the user interface object is in a first state (e.g., a hover state), and it visually responds to the changing hover distance in a first manner (e.g., changing size with varying hover distance); and after the input object makes the initial contact with the touch-sensitive surface, the user interface object is in a second state (e.g., a contact state), and it visually responds to the changing intensity of the contact in a second manner (e.g., changing color with varying contact intensity). In some embodiments, by providing distinguishable visual feedback regarding whether the object is responding to a hover portion or a press portion of an input, the device provides a more responsive user interface and allows the user to timely adjust his/her input to accomplish an intended task (e.g., to continue pushing toward the touch-sensitive surface to make contact with the object) and/or to avert input mistakes (e.g., to stop pressing harder to avoid meeting an intensity threshold to trigger an unintended action). The more responsive user interface also helps to avoid causing user confusion during an input because each portion of the input has a direct and immediate impact on the visual appearance of the user interface.

In some embodiments, the device visually distinguishes (1620): a hover state of the user interface object during which the appearance of the user interface object is dynamically changed in accordance with the current hover distance, and a contact state of the user interface object during which the appearance of the first user interface object is dynamically changed in accordance with the current contact intensity. For example, in some embodiments, a different color or hue is applied to the user interface object to indicate whether the user interface object is in the hover state or the contact state (e.g., as shown in FIGS. 7V-7AI, color of object 704 changes before and after contact is made). In a more specific example, when a fingertip is hovering over a button, the button has a blue color to indicate that it is in the hover state, and a size that increases with decreasing hover distance; when the fingertip makes contact with the touch-sensitive surface, the button turns red and is now in the contact state, and the size of the button increases with increasing contact intensity. In some embodiments, by providing distinguishable visual feedback regarding whether the object is in the hover state or the contact state, the device provides a more responsive user interface and allows the user to timely adjust his/her input to accomplish an intended task (e.g., to continue pushing toward the touch-sensitive surface to make contact with the object) and/or to avert input mistakes (e.g., to stop pressing harder to avoid meeting an intensity threshold to trigger an unintended action). The more responsive user interface also helps to avoid causing user confusion during an input because each portion of the input has a direct and immediate impact on the visual appearance of the user interface.

In some embodiments, the device aurally distinguishes (1622): a hover state of the user interface object during which the appearance of the user interface object is dynamically changed in accordance with the current hover distance, and a contact state of the user interface object during which the appearance of the first user interface object is dynamically changed in accordance with the current contact intensity. For example, in some embodiments, different types of sounds are played to indicate whether the user interface object is in the hover state or the contact state. In a more specific example, when a fingertip is hovering over a button, a continuous whirring sound is played to indicate that the button is in the hover state, and the size of the user interface object increases with decreasing hover distance (e.g., as the user is pushing down toward the touch-sensitive surface); when the fingertip makes contact with the touch-sensitive surface, a continuous buzzing sound is played to indicate that the button is now in the contact state, and the size of the button increases with increasing contact intensity (e.g., as the user continues to push down against the touch-sensitive surface). In some embodiments, the frequency or pitch of the sound that is played is correlated with (e.g., negatively correlated with) the current hover distance during the hover state, and is correlated with (e.g., positively correlated with) the current contact intensity during the contact state. Although in the embodiments described above, the appearance of the user interface object is dynamically varied in accordance with changing hover distances and/or contact intensities, in some embodiments, only dynamically changed sounds (e.g., sound frequency and/or composition) are used to indicate the current hover distance and/or the current contact intensity, and the button's appearance does not change with the changing hover distance and/or contact intensity. In some embodiments, when audio feedback is provided concurrently with the visual feedback, the audio feedback enhances the visual changes that is occurring in the user interface, and allows the user to know whether the object is responding to a hover portion or a press portion of an input without focusing on the user interface visually. In some embodiments, audio feedback is provided without accompanying visual feedback, the device ensures that the user can determine the state of the user interface element based on the audio feedback, without visually distracting the user. The audio feedback allows the user to timely adjust his/her input to accomplish an intended task (e.g., to continue pushing toward the touch-sensitive surface to make contact with the object) and/or to avert input mistakes (e.g., to stop pressing harder to avoid meeting an intensity threshold to trigger an unintended action).

In some embodiments, the device provides (1624) a first visual and/or audio and/or haptic signal in response to detecting the input object making contact with the touch-sensitive surface at the initial contact location (e.g., to indicate the transition from the hover state to the contact state). In some embodiments, by providing an audio and/or visual and/or haptic signal to indicate the transition from the hover state into the contact state, the device reduces user confusion when providing input because the user would not be surprised by a sudden change in user interface behavior when the user inadvertently makes contact with the touch-sensitive interface during a hover input.

In some embodiments, the device provides (1626) a second visual and/or audio and/or haptic signal (e.g., audio signal 722 in FIG. 7AE) in response to detecting the input object breaking contact with the touch-sensitive surface at a final contact location (e.g., to indicate the transition from the contact state to the hover state). In some embodiments, the second visual and/or audio signal is different from the first visual and/or audio signal. In some embodiments, the second visual and/or audio signal is the same as the first visual and/or audio signal. In some embodiments, by providing an audio and/or visual and/or haptic signal to indicate the transition from the contact state to the hover state, the device reduces user confusion when providing input because the user would not be surprised by a sudden change in user interface behavior when the user inadvertently breaks contact with the touch-sensitive interface during a press input.

In some embodiments, while dynamically changing the appearance of the user interface object in accordance with the current contact intensity between the input object and the touch-sensitive surface, the device detects (1628) the input object breaking contact with the touch-sensitive surface at a final contact location that corresponds a current onscreen location of the user interface object; and in response to detecting the input object breaking contact with the touch-sensitive surface, the device dynamically changes the appearance of the user interface object in a third manner in accordance with the current hover proximity parameter of the input object (e.g., the appearance of the user interface object is dynamically varied as the hover distance of the input object changes), wherein: the first manner by which the appearance of the user interface object is dynamically changed in accordance with the current hover proximity parameter before the input object has made the initial contact with the touch-sensitive surface differs from the third manner by which the appearance of the user interface object is dynamically changed in accordance with the current hover proximity parameter after the input object has broken the initial contact with the touch-sensitive surface. This is illustrated in FIG. 7AE-7AI, in contrast to FIGS. 7V-7X. For example, in some embodiments, before the finger made the initial contact with the button on the touch-screen, the button shrinks with decreasing hover distance of the fingertip with a first variable rate as the fingertip approaches the touch-screen (e.g., as if the button is being repelled by the approaching fingertip, but is eventually caught up by the approaching fingertip); and immediately after the fingertip is lifted off of the touch screen, the button grows with increasing hover distance of the fingertip at a second variable rate as the fingertip moves away from the touch-screen (e.g., giving the illusion that the button is stuck on the fingertip and is being pulled toward the user with the fingertip, but eventually breaks away from the pull of the fingertip). In another example, in some embodiments, before the finger made the initial contact with the button on the touch screen, the button maintains its size and gets progressively darker with decreasing hover distance, and after the fingertip makes contact with the touch-sensitive surface, the button continues to get darker with increasing contact intensity (and either maintains its size or shrinks in size with increasing contact intensity); then, when the fingertip starts to ease off the pressure, the button gets progressively larger with decreasing contact intensity (and either maintains its current brightness or gets progressively lighter with decreasing contact intensity); and after the fingertip breaks contact with the touch-sensitive surface, the button continues to get larger with increasing hover distance, while the brightness of the button remains constant. In other words, before the contact, brightness (and not size) of the user interface object changes with hover distance; and after the contact, size (and not brightness) of the user interface object changes with hover distance. In some embodiments, by providing distinguishable visual feedback regarding whether the object is in the hover state or the contact state and whether the object is in the hover state before or after initial contact with the touch-sensitive surface, the device provides a more responsive user interface that helps to reduce user confusion when providing an input because the user would not be surprised by a sudden change in user interface behavior when the user inadvertently makes contact or breaks contact with the touch-sensitive interface during the input.

In some embodiments, across a transition where the input object makes contact with the touch-sensitive surface or where the input object breaks contact with the touch-sensitive surface, the device maintains (1630) a direction (e.g., the direction of increasing characteristic value or the direction of decreasing value) in which a first visual characteristic of the user interface object is dynamically changed in accordance with the current hover proximity parameter or the current contact intensity. This is illustrated in FIGS. 7V-7AB. For example, in some embodiments, if the first visual characteristic has a positive correlation with the hover proximity parameter (e.g., increasing size with increasing hover distance, decreasing size with decreasing hover distance) before the input object makes contact with the touch-sensitive surface, the first visual characteristic will have a negative correlation with the contact intensity (e.g., decreasing size with increasing contact intensity, and increasing size with decreasing contact intensity) after the input object makes contact with the touch-sensitive surface. In a more specific example, the device may decrease the size of the user interface object with decreasing hover distance until the input object reaches the touch-sensitive surface, and the device will continue to decrease the size of the user interface object with increasing contact intensity while the input object remains in contact with the touch-sensitive surface. In some embodiments, if the first visual characteristic has a negative correlation with the contact intensity before the input object breaks contact with the touch-sensitive surface, the first visual characteristic has a positive correlation with the hover distance after the input object breaks contact with the touch-sensitive surface. In a more specific example, the device may increase the size of the user interface object with decreasing contact intensity until the user input object breaks contact with the touch-sensitive surface, and the device will continue to increase the size of the user interface object with increasing hover distance while the input object remains within the threshold hover distance above the touch-sensitive surface. By maintaining the direction of change for a first visual characteristic of the object when the user input transitions from a hover input to a press input, the device provides a smooth transition that is less distracting and feels more natural to the user when the user pushes down first toward and then against the touch-sensitive surface. This smooth and natural feedback helps to reduce user confusion when providing input because the user would not be surprised by a sudden change in user interface behavior when the user pushes down first toward and then against the touch-sensitive surface.

In some embodiments, the device detects (1632) a third portion of the input, wherein detecting the third portion of the input includes detecting that the current hover proximity parameter ceases to meet the hover criteria while the input object is at a final hover location that corresponds to the current onscreen location of the user interface object; and in response to detecting the third portion of the input, restoring the appearance of the user interface object to an initial state that was shown before the detection of the first portion of the input. In some embodiments, restoring the appearance of the user interface object after termination of the hover input conforms to the user's expectation, helps to avoid user confusion, and reduces users' input mistakes that are made during confusion.

In some embodiments, the device provides (1634) a third visual and/or audio and/or haptic signal in response to detecting the third portion of the input (e.g., to indicate the final exit of the input object from the hover state). This is illustrated in FIG. 7AJ. In some embodiments, the third visual and/or audio and/or haptic signal is different from the first and second visual and/or audio and/or haptic signals. In some embodiments, the third visual and/or audio and/or haptic signal is the same as the first or second visual and/or audio and/or haptic signals. In some embodiments, by providing an audio and/or visual and/or haptic signal to indicate the exit from the hover state, the device reduces user confusion when providing input because the user would not be surprised by a sudden change in user interface behavior when the user inadvertently moves outside of the hover distance during a hover input after an initial contact with the touch-sensitive surface.

In some embodiments, before restoration of the appearance of the user interface object to the initial state is completed, the device displays (1636) an animation showing an overshoot of the restoration and a reversal of the overshoot (e.g., showing a bouncy visual effect for the restoration of the user interface object after exiting the hover state). In some embodiments, the magnitude of the overshoot is based on a rate of change of a parameter of the input (e.g., a rate of change of the hover distance of the input, or a rate of change of the intensity of the input) such that the magnitude of the overshoot increases as the rate of change of the parameter increases, and the magnitude of the overshoot decreases as the rate of change of the parameter decreases. By providing the overshoot animation, the device primes the user of the final state of the user interface object before the object settles into the final state, and thus reduces user confusion and reduces users' input mistakes that are made during confusion.

In some embodiments, dynamically changing the appearance of the user interface object includes (1638) dynamically changing one or more of visual characteristics selected from a group consisting of: a size, a color, a hue, a color saturation, a brightness, a boldness, an animation speed, a vibration frequency, a level of image clarity or detail, an opacity, an image resolution, and a level of deformity.

In some embodiments, while dynamically changing the appearance of the user interface object in the first manner in accordance with the current hover proximity parameter of the input object, the device applies (1640) a first dynamically varied sound effect to accompany the dynamically changed appearance of the user interface object (e.g., in accordance with the current hover proximity parameter of the input object or the changing appearance).

In some embodiments, while dynamically changing the appearance of the user interface object in the second manner in accordance with the current contact intensity of the contact by the input object, the device applies (1642) a second dynamically varied sound effect to accompany the dynamically changed appearance of the user interface object (e.g., in accordance with the current hover proximity parameter of the input object or the changing appearance).

In some embodiments, while dynamically changing the appearance of the user interface object in the first manner and in the second manner (e.g., both in accordance with the current hover proximity parameter of the input object, and in accordance with the current contact intensity of the contact by the input object), the device applies (1644) a third dynamically varied sound effect to accompany the dynamically changed appearance of the user interface object, wherein across a transition where the input object makes contact with the touch-sensitive surface or where the input object breaks contact with the touch-sensitive surface, the device maintains a direction (e.g., the direction of increasing characteristic value or the direction of decreasing value) in which an audio characteristic (e.g., pitch, number of harmonics) of the third sound effect is dynamically changed (e.g., in accordance with the current hover proximity parameter or the current contact intensity, or in accordance with the varying appearance of the user interface object).

In some embodiments, while dynamically changing the appearance of the user interface object in the first manner or in the second manner (1646): the device detects a current angle (e.g., inclination, tilt, and/or orientation, e.g., as characterized by the inclination and azimuthal angles) of the input object relative to the touch-sensitive surface; and the device applies a fourth dynamically varied sound effect to accompany the dynamically changed appearance of the user interface object, wherein the fourth dynamically varied sound effect varies in accordance with the current angle of the input object. For example, in some embodiments, a first whirring sound (e.g., shu-shu-shu) is played when the input object rotates about a vertical axis (e.g., changing azimuthal angle) while maintaining a first fixed inclination angle, and a second whirring sound (e.g., sh-sh-sh) is played when the input object rotates about the vertical axis (e.g., changing azimuthal angle) while maintaining a second fixed inclination angle. In some embodiments, a frequency of each of the whirring sounds increases with increasing rotation speed.

In some embodiments, applying the fourth dynamically varied sound effect to accompany the dynamically changed appearance of the user interface object includes (1648): choosing different sound qualities for the fourth dynamically varied sound effect while dynamically changing the appearance of the user interface object in the first manner and the second manner. For example, when the user interface object is in the hover state, the sound quality of the fourth dynamically varied sound effect indicates friction through air (e.g., input object rotating in air); and while the user interface object is in the contact state, the sound quality of the fourth dynamically varied sound effect indicate friction on a solid material (e.g., input object scrubbing the user interface object). In some embodiments, in response to detecting the input object breaking contact with the touch-sensitive surface at a respective final contact location corresponding to the current onscreen location of the user interface object, an ending sound effect to end a currently applied dynamically varied sound effect is provided. In some embodiments, in response to detecting the input object moving beyond the threshold hover distance above the touch-sensitive surface at the respective final hover location corresponding to the current onscreen location of the user interface object, an ending sound effect to end a currently applied dynamically varied sound effect is provided.

In some embodiments, while the input object meets the hover criteria (e.g., after the user input object has been selected and picked up by the input object), the device detects (1650) first lateral movement of the input object over the touch-sensitive surface; and in response to detecting the first lateral movement of the input object over the touch-sensitive surface while the input object meets the hover criteria, the device moves the user interface object across the display in accordance with the first lateral movement of the input object over the touch-sensitive surface. In some embodiments, the movement of the user interface object appears to lag behind the lateral movement of the input object.

In some embodiments, while the input object remains in contact with the touch-sensitive surface (e.g., when the input object meets the long press criteria, and the user interface object is selected by the input object), the device detects (1652) second lateral movement of the input object across the touch-sensitive surface; and in response to detecting the second lateral movement of the input object across the touch-sensitive surface while the input object remains in contact with the touch-sensitive surface, the device moves the user interface object across the display in accordance with the second lateral movement of the input object across the touch-sensitive surface. In some embodiments, the user interface object does not lag behind the input object, when moving with the input object.

In some embodiments, before selection of the user interface object (e.g., before selection of the user interface object in response to an initial selection input (e.g., a tap or long press on the user interface object)), while the input object meets the hover criteria, the device detects (1654) third lateral movement of the input object across the touch-sensitive surface; and in response to detecting the third lateral movement of the input object across the touch-sensitive surface while the input object meets hover criteria, the device distorts the user interface object in accordance with the third lateral movement of the input object across the touch-sensitive surface, without moving the user interface object.

It should be understood that the particular order in which the operations in FIGS. 16A-16E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1700, 1800, 1900, 2000, 2100, 2200, 2300 and 2400) are also applicable in an analogous manner to method 1600 described above with respect to FIGS. 16A-16E. For example, the contacts, gestures, input objects, user interface objects, tactile outputs, audio outputs, intensity thresholds, position indicators, focus selectors, and animations described above with reference to method 1600 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1700, 1800, 1900, 2000, 2100, 2200, 2300 and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 16A-16E are, optionally, implemented by components depicted in FIGS. 1A-1B. For example, detection operations 1604 and 1608 and changing operations 1606 and 1610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 17A:
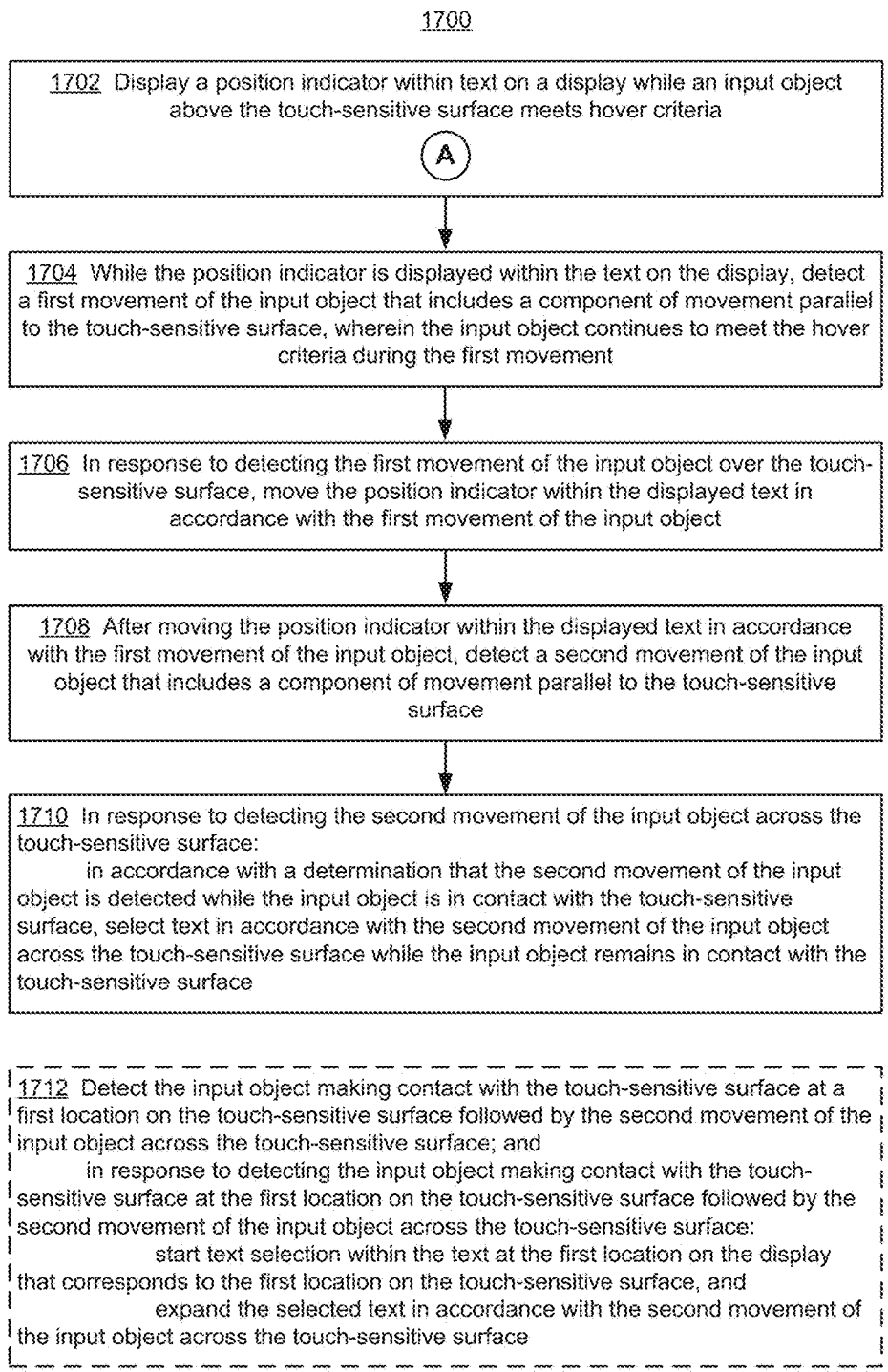
Figure 18A:
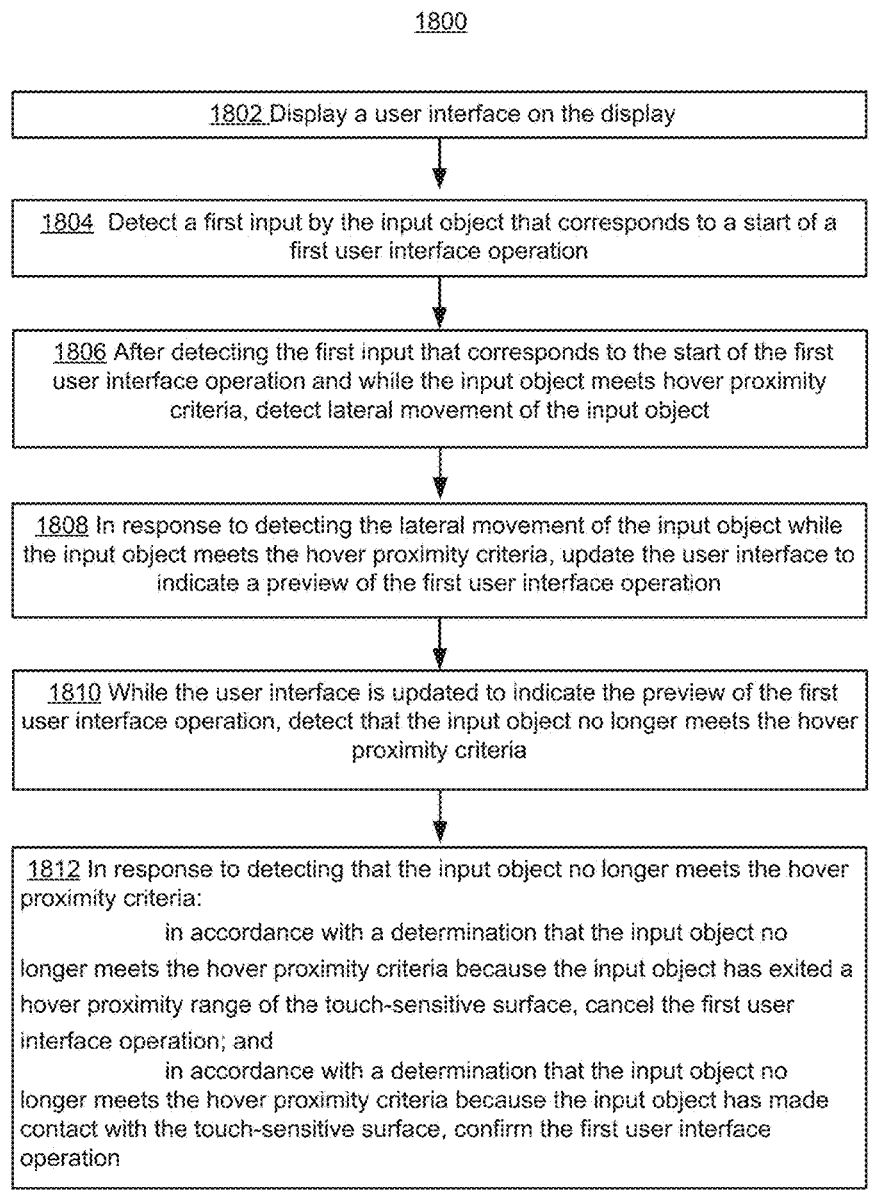
Figure 18C:
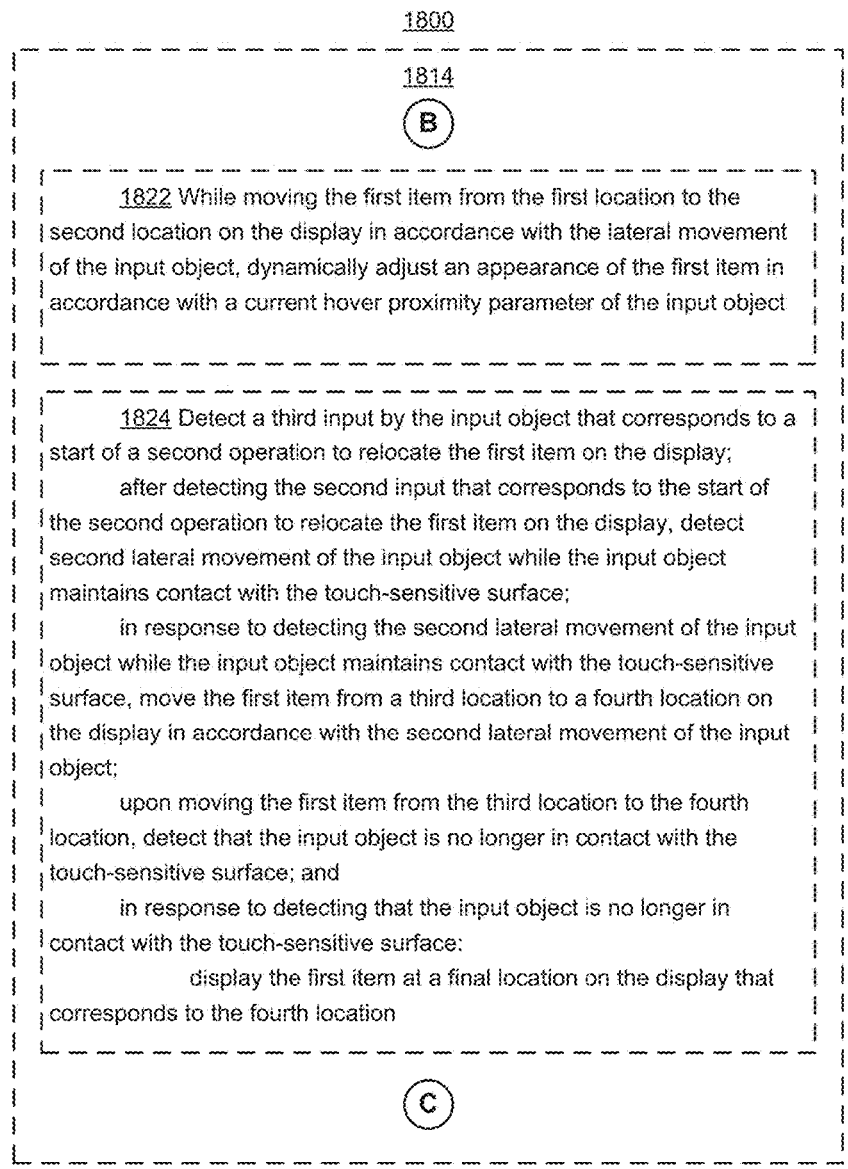
Figure 18D:
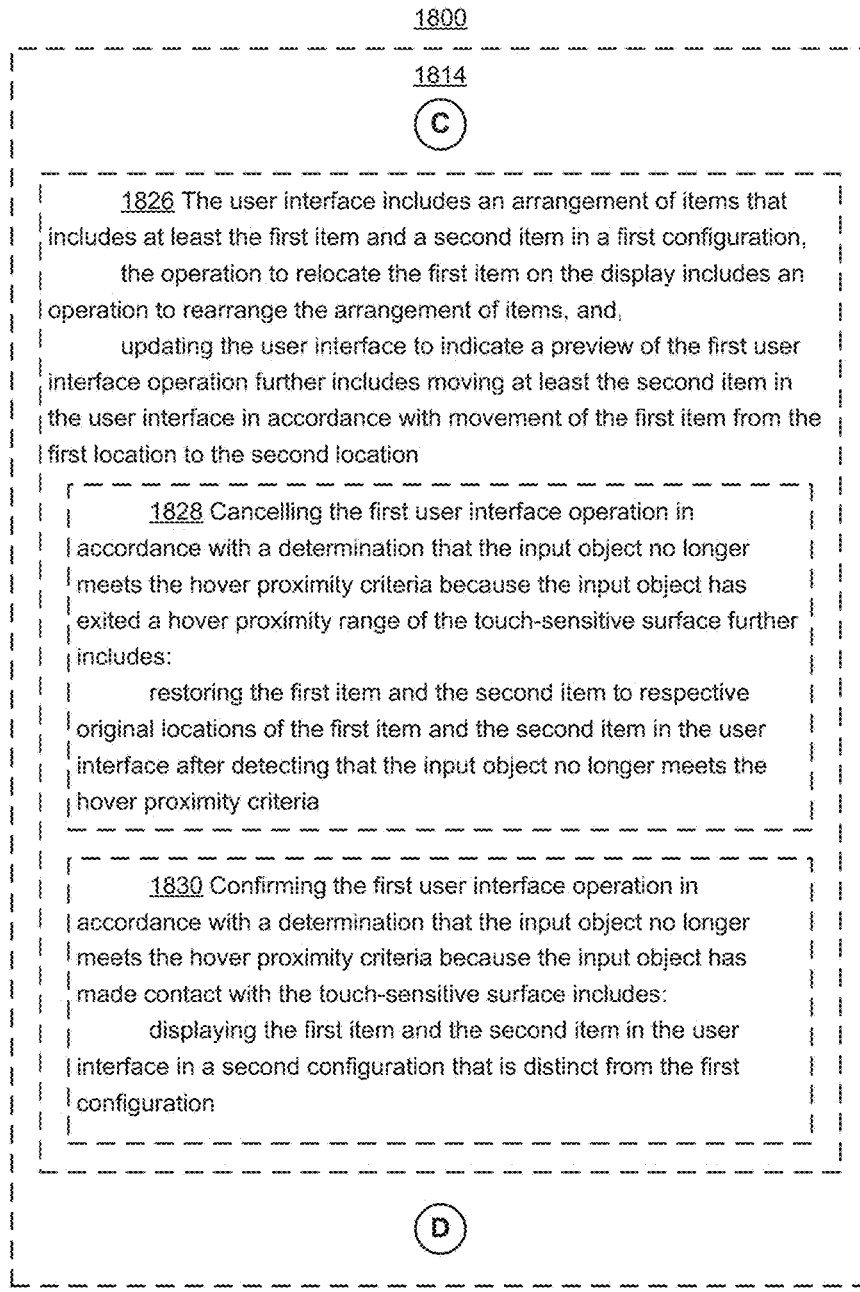
Figure 18E:
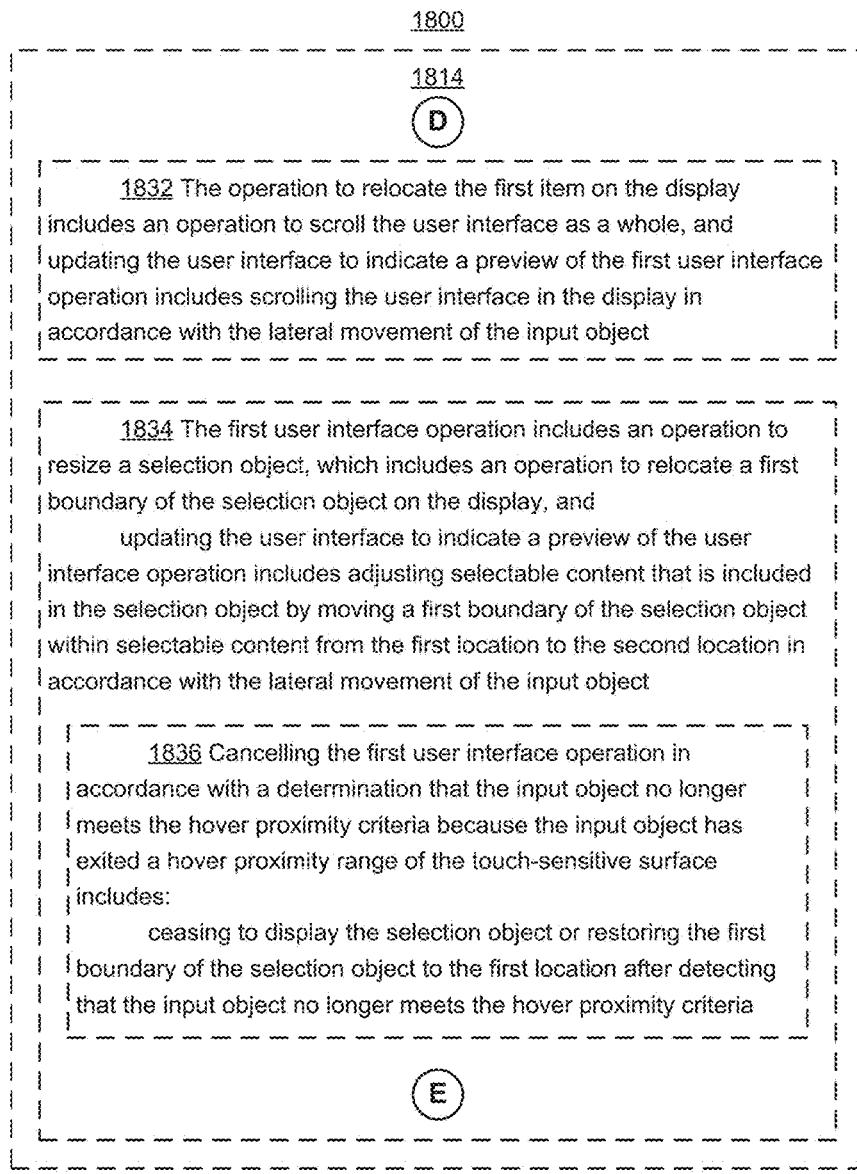
Figure 18F:
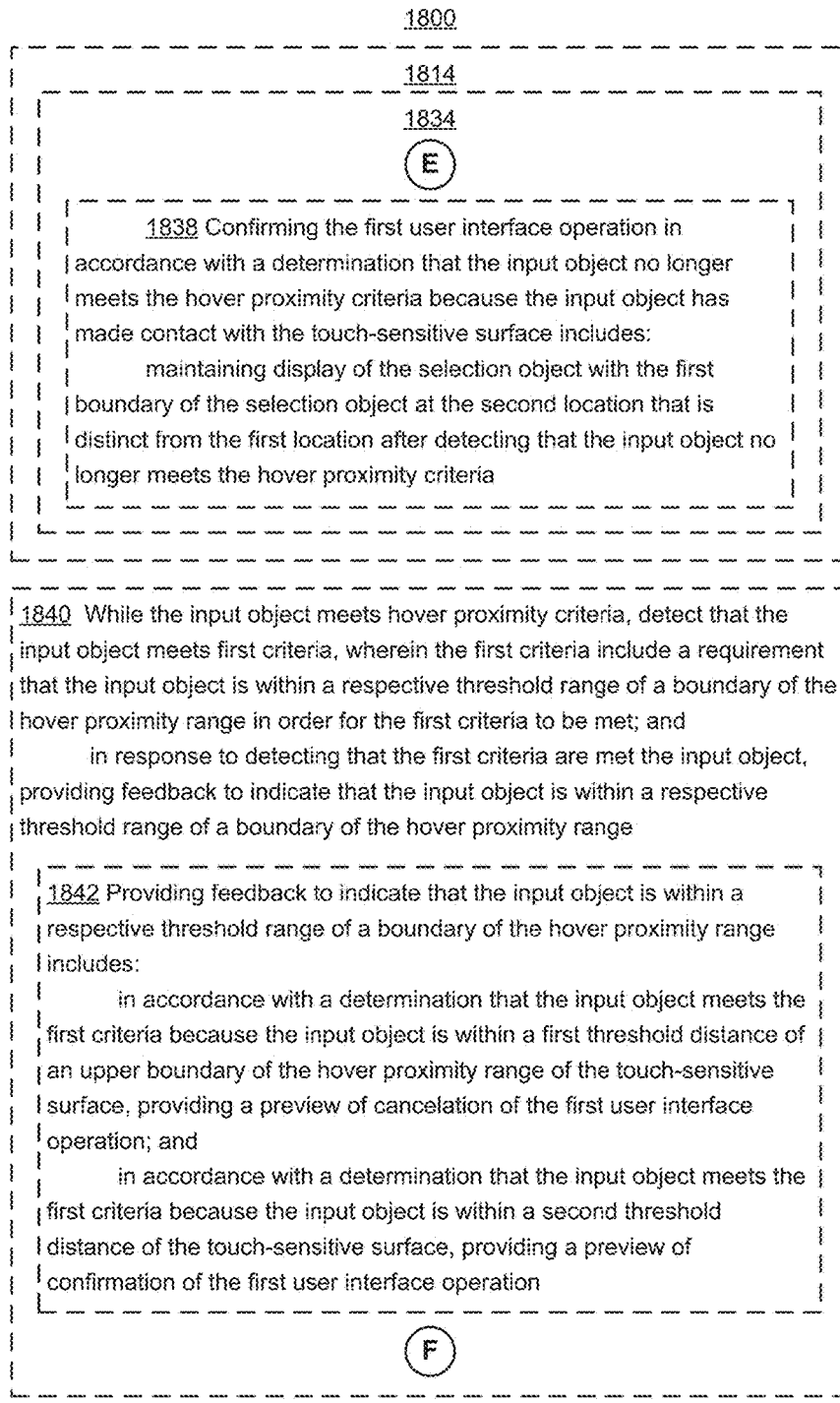
Figure 19A:
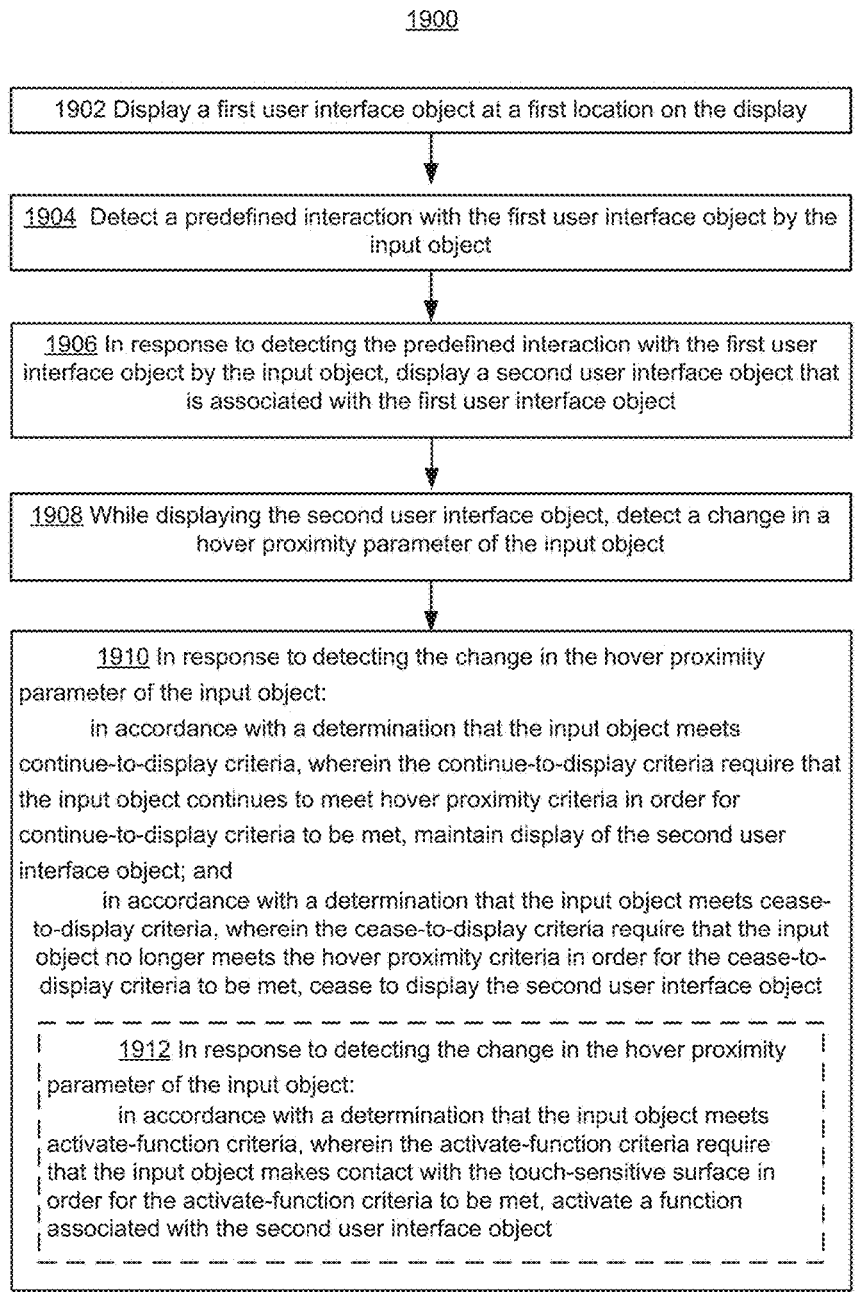
Figure 19D:
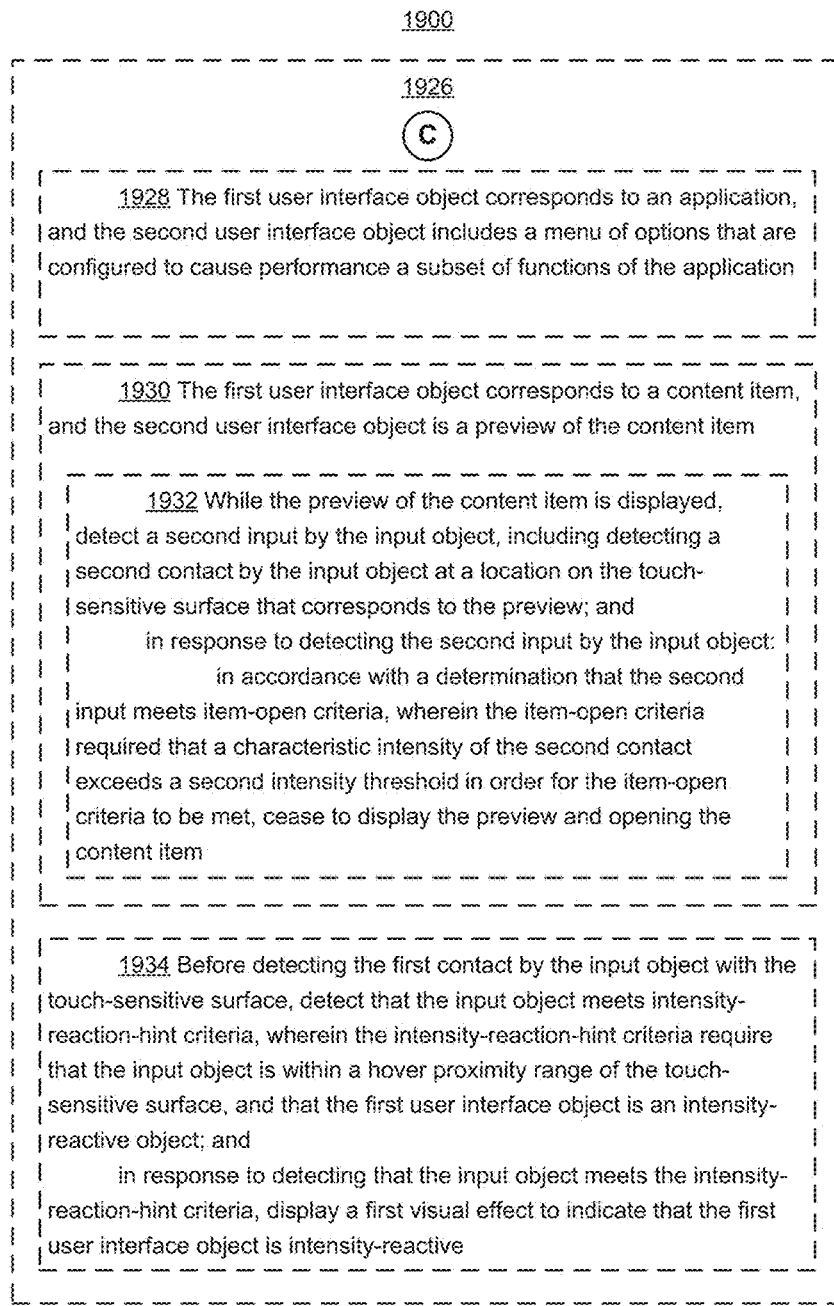
Figure 20A:
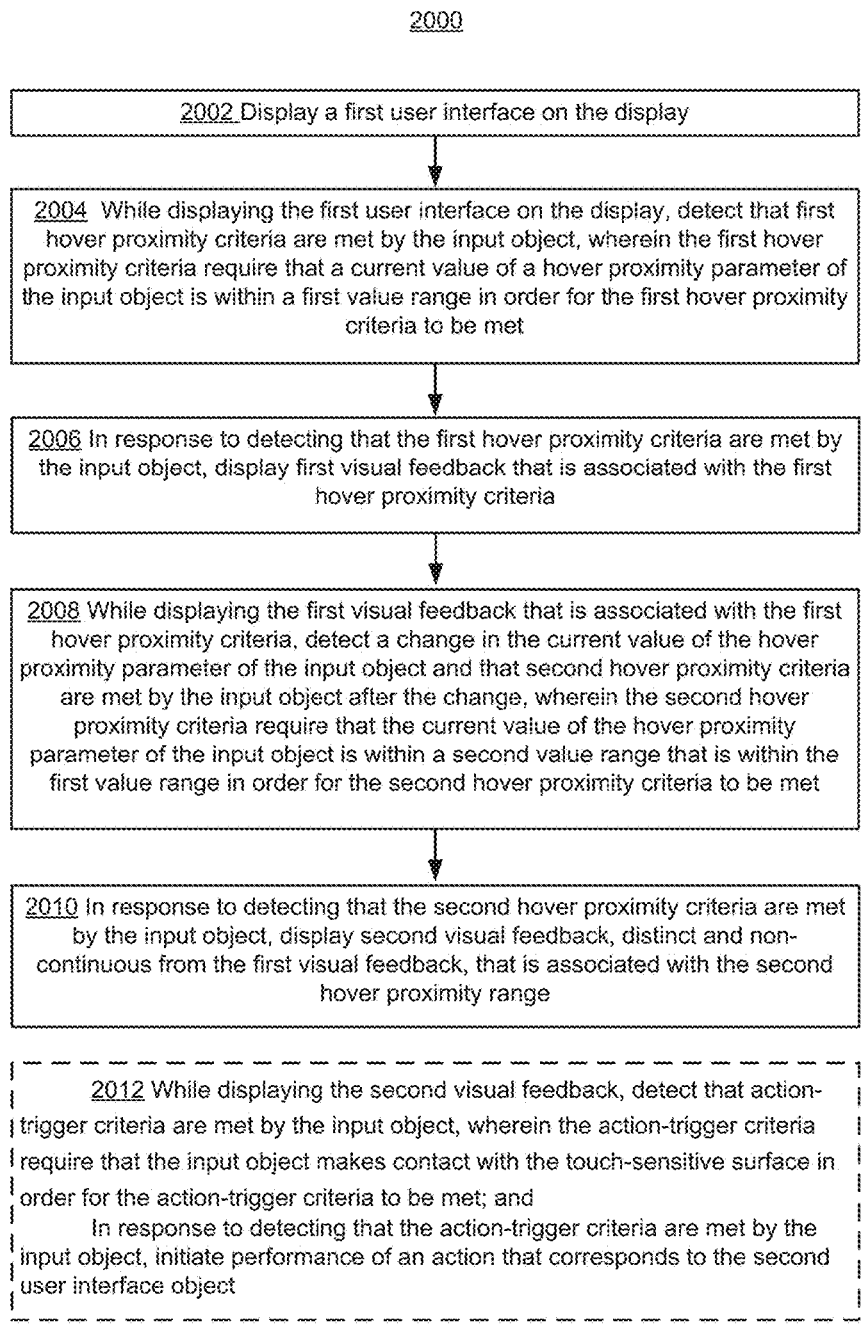
Figure 20D:
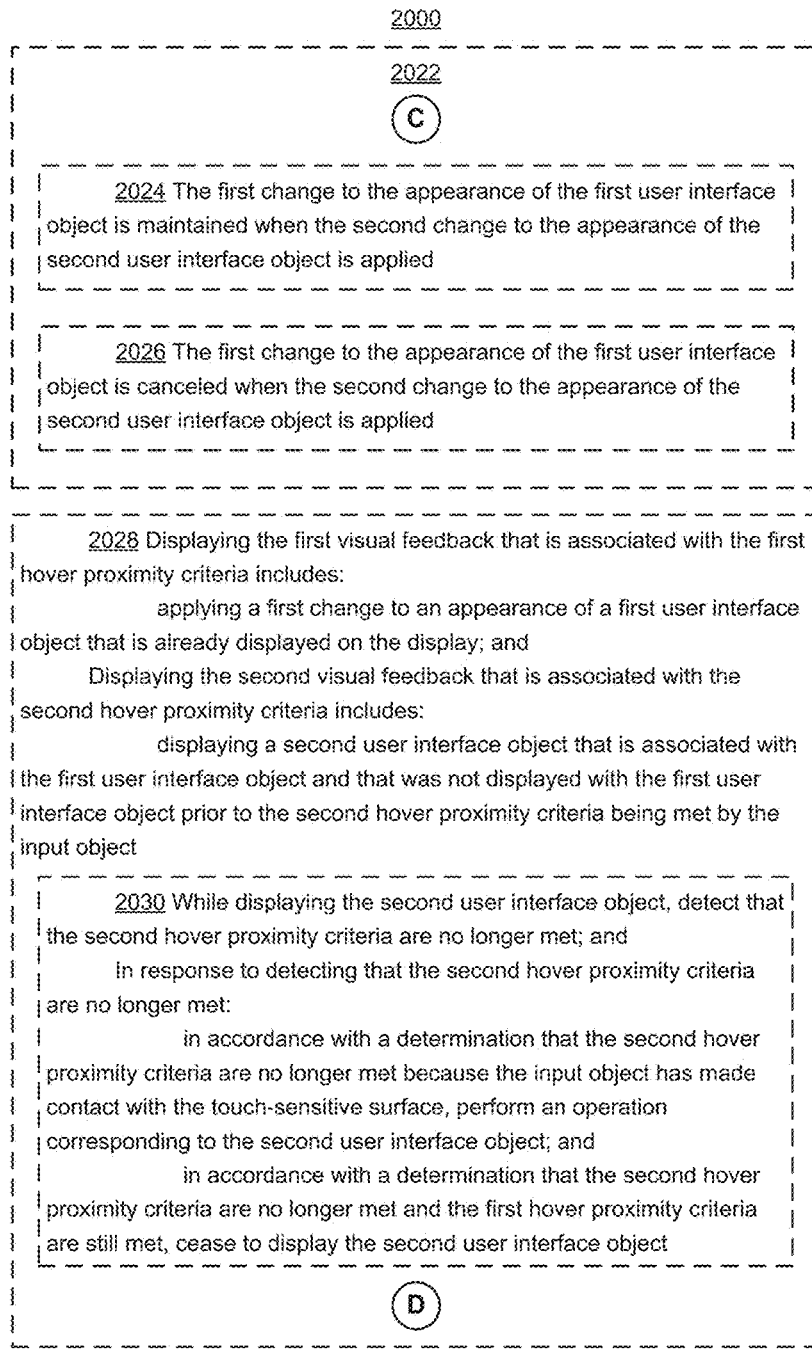
Figure 20E:
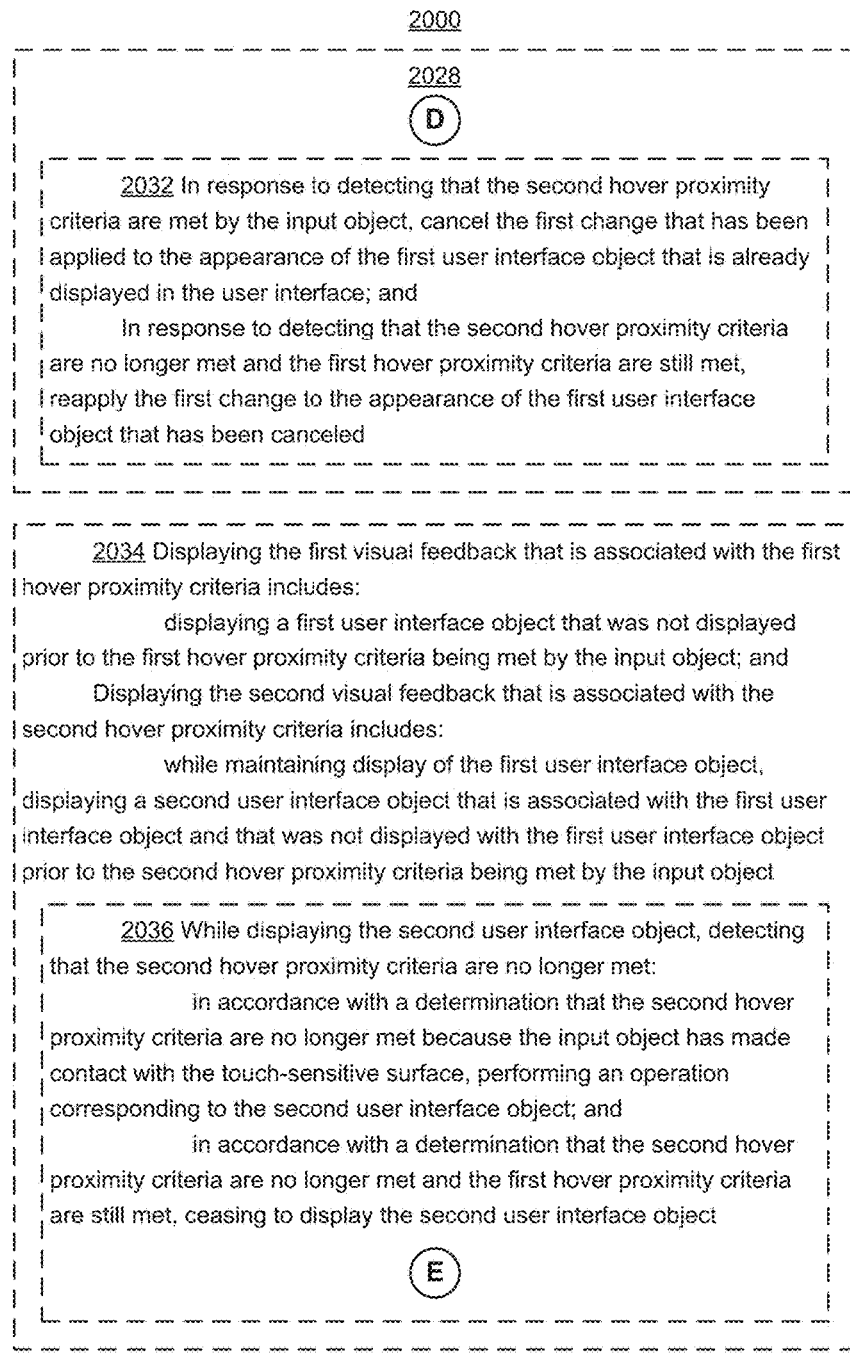
Figure 20F:
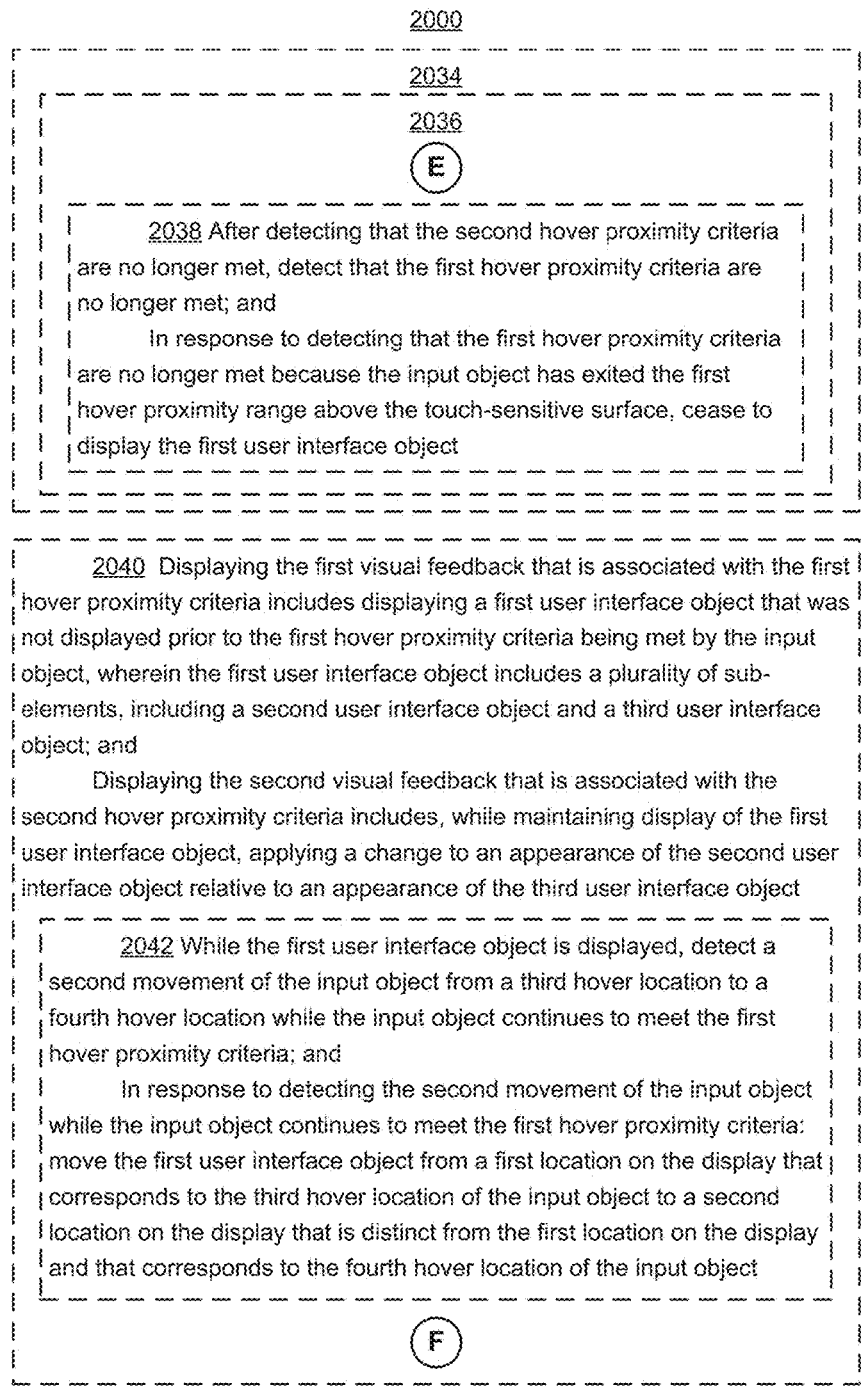
Figure 20G:
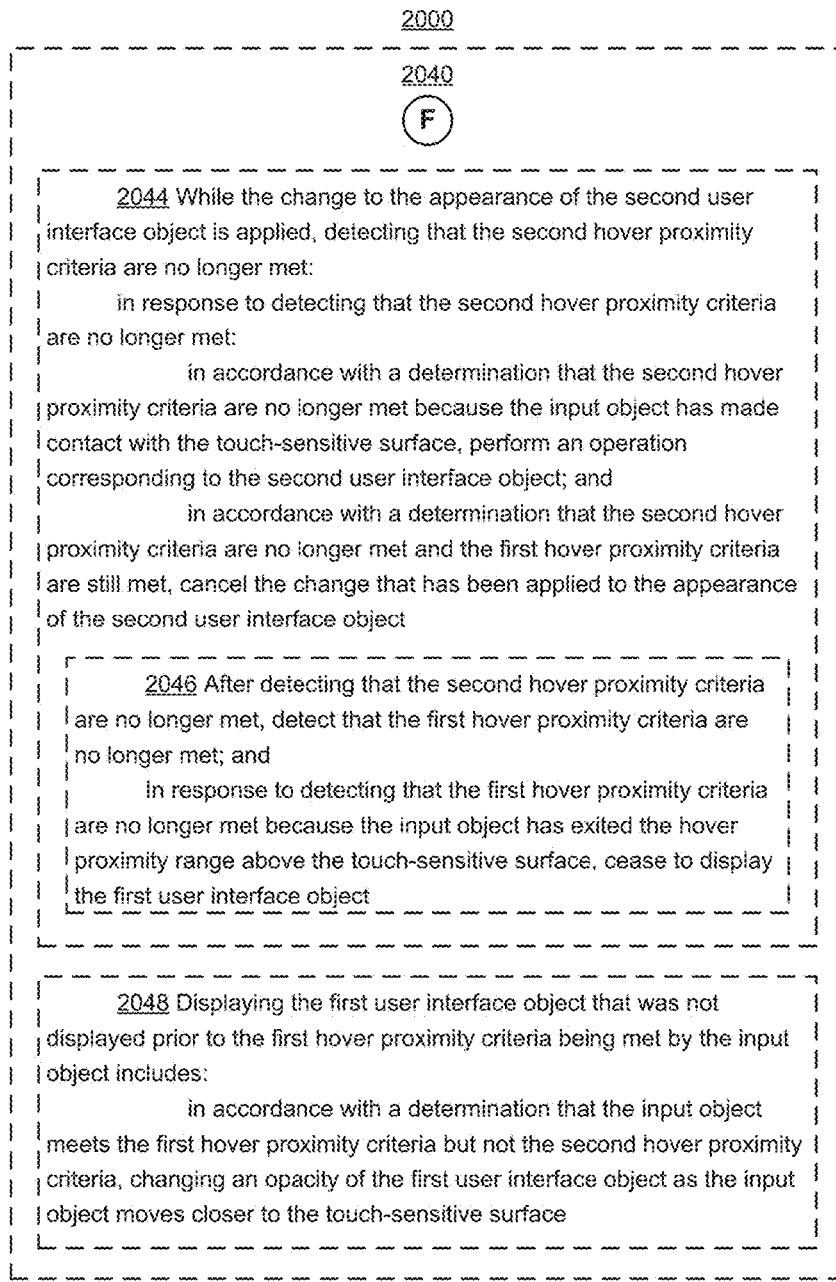
Figure 20I:
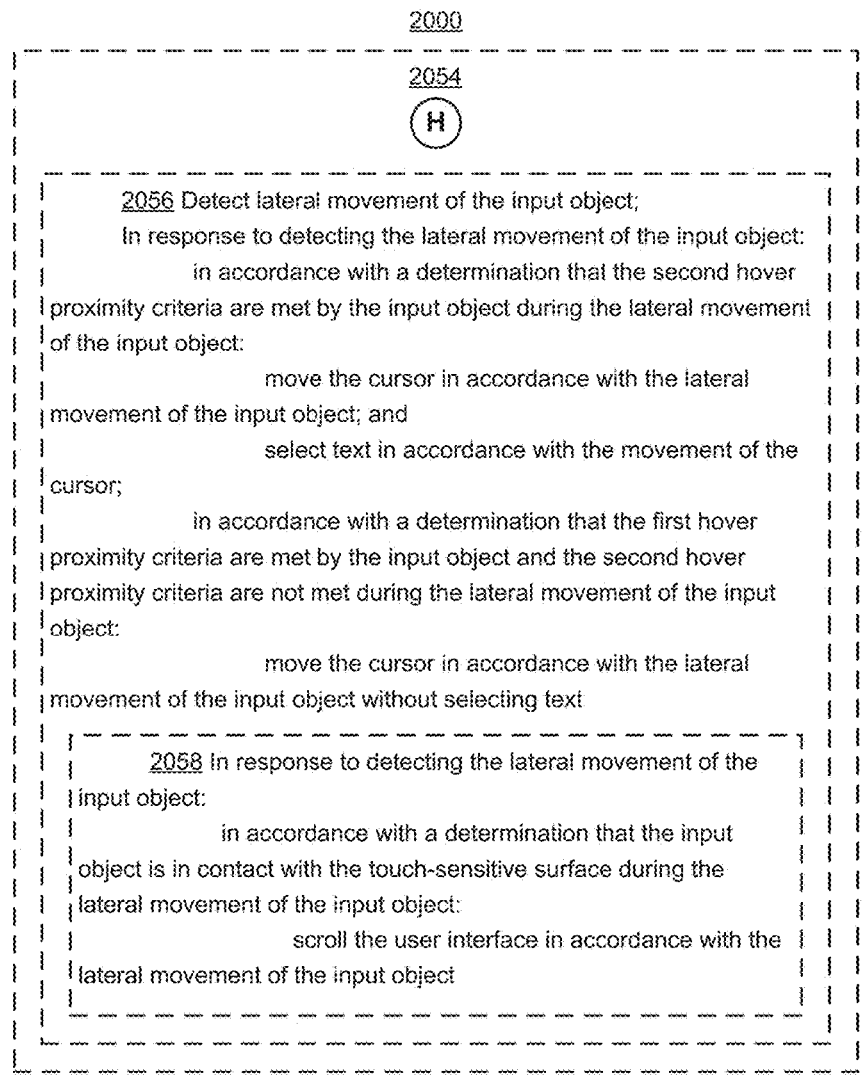
Figure 21A:
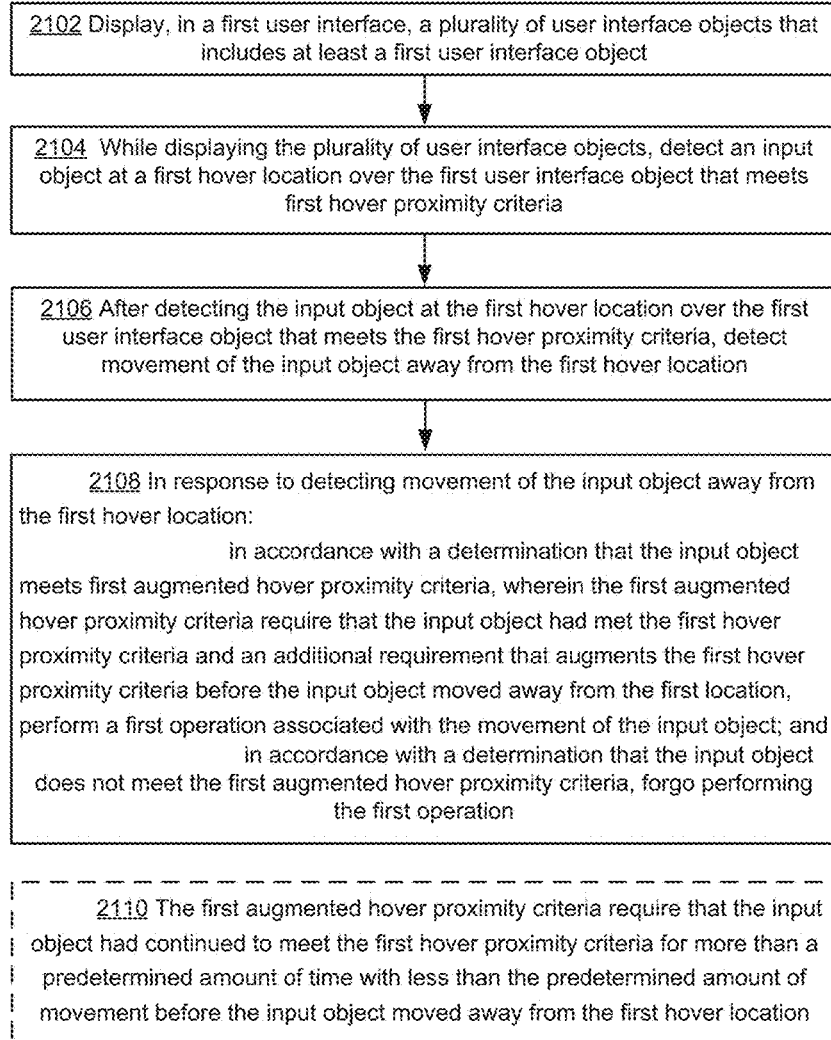
Figure 22B:
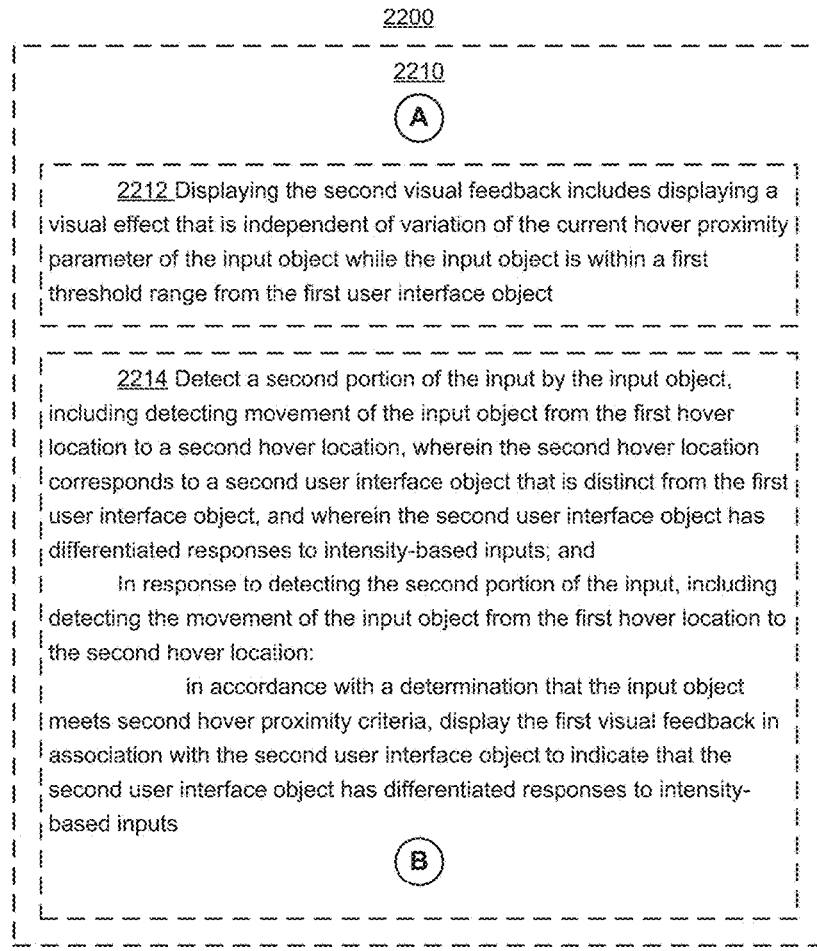
Figure 22D:
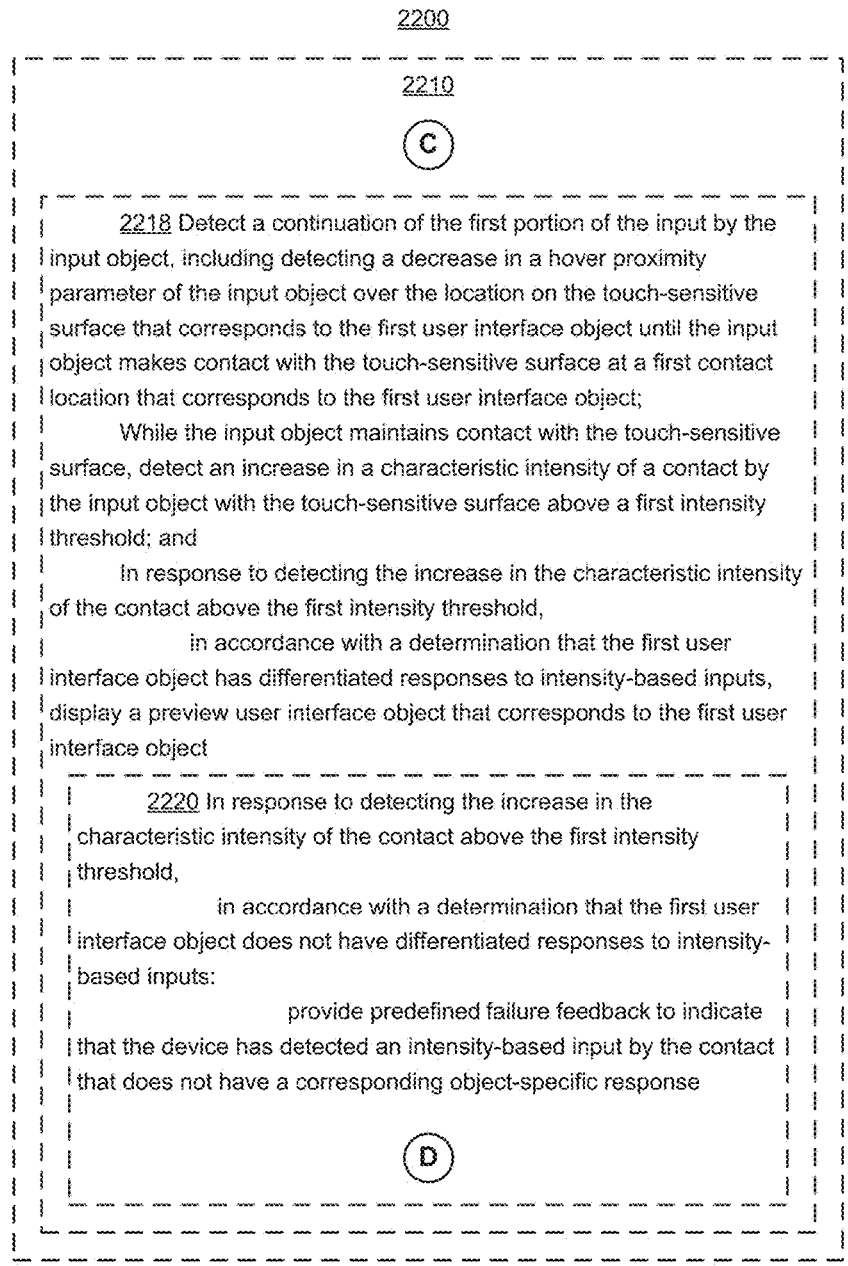
Figure 22E:
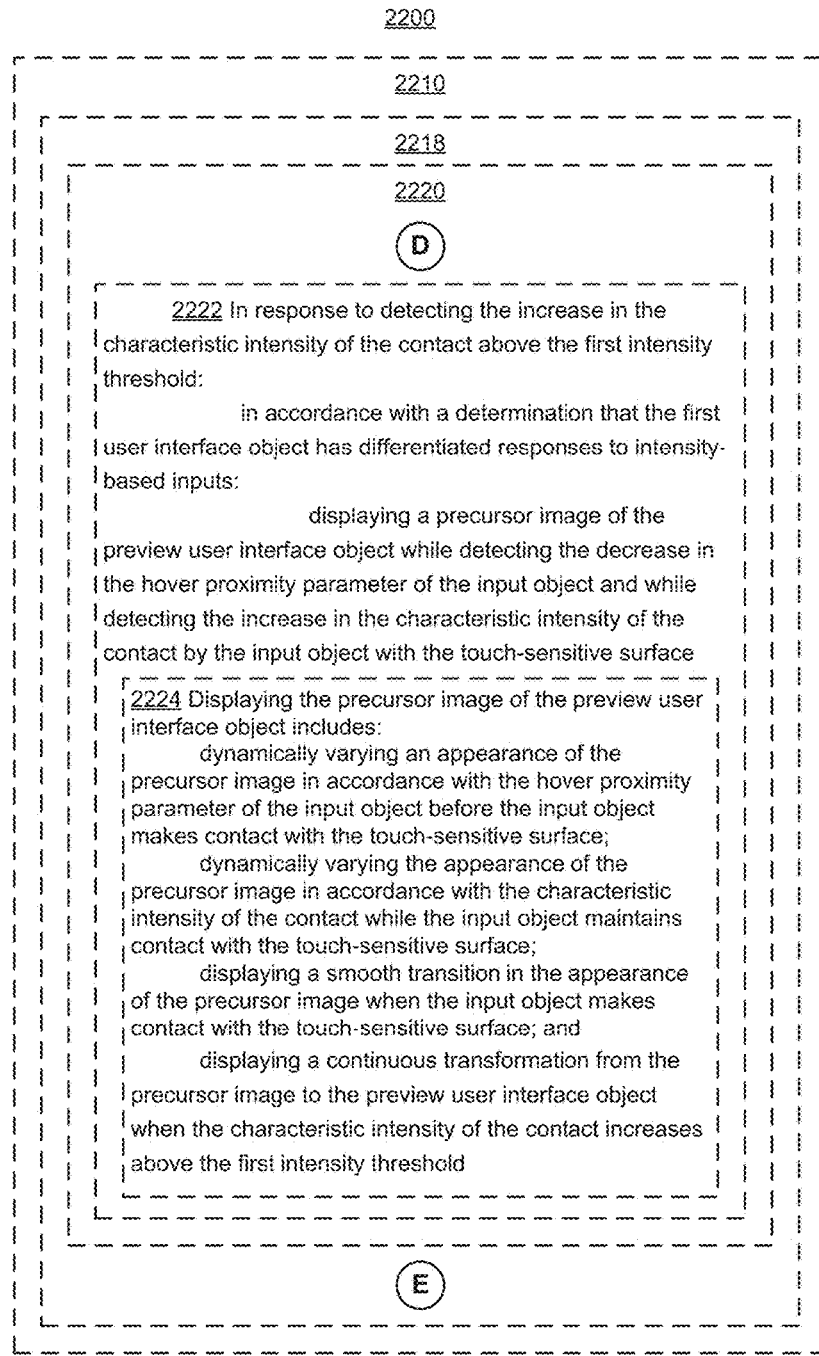
Figure 22G:
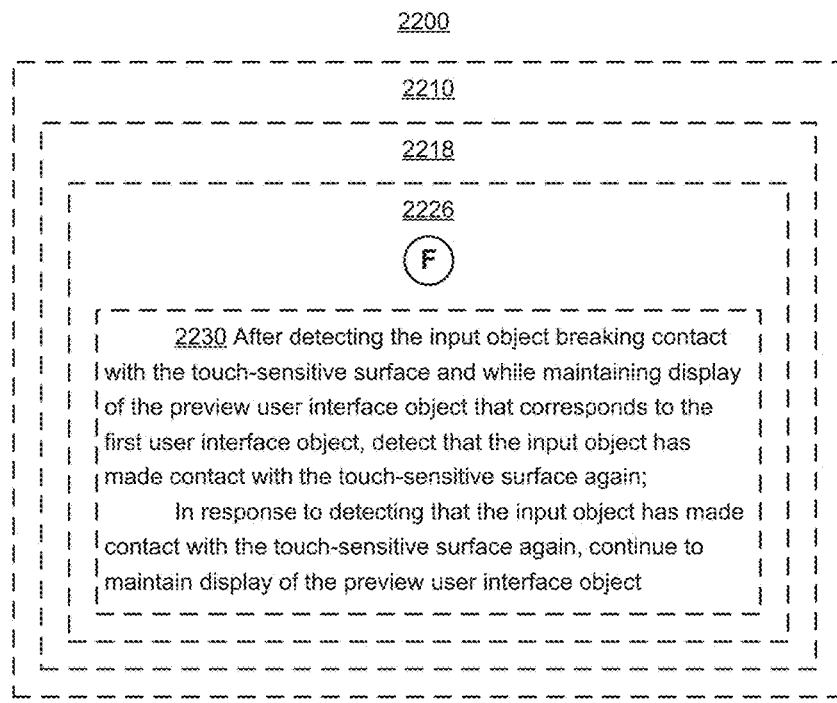
Figure 23C:
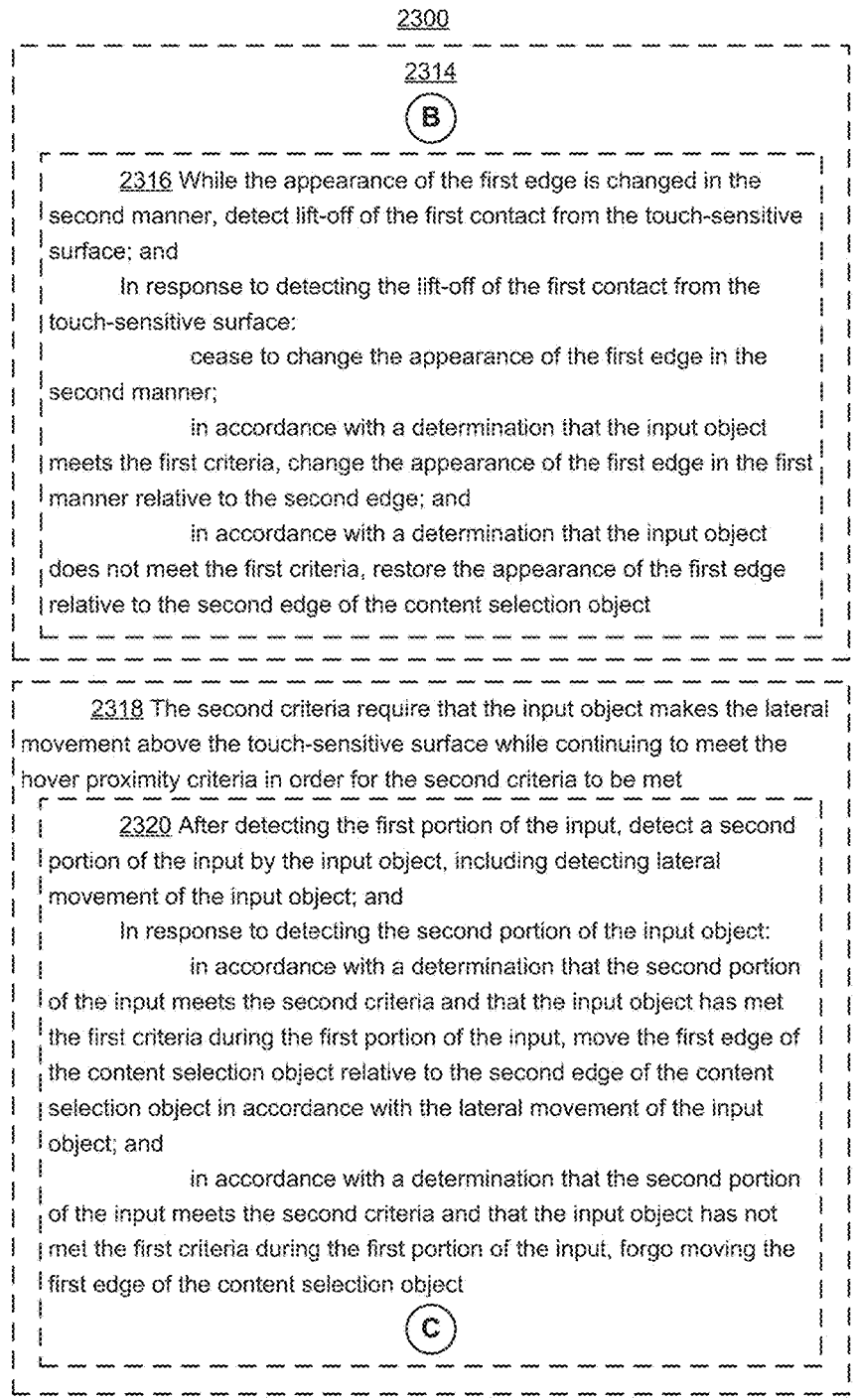
Figure 24A:
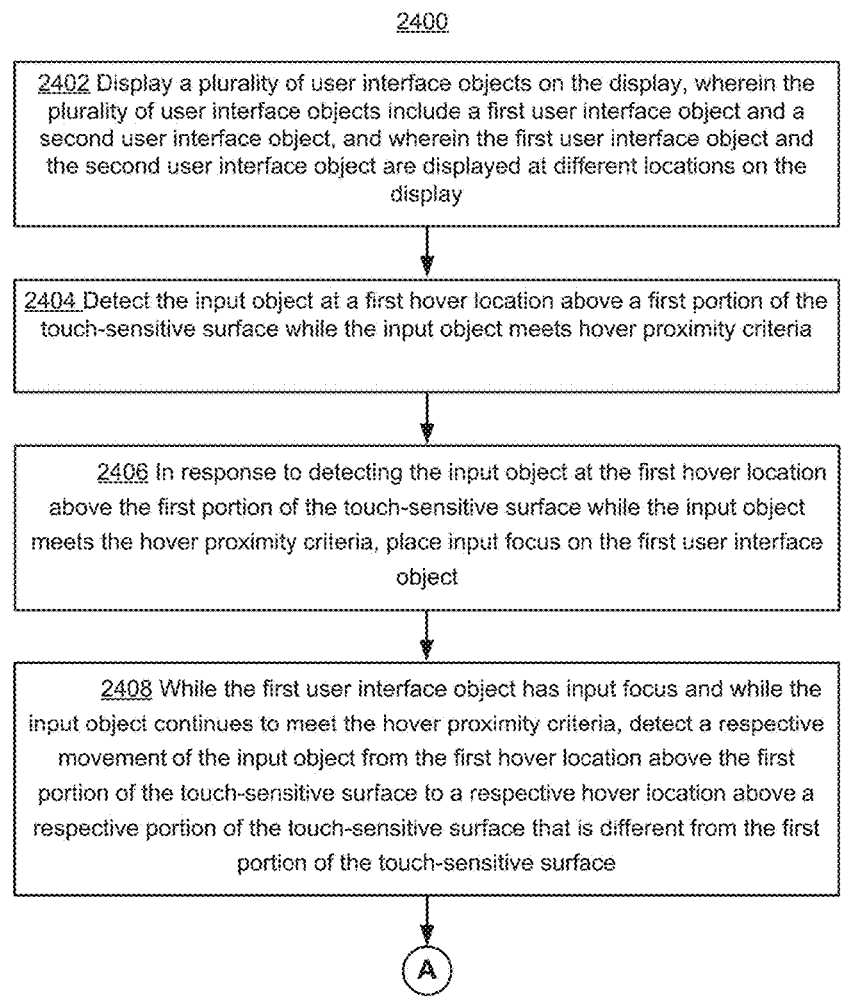
Figure 24B:
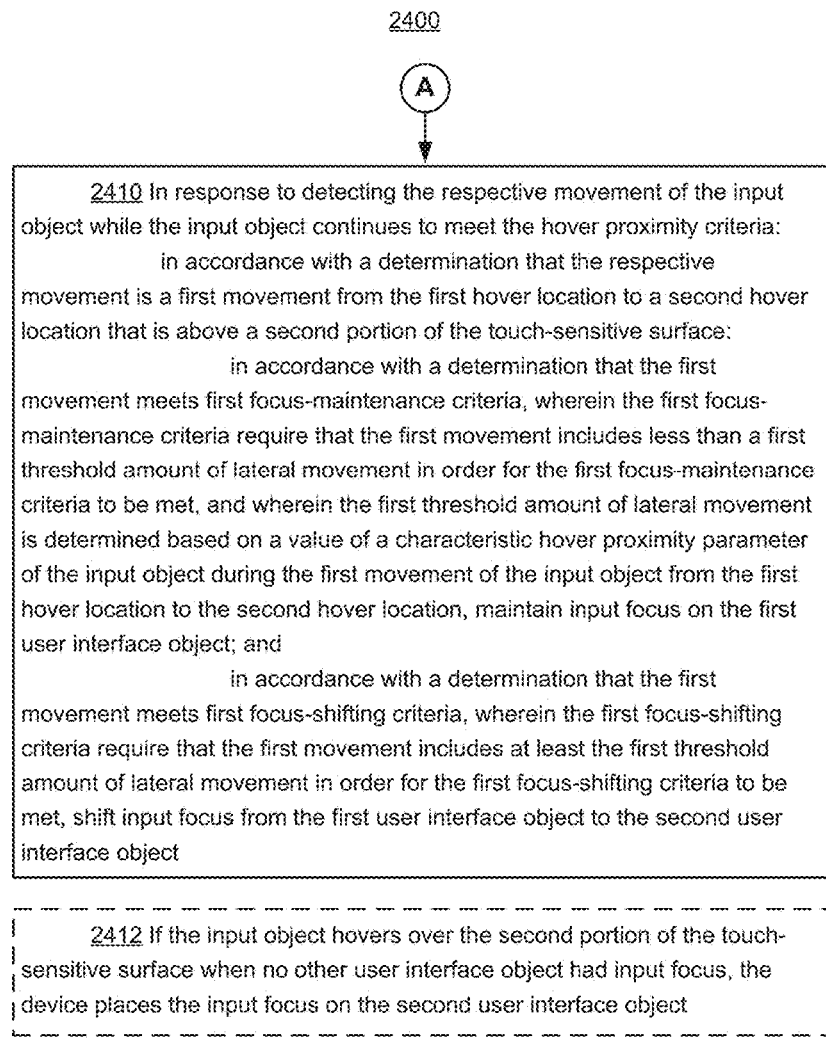
Figure 24E:
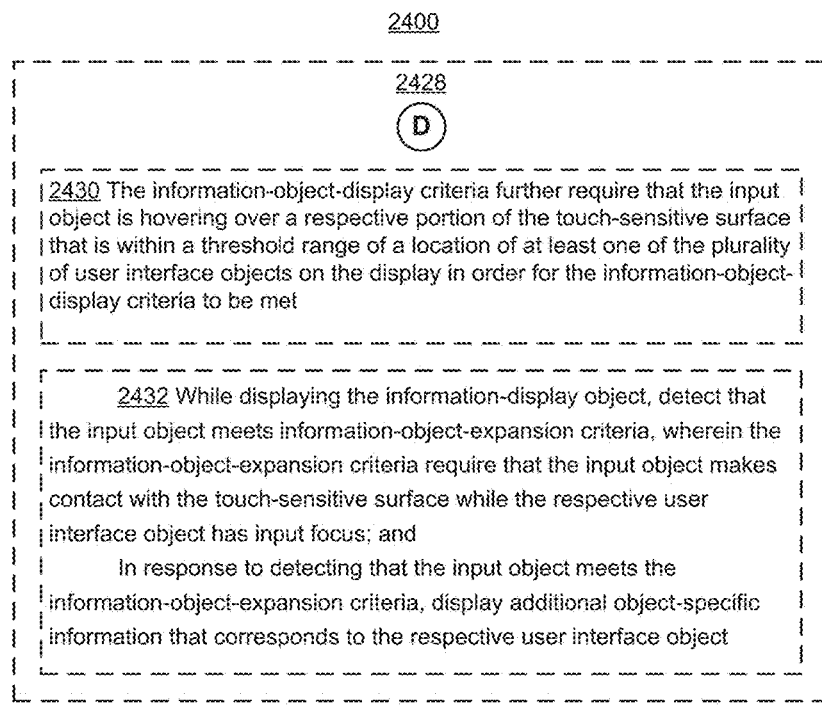

FIGS. 17A-17C are flow diagrams illustrating a method 1700 of interacting with selectable text through proximity-based inputs and contact-based inputs in accordance with some embodiments. The method 1700 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object above the touch-sensitive surface (e.g., proximity sensors (such as infrared sensors), capacitive sensors in the touch sensitive surface, or cameras next to the touch-sensitive surface). In some embodiments, the electronic device includes one or more second sensors to detect intensity of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1700 are, optionally, combined and/or the order of some operations is, optionally, changed.

As described below, the method 1700 provides an intuitive way to interact with selectable text. In particular, this method provides an intuitive and efficient way of switching from a cursor placement mode to a text selection mode, without requiring extra actions on the part of the user (e.g., a press input with increased contact intensity above a threshold intensity, or selection of an affordance), thus making the user interaction with the user interface faster and more streamlined. The method reduces the number, extent, and/or nature of the inputs from a user when interacting with selectable text, thereby creating a more efficient human-machine interface. For battery-operated electronic devices, enabling a user to select text faster and more efficiently conserves power and increases the time between battery charges.

The device displays (1702) a position indicator (e.g., a cursor, a spotlight, or text highlighting) (e.g., cursor 738) within text (e.g., editable text or non-editable text) on the display while an input object (e.g., a finger or a stylus) above the touch-sensitive surface meets hover criteria. For example, while the user interface object is displayed, the device detects that a finger (e.g., finger 734) approaches the user interface object (e.g., selectable text 732) from above touch-sensitive surface (e.g., touch-screen 112) without making contact with the touch-sensitive surface, while remaining within a threshold distance above the touch-sensitive surface, as shown in FIGS. 7AK-7AL.

While the position indicator (e.g., cursor 738) is displayed within the text (e.g., text 732) on the display, the device detects (1704) a first movement of the input object that includes a component of movement parallel to the touch-sensitive surface, wherein the input object continues to meet the hover criteria during the first movement. For example, while the position indicator is displayed, the device detects that a finger moves laterally across the space above the touch-sensitive surface without making contact with the touch-sensitive surface, while remaining within a threshold distance above the touch-sensitive surface. This is shown in FIGS. 7AL-7AM (e.g., movement of finger 734 above touch-screen 112 causes movement of cursor 738 in text 732).

In response to detecting the first movement of the input object over the touch-sensitive surface, the device moves (1706) the position indicator (e.g., cursor 738) within the displayed text in accordance with the first movement of the input object. For example, as a hovering finger moves across the touch-sensitive surface, a cursor on the display tracks the movement of the hovering finger and moves among allowed cursor positions in the text. This is illustrated in FIGS. 7AL-7AM.

After moving the position indicator within the displayed text in accordance with the first movement of the input object, the device detects (1708) a second movement of the input object that includes a component of movement parallel to the touch-sensitive surface. For example, after hovering across the touch-sensitive surface to position the cursor at a desired location within the text, a finger makes contact with the touch-sensitive surface at a first location and then moves across the touch-sensitive surface while maintaining contact with the touch-sensitive surface to select text.

In response to detecting the second movement of the input object across the touch-sensitive surface: in accordance with a determination that the second movement of the input object is detected while the input object is in contact with the touch-sensitive surface, the device selects (1710) text in accordance with the second movement of the input object across the touch-sensitive surface while the input object remains in contact with the touch-sensitive surface (e.g., a current end boundary of the text selection on the display is determined based on the current position of the input object on the touch-sensitive surface during the second movement). This is shown in FIGS. 7AN-7AO (e.g., movement of finger 734 across touch-screen 112 cause selection of text).

In some embodiments, the device detects (1712) the input object making contact with the touch-sensitive surface at a first location on the touch-sensitive surface followed by the second movement of the input object across the touch-sensitive surface; and in response to detecting the input object making contact with the touch-sensitive surface at the first location on the touch-sensitive surface followed by the second movement of the input object across the touch-sensitive surface: the device starts text selection within the text at the first location on the display that corresponds to the first location on the touch-sensitive surface (e.g., the contact position determines a starting boundary of the text selection), and the device expands the selected text in accordance with the second movement of the input object across the touch-sensitive surface. This is illustrated in FIGS. 7AN-7AO, for example.

In some embodiments, in response to detecting the second movement of the input object across the touch-sensitive surface: in accordance with a determination that the second movement of the input object is detected while the input object is hovering over the touch-sensitive surface without making contact with the touch-sensitive surface, the device moves (1714) the position indicator in accordance with the second input without selecting text. This is shown in FIGS. 7AP-7AQ, for example.

In some embodiments, the hover criteria include (1716) a criterion that is met when a hover proximity parameter of the input object is less than a threshold proximity value. For example, the detected distance of a fingertip above the touch-sensitive surface is less than a threshold distance. As used in the specification and claims, the term "hover proximity parameter" refers to the (non-zero) distance of the input object above the touch-sensitive surface or to a substitute (proxy) for the distance of the input object above the touch-sensitive surface. In some embodiments, a change in capacitance detected on the touch-sensitive surface due to changing distance of an input object above the touch-sensitive surface is a proxy for the distance of the input object above the touch-sensitive surface. In some embodiments, the hover criteria further include a criterion that the input object is not touching the touch-sensitive surface.

In some embodiments, the position indicator is (1718) initially displayed within the text in response to detecting that the hover proximity parameter of the input object is less than the threshold proximity value above an initial location on the touch-sensitive surface (e.g., when the finger moves towards a touch-screen display and comes within a threshold hover distance above the touch-screen display, the hover criteria are met by the finger and a hover input is detected). This is shown in FIGS. 7AK-7AL, for example. In some embodiments, when the finger comes close to a touch-screen display without touching it, a cursor or other position indicator is displayed; and when the finger moves away from the touch-screen display, the cursor ceases to be displayed. In some embodiments, the position indicator is displayed only when the input object is detected above a region in which selectable text is displayed, and ceases to be displayed when the finger moves outside of the region in which the selectable text is displayed even if the hover proximity parameter of the input object remains below the threshold proximity value.

In some embodiments, displaying the position indicator within the text includes (1720) displaying the position indicator (e.g., cursor 738) within the text (e.g., text 732) at a location that is based on one or more of: a position of a projection of a tip (or other representative portion) of the input object on the touch-sensitive surface (e.g., (x,y) position 504 in FIG. 7AL); an orientation of the input object relative to the touch-sensitive surface; a tilt of the input object relative to the touch-sensitive surface; and a distance of the input object relative to the touch-sensitive surface (e.g., distance 514, FIG. 7AL). In some embodiments, a cursor, spotlight, or text highlighting is positioned in the text as if it is projected from the tip of a finger onto the touch-screen display along the body of the finger. And the location of the position indicator changes dynamically as the position, orientation, tilt, and/or distance of the hovering finger changes while the hover proximity parameter of the hovering finger continues to meet the hover criteria. By displaying the position indicator at a location that is based on one or more factors other than the position of the tip of the input object, the device reduces the negative impact of the tip obscuring the position indicator, and thereby reduces user mistakes and improves operability of the device.

In some embodiments, while the hover criteria are met, the device displays (1722) a magnifier object (e.g., a magnifying window or a loupe) (e.g., magnifying loupe 736) over a portion of the displayed text, wherein the magnifier object displays a magnified image of the position indicator and text adjacent to the position indicator (without magnifying other portions of the displayed text). In some embodiments, the magnifier object continues to be displayed while the input object is in contact with the touch-sensitive surface. This is illustrated in FIG. 7AN, for example.

In some embodiments, in response to detecting the first movement of the input object over the touch-sensitive surface (1724): the device moves the magnifier object in accordance with the first movement of the input object over the touch-sensitive surface; and the device updates the magnifier object to display an updated magnified image of the position indicator and text adjacent to the position indicator. This is shown in FIG. 7AL-7AM, for example. By updating the magnifier object to display an updated magnified image of the position indicator and the text adjacent to the position indicator, the device provides a clearer and unobscured view of the text that is in proximity to the input object, and allows the user to provide proper input (e.g., text selection or cursor placement) when interacting with the user interface.

In some embodiments, while a first portion of the text is selected on the display in accordance with the second movement of the input object, the device detects (1726) liftoff of the input object from the touch-sensitive surface; and, in response to detecting the liftoff of the input object, maintaining selection of the first portion of the text on the display. This is shown in FIG. 7AP, for example. In some embodiments, liftoff of the input object is detected when the input object breaks contact with the touch-sensitive surface. In some embodiments, liftoff of the input object is detected when the input object breaks contact with the touch-sensitive surface and moves beyond a threshold proximity distance above the touch-sensitive surface. Alternatively, in some embodiments, liftoff of the input object causes the selection to be canceled, unless a press input is detected within a predefined time prior to detecting the liftoff. In some embodiments, maintaining selection of the selected text upon lift-off without requiring additional confirmation input from the user simplifies the user interaction with the device, thereby making the device-user interface more efficient. In some embodiments, the device maintains selection of the selected text upon a confirmation input (e.g., a press input) before lift-off of the contact by the input object. Requiring a confirmation input to maintain selection of the selected text reduces user mistakes and avoid inefficiencies that are caused due to user mistakes.

In some embodiments, in response to detecting the liftoff of the input object, the device displays (1728) a menu of options for the selected first portion of the text (e.g., a menu with options to copy, paste, delete, look-up, etc.). In some embodiments, the menu is displayed adjacent to the selected text. In some embodiments, the menu is displayed when the device determines that the input object is beyond a threshold proximity distance above the touch-sensitive surface. This is illustrated in FIG. 7AU, for example. In some embodiments, the menu is displayed when the device determines that the input object is no longer in contact with the touch-sensitive surface, irrespective of whether the input object is still within the threshold proximity distance above the touch-sensitive surface. By automatically displaying a menu bar after lift-off of the input object and while selection of text is maintained, the user can immediately specify an operation to be performed with respect to the selected text, without having to provide additional input to invoke the menu bar. Thus, automatic displaying the menu bar at this appropriate occasion helps to simplify the user's interaction with the device and improves the efficiency of the device-user interface.

In some embodiments, after detecting the liftoff of the input object (1730): the device determines whether the input object meets the hover criteria (e.g., determining whether the input object is beyond a threshold proximity distance above the touch-sensitive surface); in accordance with a determination that the input object meets the hover criteria, the device maintains display of the position indicator on the display; and in accordance with a determination that the input object ceases to meet the hover criteria (e.g., upon determining that the input object is beyond the threshold proximity distance above the touch-sensitive surface), the device ceases to display the position indicator on the display. This is illustrated in FIGS. 7AT-7AU, for example. In some embodiments, if the magnifier object (e.g., the magnification window, the loupe, etc.) is displayed during the hover input, when the input object is lifted beyond the threshold proximity distance above the touch-sensitive surface, the device also ceases to display the magnifier object. This is illustrated in FIG. 7AU, for example. In some embodiments, maintaining the display of the position indicator after lift-off of the input object but while the input object is still hovering above the touch-sensitive surface, the device allows the user to continue with the current input (e.g., to reposition the position indicator) without starting a new input. This improves the efficiency of the device-user interface because the user is not required to restart the process to position the position indicator by exiting the hover range, and reenter the hover range with the input object.

In some embodiments, after detecting the liftoff of the input object (e.g., when the input object breaks contact with the touch-sensitive surface but remains within a threshold proximity distance above the touch-sensitive surface) (1732): the device detects a third movement over the touch-sensitive surface of the input object while the input object meets the hover criteria; and, in response to detecting the third movement of the input object over the touch-sensitive surface, the device moves the position indicator in accordance with the third movement of the input object, while maintaining the selection of the first portion of the text on the display. This is illustrated in FIG. 7AQ, for example. By maintaining the selection of the selected text while allowing movement of the position indicator to a new location, the device offers the user the option to start a new selection and the option to keep the current selection until the user makes a decision regarding the two options (e.g., by exiting the hover range, or by touch-down on the touch-sensitive surface again). By allowing the user longer time to consider his/her options, the device helps to reduce user mistakes and improves efficiency of the device-user interface by reducing user mistakes.

In some embodiments, after moving the position indicator in accordance with the third movement of the input object over the touch-sensitive surface, the device detects (1734) the input object making contact with the touch-sensitive surface at a second location on the touch-sensitive surface; and, in response to detecting the input object making contact with the touch-sensitive surface at the second location on the touch-sensitive surface: the device cancels selection of the first portion of the text; and the device restarts text selection at a location on the display that corresponds to the second location on the touch-sensitive surface (and expanding the text selection in accordance with subsequent movement of the input object).

It should be understood that the particular order in which the operations in FIGS. 17A-17C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1800, 1900, 2000, 2100, 2200, 2300 and 2400) are also applicable in an analogous manner to method 1700 described above with respect to FIGS. 17A-17C. For example, the contacts, gestures, input objects, user interface objects, tactile outputs, audio outputs, intensity thresholds, position indicators, focus selectors, and animations described above with reference to method 1700 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1800, 1900, 2000, 2100, 2200, 2300 and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 17A-17C are, optionally, implemented by components depicted in FIGS. 1A-1B. For example, detection operations 1704 and 1708, moving operation 1704, and selection operation 1710 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 18A-18G are flow diagrams illustrating a method 1800 of interacting with a user interface object through proximity-based and contact-based inputs in accordance with some embodiments. The method 1800 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1800 are, optionally, combined and/or the order of some operations is, optionally, changed.

As described herein, method 1800 relates to a heuristic for determining whether to confirm or cancel a user interface operation after a preview of the user interface operation has been provided in response to a hover-move input by an input object. Specifically, after the device detects an input that corresponds to the start of the user interface operation, the device detects a hover-move input that conveys specific parameters of the user interface operation with at least a lateral movement of the input object while the input object hovers above the touch-sensitive surface. The device provides a preview of the user interface operation in accordance with the hover-move input. After the preview has been provided, depending on whether the input object makes contact with the touch sensitive surface or moves away from the touch-sensitive surface to end the hover-move input, the device either confirms the user interface operation or cancels the user interface operation. Method 1800 makes use of the two natural and intuitive ways to conclusion a hover-move input, namely (1) making contact with the touch-sensitive surface and (2) moving away from touch-sensitive surface, to either confirm or cancel a user interface operation after the device has provided a preview of the user interface operation in accordance with the hover-move input. As a result, the device is able to provide improved feedback to the user regarding the full effect of an operation without requiring the user's commitment to actually perform the operation. The confirmation and cancellation of the operation takes place in response to a natural conclusion of the hover-move input, without requiring any additional steps taken by the user. Providing such improved feedback and reducing the number of steps to confirm or cancel an operation in accordance with the method described herein enhance the operability of the device and make the user-device interface more efficient (e.g., by helping the user to achieve an intended result by providing the required inputs and reducing user mistakes when operating/interacting with the device) which, additionally, reduce power usage and improve battery life of the device (e.g., by enabling the user to use the device more quickly and efficiently). Additionally, providing the preview of the operation in response to a hover-move input further enhances the operability of the device (e.g., by allowing the user to have a better view of the user interface during the input and thereby reducing user mistakes when operating the device) and improves the longevity of the device (e.g., by eliminating unnecessary pressure and friction on the touch-sensitive surface during the input, and thereby reducing structural fatigue of the touch-sensitive surface).

The device displays (1802) a user interface on the display (e.g., including displaying a first user interface object (e.g., an indicator on a slider control, a dial, an app icon on a home screen, a list item in a list, a resize handle on an object, or an edge of a selection box, etc.) at a first location on the display). The device detects (1804) a first input by the input object that corresponds to a start of a first user interface operation (e.g., including detecting selection of the first user interface object by the input object as the start of a move operation (e.g., to change a current value of the slider control or dial, to reconfigure the home screen, to reorder a list, or to resize an object or a selection box) (e.g., selection is triggered by tapping on the first user interface object, pressing on the first user interface object, touching the first user interface object and holding for a period of time, or hovering over the first user interface object at a required distance above the display and/or hold for a threshold amount of time, etc., by the input object). In some embodiments, selection of the first user interface object is indicated by visual, audio, and/or haptic feedback. After detecting the first input that corresponds to the start of the first user interface operation (e.g., start of a move operation, start of a resize operation, etc.) and while the input object meets hover proximity criteria (e.g., the input object is within a hover proximity range above the touch-sensitive surface and is not in contact with the touch-sensitive surface), the device detects (1806) lateral movement of the input object (e.g., lateral movement of the input object includes a component of the movement of the input object that is parallel to the touch-sensitive surface). In response to detecting the lateral movement of the input object while the input object meets the hover proximity criteria, the device updates the user interface to indicate a preview of the first user interface operation. For example, when the first user interface operation is a move operation, the preview of the first user interface operation includes moving the first user interface object from the first location to a second location on the display, wherein the second location is distinct from the first location. This is illustrated in FIGS. 8A-8F, the preview shows that icon 806 is moved by a hover-move input. In another example, when the first user interface operation is a resize operation, the preview of the first user interface operation includes moving the resize handle or edge of an object from the first location to a second location that is distinct from the first location on the display). This is illustrated in FIGS. 8P-8R, where the preview shows selection object 834 is resized with a hover-move input by finger 734. In some embodiments, the preview of the first user interface operation further includes a visual indication of other changes that would occur as a result of the move or resize operation, such as rearrangement of the other user interface objects in the user interface to make room for the user interface object that is being moved or resized. This is illustrated in FIGS. 8C-8F, where other icons (e.g., icons 808, 810, 812, and 814) are rearranged as part of the preview of the move operation, for example. While the user interface is updated to indicate the preview of the first user interface operation (e.g., while the first user interface object (e.g., the selected icon, list item, resize handle, or edge) is at the second location on the display), the device detects (1810) that the input object no longer meets the hover proximity criteria (e.g., the input object is lifted away from the touch-sensitive surface or the input object has made contact with the touch-sensitive surface). In response to detecting that the input object no longer meets the hover proximity criteria: in accordance with a determination that the input object no longer meets the hover proximity criteria because the input object has exited a hover proximity range of the touch-sensitive surface, the device cancels (1812) the first user interface operation (e.g., including reversing the update that has been made to the user interface by restoring the first user interface object from the second location to the first location on the display); and in accordance with a determination that the input object no longer meets the hover proximity criteria because the input object has made contact with the touch-sensitive surface, the device confirms the first user interface operation (e.g., including completing the operation by releasing the first user interface object to the second location on the display or automatically releasing the first user interface object to a third location that is distinct from the first location and the second location on the display (e.g., a nearest snap location corresponding to the second location, including maintaining the selection at the updated size after lift-off of the contact)). This is illustrated in FIGS. 8A-8J, where icon 806 is moved by a hover-move input. Move of icon 806 is confirmed when finger 734 makes contact (e.g., contact 818) with the touch-screen before lift-off, and move of icon 806 is canceled when finger 734 does not make contact with the touch-screen before being lifted out of the hover proximity range above the touch-screen. This is also illustrated in FIGS. 8P-8V, where selection object 834 is resized with a hover-move input by finger 734. The resizing of selection object 834 is confirmed when finger 734 makes contact (e.g., contact 848) with the touch-screen before lift-off, and the resizing of selection object 843 is canceled with finger 734 does not make contact with the touch-screen before being lifted out of the hover proximity range above the touch-screen.

In some embodiments, the user interface includes (1814) a first item at a first location (e.g., a control (e.g., an indicator on a slider control or dial) on a user interface, an object (e.g., a shape) on a canvas, an item (e.g., a song or weather item) in a list of items (e.g., a playlist or a list of weather items for different cities), an icon in an arrange of icons (e.g., an application icon in a grid of application icons on a home screen, as shown in FIGS. 8A-8J), a resize handle or a moveable edge of a resizable object (e.g., a resizable object, a selection box, or a text selection within selectable text, as shown in FIGS. 8P-8V), or other content or control in the user interface (e.g., content of a document displayed in a window or in a display region of the display). The first user interface operation includes an operation to relocate the first item on the display (e.g., the operation is a move operation or a scroll operation, and the start of the operation is selection of an item that is to be moved or triggering of a user interface scrolling mode). Updating the user interface to indicate a preview of the first user interface operation includes moving the first item from a first location to a second location on the display in accordance with the lateral movement of the input object (e.g., the location of the first item change when the first item is moved relative to the user interface or relative to another object on the user interface (e.g., a reference position on a slider or scroll bar), or when the user interface is shifted or scrolled as a whole, in accordance with the lateral movement of the input object). Providing the preview of the move operation in response to a hover-move input enhances the operability of the device (e.g., by allowing the user to have a better view of the user interface during the input and thereby reducing user mistakes when operating the device) and improves the longevity of the device (e.g., by eliminating unnecessary pressure and friction on the touch-sensitive surface during the input, and thereby reducing structural fatigue of the touch-sensitive surface).

In some embodiments, cancelling the first user interface operation in accordance with a determination that the input object no longer meets the hover proximity criteria because the input object has exited a hover proximity range of the touch-sensitive surface includes (1816) restoring the first item to an original location of the first item on the display after detecting that the input object no longer meets the hover proximity criteria (e.g., the items' original location is an location of the first item before the first input by the input object that corresponds to the start of the first user interface operation and the lateral movement of the input object were detected). This is illustrated in FIGS. 8I-8J, and FIGS. 8R, 8U-8V, for example. In some embodiments, the item's original location is the same as the first location, and in some embodiments, the item's original location is slightly offset from the first location (e.g., when the first item jumps out of its original location upon selection of the first item). In some embodiments, restoring the first item to its original location on the display includes moving the first item back to its original location on the user interface before the move. In some embodiments, restoring the first item to its original location on the display includes restoring the user interface to its original state before the user interface is scrolled or shifted in accordance with the movement of the input object. In some embodiments, the device displays an animation showing the first item flying back to its original location and settles into its original location. In some embodiments, the device generates a tactile output to indicate that the move has been canceled and the first item has settled back into its original location. Providing a preview of a move operation in accordance with a hover-move input and determining whether to cancel the move operation depending on how the hover-move input ends (e.g., by touching down on the touch-sensitive surface or moving away from the touch-sensitive surface) enhance the operability of the device and make the user-device interface more efficient (e.g., by reducing the number of steps needed to cancel the move operation).

In some embodiments, confirming the first user interface operation in accordance with a determination that the input object no longer meets the hover proximity criteria because the input object has made contact with the touch-sensitive surface includes (1818) displaying the first item at a final location that is distinct from the first location after detecting that the input object no longer meets the hover proximity criteria (e.g., the final-location is a drop-off location of the first item and the item remains at the drop-off location after lift-off of the input object from the touch-sensitive surface is detected). This is illustrated in FIGS. 8F-8H and 8R-8T, for example. In some embodiments, the item's final location is the same as the second location, and in some embodiments, the item's final location is slightly offset from the second location (e.g., when the first item settles into its final location after drop-off of the first item upon the input object making contact with the touch-sensitive surface, or lift-off of the contact). In some embodiments, the item's final location is a nearest snap location (e.g., a third location that is distinct from the first location and the second location) for the first item from the location of the initial contact with the touch-sensitive surface by the input object. In some embodiments, the item's final location on the display is the location of the first item on the user interface when the user interface has settled at its final location after having been scrolled or shifted in accordance with the movement of the input object. In some embodiments, a tactile output is generated to indicate that the first item has settled into its final location in the user interface. Providing a preview of a move or scroll operation in accordance with a hover-move input and determining whether to confirm the move or scroll operation depending on how the hover-move input ends (e.g., by touching down on the touch-sensitive surface or moving away from the touch-sensitive surface) enhance the operability of the device and make the user-device interface more efficient (e.g., by reducing the number of steps needed to confirm the move or scroll operation).

In some embodiments, the device detects (1820) a second input by the input object (e.g., either before the first input is detected or after the first input has been completed), wherein the second input corresponds an operation to display content associated with the first item, and wherein the second input does not correspond to the start of the first user interface operation (e.g., the second input is a tap on the first item, and not a touch-hold or a press input to select the first item for subsequent movement in accordance with a hover movement of the input object). In response to detecting the second input that corresponds to an operation to display content associated with the first item, the device displays first content associated with the first item. For example, when a tap input is detected on the application icon, the device launches an application corresponding to the application icon, and a user interface of the application is displayed. When a tap input is detected on a list item (e.g., a representation of an electronic message in a list of electronic messages, a representation of electronic message conversation in a list of electronic messages, a representation of a contact in a list of contacts), the device displays additional content corresponding to the list item (e.g., an electronic message, an electronic message conversation, or a contact card). In contrast to the first input (e.g., a light press input or a touch-and-hold input) that corresponds to an operation to move the first item, the second input does not include a contact with an intensity that exceeds an intensity threshold or does not include a contact that is maintained for more than a threshold amount of time. Using different inputs for displaying content and performing the first user interface operation (e.g., a move operation) in association with the first user interface enhance the operability of the device and make the user-device interface more efficient (e.g., by providing additional functionality and control functions without cluttering the UI with additional displayed controls) which, additionally, reduce power usage and improve battery life of the device (e.g., by enabling the user to use the device more quickly and efficiently).

In some embodiments, while moving the first item from the first location to the second location on the display in accordance with the lateral movement of the input object (e.g., when moving the first item relative to the user interface or scrolling the user interface as a whole in accordance with the lateral movement of the input object), the device dynamically adjusts (1822) an appearance of the first item in accordance with a current hover proximity parameter of the input object (e.g., dynamically adjusting a size, hue, opacity, and/or other visual property of the first item in accordance with a current hover distance of the input object above the touch-sensitive surface while the first item is being dragged across the display in accordance with the lateral hover movement of the input object). This is illustrated in 8D-8E where the size of icon 806 is varied dynamically with hover distance 514 of finger 734, for example. In some embodiments, the movement of the first item lags behind the lateral hover movement of the input object when the input object accelerates in accordance with simulated inertia of the first item. In some embodiments, the first item and the input object move with different speeds, and the lag between the first item and the input object is a function of the velocity of the input object. The behavior of the first item is different when it is being moved by the input object while the input object hovers above the touch-sensitive surface and when it is being moved by the input object while the input object maintains contact with the touch-sensitive surface. For example, in a normal drag scenario, the input object maintains contact with the touch-sensitive surface during the lateral movement, and the first item has the same speed as the contact when it is dragged by the input object across the display. Even if an item lags behind an input object during a normal drag by contact, the appearance of the item does not vary during its movement (e.g., does not vary in accordance with the hover proximity parameter of the input object). Dynamically adjusting the visual feedback (e.g., adjusting the appearance of the first item) in accordance with a current hover proximity parameter of the input object during the move or scroll operation enhances the operability of the device and makes the user-device interface more efficient (e.g., by helping the user to achieve an intended result by providing the required inputs and reducing user mistakes when operating/interacting with the device) which, additionally, reduces power usage and improves battery life of the device (e.g., by enabling the user to use the device more quickly and efficiently).

In some embodiments, the device detects (1824) a third input by the input object that corresponds to a start of a second operation to relocate the first item on the display (e.g., after the first user interface operation has either been confirmed or canceled). In some embodiments, the first input and the third input are of the same type, e.g., a touch and hold input, or a light press input. In some embodiments, the first input and the third input are of distinct types, e.g., the first input is a touch-and-hold input, and the third input is a press input, or vice versa. After detecting the third input that corresponds to the start of the second operation to relocate the first item on the display, the device detects second lateral movement of the input object while the input object maintains contact with the touch-sensitive surface (e.g., the input object drags across the touch-sensitive surface after the first item has been selected by the second input for the second operation to relocate the first item). In response to detecting the second lateral movement of the input object while the input object maintains contact with the touch-sensitive surface, the device moves the first item from a third location (e.g., an original location of the first item, or a location slightly offset from the original location of the first item) (e.g., the third location is the same as the first location) to a fourth location (e.g., a location that is distinct from the third location)(e.g., the fourth location is the same as the second location) on the display in accordance with the second lateral movement of the input object (e.g., the contact drags the first item across the touch-sensitive surface). Upon moving the first item from the third location to the fourth location, the device detects that the input object is no longer in contact with the touch-sensitive surface (e.g., the input object is lifted away from the touch-sensitive surface, and optionally out of the hover proximity range above the touch-sensitive surface). In response to detecting that the input object is no longer in contact with the touch-sensitive surface: in accordance with a determination that the fourth location corresponds to a permitted drop-off location for the first item on the display, the device displays the first item at a final location on the display that corresponds to the fourth location (e.g., the final location is the fourth location or a snap location nearest the fourth location); and in accordance with a determination that the fourth location corresponds to a forbidden drop-off location for the first item on the display, the device restores the first item to an original location of the first item on the display that corresponds to the third location. For example, in a normal drag by contact, the item is dropped off at the final location of the drag gesture as long as the final location is an acceptable drop-off location. Upon lift-off, the item remains at that location; the operation to relocate the first item is completed upon lift-off. This is illustrated in FIGS. 8K-8O, where icon 806 is dragged by a contact and dropped off at a new location, for example. If the user were to cancel the relocation of the first item, the user has to drag the first item manually back to its original location. Allowing a move or scroll operation to be carried out by both a move input during hover and a move input while maintaining contact provides more flexibility to the user in carrying out a desired task. In addition, this flexibility allows a user to select the more appropriate gesture to carry out a move operation (e.g., it is more efficient to drag while maintaining contact if the user is certain of the move operation, and it is more efficient to drag while hovering if the user is likely to cancel the move operation after seeing a preview of the movement operation). Thus, providing multiple alternative ways to carry out a move or scroll operation as described herein enhances the operability of the device and makes the user-device interface more efficient (e.g., by helping the user to achieve an intended result by providing the required inputs, reducing the number of steps needed to perform a desired task, and reducing user mistakes when operating/interacting with the device) which, additionally, reduces power usage and improves battery life of the device (e.g., by enabling the user to use the device more quickly and efficiently).

In some embodiments, the user interface includes (1826) an arrangement of items (e.g., a list of items or a grid of application launch icons) that includes at least the first item and a second item in a first configuration (e.g., in a first sequential order or a first layout). The operation to relocate the first item on the display includes an operation to rearrange the arrangement of items (e.g., reordering the list of items or rearranging the grid of application icons). The start of the first user interface operation includes selection of the first item. Detecting the input by the input object that corresponds to a start of the first user interface operation includes detecting a contact by the input object with the touch-sensitive surface at a location that corresponds to the first item in the arrangement of items, and detecting that the contact is maintained at the location for more than a first threshold amount of time (e.g., detecting a tap-hold input directed to the first item to select the first item). Alternatively, detecting the input by the input object that corresponds to a start of the first user interface operation includes detecting a contact by the input object with the touch-sensitive surface at a location that corresponds to the first item in the arrangement of items, and detecting that a characteristic intensity of the contact increases above a first threshold intensity (e.g., detecting a light press input directed to the first item to select the first item). In response to detecting the input by the input object that corresponds to the start of the first user interface operation (e.g., in response to detecting the input to select the first item), the device visually indicates selection of the first item (e.g., showing that the first item moves away from its original z-position toward the input object (e.g., the first item "jumps out of" its original location or slot in the user interface towards the input object)). Detecting lateral movement of the input object includes detecting lateral movement of the input object by more than a first threshold distance. In some embodiments, the first threshold distance is a threshold distance for determining whether the input object is kept substantially stationary or has moved. In some embodiments, the first threshold distance is a threshold distance for determining whether the first item is to be pulled away from its original location (e.g., pulled out of its original slot or snap location) or remains at its original location) after the first item is selected. Updating the user interface to indicate a preview of the first user interface operation further includes moving at least the second item (and other items in the list or grid) in the user interface in accordance with movement of the first item from the first location to the second location. For example, in some embodiments, when the first item is near the location of the second item in the user interface, the second item moves away from its original location in the user interface to provide an acceptable drop-off location for the first item in the user interface. In some embodiments, after the first item has moved out of its original location in the user interface, the second item moves away from its own original location in the user interface into the original location of the first item to fill the location that has been vacated by the first item). Providing the preview of an rearrangement or reordering operation in response to a hover-move input enhances the operability of the device (e.g., by allowing the user to have a better view of the user interface during the input and thereby reducing user mistakes when operating the device) and improves the longevity of the device (e.g., by eliminating unnecessary pressure and friction on the touch-sensitive surface during the input, and thereby reducing structural fatigue of the touch-sensitive surface).

In some embodiments, cancelling the first user interface operation in accordance with a determination that the input object no longer meets the hover proximity criteria because the input object has exited a hover proximity range of the touch-sensitive surface further includes (1828): restoring the first item and the second item (and any other items in the list or grid) to respective original locations of the first item and the second item (and any other items in the list or grid) in the user interface (which has been kept stationary on the display) after detecting that the input object no longer meets the hover proximity criteria. (e.g., the list of items is displayed in the first order after the input object has exited the hover proximity range of the touch-sensitive surface; the grid of application items is displayed in the first configuration after the input object has exited the hover proximity range of the touch-sensitive surface (e.g., as shown in FIG. 8J)). In some embodiments, tactile outputs are generated by the device to indicate that the first item and the second item (and other items) are restored to their original locations after the input object is lifted out of the hover proximity range above the touch-sensitive surface (e.g., the rearrangement that was displayed as part of the preview of the first user interface operation is reversed when the first user interface operation is cancelled). Providing a preview of a rearrangement or reordering operation in accordance with a hover-move input and determining whether to cancel the rearrangement or reordering operation depending on how the hove-move ends (e.g., by touching down on the touch-sensitive surface or moving away from the touch-sensitive surface) enhance the operability of the device and make the user-device interface more efficient (e.g., by reducing the number of steps needed to cancel the rearrangement or reordering operation).

In some embodiments, confirming the first user interface operation in accordance with a determination that the input object no longer meets the hover proximity criteria because the input object has made contact with the touch-sensitive surface includes (1830): displaying the first item and the second item (and any other items in the list or grid) in the user interface in a second configuration that is distinct from the first configuration (e.g., the list of items remains displayed in the second order that is distinct from the first order after lift-off of the input object from the touch-sensitive surface is detected, and after the input object is lifted out of the hover proximity range above the touch-sensitive surface; the grid of application items remains displayed in the second configuration that is distinct from the first configuration after lift-off of the input object from the touch-sensitive surface is detected, and after the input object is lifted out of the hover proximity range above the touch-sensitive surface), e.g., as shown in FIG. 8H. Providing a preview of a rearrangement or reordering operation in accordance with a hover-move input and determining whether to confirm the rearrangement or reordering operation depending on how the hover-move input ends (e.g., by touching down on the touch-sensitive surface or moving away from the touch-sensitive surface) enhance the operability of the device and make the user-device interface more efficient (e.g., by reducing the number of steps needed to confirm the rearrangement or reordering operation).

In some embodiments, the operation to relocate the first item on the display includes (1832) an operation to scroll the user interface as a whole, and updating the user interface to indicate a preview of the first user interface operation includes scrolling the user interface in the display in accordance with the lateral movement of the input object (e.g., the whole user interface (including all of its content) moves in unison in accordance with the lateral hover movement of the input object). In some embodiments, the start of the first user interface operation includes trigging of the scroll mode. In some embodiments, detecting the input by the input object that corresponds to a start of the first user interface operation includes detecting a contact by the input object with the touch-sensitive surface at a location that corresponds to the user interface, and detecting that the contact is maintained at the location for more than a first threshold amount of time (e.g., detecting a tap-hold input directed to the user interface to trigger the scroll mode). In some embodiments, detecting the input by the input object that corresponds to a start of the first user interface operation includes detecting a contact by the input object with the touch-sensitive surface at a location that corresponds to user interface, and detecting that a characteristic intensity of the contact increases above a first threshold intensity (e.g., detecting a light press input directed to the user interface to trigger the scroll mode). In some embodiments, detecting the input by the input object that corresponds to a start of the first user interface operation includes detecting an in-air gesture by the input object (e.g., an in-air wiggle gesture) at a hover location directly above the first item or the user interface. In some embodiments, canceling the operation includes restoring the user interface to a state before the scroll mode is triggered. In some embodiments, confirming the operation includes, after the input object is lifted out of the hover proximity range above the touch-sensitive surface, maintaining the user interface in a state that the user interface has after the user interface has been scrolled in accordance with the lateral hover movement of the input object. Providing a preview of a scroll operation in accordance with a hover-move input and determining whether to confirm the scroll operation depending on how the hover-move input ends (e.g., by touching down on the touch-sensitive surface or moving away from the touch-sensitive surface) enhance the operability of the device and make the user-device interface more efficient (e.g., by reducing the number of steps needed to confirm the scroll operation).

In some embodiments, the first user interface operation includes (1834) an operation to resize a selection object (e.g., a text selection box, or an object selection box), which includes an operation to relocate a first boundary of the selection object on the display (while maintaining a location of a second boundary of the selection object on the display). Updating the user interface to indicate a preview of the user interface operation includes adjusting selectable content that is included in the selection object by moving a first boundary of the selection object within selectable content (e.g., selectable text) from the first location to the second location in accordance with the lateral movement of the input object (e.g., moving an edge of a selection box, or moving a lollipop or selection handle on or near an edge of a selection box, from a first location to a second location in the user interface to adjust the content selection). This is illustrated in FIGS. 8P-8V, for example. In some embodiments, if a new selection is initiated by the input, the selection is started from the original location of a text selection cursor at the start of the lateral movement, and the selection is expanded from the original location of the text selection cursor in accordance with the lateral movement of the input object. In some embodiments, if an existing selection is re-engaged by the input (e.g., one of the edges of the existing selection is selected by the input object), the lateral movement of the input object expands or contracts the current selection in accordance with the lateral hover movement of the input object. Providing a preview of a resize operation on a selected object in accordance with a hover-move input and determining whether to confirm the resize operation depending on how the hover-move input ends (e.g., by touching down on the touch-sensitive surface or moving away from the touch-sensitive surface) enhance the operability of the device and make the user-device interface more efficient (e.g., by reducing the number of steps needed to confirm the resize operation).

In some embodiments, cancelling the first user interface operation in accordance with a determination that the input object no longer meets the hover proximity criteria because the input object has exited a hover proximity range of the touch-sensitive surface includes (1836) ceasing to display the selection object or restoring the first boundary of the selection object to the first location (e.g., restoring the selection cursor to the original location of the selection cursor within the selectable content, or restoring the first boundary of the selection object to the original location of the first boundary of the selection object within the selectable content) after detecting that the input object no longer meets the hover proximity criteria. This is illustrated in FIG. 8U-8V, where selection handle 838 is restored to its original location, for example. Providing a preview of a resize operation on a selection object in accordance with a hover-move input and determining whether to cancel the resize operation depending on how the hover-move input ends (e.g., by touching down on the touch-sensitive surface or moving away from the touch-sensitive surface) enhance the operability of the device and make the user-device interface more efficient (e.g., by reducing the number of steps needed to cancel the resize operation).

In some embodiments, confirming the first user interface operation in accordance with a determination that the input object no longer meets the hover proximity criteria because the input object has made contact with the touch-sensitive surface includes (1838) maintaining display of the selection object with the first boundary of the selection object at the second location that is distinct from the first location after detecting that the input object no longer meets the hover proximity criteria (e.g., maintaining the location of the first boundary even after the input object is lifted off of the touch-sensitive surface and lifted out of the hover proximity range above the touch-sensitive surface). This is illustrated in FIG. 8T, for example. In some embodiments, in response to detecting that the input object no longer meets the hover proximity criteria, the device displays options for interacting with selected content corresponding to the selection object (e.g., cut, copy, paste, format as bold, format with underline, format with italics). Providing a preview of a resize operation on a selection object in accordance with a hover-move input and determining whether to confirm the resize operation depending on how the hover-move input ends (e.g., by touching down on the touch-sensitive surface or moving away from the touch-sensitive surface) enhance the operability of the device and make the user-device interface more efficient (e.g., by reducing the number of steps needed to confirm the resize operation on the selection object).

In some embodiments, while the input object meets hover proximity criteria, the device detects (1840) that the input object meets first criteria (e.g., guidance provision criteria or alert generation criteria), wherein the first criteria (e.g., the guidance provision criteria or alert generation criteria) include a requirement that the input object is within a respective threshold range (e.g., distance) of a boundary of the hover proximity range in order for the first criteria to be met (e.g., the first criteria are met when the input object is within a first threshold distance away from the upper boundary of the hover proximity range (e.g., when the input object is about to exit the hover proximity range of the touch-sensitive surface) or when the input object is within a second threshold distance away from the touch-sensitive surface (e.g., when the input object is about to make contact with the touch-sensitive surface)). In response to detecting that the first criteria (e.g., the guidance provision criteria or alert generation criteria) are met the input object, the device provides feedback (e.g., visual, audio, and/or haptic feedback) to indicate that the input object is within a respective threshold range (e.g., distance) of a boundary of the hover proximity range. Providing visual feedback to indicate that the input object is about to exit the hover proximity range (e.g., to indicate that the hover input is about to end due to lift-off) enhances the operability of the device and makes the user-device interface more efficient (e.g., by alerting the user of likely changes in the state of the device and thereby helping the user to achieve an intended result by providing the required inputs and reducing user mistakes when operating/interacting with the device) which, additionally, reduces power usage and improves battery life of the device by enabling the user to use the device more quickly and efficiently.

In some embodiments, providing feedback to indicate that the input object is within a respective threshold range of a boundary of the hover proximity range includes (1842): in accordance with a determination that the input object meets the first criteria (e.g., guidance provision criteria) because the input object is within a first threshold distance of an upper boundary of the hover proximity range of the touch-sensitive surface, providing a preview of cancellation of the first user interface operation (e.g., when the first user interface operation is a move operation for moving a first item in a user interface, visually highlighting the original location of the first item in the user interface if the input object were to exit the hover proximity range now). In some embodiments, the preview of the cancellation ceases to be displayed when the input object moves away from the boundary of the hover proximity range and continue to hover across the touch-sensitive surface. Providing feedback to indicate that the input object is within a respective threshold range of a boundary of the hover proximity range further includes: in accordance with a determination that the input object meets the first criteria (e.g., the guidance provision criteria) because the input object is within a second threshold distance of the touch-sensitive surface, providing a preview of confirmation of the first user interface operation (e.g., when the first user interface operation is a move operation for moving a first item in a user interface, visually highlighting a final location of the first item in the user interface if the input object were to make contact with the touch-sensitive surface now). In some embodiments, the preview of the confirmation ceases to be displayed when the input object moves away from the touch-sensitive surface and continues to hover across the touch-sensitive surface. Providing different visual feedback to indicate whether the operation is about to be canceled or confirmed (e.g., depending on whether the hover input is about to end due to lift-off or touch-down of the input object) enhances the operability of the device and makes the user-device interface more efficient (e.g., by alerting the user of likely changes in the state of the device and thereby helping the user to achieve an intended result by providing the required inputs and reducing user mistakes when operating/interacting with the device) which, additionally, reduces power usage and improves battery life of the device by enabling the user to use the device more quickly and efficiently.

In some embodiments, providing feedback to indicate that the input object is within a respective threshold range of a boundary of the hover proximity range includes (1844): providing an alert to a user to indicate that the input object will cease to meet the hover proximity criteria if movement of the input object were to continue in a current direction toward or away from the touch-sensitive surface (e.g., when the first user interface operation is a move operation for moving a first item in a user interface, visually highlighting the first item in the user interface by enlarging the first item, and/or visually highlighting a drop-off location for the first item (e.g., the drop-location is the original location of the first item if the input object exits hover proximity range be moving away from the touch-sensitive surface, and the drop-off location is the new final location of the first item if the input object exits hover proximity range by making contact with the touch-sensitive surface), and/or providing a tactile or audio output to indicate that the input object will cease to meet the hover proximity criteria if movement of the input object were to continue in a current direction toward or away from the touch-sensitive surface). Providing visual feedback to indicate that the input object is about to exit the hover proximity range (e.g., to indicate that the hover input is about to end due to lift-off or touch-down of the input object) enhances the operability of the device and makes the user-device interface more efficient (e.g., by alerting the user of likely changes in the state of the device and thereby helping the user to achieve an intended result by providing the required inputs and reducing user mistakes when operating/interacting with the device) which, additionally, reduces power usage and improves battery life of the device by enabling the user to use the device more quickly and efficiently.

In some embodiments, providing the alert to the user includes (1846): in accordance with a determination that the input object meets the first criteria (e.g., alert generation criteria) because the input object is within a first threshold distance of an upper boundary of the hover proximity range of the touch-sensitive surface, changing an appearance of the first item (e.g., when the first user interface operation is a move operation for moving a first item in a user interface, visually highlighting the first item in the user interface). In some embodiments, the alert ceases to be displayed when the input object moves away from the boundary of the hover proximity range and continue to hover across the touch-sensitive surface, or after the input object continues to move toward the boundary of the hover proximity range and then exits the hover proximity range. Providing the alert to the user includes further includes: in accordance with a determination that the input object meets the first criteria (e.g., the alert generation criteria) because the input object is within a second threshold distance of the touch-sensitive surface, highlighting a drop-off location for the first item in the user interface (e.g., when the first user interface operation is a move operation for moving a first item in a user interface, visually highlighting a final location of the first item in the user interface if the input object were to make contact with the touch-sensitive surface now). In some embodiments, the highlighting of the drop-off location for the first item ceases to be displayed when the input object moves away from the touch-sensitive surface and continues to hover across the touch-sensitive surface, or when the input object makes contact with the touch-sensitive surface. Providing different visual feedback (e.g., changing the appearance of the first item versus highlighting a drop-off location for the first item) depending on whether the hover input is about to end due to lift-off or touch-down of the input object enhances the operability of the device and makes the user-device interface more efficient (e.g., by alerting the user of likely changes in the state of the device and thereby helping the user to achieve an intended result by providing the required inputs and reducing user mistakes when operating/interacting with the device) which, additionally, reduces power usage and improves battery life of the device by enabling the user to use the device more quickly and efficiently.

It should be understood that the particular order in which the operations in FIGS. 18A-18G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1900, 2000, 2100, 2200, 2300, and 2400) are also applicable in an analogous manner to method 1800 described above with respect to FIGS. 18A-18G. For example, the contacts, gestures, input objects, user interface objects, tactile outputs, audio outputs, intensity thresholds, position indicators, focus selectors, and animations described above with reference to method 1800 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1900, 2000, 2100, 2200, 2300, and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18G are, optionally, implemented by components depicted in FIGS. 1A-1B. For example, detection operations 1804 and 1810, updating operation 1806, and canceling operation and confirming operation 1812 and are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 19A-19E are flow diagrams illustrating a method 1900 of interacting with a user interface object through proximity-based and contact-based inputs in accordance with some embodiments. The method 1900 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 1900 are, optionally, combined and/or the order of some operations is, optionally, changed.

Method 1900 relates to a heuristic for determining whether to maintain or cancel currently displayed visual feedback. Specifically, after the device detects a predefined interaction with a first user interface object by an input object, the device displays corresponding visual feedback (e.g., display of a second user interface object) in association with the first user interface object. The device determines whether to maintain or cancel the visual feedback (e.g., display of the second user interface object) depending on whether the input object continues to hover over the touch-sensitive surface. In accordance with the method described herein, the device maintains display of a transient user interface object (e.g., the second user interface object) in accordance with whether the input object continues to meet hover proximity criteria. In other words, the transient user interface object that is displayed in response to the user interaction is neither a "sticky" object that needs to be subsequently dismissed by a separate input, nor a conventional "non-sticky" object that ceases to be displayed immediately upon lift-off the contact that triggered the display of the transient user interface object. Instead, the transient user interface object remains displayed without any contact being maintained with the touch-sensitive surface (e.g., after lift-off of the contact), and is dismissed when the input object ceases to hover over the touch-sensitive surface (e.g., when the input object is lifted away or makes contact with the touch-sensitive surface). As a result, the device is able to provide information and/or functionality (e.g., as embodied in the transient user interface object) to the user for as long as needed (e.g., as determined by the duration of the user input), and for only as long as necessary (e.g., only until the user terminates the hover input). Providing such improved feedback and reducing the number of steps to maintain or cancel currently displayed visual feedback in accordance with the method described herein enhance the operability of the device and make the user-device interface more efficient (e.g., by helping the user to achieve an intended result by providing the required inputs and reducing user mistakes when operating/interacting with the device) which, additionally, reduce power usage and improve battery life of the device (e.g., by enabling the user to use the device more quickly and efficiently).

Device displays (1902) a first user interface object (e.g., application launch icon, list item, etc.) at a first location on the display. The device detects (1904) a predefined interaction (e.g., a tap, a press, a touch and hold, a hover interaction, etc.) with the first user interface object by the input object. In response to detecting the predefined interaction with the first user interface object by the input object, the device displays a second user interface object that is associated with the first user interface object (e.g., the second user interface object is a preview, a tool-tip, a pop-up, an unread notification, a control (e.g., a radial menu or dial), or a quick action menu associated with the first user interface object (e.g., an application launch icon, an item in a list, etc.)). In some embodiments, the second user interface object is concurrently displayed with the first user interface object. In some embodiments, the second user interface object is overlaid on the first user interface object and may partially obscure the first user interface object. In some embodiments, when the second user interface object is displayed, portions of the user interface that are not occupied by the first and second user interface objects are deemphasized, e.g., blurred and/or darkened. While displaying the second user interface object, the device detects (1908) a change in a hover proximity parameter of the input object (e.g., a hover distance of the input object above the touch-sensitive surface or other equivalent or analogous measure of the hover distance, such as capacitance, shadow characteristics, etc.). In response to detecting the change in the hover proximity parameter of the input object: in accordance with a determination that the input object meets continue-to-display criteria, wherein the continue-to-display criteria require that the input object continues to meet hover proximity criteria (e.g., the hover proximity criteria require that a hover proximity parameter (e.g., a parameter based on hover distance) associated with the input object is less than a threshold proximity value (e.g., a threshold hover distance) in order for the hover proximity criteria to be met) in order for continue-to-display criteria to be met, the device maintains (1910) display of the second user interface object; and in accordance with a determination that the input object meets cease-to-display criteria, wherein the cease-to-display criteria require that the input object no longer meets the hover proximity criteria (e.g., because the input object has exited the hover proximity range above the touch-sensitive surface) in order for the cease-to-display criteria to be met, the device ceases to display the second user interface object (e.g., while maintaining display of the first user interface object). This is illustrated in FIGS. 9E, 9F, 9I, 9N, and 9O, where mini application object 912 and quick action menu 914 remain displayed when finger 734 remains the hover proximity range above the touch-screen, and cease to be displayed when finger 734 is lifted out of the hover proximity range above the touch-screen, for example.

In some embodiments, in response to detecting the change in the hover proximity parameter of the input object: in accordance with a determination that the input object meets activate-function criteria, wherein the activate-function criteria require that the input object makes contact with the touch-sensitive surface in order for the activate-function criteria to be met, the device activates (1912) a function associated with the second user interface object (e.g., displaying full content associated with the preview, expanding the tool-tip to show a help page related to the tool tip, opening a webpage associated with the pop-up, display a communication corresponding to the unread notification, highlighting a current value or adjusting a current value of the control (e.g., a radial menu or dial), or selecting a menu option in the quick action menu associated with the first user interface object (e.g., an application icon, an item in a list, etc.))). This is illustrated in FIGS. 12M-12N and 12Q-12R, for example, where a menu option in quick action menu 1230 is activated by contact 1234. In some embodiments, in accordance with a determination that the second user interface object is no longer displayed, and that the input object has made the contact with the touch-sensitive surface after it had exited the hover proximity range first, launch the application that corresponds to the first user interface object (if the first user interface object is an application icon) or open the first user interface object to display/playback content of the first user interface object (e.g., if the first user interface object is an item such as an email item, or a weather item, a media item, etc.). In some embodiments, the activate-function criteria further requires that a characteristic intensity of the contact by the input object exceeds a first intensity threshold in order for the activate-function criteria to be met. In some embodiments, the activate-function criteria further requires that the contact by the input object be maintained for more than a threshold amount of time with less than a threshold amount of movement in order for the activate-function criteria to be met. Maintaining display of a second user interface object while hover proximity criteria are met and activating a function associated with the second user interface object when the input object ceases to meet the hover proximity criteria by making contact with the touch-sensitive surface enhance the operability of the device and make the user-device interface more efficient (e.g., by reducing the number of steps needed to activate a function associated with the second user interface object after lift-off of the contact is already detected) which, additionally, reduce power usage and improve battery life of the device by enabling the user to use the device more quickly and efficiently.

In some embodiments, maintaining display of the second user interface object in accordance with a determination that the input object meets the continue-to-display criteria includes (1914) dynamically changing an appearance of the second user interface object (e.g., dynamically adjusting a size, hue, opacity, and/or other visual property of the second user interface object) in accordance with a characteristic value of the hover proximity parameter of the input object (e.g., as the input object moves away from the touch-sensitive surface, the second user interface object increases in size and increases in opacity, and as the input object moves toward the touch-sensitive surface, the second user interface object decreases in size and decreases in opacity). This is illustrated in FIGS. 9F, 9I, and 9J, for example. Dynamically adjusting the visual feedback (e.g., adjusting the appearance of the second user interface object) in accordance with a current hover proximity parameter of the input object enhances the operability of the device and makes the user-device interface more efficient (e.g., by helping the user to achieve an intended result by providing the required inputs and reducing user mistakes when operating/interacting with the device) which, additionally, reduces power usage and improves battery life of the device (e.g., by enabling the user to use the device more quickly and efficiently).

In some embodiments, detecting the predefined interaction with the first user interface object includes (1916) detecting a first change in the hover proximity parameter of the input object in a first direction (e.g., monotonically increasing or decreasing within the hover proximity range before touch-down of the input object), and displaying the second user interface object includes: displaying a precursor image of the second user interface object; and dynamically changing an appearance of the precursor image of the second user interface object in a first manner in accordance with the first change in the hover proximity parameter of the input object. For example, as the input object is first detected within the hover proximity range above the touch-sensitive surface over the first user interface object, a precursor image of the second user interface object is displayed (e.g., a preview platter emerges from behind the first user interface object); and as the input object moves closer to the touch-sensitive surface, the precursor image grows in size in accordance with the decreasing hover proximity parameter of the input object (e.g., more of the preview platter is revealed from behind the first user interface object as the input object moves closer to the touch-sensitive surface). This is illustrated in FIGS. 9A-9B and FIGS. 12B-12C, for example. Displaying a preview of the second user interface object (e.g., precursor image) and dynamically adjusting the appearance of the preview in accordance with the changing proximity parameter of the input object during a hovering-in process of the input object enhance the operability of the device and make the user-device interface more efficient (e.g., by providing an indication of the internal state of the device and helping the user to achieve an intended result by providing the required inputs and reduce user mistakes when operating/interacting with the device) which, additionally, reduce power usage and improve battery life of the device (e.g., by enabling the user to use the device more quickly and efficiently).

In some embodiments, dynamically changing the appearance of the second user interface object in accordance with the characteristic value of the hover proximity parameter of the input object includes (1918): in accordance with detection of a second change in the hover proximity parameter of the input object in the first direction that is identical to the first change (e.g., monotonically increasing or decreasing within the hover proximity range after the touch-down of the input object), dynamically changing the appearance of the second user interface object in a second manner in accordance with the second change in the hover proximity parameter of the input object, wherein the second manner is different from the first manner. For example, when the input object moves towards the touch-sensitive surface and enters the hover proximity range initially, the preview of the second user interface object is a shadow image of the second user interface object that gradually expands from behind the first user interface object (and becomes brighter, and more saturated) as the input object continues to move closer to the touch-sensitive surface, and eventually pops out to become the second user interface object when the input object makes contact with and presses against the touch-sensitive surface. When the input object then moves away from the touch-sensitive surface, the second user interface object is maintained on the display and becomes grows in size and becomes more transparent; and if the input object approaches the touch-sensitive surface again, the second user interface object shrinks in size and becomes more opaque. In other words, the user interface behaves differently to the same changes in hover proximity parameter of the input object before and after the input object makes contact with the touch-sensitive surface. This is illustrated in FIG. 9J, for example. Displaying different dynamic visual feedback (e.g., changing the appearance of a preview of the second user interface object during hovering in and changing the appearance of the second user interface object during hover out) in accordance with the changing proximity parameter of the input object for the hovering-in and hovering out processes enhance the operability of the device and make the user-device interface more efficient (e.g., by providing an indication of the internal state of the device and helping the user to achieve an intended result by providing the required inputs and reduce user mistakes when operating/interacting with the device) which, additionally, reduce power usage and improve battery life of the device (e.g., by enabling the user to use the device more quickly and efficiently).

In some embodiments, the continue-to-display criteria require (1920) that a first characteristic rate of change in the hover proximity parameter of the input object (e.g., the rate of change immediately after lift-off of the input object from the touch-sensitive surface) after the second user interface object is displayed is less than a first threshold rate (and/or the input object is maintained in a hover range for less than a first threshold amount of time after detecting the predefined interaction) in order for the continue-to-display criteria to be met. For example, if the first rate of change is fast (e.g., the input object is quickly lifted away from the touch-sensitive surface), the device does not maintain display of the second user interface object even during the brief moment that the input object is still within the hover proximity range above the touch-sensitive surface. If the first rate of change is slow (e.g., the input object is gradually lifted away from the touch-sensitive surface), the second user interface object is continually displayed while the input object is hovering within the hover proximity range of the touch-sensitive surface. In other words, a quick lift-off of the input object causes the device to skip the transient display of the second user interface object after lift-off of the contact by the input object, and a slow, more deliberate lift-off of the input object causes the device to provide the transient display of the second user interface object after lift-off of the contact by the input object. This is illustrated in FIGS. 9K-9M, for example. Skipping display of the transient user interface object (e.g., the second user interface object) when the input object is quickly lifted away from the user interface object enhances the operability of the device and makes the user-device interface more efficient (e.g., by avoiding unnecessary visual feedback and reducing user confusion, and by helping the user to achieve an intended result by providing the required inputs and reducing user mistakes when operating/interacting with the device) which, additionally, reduces power usage and improves battery life of the device (e.g., by enabling the user to use the device more quickly and efficiently).

In some embodiments, the cease-to-display criteria require (1922) that a second characteristic rate of change in the hover proximity parameter of the input object (e.g., the rate of change when approaching the upper boundary of the hover proximity range above the touch-sensitive surface) after the second user interface object is displayed is greater than a second threshold rate (e.g., in some embodiments, the second threshold rate is the same as the first threshold rate. In some embodiments, the second threshold rate is different from the first threshold rate) (and/or the input object is maintained in a hover range for more than a second threshold amount of time after detecting the predefined interaction that is optionally different from or the same as the first threshold amount of time) in order for the cease-to-display criteria to be met. For example, if the second rate of change is fast (e.g., the input object is quickly lifted out of the hover proximity range, the device immediately ceases to display the second user interface object when the input object exits the hover proximity range above the touch-sensitive surface. If the second rate of change is slow (e.g., the input object is gradually lifted out of the hover proximity range), the second user interface object is continually displayed for a brief moment after the input object is outside of the hover proximity range above the touch-sensitive surface, before the device completely ceases to display the second user interface object. In other words, a quick lift-off of the input object causes the device to quickly remove the second user interface object from the display after the input object exits the hover proximity range, and a slow, more deliberate lift-off of the input object causes the device to provide a lingering, transient display of the second user interface after the input object has exited the hover proximity range. This is illustrated in FIGS. 9N-9O, for example. In some embodiments, an animation showing the second user interface object being pulled away from the z-plane the user interface and then bouncing back toward the z-plane of the user interface is displayed after the input object has exited the hover proximity range. Allowing the transient user interface object to linger after the input object has been lifted out of the hover proximity range above the touch-sensitive surface if the input object is lifted slowly out of the hover proximity range enhances the operability of the device and makes the user-device interface more efficient (e.g., by allowing the user more time to review and consider the second user interface object, helping the user to achieve an intended result by providing the required inputs, and reducing user mistakes when operating/interacting with the device).

In some embodiments, while the input object meets the continue-to-display criteria and while maintaining display of the second user interface: the device detects (1924) a third change in the hover proximity parameter of the input object from a first value to a second value (e.g., when the input object moves away from the touch-sensitive surface while still remaining within the hover proximity range). In response to detecting the first change in the hover proximity parameter, the device applies a first visual change to an appearance of the second user interface object (e.g., changing (e.g., discretely or, alternatively, dynamically) the transparency or opacity of the second user interface object from a first transparency value to a second transparency or opacity value, or changing (e.g., discretely or, alternatively, dynamically) the color saturation of the second user interface object from a first saturation value to a second saturation value). After applying the first visual change to the appearance of the second user interface object, the device detects a second change in the hover proximity parameter of the input object from the second value to the first value (e.g., when the input object moves toward the touch-sensitive surface while still remaining within the hover proximity range). In response to detecting the second change in the hover proximity parameter of the input object, the device reverses the first visual change to the appearance of the second user interface object. For example, when the input object moves toward the touch-sensitive surface again without first exiting the hover proximity range, the changes made to the appearance of the second user interface object is reverted. In some embodiments, the second user interface is completely restored when the input object makes contact with the touch-sensitive surface for a second time since the initial display of the second user interface object. Allowing the transient user interface object (e.g., the second user interface object) to linger after the input object has been lifted out of the hover proximity range above the touch-sensitive surface if the input object is lifted slowly out of the hover proximity range enhances the operability of the device and makes the user-device interface more efficient (e.g., by allowing the user more time to review and consider the second user interface object, helping the user to achieve an intended result by providing the required inputs, and reducing user mistakes when operating/interacting with the device).

In some embodiments, detecting the predefined interaction with the first user interface object by the input object includes (1926): detecting a first input by a first contact (made by the input object with the touch-sensitive surface) at a location on the touch-sensitive surface that corresponds to the first user interface object on the display, and detecting that the first input meets object-display criteria, wherein the object-display criteria require that a characteristic intensity of the first contact exceeds a first intensity threshold (e.g., a light press intensity threshold) in order for the object-display criteria to be met. This is illustrated in FIGS. 9C-9E, for example. Requiring a press input to trigger display of the transient user interface object (e.g., the second user interface object) enhances the operability of the device and makes the user-device interface more efficient (e.g., by avoiding accidental display of the second user interface object, helping the user to achieve an intended result by providing the required inputs, and reducing user mistakes when operating/interacting with the device).

In some embodiments, the first user interface object corresponds (1928) to an application (e.g., the first user interface object is an application launch icon that is displayed on a home screen, and a tap input detected on the application launch icon launches the application), the second user interface object includes a menu of options (e.g., mini application object 912 or quick action menu 914 in FIG. 9E) that are configured to cause performance a subset of functions of the application (e.g., the second user interface object is a quick action menu associated with an application that is displayed when a user press on an application icon corresponding to the application). Requiring a press input to trigger display of a quick action menu enhances the operability of the device and makes the user-device interface more efficient (e.g., by avoiding accidental display of the quick action menu and reducing user mistakes when operating/interacting with the device). Additionally, displaying a quick action menu as a transient user interface object that can be maintained or dismissed depending on whether the input object continues to hover over the touch-sensitive surface or is lifted out of the hover proximity range enhances the operability of the device and makes the user-device interface more efficient (e.g., by reducing the number of inputs needed to perform an operation (e.g., to activate a menu function or dismiss the menu)) which, additionally, reduces power usage and improves battery life of the device by enabling the user to use the device more quickly and efficiently.

In some embodiments, the first user interface object corresponds (1930) to a content item (e.g., the first user interface object is a list item (e.g., song, weather, news, email, message, conversation, contact, etc.) in a list (e.g., playlist, weather list, news list, email list, message list, conversation list, contact list, etc.)), and the second user interface object is a preview of the content item (e.g., the preview shows an abridged or reduced scale version of the content item). In some embodiments, a tap input detected on the first user interface object opens the content item without showing the preview of the content item. Requiring a press input to trigger display of a preview of a content item enhances the operability of the device and makes the user-device interface more efficient (e.g., by avoiding accidental display of the preview and reducing user mistakes when operating/interacting with the device). Additionally, displaying a preview of a content item as a transient user interface object that can be maintained or dismissed depending on whether the input object continues to hover over the touch-sensitive surface or is lifted out of the hover proximity range enhances the operability of the device and makes the user-device interface more efficient (e.g., by reducing the number of inputs needed to perform an operation (e.g., to display the preview or dismiss the preview)) which, additionally, reduces power usage and improves battery life of the device by enabling the user to use the device more quickly and efficiently.

In some embodiments, while the preview of the content item is displayed, the device detects (1932) a second input by the input object, including detecting a second contact (e.g., the second contact is the same as the first contact that is continuously maintained on the touch-sensitive surface, or a separate contact from the first contact) by the input object at a location on the touch-sensitive surface that corresponds to the preview. In response to detecting the second input by the input object: in accordance with a determination that the second input meets item-open criteria, wherein the item-open criteria required that a characteristic intensity of the second contact exceeds a second intensity threshold (e.g., the second intensity threshold is the same as the first intensity threshold, or is another intensity threshold that is different from the first intensity threshold) in order for the item-open criteria to be met (e.g., another light press input or a deep press input is required for the item-open criteria to be met), the device ceases to display the preview and opening the content item. In some embodiments, when the preview is no longer displayed, the transient preview is not displayed when the input object is lifted off the touch-sensitive surface and hovers over the touch-sensitive surface within the hover proximity range; instead, the fully opened content item remains displayed on the display. In some embodiments, a swipe on the preview causes display of options associated with the preview. For example, in response to detecting the second input by the input object: in accordance with a determination that the second input meets option-display criteria, wherein the option-display criteria require that a movement of the second contact (e.g., in a predetermined direction) exceeds a threshold distance across the touch-sensitive surface in order for the option-display criteria to be met (e.g., a swipe input is required for the option-display criteria to be met), the device displays one or more options associated with the content item while maintaining display of the preview (e.g., one or more options, such as save, share, copy, delete, etc. are displayed with the preview once the preview is swiped upward or sideways). Requiring a deep press input to fully open a content item enhances the operability of the device and makes the user-device interface more efficient (e.g., by avoiding accidental open the content item and reducing user mistakes when operating/interacting with the device). Additionally, allowing the user to press harder on the preview to open the content item or to hover above the preview to maintain display of the preview enhances the operability of the device and makes the user-device interface more efficient (e.g., by reducing the number of inputs needed to perform an operation (e.g., to open the item or maintaining the preview), and providing additional functionality without cluttering the user interface with additional displayed controls) which, additionally, reduces power usage and improves battery life of the device by enabling the user to use the device more quickly and efficiently.

In some embodiments, before detecting the first contact by the input object with the touch-sensitive surface, the device detects (1934) that the input object meets intensity-reaction-hint criteria, wherein the intensity-reaction-hint criteria require that the input object is within a hover proximity range of the touch-sensitive surface, and that the first user interface object is an intensity-reactive object (e.g., the device provides different object-specific reactions when the first user interface object is activated by a contact with a first intensity versus a contact with a second intensity that is different from the first intensity, in other words, the first user interface object has differentiated object-specific responses to intensity-based inputs (e.g., touch inputs with different intensities)). In response to detecting that the input object meets the intensity-reaction-hint criteria, the device displays a first visual effect to indicate that the first user interface object is intensity-reactive. For example, in some embodiments, the device displays a shadow platter behind the first user interface object that expands or contracts in accordance with the current hover proximity parameter of the input object. In some embodiments, the device further dims the portions of the user interface surrounding the first user interface object when the device determines that the intensity-reaction-hint criteria are met by the input object. In some embodiments, the device visually highlights or enlarges the first user interface object to indicate that the first user interface object is intensity-reactive. In contrast, for a user interface object that is not intensity-reactive, when the input object is hovering within a hover proximity range of the touch-sensitive surface above the user interface object on the display, the intensity-reaction-hint criteria will not be met, and the device forgoes displaying any of the above visual effects. In some embodiments, the first user interface object is an application icon and the intensity-based response for a press input is displaying a quick-action menu, in contrast to launching an application in response to a tap input. In some embodiments, the intensity-reaction-hint criteria are met when the input object is detected within the hover proximity range above other types of user interface objects that have other types of intensity-based responses. For example, in some embodiments, the first user interface object is a list item that corresponds to a content item, and the intensity-based response is to display a preview of the content item when a user presses on the list item, in contrast to opening the list item in response to a tap input. In some embodiments, in addition to providing visual feedback to indicate whether a user interface object is intensity reactive in response to detecting the input object within hover proximity range of the object, the device also optionally provides haptic and/or feedback to further enhance or facilitate the visual feedback. Additional details are described with respect to FIGS. 12A-12R and method 2200. Providing visual feedback to indicate whether an object has differentiated, object-specific responses to intensity-based inputs (e.g., a light press input versus a deep press input) when an input object hovers over the object enhances the operability of the device and makes the user-device interface more efficient (e.g., by alerting the user of the nature and behavior of the object, avoiding accidentally triggering an intensity-based response by making contact with the touch-sensitive surface, helping the user to achieve an intended result by providing the required inputs, and reducing user mistakes when operating/interacting with the device) which, additionally, reduces power usage and improves battery life of the device by enabling the user to use the device more quickly and efficiently.

In some embodiments, the first user interface object corresponds (1936) to an application (e.g., the first user interface object is an application launch icon that is displayed on a home screen), and the second user interface object is an unread notification or a preview of a communication for the application. Detecting the predefined interaction includes: detecting that the input object meets notification-display criteria, wherein the notification-display criteria require that the input object is within a hover proximity range of the touch-sensitive surface, and that the application has at least one unread notification or unread communication available for user review (e.g., the application icon has an indicator specifying the number of unread notifications or communications that are available for user's review, and/or a notification has been presented once and has been stored in the notification center waiting for the user to process (e.g., discard, save, view, etc.)) in order for the notification-display criteria to be met; and in response to detecting that the input object meets the notification-display criteria, displaying the unread notification or the preview of the communication without launching the application. For example, in some embodiments, the notification banner is displayed again over the user interface or near the first user interface object. In some embodiments, the notification continues to be displayed until the user lifts the input object out of the hover proximity range. This is illustrated in FIGS. 11A-11G, for example. Triggering display of an unread notification or communication that correspond to an application when an input object is detected to hover over an application launch icon of the application and maintaining display of the unread notification or communication for an amount of time that is determined by how long the input object remains hovering over the touch-sensitive surface enhance operability of the device and make the user-device interface more efficient (e.g., by dynamically adapting the duration of information presentation to user's input, and reducing the number of steps needed to display useful information and to dismiss the display of the information) which, additionally, reduce power usage and improve battery life of the device by enabling the user to use the device more quickly and efficiently.

In some embodiments, the first user interface object is (1938) a control object (e.g., the first user interface object is an application launch icon that is displayed on a home screen or a control that is displayed in a user interface) and the second user interface object is an information object (e.g., a tool-tip pop-up) that includes information related to a function of the control object. Detecting the predefined interaction includes: detecting that the input object meets information-display criteria, wherein the information-display criteria require that the input object is within a hover proximity range of the touch-sensitive surface, and that an information object corresponding to the first user interface object is available for user review (e.g., the control has a tool tip) in order for the information-display criteria to be met; and in response to detecting that the input object meets the information-display criteria, displaying the information object that corresponds to the first user interface object. For example, in some embodiments, the tool tip is displayed near the first user interface object. In some embodiments, the tool-tip continues to be displayed until the user lifts the input object out of the hover proximity range. Triggering display of an information object (e.g., a tool tip) that correspond to a user interface control when an input object is detected to hover over the user interface control and maintaining display of the information object for an amount of time that is determined by how long the input object remains hovering over the touch-sensitive surface enhance operability of the device and make the user-device interface more efficient (e.g., by dynamically adapting the duration of information presentation to user's input, and reducing the number of steps needed to display useful information and to dismiss the display of the information) which, additionally, reduce power usage and improve battery life of the device by enabling the user to use the device more quickly and efficiently.

It should be understood that the particular order in which the operations in FIGS. 19A-19E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1800, 2000, 2100, 2200, 2300, and 2400) are also applicable in an analogous manner to method 1900 described above with respect to FIGS. 19A-19E. For example, the contacts, gestures, input objects, user interface objects, tactile outputs, audio outputs, intensity thresholds, position indicators, focus selectors, and animations described above with reference to method 1900 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1800, 2000, 2100, 2200, 2300, and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 19A-19E are, optionally, implemented by components depicted in FIGS. 1A-1B. For example, detection operations 1904 and 1908, and maintaining operation and ceasing operation 1910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 20A-20I are flow diagrams illustrating a method 2000 of interacting with a user interface object through proximity-based and contact-based inputs in accordance with some embodiments. The method 2000 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 2000 are, optionally, combined and/or the order of some operations is, optionally, changed.

Method 2000 relates to providing multiple levels of distinct and non-continuous visual feedback in response to variations in a hover-proximity parameter (e.g., hover distance) of an input object while the input object hovers over the touch-sensitive surface. Specifically, the device recognizes at least two hover-proximity ranges, one of which being a sub-range of the other. When the input object initially moves toward the touch-sensitive surface, the input object first enters a level-1 hover-proximity range while remaining outside of a level-2 hover proximity range; and as the input object continues to move closer to the touch-sensitive surface, the input object then enters the level-2 hover proximity range while remaining within the level-1 hover proximity range. Crossing the boundaries into the level-1 hover proximity range and the level-2 hover proximity range triggers two distinct responses that are discrete from each other in form and are related to each other in function and/or content. Segmenting the hover range above the touch-sensitive surface into multiple sub-ranges and using different sub-ranges for triggering different visual feedback that correspond to respective functions (including changing a state of the device in different respective manners and/or providing information of different respective types) allow the device to provide more differentiated and fine-tuned feedback to the user and allow the user to adjust his/her inputs after the inputs have been started to achieve desired results. Providing such improved feedback enhances the operability of the device and makes the user-device interface more efficient (e.g., by helping the user to achieve an intended result by providing the required inputs and reducing user mistakes when operating/interacting with the device) which, additionally, reduces power usage and improves battery life of the device (e.g., by enabling the user to use the device more quickly and efficiently).

The device displays (2002) a first user interface on the display. While displaying the first user interface on the display (e.g., a media player user interface in a full screen mode, or a window of an application on a background user interface (e.g., a desktop)), the device detects (2004) that first hover proximity criteria are met by the input object, wherein the first hover proximity criteria require that a current value of a hover proximity parameter of the input object is within a first value range in order for the first hover proximity criteria to be met (e.g., input object is less than 0.8 cm above the touch-sensitive surface without touching the touch-sensitive surface). In response to detecting that the first hover proximity criteria are met by the input object, the device displays (2006) first visual feedback (e.g., displaying a first user interface object (e.g., a playback control panel that was not previously displayed) concurrently with the first user interface (e.g., overlaid on the first user interface)) that is associated with the first hover proximity criteria. While displaying the first visual feedback that is associated with the first hover proximity criteria (e.g., while displaying the first user interface object (e.g., the playback control panel)), the device detects (2008) a change in the current value of the hover proximity parameter of the input object and that second hover proximity criteria are met by the input object after the change, wherein the second hover proximity criteria require that the current value of the hover proximity parameter of the input object is within a second value range that is within the first value range in order for the second hover proximity criteria to be met (e.g., the input object is less than 0.5 cm above the touch-sensitive surface without touching the touch-sensitive surface) (in other words, the second hover proximity criteria are more difficult to meet than the first hover proximity criteria, and when the second hover proximity criteria are met, the first hover proximity criteria are also met, but not vice versa). In response to detecting that the second hover proximity criteria are met by the input object, the device displays second visual feedback, distinct and non-continuous from the first visual feedback, that is associated with the second hover proximity range (e.g., altering an appearance of a respective sub-element of the two or more sub-elements in the first user interface object (e.g., highlighting the playback button in the playback control panel that is directly under the fingertip), or augmenting the first visual feedback by adding additional elements or abruptly/discretely altering one or more visual characteristics of the first visual feedback upon detecting that the second hover proximity criteria are met by the input object). This is illustrated in FIGS. 10A-10E, where tool bar 1006 is displayed when first hover proximity criteria are met, and control affordance 1008 is highlighted when second hover proximity criteria are met, for example. This is also illustrated in FIGS. 10F-10M, where control panel 1023 is displayed when first hover proximity criteria are met, and playback controls 1024 and 1026 are highlighted respectively when second hover proximity criteria are met (and finger 734 is near each of playback controls 1024 and 1026), for example. This is also illustrated in FIGS. 10O-10P, where respective counts of unread notifications for one or more applications in a folder are displayed (e.g., in notification list 1048) when first hover proximity criteria are met, and notification content for the unread notifications are displayed (e.g., in expanded notification list 1050) when second hover proximity criteria are met, for example. This is also illustrated in FIGS. 10T-10Y, where cursor 1074 is displayed when first hover proximity criteria are met, and selection handles 1084 and 1086 are displayed when second hover proximity criteria are met, for example. In some embodiments, the first visual feedback ceases to be displayed when the second hover proximity criteria are met. In some embodiments, the first visual feedback continues to be displayed when the second hover proximity criteria are met and the second visual feedback is displayed. In some embodiments, one or more additional hover proximity criteria are used to trigger additional device/user interface behaviors. For example, the different embodiments described herein may be combined to have a three-level proximity user interface, four-level proximity user interface, and so on. In some embodiments, for a particular level of hover proximity criteria, the effect of meeting the proximity criteria at a first level in one embodiment may take place concurrently with the effect of meeting proximity criteria at the same level or a different level in another embodiment described herein.

In some embodiments, while displaying the second visual feedback, the device detects (2012) that action-trigger criteria are met by the input object, wherein the action-trigger criteria require that the input object makes contact with the touch-sensitive surface in order for the action-trigger criteria to be met. In some embodiments, the action-trigger criteria further require lift-off of the input object from the touch-sensitive surface in order for the action-trigger criteria to be met, such as a tap input. In response to detecting that the action-trigger criteria are met by the input object, the device initiates performance of an action that corresponds to the second user interface object (and ceasing to display the first visual feedback and the second visual feedback, if either or both are still displayed). This is illustrated in FIGS. 10D-10E, where a tap input activates control affordance 1008, for example. This is also illustrated in FIGS. 10K-10L, where a tap input toggles playback control 1026, for example. This is also illustrated in FIGS. 10R-10S, wherein a tap input launches an instant messaging application to a user interface that corresponds to an unread notification that is tapped on, for example. The triggering of the action by contact after the second visual feedback is displayed in response to the second hover proximity criteria being met enhances the operability of the device and makes the user-device interface more efficient (e.g., by providing additional information or functionality and allowing the user to act upon the information or functionality with a natural progression of the current input gesture (e.g., continuing to move closer to the touch-sensitive surface), and by helping the user to achieve an intended result by providing the required inputs and reducing user mistakes when operating/interacting with the device).

In some embodiments, in response to detecting that the second hover proximity criteria are met by the input object, the device ceases (2014) to display the first visual feedback when displaying the second visual feedback. While displaying the second visual feedback, the device detects that the second hover proximity criteria are no longer met and that the first hover proximity criteria are still met. In response to detecting that the second hover proximity criteria are no longer met and that the first hover proximity criteria are still met: the device ceases to display the second visual feedback that is associated with the second hover proximity criteria; and the device redisplays the first visual feedback that is associated with the first hover proximity criteria (or displaying a modified (e.g., reversed) version of the first visual feedback in accordance with the changes of the hover proximity parameter of the input object after the input object has moved out of the second hover proximity range but is still within the first hover proximity range). Ceasing to display the first visual feedback when the second hover proximity criteria are met (e.g., during a hover-in process by the input object) helps to reduce visual clutter and avoid user confusion when providing inputs, and redisplaying the first visual feedback when the second hover proximity criteria are no longer met and the first hover proximity criteria are still met (e.g., during the hover-out process by the input object) helps to reduce the number of steps to redisplay previously displayed information, both of which enhance the operability of the device and make the user-device interface more efficient (e.g., by reducing the number of steps needed to perform a task, helping the user to achieve an intended result by providing the required inputs, and reducing user mistakes when operating/interacting with the device).

In some embodiments, in response to detecting that the second hover proximity criteria are met by the input object, the device maintains (2016) display of the first visual feedback while displaying the second visual feedback. While displaying the first visual feedback and the second visual feedback, the device detects that the second hover proximity criteria are no longer met and that the first hover proximity criteria are still met. In response to detecting that the second hover proximity criteria are no longer met and that the first hover proximity criteria are still met: the device ceases to display the second visual feedback that is associated with the second hover proximity criteria; and the device continues to maintain display of the first visual feedback that is associated with the first hover proximity criteria. This is illustrated in FIGS. 10F-10I and 10L, for example. Maintaining display of the first visual feedback when the second hover proximity criteria are met (e.g., during a hover-in process by the input object) helps to provide context for subsequent inputs and the second visual feedback, and ceasing to display the second visual feedback when the second hover proximity criteria are no longer met (e.g., during the hover-out process by the input object) helps to reduce visual clutter and avoid user confusion, both of which enhance the operability of the device and make the user-device interface more efficient (e.g., by helping the user to achieve an intended result by providing the required inputs, and reducing user mistakes when operating/interacting with the device) which, additionally, reduce power usage and improve battery life of the device by enabling the user to use the device more quickly and efficiently.

In some embodiments, displaying the second visual feedback that is associated with the second hover proximity range includes (2018) applying a first visual change to a first portion of the first user interface while the input object is detected at a first hover location above the touch-sensitive surface (e.g., based on the first portion of the first user interface being closer to the first hover location of the input object than other portions of the first user interface). While the first visual change is applied to the first portion of the first user interface, the device detects a first movement (e.g., including a lateral movement) of the input object from a first hover location to a second hover location while the input object continues to meet the second hover proximity criteria (or, in some embodiments, the first hover proximity criteria). In response to detecting the first movement of the input object while the input object continues to meet the second hover proximity criteria (or, in some embodiments, the first hover proximity criteria): the device, optionally, ceases to apply the first visual change to the first portion of the first user interface, and the device applies a second visual change to a second portion of the first user interface that is distinct from the first portion while the input object is detected at the second hover location above the touch-sensitive surface (e.g., based on the second portion of the first user interface being closer to the second hover location of the input object than other portions of the first user interface). This is illustrated in FIGS. 10I-10J, where different control affordances 1024 and 1026 are highlighted when finger 734 moves laterally near each of the two control affordances while continuing to meet the second hover proximity criteria. Allowing the user to interact with (e.g., causing visual changes that indicate the changes in the internal state of the device) different portions of the user interface during movement of the input object while the input object continues to meet the second hover proximity criteria and providing visual feedback indicating which portion of the user interface is activated or will be activated upon contact enhance the operability of the device and make the user-device interface more efficient (e.g., by helping the user to achieve an intended result by providing the required inputs and reduce user mistakes when operating/interacting with the device) which, additionally, reduce power usage and improve battery life of the device (e.g., by enabling the user to use the device more quickly and efficiently).

In some embodiments, displaying the first visual feedback that is associated with the first hover proximity criteria includes (2020): shifting first content that is displayed on the display laterally across the display (e.g., shifting content within the first user interface or shifting the entire first user interface from a first portion of display to a second portion of the display) (and, optionally, displaying a third user interface object (e.g., a pull-tab for a control panel) at a third location on the display that is previously occupied by the first content before the shifting of the first content). Displaying the second visual feedback that is associated with the second hover proximity criteria includes, while the first content remains shifted, displaying a user interface object (e.g., the control panel) (e.g., overlaid on the first user interface) at a location on the display that is previously occupied by the first content. This is illustrated in FIGS. 10A-10C, where web content shifts up to make room for control bar 1006, for example. In some embodiments, the user interface object is displayed as soon as the first content is shifted, without requiring the input object to hover closer. In some embodiments, the user interface object is a tab or indicator that is pulled by a contact to bring in a control panel that is overlaid on the first content. In some embodiments, the first content includes activatable control(s) or link(s) below the hover location of the input object, and upon the input object meeting the first hover proximity criteria, the first content is shifted such that no activatable control or links are below the hover location of the input object. In some embodiments, a pull tab is displayed below the hover location of the input object that was previously occupied by the activatable control(s) or link(s) of the first content, and a user can swipe or tap on the pull tab to bring up a control panel over the first content. In some embodiments, the control panel is displayed in response to the input object meeting the second hover proximity criteria (e.g., hover closer to the touch-sensitive surface). In some embodiments, when the input object meets the first hover proximity criteria while at a first hover location, the device magnifies or highlights a portion of the user interface with activatable control(s) or link(s) that is below the input object. In some embodiments, the user can tap on or hover closer to a particular activatable control or link in the magnified portion to activate it. Shifting content out of the way upon detecting the input object hovering at a first hover distance and displaying a user interface object at the original location of the content when the input object hovers closer to the touch-sensitive surface enhance the operability of the device and make the user-device interface more efficient (e.g., by providing a more responsive user interface, helping the user to achieve an intended result by providing the required inputs, and reduce user mistakes when operating/interacting with the device) which, additionally, reduce power usage and improve battery life of the device (e.g., by enabling the user to use the device more quickly and efficiently).

In some embodiments, displaying the first visual feedback that is associated with the first hover proximity criteria includes (2022): applying a first change to an appearance of a first user interface object that is already displayed on the display (e.g., highlighting a full-screen user interface that includes multiple sub-elements, or highlighting or enlarging a container object that includes multiple sub-elements (e.g., a window, a toolbar, a dock, a list, a menu, a block of content comprising sub-blocks of content) and that is already displayed in the user interface), wherein the first user interface object includes a second user interface object (e.g., a first item, object, control, or sub-block of content) and a third user interface object (e.g., a second item, object, control, or sub-block of content). Displaying the second visual feedback that is associated with the second hover proximity criteria includes: applying a second change to an appearance of the second user interface object (e.g., highlighting or enlarging some of sub-elements of the first user interface object that are displayed near the hover location of the input object) relative to an appearance of the third user interface object within the first user interface object. Although the appearances of the second and third objects may have been affected as a result of the first change that is applied to the first user interface object as a whole when the input object met the first hover proximity criteria, the first change to the appearance of the first user interface object does not single out the second object relative to the third object. When the second hover proximity criteria are met by the input object, the second change in appearance is selectively applied to the second user interface object and not to the third user interface object or other user interface objects in the first user interface objects based on the hover location of the input object relative to the locations of the second and third user interface objects (e.g., when the hover location is closer to the second user interface object than the third user interface object, the second change in appearance is applied to the second user interface object, instead of the third user interface object). As a more specific example, in some embodiments, the first user interface object includes a tool bar, and hovering over the tool bar at a first hover distance causes the device to magnify the tool bar along with the controls within the tool bar, and while the tool bar remains magnified, hovering over the tool bar at a second, closer hover distance causes the device to highlight and/or magnify a first control within the tool bar that is closest to the input object, while leaving the other controls unchanged. In another example, the first user interface includes several paragraph of text, and hovering over the first user interface at a first hover distance causes the device to select a first paragraph within the user interface that is the closest to the hover location of the input object, and when the input object hovers over the user interface at a second, closer hover distance, the device ceases to select the first paragraph, and instead, selects a sentence within the first paragraph that is closest to the current hover location of the input object. In some embodiments, when the input object meets the second hover proximity criteria, the device deemphasizes other portions of the first user interface object (e.g., blur or darken) relative to the second user interface object that is closest to the hover location of the input object (and optionally keeping the second user interface object unchanged). Highlighting a user interface object upon detecting the input object hovering at a first hover distance and highlighting a sub-element of the user interface object when the input object hovers closer to the touch-sensitive surface enhance the operability of the device and make the user-device interface more efficient (e.g., by providing a more responsive user interface, gradually guiding the user's attention toward a small portion of the user interface, allowing the user to adjust the input based on the visual feedback at the different levels, and reduce user mistakes when operating/interacting with the device) which, additionally, reduce power usage and improve battery life of the device (e.g., by enabling the user to use the device more quickly and efficiently).

The first change to the appearance of the first user interface object is maintained (2024) when the second change to the appearance of the second user interface object is applied. This is illustrated in FIGS. 10B-10C and 10H-10I, for example. In some embodiments, when the input object hovers over a tool bar at a first threshold hover distance, the tool bar is magnified, and when the input object hovers closer over the tool bar at a second threshold hover distance, a control in the tool bar that is closest to the input object is highlighted while the tool bar remains magnified. When the input object is lifted away from the touch-sensitive surface, the highlight of the control is canceled first, while the magnification of the tool bar is maintained until the input object is more than the first threshold hover distance away from the touch-sensitive surface. In some embodiments, when the input object moves laterally over the touch-sensitive surface from a location above the second user interface object to a location above the third user interface object (while continuing to meet the second hover proximity threshold), the highlight on the second user interface object is canceled and the highlight is applied to the third user interface object, while the tool bar continues to be magnified. Maintaining the visual feedback previously shown when the input object hovers closer to the touch-sensitive surface enhances the operability of the device and makes the user-device interface more efficient (e.g., by gradually guiding the user's attention toward a small portion of the user interface while maintaining context for the new changes, helping the user to achieve an intended result by providing the required inputs, and reducing user mistakes when operating/interacting with the device) which, additionally, reduces power usage and improves battery life of the device (e.g., by enabling the user to use the device more quickly and efficiently).

In some embodiments, the first change to the appearance of the first user interface object is canceled (2026) when the second change to the appearance of the second user interface object is applied. This is illustrated in FIG. 10O-10P (notification list 1048 is replaced by expanded notification list 1050) and FIGS. 10V-10W (cursor 1074 is replaced by two selection handles 1084 and 1086), for example. In some embodiments, when the input object hovers over a paragraph of text at a first threshold hover distance, the paragraph of text is selected, and when the input object hovers closer over the text at a second threshold hover distance, the selection of the paragraph is canceled, and a sentence within the paragraph becomes selected. In some embodiments, when the input object is lifted away from the touch-sensitive surface, the selection of the sentence is canceled. In some embodiments, the selection of the paragraph is restored. In some embodiments, the selection of the paragraph is not restored. In some embodiments, when the input object moves laterally over the touch-sensitive surface from a location above a first sentence to a location above a second sentence (while continuing to meet the second hover proximity threshold), the selection of the first sentence is canceled and the second sentence is selected. Canceling the visual feedback previously shown when the input object hovers closer to the touch-sensitive surface enhances the operability of the device and makes the user-device interface more efficient (e.g., by reducing visual clutter and avoiding user confusion, helping the user to achieve an intended result by providing the required inputs, and reducing user mistakes when operating/interacting with the device) which, additionally, reduces power usage and improves battery life of the device (e.g., by enabling the user to use the device more quickly and efficiently).

In some embodiments, displaying the first visual feedback that is associated with the first hover proximity criteria includes (2028): applying a first change to an appearance of a first user interface object that is already displayed on the display (e.g., highlighting or enlarging a user interface element (e.g., an application icon, a list, a menu, etc.) that is already displayed in the user interface). Displaying the second visual feedback that is associated with the second hover proximity criteria includes displaying a second user interface object that is associated with the first user interface object and that was not displayed with the first user interface object prior to the second hover proximity criteria being met by the input object (e.g., the second user interface object is a new object that is displayed in response to the second hover proximity criteria being met by the input object). As a more specific example, in some embodiments, the first user interface object includes an application icon of a corresponding application, and hovering over the application icon at a first hover distance causes the device to select/highlight the application icon, and while the application icon remains selected/highlighted, hover over the application icon at a second, closer hover distance causes the device to display a tool-tip related to the application, an unread notification for the application, a quick action menu for the application, etc. In some embodiments, tapping on the second user interface object while it is displayed causes an operation of the application to be performed (e.g., tool-tip turns into a help page, application launches to a user interface corresponding to the communication that triggered the notification, an action in the menu is performed, etc.). In some embodiments, the action is performed without launching the application. In another example, the first user interface object includes an item in a list (e.g., an email item in an inbox, or a message in a listing of messages, or a contact in a listing of contacts, or a conversation in a listing of conversations), and hovering over the list item at a first hover distance causes the device to select/highlight the item, and while the item remains selected/highlighted, hover over the application icon at a second, closer hover distance causes the device to display a preview of the item (e.g., a pop-up platter with content corresponding to the item). In some embodiments, tapping on the second user interface object while it is displayed causes the application to be launched to a user interface corresponding to the content of the preview. In another example, the first user interface object includes a link to additional content (e.g., a webpage), and hovering over the link at a first hover distance causes the device to select/highlight the link, and hovering over the link at a second, closer hover distance causes the device to display a preview of the additional content (e.g., a pop-up platter with additional content corresponding to the link). In some embodiments, tapping on the second user interface object while it is displayed causes the content corresponding to the link to be fully displayed. Highlighting a user interface object upon detecting the input object hovering at a first hover distance and creating a new user interface object that is associated with the highlighted user interface object when the input object hovers closer to the touch-sensitive surface enhance the operability of the device and make the user-device interface more efficient (e.g., by providing a more responsive user interface, gradually guiding the user's attention toward a new user interface object in the user interface, providing more functions as needed without unnecessarily cluttering the user interface, and reduce user mistakes when operating/interacting with the device) which, additionally, reduce power usage and improve battery life of the device (e.g., by enabling the user to use the device more quickly and efficiently).

In some embodiments, while displaying the second user interface object, the device detects (2030) that the second hover proximity criteria are no longer met: in accordance with a determination that the second hover proximity criteria are no longer met because the input object has made contact with the touch-sensitive surface, the device performs an operation (e.g., opening a webpage, display full content of a communication, launch an application, etc.) corresponding to the second user interface object (and ceasing to display the second user interface object); and in accordance with a determination that the second hover proximity criteria are no longer met and the first hover proximity criteria are still met, the device ceases to display the second user interface object (without performing an operation corresponding to the second user interface object). This is illustrated in FIG. 10F-10M, for example. After the new user interface object (e.g., the second user interface object) is displayed in response to the level-two hover proximity criteria being met, the new user interface object is either activated to perform an operation or ceases to be displayed depending on whether the input object moves closer and makes contact with the touch-sensitive surface or moves away and exits the level-two hover proximity range. The two outcomes are both easily achievable by a natural progression of the current input. Therefore, the heuristic for determining whether to perform an operation or ceases to display the new user interface object as described herein enhances the operability of the device and makes the user-device interface more efficient (e.g., by reducing the number of steps needed to perform a task, and providing additional functional control options without cluttering the user interface with additional displayed control).

in response to detecting that the second hover proximity criteria are met by the input object, the device cancels (2032) the first change that has been applied to the appearance of the first user interface object (e.g., ceasing to highlight or enlarge the first user interface object (e.g., the application icon, the list item, the link, etc.) that is already displayed in the user interface. In response to detecting that the second hover proximity criteria are no longer met and the first hover proximity criteria are still met (e.g., after canceling the first change that has been applied to the appearance of the first user interface object), the device reapplies the first change to the appearance of the first user interface object that has been canceled. In some embodiments, in response to detecting that both the first hover proximity criteria and the second hover proximity criteria are no longer met because the input object has exited the hover proximity range above the touch-sensitive surface, the device cancels the first change that has been reapplied to the appearance of the first user interface object. Ceasing to display the first visual feedback when the second hover proximity criteria are met (e.g., during a hover-in process by the input object) helps to reduce visual clutter and avoid user confusion when providing inputs, and redisplaying the first visual feedback when the second hover proximity criteria are no longer met and the first hover proximity criteria are still met (e.g., during the hover-out process by the input object) helps to reduce the number of steps to redisplay previously displayed information, both of which enhance the operability of the device and make the user-device interface more efficient (e.g., by reducing the number of steps needed to perform a task, helping the user to achieve an intended result by providing the required inputs, and reducing user mistakes when operating/interacting with the device).

In some embodiments, displaying the first visual feedback that is associated with the first hover proximity criteria includes (2034): displaying a first user interface object that was not displayed prior to the first hover proximity criteria being met by the input object (e.g., when the input object hovers over an application icon at a first threshold hover distance above the touch-sensitive surface, a quick action menu associated with the application icon pops up from next to the application icon). Displaying the second visual feedback that is associated with the second hover proximity criteria includes: while maintaining display of the first user interface object, displaying a second user interface object that is associated with the first user interface object and that was not displayed with the first user interface object prior to the second hover proximity criteria being met by the input object (e.g., the second user interface object is another new object that is displayed in response to the second hover proximity criteria being met by the input object). In some embodiments, the second user interface object is displayed while the input object maintains its lateral position (no lateral movement) since the first user interface object is displayed. In some embodiments, hovering over an application icon at a first hover distance causes the device to display a pop-up menu associated with the application icon, and while the pop-up menu is displayed, hovering over the application icon (or the pop-up menu) at a second, closer hover distance causes the device to display a sub-menu of the pop-up menu. In some embodiments, tapping on the sub-menu, or an item in the sub-menu while it is displayed causes the device to perform an operation of the application that corresponds to the sub-menu or menu item. In some embodiments, the action is performed without launching the application. In some embodiments, after the sub-menu is displayed, when the input object moves away (with less than a threshold amount of lateral movement or no lateral movement) from the touch-sensitive surface back to the first threshold hover distance above the touch-sensitive surface, the device ceases to display the sub-menu, while continuing to display the menu. The device ceases to display the menu when the input object exits the first hover proximity range above the touch-sensitive surface. Displaying a first new user interface object upon detecting the input object hovering at a first hover distance and creating a second new user interface object that is associated with the first new object when the input object hovers closer to the touch-sensitive surface enhance the operability of the device and make the user-device interface more efficient (e.g., by providing a more responsive user interface, gradually guiding the user's attention toward a new user interface object in the user interface, providing more functions as needed without unnecessarily cluttering the user interface, and reduce user mistakes when operating/interacting with the device) which, additionally, reduce power usage and improve battery life of the device (e.g., by enabling the user to use the device more quickly and efficiently).

In some embodiments, while displaying the second user interface object, detecting that the second hover proximity criteria are no longer met: in accordance with a determination that the second hover proximity criteria are no longer met because the input object has made contact with the touch-sensitive surface, the device performs an operation corresponding to the second user interface object (e.g., activate an option in the sub-menu) (and ceasing to display the second user interface object); and in accordance with a determination that the second hover proximity criteria are no longer met and the first hover proximity criteria are still met, the device ceases to display the second user interface object (without performing an operation corresponding to the second user interface object, and while maintaining display of the first user interface object). After the second new user interface object is displayed in response to the level-two hover proximity criteria being met, the second new user interface object is either activated to perform an operation or ceases to be displayed depending on whether the input object moves closer and makes contact with the touch-sensitive surface or moves away and exits the level-two hover proximity range. The two outcomes are both easily achievable by a natural progression of the current input. Therefore, the heuristic for determining whether to perform an operation or cease to display the second new user interface object as described herein enhances the operability of the device and makes the user-device interface more efficient (e.g., by reducing the number of steps needed to perform a task, and providing additional functional control options without cluttering the user interface with additional displayed controls).

In some embodiments, after detecting that the second hover proximity criteria are no longer met, the device detects that the first hover proximity criteria are no longer met. In response to detecting that the first hover proximity criteria are no longer met because the input object has exited the first hover proximity range above the touch-sensitive surface, the device ceases to display the first user interface object. Ceasing to display a currently displayed new object when the input object is lifted out of the first-level hover proximity range enhances the operability of the device and makes the user-device interface more efficient (e.g., by reducing visual clutter and avoid user confusion, helping the user to achieve an intended result by providing the required inputs and reducing mistakes when operating/interacting with the device) which, additionally, reduces power usage and improves battery life of the device by enabling the user to use the device more quickly and efficiently.

In some embodiments, displaying the first visual feedback that is associated with the first hover proximity criteria includes (2040): displaying a first user interface object that was not displayed prior to the first hover proximity criteria being met by the input object, wherein the first user interface object includes a plurality of sub-elements, including a second user interface object and a third user interface object (e.g., when the input object hovers over a media player window or full screen media playing window at a first threshold hover distance above the touch-sensitive surface, a control panel associated with media player application is displayed over the media player window). In some embodiments, the first user interface object is displayed at a location that corresponds to (e.g., directly below, or projected from) the hover location of the input object at the time when the input object met the first hover proximity criteria. Displaying the second visual feedback that is associated with the second hover proximity criteria includes: while maintaining display of the first user interface object, applying a change to an appearance of the second user interface object relative to an appearance of the third user interface object. For example, in some embodiments, the second user interface object is a pause button, and the third user interface object is a fast forward button. When the input object hovers closer to the touch-sensitive surface at a second threshold hover distance, and the input object is closer to the pause button than the fast forward button, the pause button is highlighted relative to the fast forward button (and other buttons in the control panel). In some embodiments, if the input object moves laterally and becomes closer to fast forward button than the pause button, the fast forward button is highlighted, and the pause button is no longer highlighted. In some embodiments, when the input object moves vertically and makes contact with the touch-sensitive surface, the highlighted control (e.g., the fast forward button) is activated and the media playing is fast forwarded. In some embodiments, when the input object hovers closer to the touch-sensitive surface at a second threshold hover distance, and the input object is closer to the pause button than the fast forward button, the pause button is unchanged, while the fast forward button and other controls in the control panel are deemphasized (e.g., darkened or blurred) relative to the pause button. This is illustrated in FIGS. 10F-10M, for example. Displaying a new user interface object upon detecting the input object hovering at a first hover distance and highlighting a sub-element within the new object when the input object hovers closer to the touch-sensitive surface enhance the operability of the device and make the user-device interface more efficient (e.g., by providing a more responsive user interface, gradually guiding the user's attention toward a portion of a new user interface object, providing more functions as needed without unnecessarily cluttering the user interface, and reduce user mistakes when operating/interacting with the device) which, additionally, reduce power usage and improve battery life of the device (e.g., by enabling the user to use the device more quickly and efficiently).

In some embodiments, while the first user interface object is displayed, the device detects (2042) a second movement (e.g., including a lateral movement) of the input object from a third hover location to a fourth hover location while the input object continues to meet the first hover proximity criteria. In response to detecting the second movement of the input object while the input object continues to meet the first hover proximity criteria, the device moves the first user interface object from a first location on the display that corresponds to the third hover location of the input object to a second location on the display that is distinct from the first location on the display and that corresponds to the fourth hover location of the input object. For example, in some embodiments, the playback control panel is displayed at a location that corresponds to the hover location of the input object at the time when the input object met the first hover proximity criteria, and the playback control panel moves with the input object as the input object moves from a third hover location to a fourth hover location while remaining within the first hover proximity range above the touch-sensitive surface. This is illustrated in FIGS. 10G-10H, for example. After a new user interface object is displayed upon detecting the input object hovering at a first hover distance, moving the new user interface object in accordance with a lateral hover movement within the first-level hover proximity range enhance the operability of the device and make the user-device interface more efficient (e.g., by allowing the user to reposition the new user interface object to a more convenient location away from existing content on the user interface, thereby helping the user to achieve an intended result by providing the required inputs and reducing user mistakes when operating/interacting with the device) which, additionally, reduce power usage and improve battery life of the device (e.g., by enabling the user to use the device more quickly and efficiently).

In some embodiments, while the change to the appearance of the second user interface object is applied, the device detects (2044) that the second hover proximity criteria are no longer met. In response to detecting that the second hover proximity criteria are no longer met: in accordance with a determination that the second hover proximity criteria are no longer met because the input object has made contact with the touch-sensitive surface, the device performs an operation corresponding to the second user interface object (e.g., activate the button that is highlighted to control playback of media) (and optionally, maintaining display of the first user interface object). In some embodiments, in addition to requiring contact with the touch-sensitive surface, the device requires that a characteristic intensity of the contact increases above a first intensity threshold (e.g., a light press intensity threshold) in order to trigger performance of the operation that corresponds to the second user interface object. In accordance with a determination that the second hover proximity criteria are no longer met and the first hover proximity criteria are still met, the device cancels the change that has been applied to the appearance of the second user interface object (without performing an operation corresponding to the second user interface object, and maintaining display of the first user interface object). For example, when the input object moves away from the touch-sensitive surface and exits the second hover proximity range, the highlighting of a particular control nearest the input object is canceled. After the new user interface object (e.g., the second user interface object) is displayed and a sub-element within the new user interface object is highlighted in response to the level-two hover proximity criteria being met, the sub-element is either activated to perform an operation or ceases to be highlighted depending on whether the input object moves closer and makes contact with the touch-sensitive surface or moves away and exits the level-two hover proximity range. The two outcomes are both easily achievable by a natural progression of the current input. Therefore, the heuristic for determining whether to perform an operation or ceases to highlight the sub-element within the new user interface object as described herein enhances the operability of the device and makes the user-device interface more efficient (e.g., by reducing the number of steps needed to perform a task, and providing additional functional control options without cluttering the user interface with additional displayed control).

In some embodiments, after detecting that the second hover proximity criteria are no longer met, the device detects (2046) that the first hover proximity criteria are no longer met. In response to detecting that the first hover proximity criteria are no longer met because the input object has exited the hover proximity range above the touch-sensitive surface, the device ceases to display the first user interface object (e.g., when the input object is lifted out of the first hover proximity range, the device ceases to display the playback control panel on the media player user interface). Ceasing to display a currently displayed new object when the input object is lifted out of the first-level hover proximity range enhances the operability of the device and makes the user-device interface more efficient (e.g., by reducing visual clutter and avoid user confusion, helping the user to achieve an intended result by providing the required inputs and reducing mistakes when operating/interacting with the device) which, additionally, reduces power usage and improves battery life of the device by enabling the user to use the device more quickly and efficiently.

In some embodiments, displaying the first user interface object that was not displayed prior to the first hover proximity criteria being met by the input object includes (2048): in accordance with a determination that the input object meets the first hover proximity criteria but not the second hover proximity criteria, changing (e.g., increasing) an opacity of the first user interface object as the input object moves closer to the touch-sensitive surface. In some embodiments, the opacity of the first user interface object is reduced when the input object moves away from the touch-sensitive surface while still meeting the first hover proximity criteria. Changing an opacity of a newly displayed object when the input object moves closer to the touch-sensitive surface enhances the operability of the device and makes the user-device interface more efficient (e.g., by providing information about the state of the input object, helping the user to achieve an intended result by providing the required inputs, and reducing mistakes when operating/interacting with the device) which, additionally, reduces power usage and improves battery life of the device by enabling the user to use the device more quickly and efficiently.

In some embodiments, displaying the first visual feedback that is associated with the first hover proximity criteria includes (2050): applying a first change to an appearance of a first user interface object that is already displayed in the first user interface. Displaying the second visual feedback that is associated with the second hover proximity criteria includes: while maintaining the first change to the appearance of the first user interface object, applying a second change to the appearance of the first user interface object that is distinct and non-continuous from the first change that has been applied to the first user interface object. For example, in some embodiments, hovering over selectable text to magnify the text (e.g., magnify a sentence that is under the finger when the finger is at a first threshold hover distance above the touch-sensitive surface), and hovering closer to select the magnified sentence (e.g., the magnified sentence is selected when the finger moves to a second threshold hover distance above the touch-sensitive surface). Upon detection of the finger moving laterally while meeting the first hover proximity criteria without meeting the second hover proximity criteria, the device displays different portions of text that are magnified with the lateral movement of the finger; and upon detection of the finger moving laterally while meeting the second hover proximity criteria, the device displays different portions of text are selected with the lateral movement of the finger. Applying two different types of visual effect to an existing user interface object depending on whether the input object is detected in the level-one hover proximity range or the level-two hover proximity range enhances the operability of the device and makes the user-device interface more efficient (e.g., by indicating to the user the different states that the device is currently in, and thereby helping the user to achieve an intended result by providing the required inputs and reducing user mistakes when operating/interacting with the device) which, additionally, reduce power usage and improve battery life of the device (e.g., by enabling the user to use the device more quickly and efficiently).

In some embodiments, while displaying the second visual feedback, the device detects (2052) that third hover proximity criteria are met by the input object, wherein the third hover proximity criteria require that the current value of the hover proximity parameter of the input object is within a third value range, and wherein the third value range is within the second value range (e.g., the input object is less than 0.3 cm away from the touch-sensitive surface without touching the touch-sensitive surface) (in other words, the third hover proximity criteria are more difficult to meet than second hover proximity criteria, and when the third hover proximity criteria are met, the first and second hover proximity criteria are also met, but not vice versa). In response to detecting that the third hover proximity criteria are met by the input object, the device displays a third visual feedback, distinct and non-continuous from the first and second visual feedback, that is associated with the third hover proximity range. Providing multiple levels of distinct and non-continuous visual feedback in response to variations in a hover-proximity parameter (e.g., hover distance) of an input object enhances the operability of the device and makes the user-device interface more efficient (e.g., by helping the user to achieve an intended result by providing the required inputs and reducing user mistakes when operating/interacting with the device) which, additionally, reduces power usage and improves battery life of the device (e.g., by enabling the user to use the device more quickly and efficiently).

In some embodiments, displaying the first visual feedback that is associated with the first hover proximity criteria includes (2054): applying a magnification to a first portion of selectable text that is displayed at a location that corresponds to a current hover location of the input object; and displaying a cursor that was not displayed before the first hover proximity criteria were met by the input object (e.g., displaying the cursor within the portion of the selectable text that has been magnified). Displaying the second visual feedback that is associated with the second hover proximity criteria includes: while the magnification is applied to the first portion of the selectable text and the cursor is displayed, changing an appearance of the cursor to indicate that text selection mode is activated (e.g., including enhancing the color and thickness of the cursor or adding a lollipop on top of the cursor, or next to the cursor). This is illustrated in FIGS. 10T-10Y, for example. In some embodiments, in addition to requiring the first hover proximity criteria to be met by the input object, the device further requires that the input object is held with less than a threshold amount of movement for a threshold amount of time within the first hover proximity range in order to apply the magnification and display the cursor. In some embodiments, in addition to requiring the first hover proximity criteria to be met by the input object, the device further requires that the input object makes contact with the touch-sensitive surface first before hovering and holding the input object within the first hover proximity range, in order to apply the magnification and display the cursor. In some embodiments, in addition to requiring the first hover proximity criteria to be met by the input object, the device further requires that the input object makes contact with the touch-sensitive surface and presses against the touch-sensitive surface with more than a threshold intensity before hovering and holding the input object within the first hover proximity range, in order to apply the magnification and display the cursor. Highlighting selectable text and displaying a cursor upon detecting the input object hovering at a first hover distance and changing the appearance of the cursor to indicate that text selection mode is activated when the input object hovers closer to the touch-sensitive surface enhance the operability of the device and make the user-device interface more efficient (e.g., by providing a more responsive user interface, providing additional functions as needed without unnecessarily cluttering the user interface with additional displayed controls, and reducing user mistakes when operating/interacting with the device) which, additionally, reduce power usage and improve battery life of the device (e.g., by enabling the user to use the device more quickly and efficiently).

In some embodiments, the device detects (2056) lateral movement of the input object. In response to detecting the lateral movement of the input object: in accordance with a determination that the second hover proximity criteria are met by the input object during the lateral movement of the input object: the device moves the cursor in accordance with the lateral movement of the input object (e.g., moving the cursor with a user interface object that represents a boundary of the selection in accordance with the lateral movement of the input object); and the device selects text in accordance with the movement of the cursor (e.g., selecting text in accordance with the movement of the cursor with the lollipop on top). In accordance with a determination that the first hover proximity criteria are met by the input object and the second hover proximity criteria are not met during the lateral movement of the input object: the device moves the cursor in accordance with the lateral movement of the input object (e.g., moving the cursor without moving the user interface object that represents the boundary of the selection in accordance with the lateral movement of the input object) without selecting text. This is illustrated in FIGS. 10T-10Y, for example. Performing different functions in response to lateral hover movement (e.g., moving the cursor or resizing text selection) depending on whether the lateral hover movement occurs within the second-level hover proximity range or outside of the second-level hover proximity range enhances the operability of the device and makes the user-device interface more efficient (e.g., by providing additional functions without cluttering the user interface with additional displayed controls, reducing the number of inputs needed to perform a desired operation, helping the user to achieve an intended result by providing the required inputs, and reducing user mistakes when operating/interacting with the device) which, additionally, reduces power usage and improves battery life of the device (e.g., by enabling the user to use the device more quickly and efficiently).

In some embodiments, in response to detecting the lateral movement of the input object: in accordance with a determination that the input object is in contact with the touch-sensitive surface during the lateral movement of the input object: the device scrolls (2058) the user interface in accordance with the lateral movement of the input object (e.g., without moving the cursor, without selecting text). Performing different functions in response to lateral movement (e.g., moving the cursor, resizing text selection, or scrolling the user interface) depending on whether the lateral movement occurs during hover or while maintaining contact with the touch-sensitive surface enhances the operability of the device and makes the user-device interface more efficient (e.g., by providing additional functions without cluttering the user interface with additional displayed controls, reducing the number of inputs needed to perform a desired operation, helping the user to achieve an intended result by providing the required inputs, and reducing user mistakes when operating/interacting with the device) which, additionally, reduces power usage and improves battery life of the device (e.g., by enabling the user to use the device more quickly and efficiently).

It should be understood that the particular order in which the operations in FIGS. 20A-20I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1800, 1900, 2100, 2200, 2300, and 2400) are also applicable in an analogous manner to method 2000 described above with respect to FIGS. 20A-20I. For example, the contacts, gestures, input objects, user interface objects, tactile outputs, audio outputs, intensity thresholds, position indicators, focus selectors, and animations described above with reference to method 2000 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1800, 1900, 2100, 2200, 2300, and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 20A-20I are, optionally, implemented by components depicted in FIGS. 1A-1B. For example, detection operations 2004 and 2008 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 21A-21D are flow diagrams illustrating a method 2100 of interacting with a user interface object through proximity-based and contact-based inputs in accordance with some embodiments. The method 2100 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 2100 are, optionally, combined and/or the order of some operations is, optionally, changed.

Method 2100 relates to conditionally performing an operation in accordance with a hover-move input by an input object when the input object has met both the usual hover proximity criteria for detecting a hover input and an additional requirement that augments the usual hover proximity criteria (e.g., a time threshold for holding the input object in place, or a closer hover proximity range, etc.) before the movement of the input object. The additional requirement that augments the usual hover proximity criteria serves as a trigger for entering a mode in which the operation is performed; and once the mode is entered, the input object no longer needs to meet the additional requirement to continue the operation or to repeat performance of the operation (e.g., with respect to another object), as long as the input object continues to meet the usual hover proximity criteria. By using an augmented requirement that can be satisfied by a single input, rather than a combination of multiple inputs (e.g., multiple concurrent or sequential inputs), as the condition for entering a particular operation mode, the device reduces the number of inputs needed to perform an operation and thereby enhancing the operability of the device and making the user-device interface more efficient. Additionally, by not requiring the input object to continue to meet the augmented requirement during the hover-move input, the device also makes it easier for the user to continue or repeat performance of the operation, thereby enhancing the operability of the user device and making the user-device interface more efficient (e.g., by reducing user mistakes when operating/interacting with the device).

The device displays (2102), in a first user interface, a plurality of user interface objects that includes at least a first user interface object. While displaying the plurality of user interface objects, the device detects (2104) an input object at a first hover location over the first user interface object that meets first hover proximity criteria (e.g., a hover proximity parameter of the input object within a first hover proximity range above the touch-sensitive surface). After detecting the input object at the first hover location over the first user interface object that meets the first hover proximity criteria, the device detects (2106) movement of the input object away from the first hover location (e.g., detecting a change in the hover location of the input object, including a change in the lateral position of the input object, and a change in the vertical position of the input object). In response to detecting movement of the input object away from the first hover location: in accordance with a determination that the input object meets first augmented hover proximity criteria, wherein the first augmented hover proximity criteria require that the input object had met the first hover proximity criteria and an additional requirement that augments the first hover proximity criteria before the input object moved away from the first location (e.g., the additional requirement is that the input object meets the first hover proximity criteria with less than a predetermined amount of movement for more than a threshold amount of time (e.g., the input object was held substantially stationary for a threshold amount of time while meeting the first hover proximity criteria)), the device performs (2108) a first operation associated with the movement of the input object (e.g., selecting an edge of a text selection box and move it relative to another edge of the text selection box, or ceasing to display a tool-tip associated with the first user interface object and displaying a tool tip for a second user interface object that is distinct from the first user interface object when the input object moves to a second hover location above the second user interface object); and in accordance with a determination that the input object does not meet the first augmented hover proximity criteria (e.g., because the input object had not met the additional requirement with less than the predetermined amount of movement before the input object moved away from the first hover location) (e.g., because the input object had not met either the first hover proximity criteria or the additional requirement (e.g., the input object has been lifted out of the hover proximity range above the touch-sensitive surface)), the device forgoes performing the first operation. This is illustrated in FIGS. 11A-11G, where finger 734 is hovered over application icon 1104 for a threshold amount of time to trigger notification redisplay mode, and when finger 734 moves over to another icon 1106, notification 1112 for icon 1106 is redisplayed without requiring finger 734 to be hovered over for that threshold amount of time.

In some embodiments, the first augmented hover proximity criteria require (2110) that the input object had continued to meet the first hover proximity criteria for more than a predetermined amount of time with less than the predetermined amount of movement before the input object moved away from the first hover location. This is illustrated in the example shown in FIGS. 11A-11G, for example. Conditionally performing an operation in accordance with a hover-move input by an input object when the input object had met a hover-hold requirement before the input object moved away reduces the number of inputs needed to perform the operation and thereby enhancing the operability of the device and making the user-device interface more efficient. Additionally, by not requiring the input object to continue to meet the hover-hold criteria during the hover-move input, the device also makes it easier for the user to continue or repeat performance of the operation, thereby enhancing the operability of the user device and making the user-device interface more efficient (e.g., by reducing user mistakes when operating/interacting with the device).

In some embodiments, the first augmented hover proximity criteria require (2112) that the input object meets second hover proximity criteria (for more than a predetermined amount of time with less than the predetermined amount of movement) before the input object moved away from the first hover location, wherein the first hover proximity criteria require that a current hover proximity parameter of the input object is within a first value range, the second hover proximity criteria require that the current hover proximity parameter of the input object is within a second value range, and the second value range is within the first value range (e.g., the second hover proximity criteria require that the input object to be held closer to the touch-sensitive surface than the first hover proximity criteria). Conditionally performing an operation in accordance with a hover-move input by an input object when the input object had met a close-hover requirement before the input object moved away reduces the number of inputs needed to perform the operation, and thereby enhancing the operability of the device and making the user-device interface more efficient. Additionally, by not requiring the input object to continue to meet the close-hover requirement during the hover-move input, the device also makes it easier for the user to continue or repeat performance of the operation, thereby enhancing the operability of the user device and making the user-device interface more efficient (e.g., by reducing user mistakes when operating/interacting with the device). It is noted that, descriptions of embodiments that require a hover-hold input for a certain response may require the input object to hover closer (e.g., meeting a smaller hover proximity range without meeting the time threshold of the "hold" requirement) to achieve the same response. Similarly, descriptions of embodiments that require the input object to come within a closer hover distance (e.g., level-two hover proximity range) for a certain response may require the input object to hover and hold for a threshold amount of time to achieve the same response. Therefore, the examples shown in FIGS. 10A-10Y are applicable to method 1100 as well. In the interest of brevity, different permutations of criteria and response are not enumerated here.

In some embodiments, performing the first operation includes (2114) changing an appearance of the first user interface object (e.g., displaying a shadow behind the first user interface object, highlighting the first user interface object, adding a lollipop on top of the object when the object is a cursor, lifting the object off of its original z-plane, changing the color of the object when the object is a lollipop, etc.) to indicate that a mode associated performing the first operation has been entered (e.g., tool-tip display mode for displaying tool-tips associated with icons or controls, notification display mode for displaying unread notifications from applications corresponding to application launch icons, preview-display mode for displaying previews of list items, text selection mode for moving a selection handle or lollipop to change a size of a selection, etc.)). Providing a visual indication that a mode associated with performing the first operation has been entered by changing the appearance of the first user interface object enhances the operability of the device and making the user-device interface more efficient (e.g., by alerting the user of the change in the state of the device and helping the user to achieve an intended result by providing the required inputs), which, additionally, reduces power usage and improves battery life of the device by enabling the user to use the device more quickly and efficiently.

In some embodiments, performing the first operation includes (2116) changing a size of a selection in accordance with the movement of the input object (e.g., changing a size or boundary of a text selection in accordance with the movement of the input object after the input object has hovered over the selectable text for more than a threshold amount of time). In some embodiments, the first user interface object is an edge of a selection box or a selection handle on a selection box, or a cursor. In some embodiments, if the input object is not held over the first user interface object for more than the threshold amount of time, the movement of the input object moves the first user interface object without selecting text or expanding selected text). In some embodiments, the first user interface object is a cursor, and when the first augmented hover proximity criteria are met by the input object, the appearance of the cursor changes (e.g., a selection handle is displayed or existing selection handle is enlarged or changes color) to indicate that the text selection mode is entered, and subsequent movement of the cursor with the changed appearance in accordance with the movement of the input object changes the size of a selection (e.g., expands text selection). In some embodiments, touch-down of the input object on the touch-sensitive surface confirms the selection (e.g., selection remains after the input object is then lifted out of the hover proximity range above the touch-sensitive surface). In some embodiments, lifting the input object out of the hover proximity range without first touching down on the touch-sensitive surface cancels the text selection. Conditionally changing a size of a selection in accordance with a hover-move input by an input object when the input object has met both the usual hover proximity criteria for detecting a hover input and an additional requirement that augments the usual hover proximity criteria (e.g., a time threshold for holding the input object in place, or a closer hover proximity range, etc.) before the movement of the input object enhances the operability of the device and makes the user-device interface more efficient (e.g., by reducing the number of inputs needed to change the size of a selection and reducing user mistakes when operating/interacting with the device).

In response to detecting movement of the input object away from the first hover location: in accordance with the determination that the input object does not meet the first augmented hover proximity criteria, the device moves (2118) the first user interface object in accordance with the movement of the input object, without changing the size of the selection (e.g., in some embodiments, when the first augmented hover proximity criteria are not met by the input object, the appearance of the cursor does not change and the selection mode is not entered; and the movement of the input object repositions the cursor in the selectable text without selecting text)). In some embodiments, touch-down of the input object on the touch-sensitive surface confirms the movement of the cursor (e.g., cursor remains at the new location after the input object is then lifted out of the hover proximity range above the touch-sensitive surface). In some embodiments, lifting the input object out of the hover proximity range without first touching down on the touch-sensitive surface cancels the move and restores the cursor back to its original location before the move. In some embodiments, a quick flick without touch-down throws the first user interface object laterally across the first user interface and the first user interface settles into a final location (e.g., a snap location). Conditionally move a cursor (as opposed to change the size of a selection) in accordance with a hover-move input by an input object when the input object has not met both the usual hover proximity criteria for detecting a hover input and an additional requirement that augments the usual hover proximity criteria before the movement of the input object enhances the operability of the device and makes the user-device interface more efficient (e.g., by reducing the number of inputs needed to move the cursor and reducing user mistakes when operating/interacting with the device).

In some embodiments, detecting movement of the input object away from the first hover location includes (2120) detecting movement of the input object to a second hover location over a second user interface object of the plurality of user interface objects (e.g., now the second user interface object has input focus). Performing the first operation includes displaying second information about the second user interface object in response to detecting the input object at the second hover location over the second user interface object (e.g., when the input object moves to over the second user interface object, the device displays a tooltip or preview corresponding to the second user interface object, as long as the augmented hover proximity criteria had been met by the input object before the input object moved to the second hover location, and the input object continues to meet the first hover proximity criteria while the input object is detected at the second hover location). Conditionally displaying information (e.g., a second tool tip or pop-up window associated with a second object) in accordance with a hover-move input by an input object when the input object has met both the usual hover proximity criteria for detecting a hover input and an additional requirement that augments the usual hover proximity criteria before the movement of the input object enhances the operability of the device and makes the user-device interface more efficient (e.g., by reducing the number of inputs needed to display the information associated with the second object and reducing user mistakes when operating/interacting with the device).

In some embodiments, the device detects (2122) that the input object meets the first hover proximity criteria and the additional requirement that augment the first hover proximity criteria before the input object moved away from the first location. In response to detecting that the input object meets the first hover proximity criteria and the additional requirement that augment the first hover proximity criteria before the input object moved away from the first hover location, the device displays first information about the first user interface object (e.g., when the input object hover over the first user interface object and holds for more than the threshold amount of time, the device displays an information pop-up, a menu, or a preview that corresponds to the first user interface object; or when the input object is brought within a threshold distance to the touch-sensitive surface that is closer than the regular hover proximity range, the device displays an information pop-up, a menu, or a preview that corresponds to the first user interface object). Prior to conditionally displaying second information about a second object, displaying first information about a first object when the augmented hover proximity criteria are met before the movement of the input object enhances the operability of the device and makes the user-device interface more efficient (e.g., by reducing the number of inputs needed to display information about the first object and reducing user mistakes when operating/interacting with the device).

In some embodiments, performing the first operation includes (2124) ceasing to display first information about the first user interface object (e.g., ceasing to display a tool-tip or preview corresponding to the first user interface object (e.g., a first application launch icon or a first list item) that has been displayed in response to the input object meeting the first augmented hover proximity criteria (e.g., hover and hold still for a threshold amount of time over the first user interface object, or hover sufficiently close to the first user interface object)). Ceasing to display the first information when the input object moves away from the first object when the augmented hover proximity criteria have been met before the movement of the input object enhances the operability of the device and makes the user-device interface more efficient (e.g., by helping the user to achieve an intended result by providing the required inputs and reducing user mistakes when operating/interacting with the device).

In some embodiments, displaying the second information about the second user interface object includes (2126) displaying the second information without requiring that the input object meets the first augmented hover proximity criteria (e.g., without requiring that the input object meets both the first hover proximity criteria and the additional requirement that augment the first hover proximity criteria at the second hover location). By not requiring the input object to continue to meet the augmented requirement during the hover-move input, the device also makes it easier for the user to display the information about an additional object (e.g., the second object), thereby enhancing the operability of the user device and making the user-device interface more efficient (e.g., by reducing user mistakes when operating/interacting with the device).

In some embodiments, after displaying the second information about the second user interface object in response to detecting the input object at the second hover location over the second user interface object, the device detects (2128) that the input object no longer meets the first hover proximity criteria because the input object has exited a hover proximity range above the touch-sensitive surface. In response to detecting that the input object no longer meets the first hover proximity criteria because the input object has exited the hover proximity range above the touch-sensitive surface, the device ceases to display the second information about the second user interface object (and ceasing to display the first information about the first user interface object if the first information has been maintained after the movement of the input object from the first location to the second location). Ceasing to display the information about an object when the input object exits the hover proximity range enhances the operability of the user device and makes the user-device interface more efficient (e.g., by providing timely feedback regarding the state of the device, helping the user to achieve an intended result by providing the required inputs, and reducing user mistakes when operating/interacting with the device).

In some embodiments, after detecting that the input object no longer meets the first hover proximity criteria because the input object has exited the hover proximity range above the touch-sensitive surface, the device detects (2130) that the input object meets the first hover proximity criteria again after the input object has reentered the hover proximity range at the second location above the second user interface object. In response to detecting that the input object meets the first hover proximity criteria at the second location above the second user interface object: in accordance with a determination that the input object meets the first augmented hover proximity criteria, the device redisplays the second information about the second user interface object; and in accordance with a determination that the input object does not meet the first augmented hover proximity criteria, the device forgoes redisplaying the second information about the second user interface object. This is illustrated in FIGS. 11I-11J, for example. After the device has exited the mode for displaying the information, requiring the input object to meet the augmented requirement again to redisplay the information about the second object enhances the operability of the user device and makes the user-device interface more efficient (e.g., by avoiding accidentally triggering display of the information and reducing user mistakes when operating/interacting with the device).

In some embodiments, the first user interface object and the second user interface objects are (2132) of a first type of objects, and the first information and the second information are of a first type of information. For example, the plurality of user interface objects are application launch icons on a home screen, or list items in a list. In some embodiments, the first information and the second information are tool-tips or previews that are displayed in proximity to their corresponding application launch icons or list items. In some embodiments, the first information and the second information are tool-tips or notifications that are displayed at a designated location on the display (e.g., in a banner area at the top portion of the display), independent of the respective locations of their corresponding application launch icons or list items. In some embodiments, the first information ceases to be displayed when the second information is displayed. In some embodiments, the first information ceases to be displayed when the input object moves away from the first location over the first user interface object. In some embodiments, the first information ceases to be displayed when the input object exits the hover proximity range, e.g., by touch-down on the touch-sensitive surface, or by moving up and exiting the hover proximity range above the touch-sensitive surface. Having the mode for displaying information about object to only display the same type of information for the same type of objects enhances the operability of the user device and makes the user-device interface more efficient (e.g., by conforming to user's expectations and reducing user mistakes when operating/interacting with the device), which, additionally, reduces power usage and improves battery life of the device by enabling the user to use the device more quickly and efficiently.

It should be understood that the particular order in which the operations in FIGS. 21A-21D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1800, 1900, 2000, 2200, 2300 and 2400) are also applicable in an analogous manner to method 2100 described above with respect to FIGS. 21A-21D. For example, the contacts, gestures, input objects, user interface objects, tactile outputs, audio outputs, intensity thresholds, position indicators, focus selectors, and animations described above with reference to method 2100 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1800, 1900, 2000, 2200, 2300 and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 21A-21D are, optionally, implemented by components depicted in FIGS. 1A-1B. For example, detection operations 2104 and 2106, and performing operation 2108 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 22A-22G are flow diagrams illustrating a method 2200 of interacting with a user interface object through proximity-based and contact-based inputs in accordance with some embodiments. The method 2200 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 2200 are, optionally, combined and/or the order of some operations is, optionally, changed.

Method 2200 relates to providing visual feedback to indicate whether a user interface object has differentiated, object-specific responses to intensity-based touch inputs (e.g., activating a default function in response to a light tap vs. displaying a menu in response to a deep press) before any intensity-based input is detected in relation to the user interface object. Specifically, the device provides the visual indication for such "intensity-reactive" user interface objects when an input object is detected near one of such user interface objects within a hover-proximity range above the touch-sensitive surface. Providing a visual indication to the user regarding whether a user interface object is "intensity-reactive" while the input object is hovering over the user interface object allows the user to receive information without making contact with the touch-sensitive surface or supplying the necessary force to accidentally activating a function that corresponds to the user interface object. Providing such improved visual feedback to indicate the intensity-reaction behavior of a user in response to a hover input enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

The device displays (2202) a plurality of user interface objects (e.g., application launch icons for launching respective applications), including a first user interface object, on the display. The device detects (2204) a first portion of an input by an input object, including detecting the input object at a first hover location above the touch-sensitive surface while the input object meets first hover proximity criteria (e.g., the first hover proximity criteria require that a hover proximity parameter of the input object is within a first range (e.g., the input object is within a first hover distance above the touch-sensitive surface)), wherein the first hover location above the touch-sensitive surface corresponds to a location of the first user interface object on the display (e.g., the first hover location is directly above or is within a three-dimensional reactive region of the display location of the first user interface object). In response to detecting the first portion of the input, including detecting the input object at the first hover location above the touch-sensitive surface while the input object meets the first hover proximity criteria: in accordance with a determination that the first user interface object has differentiated responses to intensity-based inputs (e.g., in accordance with a determination that the first user interface object has a first object-specific response (e.g., displaying a preview or menu) to a first input by a contact with a first characteristic intensity (e.g., a press input) and has a second object-specific response (e.g., launch an application or open a document) to a second input by the contact with a second characteristic intensity (e.g., a tap input), and so on), the device displays (2206) first visual feedback in association with the first user interface object (e.g., displaying a shadow or an edge of a preview platter behind the first user interface object, or blurring the rest of the user interface around the first user interface object, or showing the first user interface object floating up from the original z-plane of the first user interface object toward the user, or highlighting or shining a spot light on the first user interface object, and/or otherwise altering an appearance of the first user interface object) to indicate that the first user interface object has differentiated responses to intensity-based inputs; and, in accordance with a determination that the first user interface object does not have differentiated responses to intensity-based inputs (e.g., in accordance with a determination that the first user interface object has a uniform response to input by a contact irrespective of a characteristic intensity of the contact), the device foregoes displaying the first visual feedback in association with the first user interface object. In some embodiments, the device implements a failure feedback for those user interface objects that do not have differentiated object-specific responses to intensity-based inputs, such as displaying a non-object-specific canned animation and/or providing a non-object specific haptic feedback that indicates a lack of object-specific response for a press input that meets a certain intensity threshold. Even though this failure feedback is different from the normal object-specific responses for a tap input on the user interface objects, these user interface objects are nonetheless considered to not have differentiated responses to intensity-based inputs for the purposes of displaying the first visual feedback. This is illustrated in FIGS. 12A-12E, for example.

In some embodiments, displaying the first visual feedback includes (2208) dynamically varying a visual effect that is displayed in accordance with a current hover proximity parameter of the input object while the input object is within a first threshold range from the first user interface object (e.g., varying a size or appearance of the shadow or the edge of a preview platter behind the first user interface object, or varying an amount of blurring that is applied to the rest of the user interface around the first user interface object, or varying the z-height of the first user interface object above the original z-plane of the first user interface object, or varying the brightness of the highlighting or the spot light shone on the first user interface object, and/or otherwise varying the amount of changes that is applied to the appearance of the first user interface object, in accordance with the current hover distance of the input object above the touch-screen while the input object is within the three dimensional reactive region of the first user interface object). This is illustrated in FIGS. 12B-12, for example. Dynamically varying a visual effect in accordance with a current hover proximity parameter of the input object while the input object is hovering over the user interface object allows the user to receive information about how close the input object is to the touch-sensitive surface enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, in response to detecting the first portion of the input, including detecting the input object at the first hover location above the touch-sensitive surface while the input object meets the first hover proximity criteria: in accordance with the determination that the first user interface object does not have differentiated responses to intensity-based inputs, the device displays (2210) second visual feedback (e.g., showing a different type of feedback or just the beginning portion of the first visual feedback to indicate to the user that the hover proximity criteria are met (e.g., displaying a shadow for a very brief period)) that is distinct from the first visual feedback in association with the first user interface object to indicate that the first user interface object does not have differentiated responses to intensity-based inputs. This is illustrated in FIG. 12D-12E, for example. Showing a different visual effect for a non-intensity-reactive object helps to distinguish an intensity-reactive object and an non-intensity-reactive object before the input object makes contact with the touch-sensitive surface enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, displaying the second visual feedback includes (2212) displaying a visual effect that is independent of variation of the current hover proximity parameter of the input object while the input object is within a first threshold range from the first user interface object (e.g., displaying a static visual effect, or a canned animation (e.g., a canned animation that shows an initial portion of the visual effect that is displayed for an object that has differentiated responses to intensity-based inputs and then cuts out) while the input object is within the three-dimensional reactive region of the first user interface object). This is illustrated in FIGS. 12D-12E, for example. Showing a different visual effect that does not vary in accordance with a current hover proximity parameter of the input object helps to distinguish an intensity-reactive object and an non-intensity-reactive object before the input object makes contact with the touch-sensitive surface enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, the device detects (2214) a second portion of the input by the input object, including detecting movement of the input object from the first hover location to a second hover location, wherein the second hover location corresponds to a second user interface object that is distinct from the first user interface object (e.g., the second hover location is directly above or is within a three-dimensional reactive region of the display location of the second user interface object), and wherein the second user interface object has differentiated responses to intensity-based inputs. In response to detecting the second portion of the input, including detecting the movement of the input object from the first hover location to the second hover location: in accordance with a determination that the input object meets second hover proximity criteria (e.g., in some embodiments, the second hover proximity criteria is the same as the first hover proximity criteria; in some embodiments, the second hover proximity criteria are less stringent requirements than the first hover proximity criteria and are met whenever the first hover proximity criteria are met), the device displays the first visual feedback in association with the second user interface object (e.g., displaying a shadow or an edge of a preview platter behind the second user interface object, or blurring the rest of the user interface around the second user interface object, and/or highlighting or shining a spot light on the second user interface object) to indicate that the second user interface object has differentiated responses to intensity-based inputs. This is illustrated in FIG. 12F, for example. In some embodiments, in response to detecting the movement of the input object from the first hover location to the second hover location, the device, in accordance with a determination that the input object does not meet the second hover proximity criteria, forgoes display of the first visual feedback in association with the second user interface object. Showing the same visual effect for intensity-reactive objects when the input object hovers over the intensity-reactive objects helps to call out these intensity-reactive objects from other objects in the user interface, thereby enhancing the operability of the device and making the user-device interface more efficient (e.g., by helping the user to achieve an intended result by providing the required inputs and reducing user mistakes when operating/interacting with the device).

In some embodiments, the device detects (2216) a third portion of the input by the input object, including detecting movement of the input object from the second hover location to a third hover location, wherein the third hover location corresponds to a third user interface object that is distinct from the first user interface object and the second user interface object (e.g., the third hover location is directly above or is within a three-dimensional reactive region of the display location of the third user interface object), and wherein the third user interface object does not have differentiated responses to intensity-based inputs. In response to detecting the third portion of the input, including detecting the movement of the input object from the second hover location to the third hover location: in accordance with a determination that the input object meets the second hover proximity criteria, the device displays the second visual feedback in association with the third user interface object (e.g., displaying a static visual effect, or a canned animation (e.g., a canned animation that shows an initial portion of the visual effect that is displayed for an object that has differentiated responses to intensity-based inputs and then cuts out) while the input object is within the three-dimensional reactive region of the third user interface object) to indicate that the third user interface object does not have differentiated responses to intensity-based inputs. This is illustrated in FIG. 12G, for example. Showing the same visual effect for non-intensity-reactive objects when the input object hovers over the intensity-reactive objects helps to call out these non-intensity-reactive objects from other objects in the user interface, thereby enhancing the operability of the device and making the user-device interface more efficient (e.g., by helping the user to achieve an intended result by providing the required inputs and reducing user mistakes when operating/interacting with the device).

In some embodiments, the device detects (2218) a continuation of the first portion of the input by the input object, including detecting a decrease in a hover proximity parameter of the input object over the location on the touch-sensitive surface that corresponds to the first user interface object until the input object makes contact with the touch-sensitive surface at a first contact location that corresponds to the first user interface object. While the input object maintains contact with the touch-sensitive surface, the device detects an increase in a characteristic intensity of a contact by the input object with the touch-sensitive surface above a first intensity threshold (e.g., a light press intensity threshold). In response to detecting the increase in the characteristic intensity of the contact above the first intensity threshold: in accordance with a determination that the first user interface object has differentiated responses to intensity-based inputs, the device displays a preview user interface object that corresponds to the first user interface object (e.g., a quick action menu that corresponds to an application launch icon, a preview of an email message that corresponds to an email item in a listing of email items, a preview of a photo that corresponds to a thumbnail image of the photo, etc.). This is illustrated in FIGS. 12J-12L, for example, where quick action menu 1230 and mini application object 1228 are displayed in response to a light press input. After showing the visual effect to indicate that an object is intensity-reactive, providing object-specific responses in response to an intensity-based input (e.g., the intensity of the contact exceeds a threshold that is greater than the contact detection intensity threshold) enhances the operability of the device and makes the user-device interface more efficient (e.g., by avoiding user confusion, helping the user to achieve an intended result by providing the required inputs, and reducing user mistakes when operating/interacting with the device).

In some embodiments, in response to detecting the increase in the characteristic intensity of the contact above the first intensity threshold: in accordance with a determination that the first user interface object does not have differentiated responses to intensity-based inputs: the device provides (2220) predefined (e.g., non-object-specific) failure feedback (e.g., a canned failure animation or tactile/audio output) to indicate that the device has detected an intensity-based input by the contact that does not have a corresponding object-specific response. This is illustrated in FIG. 12H, for example. In some embodiments, the device does not provide any failure feedback (or any object-specific feedback) and the absence of the feedback to the input indicates that the first user interface object does not have a corresponding object-specific response to the intensity-based input by the contact. After showing the visual effect to indicate that an object is non-intensity-reactive or not showing any visual effect to indicate that the object is non-intensity-reactive, providing a generic/predefined non-object-specific response in response to an intensity-based input enhances the operability of the device and makes the user-device interface more efficient (e.g., by avoiding user confusion, helping the user to achieve an intended result by providing the required inputs, and reducing user mistakes when operating/interacting with the device).

In some embodiments, in response to detecting the increase in the characteristic intensity of the contact above the first intensity threshold: in accordance with a determination that the first user interface object has differentiated responses to intensity-based inputs: the device displays (2222) a precursor image of the preview user interface object while detecting the decrease in the hover proximity parameter of the input object and while detecting the increase in the characteristic intensity of the contact by the input object with the touch-sensitive surface. This is illustrated in FIG. 12K, for example, where a precursor image (e.g., preview platter 1206) is displayed. After showing the visual effect to indicate that an object is intensity-reactive, providing visual feedback (e.g., a precursor image of the preview user interface) in response to detecting an increase in intensity of the contact (e.g., before the intensity of the contact exceeds a threshold that is greater than the contact detection intensity threshold) enhances the operability of the device and makes the user-device interface more efficient (e.g., by informing the user of the state of the device, avoiding user confusion, helping the user to achieve an intended result by providing the required inputs, and reducing user mistakes when operating/interacting with the device).

In some embodiments, displaying the precursor image of the preview user interface object includes (2224): dynamically varying an appearance of the precursor image in accordance with the hover proximity parameter of the input object before the input object makes contact with the touch-sensitive surface; dynamically varying the appearance of the precursor image in accordance with the characteristic intensity of the contact while the input object maintains contact with the touch-sensitive surface; displaying a smooth transition (as opposed to a discrete or abrupt transition) in the appearance of the precursor image when the input object makes contact with the touch-sensitive surface; and displaying a continuous transformation from the precursor image to the preview user interface object when the characteristic intensity of the contact increases above the first intensity threshold. After showing the visual effect to indicate that an object is intensity-reactive, dynamically varying visual feedback (e.g., dynamically varying a precursor image of the preview user interface) in accordance with the changes in the intensity of the contact (e.g., before the intensity of the contact exceeds a threshold that is greater than the contact detection intensity threshold) and smoothly transitioning the precursor image to the preview user interface when the threshold intensity is reached enhance the operability of the device and make the user-device interface more efficient (e.g., by informing the user of the state of the device, avoiding user confusion, helping the user to achieve an intended result by providing the required inputs, and reducing user mistakes when operating/interacting with the device).

In some embodiments, while displaying the preview user interface object that corresponds to the first user interface object in response to detecting the increase in the characteristic intensity of the contact above the first intensity threshold and in accordance with the determination that the first user interface object has differentiated responses to intensity-based inputs, the device detects (2226) the input object breaking contact with the touch-sensitive surface. In response to detecting the input object breaking contact with the touch-sensitive surface: in accordance with a determination that the input object meets second hover proximity criteria (e.g., the same as the first hover proximity criteria or has a greater or lesser hover proximity range than the first hover proximity criteria), the device maintains display of the preview user interface object while the input object continues to meet the second hover proximity criteria; and in accordance with a determination that the input object no longer meets the second hover proximity criteria because the input object has exited a hover proximity range specified by the second hover proximity criteria, the device ceases to display the preview user interface object. This is illustrated in FIGS. 12M-12P, for example. Maintaining display of the preview user interface after lift-off of the contact and before the input object is lifted out of the hover proximity range enhances the operability of the device and makes the user-device interface more efficient (e.g., by informing the user of the state of the device, helping the user to achieve an intended result by providing the required inputs, and reducing user mistakes when operating/interacting with the device).

In some embodiments, maintaining display of the preview user interface object while the input object continues to meet the second hover proximity criteria includes (2228): dynamically varying an appearance of the preview user interface object in accordance with a current hover proximity parameter of the input object while the input object continues to meet the second hover proximity criteria (e.g., varying a size or appearance of the preview, and/or varying an amount of blurring that is applied to the rest of the user interface around the preview, and/or varying the z-height of the preview above the original z-plane of the preview, or varying the brightness of the highlighting or the spot light shone on the preview, and/or otherwise varying the amount of changes that is applied to the appearance of the preview, in accordance with the current hover distance of the input object above the touch-screen while the input object is within the three dimensional reactive region of the first user interface object). This is illustrated in FIGS. 12M-12O, for example. Dynamically varying the appearance of the preview user interface while maintaining display of the preview user interface after lift-off of the contact and before the input object is lifted out of the hover proximity range enhances the operability of the device and makes the user-device interface more efficient (e.g., by informing the user of the state of the device, helping the user to achieve an intended result by providing the required inputs, and reducing user mistakes when operating/interacting with the device).

In some embodiments, after detecting the input object breaking contact with the touch-sensitive surface and while maintaining display of the preview user interface object that corresponds to the first user interface object, the device detects (2230) that the input object has made contact with the touch-sensitive surface again. In response to detecting that the input object has made contact with the touch-sensitive surface again, the device continues to maintain display of the preview user interface object (e.g., including restoring the appearance of the preview user interface object to the state before the input object broke contact with the touch-sensitive surface). Allowing the user to maintain display of the preview user interface after lift-off of the contact by touching down again on the touch-sensitive surface while the preview user interface is still displayed during the hovering out process (e.g., after first lift-off followed by a period of hovering) enhances the operability of the device and makes the user-device interface more efficient (e.g., by reducing the number of inputs needed to perform a task, such as keeping the preview on the display, helping the user to achieve an intended result by providing the required inputs, and reducing user mistakes when operating/interacting with the device). In some embodiments, instead of maintaining display of the preview user interface object, the device performs a function and ceases to display the second user interface object, e.g., launch an application to a user interface that corresponds to an item at the location of the contact, or opening a content item and replacing the current user interface with another user interface that displays the content.

It should be understood that the particular order in which the operations in FIGS. 22A-22G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1800, 1900, 2000, 2100, 2300 and 2400) are also applicable in an analogous manner to method 2100 described above with respect to FIGS. 22A-22G. For example, the contacts, gestures, input objects, user interface objects, tactile outputs, audio outputs, intensity thresholds, position indicators, focus selectors, and animations described above with reference to method 2200 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1800, 1900, 2000, 2100, 2300 and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 22A-22G are, optionally, implemented by components depicted in FIGS. 1A-1B. For example, detection operation 2204, and display operation 2206 and 2210 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 23A-23E are flow diagrams illustrating a method 2300 of interacting with a user interface object through proximity-based and contact-based inputs in accordance with some embodiments. The method 2300 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 2300 are, optionally, combined and/or the order of some operations is, optionally, changed.

Method 2300 relates to providing visual feedback to indicate which edge of a content selection object (e.g., text selection box) will be moved in accordance with movement of an input object to change a size of the content selection object. Conventionally, it is often difficult to select a respective edge of a content selection object with a contact when two edges of the content selection object are located near each other. For example, the input object (e.g., a finger or stylus) may block the view of the two edges of the content selection object and/or accidently select the wrong edge when the input object moves close to the two edges on the touch-screen, which will, in some circumstances, cause input mistakes and require additional steps to correct the input mistakes. In the method disclosed herein, visual feedback that clearly indicates which one of the edges is selected (or will be selected) for relocation is provided when the input object is detected hovering over one or both of the edges (and optionally, before the requirement for selecting and moving the edge is met). If, upon seeing the visual feedback, the user decides that the wrong edge is selected (or will be selected) for relocation, the user can adjust the hover location of the input object to cause the correct edge to be selected. Providing visual feedback to indicate which edge is selected (or is to be selected) for subsequent movement before the actual movement is started enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

The device displays (2302) a content selection object (e.g., a text selection box, or object selection box) within selectable content, wherein the content selection object includes a first edge of the content selection object and a second edge of the content selection object, and wherein content (e.g., text) located between the first edge of the content selection object and the second edge of the content selection object is selected. The device detects (2304) a first portion of an input by the input object, including detecting the input object at a first hover location above the touch-sensitive surface that corresponds to the first edge of the content selection object. In response to detecting the first portion of the input by the input object: in accordance with a determination that the first portion of the input meets first criteria (e.g., edge-disambiguation criteria), wherein the first criteria (e.g., edge-disambiguation criteria) require that the input object meets hover proximity criteria when the input object is detected at the first hover location above the touch-sensitive surface that corresponds to the location of the first edge of the content selection object on the display in order for the first criteria to be met, the device changes (2306) (e.g., visually enhancing) an appearance of the first edge relative to the second edge of the content selection object in a first manner (e.g., enlarging a size of the first edge relative to the second edge, changing the color of the first edge relative to the second edge, enlarging a portion of the first edge, animating the first edge while keeping the second edge still, displaying a shadow or ghost cursor next to the first edge to indicate that the first edge of lifted toward the user relative to the second edge, etc.) to indicate that the first edge of the content selection object will be selected for movement relative to the second edge of the content selection object when the input object meets second criteria (e.g., edge-move criteria) (e.g., when lateral movement of the input object is detected after the first criteria are met, or after augmented first criteria (e.g., first criteria and an additional criterion regarding the first criteria) are met). This is illustrated in FIGS. 13A-13C, for example, where edge 1308 is selected for movement.

In some embodiments, in response to detecting the first portion of the input by the input object: in accordance with a determination that the first portion of the input does not meet the first criteria (e.g., edge-disambiguation criteria), the device maintains (2308) the appearance of the first edge relative to the second edge of the content selection object to indicate that the selectable content will be scrolled when the input object meets the second criteria (e.g., content-scroll criteria) (e.g., when lateral movement of the input object is detected without the first criteria having been met, or without the augmented first criteria having been met). This is illustrated in FIGS. 13H-13I, where content is scrolled, for example. The absence of changes to the appearance of the edges when neither is selected or to be selected for movement relative to the other is used as visual feedback to indicate that the selectable content will be scrolled as a whole. If, upon seeing the absence of the visual feedback, the user decides that an edge should be selected for relocation, the user can adjust the hover location of the input object to cause the correct edge to be selected. Utilizing the absence of visual feedback to convey one state of the device relative to another state for which visual feedback is provided enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, after detecting the first portion of the input, the device detects (2310) a second portion of the input by the input object, including detecting lateral movement of the input object. In response to detecting the second portion of the input object: in accordance with a determination that the second portion of the input meets the second criteria (e.g., the edge-action criteria): in accordance with a determination that the input object has met the first criteria (e.g., edge-disambiguation criteria) during the first portion of the input, the device moves the first edge of the content selection object relative to the second edge of the content selection object in accordance with the lateral movement of the input object across the touch-sensitive surface. In accordance with a determination that the input object has not met the first criteria (e.g., edge-disambiguation criteria) during the first portion of the input, the device scrolls the selectable content in accordance with the lateral movement of the input object across the touch-sensitive surface. This is illustrated in FIGS. 13A-13E, and 13H-13J, for example. Disambiguating a movement input as either a scroll input or a resize input based on whether an edge of the content selection object has previously been selected by an input object enhances the operability of the device and makes the user-device interface more efficient (e.g., by reducing the number of inputs required for a performing a task, helping the user to achieve an intended result by providing the required inputs, and reducing user mistakes when operating/interacting with the device) which, additionally, reduces power usage and improves battery life of the device by enabling the user to use the device more quickly and efficiently.

In some embodiments, the second criteria (e.g., the edge-action criteria) require (2312) that the input object makes contact with the touch-sensitive surface and maintains continuous contact with the touch-sensitive surface while making the lateral movement across the touch-sensitive surface in order for the second criteria to be met. Requiring the input object to make contact and maintain contact with the touch-sensitive surface while making the lateral movement across the touch-sensitive surface in order to move an edge of the content selection object to resize the content selection object enhances the operability of the device and makes the user-device interface more efficient (e.g., by avoiding accidental resizing of the content selection object and reducing user mistakes when operating/interacting with the device) which, additionally, reduces power usage and improves battery life of the device by enabling the user to use the device more quickly and efficiently.

In some embodiments, while the appearance of the first edge is changed (e.g., visually enhanced) relative to the second edge in the first manner, the device detects (2314) a first contact of the input object with the touch-sensitive surface at a location that corresponds to the first edge of the content selection object (while the first edge has input focus). In response to detecting the first contact of the input object with the touch-sensitive surface at the location that corresponds to the first edge of the content selection object: the device changes (e.g., visually enhancing) the first edge of the content selection object relative to the second edge of the content selection object in a second manner that is distinct from the first manner (e.g., changing the color of the lollipop on the first edge, further enlarge the end of the lollipop, etc.). This is shown in FIGS. 12C and 12D, for example. Providing different visual feedback (e.g., changing the appearance of the first edge in different manners relative to the second edge) when the input object hovers over and makes contact with the touch-sensitive surface enhances the operability of the device and makes the user-device interface more efficient (e.g., by informing the user of the state of the device, helping the user to achieve an intended result by providing the required inputs, and reducing user mistakes when operating/interacting with the device) which, additionally, reduces power usage and improves battery life of the device by enabling the user to use the device more quickly and efficiently.

In some embodiments, while the appearance of the first edge is changed (e.g., visually enhanced) in the second manner, the device detects (2314) lift-off of the first contact from the touch-sensitive surface. In response to detecting the lift-off of the first contact from the touch-sensitive surface: the device ceases to change (e.g., visually enhance) the appearance of the first edge in the second manner. In accordance with a determination that the input object meets the first criteria, the device changes (e.g., visually enhancing) the appearance of the first edge in the first manner relative to the second edge. In accordance with a determination that the input object does not meet the first criteria, the device restores the appearance of the first edge relative to the second edge of the content selection object. This is illustrated in FIGS. 13E-13G, where the changes to selection handle 1308 is reversed as finger 734 is lifted off the touch-screen and lifted out of the hover proximity range above the touch-screen. Reversing the visual changes applied to the first edge (e.g., reversing to changing the appearance in the first manner, or completely removing the changes previously applied) in accordance with whether the input object continues to hover over the first edge or is lifted out of the hover range above the first edge enhances the operability of the device and makes the user-device interface more efficient (e.g., by informing the user of the internal state of the device, helping the user to achieve an intended result by providing the required inputs, and reducing user mistakes when operating/interacting with the device) which, additionally, reduces power usage and improves battery life of the device by enabling the user to use the device more quickly and efficiently.

In some embodiments, the second criteria require (2318) that the input object makes the lateral movement above the touch-sensitive surface while continuing to meet the hover proximity criteria in order for the second criteria to be met. Requiring the input object to remain in the hovering state while making the lateral movement over the touch-sensitive surface in order to move an edge of the content selection object to resize the content selection object enhances the operability of the device and makes the user-device interface more efficient (e.g., by allowing the user to cancel the move by lifting away the input object without first making contact with the touch-sensitive surface and reducing user mistakes when operating/interacting with the device) which, additionally, reduces power usage and improves battery life of the device by enabling the user to use the device more quickly and efficiently.

In some embodiments, after detecting the first portion of the input, the device detects (2320) a second portion of the input by the input object, including detecting lateral movement of the input object. In response to detecting the second portion of the input object: in accordance with a determination that the second portion of the input meets the second criteria (e.g., the edge-action criteria) and that the input object has met the first criteria (e.g., edge-disambiguation criteria) during the first portion of the input, the device moves the first edge of the content selection object relative to the second edge of the content selection object in accordance with the lateral movement of the input object. In accordance with a determination that the second portion of the input meets the second criteria (e.g., the edge-action criteria) and that the input object has not met the first criteria (e.g., edge-disambiguation criteria) during the first portion of the input, the device forgoes moving the first edge of the content selection object (and optionally, moving a cursor within the content while maintaining display of the content selection object). Requiring the input object to meet edge-disambiguation criteria before a resizing operation by lateral movement of the input object enhances the operability of the device and makes the user-device interface more efficient (e.g., by avoiding accidental resizing of the content selection object and reducing user mistakes when operating/interacting with the device) which, additionally, reduces power usage and improves battery life of the device by enabling the user to use the device more quickly and efficiently.

after detecting the second portion of the input by the input object and moving the first edge relative to the second edge in response to the second portion of the input, the device detects (2322) a third portion of the input by the input object, including detecting that the input object no longer meets the hover proximity criteria. In response to detecting the third portion of the input by the input object: in accordance with a determination that the input object no longer meets the hover proximity criteria because the input object has exited a hover proximity range above the touch-sensitive surface, the device restores the first edge of the selection object to the location of the first edge before the first edge was moved in accordance with the lateral movement of the input object across the touch-sensitive surface (e.g., the change to the content selection object is canceled when the user lift away the input object without making contact with the touch-sensitive surface); and in accordance with a determination that the input object no longer meets the hover proximity criteria because the input object has made contact with the touch-sensitive surface, the device confirms content selection between the first edge and the second edge of the content selection object (e.g., upon detecting subsequent lift-off of the input object from the touch-sensitive surface or upon detecting subsequent exit of the hover proximity range above the touch-sensitive surface by the input object, the device will continue to maintain the selection, and optionally display a menu (e.g., with options for cut, copy, paste, lookup, etc.) with the selection). This is illustrated in FIGS. 13J-13N, for example. After moving first edge in accordance with the lateral movement of the input object, allowing the user to confirm the move by making contact with the touch-sensitive surface or cancel the move by lifting the input object out of the hover proximity range without making contact with the touch-sensitive surface first enhances the operability of the device and makes the user-device interface more efficient (e.g., helping the user to achieve an intended result by providing the required inputs and reducing user mistakes when operating/interacting with the device) which, additionally, reduces power usage and improves battery life of the device by enabling the user to use the device more quickly and efficiently.

In some embodiments, the first criteria (e.g., the edge-disambiguation criteria) further require (2324) that the input object meets the hover proximity criteria for at least a first threshold amount of time with less than a threshold amount of movement away from the first hover location in order for the first criteria to be met (e.g., the first criteria require that the input object is held substantially stationary while hovering over the first edge in order to select the first edge for subsequent movement relative to the second edge). This is illustrated in FIGS. 13A-13C, for example, where finger 734 is hovered over selection handle 1308 for at least a threshold amount of time T before selection handle 1308 is selected for movement. Requiring the input object to meet a hover-hold requirement before performing a resizing operation by lateral movement of the input object enhances the operability of the device and makes the user-device interface more efficient (e.g., by avoiding accidental resizing of the content selection object and reducing user mistakes when operating/interacting with the device) which, additionally, reduces power usage and improves battery life of the device by enabling the user to use the device more quickly and efficiently.

In some embodiments, the first criteria further require (2326) that the input object makes a predefined gesture (e.g., an in-air wiggle gesture that includes movement of the input object back and forth over a portion of the touch-sensitive surface while remaining within a range of hover distance from the touch-sensitive surface) while the input object meets the hover proximity criteria at the first hover location in order for the first criteria to be met. Requiring the detection of a predefined gesture while the input object is hovering over the touch-sensitive surface before performing a resizing operation by lateral movement of the input object enhances the operability of the device and makes the user-device interface more efficient (e.g., by avoiding accidental resizing of the content selection object and reducing user mistakes when operating/interacting with the device) which, additionally, reduces power usage and improves battery life of the device by enabling the user to use the device more quickly and efficiently.

In some embodiments, changing (e.g., visually enhancing) the appearance of the first edge of the content selection object relative to the second edge of the content selection object in the first manner includes (2328) transforming the first edge of the content selection object to a content selection handle (e.g., a straight stem with an enlarged circular end) (while keeping a corresponding end of the second edge of the content selection object unchanged (e.g., without any content selection handle)). Requiring the input object to meet a hover-hold requirement before performing a resizing operation by lateral movement of the input object enhances the operability of the device and makes the user-device interface more efficient (e.g., by avoiding accidental resizing of the content selection object and reducing user mistakes when operating/interacting with the device) which, additionally, reduces power usage and improves battery life of the device by enabling the user to use the device more quickly and efficiently.

In some embodiments, changing (e.g., visually enhancing) the appearance of the first edge of the content selection object relative to the second edge of the content selection object in the first manner includes (2330) displaying a content selection handle adjacent to the first edge of the content selection object (e.g., such that the first edge is attached to the content selection handle when the content selection handle is dragged by the input object across the display) (without concurrently displaying a lollipop adjacent to the second edge of content selection object). Displaying the content selection handle adjacent to the selected edge enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, the first edge of the content selection object is (2332) a first content selection handle and the second edge of the content selection object is a second content selection handle other than the first content selection handle. Changing (e.g., visually enhancing) the appearance of the first edge of the content selection object relative to the second edge of the content selection object in the first manner includes enlarging at least a portion of the first content selection handle (e.g., the round head of the content selection handle) relative to a corresponding portion of the second content selection handle. In some embodiments, the first content selection handle and the second content selection handle have the same original color, and visually enhancing the appearance of the first edge relative to the second edge includes changing a color of the first content selection handle relative to an original color of the first content selection handle and the second content selection handle. This is illustrated in FIGS. 13B-13C, for example. Enlarging at least a portion of the selected content selection handle relative to the unselected content selection handle enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

It should be understood that the particular order in which the operations in FIGS. 23A-23E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1800, 1900, 2000, 2100, 2200 and 2400) are also applicable in an analogous manner to method 2300 described above with respect to FIGS. 23A-23E. For example, the contacts, gestures, input objects, user interface objects, tactile outputs, audio outputs, intensity thresholds, position indicators, focus selectors, and animations described above with reference to method 2300 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1800, 1900, 2000, 2100, 2200 and 2400). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 23A-23E are, optionally, implemented by components depicted in FIGS. 1A-1B. For example, detection operation 2304 and changing operation 2306 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 24A-24E are flow diagrams illustrating a method 2400 of interacting with a user interface object through proximity-based and contact-based inputs in accordance with some embodiments. The method 2400 is performed at an electronic device (e.g., device 300, FIG. 3, or portable multifunction device 100, FIG. 1A) with a display and a touch-sensitive surface. In some embodiments, the electronic device includes one or more first sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and one or more second sensors to detect intensities of contact of the input object with the touch-sensitive surface. In some embodiments, the one or more second sensors are different from the one or more first sensors. In some embodiments, the one or more second sensors are the same as the one or more first sensors. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 2400 are, optionally, combined and/or the order of some operations is, optionally, changed.

Method 2400 relates to a heuristic for keeping input focus on a user interface object stable against accidental movement of an input object above the user interface object. Specifically, after input focus is placed on a first user interface object in response to detecting the input object at a first hover location above the first user interface object, the device compares subsequent movement (e.g., accidental movement or intentional movement) of the input object away from the first hover location (or from another stationary reference location that is associated with the first user interface object (e.g., the centroid of the first user interface object)) against a variable movement threshold in order to determine whether to maintain input focus on the first user interface object or to shift the input focus to another user interface object. The variable movement threshold has a value that is dynamically determined based on a characteristic hover proximity parameter of the input object during the movement of the input object away from the first hover location. The characteristic hover proximity parameter of the input object during the hover movement of the input object is used as an indicator of whether the movement is likely to be intentional or accidental. For example, a smaller hover distance or a faster rate of change in the hover distance during the hover movement may indicate that the movement is an accidental movement and that the device should require a larger movement in order to shift input focus from the first input object. Other factors may also be taken into account in conjunction with the characteristic hover proximity parameter of the input object when determining whether to shift input focus away from the first user interface object. Providing a more intelligent and refined way of determining whether to maintain input focus on a user interface object (e.g., by taking into account a characteristic hover proximity parameter of the input object during hover movement of the input object) enhances the operability of the device and makes the user-device interface more efficient (e.g., by helping the user to achieve an intended result by providing the required inputs and reducing user mistakes when operating/interacting with the device) which, additionally, reduces power usage and improves battery life of the device by enabling the user of to use the device more quickly and efficiently.

The device displays (2402) a plurality of user interface objects on the display, wherein the plurality of user interface objects include a first user interface object and a second user interface object, and wherein the first user interface object and the second user interface object are displayed at different locations (e.g., separated by a first non-zero distance) on the display. The device detects (2404) the input object at a first hover location above (e.g., directly above) a first portion of the touch-sensitive surface while the input object meets hover proximity criteria (e.g., the input object is within a threshold hover distance above the touch-sensitive surface, or the hover proximity parameter of the input object is within a predetermined value range). In response to detecting the input object at the first hover location above the first portion of the touch-sensitive surface while the input object meets the hover proximity criteria, the device places (2406) input focus on the first user interface object (e.g., shifting input focus from another user interface object to the first user interface object or starting input focus on the first user interface object when no other object had input focus). While the first user interface object has input focus and while the input object continues to meet the hover proximity criteria, the device detects (2406) a respective movement (e.g., a movement with a lateral component and an optional vertical component) of the input object from the first hover location above the first portion of the touch-sensitive surface to a respective hover location above (e.g., directly above) a respective portion of the touch-sensitive surface that is different from the first portion of the touch-sensitive surface.

In response to detecting the respective movement of the input object while the input object continues to meet the hover proximity criteria: in accordance with a determination that the respective movement is a first movement from the first hover location to a second hover location that is above a second portion of the touch-sensitive surface: in accordance with a determination that the first movement meets first focus-maintenance criteria, wherein the first focus-maintenance criteria require that the first movement includes less than a first threshold amount of lateral movement in order for the first focus-maintenance criteria to be met, and wherein the first threshold amount of lateral movement is determined based on a value of a characteristic hover proximity parameter of the input object during the first movement of the input object from the first hover location to the second hover location, the device maintains (2410) input focus on the first user interface object; and in accordance with a determination that the first movement meets first focus-shifting criteria, wherein the first focus-shifting criteria require that the first movement includes at least the first threshold amount of lateral movement in order for the first focus-shifting criteria to be met, the device shifts input focus from the first user interface object to the second user interface object. This is illustrated in FIGS. 14A-14G, for example. In some embodiments, each user interface object has a respective three-dimensional reactive region above the portion of the touch-sensitive surface that corresponds to the user interface object, and if no other user interface object already has input focus, an input object detected within the respective three-dimensional reactive region for the second user interface object would normally give input focus to the second user interface object. However, when the first user interface object and the second user interface object are spaced close together, and the first user interface object already has input focus, more lateral movement is required to shift the input focus away from the first user interface object to the second user interface object. Specifically, it is insufficient to have the input object be detected within the reactive region above the second user interface object as a result of the movement of the input object, it is further required that the input object has made more than a threshold amount of lateral movement in order to shift the input focus from the first user interface object to the second user interface object. Furthermore, the threshold amount of lateral movement is determined based on the characteristic hover proximity parameter of the input object during the movement. In other words, the input focus on the first user interface object is made more stable by this additional requirement on the lateral movement of the input object.

In some embodiments, if the input object hovers over the second portion of the touch-sensitive surface when no other user interface object had input focus, the device places (2412) the input focus on the second user interface object. When the focus-maintenance criteria are met when the input object hovers over the second portion of the touch-sensitive surface, the input focus remains with the first user interface object, and when the first input object did not already have input focus, the second user interface object obtains the input focus when the input object hovers over the second portion of the touch-sensitive surface. By overriding the default rule for granting input focus on an object when another object already has input focus, the device makes the input focus more stable against accidental movement during a hover input, thereby enhancing the operability of the device and making the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, in response to detecting the respective movement of the input object while the input object continues to meet the hover proximity criteria: in accordance with a determination that the respective movement is a second movement from the first hover location to a third hover location that is above (e.g., directly above) a third portion of the touch-sensitive surface: in accordance with a determination that the second movement meets second focus-maintenance criteria, wherein the second focus-maintenance criteria require that the second movement includes less than a second threshold amount of lateral movement (e.g., the second threshold amount of lateral movement is smaller than the first threshold amount of lateral movement) in order for the second focus-maintenance criteria to be met, the device maintains (2414) input focus on the first user interface object without regard to a value of the characteristic hover proximity parameter of the input object during the second movement of the input object from the first hover location to the third hover location (e.g., the second threshold amount of lateral movement is independent of a value of the characteristic hover proximity parameter of the input object during the second movement of the input object from the first hover location to the third hover location). By having a second set of focus-maintenance criteria that are met when the input object makes very small movements during hover, the device makes the input focus more stable against accidental movement during a hover input, thereby enhancing the operability of the device and making the user-device interface more efficient (e.g., by helping the user to achieve an intended result by providing the required inputs and reducing user mistakes when operating/interacting with the device) which, additionally, reduces power usage and improves battery life of the device by enabling the user to use the device more quickly and efficiently.

In some embodiments, in response to detecting the respective movement of the input object while the input object continues to meet the hover proximity criteria: in accordance with a determination that the respective movement is a third movement from the first hover location to a fourth hover location that is above (e.g., directly above) a fourth portion of the touch-sensitive surface: in accordance with a determination that the third movement meets second focus-shifting criteria, wherein the second focus-shifting criteria require that the fourth portion of the touch-sensitive surface corresponds to a third user interface object of the plurality of user interface object, and that the third movement includes at least a third threshold amount of lateral movement (e.g., the third threshold amount of lateral movement is greater than the first threshold amount of lateral movement), in order for the second focus-shifting criteria to be met, the device shifts (2416) input focus from the first user interface object to the third user interface object without regard to a value of the characteristic hover proximity parameter of the input object during the third movement of the input object from the first hover location to the fourth hover location (e.g., the third threshold amount of lateral movement is independent of a value of the characteristic hover proximity parameter of the input object during the third movement of the input object from the first hover location to the fourth hover location). When the first input object makes a sufficient amount of lateral movement during hover, the device takes input focus away from the first user interface object, thereby enhancing the operability of the device and making the user-device interface more efficient (e.g., performing an operation in accordance with user expectation and reducing user mistakes when operating/interacting with the device) which, additionally, reduces power usage and improves battery life of the device by enabling the user to use the device more quickly and efficiently.

In some embodiments, the characteristic hover proximity parameter of the input object is (2418) based on a hover distance (or its equivalent) of the input object from the touch-sensitive surface (and accordingly, in some embodiments, the first threshold amount of lateral movement (which is not the actual lateral movement executed by the input object) is determined based on the vertical distance of the input object from the touch-sensitive surface during the first movement from the first hover location to the second hover location). This is illustrated in FIGS. 14E-14G, for example.

In some embodiments, the characteristic hover proximity parameter of the input object is (2420) based on a rate of change in a hover distance (or its equivalent) of the input object from the touch-sensitive surface (and accordingly, in some embodiments, the first threshold amount of lateral movement (which is not the actual lateral movement executed by the input object) is determined based on a rate of change in the vertical distance of the input object from the touch-sensitive surface during the first movement from the first hover location to the second hover location). Using the rate of change in a hover distance of the input object as a parameter to determine how much lateral movement is required to shift input focus away from the first user interface object enhances the operability of the device and makes the user-device interface more efficient (e.g., by avoiding accidentally shifting input focus from an object during touch-down or lift-away processes and by reducing user mistakes when operating/interacting with the device) which, additionally, reduces power usage and improves battery life of the device by enabling the user to use the device more quickly and efficiently.

In some embodiments, the first threshold amount of lateral movement is (2422) smaller for a greater characteristic hover proximity parameter of the input object (e.g., as a result, the input focus on the first object is more stable when the input object is hovered lower over the touch-sensitive surface, and it takes more lateral movement to shift input focus away from the first user interface object when the input object is located closer to the touch-sensitive surface). This is illustrated in FIGS. 14D-14G, for example. For example, the first threshold amount of lateral movement decreases through a series of values as the input object moves toward the touch-sensitive surface and/or decreases through a series of values as the input object moves more slowly and, optionally, the first threshold amount of lateral movement increases through a series of values as the input object moves away from the touch-sensitive surface and/or increases through a series of values as the input object moves more quickly. Requiring a smaller amount of lateral movement to shift input focus when the input object is farther away from the touch-sensitive surface enhances the operability of the device and makes the user-device interface more efficient (e.g., by avoiding accidentally shifting input focus from an object when hovering close to the touch-sensitive surface and by reducing user mistakes when operating/interacting with the device) which, additionally, reduces power usage and improves battery life of the device by enabling the user to use the device more quickly and efficiently.

In some embodiments, the first threshold amount of lateral movement is (2424) greater for a greater characteristic hover proximity parameter of the input object (e.g., as a result, the input focus on the first object is more stable when the input object is hovered higher over the touch-sensitive surface, and it takes more lateral movement to shift input focus away from the first user interface object when the input object is located farther away from the touch-sensitive surface). For example, the first threshold amount of lateral movement increases through a series of values as the input object moves toward the touch-sensitive surface and/or increases through a series of values as the input object moves more slowly and, optionally, the first threshold amount of lateral movement decreases through a series of values as the input object moves away from the touch-sensitive surface and/or decreases through a series of values as the input object moves more quickly. Requiring a greater amount of lateral movement to shift input focus when the input object is farther away from the touch-sensitive surface enhances the operability of the device and makes the user-device interface more efficient (e.g., by avoiding accidentally shifting input focus from an object when hovering farther away from the touch-sensitive surface and by reducing user mistakes when operating/interacting with the device) which, additionally, reduces power usage and improves battery life of the device by enabling the user to use the device more quickly and efficiently.

In some embodiments, in accordance with a determination that the input object is moving toward the touch-sensitive surface, the device maintains (2426) input focus on the first user interface object for at least a predetermined amount of time (e.g., for long enough to determine whether the user is tapping on the touch-sensitive surface to confirm selection of the highlighted user interface object) (e.g., as a result, the input focus on the first object is more stable when the input object is moving quickly toward the touch-sensitive surface (e.g., during a tap), and it is less likely to accidentally lose input focus on the first user interface object during a tap input on the first user interface object). This is illustrated in FIGS. 14K-14L, for example. Maintaining input focus for a predetermined amount of time when the input object is moving toward the touch-sensitive surface enhances the operability of the device and makes the user-device interface more efficient (e.g., by avoiding accidentally shifting input focus from an object during a touch-down process and by reducing user mistakes when operating/interacting with the device) which, additionally, reduces power usage and improves battery life of the device by enabling the user to use the device more quickly and efficiently.

In some embodiments, the device detects (2428) that the input object meets information-object-display criteria, wherein the information-object-display criteria require that the input object meets the hover proximity criteria in order for the information-object-display criteria to be met. In response to detecting that the input object meets the information-object-display criteria, the device displays an information-display object (e.g., an information pop-up) that corresponds to the input object, including: in accordance with a determination that a respective user interface object (e.g., a respective POI represented by a corresponding pin on a map) of the plurality of user interface objects (e.g., a plurality of points of interests (POIs) represented by corresponding pins on the map) has input focus, displaying object-specific information (e.g., name, type, rating information, location information, etc.) that corresponds to the respective user interface object of the plurality of user interface object in the information-display object, and in accordance with a determination that none of the plurality of user interface objects has input focus, forgoing display any object-specific information in the information-display object (e.g., displaying an empty pop-up or displaying generic information in the information pop-up that is applicable to multiple user interface objects on the display (e.g., a cluster of multiple pins on a map)). This is illustrated in FIGS. 14C (e.g., empty information pop-up 1412) and 14D (e.g., information pop-up 1414 for location pin 1404), for example. Displaying object-specific information for a user interface object that has input focus during a hover input enhances the operability of the device and makes the user-device interface more efficient (e.g., by providing information to the user, helping the user to achieve an intended result by providing the required inputs, and reducing user mistakes when operating/interacting with the device) which, additionally, reduces power usage and improves battery life of the device by enabling the user to use the device more quickly and efficiently.

In some embodiments, the information-object-display criteria further require (2430) that the input object is hovering over a respective portion of the touch-sensitive surface that is within a threshold range of a location of at least one of the plurality of user interface objects on the display in order for the information-object-display criteria to be met (e.g., the information pop-up is only displayed if the input object is hovering over a location that is sufficiently close to at least one point of interest on the touch-screen). Displaying object-specific information for a user interface object that is within a threshold range of the input object during a hover input enhances the operability of the device and makes the user-device interface more efficient (e.g., by providing information to the user, informing the user of the internal state of the device, helping the user to achieve an intended result by providing the required inputs, and reducing user mistakes when operating/interacting with the device) which, additionally, reduces power usage and improves battery life of the device by enabling the user to use the device more quickly and efficiently.

In some embodiments, while displaying the information-display object (e.g., the information pop-up), the device detects (2432) that the input object meets information-object-expansion criteria, wherein the information-object-expansion criteria require that the input object makes contact with the touch-sensitive surface while the respective user interface object has input focus. In response to detecting that the input object meets the information-object-expansion criteria, the device displays additional object-specific information that corresponds to the respective user interface object (e.g., expanding the information pop-up to show more information on the point of interest that has input focus, or opening a webpage or window to show more information on the point of interest that has input focus). Expanding object-specific information for user input object when the input object makes contact with the touch-sensitive surface enhances the operability of the device and makes the user-device interface more efficient (e.g., by providing information to the user, helping the user to achieve an intended result by providing the required inputs, and reducing user mistakes when operating/interacting with the device) which, additionally, reduces power usage and improves battery life of the device by enabling the user to use the device more quickly and efficiently. It should be understood that the particular order in which the operations in FIGS. 24A-24E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1500, 1600, 1700, 1800, 1900, 2000, 2100, 2200 and 2300) are also applicable in an analogous manner to method 2400 described above with respect to FIGS. 24A-24E. For example, the contacts, gestures, input objects, user interface objects, tactile outputs, audio outputs, intensity thresholds, position indicators, focus selectors, and animations described above with reference to method 2400 optionally have one or more of the characteristics of the contacts, gestures, input objects, user interface objects, tactile outputs, audio outputs, intensity thresholds, position indicators, focus selectors, and animations described herein with reference to other methods described herein (e.g., methods 1500, 1600, 1700, 1800, 1900, 2000, 2100, 2200 and 2300). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 24A-24E are, optionally, implemented by components depicted in FIGS. 1A-1B. For example, detection operations 2404 and 2408, placing operation 2406, and shifting operation 2410 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A computer readable storage medium storing one or more programs, the one or more programs comprising instructions which, when executed by an electronic device with a touch-sensitive surface and a display, wherein the electronic device includes one or more sensors to detect proximity of an input object above the touch-sensitive surface, cause the electronic device to:
   display a user interface object at a first location on the display and at least one additional user interface object on the display;
   detect selection of the user interface object at the first location on the display; and,
   while the user interface object is selected:
      detect lateral movement of the input object over the touch-sensitive surface while the input object meets hover criteria; and,
      in response to detecting lateral movement of the input object over the touch-sensitive surface while the input object meets the hover criteria:
         move the selected user interface object in accordance with the lateral movement of the input object over the touch-sensitive surface; and,
         while moving the selected user interface object in accordance with the lateral movement of the input object over the touch-sensitive surface, dynamically vary a first visual characteristic of the selected user interface object relative to the first visual characteristic of the at least one additional user interface object on the display, wherein the amount by which the first visual characteristic of the selected user interface object varies relative to the first visual characteristic of the at least one additional user interface object is determined in accordance with a current hover proximity parameter of the input object.

2. The storage medium of claim 1, wherein the hover criteria include a criterion that is met when the hover proximity parameter of the input object is less than a threshold proximity value.

3. The storage medium of claim 1, including instructions which, when executed by the electronic device, cause the electronic device to:
   while the input object is detected, display a position indicator at a location on the display that corresponds to a current position of the input object over the touch-sensitive surface.

4. The storage medium of claim 3, including instructions which, when executed by the electronic device, cause the electronic device to:
   dynamically vary a visual characteristic of the position indicator in accordance with the current hover proximity parameter of the input object.

5. The storage medium of claim 1, wherein detecting selection of the user interface object includes detecting the input object making and breaking contact with the touch-sensitive surface at a location that corresponds to the first location of the user interface object on the display.

6. The storage medium of claim 1, wherein detecting selection of the user interface object includes detecting a press input by the input object at a location that corresponds to the first location of the user interface object on the display, and wherein detecting the press input includes detecting a characteristic intensity of a contact of the input object with the touch-sensitive surface above a first threshold intensity.

7. The storage medium of claim 1, wherein detecting selection of the user interface object includes detecting a long press input by the input object at a location that corresponds to the first location of the user interface object on the display, and wherein detecting the long press input includes detecting a characteristic intensity of a contact of the input object with the touch-sensitive surface remains above a first threshold intensity for at least a threshold amount of time.

8. The storage medium of claim 1, including instructions which, when executed by the electronic device, cause the electronic device to:
prior to detecting selection of the user interface object at the first location and while the input object meets the hover criteria:
detect the input object over a location on the touch-sensitive surface that corresponds to the first location of the user interface object on the display; and,
while detecting the input object over the location on the touch-sensitive surface that corresponds to the first location of the user interface object on the display, dynamically vary an appearance of the user interface object at the first location in accordance with the current hover proximity parameter of the input object;
while dynamically varying the appearance of the user interface object at the first location, detect lateral movement of the input object over the touch-sensitive surface; and,
in response to detecting lateral movement of the input object over the touch-sensitive surface:
cease to dynamically vary the appearance of the user interface object at the first location; and,
maintain the user interface object at the first location.

9. The storage medium of claim 1, including instructions which, when executed by the electronic device, cause the electronic device to:
in response to detecting selection of the user interface object at the first location on the display, provide visual feedback to indicate that the user interface object is selected.

10. The storage medium of claim 1, wherein dynamically varying the first visual characteristic of the user interface object in accordance with the current hover proximity parameter of the input object includes dynamically changing a size of the user interface object in accordance with the current hover proximity parameter of the input object.

11. The storage medium of claim 1, including instructions which, when executed by the electronic device, cause the electronic device to:
while dynamically varying the first visual characteristic of the selected user interface object, maintain display of all of the selected user interface object on the display.

12. An electronic device, comprising:
a display;
a touch-sensitive surface;
one or more sensors to detect proximity of an input object above the touch-sensitive surface;
one or more processors;
memory; and
one or more programs, wherein the one or more programs are stored in the memory and configured to be executed by the one or more processors, the one or more programs including instructions for:
displaying a user interface object at a first location on the display and at least one additional user interface object on the display;
detecting selection of the user interface object at the first location on the display; and,
while the user interface object is selected:
detecting lateral movement of the input object over the touch-sensitive surface while the input object meets hover criteria; and,
in response to detecting lateral movement of the input object over the touch-sensitive surface while the input object meets the hover criteria:
moving the selected user interface object in accordance with the lateral movement of the input object over the touch-sensitive surface; and,
while moving the selected user interface object in accordance with the lateral movement of the input object over the touch-sensitive surface, dynamically varying a first visual characteristic of the selected user interface object relative to the first visual characteristic of the at least one additional user interface object on the display, wherein the amount by which the first visual characteristic of the selected user interface object varies relative to the first visual characteristic of the at least one additional user interface object is determined in accordance with a current hover proximity parameter of the input object.

13. The electronic device of claim 12, including instructions for:
while dynamically varying the first visual characteristic of the selected user interface object, maintaining display of all of the selected user interface object on the display.

14. The electronic device of claim 12, wherein the hover criteria include a criterion that is met when the hover proximity parameter of the input object is less than a threshold proximity value.

15. The electronic device of claim 12, including instructions for:
while the input object is detected, displaying a position indicator at a location on the display that corresponds to a current position of the input object over the touch-sensitive surface.

16. The electronic device of claim 15, including instructions for:
dynamically varying a visual characteristic of the position indicator in accordance with the current hover proximity parameter of the input object.

17. The electronic device of claim 12, wherein detecting selection of the user interface object includes detecting the input object making and breaking contact with the touch-sensitive surface at a location that corresponds to the first location of the user interface object on the display.

18. The electronic device of claim 12, wherein detecting selection of the user interface object includes detecting a press input by the input object at a location that corresponds to the first location of the user interface object on the display, and wherein detecting the press input includes detecting a characteristic intensity of a contact of the input object with the touch-sensitive surface above a first threshold intensity.

19. The electronic device of claim 12, wherein detecting selection of the user interface object includes detecting a long press input by the input object at a location that corresponds to the first location of the user interface object on the display, and wherein detecting the long press input includes detecting a characteristic intensity of a contact of the input object with the touch-sensitive surface remains above a first threshold intensity for at least a threshold amount of time.

20. The electronic device of claim 12, including instructions for:
prior to detecting selection of the user interface object at the first location and while the input object meets the hover criteria:
detecting the input object over a location on the touch-sensitive surface that corresponds to the first location of the user interface object on the display; and,
while detecting the input object over the location on the touch-sensitive surface that corresponds to the first location of the user interface object on the display, dynamically varying an appearance of the user interface object at the first location in accordance with the current hover proximity parameter of the input object;
while dynamically varying the appearance of the user interface object at the first location, detecting lateral movement of the input object over the touch-sensitive surface; and,
in response to detecting lateral movement of the input object over the touch- sensitive surface:
ceasing to dynamically vary the appearance of the user interface object at the first location; and,
maintaining the user interface object at the first location.

21. The electronic device of claim 12, including instructions for:
in response to detecting selection of the user interface object at the first location on the display, providing visual feedback to indicate that the user interface object is selected.

22. The electronic device of claim 12, wherein dynamically varying the first visual characteristic of the user interface object in accordance with the current hover proximity parameter of the input object includes dynamically changing a size of the user interface object in accordance with the current hover proximity parameter of the input object.

23. A method, comprising:
at an electronic device with a touch-sensitive surface and a display, wherein the electronic device includes one or more sensors to detect proximity of an input object above the touch-sensitive surface:
displaying a user interface object at a first location on the display;
detecting selection of the user interface object at the first location on the display and at least one additional user interface object on the display; and,
while the user interface object is selected:
detecting lateral movement of the input object over the touch-sensitive surface while the input object meets hover criteria; and,
in response to detecting lateral movement of the input object over the touch-sensitive surface while the input object meets the hover criteria:
moving the selected user interface object in accordance with the lateral movement of the input object over the touch-sensitive surface; and,
while moving the selected user interface object in accordance with the lateral movement of the input object over the touch-sensitive surface, dynamically varying a first visual characteristic of the selected user interface object relative to the first visual characteristic of the at least one additional user interface object on the display, wherein the amount by which the first visual characteristic of the selected user interface object varies relative to the first visual characteristic of the at least one additional user interface object is determined in accordance with a current hover proximity parameter of the input object.

24. The method of claim 23, further comprising:
while dynamically varying the first visual characteristic of the selected user interface object, maintaining display of all of the selected user interface object on the display.

25. The method of claim 23, wherein the hover criteria include a criterion that is met when the hover proximity parameter of the input object is less than a threshold proximity value.

26. The method of claim 23, further comprising:
while the input object is detected, displaying a position indicator at a location on the display that corresponds to a current position of the input object over the touch-sensitive surface.

27. The method of claim 26, further comprising:
dynamically varying a visual characteristic of the position indicator in accordance with the current hover proximity parameter of the input object.

28. The method of claim 23, wherein detecting selection of the user interface object includes detecting the input object making and breaking contact with the touch- sensitive surface at a location that corresponds to the first location of the user interface object on the display.

29. The method of claim 23, wherein detecting selection of the user interface object includes detecting a press input by the input object at a location that corresponds to the first location of the user interface object on the display, and wherein detecting the press input includes detecting a characteristic intensity of a contact of the input object with the touch- sensitive surface above a first threshold intensity.

30. The method of claim 23, wherein detecting selection of the user interface object includes detecting a long press input by the input object at a location that corresponds to the first location of the user interface object on the display, and wherein detecting the long press input includes detecting a characteristic intensity of a contact of the input object with the touch-sensitive surface remains above a first threshold intensity for at least a threshold amount of time.

31. The method of claim 23, further comprising:
prior to detecting selection of the user interface object at the first location and while the input object meets the hover criteria:
detecting the input object over a location on the touch-sensitive surface that corresponds to the first location of the user interface object on the display; and,
while detecting the input object over the location on the touch-sensitive surface that corresponds to the first location of the user interface object on the display, dynamically varying an appearance of the user interface object at the first location in accordance with the current hover proximity parameter of the input object;
while dynamically varying the appearance of the user interface object at the first location, detecting lateral movement of the input object over the touch-sensitive surface; and,
in response to detecting lateral movement of the input object over the touch- sensitive surface:
ceasing to dynamically vary the appearance of the user interface object at the first location; and,
maintaining the user interface object at the first location.

32. The method of claim 23, further comprising:
in response to detecting selection of the user interface object at the first location on the display, providing visual feedback to indicate that the user interface object is selected.

33. The method of claim 23, wherein dynamically varying the first visual characteristic of the user interface object in accordance with the current hover proximity parameter of the input object includes dynamically changing a size of the user interface object in accordance with the current hover proximity parameter of the input object.

* * * * *